United States Patent
Yanai et al.

(10) Patent No.: US 6,626,146 B1
(45) Date of Patent: Sep. 30, 2003

(54) ELECTROMAGNETIC VALVE DRIVE APPARATUS OF INTERNAL COMBUSTION ENGINE

(75) Inventors: Akihiro Yanai, Toyota (JP); Mitsugu Makita, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 225 days.

(21) Appl. No.: 09/729,289

(22) Filed: Dec. 5, 2000

(30) Foreign Application Priority Data

Dec. 7, 1999 (JP) .......................... 11-347396

(51) Int. Cl.⁷ .......................... F01L 9/04; F02D 13/02
(52) U.S. Cl. ................ 123/432; 123/90.11; 251/129.15
(58) Field of Search .................. 123/432, 315, 123/90.11; 251/129.01, 129.1, 129.15, 129.16

(56) References Cited

U.S. PATENT DOCUMENTS

| 4,706,619 A | * 11/1987 | Buchl .................. 123/90.11 |
| 5,499,157 A | 3/1996 | Younessi et al. |
| 5,915,347 A | * 6/1999 | Yanai et al. ............. 123/90.11 |
| 6,276,318 B1 | * 8/2001 | Yanai et al. ............. 123/90.11 |

FOREIGN PATENT DOCUMENTS

| EP | 0 727 566 A3 | 8/1996 |
| EP | 0 727 566 A2 | 8/1996 |
| EP | 1 036 964 A1 | 9/2000 |
| JP | (P) HEI 08-284626 | 8/1995 |
| JP | (P) HEI 09-189209 | 1/1996 |
| JP | 9-189253 | 7/1997 |
| JP | 9-217613 | 8/1997 |
| JP | (P) HEI 11-166657 | 12/1997 |
| WO | WO99/30068 | 6/1999 |

* cited by examiner

Primary Examiner—Henry C. Yuen
Assistant Examiner—Arnold Castro
(74) Attorney, Agent, or Firm—Kenyon & Kenyon

(57) ABSTRACT

An electromagnetic valve drive apparatus of an internal combustion engine has a three-switching element in-series type drive circuit. Through switching operations of switching elements that are shared by eight electromagnetic coils consisting of upper coils and lower coils of four valves. The four valves include a first two valves that perform identical operations and a second two valves whose open period does not overlap the open period of the first two valves. The three-switching element in-series type drive circuit is able to supply current and to rapidly reduce, or discontinue, current through the electromagnetic coils. The electromagnetic valve drive apparatus is able to control the quantity of current through the electromagnetic coils while reducing the number of switching elements employed.

22 Claims, 157 Drawing Sheets

[SWITCHING PATTERN a1]

[SWITCHING PATTERN b1]

[SWITCHING PATTERN c1]

[SWITCHING PATTERN d1]

[SWITCHING PATTERN a2]

[SWITCHING PATTERN b2]

[SWITCHING PATTERN c2]

[SWITCHING PATTERN d2]

FIG. 16

| | INTAKE/EXHAUST VALVES DRIVEN |
|---|---|
| DRIVE CIRCUIT 92a | 2 INTAKE VALVES OF CYLINDER 2a + 2 INTAKE VALVES OF CYLINDER 2d = 4 VALVES |
| DRIVE CIRCUIT 92b | 2 EXHAUST VALVES OF CYLINDER 2a + 2 EXHAUST VALVES OF CYLINDER 2d = 4 VALVES |
| DRIVE CIRCUIT 92c | 2 INTAKE VALVES OF CYLINDER 2b + 2 INTAKE VALVES OF CYLINDER 2c = 4 VALVES |
| DRIVE CIRCUIT 92d | 2 EXHAUST VALVES OF CYLINDER 2b + 2 EXHAUST VALVES OF CYLINDER 2c = 4 VALVES |

[SWITCHING PATTERN a11]

[SWITCHING PATTERN b11]

[SWITCHING PATTERN c11]

[SWITCHING PATTERN d11]

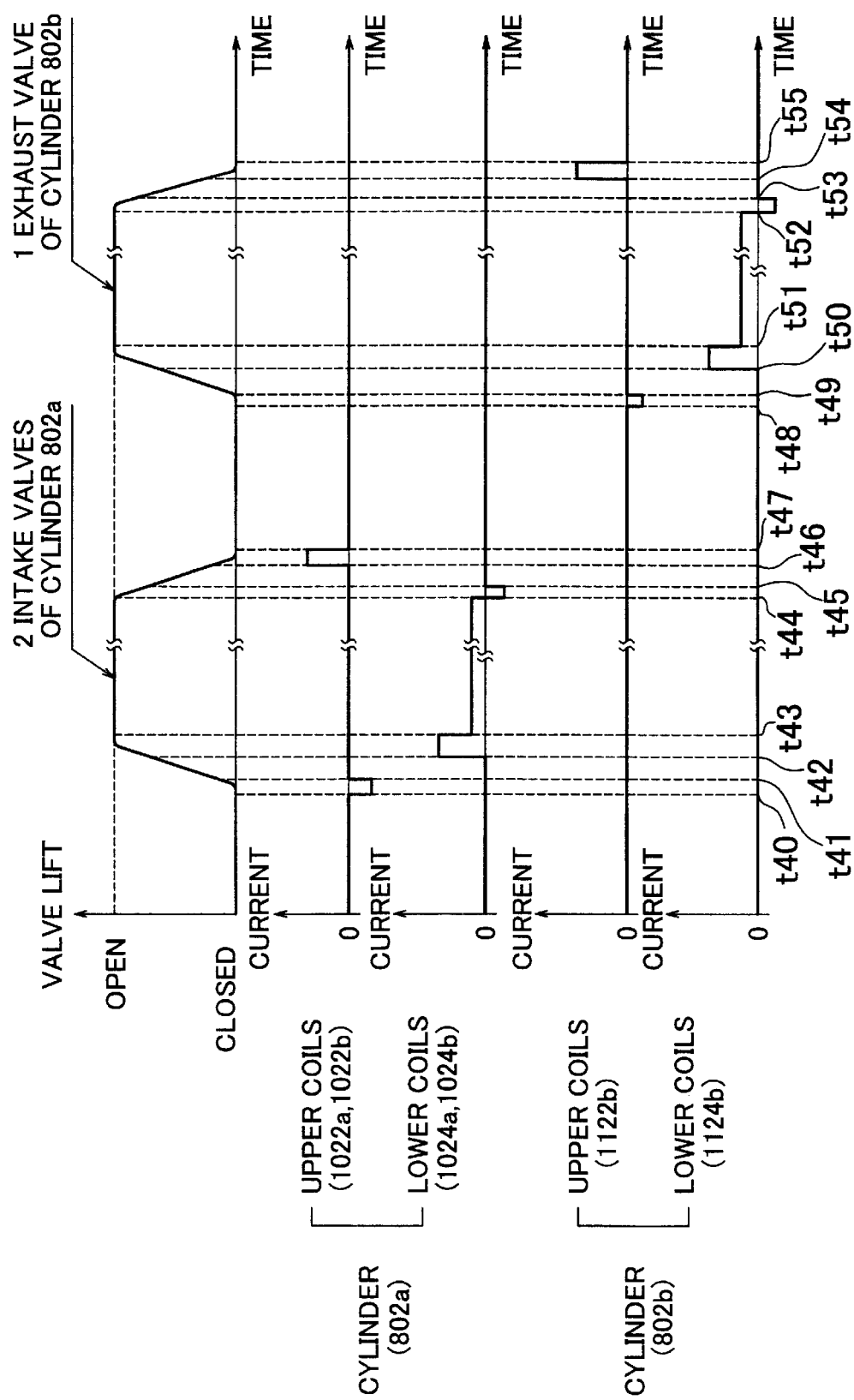

[SWITCHING PATTERN a21]

[SWITCHING PATTERN b21]

[SWITCHING PATTERN e21]

[SWITCHING PATTERN f21]

[ SWITCHING PATTERN a22 ]

[ SWITCHING PATTERN b22 ]

[SWITCHING PATTERN c22]

[SWITCHING PATTERN d22]

FIG. 26

| | INTAKE/EXHAUST VALVES DRIVEN |
|---|---|
| DRIVE CIRCUIT 992a | 2 INTAKE VALVES OF CYLINDER 802a<br>+ 1 EXHAUST VALVES OF CYLINDER 802b = 3 VALVES |
| DRIVE CIRCUIT 992b | 2 INTAKE VALVES OF CYLINDER 802b<br>+ 1 EXHAUST VALVES OF CYLINDER 802d = 3 VALVES |
| DRIVE CIRCUIT 992c | 2 INTAKE VALVES OF CYLINDER 802c<br>+ 1 EXHAUST VALVES OF CYLINDER 802a = 3 VALVES |
| DRIVE CIRCUIT 992d | 2 INTAKE VALVES OF CYLINDER 802d<br>+ 1 EXHAUST VALVES OF CYLINDER 802c = 3 VALVES |

[SWITCHING PATTERN a31]

[SWITCHING PATTERN b31]

[SWITCHING PATTERN e31]

[SWITCHING PATTERN f31]

[SWITCHING PATTERN a32]

[SWITCHING PATTERN b32]

FIG. 36

| | INTAKE/EXHAUST VALVES DRIVEN |
|---|---|
| DRIVE CIRCUIT 1592a | 3 INTAKE VALVES OF CYLINDER 1402a<br>+ 2 EXHAUST VALVES OF CYLINDER 1402b = 5 VALVES |
| DRIVE CIRCUIT 1592b | 3 INTAKE VALVES OF CYLINDER 1402b<br>+ 2 EXHAUST VALVES OF CYLINDER 1402d = 5 VALVES |
| DRIVE CIRCUIT 1592c | 3 INTAKE VALVES OF CYLINDER 1402c<br>+ 2 EXHAUST VALVES OF CYLINDER 1402a = 5 VALVES |
| DRIVE CIRCUIT 1592d | 3 INTAKE VALVES OF CYLINDER 1402d<br>+ 2 EXHAUST VALVES OF CYLINDER 1402c = 5 VALVES |

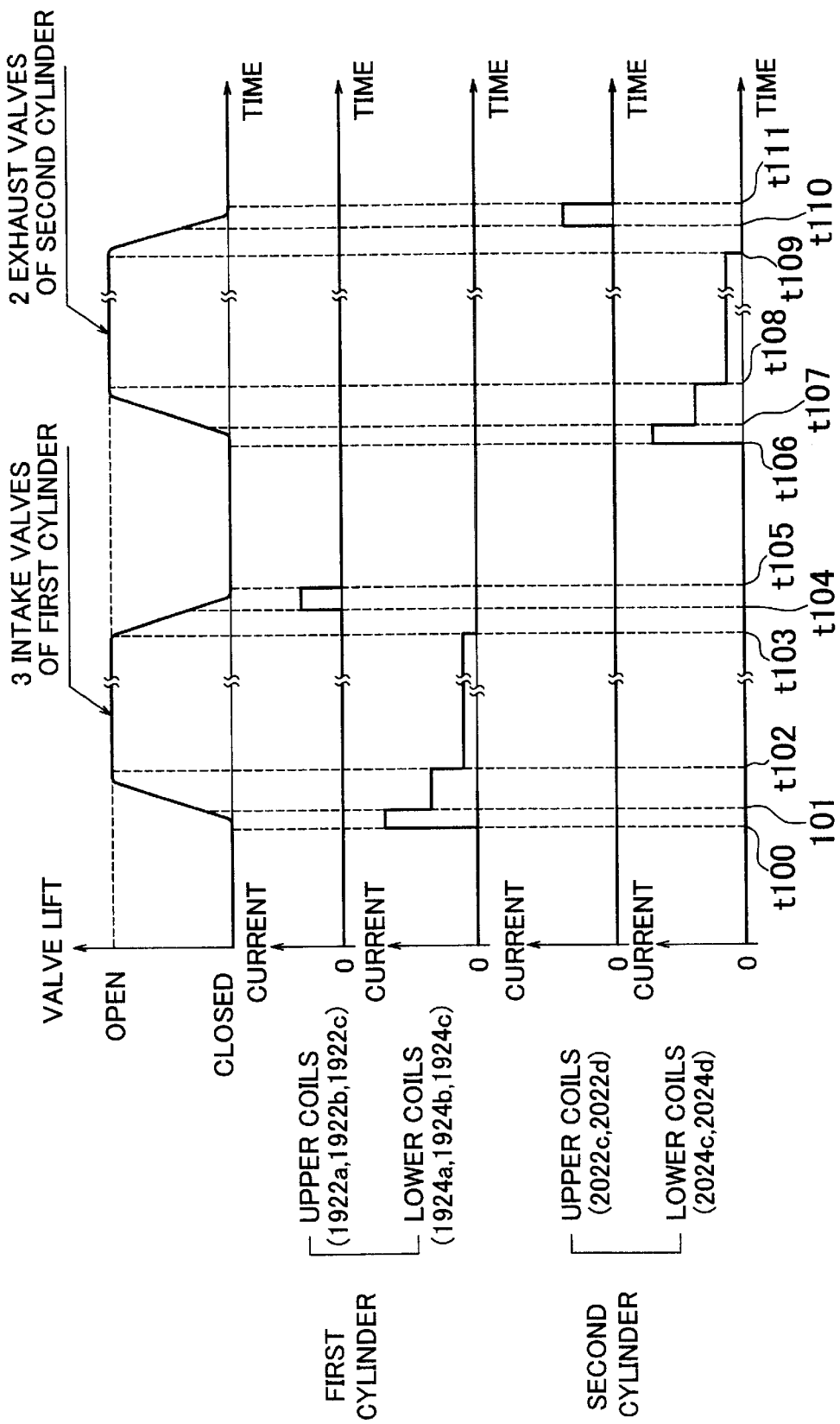

FIG. 46

| | INTAKE/EXHAUST VALVES DRIVEN |
|---|---|
| DRIVE CIRCUIT 2292a | 3 INTAKE VALVES OF CYLINDER 2102a<br>+ 3 INTAKE VALVES OF CYLINDER 2102d = 6 VALVES |
| DRIVE CIRCUIT 2292b | 3 EXHAUST VALVES OF CYLINDER 2102a<br>+ 3 EXHAUST VALVES OF CYLINDER 2102d = 6 VALVES |
| DRIVE CIRCUIT 2292c | 3 INTAKE VALVES OF CYLINDER 2102b<br>+ 3 INTAKE VALVES OF CYLINDER 2102c = 6 VALVES |
| DRIVE CIRCUIT 2292d | 3 EXHAUST VALVES OF CYLINDER 2102b<br>+ 3 EXHAUST VALVES OF CYLINDER 2102c = 6 VALVES |

[SWITCHING PATTERN a81]

[SWITCHING PATTERN b81]

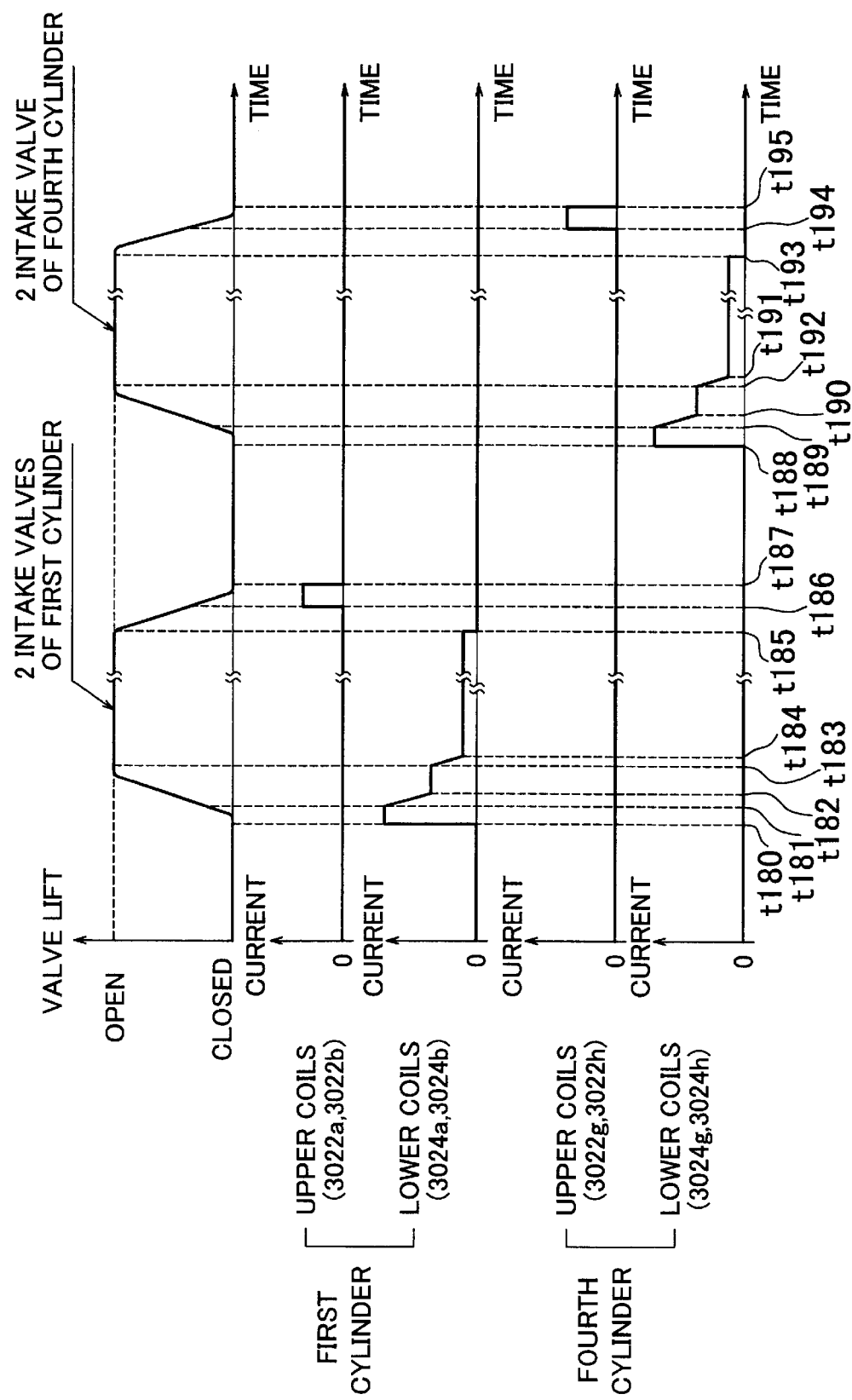

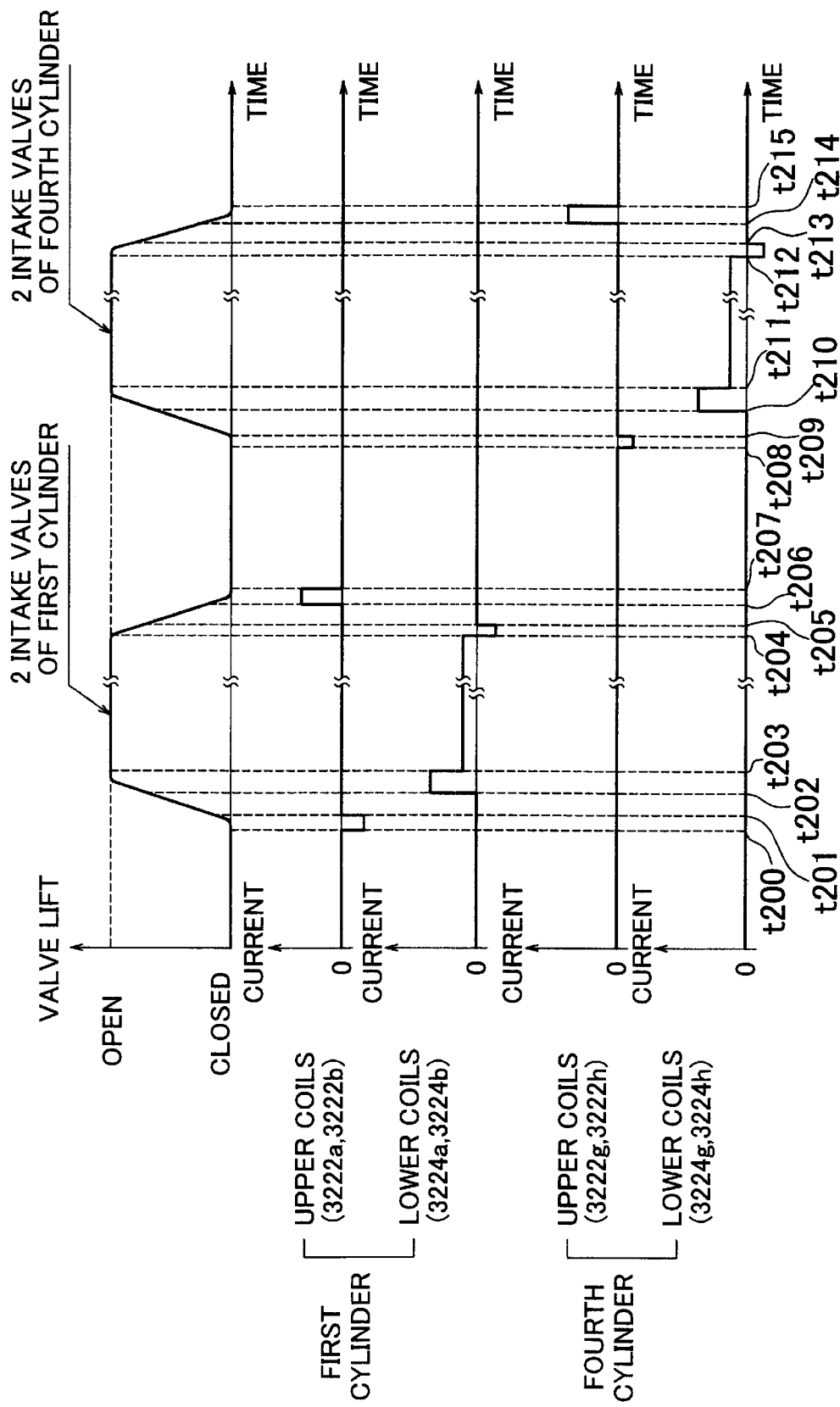

F I G. 61E
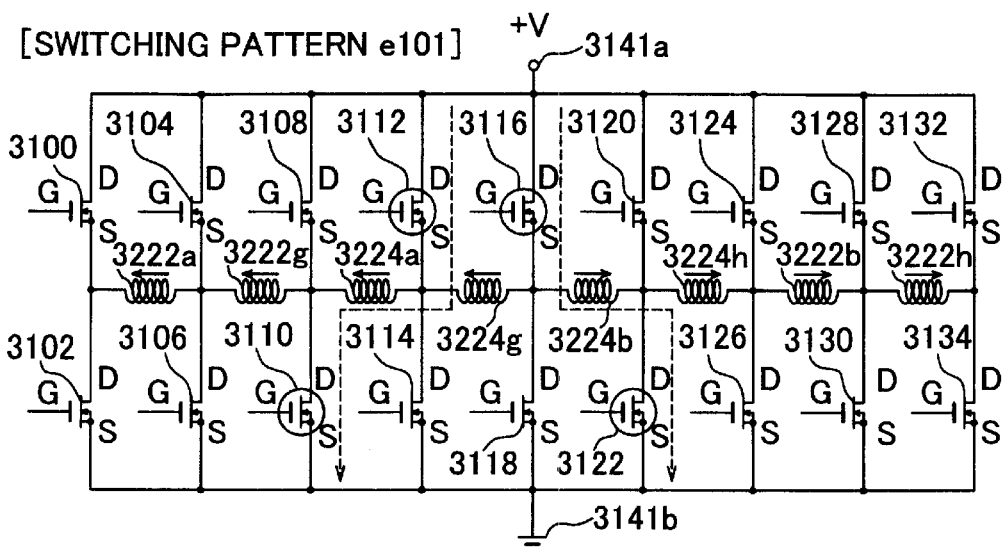
F I G. 61F
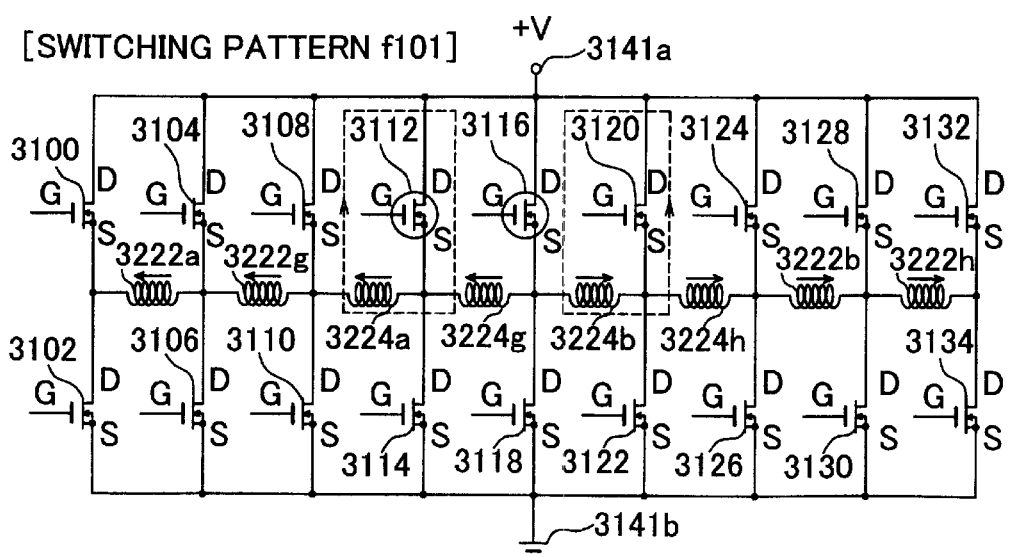

FIG. 70 A1
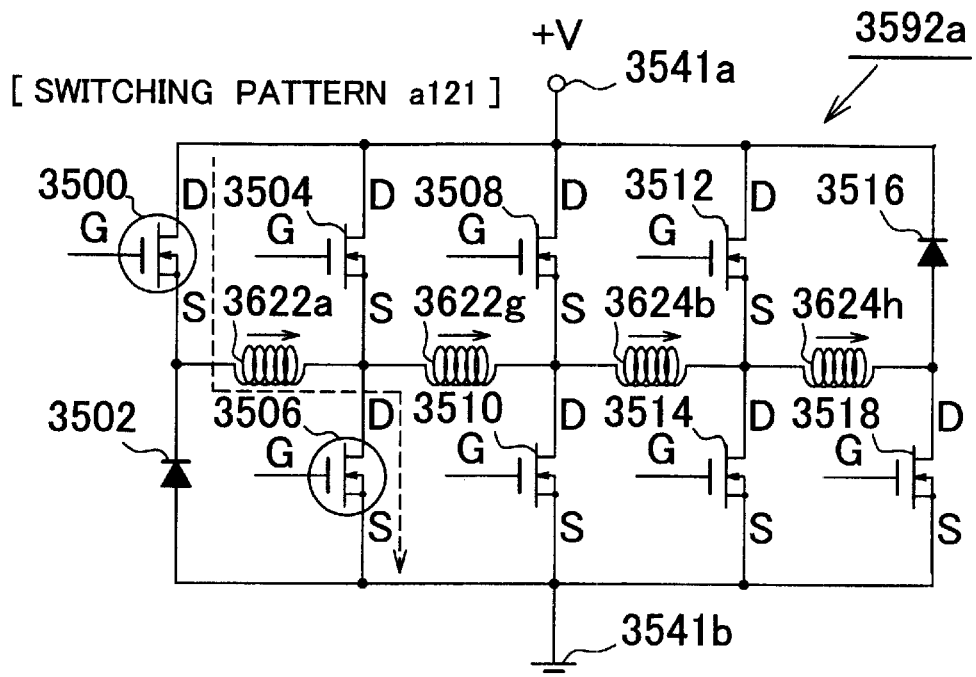
FIG. 70 B1
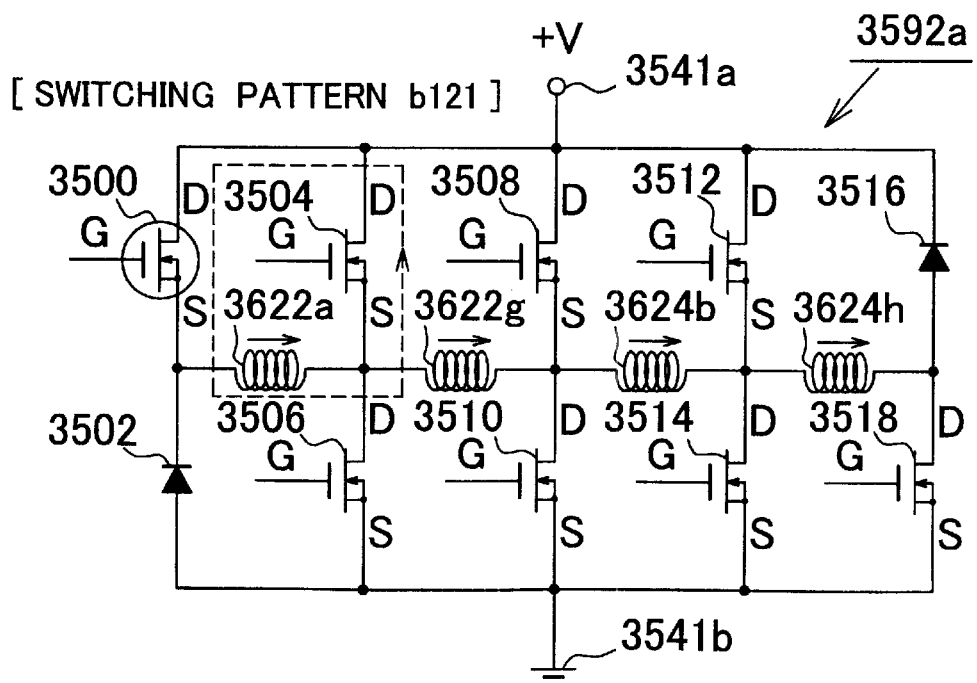

FIG. 70 C1
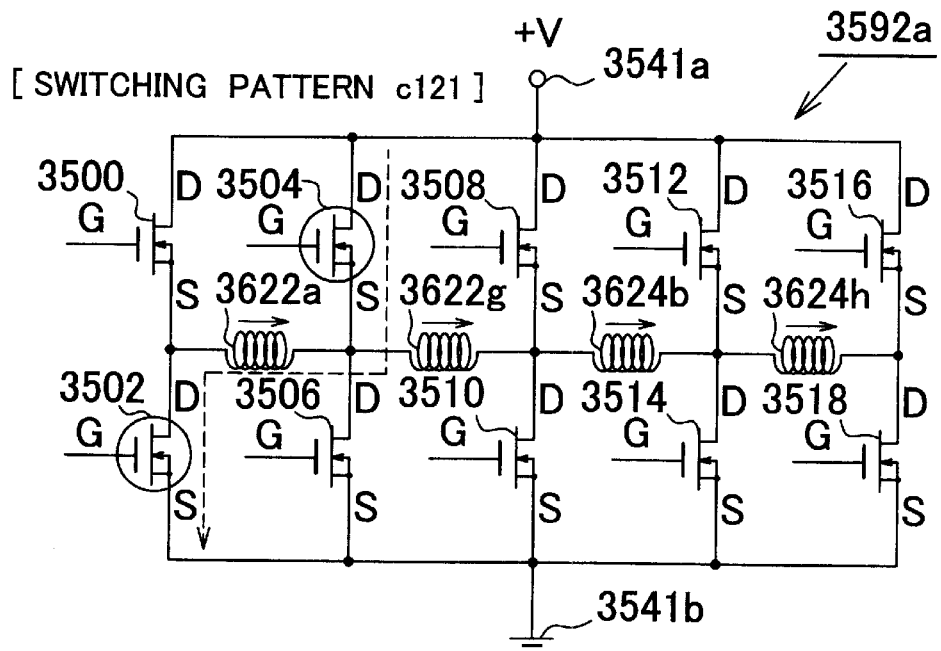
FIG. 70 D1
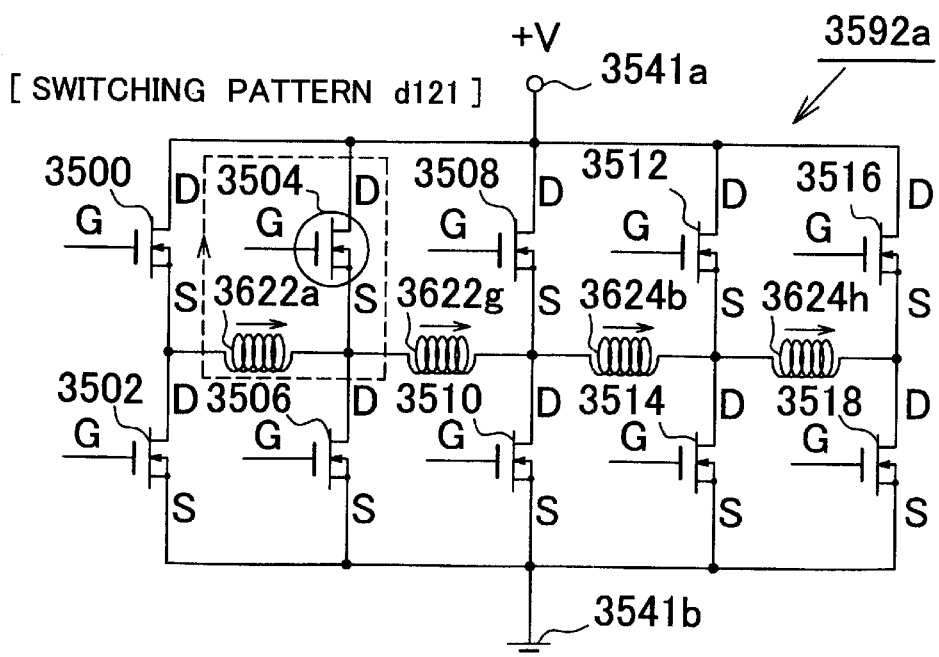

FIG. 70 C2
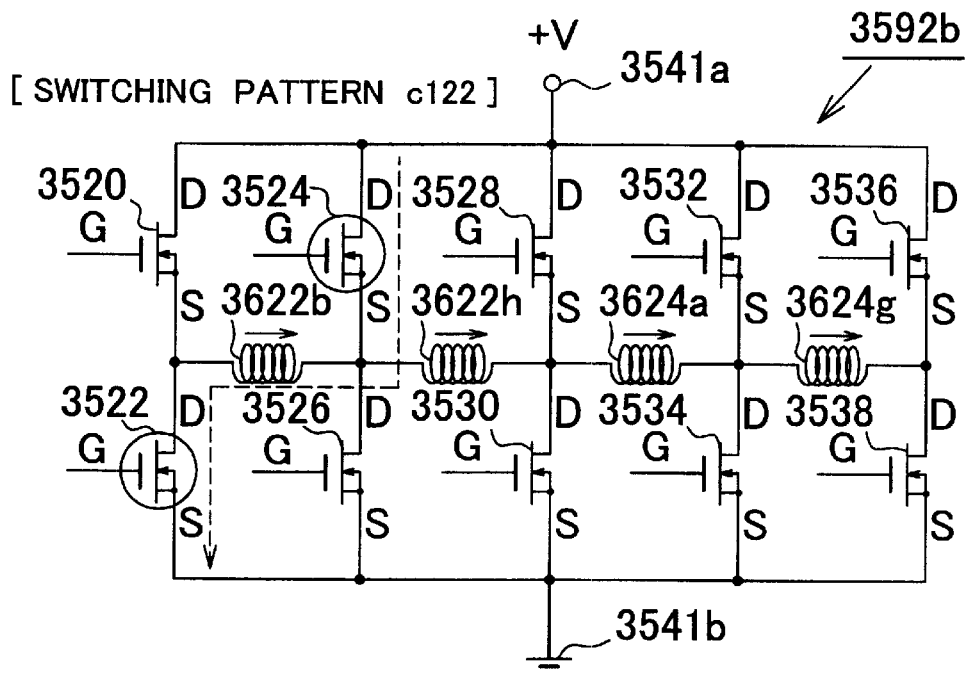
FIG. 70 D2
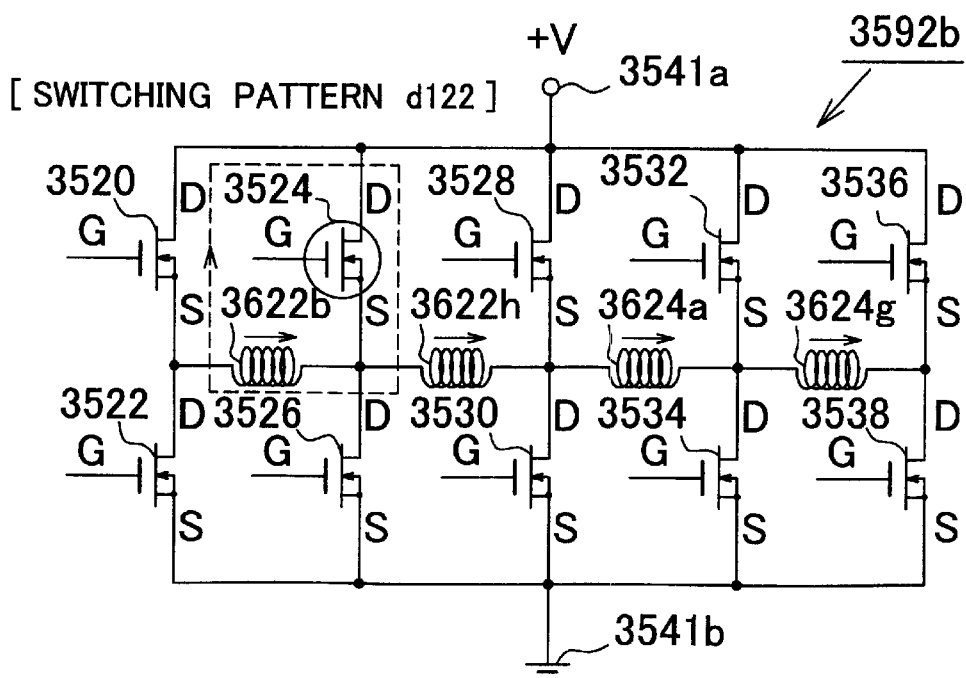

FIG. 70 E1
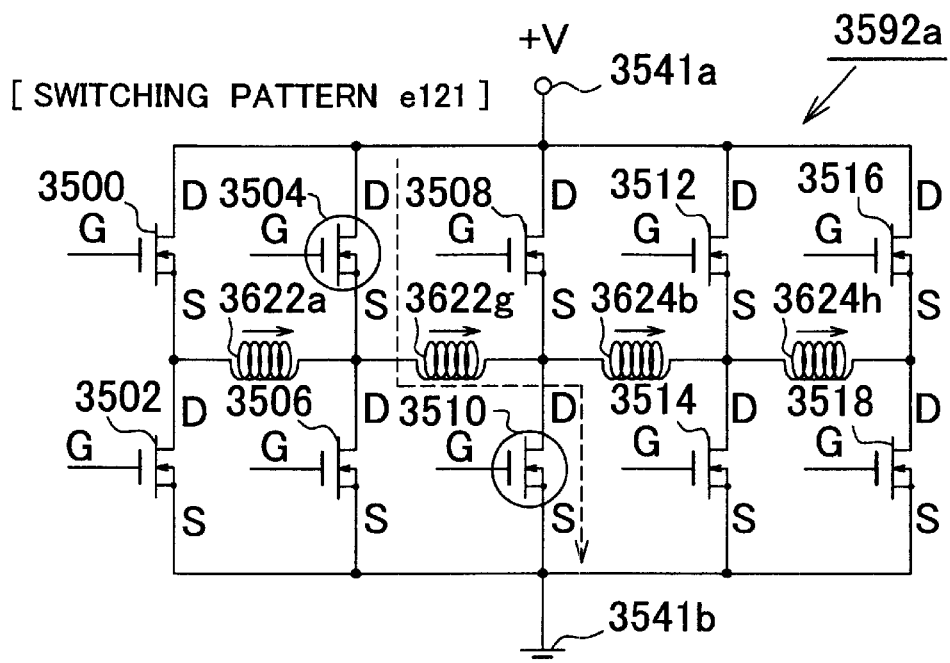
FIG. 70 F1
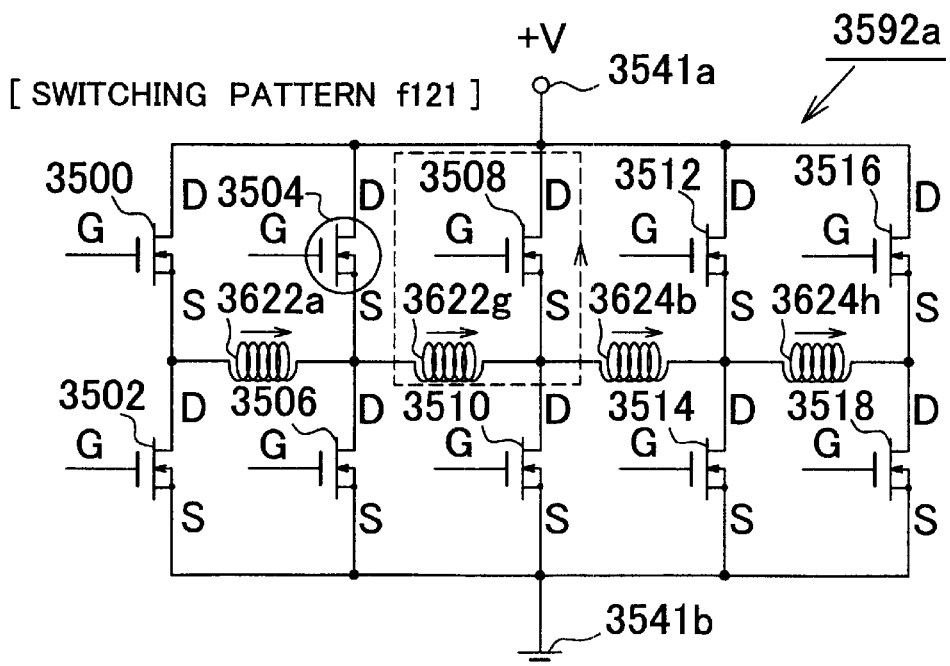

FIG. 70 E2
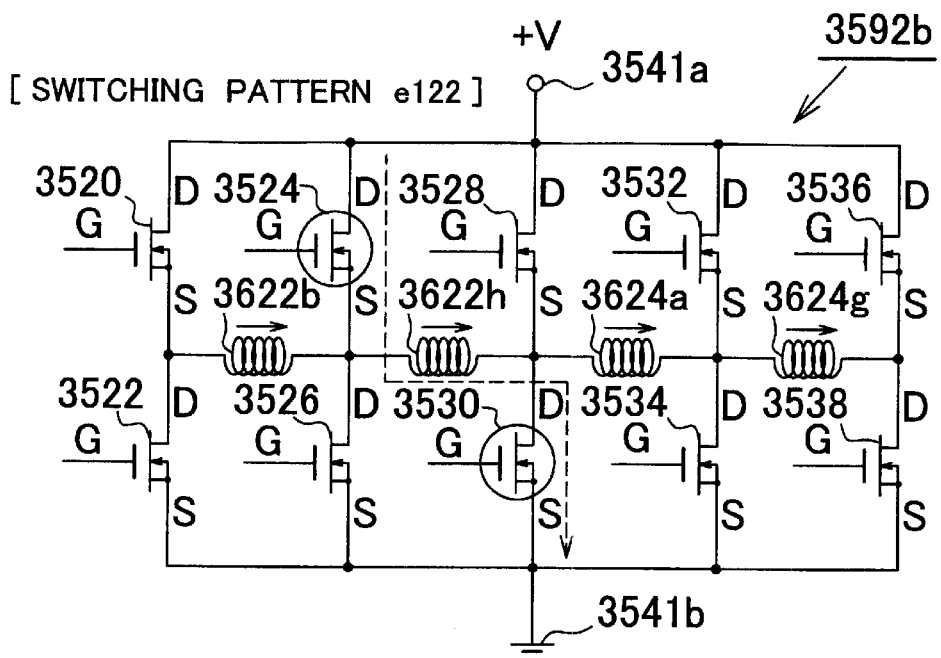
FIG. 70 F2
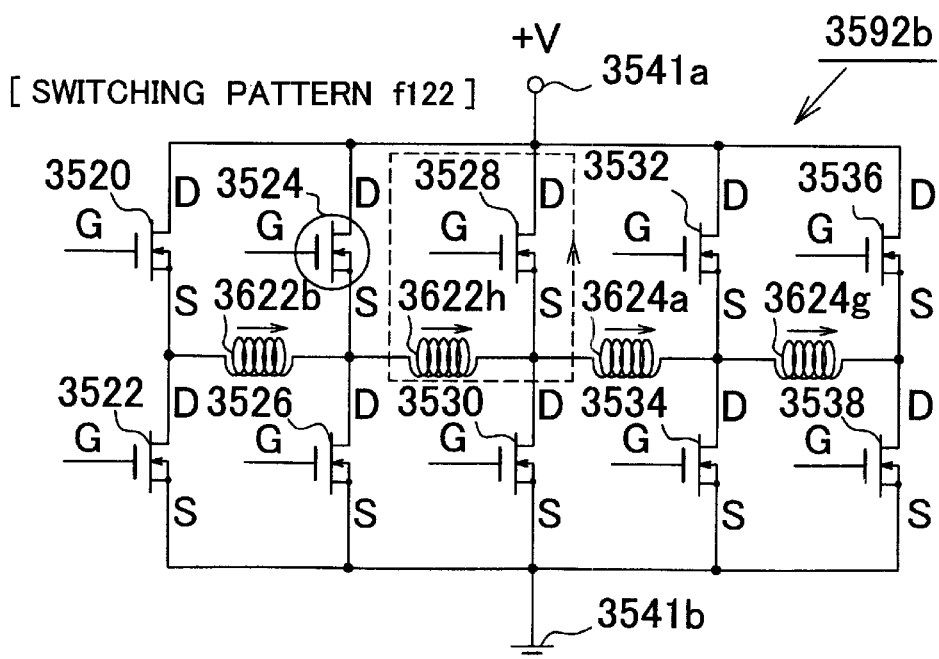

FIG. 70 G1
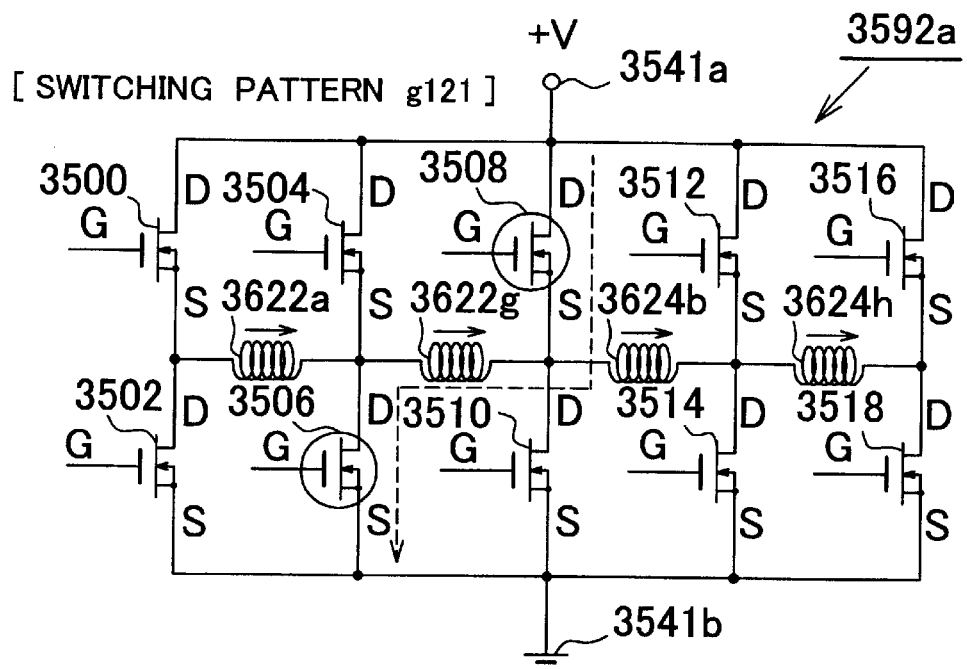
FIG. 70 H1
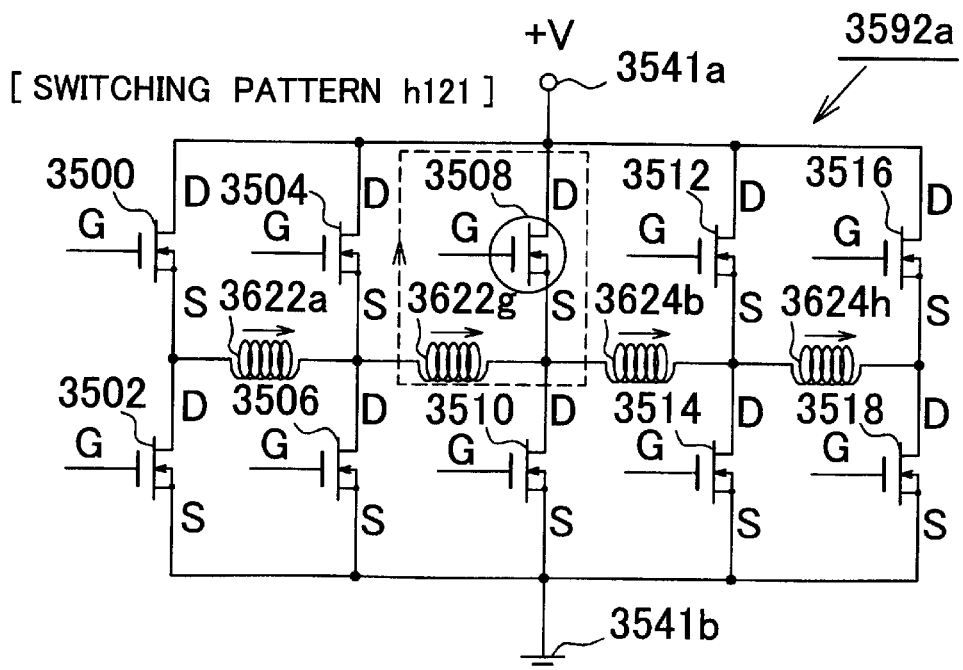

FIG. 70 G2
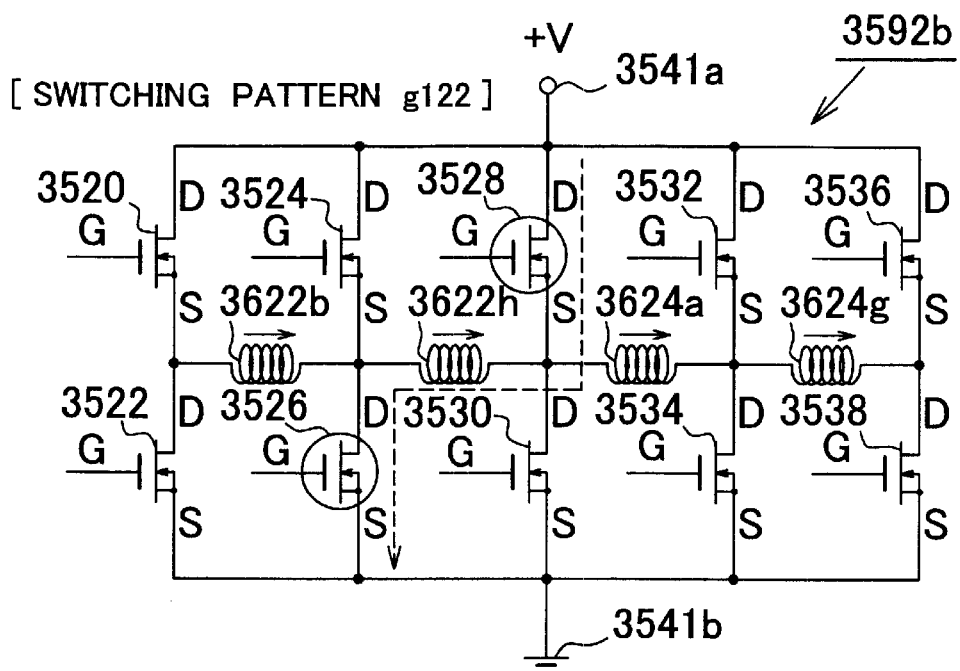
FIG. 70 H2
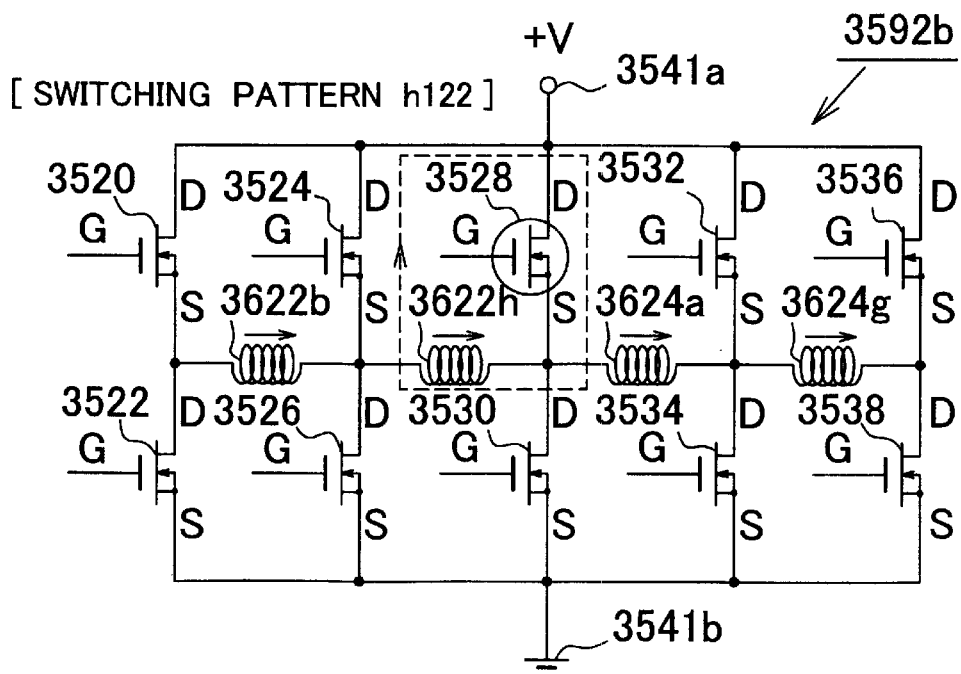

FIG. 70 I1
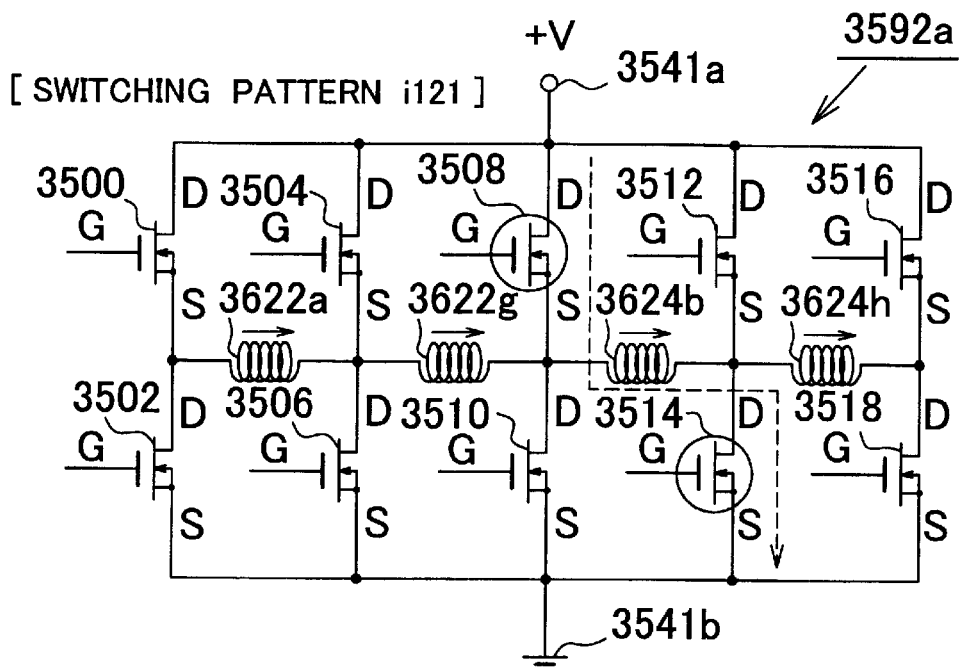
FIG. 70 J1
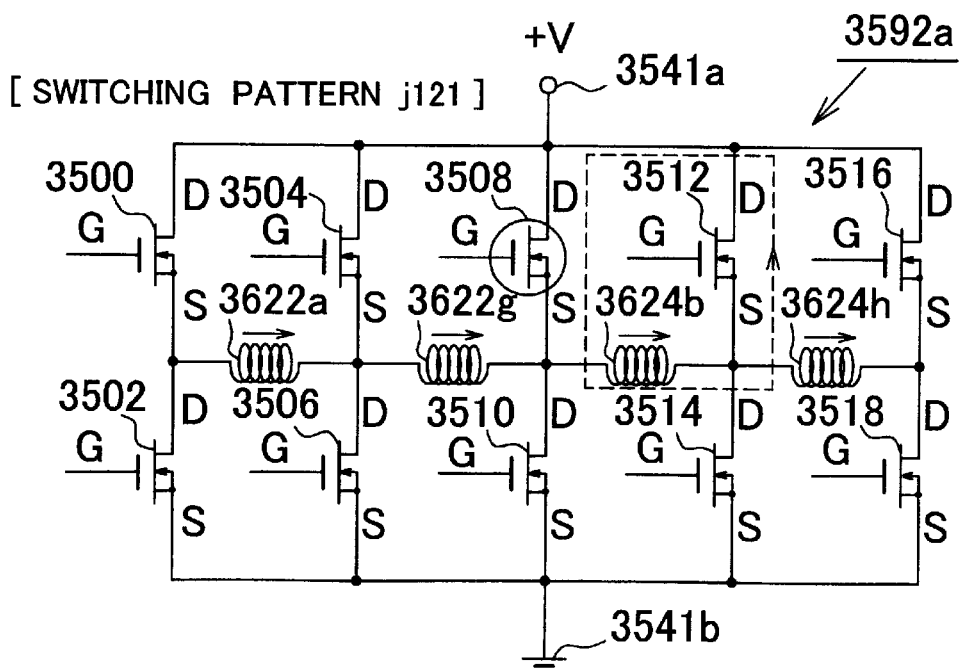

FIG. 70 I2
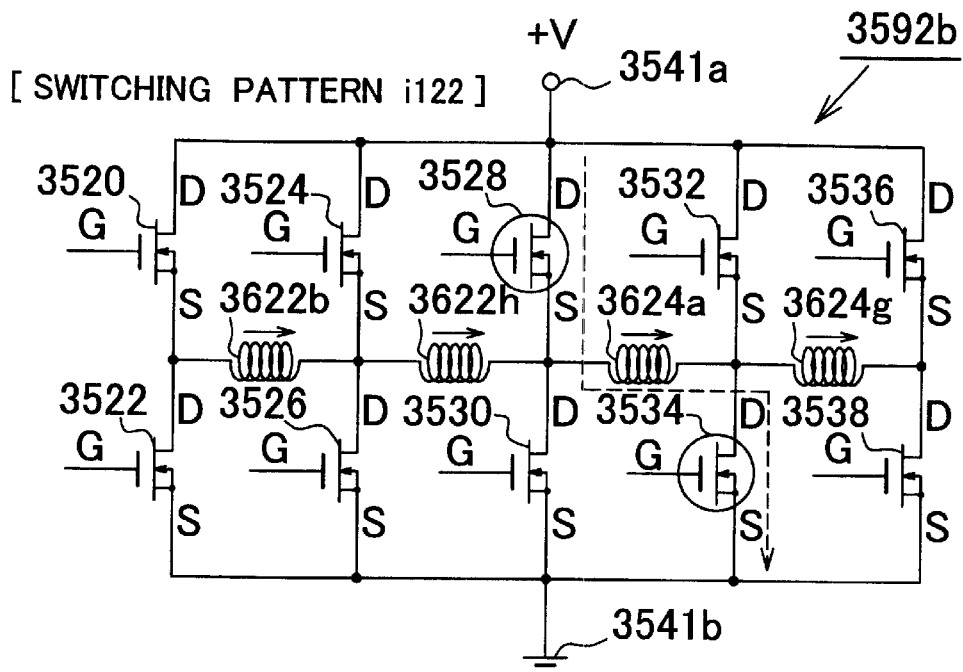
FIG. 70 J2
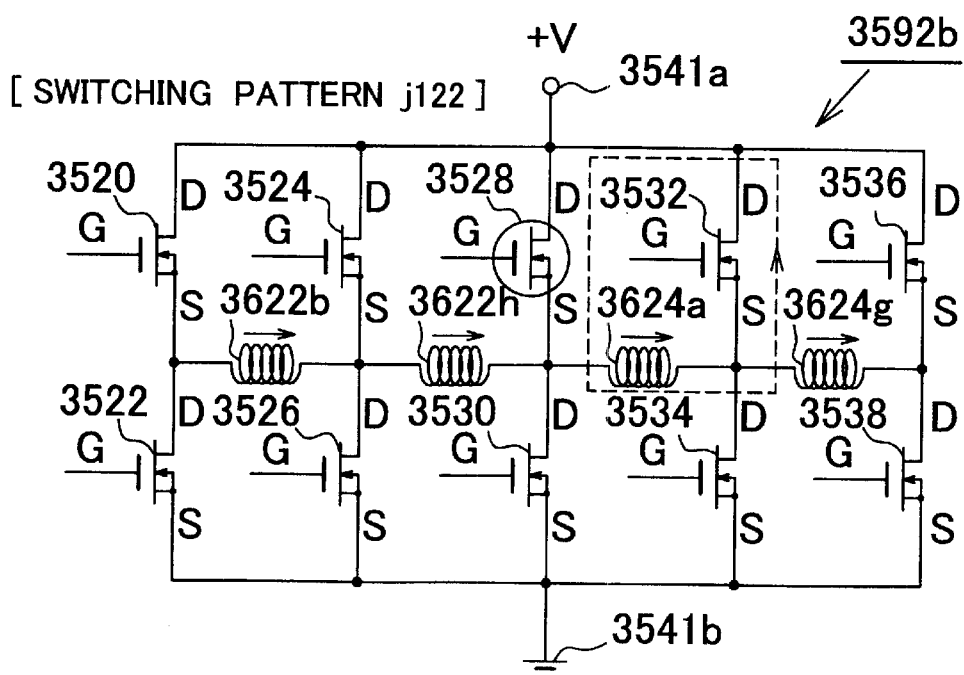

FIG. 70 K1
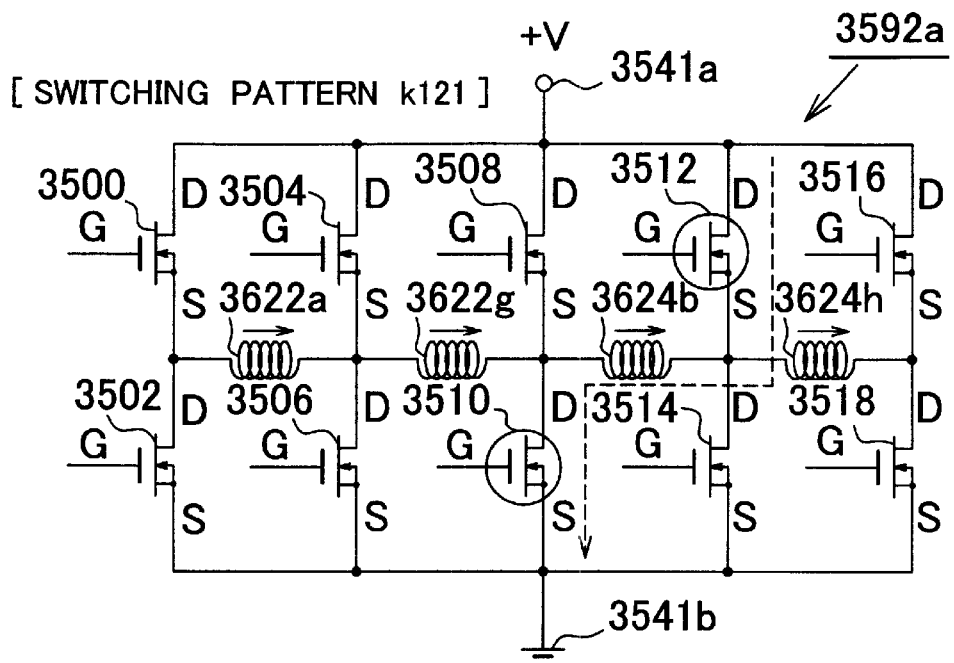
FIG. 70 L1
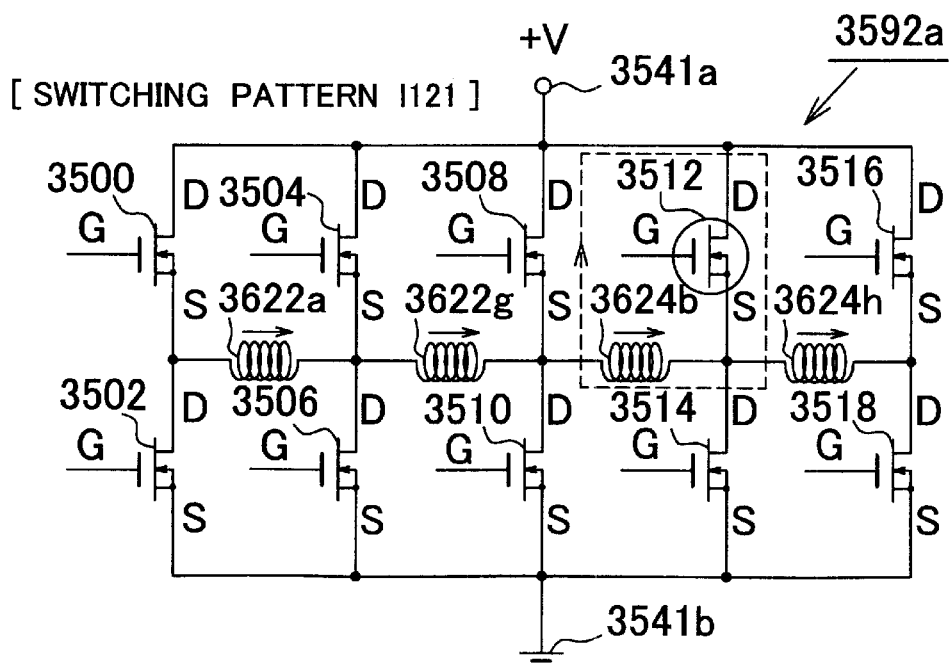

FIG. 70 K2
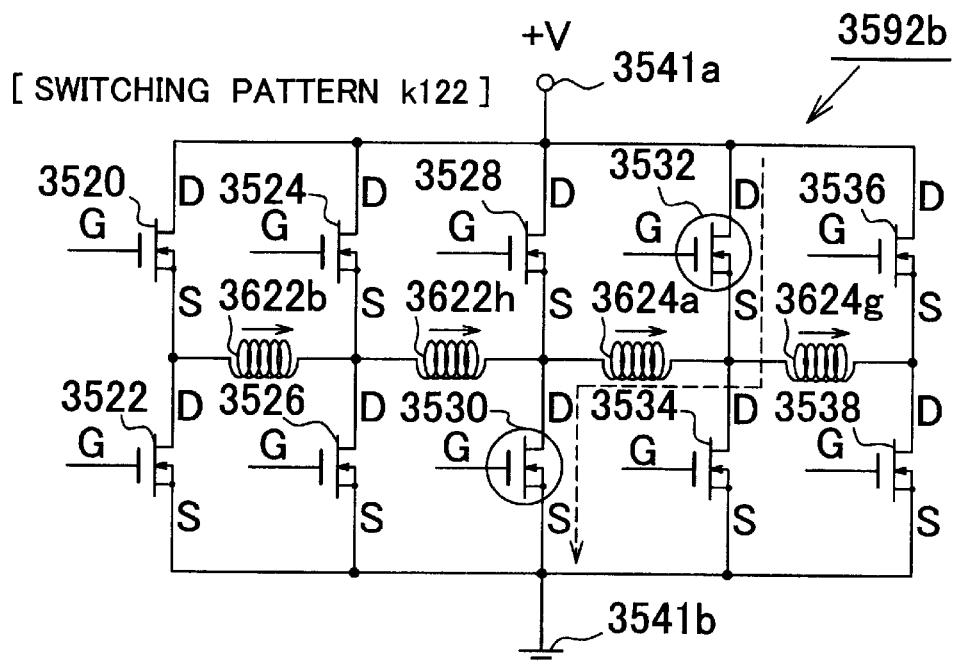
FIG. 70 L2
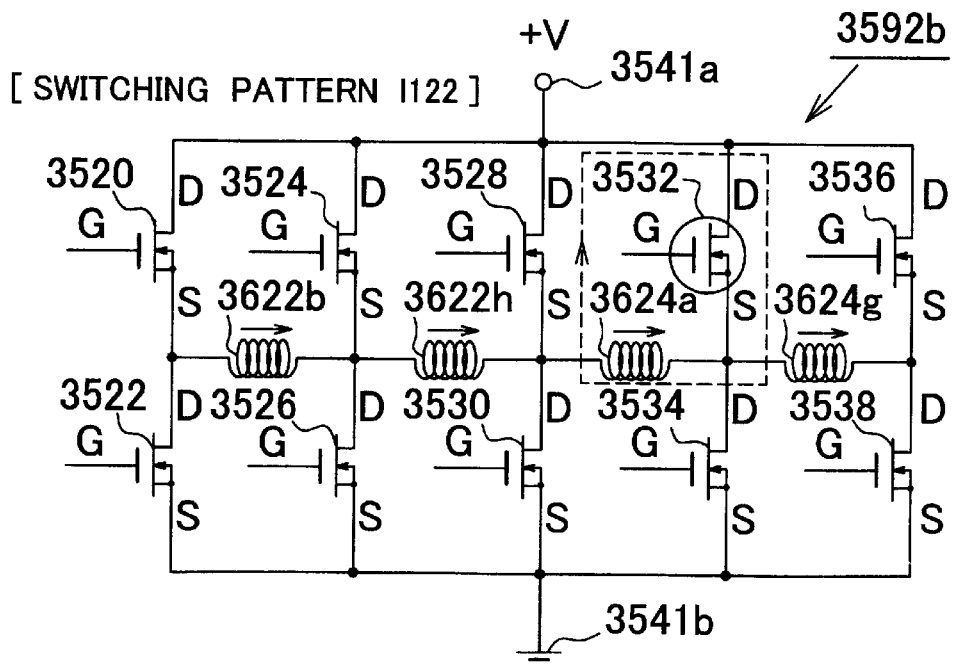

FIG. 70 M1
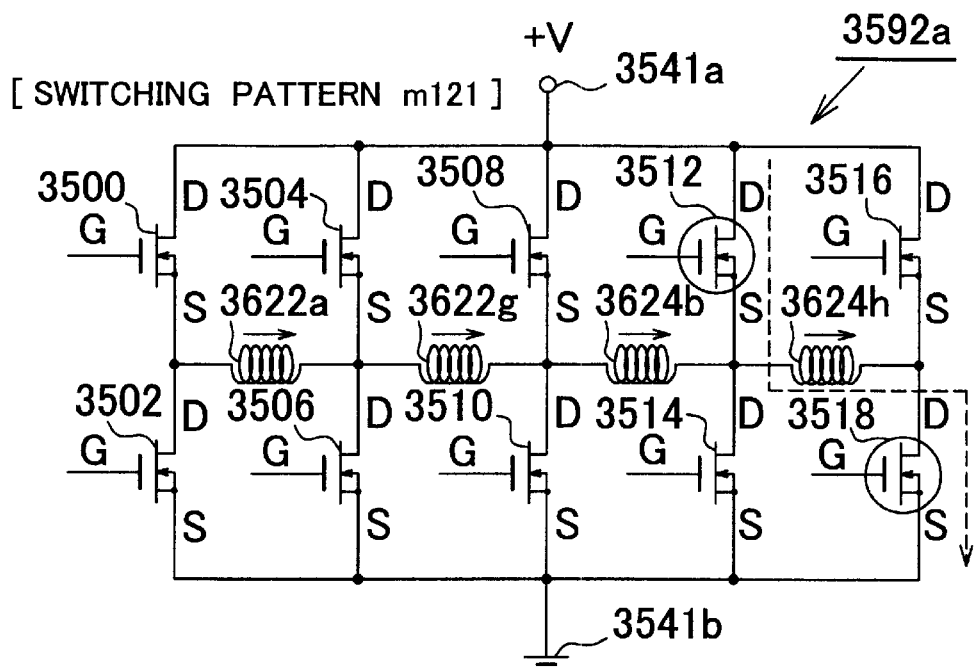
FIG. 70 N1
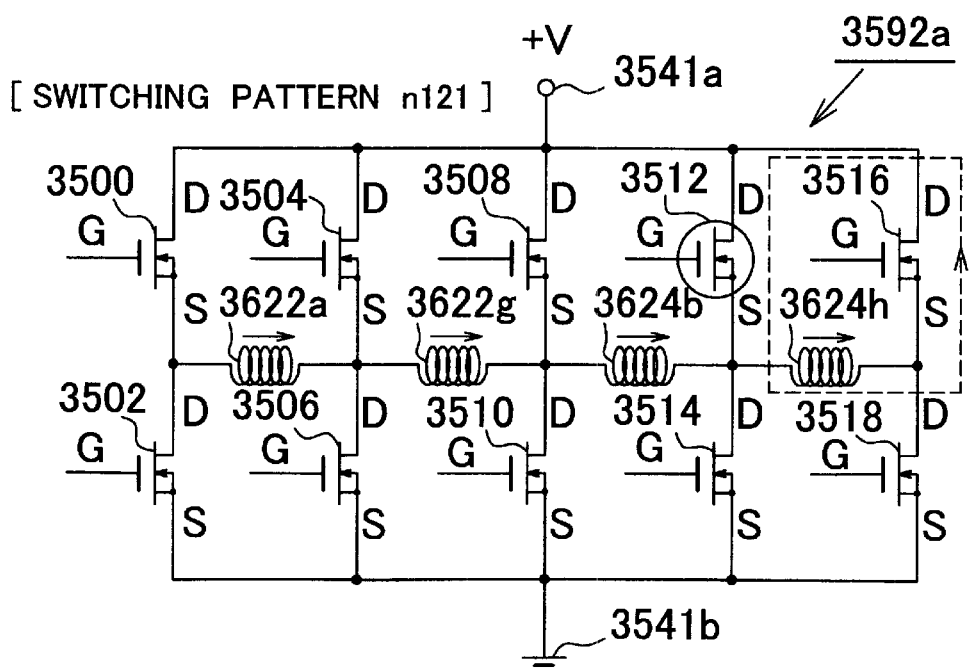

FIG. 70 M2
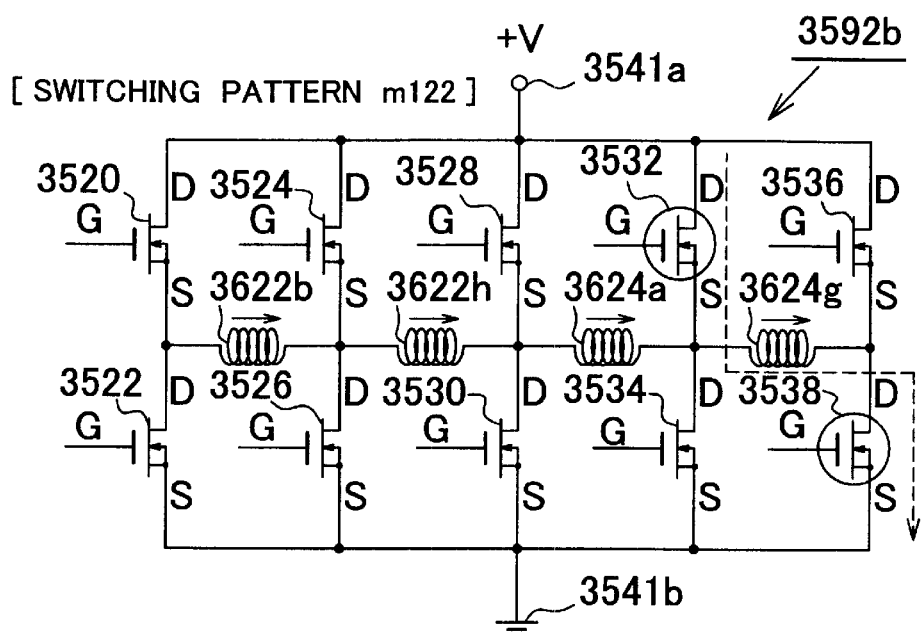
FIG. 70 N2
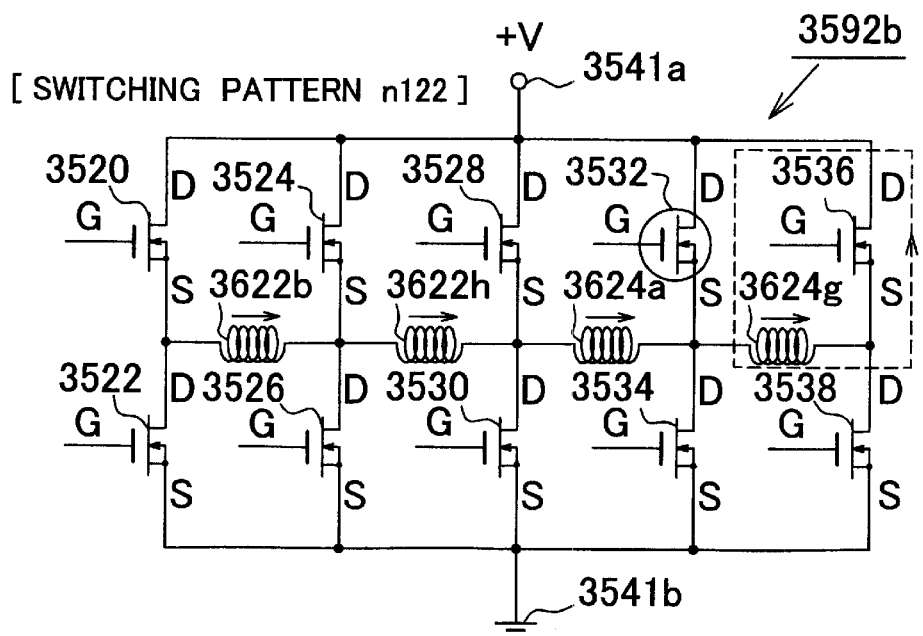

FIG. 70 O1
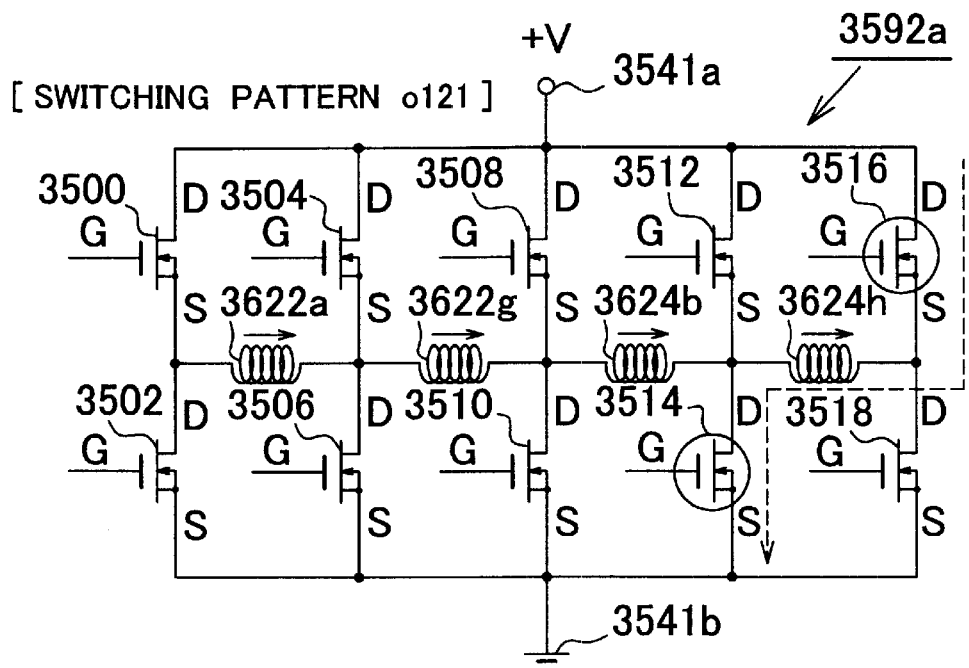
FIG. 70 P1
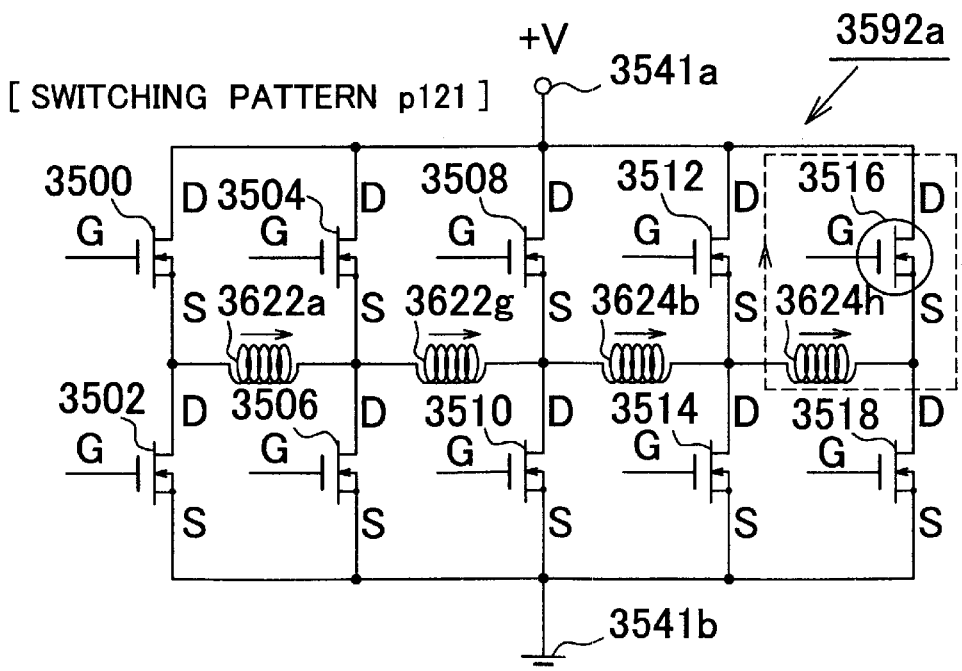

FIG. 70 O2
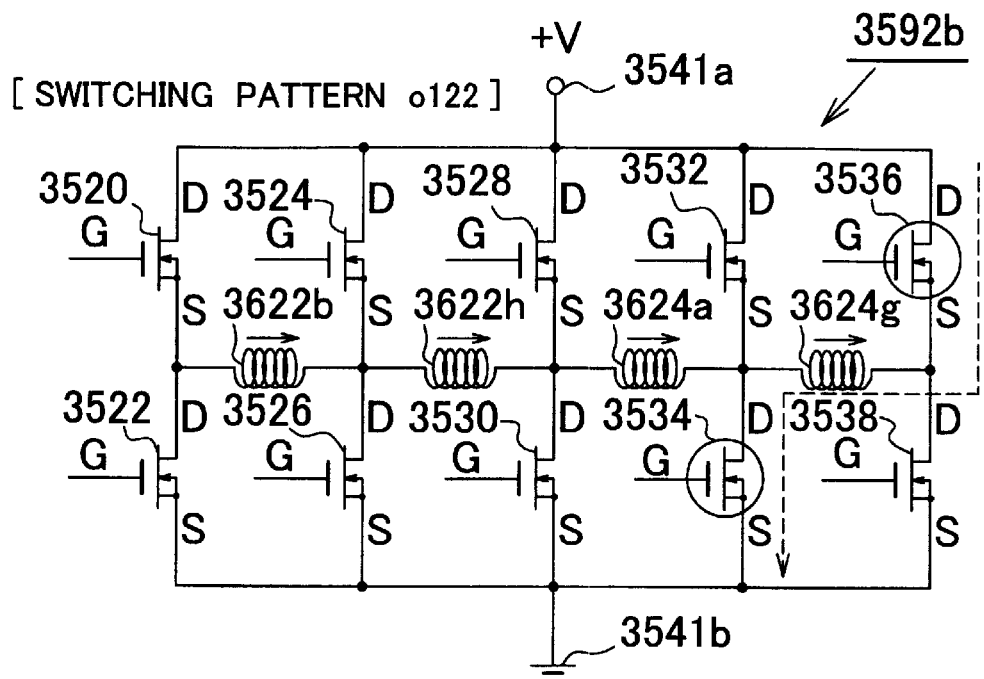
FIG. 70 P2
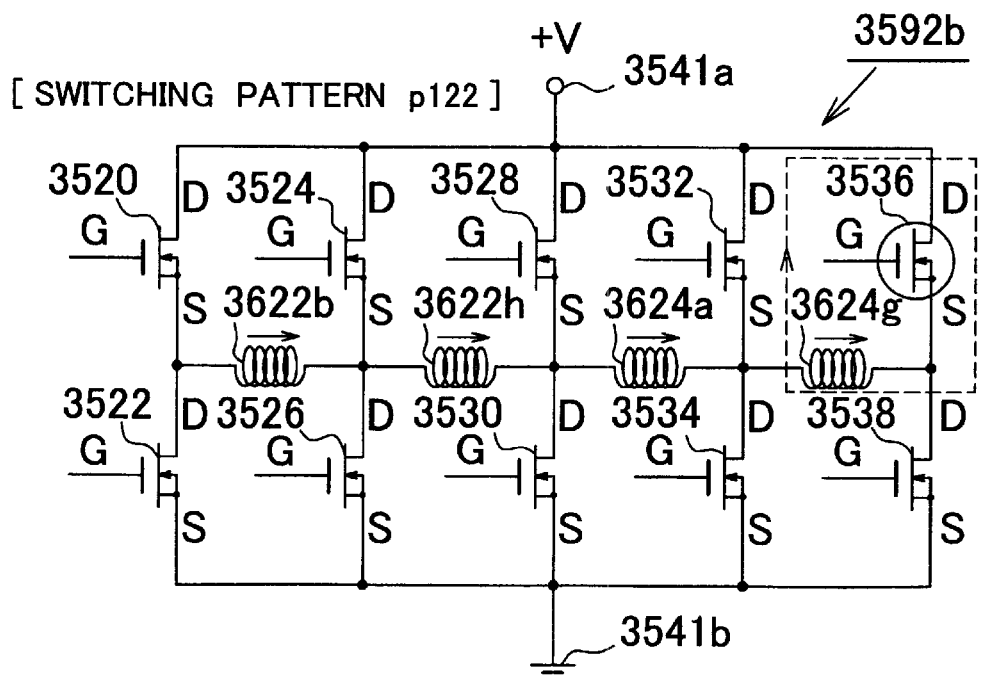

FIG. 74 A1
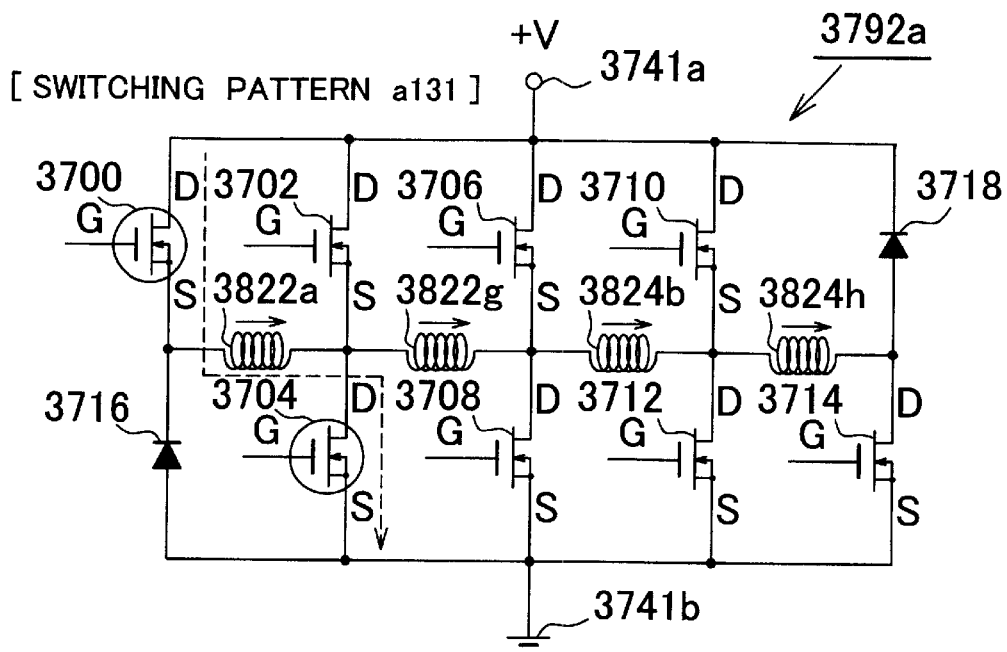
FIG. 74 B1
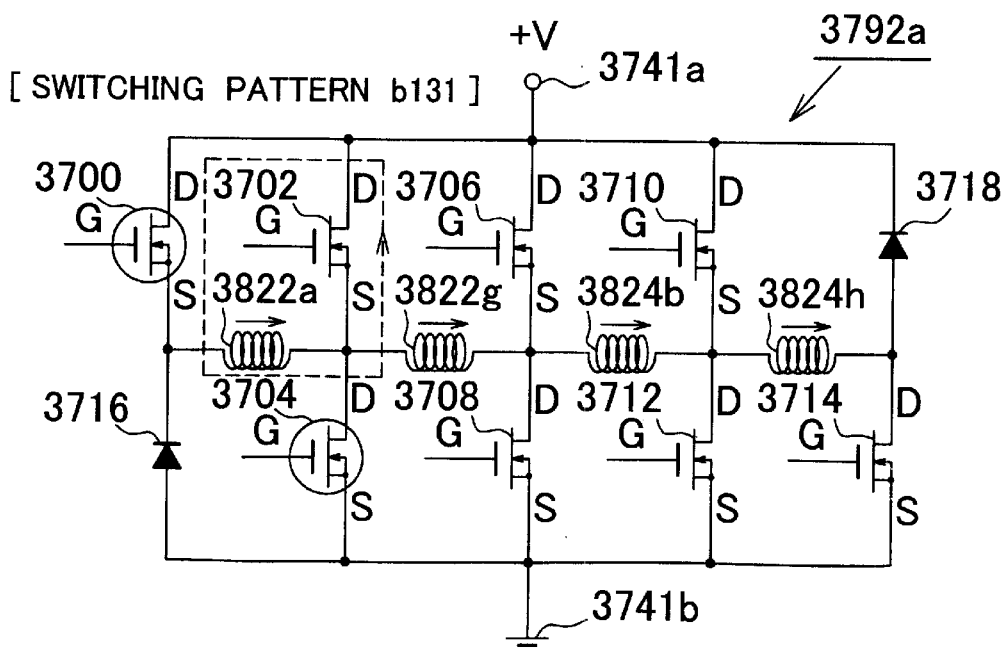

FIG. 74 A2
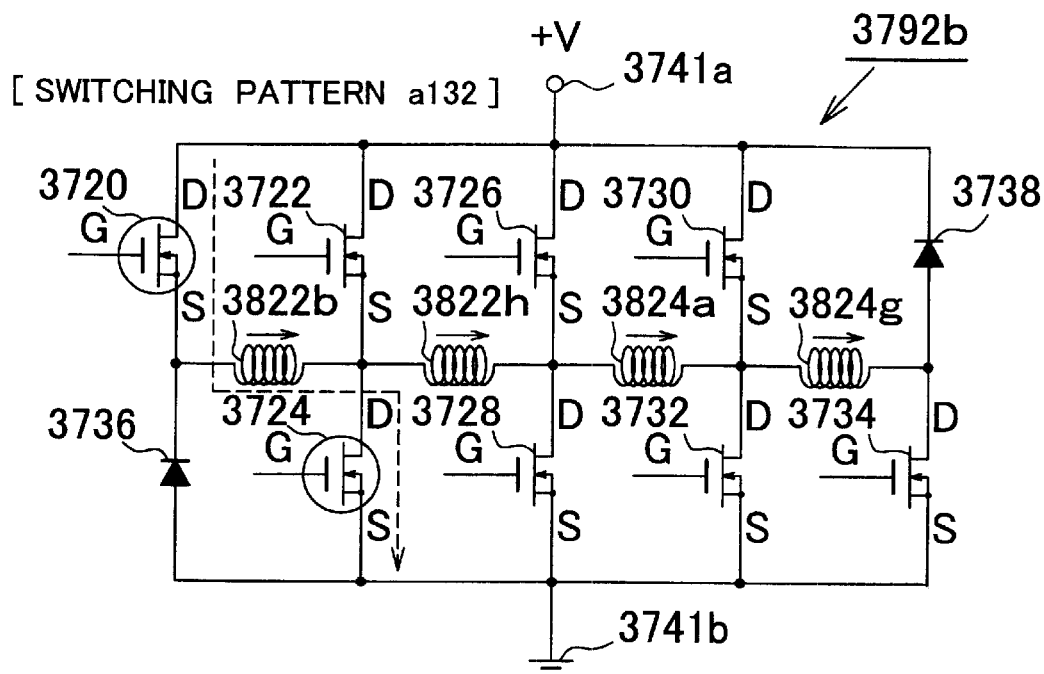
FIG. 74 B2
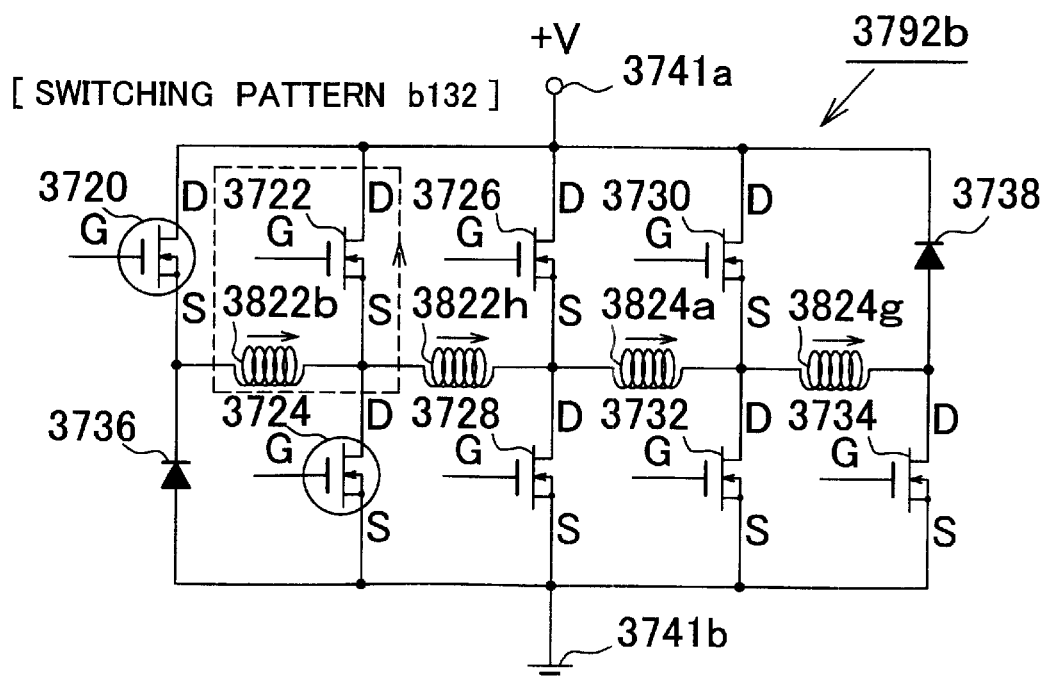

FIG. 74 C1
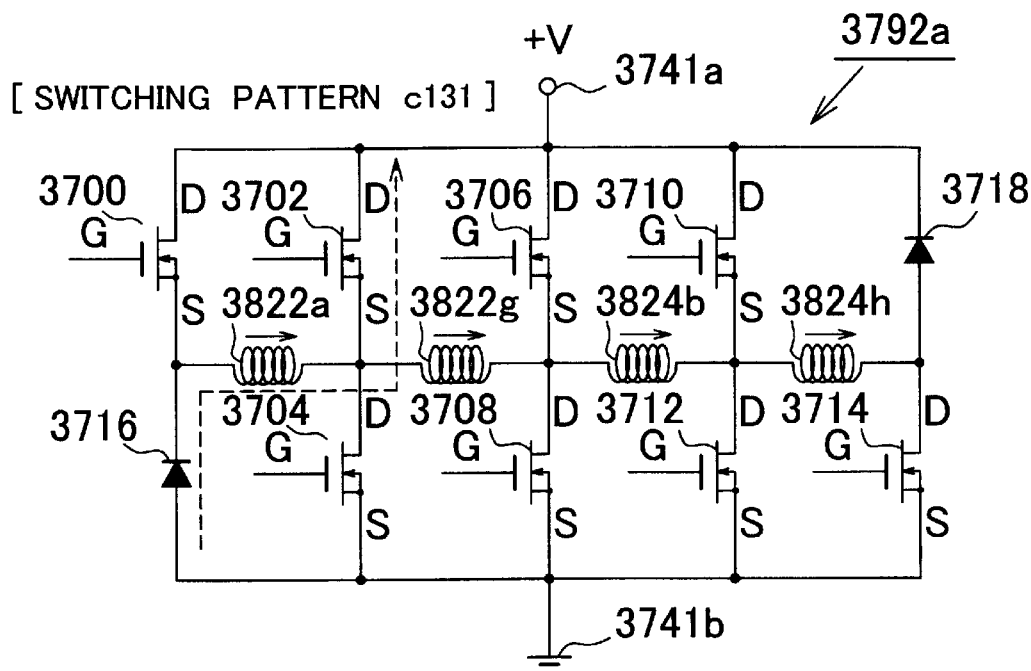
FIG. 74 E1
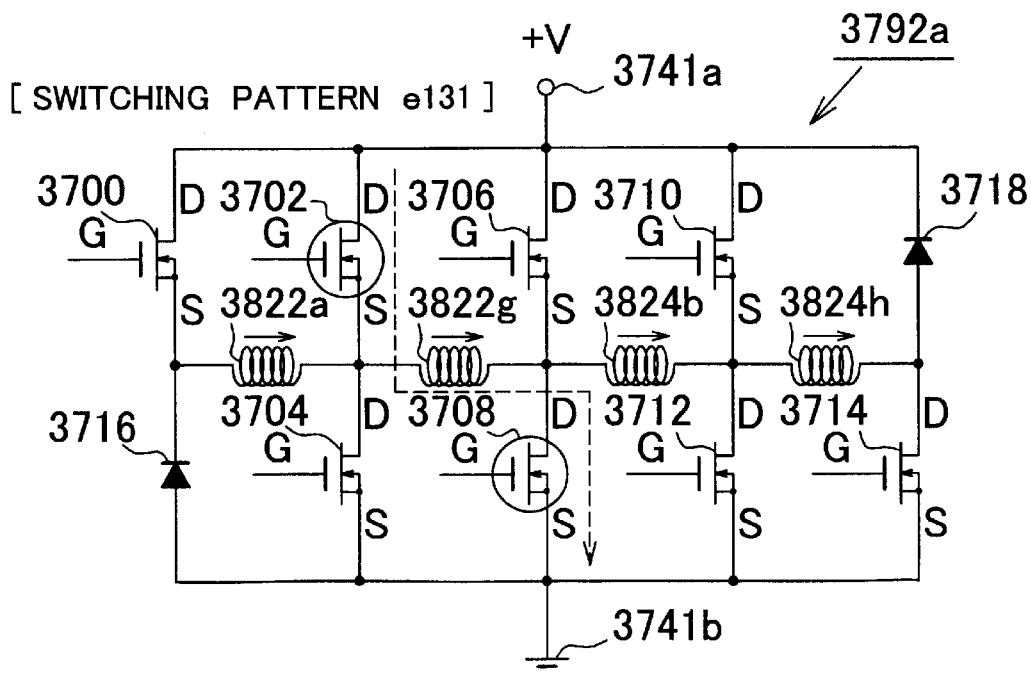

FIG. 74 C2
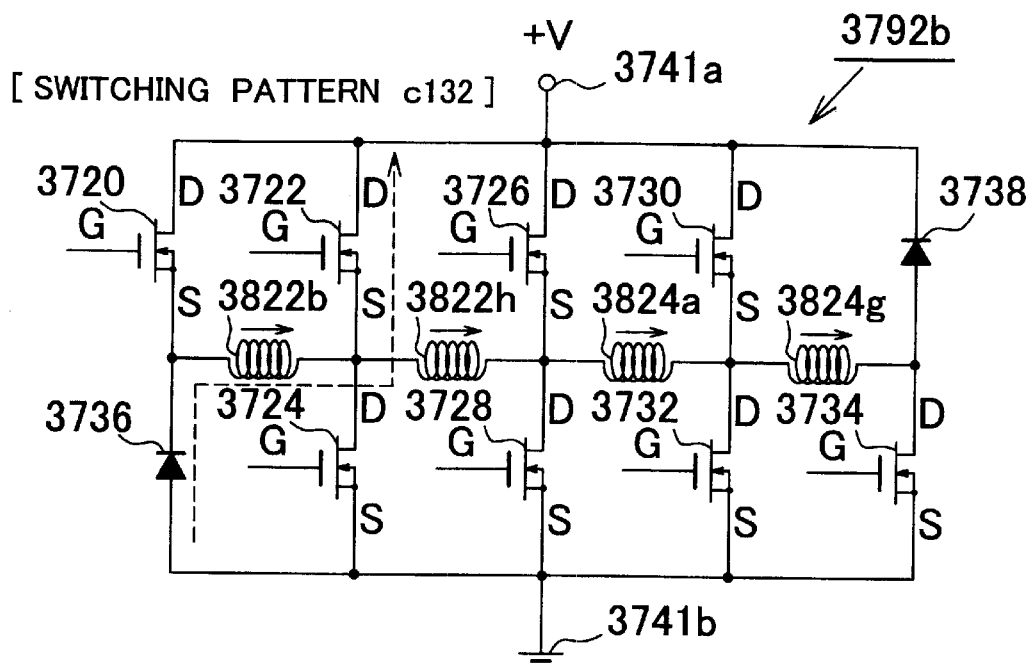
FIG. 74 E2
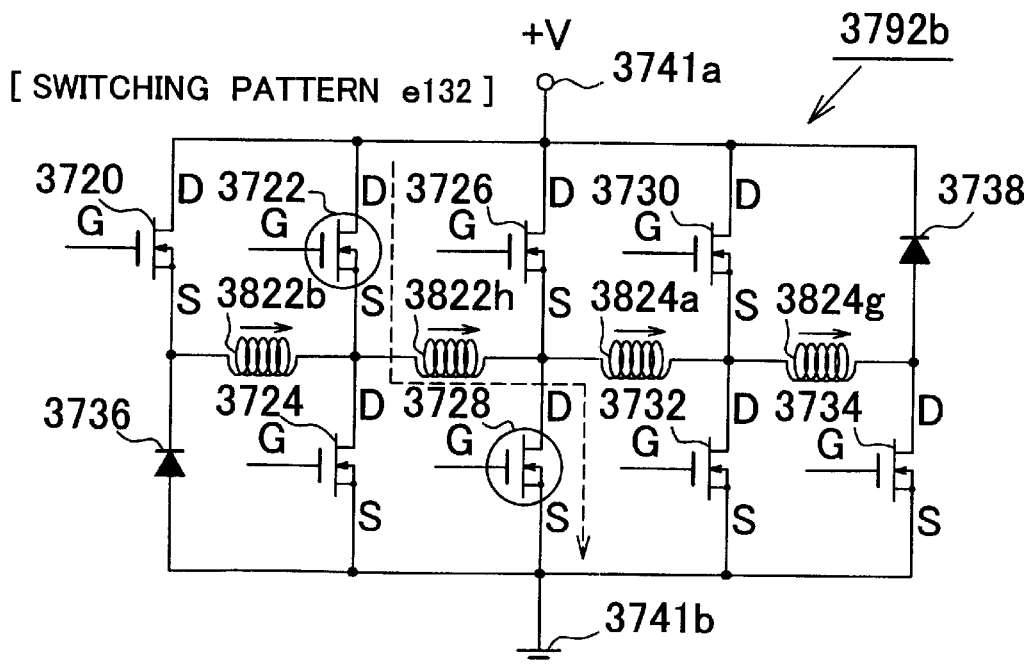

FIG. 74 F1
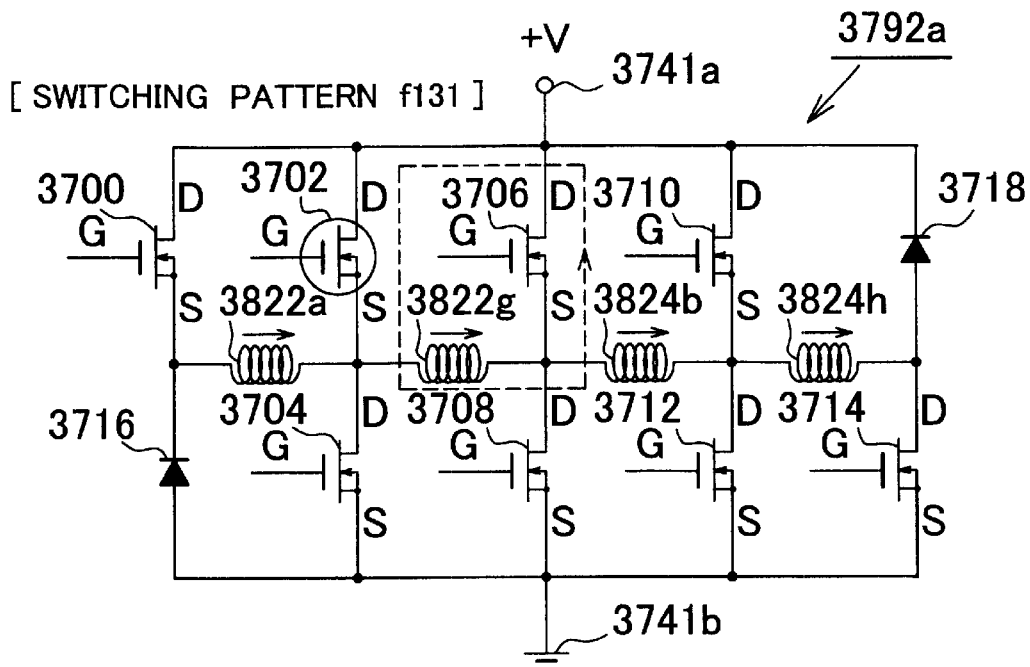
FIG. 74 G1
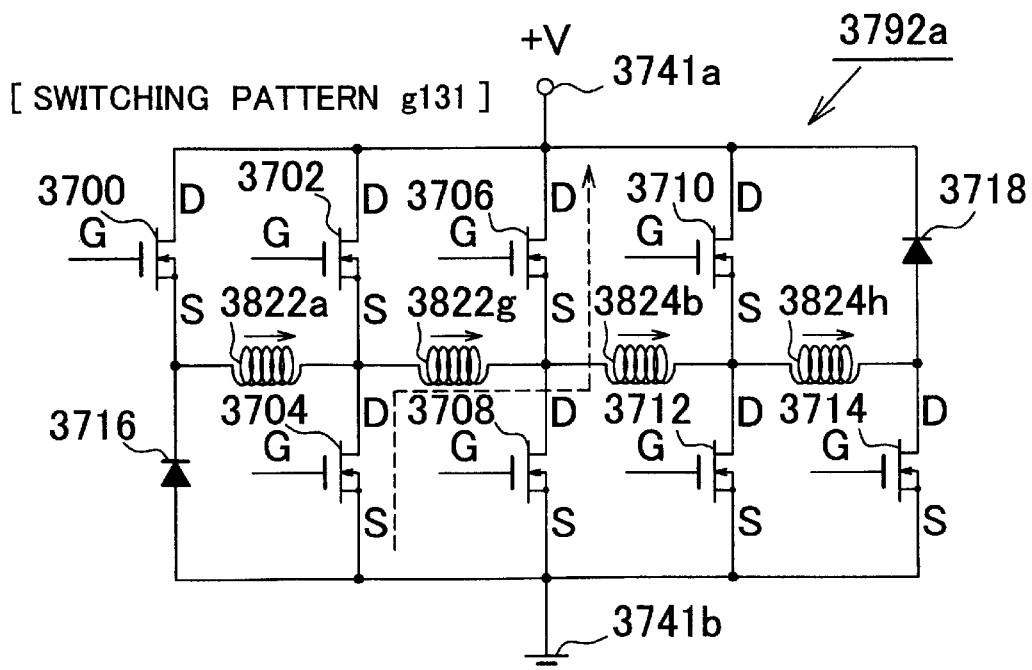

FIG. 74 F2
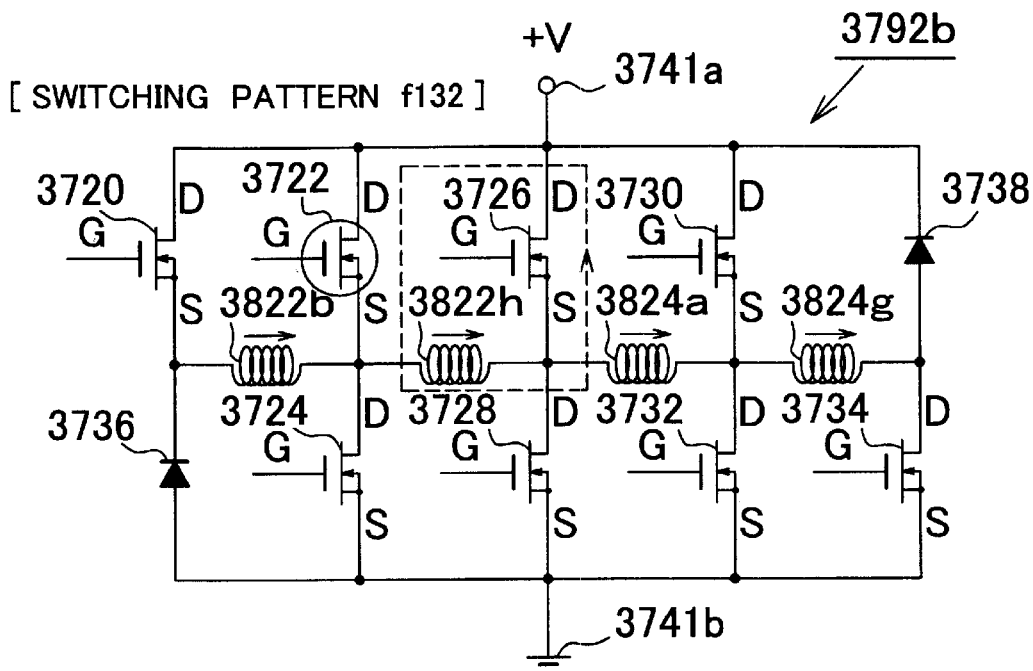
FIG. 74 G2
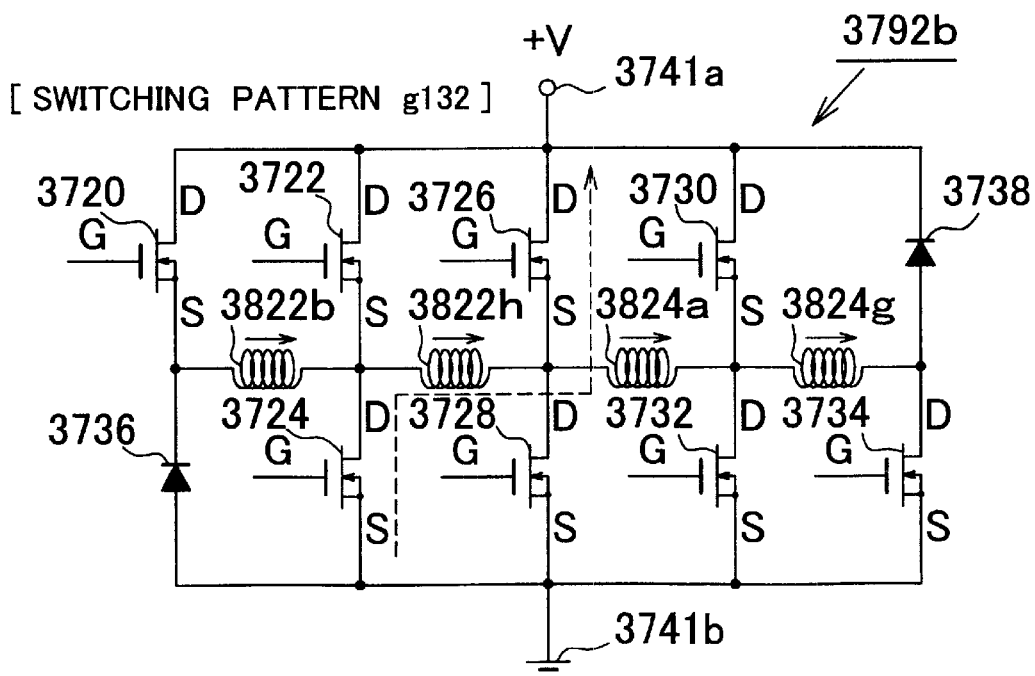

FIG. 74 I1
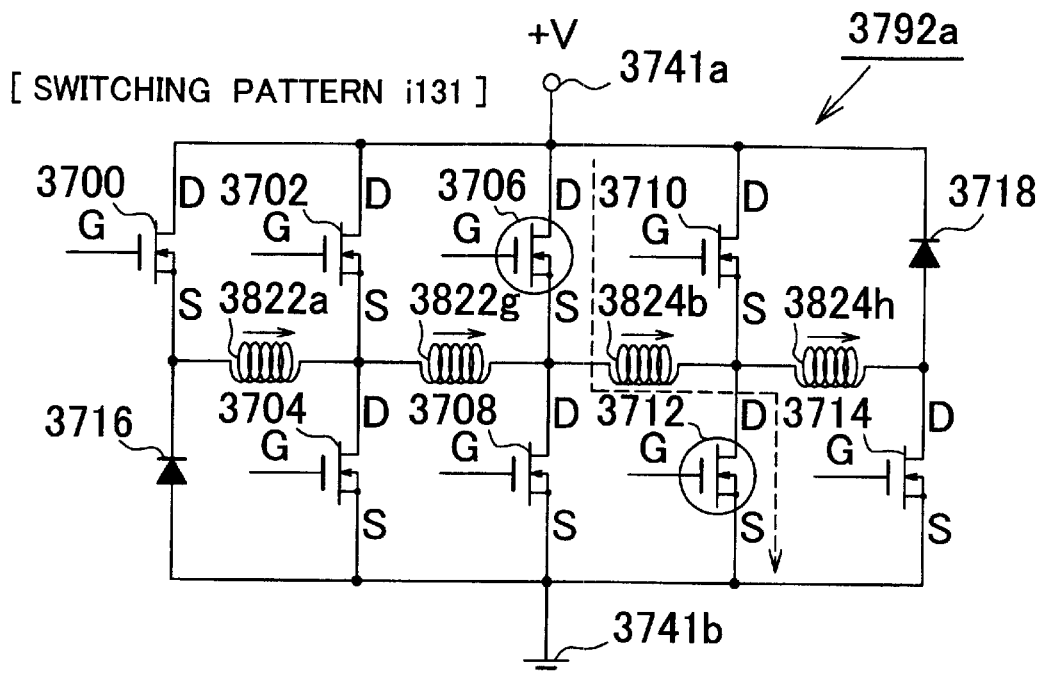
FIG. 74 J1
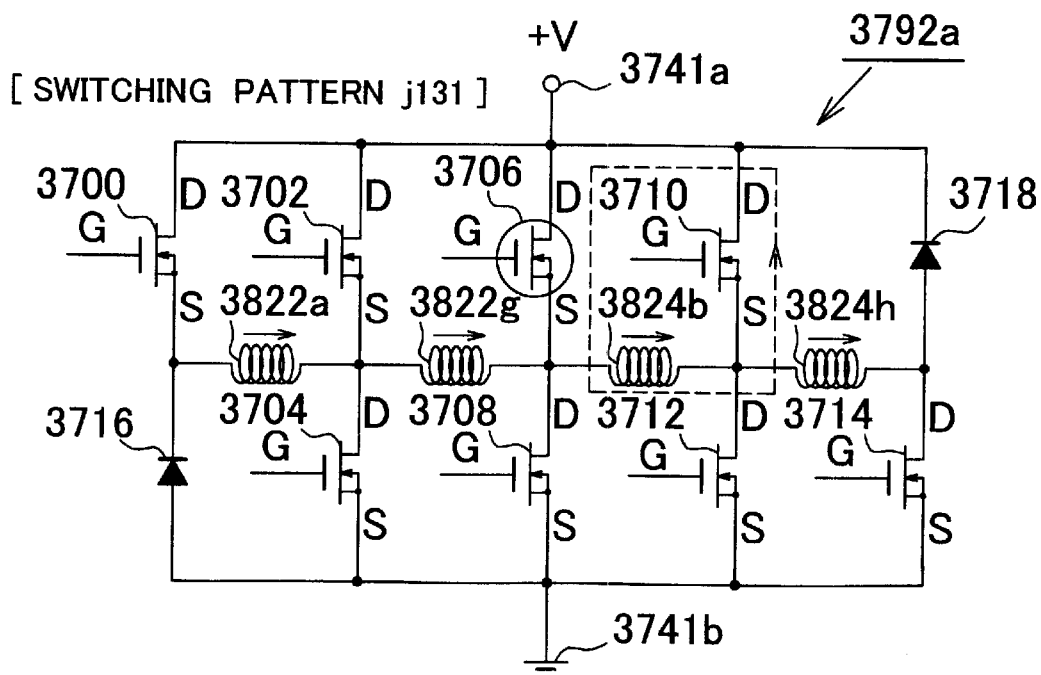

FIG. 74 I2
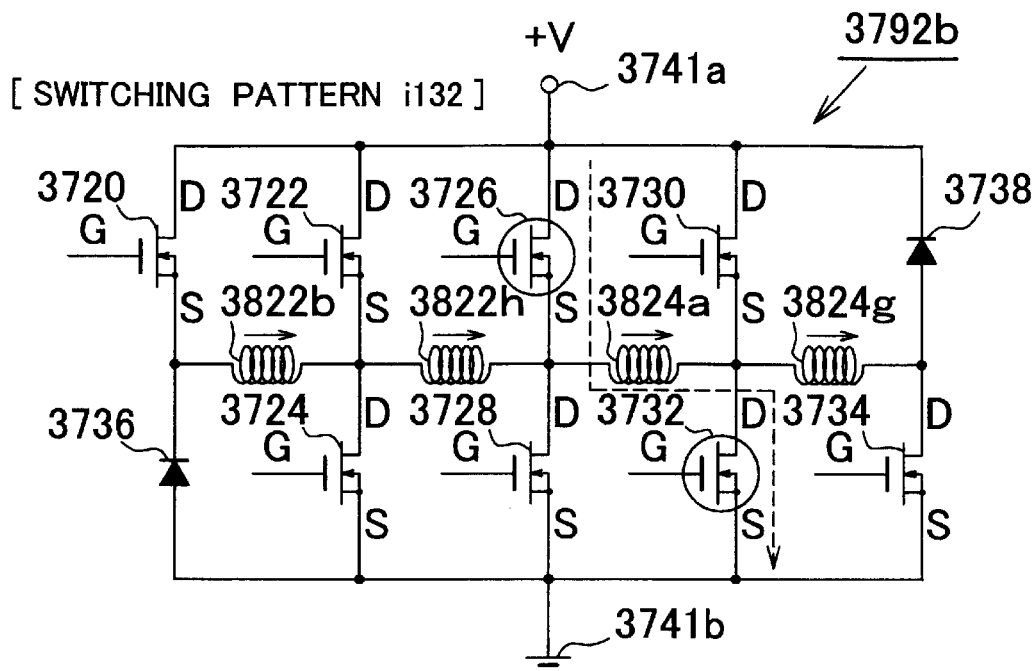
FIG. 74 J2
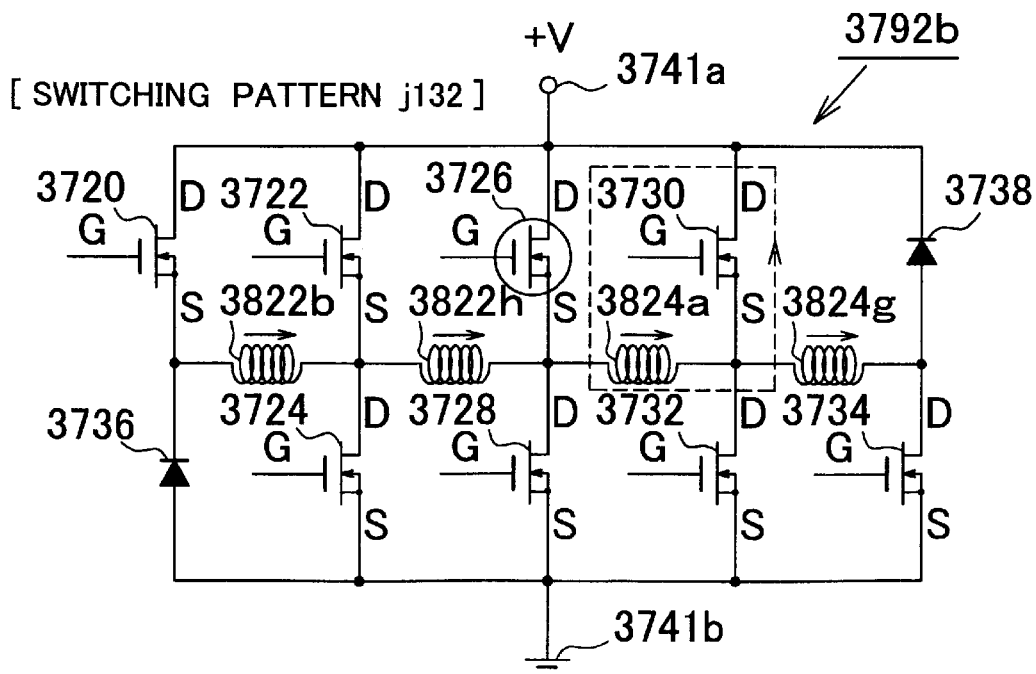

FIG. 74 K1
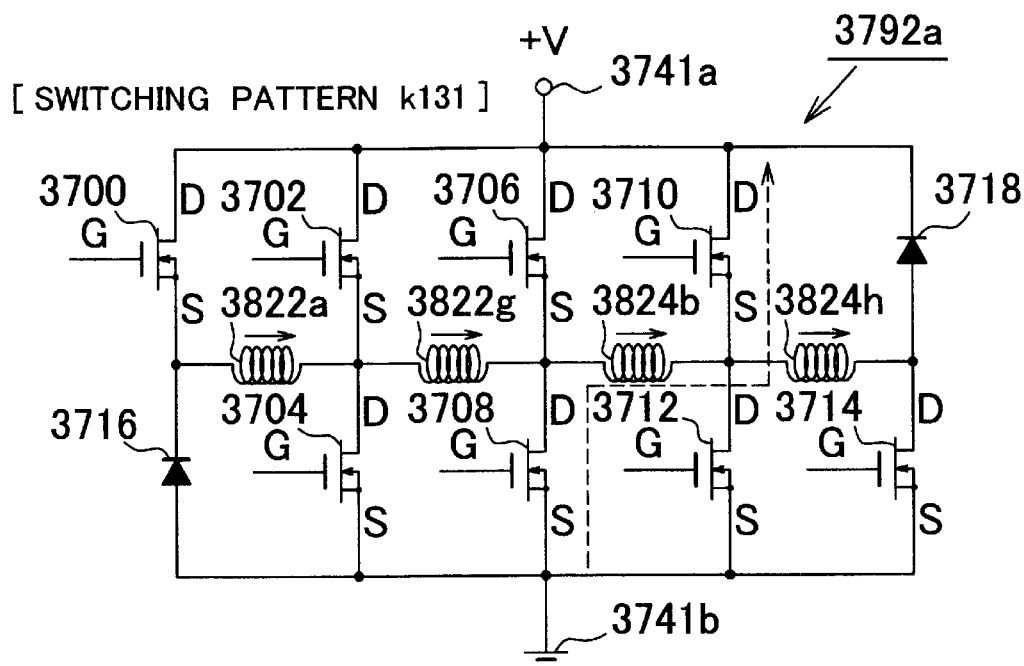
FIG. 74 M1
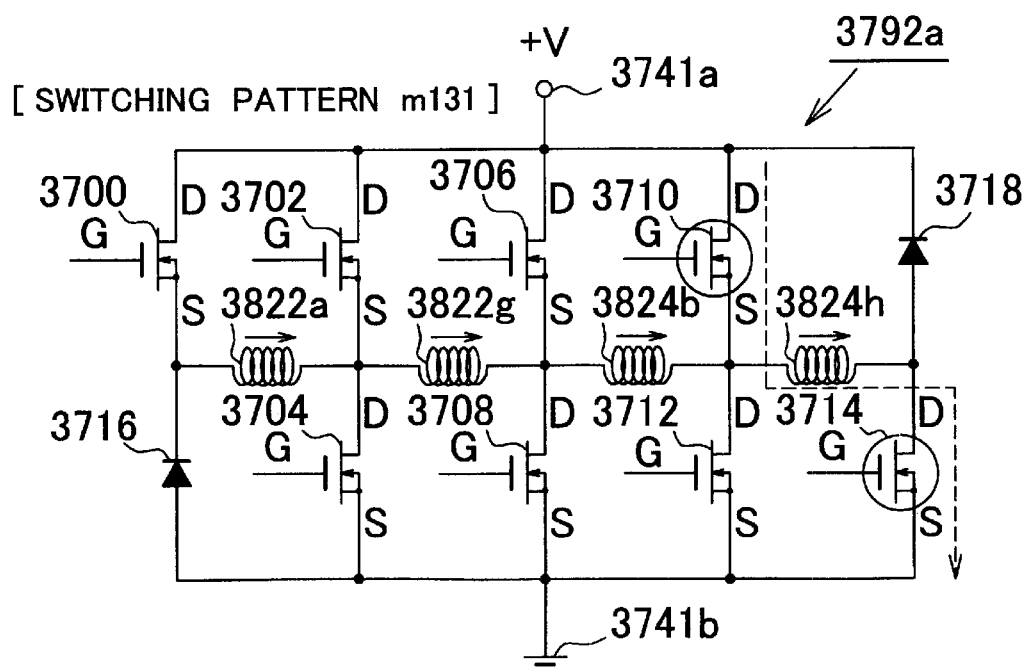

FIG. 74 K2
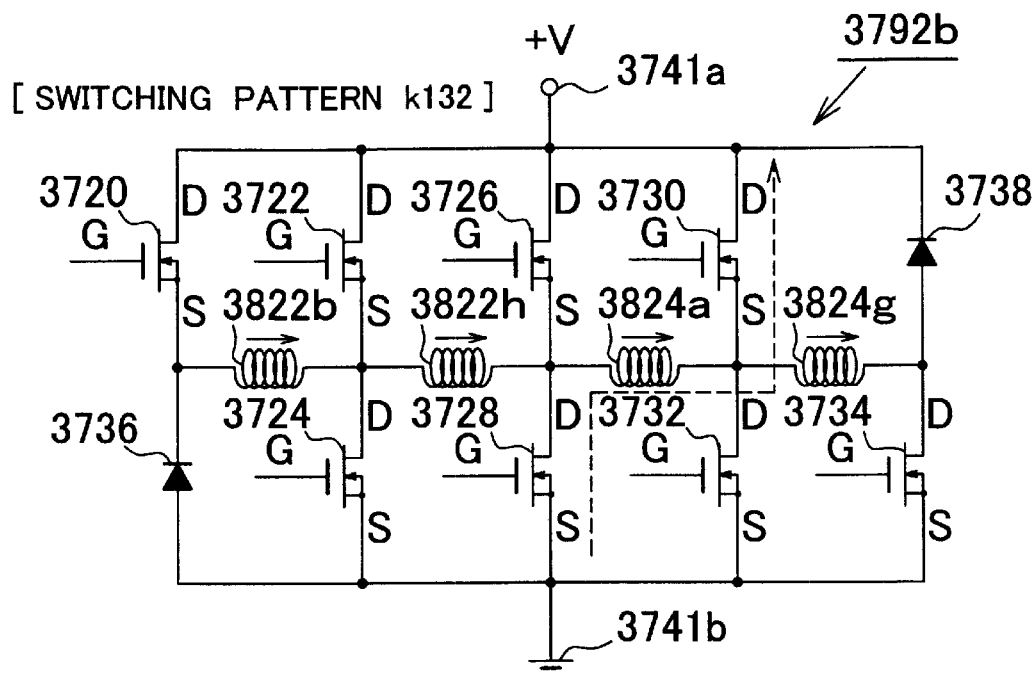
FIG. 74 M2
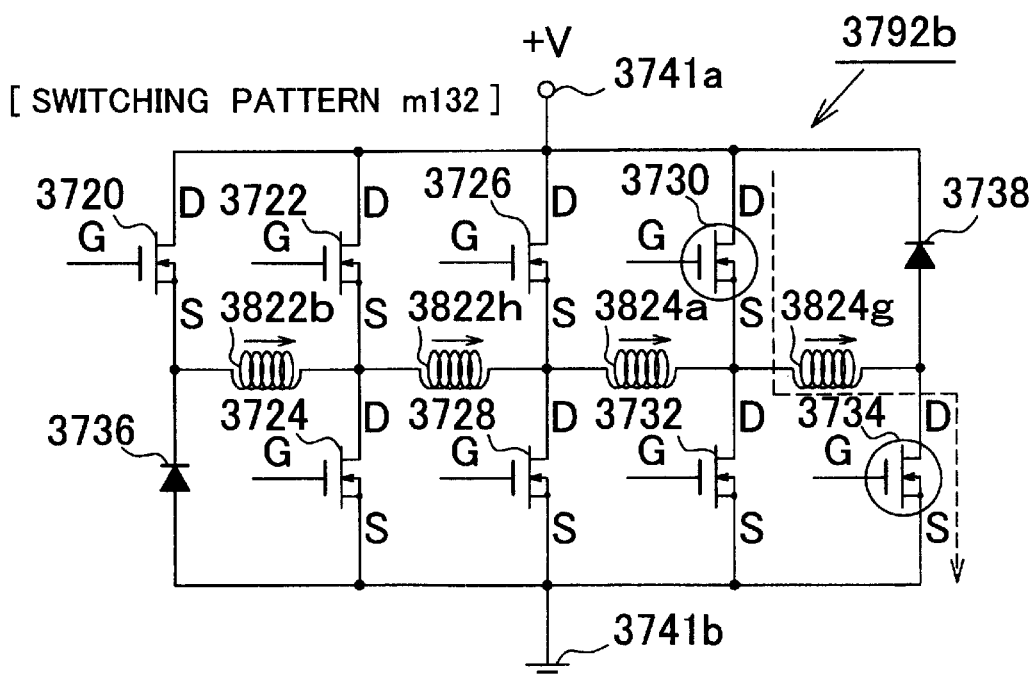

FIG. 74 N1
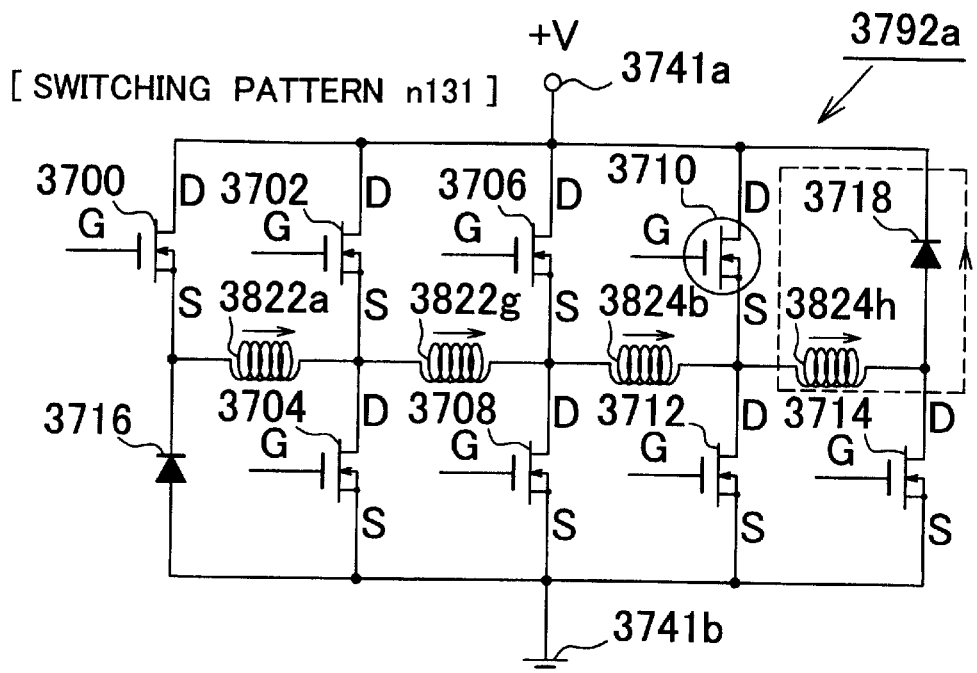
FIG. 74 O1
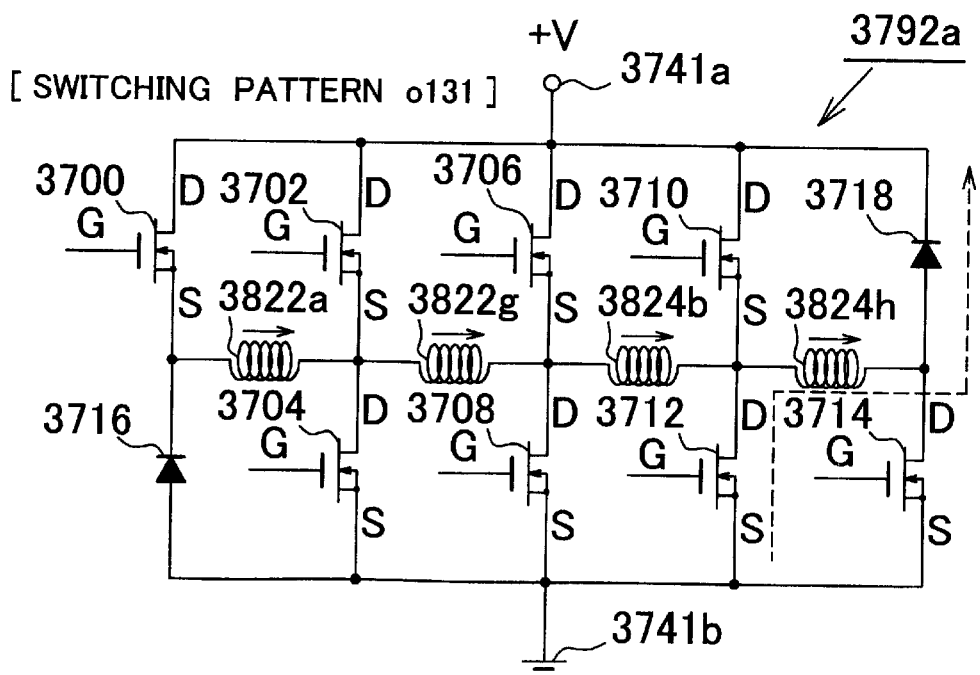

FIG. 74 N2
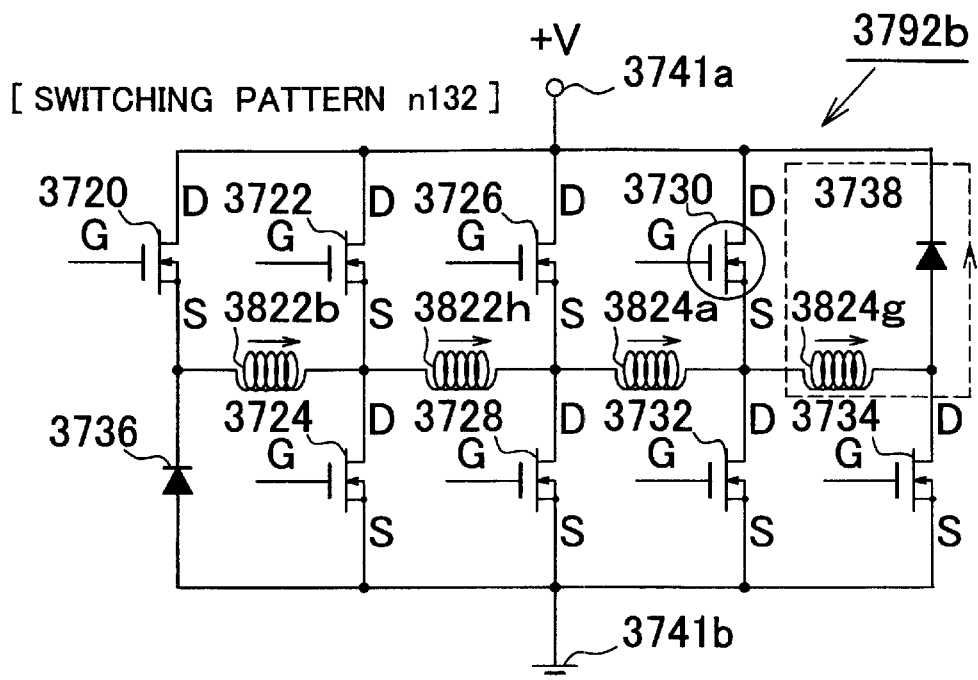
FIG. 74 O2
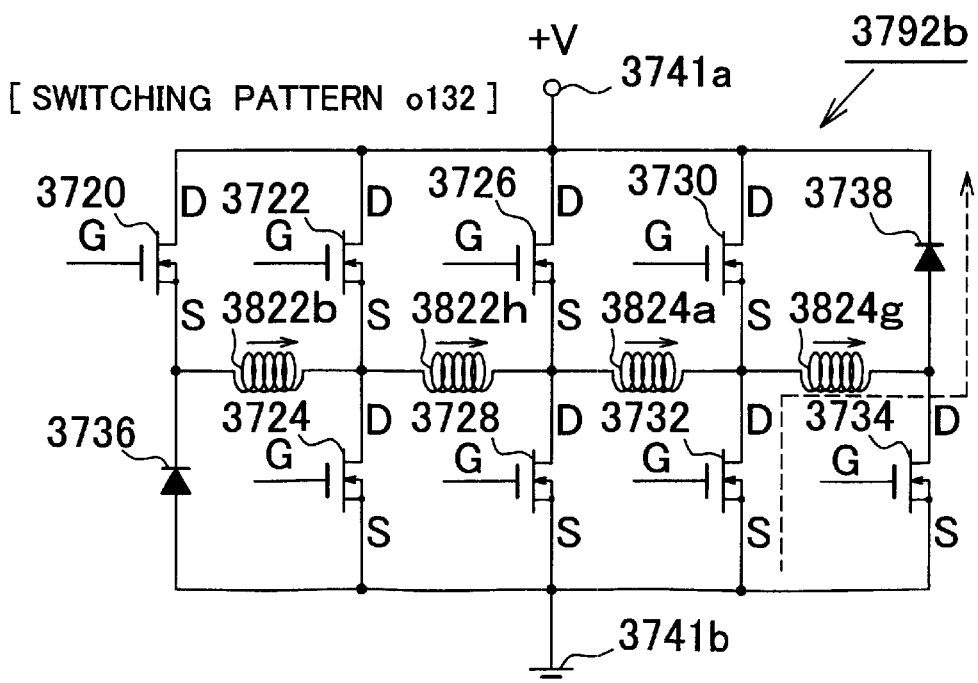

ELECTROMAGNETIC VALVE DRIVE APPARATUS OF INTERNAL COMBUSTION ENGINE

BACKGROUND OF THE INVENTION

1. Field of the Invention

The invention relates to an electromagnetic valve drive apparatus of an internal combustion engine and, more particularly, to an internal combustion engine electromagnetic valve drive apparatus in which intake valves and/or exhaust valves provide for a plurality of cylinders with valve-opening electromagnetic valves, valve-closing electromagnetic valves, and closed valve state holding mechanisms that do not employ electromagnetic force, and in which drive circuits are provided for the electromagnetic valves, whereby the valves are opened and closed.

2. Description of the Related Art

The disclosure of Japanese Patent Application No. HEI 11-347396 filed on Dec. 7, 1999 is herein incorporated by reference.

Known electric valves are used as intake valves or exhaust valves of internal combustion engines. An example of electromagnetic valves an armature displaceable with a valve body, a pair of electromagnetic coils disposed above and below the armature, and springs that urge the valve body toward a neutral position, as described in Japanese Patent Application Laid-Open No. HEI 8-284626.

In the electromagnetic valve, the valve body and the armature are held at the neutral position by the forces from the springs when neither one of the electromagnetic coils is supplied with an exciting current. When the upper electromagnetic coil is supplied with an exciting current, the valve body and the armature are magnetically drawn toward the upper electromagnetic coil. Conversely, when the lower electromagnetic coil is supplied with an exciting current, the valve body and the armature are magnetically drawn toward the lower electromagnetic coil. Therefore, this conventional electromagnetic valve is able to open and close the valve body by supplying suitable exciting current alternately through the electromagnetic coils.

In view of the responsiveness of the electromagnetic valve in opening and closing actions, durability of the electromagnetic valve, and the like, it is necessary to control the quantity of current through the electromagnetic coils with a high responsiveness. Thus, the exciting current supplied to each electromagnetic coil is controlled by an H-shape bridge circuit. The H-shape bridge circuit is formed by the terminals of the electromagnetic coils and four switching elements, each of which is provided between one of the terminals of the electromagnetic coil, and a high potential side or a low potential side.

In the H-bridge circuit, a voltage can be applied to the electromagnetic coil to supply an exciting current in a forward direction by turning on a pair of switching elements located diagonally about the electromagnetic coil and turning off the other pair of switching elements. By reversing the on/off states of the two pairs of switching elements, a voltage in a direction opposite to the exciting current can be applied to the electromagnetic coil. Therefore, by switching the on/off states of the switching elements of the H-bridge circuit, it is possible to quickly discontinue the production of electromagnetic force from the electromagnetic coil, and to supply a reverse current through the electromagnetic coil immediately after the discontinuation of electromagnetic force. Conversely, when a current is flowing through the electromagnetic coil in the direction opposite to the exciting current, it is possible to quickly discontinue the production of electromagnetic force from the electromagnetic coil in the reverse direction, or to deliver a current through the electromagnetic coil in the forward direction immediately after the discontinuation of reverse electromagnetic force, by applying a voltage to the electromagnetic coil in the forward direction.

In this manner, the quantity of current through each electromagnetic coil can be controlled with a increased responsiveness.

However, in order to achieve such a increased responsiveness, it is necessary to provide four switching elements for each electromagnetic coil as described above. Because each electromagnetic valve needs to have two electromagnetic coils, such as, a valve-closing electromagnetic valve and an valve-opening electromagnetic valve, the total number of switching elements needed for each electromagnetic coil becomes eight. Therefore, in the case of a four-cylinder four-valve engine, 128 switching elements are needed for the 16 valves, thus leading to a size increase and a cost increase of the electromagnetic valve drive apparatus.

In order to solve this problem, a drive apparatus for electromagnetic valves are known in which the number of switching elements is reduced while the functions of the electromagnetic valve drive apparatus are maintained, as described in Japanese Patent Application Laid-Open No. HEI 11-166657. This drive apparatus for electromagnetic valves has a drive circuit. The drive circuit includes series circuits having three switching elements connected in series and arranged in parallel for a group of electromagnetic valves that perform identical operations. In this circuit construction, switching elements are used collectively for a plurality of electromagnetic valves. That is, this construction reduces the need to provide dedicated switching elements for each electromagnetic valve. Therefore, if this three-switching-elements-in-series type drive circuit is applied to a four-cylinder four-valve engine, only 72 switching elements are needed for the 16 valves. The size and cost of the electromagnetic valve drive apparatus may be reduced.

However, even with the sharing of switching elements, the total number of switching elements employed is still large. A need has arisen for a further reduction in the number of switching elements to reduce the size and cost of the electromagnetic valve drive apparatus.

SUMMARY OF THE INVENTION

Accordingly, it is an object of the invention to provide an electromagnetic valve drive apparatus of an internal combustion engine that allows a further reduction in the number of switching elements.

To achieve the aforementioned and other objects, an electromagnetic valve drive apparatus of an internal combustion engine includes valve-closing electromagnetic coils provided for intake valves and/or exhaust valves. The valves are provided for a plurality of cylinders. The electromagnetic drive apparatus includes valve-opening electromagnetic coils provided for the intake valves and/or the exhaust valves, and a mechanism that holds the intake valves and the exhaust valves in a closed state without using an electromagnetic force. The electromagnetic valve drive apparatus also includes a drive circuit provided for the electromagnetic coils, so that the electromagnetic valve drive apparatus opens and closes the valves. The drive circuit is provided for a valve group of valves, including a plurality of valves that perform identical operations and has at least one valve whose open period does not overlap an open period of the plurality of valves that perform identical operations. In the drive circuit, a plurality of series circuits are connected in parallel between a high electric potential side and a low electric potential side. Each series circuit is formed by connecting a plurality of switching elements in series. The electromagnetic coils are provided individually for the valves of the valve group and are connected between the series circuits.

Thus, the drive circuit is provided collectively for a valve group that consists of a plurality of valves that perform identical operations and at least one other valve whose open period does not overlap the open period of the valves that perform identical operations. The drive circuit is constructed to have a plurality of series circuits connected in parallel between the high electric potential side and the low electric potential side. Each series circuit is formed by connecting a plurality of switching elements in series. The electromagnetic coils are provided individually for the valves of the valve group and are connected between the series circuits.

The electromagnetic coils driven by the above-described drive circuit include the electromagnetic coils used for the valves that perform identical operations, and the electromagnetic coils of at least one valve whose open period does not overlap the open period of the valves that perform identical operations. Due to the relationship between the two sets of valves in which their open valve periods do not overlap each other, the acting periods of the switching elements for controlling current through the electromagnetic coils can be completely separated for the two sets of valves so as to open the valves and hold the valves in the open state. Therefore, in the drive circuit, switching elements can be shared by the two sets of valves, whose open periods do not overlap each other.

Furthermore, in view of two valves whose open periods do not overlap each other, another valve that performs an operation identical to that of a first valve of the two valves requires the same operation of the switching elements as that required by the first valve. Because of this valve relationship, the sharing of a switching element in the drive circuit also is possible between valves that perform identical operations.

With respect to the second valve of the two valves whose open periods do not overlap each other, the valve that performs an operation identical to that of the first valve has a relationship in which the open period of the valve does not overlap the open period of the second valve, so that the sharing of a switching element in the drive circuit also is possible between the valve and the second valve.

Thus, a valve whose operation is identical to the operation of one of two valves allows the sharing of a switching element for a valve-opening operation with respect to either one of the two valves.

Therefore, the sharing of switching elements can be achieved by providing the drive circuit collectively for a group of valves consisting of a plurality of valves that perform identical operations and at least one other valve whose open period does not overlap the open period of the valves that perform identical operations, the number of switching elements employed to open the valves may be reduced.

The closed periods of the valves of the valve group overlap each other. However, due to the provision of the mechanism for holding the valves in the closed state without using electromagnetic force, it may necessary to drive a switching element during the closed valve period. Therefore, the activation of the electromagnetic coils is needed only during the closing action of the valves. Because the closing action occurs at the end of each open valve period, the closing action period of valves does not overlap the closing action period of other valves whose open period does not overlap the open period of the aforementioned valves. Therefore, the sharing of switching elements for closing the valves can be achieved as described above in conjunction with the valve opening operation.

Therefore, the sharing of switching elements can be achieved by providing the drive circuit collectively for a group of valves consisting of a plurality of valves that perform identical operations and at least one other valve whose open period does not overlap the open period of the valves that perform identical operations. The number of switching elements employed to open and close the valves may be reduced.

Thus, the drive circuit is able to supply current and discontinue current through the electromagnetic coils of valves at appropriate timings, through the switching operations of the reduced number of switching elements that are shared by the electromagnetic coils.

Hence, the invention reduces the number of switching elements employed, and therefore allows a size reduction and a cost reduction of the electromagnetic valve drive apparatus.

Furthermore in the electromagnetic valve drive apparatus of an internal combustion engine, the drive circuit may be collectively formed by at least one series circuit connection that is made only via the electromagnetic coils provided for the plurality of valves that perform identical operations, and at least one other series circuit connection that is made only via the electromagnetic coils provided for at least one valve whose open period does not overlap the open period of the plurality of valves that perform identical operations.

The connections between the series circuits constituting the drive circuit may be formed by two kinds of circuit connections. The circuit connections are made via the electromagnetic coils provided for a plurality of valves that perform identical operations, and inter-series circuit connections made only via the electromagnetic coils provided for at least one valve whose open period does not overlap the open period of the plurality of valves. As the drive circuit formed by the two kinds of circuit connections is provided collectively for the group of valves, switching elements can be shared by valves of the valve group in controlling the quantity of current through the electromagnetic coils. Therefore, the number of switching elements employed may be reduced, thereby allowing a size reduction and a cost reduction of the electromagnetic valve drive apparatus.

The electromagnetic valve drive apparatus of an internal combustion engine may be include the drive circuit collectively formed by alternately disposing circuit connections. The circuit connections are made via the electromagnetic coils provided for a plurality of valves that perform identical operations and via the electromagnetic coils provided for at least one valve whose open period does not overlap the open period of the plurality of valves.

The two circuit connections may be arranged so that the two kinds alternate. With this arrangement, the drive circuit allows the sharing of switching elements among valves of the group in the control of the quantity of current through the electromagnetic coils. Therefore, the number of switching elements employed can be reduced, so that the electromagnetic valve drive apparatus can be reduced in size and cost.

Furthermore, in the electromagnetic valve drive apparatus of an internal combustion engine, the drive circuit may also be collectively formed in such a fashion that the circuit connections are disposed separately with a single series circuit defining a boundary there between.

The circuit connections of the two kinds may be arranged in such a fashion that the two kinds are separated by a single series circuit defining a boundary. That is, one group of circuit connections may be disposed as a unit at one side of a series circuit, and the other group of circuit connections may be disposed as a unit at the other side of the series circuit.

With this construction, the drive circuit provided collectively for a group of valves allows the sharing of switching elements among valves of the group in controlling the quantity of current through the electromagnetic coils. Therefore, the number of switching elements employed can be reduced, so that the size and cost of the electromagnetic valve drive apparatus also can be reduced.

Furthermore, in the electromagnetic valve drive apparatus of an internal combustion engine, each series circuit may be connected to another series circuit via electromagnetic coils provided for a single valve.

Thus, it is possible to connect each series circuit to another series circuit via the electromagnetic coils of a single valve instead of electromagnetic coils of difference valves. This construction facilitates the sharing of switching elements, and, therefore, may reduce the number of switching elements.

For example, if each series circuit is connected to another series circuit via two electromagnetic coils of a single valve, such as, a valve-opening electromagnetic coil and a valve-closing electromagnetic coil of the valve, the sharing of a series circuit becomes possible between the valve-opening electromagnetic coil and the valve-closing electromagnetic coil. Thus, such a connection construction may reduce the number of switching elements employed.

Furthermore, in the electromagnetic valve drive apparatus of an internal combustion engine, each series circuit may be formed by connecting three switching elements in series, and end portions of the electromagnetic coils may be connected to series connecting portions between the switching elements so as to form circuit connections.

The circuit connections may be formed by connecting the end portions of the electromagnetic coils to the series connecting portions between the switching elements of the series circuits formed by connecting three switching elements.

With this construction, the drive circuit provided collectively for a group of valves allows the sharing of switching elements among valves of the group in controlling the quantity of current through the electromagnetic coils. Therefore, the number of switching elements employed can be reduced, so that the size and cost of the electromagnetic valve drive apparatus can be reduced.

The above-described construction makes it possible to realize a mode of supplying reverse current through the electromagnetic coils in the switching control of the switching elements.

Furthermore, the at least one series circuit may also be formed by connecting three switching elements in series, and at least one other series circuit is formed by connecting two switching elements and a diode in series. The diode is disposed between the two switching elements in such a direction as to allow a current to flow from the low electric potential side to the high electric potential side. Circuit connections are formed by connecting end portions of the electromagnetic coils to series connecting portions between the switching elements of the at least one series circuit or to series connecting portions between the diode and the switching elements of the at least one other series circuit.

With the two kinds of series circuits, the circuit connections may be formed by connecting the end portions of the electromagnetic coils to the series connecting portions between the switching elements or to the series connecting portions between the diode and the switching elements.

Thus, using low-cost diodes in place of switching elements, the electromagnetic valve drive apparatus is able to control the quantity of current through the electromagnetic coils. Therefore, the number of switching elements employed is reduced so that the size and cost of the electromagnetic valve drive apparatus can be reduced.

Still further, the drive circuit may be provided collectively for a valve group of four valves consisting of two valves that perform identical operations on a cylinder and two valves of another cylinder whose open valve period does not overlap the open valve period of the two valves. In the drive circuit, five series circuits are formed by connecting three switching elements in series, and are connected in parallel between the high electric potential side and the low electric potential side, and electromagnetic coils provided for the four valves are connected between the five series circuits.

More specifically, the drive circuit may be provided collectively for a valve group of four valves consisting of two valves that perform identical operations on a single cylinder and two valves whose open period does not overlap the open period of the two valves. In the drive circuit, five series circuits are formed by connecting three switching elements in series, and are connected in parallel between the high electric potential side and the low electric potential side. The electromagnetic coils provided individually for the four valves are connected between the five series circuits. In this manner, switching elements can be shared by valves of the group.

With the above-described construction, the electromagnetic valve drive apparatus is able to control the quantity of current through the electromagnetic coils. Therefore, the number of switching elements employed can be reduced, so that the size and cost of the electromagnetic valve drive apparatus can be reduced.

Furthermore, the valve-opening electromagnetic coil and the valve-closing electromagnetic coil of each valve may be connected between different pairs of series circuits.

If the two electromagnetic coils of a single valve are connected between different pairs of series circuits as mentioned above, the number of switching elements and electromagnetic coils provided along each current path for activation of the electromagnetic coils can be reduced. Therefore, it becomes possible to reduce the loss of supplied current.

Still further, in the electromagnetic valve drive apparatus of an internal combustion engine, each series circuit may be formed by connecting two switching elements, and circuit connections may be formed by connecting the end portions of the electromagnetic coils to the series connecting portions between the switching elements.

By connecting the end portions of the electromagnetic coils to the series connecting portions between the two switching elements of the series circuits each formed by connecting two switching elements as described above, it becomes possible to realize a mode of supplying reverse current through the electromagnetic coils particularly in the switching control of the switching elements.

Furthermore, the electromagnetic valve drive apparatus of an internal combustion engine also may have the following construction. That is, at least one series circuit is formed by connecting two switching elements, and at least one other series circuit is formed by connecting in series one switching element and a diode. The diode is disposed in such a direction as to allow a current to flow from the low electric potential side to the high electric potential side. The series circuits are connected by connecting end portions of electromagnetic coils to a series connecting portion between the switching elements of the series circuit or to a series connecting portion between the switching element and the diode of the other series circuit.

With the two kinds of series circuits as described above, the circuit connections may be formed by connecting the end portions of the electromagnetic coils to the series connecting portion between switching elements of at least one series circuit or to the series connecting portions between the switching element and the diode of at least one other series circuit.

Thus, using low-cost diodes in place of switching elements, the electromagnetic valve drive apparatus is able to control the quantity of current through the electromagnetic coils. Therefore, the number of switching elements employed is further reduced, so that the size and cost of the electromagnetic valve drive apparatus can be further reduced.

Still further, the electromagnetic valve drive apparatus of an internal combustion engine may have the following construction. That is, the drive circuit is provided collectively for a valve group of four valves consisting of two valves that perform identical operations on a cylinder and two valves of another cylinder whose open valve period does not overlap the open valve period of the two valves. In the drive circuit, nine series circuits are formed by connecting two switching elements in series and are connected in parallel between the high electric potential side and the low electric potential side. The nine series circuits are connected via electromagnetic coils provided for the four valves.

More specifically, the drive circuit may be provided collectively for a valve group of four valves consisting of two valves that perform identical operations on a single cylinder and two valves whose open period does not overlap the open period of the two valves. In the drive circuit, nine series circuits are formed by connecting two switching elements in series and are connected in parallel between the high electric potential side and the low electric potential side. The electromagnetic coils provided individually for the four valves are connected between the nine series circuits. In this manner, switching elements can be shared by valves of the group.

With the above-described construction, the electromagnetic valve drive apparatus is able to control the quantity of current through the electromagnetic coils. Therefore, the number of switching elements employed can be reduced, so that the size and cost of the electromagnetic valve drive apparatus can be reduced.

Furthermore, in the electromagnetic valve drive apparatus of an internal combustion engine, the switching elements may have built-in diodes, and may be disposed in such a direction that a current is allowed to flow from the low electric potential side to the high electric potential side by the diodes.

Therefore, it becomes possible to perform a more complicated control of current through the electromagnetic coils.

The electromagnetic valve drive apparatus of an internal combustion engine may further include a mechanism that holds the electromagnetic coils in an open state without using an electromagnetic force.

Thus, in addition to the mechanism for holding the valves in the closed state without using electromagnetic force, the mechanism for holding the valves in the open state without using electromagnetic force may be provided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 16 shows combinations of the drive circuits and the intake and exhaust valves according to the embodiment of FIG. 1.

FIG. 23 is a timing chart indicating the operations of intake/exhaust valves and the current control according to the embodiment of FIG. 21.

FIG. 26 shows combinations of the drive circuits and the intake and exhaust valves that according to the embodiment of FIG. 21.

FIG. 36 shows combinations of the drive circuits and the intake and exhaust valves according to the embodiment of FIG. 31.

FIG. 38 is a timing chart indicating the operations of intake/exhaust valves and the current control according to the embodiment of FIG. 37.

FIG. 46 shows combinations of the drive circuits and the intake and exhaust valves according to the embodiment of FIG. 41.

FIG. 56 is a timing chart indicating the operations of intake valves and the current control according to the embodiment of FIG. 55.

FIG. 60 is a timing chart indicating the operations of intake valves and the current control according to the embodiment of FIG. 59.

FIGS. 61A–61H are circuit diagrams for illustrating the control of current according to the embodiment of FIG. 59.

FIGS. 70A1–70P2 are circuit diagrams for illustrating the control of current.

FIGS. 74A1 to 74C2, 74E1 to 74G2, 74I1 to 74K2 and 74M1 to 74O2 are circuit diagrams for illustrating the control of current.

DETAILED DESCRIPTION OF PREFERRED EMBODIMENTS

Figure 1:
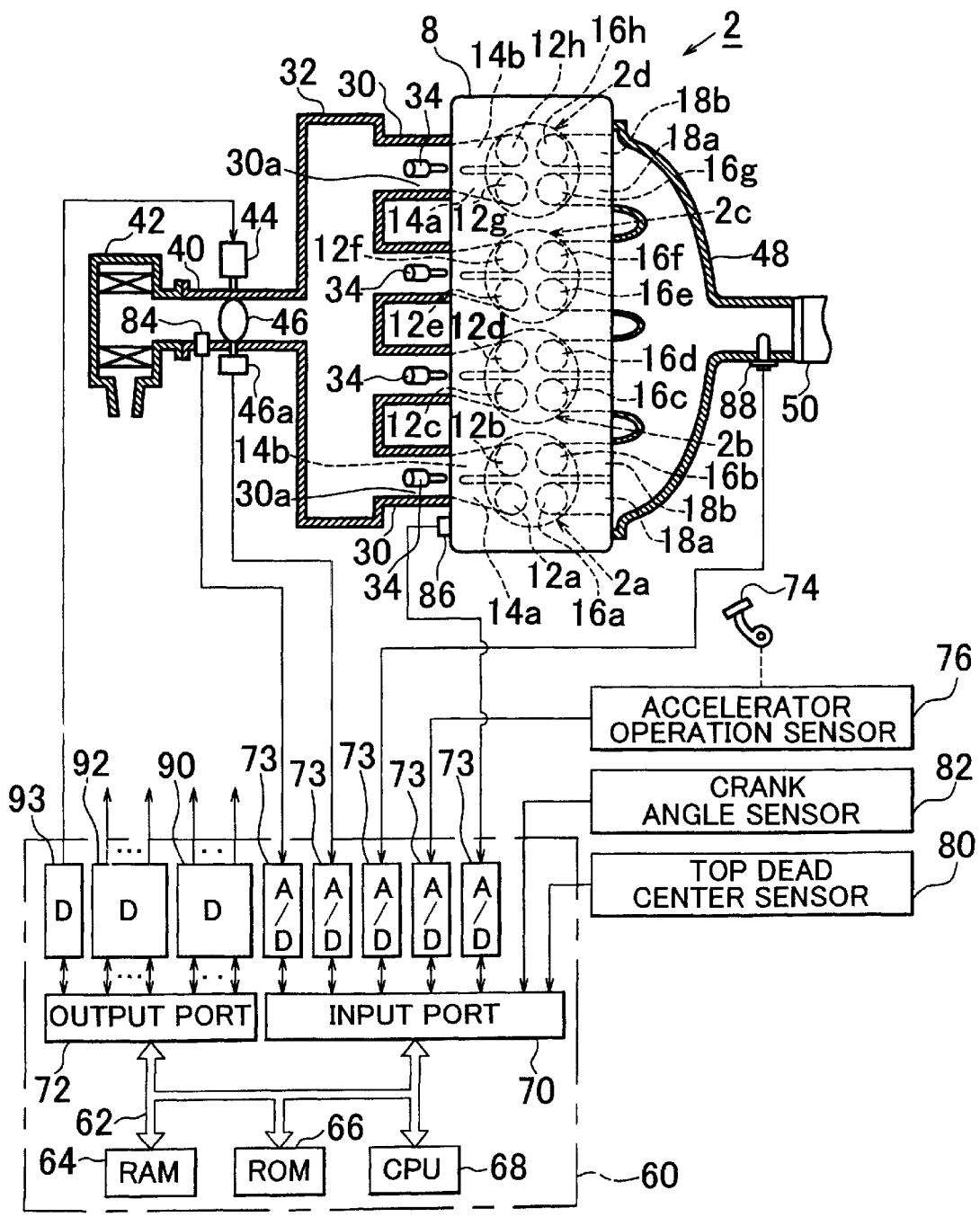
FIG. 1 is a block diagram schematically illustrating a construction of an engine and its control system according to an embodiment of the present invention.
Figure 2:
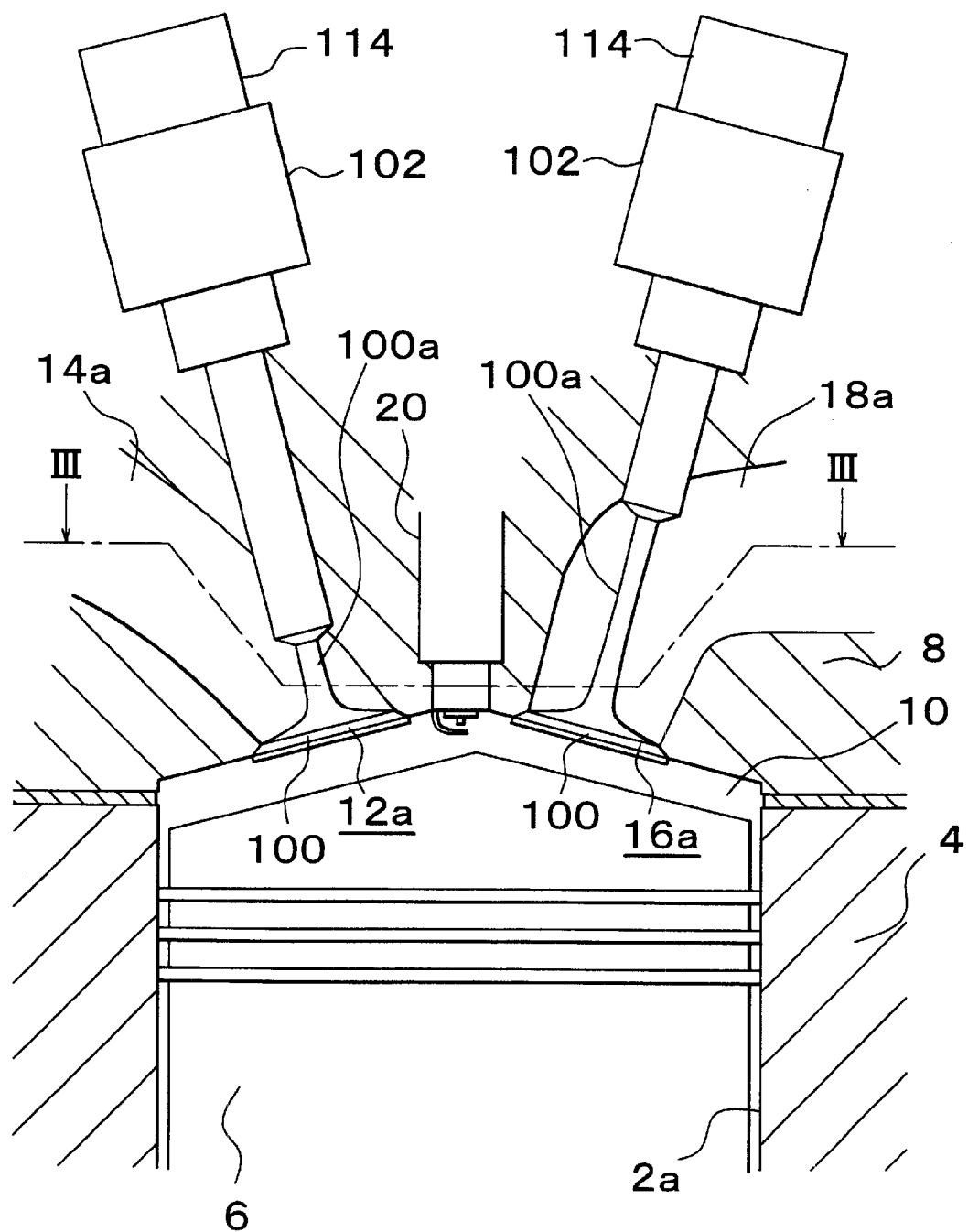
FIG. 2 is a longitudinal sectional view of the engine in FIG. 1.
Figure 3:
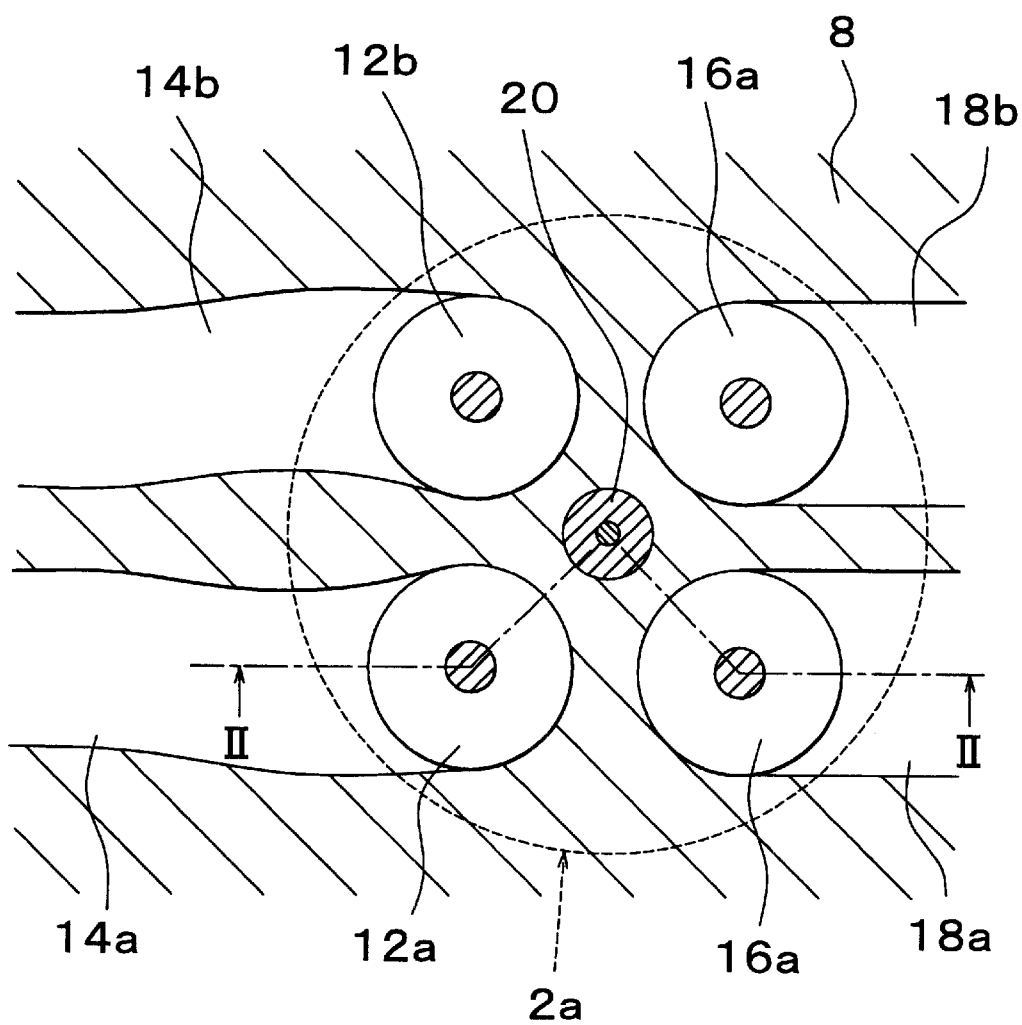
FIG. 3 is a sectional view taken on line III—III in FIG. 2.

FIG. 1 is a block diagram schematically illustrating the constructions of a gasoline engine 2. Engine 2 is an internal combustion engine with a control system. FIG. 2 is a longitudinal sectional view of the engine 2. FIG. 3 is a sectional view taken on line III—III in FIG. 2.

The engine 2 is installed in a motor vehicle so as to power the motor vehicle. The engine 2 has four cylinders 2a, 2b, 2c, and 2d. Each cylinder 2a–2d has a combustion chamber 10 that is defined by a cylinder block 4, a piston 6 that is reciprocated within the cylinder block 4, and a cylinder head 8 mounted on the cylinder block 4.

Each combustion chamber 10 is provided with a first intake valve 12a, 12c, 12e, 12g, a second intake valve 12b, 12d, 12f, 12h, a first exhaust valve 16a, 16c, 16e, or 16g, and a second exhaust valve 16b, 16d, 16f, 16h. The valves 12a–12h and 16a–16h are formed as electromagnetic valves. Among the valves of each combustion chamber 10, the first valve 12a, 12c, 12e, or 12g is disposed so as to open and close a first intake port 14a, and the second intake valve 12b, 12d, 12f, or 12h is disposed so as to open and close a second intake port 14b. The first exhaust valve 16a, 16c, 16e, or 16g is disposed so as to open and close a first exhaust port 18a, and the second exhaust valve 16b, 16d, 16f, or 16h is disposed so as to open and close a second exhaust port 18b.

As shown in FIG. 1, the first intake ports 14a and the second intake ports 14b of the cylinders 2a–2d are connected to a surge tank 32 via intake passages 30a formed within an intake manifold 30. A fuel injection valve 34 is disposed in each intake passage 30a so that a necessary amount of fuel can be injected to the first intake port 14a and the second intake port 14b of the corresponding combustion chamber 10.

The surge tank 32 is connected to an air cleaner 42 via an intake duct 40. Disposed in the intake duct. 40 is a throttle valve 46 that is driven by an electric motor 44. Electric motor 44 may be a DC motor or a step motor. The degree of opening of the throttle valve 46, or degree of throttle opening TA, is detected by a throttle opening sensor 46a, and is controlled in accordance with the state of operation of the engine 2 and operation of an accelerator pedal 74.

The first exhaust ports 18a and the second exhaust ports 18b of the cylinders 2a–2d are connected to an exhaust manifold 48. Thus, exhaust gas is emitted to the outside via a catalytic converter 50.

An electronic control unit ("EMU") 60 is formed by a digital computer, and has a random access memory ("RAM") 64, a read-only memory ("ROM") 66, a microprocessor 68, an input port 70, and an output port 72 that are interconnected by a bidirectional bus 62.

The throttle opening sensor 46a for detecting the degree of throttle opening TA inputs to the input port 70 an output voltage proportional to the degree of opening of the throttle valve 46 via an A/D converter 73. The accelerator pedal 74 is provided with an accelerator operation sensor 76. The accelerator operation sensor 76 inputs to the input port 70 an output voltage proportional to the amount of depression of the accelerator pedal 74, referred to as an amount of accelerator operation ACCP via an A/D converter 73. A top dead center sensor 80 generates an output pulse every time, for example, cylinder 2a of the cylinders 2a–2d reaches the intake top dead center. Each output pulse from the top dead center sensor 80 is inputted to the input port 70. A crank angle sensor 82 generates an output pulse every time a crankshaft turns 30°. Each output pulse from the crank angle sensor 82 is inputted to the input port 70. The microprocessor 68 calculates a current crank angle from the output pulse from the top dead center sensor 80 and the output pulses from the crank angle sensor 82, and calculates an engine revolution speed from the frequency of output pulses from the crank angle sensor 82.

The intake duct 40 is provided with an intake air sensor 84 that inputs to the input port 70 an output voltage corresponding to an amount of intake air GA flowing in the intake duct 40 via an A/D converter 73. The cylinder block 4 of the engine 2 is provided with a water temperature sensor 86. The water temperature sensor 86 detects the temperature of cooling water THW of the engine 2, and inputs to the input port 70 an output voltage corresponding to the cooling water temperature THW via an A/D converter 73. The exhaust manifold 48 is provided with an air-fuel ratio sensor 88 that inputs to the input port 70 an output voltage corresponding to the air-fuel ratio via an A/D converter 73. Various other signals may be inputted to the input port 70.

The output port 72 is connected to the fuel injection valves 84 via a drive circuit portion 90. In accordance with the engine operational state, the EMU 60 performs a control of opening the fuel injection valves 34 to execute a fuel injection duration control and an amount-of-fuel injection control. The output port 72 is also connected to the intake valves 12a–12h and the exhaust valves 16a–16h via a drive circuit portion 92. The ECU 60 performs a control of driving the intake valves 12a–12h and the exhaust valves 16a–16h in accordance with the engine operational state. The output port 72 is also connected to the motor 44 via a drive circuit portion 93. The ECU 60 controls the degree of opening of the throttle valve 46 in accordance with the operational state of the engine 2 and the amount of accelerator operation ACCP.

Figure 4:
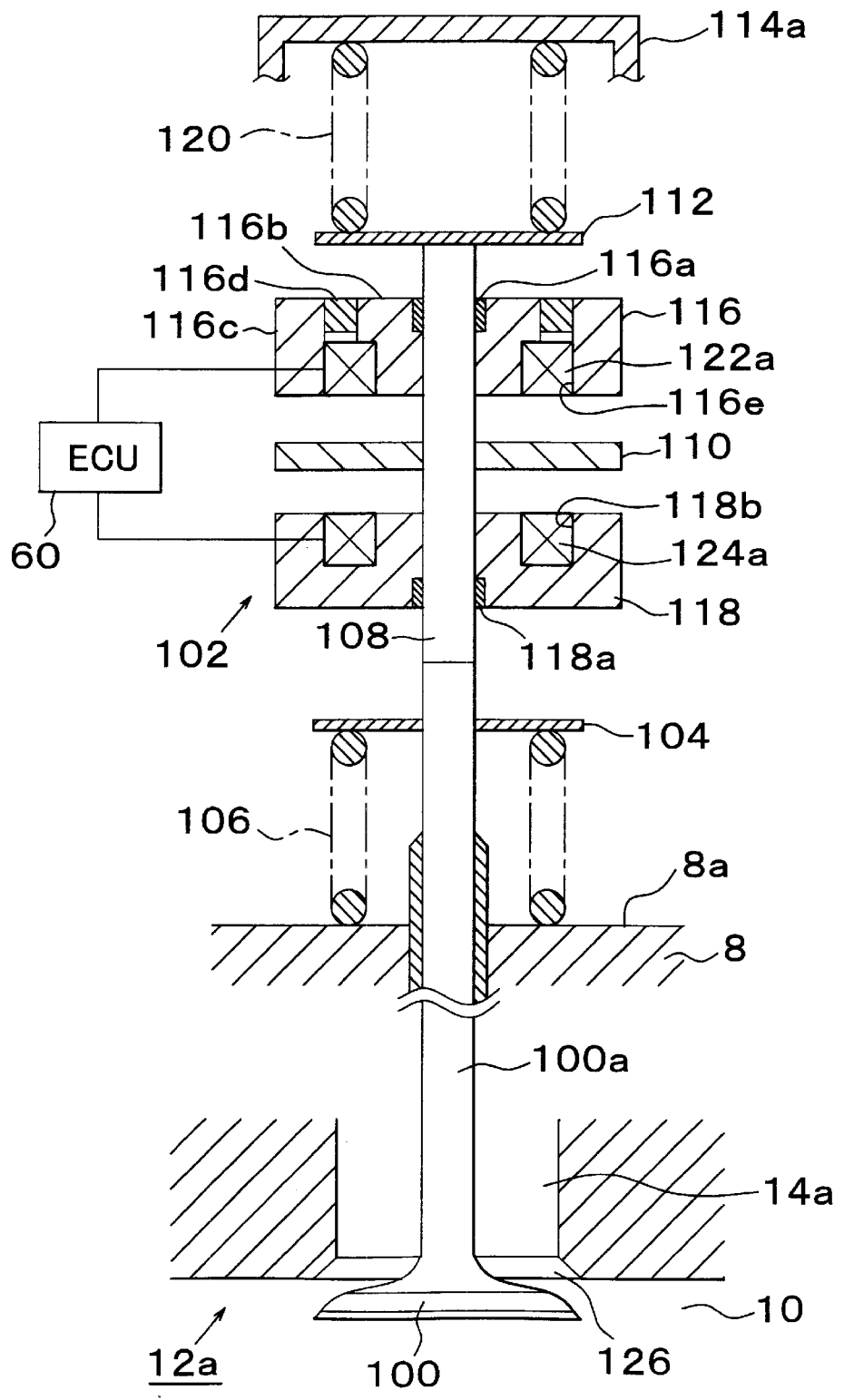
FIG. 4 is an illustration of a construction of an intake valve according to the embodiment of FIG. 1.

Constructions of the intake valves 12a–12h and the exhaust valves 16a–16h formed by electromagnetic valves are described below. Because these electromagnetic valves are substantially the same in basic construction, the first intake valve 12a will be described as a representative of the valves. FIG. 4 illustrates an internal construction of the first intake valve 12a.

The first intake valve 12a has a valve body 100, a valve stem 100a formed integrally with the valve body 100 at an end thereof, and an electromagnetic drive portion 102. The valve stem 100a has a lower retainer 104 that is fixed to an end portion of the stem opposite from the valve body 100. A compressed lower spring 106 is disposed between the lower retainer 104 and a spring retaining face 8a formed on the cylinder head 8. The lower spring 106 urges the valve body 100 together with the valve stem 100a in such a direction as to move the valve body 100 away from the combustion chamber 10, so that the valve body 100 closes the first exhaust port 18a.

The electromagnetic drive portion 102 has, in its central portion, an armature shaft 108 that is disposed coaxially with the valve stem 100a. The armature shaft 108 has an armature 110 fixed to a substantially central portion of the armature shaft 108, and an upper retainer 112 fixed to an end of the armature shaft 108. The armature 110 preferably is formed from a high-magnetic permeability material. An end portion of the armature shaft 108 opposite from the upper retainer 112 is in contact with the lower retainer 104 portion of the valve stem 100a.

A ring-shaped upper core 116 is fixed within a casing 114 of the electromagnetic drive portion 102, as depicted in FIG. 2. The upper core 116 is fixed at a position between the upper retainer 112 and the armature 110, with the armature shaft 108 extending through the upper core 116. Similarly, a ring-shaped lower core 118 is fixed within the casing 114 of the electromagnetic drive portion 102, at a side of the armature 110 opposite from the upper core 116, with the armature shaft 108 extending through the lower core 118. The casing 114 is fixed to the cylinder head 8, as depicted in FIG. 2. The upper core 116 and the lower core 118 support the armature shaft 108 slidably by bushes 116a and 118a that are disposed in through-holes formed in central portions of the upper core 116 and the lower core 118, respectively.

A compressed upper spring 120 is disposed between the upper retainer 112 fixed to an end of the armature shaft 108, and an upper cap 114a provided in the casing 114. The upper spring 120 urges the armature shaft 108 toward the valve stem 100a. Thus, the valve stem 100a and the valve body 100 receive spring forces of the lower spring 106 and the upper spring 120 in opposite directions.

The upper core 116 has a central portion 116b through which the armature shaft 108 slidably extends, an outer peripheral portion 116c, and a ring-shaped upper magnet 116d. The upper magnet 116d corresponds to a closed valve state holding mechanism and connects the central portion 116b and the outer peripheral portion 116c. The central portion 116b and the outer peripheral portion 116c preferably is formed from a high-magnetic permeability material. The upper magnet 116d preferably is a permanent magnet. An excitation upper coil 122a corresponds to a valve-closing electromagnetic coil and is disposed in a ring-shaped groove 116e between the central portion 116b and the outer peripheral portion 116c. The groove 116e is defined by a portion of the central portion 116b and a portion of the outer peripheral portion 116c that are not directly connected by the upper magnet 116d.

The upper magnet 116d is magnetized in radial directions. A magnetic flux produced from the upper core 116 by the presence of the upper magnet 116d extends through the armature 110.

Figure 10:
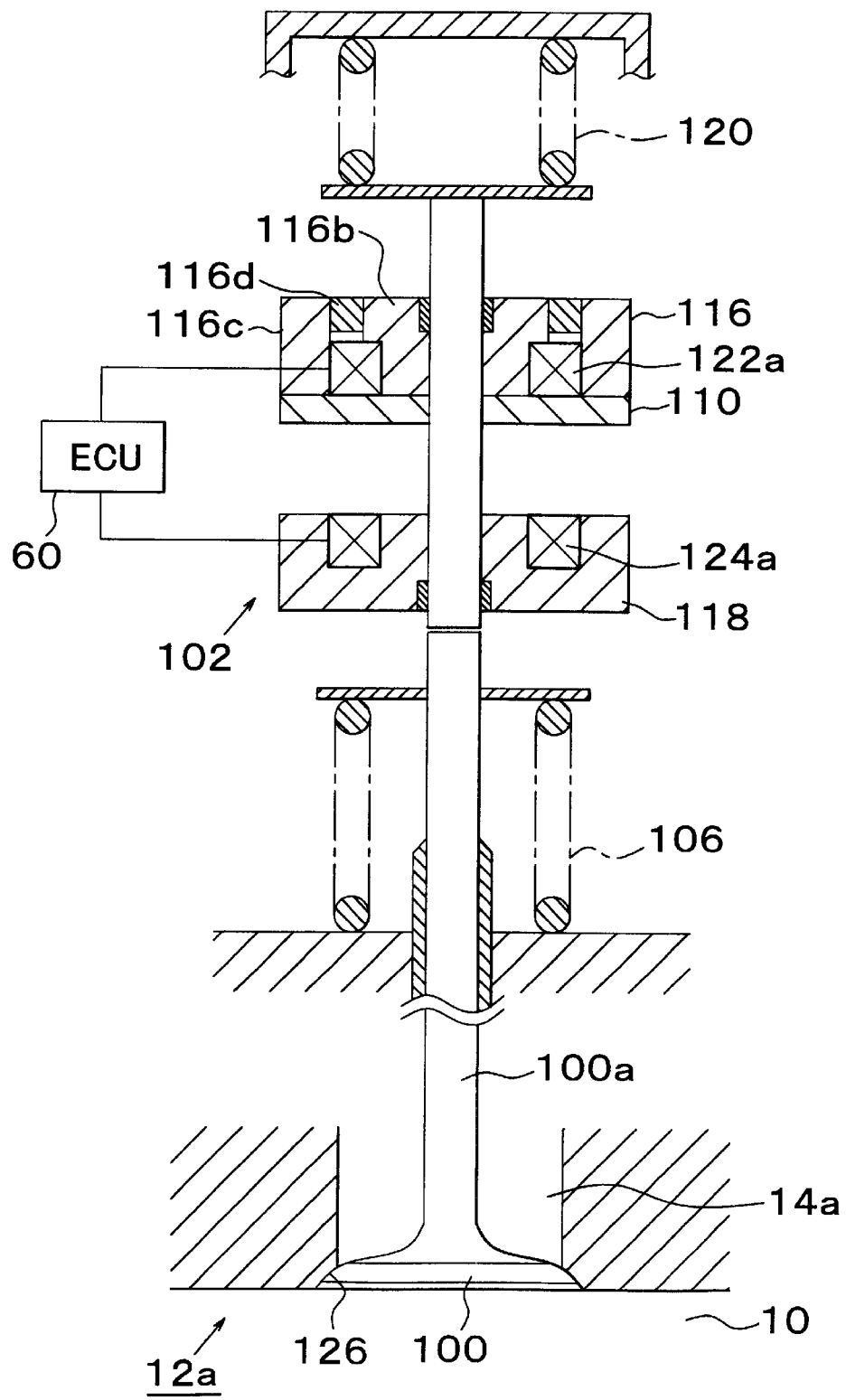
FIG. 10 is a diagram illustrating an operation an intake valve according to the embodiment of FIG. 1.

When the excitation upper coil 122a is not supplied with an exciting current, magnetic fluxes produced by the upper magnet 116d circulate through a magnetic circuit formed by the outer peripheral portion 116c, the armature 110, and the central portion 116b while the armature 110 is in contact with the upper core 116. Therefore, a magnetic attraction force is created between the upper magnet 116d and the armature 110 such that the contact between the armature 110 and the upper core 116 can be maintained despite the spring force of the upper spring 120. When the armature 110 and the upper core 116 are held in contact by the magnetic attraction force created by the upper magnet 116d, the valve body 100 remains in contact with a valve seat 126 so that the first intake port 14a is completely closed as indicated in FIG. 10.

The lower core 118 preferably is formed from a high-magnetic permeability material. The lower core 118 has an annular groove 118b that is open toward the armature 110. The groove 118b extends around the armature shaft 108 that slidably extends through the lower core 118. An excitation lower coil 124a corresponds to a valve-opening electromagnetic coil and is disposed in the groove 118b. Unlike the upper core 116, the lower core 118 does not have a permanent magnet therein. Therefore, when the excitation lower coil 124a is not supplied with an exciting current, the lower core 118 is not able to maintain the contact with the armature 110.

FIG. 4 shows a state that no exciting current is supplied to either the upper coil 122a or the lower coil 124a while the armature 110 is apart from the upper core 116. In this state, the armature 110 does not contact either the upper core 116 or the lower core 118, but resides at an intermediate position where the forces acting on the armature 110, mainly from the upper spring 120 and the lower spring 106, balance. Therefore, the valve body 100 is slightly apart from the valve seat 126, so that the first intake port 14a is in an half open state.

Figure 5:
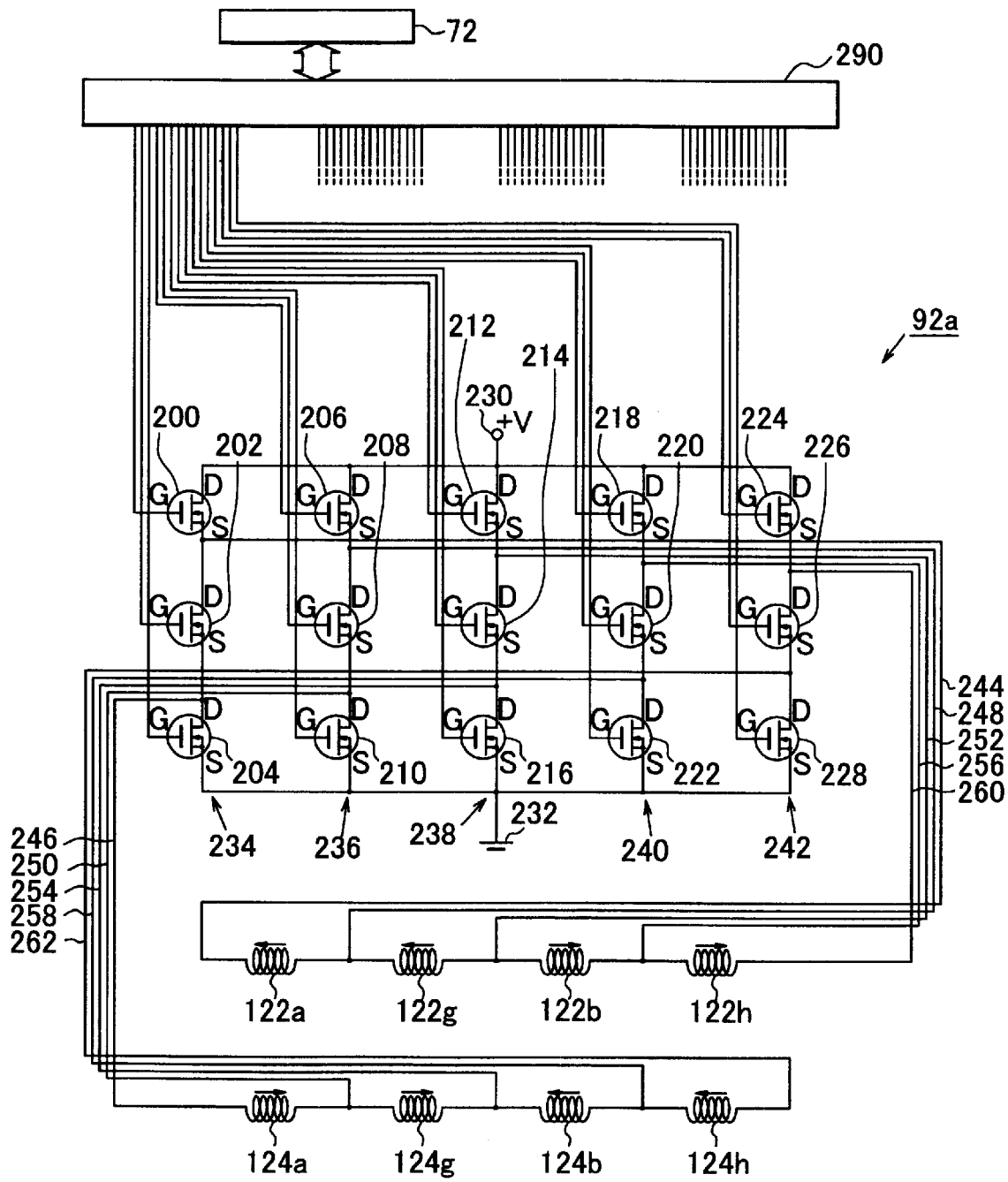
FIG. 5 is an illustration of a construction of a drive circuit according to the embodiment of FIG. 1.

FIG. 5 illustrates a drive circuit 92a provided in the drive circuit portion 92 of the ECU 60 for driving a total of four intake valves 12a, 12b, 12g, and 12h of cylinder 2a and cylinder 2d. The drive circuit 92a is a 3-switching element in-series type drive circuit.

The drive circuit 92a has 15 field-effect transistors ("FETs") depicted as switching elements 200, 202, 204, 206, 208, 210, 212, 214, 216, 218, 220, 222, 224, 226, and 228. Of these switching elements, three switching elements 200, 202, and 204 are connected in series, and form a series circuit 234 connected between a high potential side terminal 230 and a low potential side terminal 232. Similarly, three switching elements 206, 208, and 210, three switching elements 212, 214, and 216, three switching elements 218, 220, and 222, and three switching elements 224, 226, and 228 are separately connected in series, and form four series circuits 236, 238, 240, and 242 respectively, connected between the high potential side terminal 230 and the low potential side terminal 232.

Thus, the five series circuits 234 to 242 are connected in parallel between the high potential side terminal 230 and the low potential side terminal 232.

In the series circuit 234, a series connecting portion between two switching elements 200 and 202 is connected with one end of an electrically conductive wire 244. Similarly, a series connecting portion between two switching elements 202 and 204 is connected with one end of an electrically conductive wire 246. In the series circuit 236, a series connecting portion between two switching elements 206 and 208 is connected with one end of an electrically conductive wire 248, and a series connecting portion between two switching elements 208 and 210 is connected with one end of an electrically conductive wire 250. In the series circuit 238, a series connecting portion between two switching elements 212 and 214 is connected with one end of an electrically conductive wire 252, and a series connecting portion between two switching elements 214 and 216 is connected with one end of an electrically conductive wire 254. In the series circuit 240, a series connecting portion between two switching elements 218 and 220 is connected with one end of an electrically conductive wire 256, and a series connecting portion between two switching elements 220 and 222 is connected with one end of an electrically conductive wire 258. In the series circuit 242, a series connecting portion between two switching elements 224 and 226 is connected with one end of an electrically conductive wire 260, and a series connecting portion between two switching elements 226 and 228 is connected with one end of an electrically conductive wire 262.

Of these wires, the conductive wire 244 is connected to an end of the upper coil 122a incorporated, in the first intake valve 12a of cylinder 2a. The conductive wire 248 is connected to the other end of the upper coil 122a and to an end of the upper coil 122g incorporated in the first intake valve 12g of cylinder 2d. The conductive wire 252 is connected to the other end of the upper coil 122g and to an end of the upper coil 122b incorporated in the second intake valve 12b of cylinder 2a. The conductive wire 256 is connected to the other end of the upper coil 122b and to an end of the upper coil 122h incorporated in the second intake valve 12h of the cylinder 2d. The conductive wire 260 is connected to the other end of the upper coil 122h.

The conductive wire 246 is connected to an end of the lower coil 124a incorporated in the first intake valve 12a of cylinder 2a. The conductive wire 250 is connected to the other end of the lower coil 124a and to an end of the lower coil 124g incorporated in the first intake valve 12g of the cylinder 2d. The conductive wire 254 is connected to the other end of the lower coil 124g and to an end of the lower coil 124b incorporated in the second intake valve 12b of the cylinder 2a. The conductive wire 258 is connected to the other end of the lower coil 124b and to an end of the lower coil 124h incorporated in the second intake valve 12h of the cylinder 2d. The conductive wire 262 is connected to the other end of the lower coil 124h.

Thus, the connections between the series circuit 234 and the series circuit 236, and the connections between the series circuit 238 and the series circuit 240 are accomplished only by the electromagnetic coils 122a, 122b, 124a, and 124b. The electromagnetic coils 122a, 122b, 124a and 124b are provided in the two intake valves 12a, and 12b, that perform identical operations on cylinder 2a. Furthermore, the connections between the series circuit 236 and the series circuit 238 and the connections between the series circuit 240 and the series circuit 242 are accomplished only by the electromagnetic coils 122g, 122h, 124g, and 124h provided in the two intake valves 12g, and 12h, that perform identical operations on cylinder 2d. Thus, in the drive circuit 92a, the inter-series circuit connections accomplished by the electromagnetic coils 122a, 122b, 124a, and 124b of the two intake valves 12a, and 12b of cylinder 2a, and the inter-series circuit connections accomplished by the electromagnetic coils 122g, 122h, 124g, and 124h of the two intake valves 12g, 12h of cylinder 2d are arranged alternately. In this manner, the drive circuit 92a is provided collectively for the valve group consisting of the four valves 12a, 12b, 12g, and 12h.

A solid-line arrow shown in each electromagnetic coil 122a, 122g, 122b, 122h, 124a, 124g, 124b, and 124h indicates the direction of current that is conducted to magnetically attract the armature 110. This direction will be referred to as a "forward direction". In other depicted embodiments, the solid-line arrows shown in electromagnetic coils have the same meaning.

The gate terminal G of each switching element 200–228 inputs an ON, high level, signal and an OFF, low level, signal via a buffer circuit 290 in the drive circuit portion 92. The processor 68 controls the output signal to each gate terminal G via the output port 72 and the buffer circuit 290.

Each switching element 200–228 goes to an ON state upon input of the ON signal to the gate terminal G, and goes to an OFF state upon input of the OFF signal to the gate terminal G. Each switching element 200–228 permits flow of current between the drain terminal D and the source terminal S during the ON state. Each switching element 200–228 blocks flow of current between the drain terminal D and the source terminal S during the OFF state. Each switching element 200–228 has a built-in diode that allows flow of current from the source terminal S toward the drain terminal D. Each switching element 200–228 is connected so that the built-in diode allows current to flow from the low potential side terminal 232 to the high potential side terminal 230. Therefore, the switching elements 200–228 allow flow of current from the low potential side terminal 232 toward the high potential side terminal 230 even during the OFF state. The switching elements also may use FETs having substantially the same functions as mentioned above.

By using the switching elements 200–229, the state of activation of each electromagnetic coil 122a, 122g, 122b, 122h, 124a, 124g, 124b, and 124h is controlled so that the control of opening and closing the two intake valves 12a, and 12b of cylinder 2a and the two intake valves 12g, 12h of cylinder 2d is executed.

Figure 6:
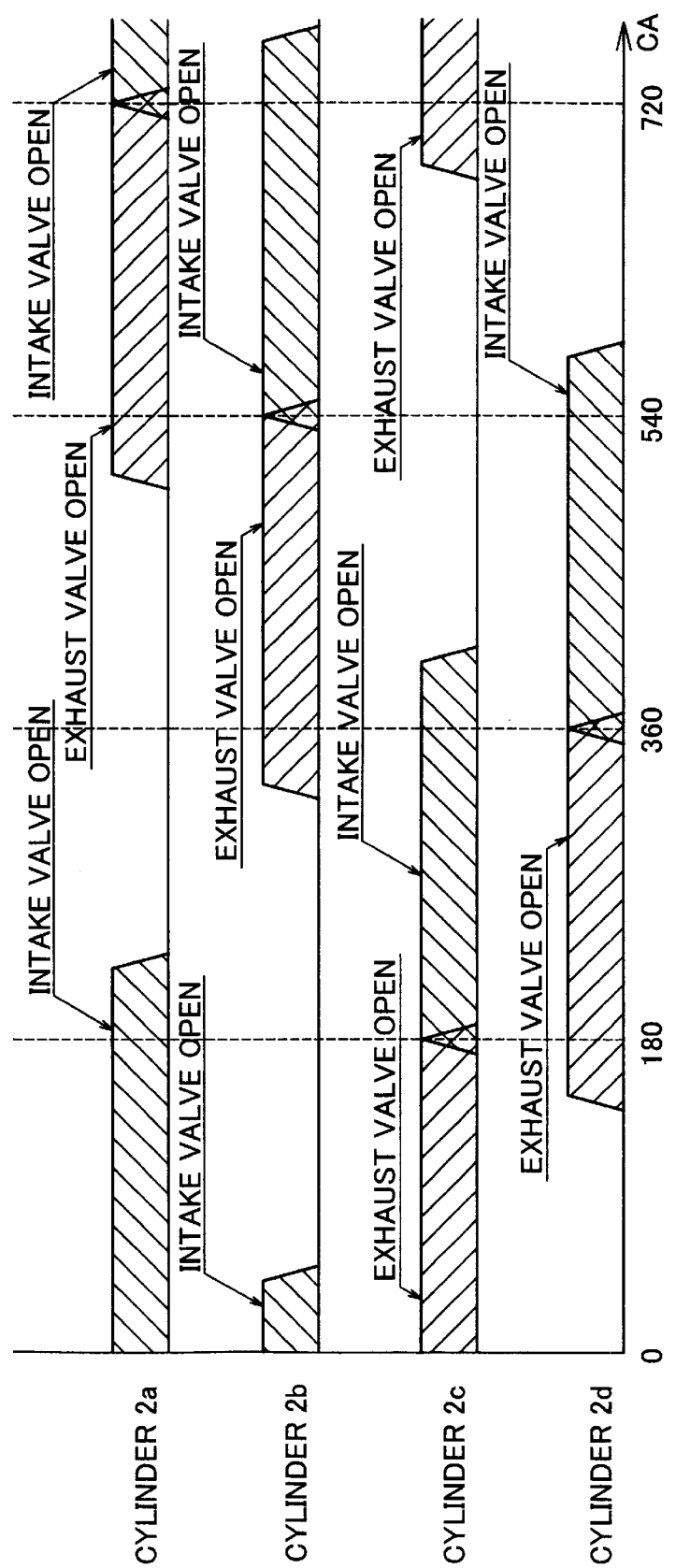
FIG. 6 is a valve timing chart according to the embodiment of FIG. 1.

As indicated in a valve timing chart shown in FIG. 6, the open valve periods of the intake valves 12a, and 12b of cylinder 2a and of the intake valves 12g, and 12h of cylinder 2d do not overlap. Thus, the drive circuit 92a illustrated in FIG. 5 is provided collectively for the intake valves 12a, and 12b of cylinder 2a and the intake valves 12g, and 12h of cylinder 2d so that their open valve periods do not overlap.

The opening and closing operations of the intake valves 12a, and 12b of cylinder 2a and the intake valves 12g, and 12h of cylinder 2d are caused by supply of control currents from the ECU 60. A timing chart shown in FIG. 7 indicates the operations of the intake valves 12a, 12b, 12g, and 12h.

Figure 7:
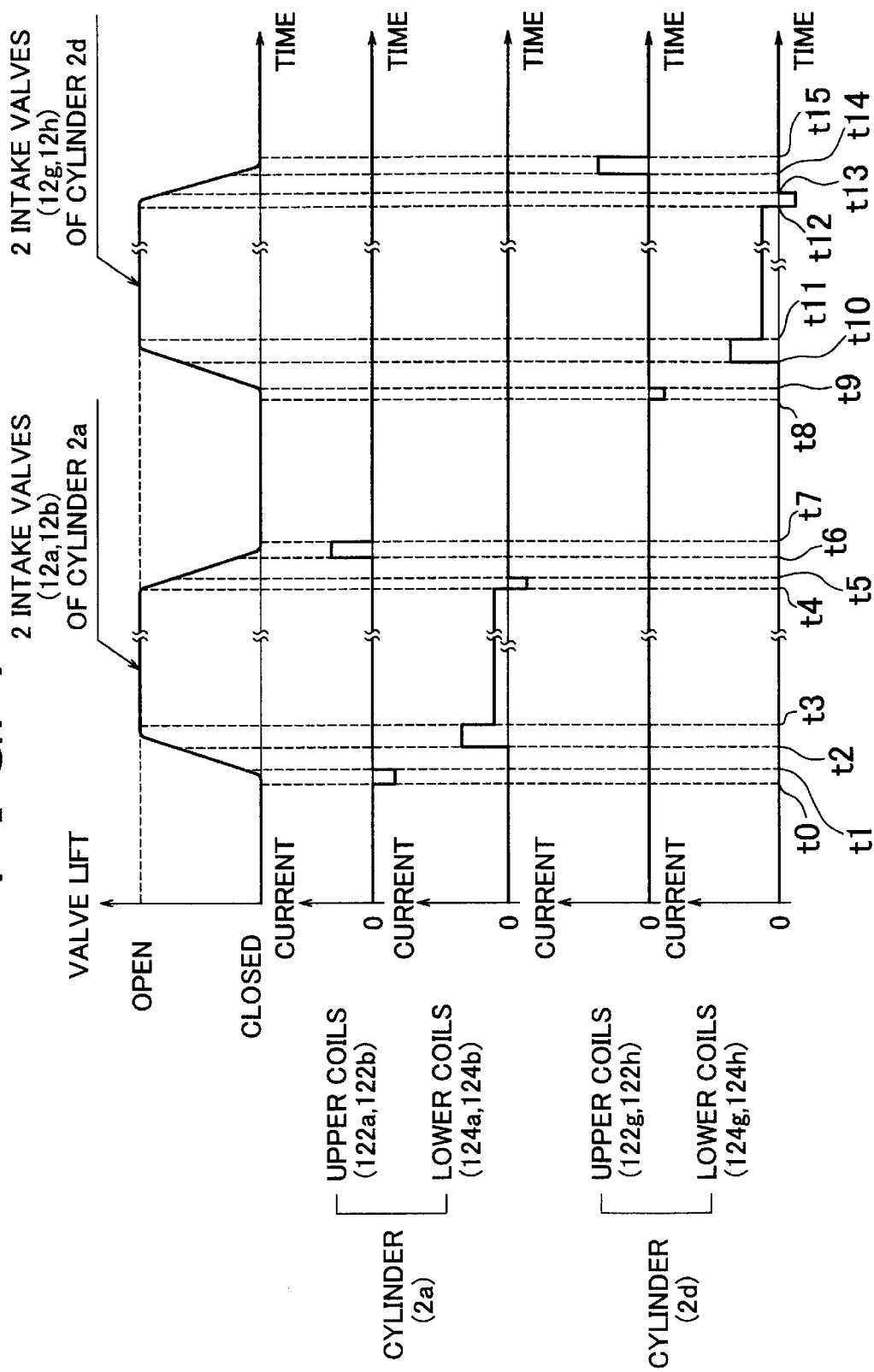
FIG. 7 is a timing chart indicating the operations of intake valves and the current control according to the embodiment of FIG. 1.

FIGS. 8A to 8F and FIGS. 9A to 9F are circuit diagrams indicating a state of control performed on the drive circuit 92a shown in FIG. 5 in order to perform the operations indicated in FIG. 7. In FIGS. 8A to 8F and 9A to 9F, the conductive wires 244–262 are omitted. Furthermore, in FIGS. 8A to 8F and 9A to 9F, illustration of a switching element without a circle "□" indicates that the switching element is in a state that the OFF signal is inputted to the gate terminal G. Illustration of a switching element enclosed in a circle "□" indicates that the switching element is in a state that the ON signal is inputted to the gate terminal G. Furthermore, each broken line with an arrow indicates a path of current and a direction of current which may be reverse depending on situations.

Before a time point t0 indicated in FIG. 7, the armatures 110 are brought into contact with the upper cores 116 as shown in FIG. 10 by temporary excitation of the upper coils 122a, 122b, 122g, and 122h. This contact state is maintained by the magnetic attraction force of the upper magnets 116d. Therefore, the valve bodies 100 are in contact with the valve seats 126. Thus, the intake valves 12a, and 12b of cylinder 2a and the intake valves 12g, and 12h of cylinder 2d are in a completely closed state. The OFF signals are outputted to all the fifteen switching elements 200–228.

Between time t0–t1 during the intake stroke of cylinder 2a, the processor 68 outputs the ON signals to only the switching elements 200, 208, 210, 214, 216, and 218. Processor 68 outputs the OFF signals to the other switching elements, so as to establish a switching pattern b1 as indicated in FIG. 8B. As a result, currents flow from the high potential side terminal 230 to the low potential side terminal 232 as indicated by broken lines with arrows in FIG. 8B, so that reverse-direction current, or the "releasing current" is supplied to each of the upper coils 122a, and 122b so as to cancel out the magnetic fluxes from the upper magnet 116d.

Therefore, with regard to each upper coil 122a, and 122b, the magnetic attraction force on the armature 110 created by the upper core 116 is cancelled out. As a result, the armatures 110 start to move toward the lower cores 118, that is, toward a fully open state, due to forces from the upper springs 120. Hence, the valve bodies 100 start to move apart from the valve seats 126, and the amount of valve lift starts to increase.

Figure 8A:
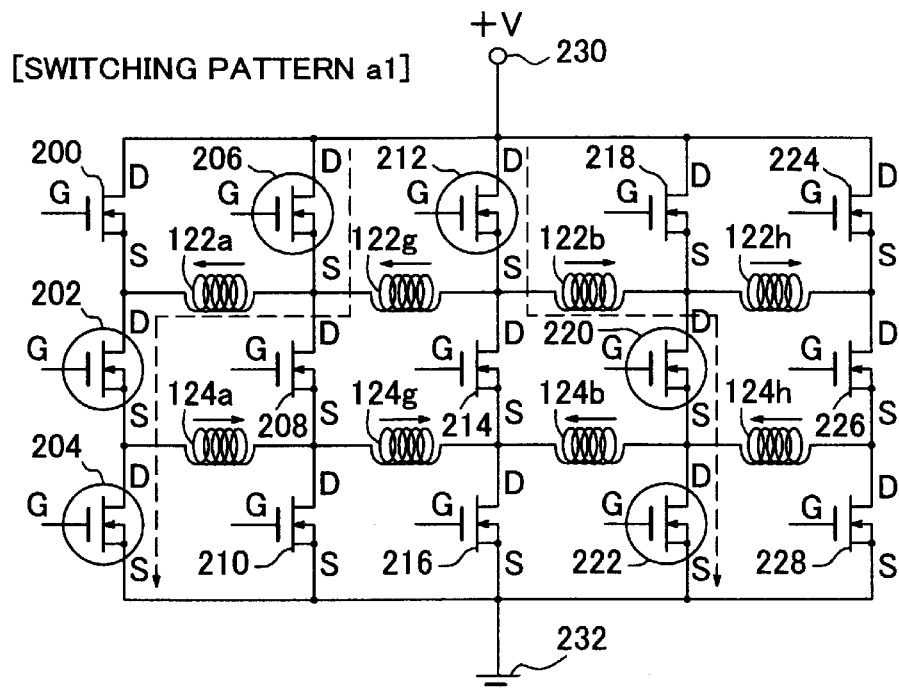
FIGS. 8A to 8F are diagrams of a circuit for illustrating the control of current according to the embodiment of FIG. 1.
Figure 8B:
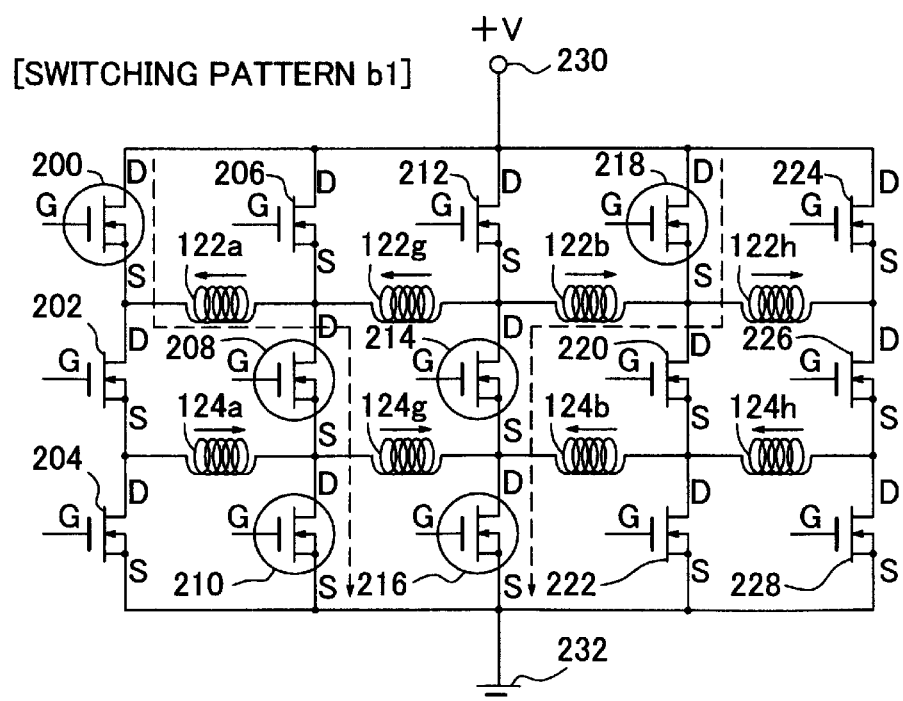

After that, at the time point t1, the processor 68 outputs the ON signals to the switching elements 202, 204, 206, 212, 220, and 222, and outputs the OFF signals to the other switching elements to establish a switching pattern a1 indicated in FIG. 8A. Therefore, the releasing currents flowing through the upper coils 122a, and 122b become regenerative currents flowing in a direction opposite to the direction indicated by the broken lines with arrows in FIG. 8A, and rapidly discontinue. Then, the processor 68 immediately outputs the OFF signals to all the switching elements 200–228 to maintain a current discontinued state.

At the time point t1 when the releasing currents discontinue through the upper coils 122a, and 122b, the armatures 110 are sufficiently apart from the upper cores 116, so that the armatures 110 are not returned to the upper cores 116 by the magnetic forces from the upper magnets 116d. After that, the armatures 110 are gradually moved apart from the upper cores 116 toward the lower cores 118 by the forces from the upper springs 120.

Figure 8C:
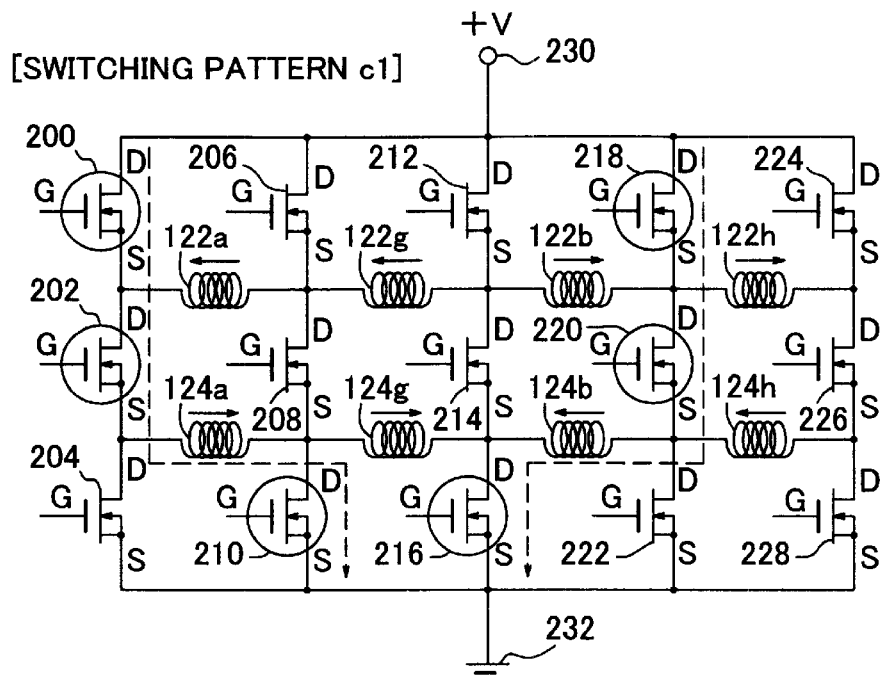

Subsequently at a time point t2, the processor 68 outputs the ON signals to the switching elements 200, 202, 210, 216, 218, and 220, and outputs the OFF signals to the other switching elements to establish a switching pattern c1 indicated in FIG. 8C. Therefore, currents flow from the high potential side terminal 230 to the low potential side terminal 232 as indicated by broken lines with arrows in FIG. 8C, so that forward-direction currents flow through the lower coils 124a, and 124b of the intake valves 12a, and 12b of cylinder 2a. Then, at a time point t3, the switching pattern c1 and a switching pattern f1 depicted in FIG. 8F are alternated to maintain the quantity of current for magnetically attracting the armatures 110 to the lower cores 118 referred to as drawing current. Therefore, when approaching the lower cores 118, the armatures 110 come into contact with the lower cores 118, by overcoming the forces from the lower springs 106.

In the switching pattern f1, the processor 68 outputs the ON signals to only the switching elements 210, and 216, and outputs the OFF signals to the other switching elements. Therefore, a current circulation path through which current flows in a sequence of the lower coil 124a and the switching elements 210 and 204 is formed. A current circulation path through which current flows in a sequence of the lower coil 124b and the switching elements 216 and 222 is formed. Immediately after the switching pattern c1 is changed to the switching pattern f1, flywheel currents flow through these circulation paths as indicated by broken lines with arrows in FIG. 8F. Therefore, by adjusting the proportion between the switching pattern c1 and the switching pattern f1, the quantity of current flowing through the lower coils 124a, and 124b in the forward direction can be adjusted.

Figure 8D:
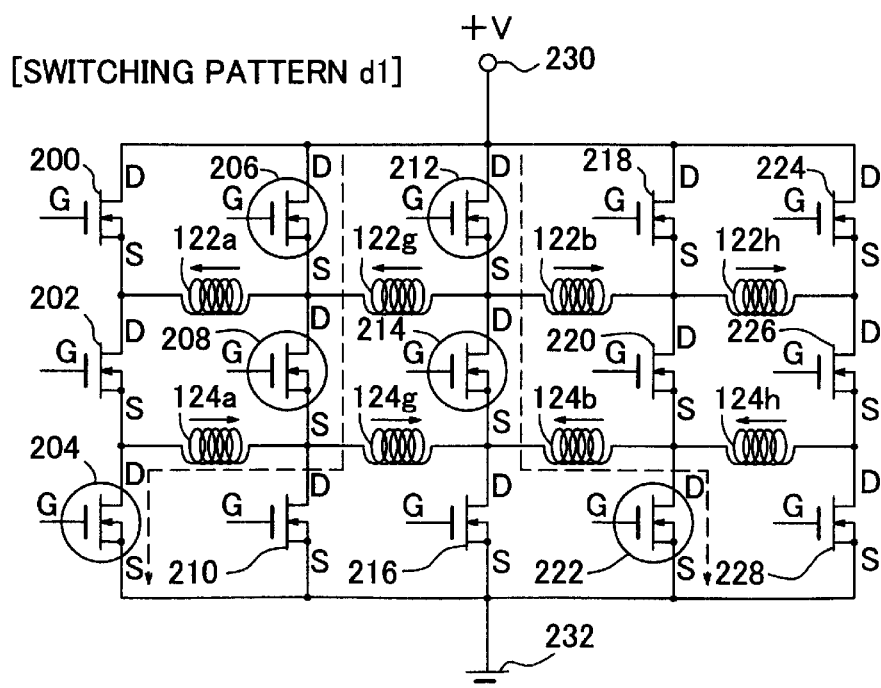

At the time point t3 after the armatures 110 contact the lower cores 118, the switching pattern is temporarily changed to a switching pattern d1 indicated in FIG. 8D. In the switching pattern d1, the processor 68 outputs the ON signals to the switching elements 204, 206, 208, 212, 214, and 222, and outputs the OFF signals to the other switching elements. Therefore, regenerative currents flow in a direction opposite to the direction indicated by broken lines with arrows in FIG. 8D, so that the drawing currents through the lower coils 124a, and 124b rapidly decrease. Immediately after that, the state of alternating the switching pattern c1 and the switching pattern f1 is resumed. In this case, however, the proportion of the switching pattern c1 is reduced in comparison with the pattern alternating state during the time period t2–t3. In this manner, the quantity of current flowing through the lower coils 124a, and 124b in the forward direction is set to an exciting current needed to maintain the contact between the armatures 110 and the lower cores 118, referred to as holding current.

Figure 11:
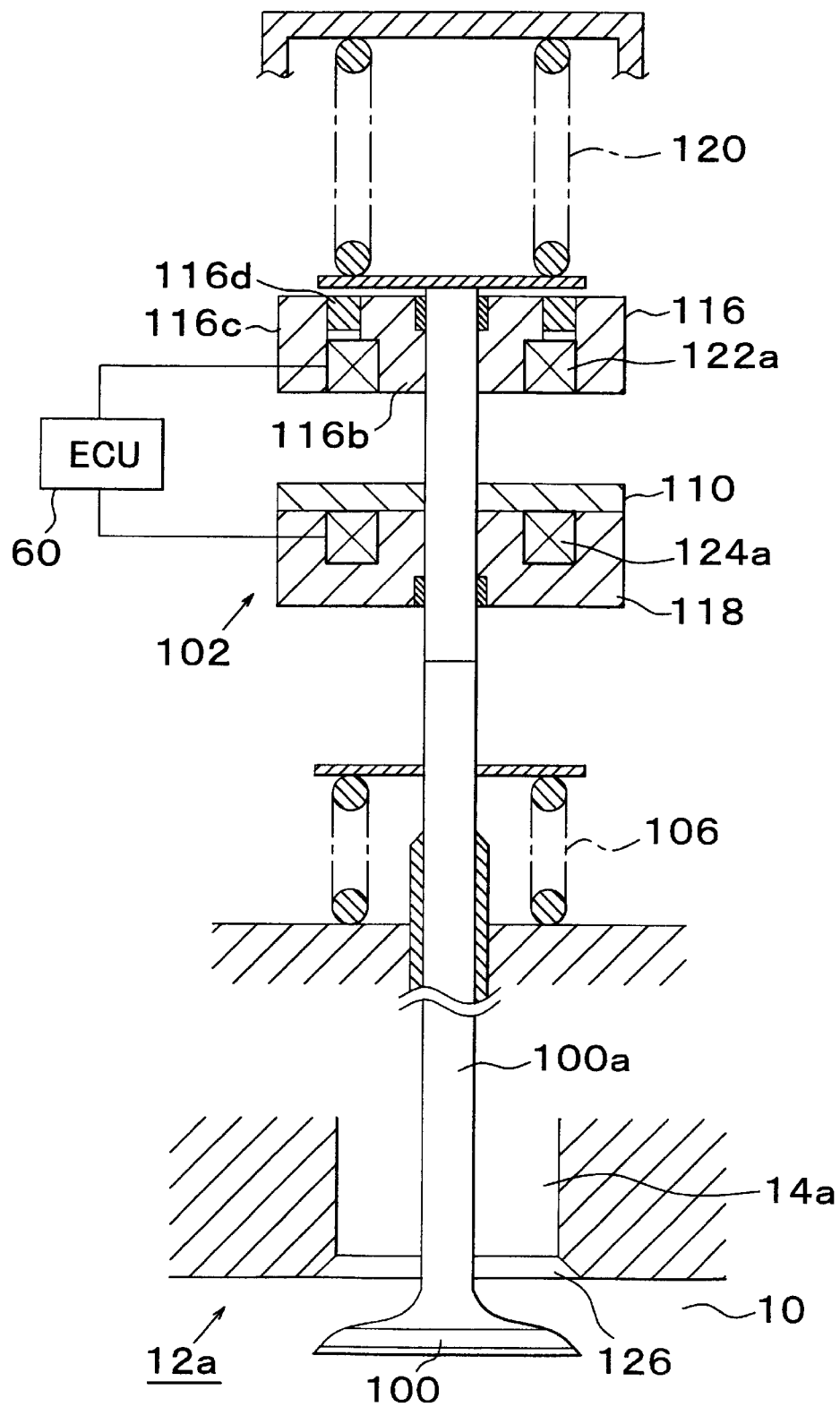
FIG. 11 is a diagram illustrating an operation an intake valve according to the embodiment of FIG. 1.

While the armatures 110 are held in contact with the lower cores 118 by the magnetic force created by continuously supplying the holding currents through the lower coils 124a, and 124b, the valve bodies 100 are farthest from the valve seats 126 as depicted in FIG. 11. Thus, the intake ports 14a, and 14b of cylinder 2a remain in the fully open state.

Subsequently, at a time point t4 near or at a timing at which the intake stroke of cylinder 2a ends, the switching pattern is changed to the switching pattern d1 indicated in FIG. 8D. Therefore, regenerative currents flow in the direction opposite to the direction indicated by the broken lines with arrows in FIG. 8D, so that the holding currents through the lower coils 124a, and 124b rapidly discontinue, and then releasing currents flow in the direction indicated by the broken line arrows.

Subsequently at a time point t5, the switching pattern is temporarily changed to the switching pattern c1. Therefore, regenerative currents flow in the direction opposite to the direction indicated by the broken line arrows in FIG. 8C, so that the releasing currents through the lower coils 124a, and 124b rapidly discontinue. Then, the processor 68 immediately outputs the OFF signals to all the switching elements 200–208 to maintain the current discontinued state.

Due to the releasing currents through the lower coils 124a, and 124b and the subsequent current discontinuation, the armatures 110 lose the attraction force to the lower cores 118. Then, the armatures 110 start to move toward the upper cores 116 toward the completely closed state due to the forces from the lower springs 106. Therefore, the valve bodies 100 approach the valve seats 126 because the amount of valve lift starts to decrease.

Subsequently at a time point t6, the processor 68 changes the switching pattern to the switching pattern a1 indicated in FIG. 8A, in order to draw the armatures 110 into contact with the upper cores 116. As a result, the drawing currents flow through the upper coils 122a, and 122b as indicated by the broken line arrows in FIG. 8A. After that, a needed drawing current is maintained by alternating the switching pattern a1 and a switching pattern e1 indicated in FIG. 8E, until the armatures 110 contact the upper cores 116.

In the switching pattern e1, the processor 68 outputs the ON signals to only the switching elements 206, and 212, and outputs the OFF signals to the other switching elements. Therefore, a current circulation path is formed through which current flows in a sequence of the upper coil 122a and the switching elements 200 and 206. A current circulation path is formed through which current flows in a sequence of the upper coil 122b and the switching elements 218 and 212. Immediately after the switching pattern a1 is changed to the switching pattern e1, flywheel currents flow through these circulation paths as indicated by broken line arrows in FIG. 8E. Therefore, by adjusting the proportion between the switching pattern a1 and the switching pattern e1, the quantity of current flowing through the upper coils 122a, and 122b in the forward direction can be adjusted.

At a time point t7 after the armatures 110 contact the upper cores 116 and, therefore, close the intake valves 12a, and 12*b* of cylinder 2*a* as shown in FIG. 10, the switching pattern is temporarily changed to the switching pattern b1 indicated in FIG. 8B. Therefore, regenerative currents flow in the direction opposite to the direction indicated by the broken line arrows in FIG. 8B, so that the drawing currents through the upper coils 122*a,* and 122*b* rapidly discontinue. Then, the processor 68 immediately outputs the OFF signals to all the switching elements 200–228 to maintain the current discontinued state.

Even after the drawing currents discontinue, the contact between the armatures 110 and the upper cores 116 is maintained by the magnetic attraction force from the upper magnets 116*d.* Thus, the valve bodies 100 are held in contact with the valve seats 126, and the intake valves 12*a,* and 12*b* of cylinder 2*a* are kept in the completely closed state.

After the state where the OFF signals are outputted to all the switching elements 200–228, a timing point comes at which the intake stroke of cylinder 2*d* occurs. The intake stroke of cylinder 2*d* does not overlap the intake stroke of cylinder 2*a.* In this case, starting at a time point t8, the processor 68 outputs the ON signals to the switching elements 206, 214, 216, 220, 222, and 224, and outputs the OFF signals to the other switching elements, so as to establish a switching pattern b2 indicated in FIG. 9B. Therefore, currents flow from the high potential side terminal 230 to the low potential side terminal 232 as indicated by broken line arrows in FIG. 9B, so that releasing current is supplied to each of the upper coils 122*g,* and 122*h* of the intake valves 12*g,* and 12*h* of cylinder 2*d* to cancel out the magnetic fluxes from the upper magnet 116*d.*

Therefore, with regard to each upper coil 122*g,* and 122*h,* the magnetic attraction force on the armature 110 created by the upper core 116 is cancelled out. As a result, the armatures 110 start to move toward the lower cores 118, or toward the fully open state, due to the forces from the upper springs 120. Hence, the valve bodies 100 start to move apart from the valve seats 126, and the amount of valve lift starts to increase.

Figure 9A:
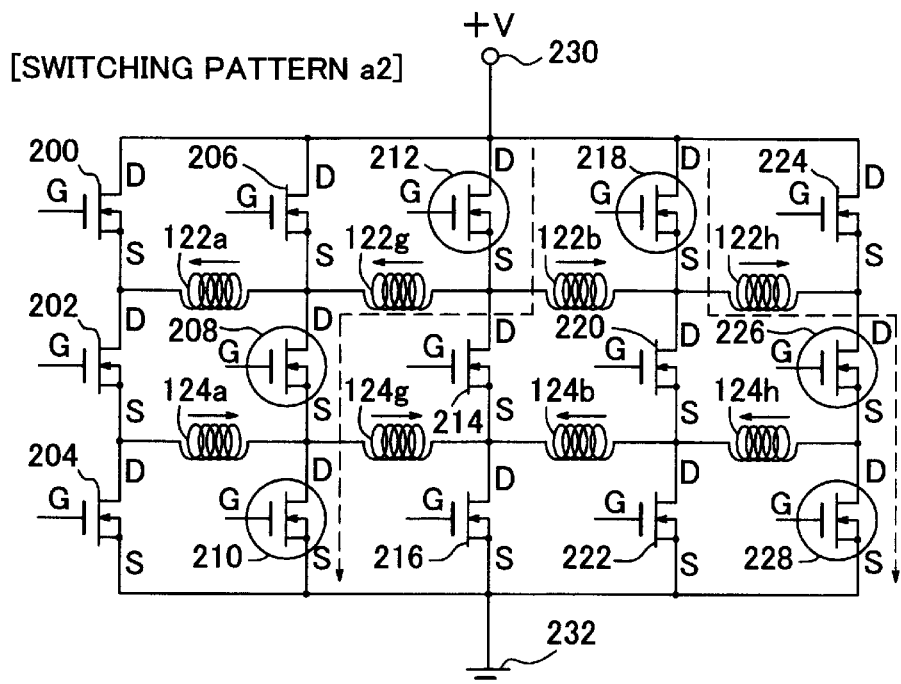
FIGS. 9A–9F are diagrams of a circuit for illustrating the control of current according to the embodiment of FIG. 1.

After that, at a time point t9, the processor 68 outputs the ON signals to the switching elements 208, 210, 212, 218, 226, and 228, and outputs the OFF signals to the other switching elements to establish a switching pattern a2 indicated in FIG. 9A. Therefore, the releasing currents flowing through the upper coils 122*g,* and 122*h* become regenerative currents flowing in a direction opposite to the direction indicated by the broken line arrows in FIG. 9A. Therefore the releasing currents flowing through the upper coils 122*g,* 122*h* rapidly discontinue. Then, the processor 68 immediately outputs the OFF signals to all the switching elements 200–228 to maintain a current discontinued state.

At the time point t9 when the releasing currents through the upper coils 122*g,* and 122*h* discontinue, the armatures 110 are sufficiently apart from the upper cores 116, so that the armatures 110 are not returned to the upper cores 116 by the magnetic forces from the upper magnets 116*d.* After that, the armatures 110 are gradually moved apart from the upper cores 116 toward the lower cores 118 by the forces from the upper springs 120.

Figure 9B:
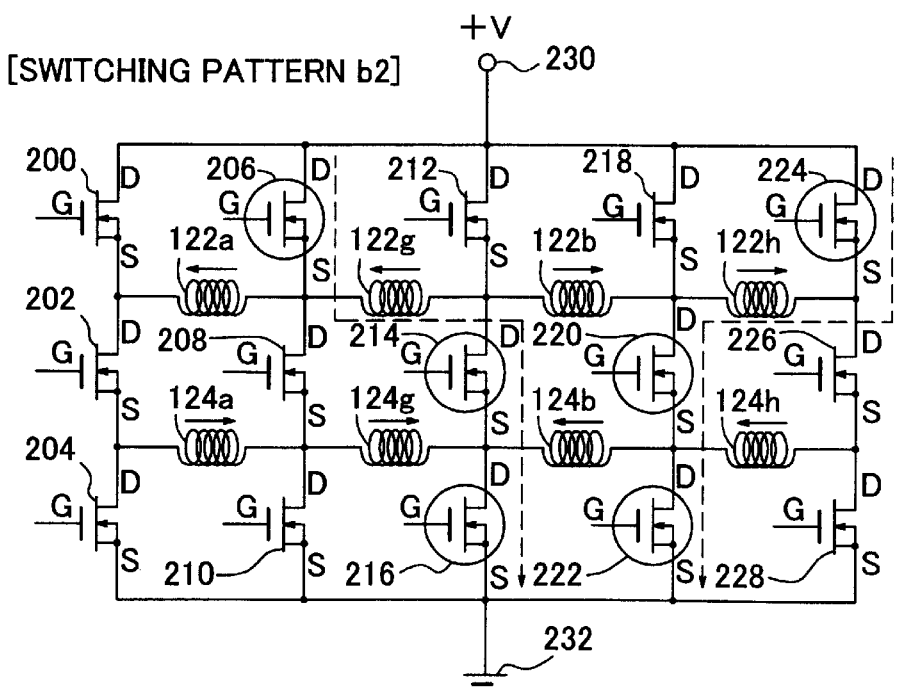
Figure 9C:
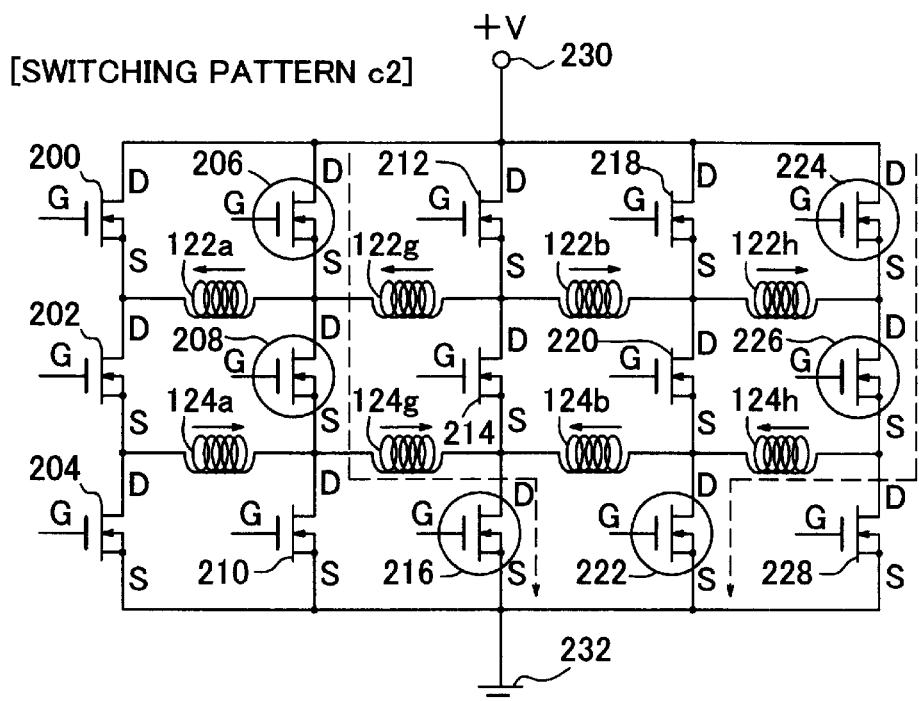

Subsequently at a time point t10, the processor 68 outputs the ON signals to the switching elements 206, 208, 216, 222, 224, and 226, and outputs the OFF signals to the other switching elements to establish a switching pattern c2 indicated in FIG. 9C. Therefore, currents flow from the high potential side terminal 230 to the low potential side terminal 232 as indicated by broken line arrows in FIG. 9C, so that currents flow through the lower coils 124*g,* and 124*h* of the intake valves 12*g,* and 12*h* of cylinder 2*d* in the forward direction. Then, until a time point t11, the switching pattern c2 and a switching pattern f2 indicated in FIG. 9F are alternated to maintain the drawing current for magnetically attracting the armatures 110 to the lower cores 118. Therefore, when approaching the lower cores 118, the armatures 110 come into contact with the lower cores 118 and overcome the forces from the lower springs 106.

In the switching pattern f2, the processor 68 outputs the ON signals to the switching elements 216, and 222, and outputs the OFF signals to the other switching elements. Therefore, a current circulation path is formed through which current flows in a sequence of the lower coil 124*g* and the switching elements 216 and 210. A current circulation path is formed through which current flows in a sequence of the lower coil 124*h* and the switching elements 222 and 228. Immediately after the switching pattern c2 is changed to the switching pattern f2, flywheel currents flow through these circulation paths as indicated by broken line arrows in FIG. 9F. Therefore, by adjusting the proportion between the switching pattern c2 and the switching pattern f2, the quantity of current flowing through the lower coils 124*g,* and 124*h* in the forward direction can be adjusted.

Figure 9D:
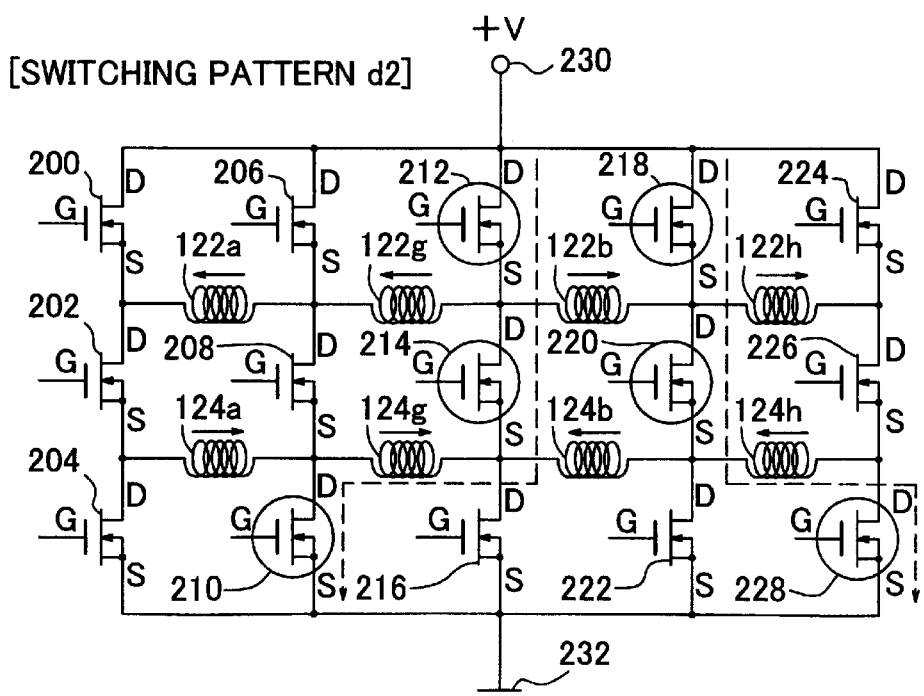

At the time point t11 after the armatures 110 come into contact with the lower cores 118, the switching pattern is temporarily changed to a switching pattern d2 indicated in FIG. 9D. In the switching pattern d2, the processor 68 outputs the ON signals to the switching elements 210, 212, 214, 218, 220, and 228, and outputs the OFF signals to the other switching elements. Therefore, regenerative currents flow in a direction opposite to the direction indicated by broken lines with arrows in FIG. 9D, so that the drawing currents through the lower coils 124*g,* 124*h* rapidly decrease. Immediately after that, the state of alternating the switching pattern c2 and the switching pattern f2 is resumed. In this case, however, the proportion of the switching pattern c2 is reduced, in comparison with the pattern alternating state during the time period t10–t11. In this manner, the quantity of current flowing through the lower coils 124*g,* and 124*h* in the forward direction is reduced to the level of the holding current so as to maintain the contact between the armatures 110 and the lower cores 118. By continuously supplying the holding currents through the lower coils 124*g,* and 124*h* as described above, the intake ports 14*g,* 14*h* of cylinder 2*d* are kept in the fully open state.

Subsequently, at a time point t12 near or at a timing at which the intake stroke of cylinder 2*d* ends, the switching pattern is changed to the switching pattern d2 indicated in FIG. 9D. Therefore, regenerative currents flow in the direction opposite to the direction indicated by the broken lines with arrows in FIG. 9D, so that the holding currents through the lower coils 124*g,* and 124*h* rapidly discontinue, and the releasing currents flow in the direction indicated by the broken line arrows.

Subsequently at a time point t13, the switching pattern is temporarily changed to the switching pattern c2. Therefore, regenerative. currents flow in the direction opposite to the direction indicated by the broken line arrows in FIG. 9C, so that the releasing currents flow through the lower coils 124*g,* and 124*h* rapidly discontinue. Then, the processor 68 immediately outputs the OFF signals to all the switching elements 200–228 to maintain the current discontinued state.

After the armatures 110 lose the attraction force toward the lower cores 118 as described above, the valve bodies 100 approach the valve seats 126 due to the forces from the lower springs 106, thus decreasing the amount of valve lift.

Subsequently at a time point t14, the processor 68 changes the switching pattern to the switching pattern a2 indicated in FIG. 9A, in order to draw the armatures 110 into contact with the upper cores 116. As a result, the drawing currents flow through the upper coils 122g, and 122h as indicated by the broken line arrows in FIG. 9A. A drawing current is maintained by alternating the switching pattern a2 and a switching pattern e2 indicated in FIG. 9E, until the armatures 110 contact the upper cores 116.

In the switching pattern e2, the processor 68 outputs the ON signals to the switching elements 212, and 218, and outputs the OFF signals to the other switching elements. Therefore, a current circulation path is formed through which current flows in a sequence of the upper coil 122g and the switching elements 206 and 212. A current circulation path is formed through which current flows in a sequence of the upper coil 122h and the switching elements 224 and 218. Immediately after the switching pattern a2 is changed to the switching pattern e2, flywheel currents flow through these circulation paths as indicated by broken line arrows in FIG. 9E. Therefore, by adjusting the proportion between the switching pattern a2 and the switching pattern e2, the quantity of current flowing through the upper coils 122g, and 122h in the forward direction can be adjusted.

At a time point t15 after the armatures 110 come into contact with the upper cores 116, the switching pattern is temporarily changed to the switching pattern b2 indicated in FIG. 9B. Therefore, regenerative currents flow in the direction opposite to the direction indicated by the broken line arrows in FIG. 9B, so that the drawing currents through the upper coils 122g, and 122h rapidly discontinue. Then, the processor 68 immediately outputs the OFF signals to all the switching elements 200–228 to maintain the current discontinued state.

Even after the drawing currents discontinue, the contact between the armatures 110 and the upper cores 116 is maintained by the magnetic attraction force from the upper magnets 116d. Thus, the valve bodies 100 are held in contact with the valve seats 126, and therefore the intake valves 12g, and 12h of cylinder 2d are kept in the completely closed state.

By repeating the processes described above, the intake valves 12a, 12b, 12g, and 12h of cylinder 2a and cylinder 2d are opened and closed.

Figure 8E:
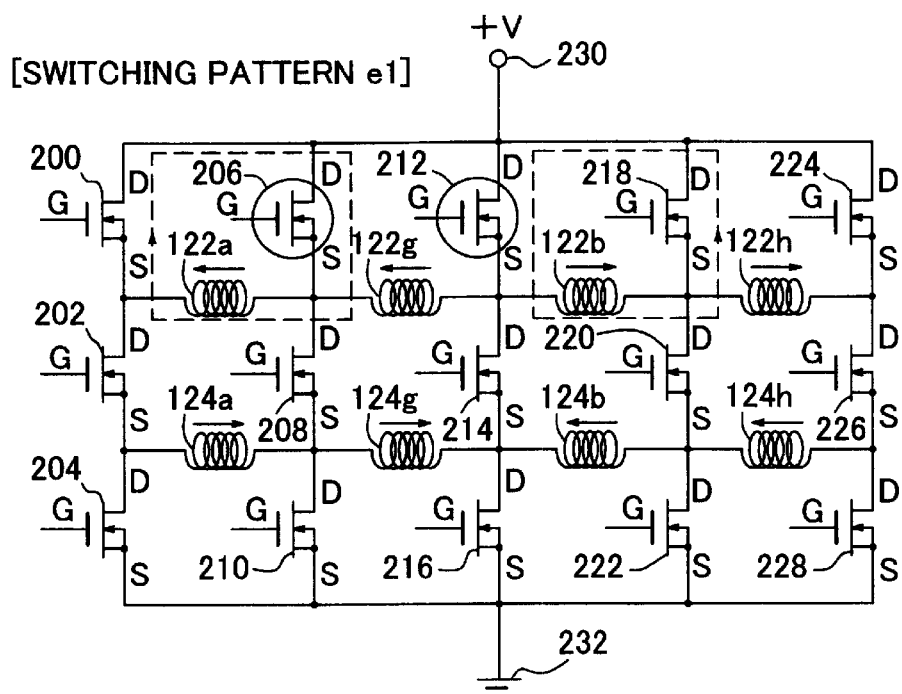
Figure 8F:
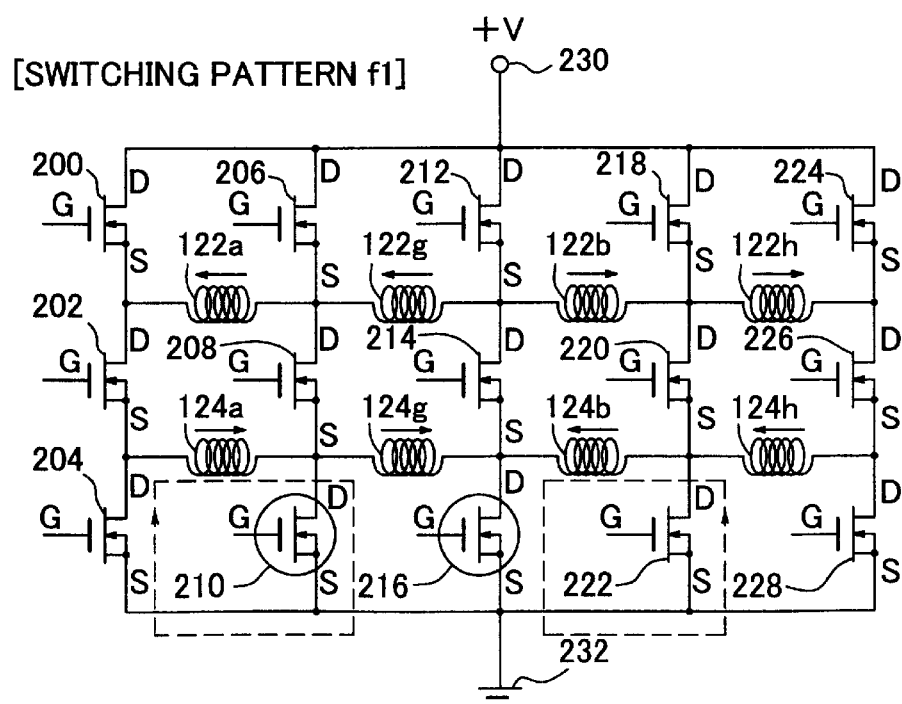

With regard to the operation of the drive circuit 92a for the intake valves 12a, and 12b of cylinder 2a, it should be understood that the switching elements 200–222 as depicted in FIGS. 8A, 8B and 8E are the same as the switching elements 200–222 as depicted in FIGS. 8C, 8D and 8F. These switching elements are shared by the upper coils 122a, and 122b and the lower coils 124a, and 124b.

Figure 9E:
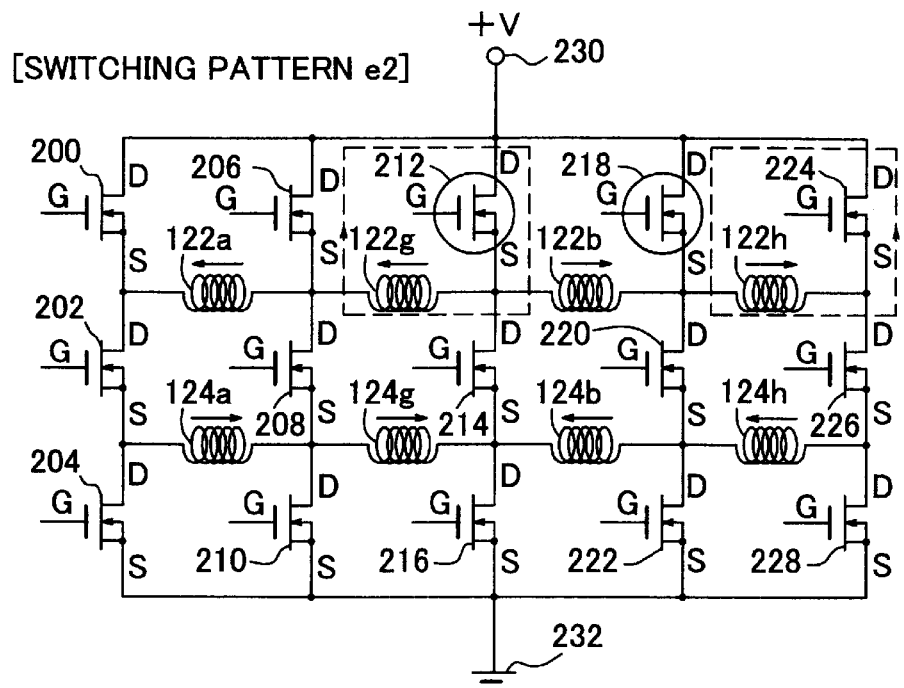
Figure 9F:
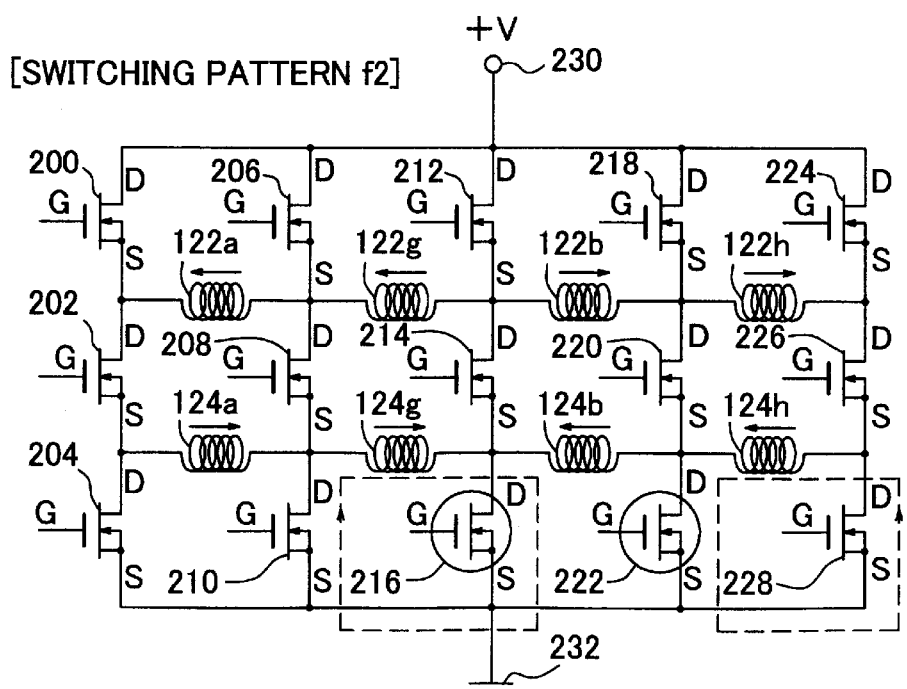

With regard to the intake valves 12g, and 12h of cylinder 2d, it should be understood that the switching elements 206–228 as depicted in FIGS. 9A, 9B and 9E are the same as the switching elements 206–228 as depicted in FIGS. 9C, 9D and 9F. These switching elements are shared by the upper coils 122g, and 122h and the lower coils 124g, and 124h.

Furthermore, through comparison between the switching elements 200–222 that conduct current to drive the upper coils 122a, and 122b and the lower coils 124a, and 124b of the intake valves 12a, and 12b of cylinder 2a as indicated in FIGS. 8A to 8F and the switching elements 206–228 that conduct current to drive the upper coils 122g, and 122h and the lower coils 124g, 124h of the intake valves 12g, and 12h of cylinder 2d as indicated in FIGS. 9A to 9F, it should be understood that the switching elements 206–222 are shared.

Figure 12:
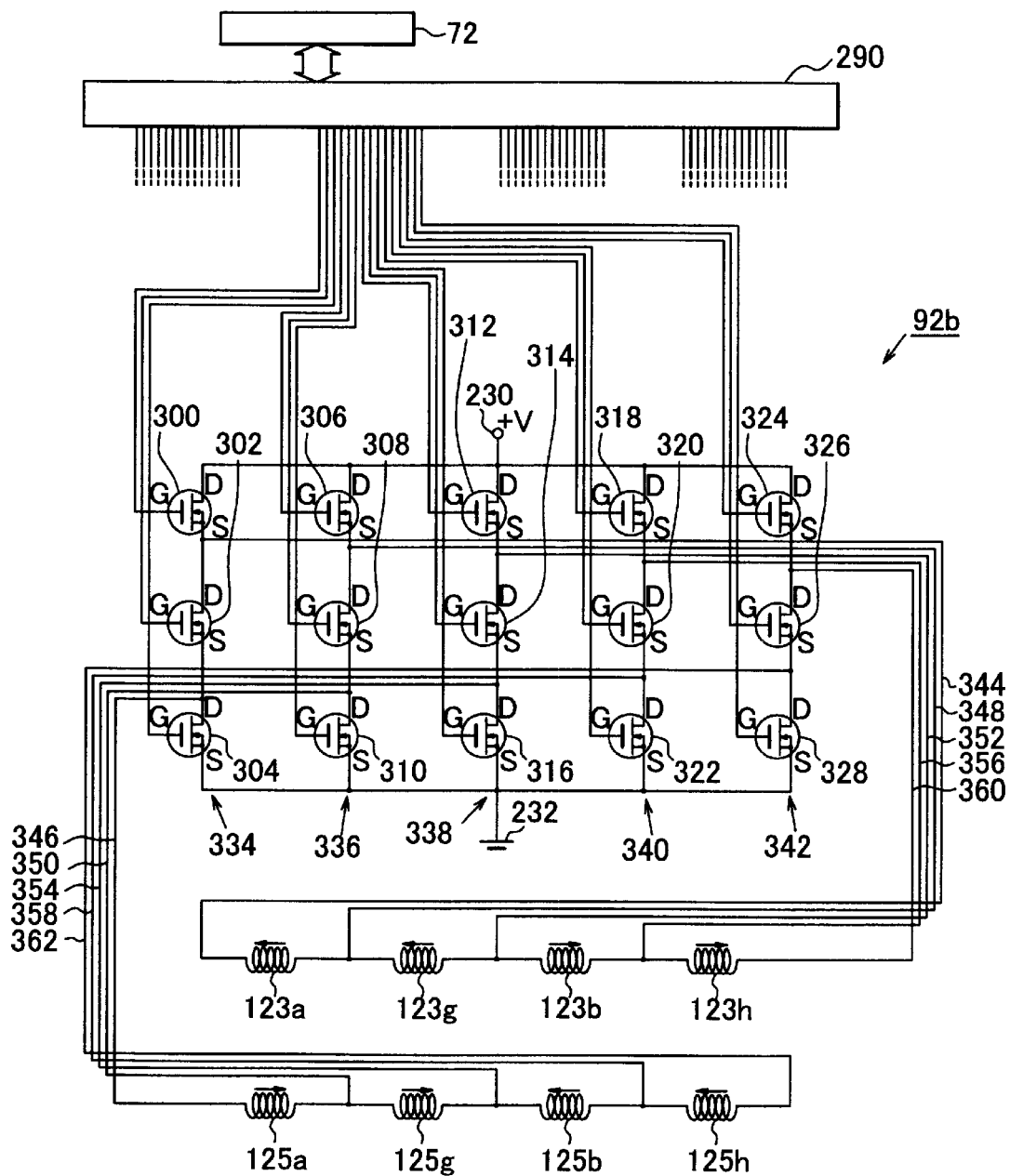
FIG. 12 is a diagram illustrating a construction of a drive circuit according to the embodiment of FIG. 1.

FIG. 12 illustrates a drive circuit 92b provided in the drive circuit portion 92 collectively for a total of four exhaust valves 16a, 16b, 16g, and 16h of cylinder 2a and cylinder 2d.

The drive circuit 92b has a configuration that is substantially similar as that of the drive circuit 92a illustrated in FIG. 5. Thus, 15 FETs are provided as switching elements 300, 302, 304, 306, 308, 310, 312, 314, 316, 318, 320, 322, 324, 326, and 328. Five series circuits 334, 336, 338, 340, and 342 are formed by connecting three of the switching elements 300–328 in series. The five series circuits are connected in parallel between a high potential side terminal 230 and a low potential side terminal 232. Upper coils 123a, 123g, 123b, and 123h and lower coils 125a, 125g, 125b, and 125h are connected between the series circuits 334–342 and more specifically, between series connecting portions of the switching elements 300–328 via electrically conductive wires 344, 346, 348, 350, 352, 354, 356, 358, 360, and 362.

Figure 13:
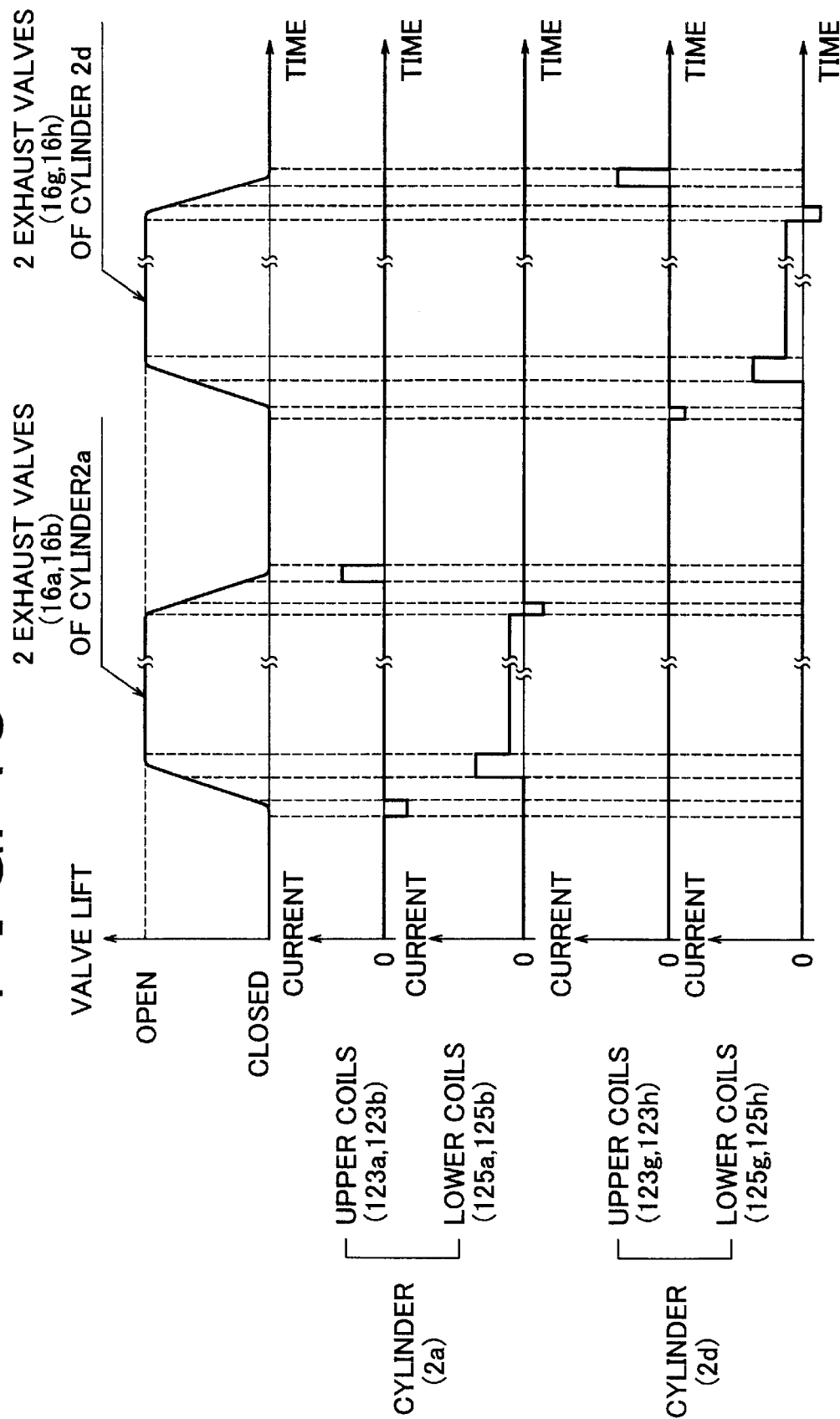
FIG. 13 is a timing chart indicating the operations of exhaust valves and the current control according to the embodiment of FIG. 1.

The open valve period of the exhaust valves 16a, and 16b of cylinder 2a and the open valve period of the exhaust valves 16g, and 16h do not overlap each other. Therefore, the switching elements 300–328 are controlled by the processor 68 in patterns that are substantially the same as the switching patterns a1 to f2 indicated in FIGS. 8A to 8F and FIGS. 9A to 9F. Hence, the exhaust valves 16a, and 16b of cylinder 2a and the exhaust valves 16g, and 16h of cylinder 2d can be driven in the opening and closing directions as indicated in a timing chart shown in FIG. 13. As a result, the switching element sharing is achieved regarding the switching elements 300–328 in the drive circuit 92b, as in the case of the drive circuit 92a.

Thus, through the use of the two drive circuits 92a, and 92b, it is possible to drive a total of eight intake and exhaust valves. The two intake valves 12a, and 12b and the two exhaust valves 16a, and 16b of cylinder 2a and the two intake valves 12g, and 12h and the two exhaust valves 16g, and 16h of cylinder 2d may be driven.

Figure 14:
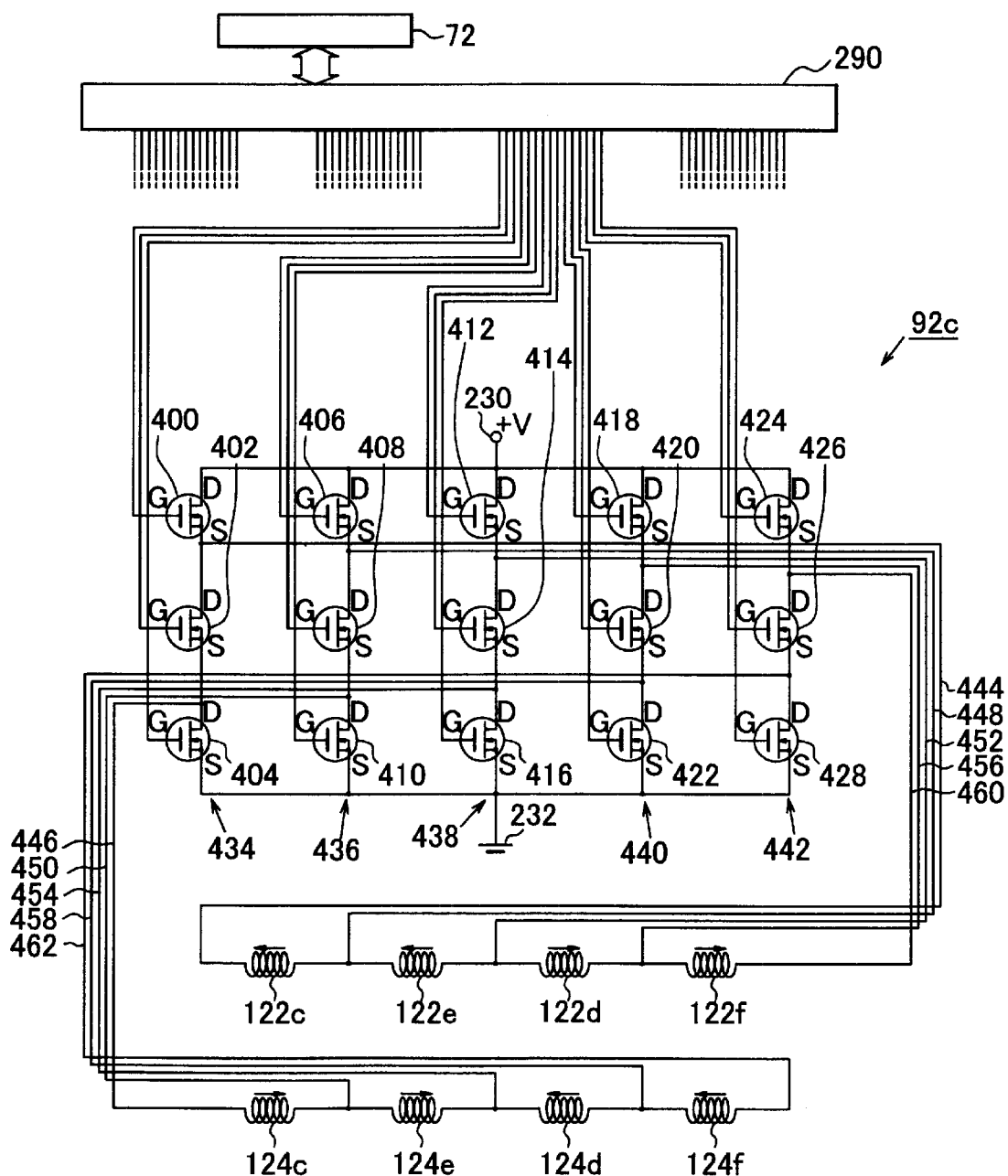
FIG. 14 is a diagram illustrating a construction of a drive circuit according to the embodiment of FIG. 1.

Because the open valve period of the intake valves 12c, and 12d of cylinder 2b and the open valve period of the intake valves 12e, 12f of the cylinder 2c do not overlap each other, a drive circuit 92c is provided in the drive circuit portion 92 collectively for the intake valves 12c, 12d, 12e, and 12f as shown in FIG. 14.

The drive circuit 92c has a configuration that is substantially similar as that of the drive circuit 92a illustrated in FIG. 5. Thus, 15 FETs are provided as switching elements 400, 402, 404, 406, 408, 410, 412, 414, 416, 418, 420, 422, 424, 426, and 428. Five series circuits 434, 436, 438, 440, and 442 are formed by connecting three of the switching elements 400–428 in series. The five series circuits are connected in parallel between a high potential side terminal 230 and a low potential side terminal 232. Upper coils 122c, 122e, 122d, and 122f and lower coils 124c, 124e, 124d, and 124f are connected between the series circuits 434–442, and, more specifically, between series connecting portions of the switching elements 400–428 of the series circuits 434–442, via electrically conductive wires 444, 446, 448,. 450, 452, 454, 456, 458, 460, and 462.

In the drive circuit 92c, the switching elements 400–428 are controlled by the processor 68 in patterns that are substantially the same as the switching patterns a1 to f2 indicated in FIGS. 8A to 8F and FIGS. 9A to 9F. Hence, the intake valves 12c, and 12d cylinder 2b and the intake valves 12e, and 12f of cylinder 2c can be driven in the opening and closing directions in a manner similar to that indicated in the timing chart of FIG. 7. As a result, the switching element sharing is achieved regarding the switching elements 400–428, as in the case of the drive circuit 92a.

Figure 15:
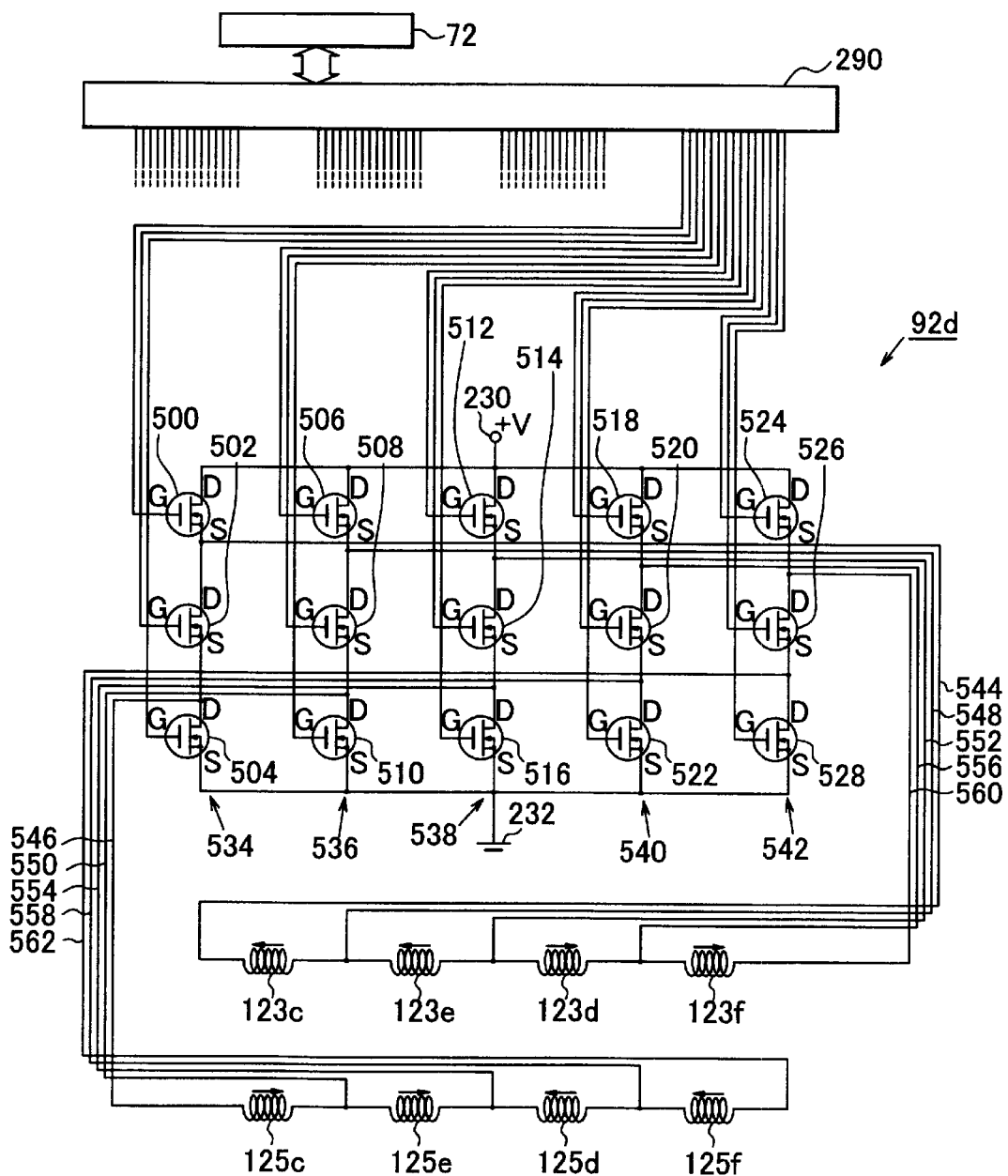
FIG. 15 is a diagram illustrating a construction of a drive circuit according to the embodiment of FIG. 1.

Because the open valve period of the exhaust valves 16c, and 16d of cylinder 2b and the open valve period of the exhaust valves 16e, and 16f of cylinder 2c do not overlap each other, a drive circuit 92d is provided as a portion of the drive circuit portion 92 collectively for the exhaust valves 16c, 16d, 16e, and 16f as shown in FIG. 15.

The drive circuit 92d has a configuration that is substantially similar as that of the drive circuit 92a illustrated in FIG. 5. Thus, 15 FETs are provided as switching elements 500, 502, 504, 506, 508, 510, 512, 514, 516, 518, 520, 522, 524, 526, and 528. Five series circuits 534, 536, 538, 540, and 542 are formed by connecting three of the switching elements 500–528 in series. The five series circuits are connected in parallel between a high potential side terminal 230 and a low potential side terminal 232. Upper coils 123c, 123e, 123d, and 123f and lower coils 125c, 125e, 125d, and 125f are connected between the series circuits 534–542, and more specifically, between series connecting portions of the switching elements 500–528 of the series circuits 534–542, via electrically conductive wires 544, 546, 548, 550, 552, 554, 556, 558, 560, and 562.

In the drive circuit 92d, the switching elements 300–328 are controlled by the processor 68 in patterns that are substantially similar as the switching patterns a1 to f2 indicated in FIGS. 8A to 8F and FIGS. 9A to 9F. Hence, the exhaust valves 16c, and 16d of cylinder 2b and the exhaust valves 16e, and 16f of cylinder 2c can be driven in the opening and closing directions in a manner similar to that indicated in the timing chart of FIG. 13. As a result, the switching element sharing is achieved regarding the switching elements 500–528, as in the case of the drive circuit 92a.

Thus, through the use of the two drive circuits 92c, and 92d, it is possible to drive a total of eight intake and exhaust valves. The two intake valves 12c, and 12d and the two exhaust valves 16d, and 16d of cylinder 2b and the two intake valves 12e, and 12f and the two exhaust valves 16e, and 16f of cylinder 2c may be driven.

Because the drive circuit portion 92 is provided with the four drive circuits 92a–92d, it is possible to drive a total of 16 valves of the four cylinders 2a–2d, that is, the eight intake valves 12a–12h and the eight exhaust valves 16a–16h.

As described above, the drive circuit portion 92 provided in the ECU 60 includes the four drive circuits 92a 92d to perform current control on a total of 32 electromagnetic coils provided for the 16 intake and exhaust valves 12a–12h and 16a–16h provided on the four-cylinder four-valve engine 2. Each of the drive circuits 92a–92d is provided collectively for a valve group consisting of four valves. The valve group comprises the two valves that perform identical operations on a single cylinder and the two valves whose open period does not overlap the open period of the aforementioned two valves. More specifically, each drive circuit is provided collectively for a valve group consisting of four valves as shown in FIG. 16.

Each of the drive circuits 92a–92d has a configuration in which the five series circuits 234–242, 334–342, 434–443, and 534–542 are formed by connecting three of the switching elements 200–228, 300–328, 400–428, and 500–528, respectively, in series. The series circuits are connected in parallel between the high potential side terminal 230 and the low potential side terminal 232. The upper coils 122a 122h, and 123a–123h and the lower coils 124a–124h, and 125a–125h, provided for the intake and exhaust valves 12a–12h, and 16a–16h, connect between the series circuits 234–242, 334–342, 434–443, and 534–542. More specifically, the coils connect between the series connecting portions between the switching elements of the series circuits 234–242, 334–342, 434–443, and 534–542. The inter-series circuit connections established via the upper coils and the lower coils for the two valves that perform identical operations on the same cylinder and the inter-series circuit connections established via the upper coils and the lower coils for other two valves whose open period does not overlap the open period of the aforementioned two valves are alternately disposed.

Thus, the electromagnetic coils, upper coils and lower coils, driven by each drive circuit 92a–92d include the electromagnetic coils used in the valves that perform identical operations and the electromagnetic coils of other valves whose open period does not overlap the open period of the aforementioned valves. Since the open periods of the valves of the group driven by each drive circuit do not overlap, switching elements for opening valves and maintaining the open state of the valves can be shared by the lower coils of each group of valves.

The closed periods of the valves of each group overlap each other. However, because the upper coils 116d are provided for maintaining the closed state of the valves without using electromagnetic force, there is no need to drive a switching element during the closed valve period. Therefore, the valve-closing electromagnetic coils need to be activated during the closing action of the valves. The closing action period of valves does not overlap the closing action period of other valves whose open period does not overlap the open period of the aforementioned valves. Therefore, the upper coils of each group of valves can share switching elements for closing the valves.

Furthermore, since combinations formed by the upper coil and the lower coil of a single valve connect between the five series circuits 234–242, 334–342, 434–443, and 534–542 are disposed in parallel in each drive circuit. More specifically, the series connecting portions between the switching elements of the series circuits, switching elements also can be shared by the upper coils and the lower coils.

As a result, the 16 valves can be opened and closed through the use of a total of 60 switching elements 200–228, 300–328, 400–428, and 500–528 provided in the drive circuits 92a–92d. The aforementioned conventional three-switching element in-series type construction needs 72 switching elements.

Thus, the drive circuits 92a–92d are able to supply current to and rapidly reduce, or discontinue, current through the electromagnetic coils that are currently needed among the upper coils and the lower coils of many valves, with appropriate timing, based on the switching actions of a small number of switching elements that are shared by the electromagnetic coils. In this manner, the drive circuits 92a–92d are able to control the quantities of current through the electromagnetic coils.

Therefore, it is possible to further reduce the number of switching elements employed, and to reduce the size and cost of the drive circuit portion 92 for the intake valves 12a–12h and the exhaust valves 16a–16h formed as electromagnetic valves.

The terminal portions of the electromagnetic coils 122a–125h are connected to the series connecting portions between the switching elements of the series circuits 234–242, 334–342, 434–443, and 534–542. The series circuits are formed by connecting three switching elements in series. Therefore, in the switching control on the switching elements 200–228, 300–328, 400–428, and 500–528, a mode of supplying reverse currents through the electromagnetic coils 122a–125h can be realized as indicated in FIGS. 8B, 8D, 9B and 9D.

In the drive circuits 92a–92d, the upper coils 122a 122h, and 123a–123h and the lower coils 124a–124h, and 125a–125h of the 16 valves are connected via the 40 electrically conductive wires 244–262, 344–362, 444–462, and 544–562 for the above-described control, as shown in FIGS. 5, 12, 14 and 15. In contrast, the aforementioned conventional three-switching element in-series type construction use 48 wires. Therefore, an embodiment of the present invention also allows a reduction in the thickness of a wire harness disposed in a vehicle, and, therefore, contributes to reductions in size and weight.

Another embodiment of the present invention differs from previous embodiments by using a drive circuit 692a, instead of the drive circuit 92a. The drive circuit 692a is a 3-switching element in-series type drive circuit.

The relationship of the drive circuit 692a with other drive circuits 692b, 692c, and 692d corresponds to the relationship of the drive circuit 92a with the other drive circuits 92b, 92c, and 92d. Because the other drive circuits 692b, 692c, and 692d are similar to the drive circuit 692a, the drive circuit 692a will be described below as a representative of the other drive circuits. Other configurations of the present embodiments are substantially similar as those described above, unless otherwise noted.

The drive circuit 692a is formed by 14 switching elements 600, 602, 604, 606, 608, 610, 612, 614, 616, 618, 620, 622, 624, and 626, and a diode 628. Five series circuits 634, 636, 638, 640, and 642 are connected in parallel between a high potential side terminal 630 and a low potential side terminal 632. Each of the five series circuits is formed by connecting in series three elements selected from the switching elements 600–626 and the diode 628. Of the five series circuits 634–642, the series circuit 638 is formed by connecting in series the switching element 612, the diode 628, and the switching element 614. The diode 628 is disposed in such a direction as to allow current to flow from the low potential side terminal 632 to the high potential side terminal 630. The other four series circuits 634, 636, 640, and 642 are formed by connecting three of the switching elements 600–610 and 616–626 in series.

The drive circuit 692a differs from the drive circuit 92a in that the diode 628 is provided instead of a switching element. Other configurations of the drive circuit 692a are substantially similar as those of the drive circuit 92a. An upper coil 722a of a first intake valve and an upper coil 722b of a second intake valve of a cylinder, an upper coil 722g of a first intake valve and an upper coil 722h of a second intake valve of fourth cylinder, a lower coil 724a of the first intake valve and a lower coil 724b of the second intake valve of first cylinder, and a lower coil 724g of the first intake valve and a lower coil 724h of the second intake valve of the fourth cylinder are connected via ten electrically conductive wires 644, 646, 648, 650, 652, 654, 656, 658, 660, and 662.

The fourteen switching elements 600–626 are the same as the above-described switching elements of FIGS. 1–15 in that ON signals and OFF signals from a processor are inputted to the gate terminals G via an output port 672 and a buffer circuit 690.

The opening and closing operations of the two intake valves of the first cylinder and the two intake valves of the fourth cylinder are performed when control currents are supplied from the ECU. A timing chart shown in FIG. 22 indicates the operations of the two intake valves of the first cylinder and the two intake valves of the fourth cylinder.

Figure 17:
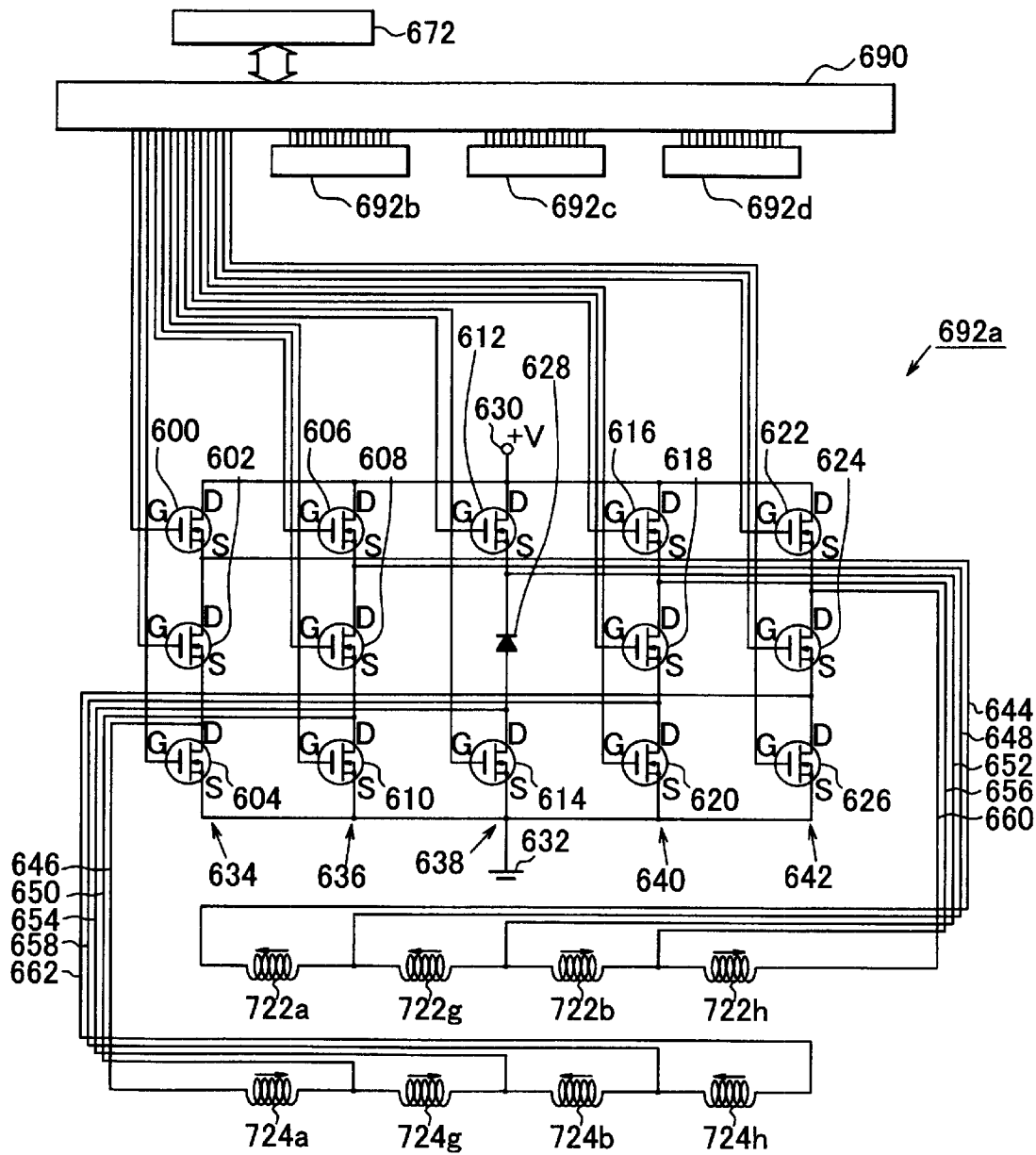
FIG. 17 is a diagram illustrating a construction of a drive circuit according to another embodiment of the present invention.
Figure 18:
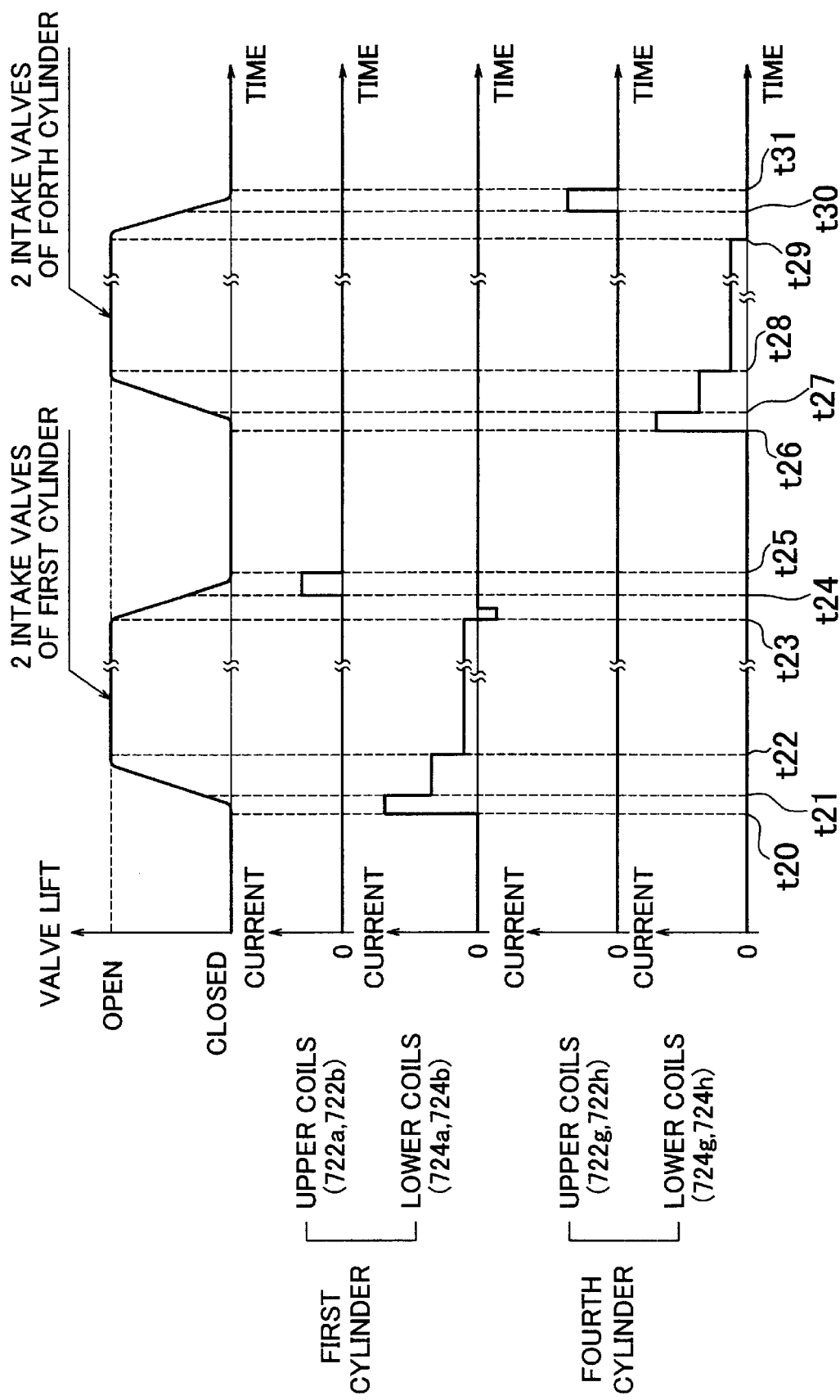
FIG. 18 is a timing chart indicating the operations of intake valves and the current control according to the embodiment of FIG. 17.

FIGS. 19A to 19F and FIGS. 20A to 20F are circuit diagrams indicating states of control performed on the drive circuit 692a shown in FIG. 17 so as to realize the operations indicated in FIG. 18. In FIGS. 19A to 19F and 20A to 20F, the conductive wires 644–662 are omitted. Furthermore, in FIGS. 19A to 19F and 20A to 20F, broken line. arrows and circles "□" indicate the same states as described with regard to FIGS. 1–16.

It is assumed that before a time point t20 indicated in FIG. 18, the armatures 110 are brought into contact with the upper cores 116 as depicted in FIG. 10 by temporary excitation of the upper coils 722a, 722b, 722g, and 722h. This contact state is maintained by the magnetic attraction force of the upper magnets 116d. Therefore, the valve bodies 100 are in contact with the valve seats 126. The intake valves of the first cylinder and the intake valves of the fourth cylinder are in a completely closed state. The OFF signals are outputted to all the fourteen switching elements 600–626.

Figure 19A:
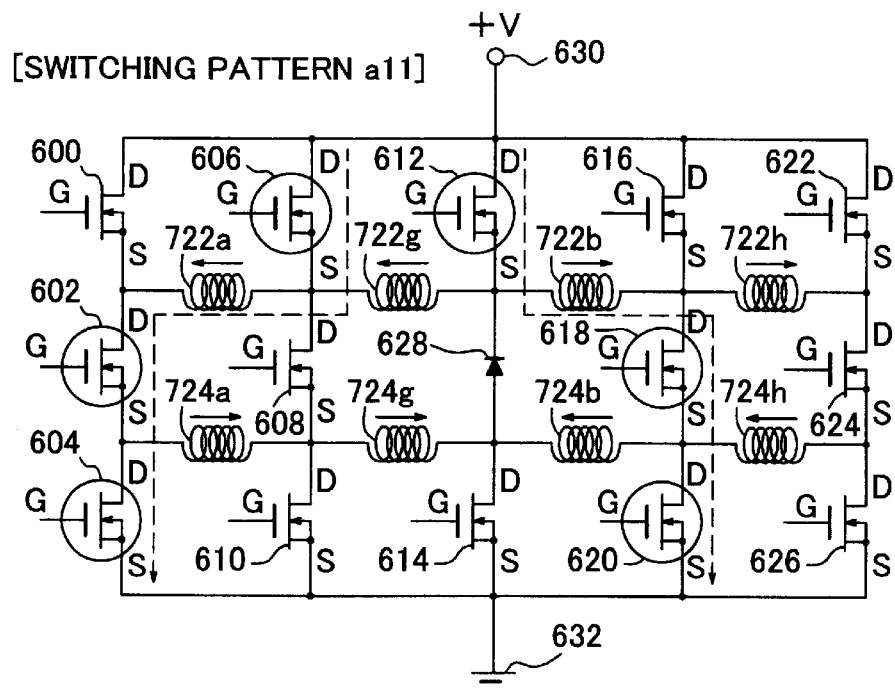
FIGS. 19A–19F are circuit diagrams for illustrating the control of current according to the embodiment of FIG. 17.
Figure 19B:
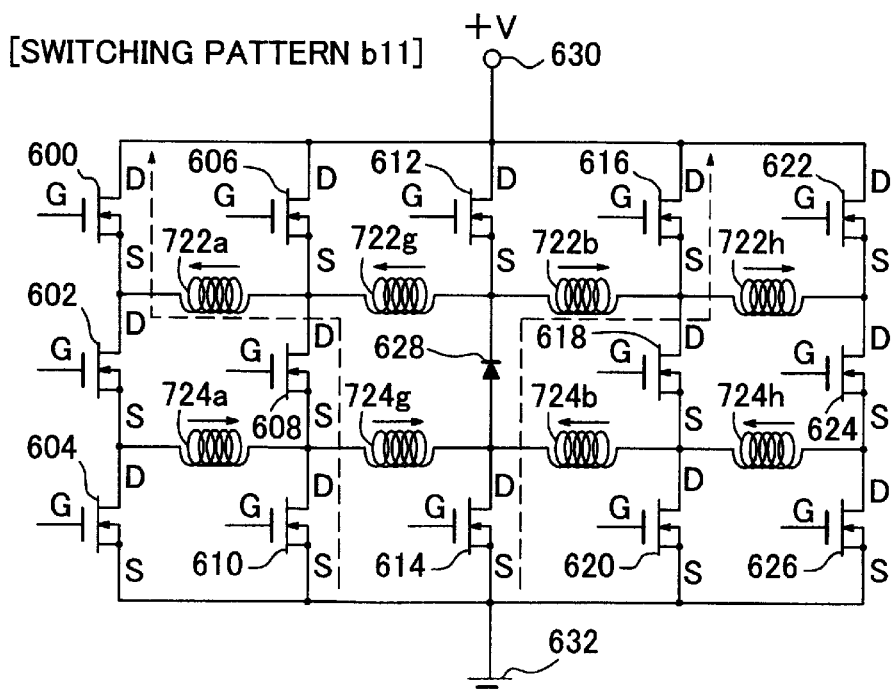
Figure 19C:
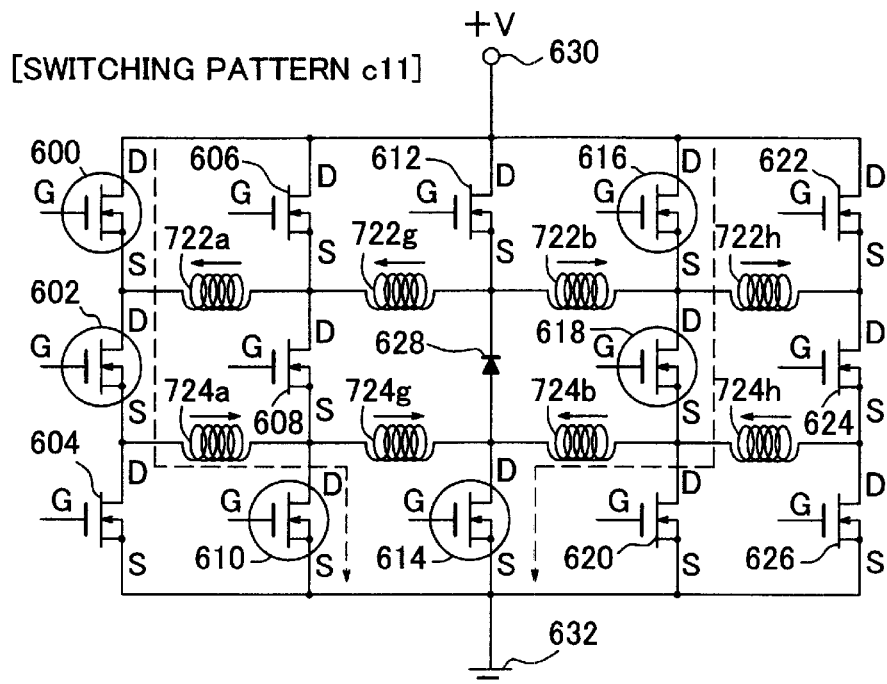

At the time of the intake stroke of the first cylinder, the processor outputs the ON signals to the switching elements 600, 602, 610, 614, 616, and 618 and outputs the OFF signals to the other switching elements at the time point t20. This establishes a switching pattern c11 indicated in FIG. 19C. As a result, currents flow from the high potential side terminal 630 to the low potential side terminal 632 as indicated by broken line arrows in FIG. 19C, so that currents flow through the lower coils 724a, and 724b of the intake valves of the first cylinder in a forward direction. Then, the switching pattern c11 and a switching pattern f11 indicated in FIG. 19F are alternated until a time point t21.

In the switching pattern f11, the processor outputs the ON signals to the switching elements 610, and 614, and outputs the OFF signals to the other switching elements. Therefore, a current circulation path is formed through which current flows in a sequence of the lower coil 724a and the switching elements 610 and 604. A current circulation path is formed through which current flows in a sequence of the lower coil 724b and the switching elements 614 and 620. Immediately after the switching pattern c11 is changed to the switching pattern f11, flywheel currents flow through these circulation paths as indicated by broken line arrows in FIG. 19F. Therefore, by adjusting the proportion of the switching pattern c11 to a sufficient value, it is possible to achieve an adjustment current flow through the lower coils 724a, and 724b in the forward direction.

In this manner, the lower coils 724a, and 724b are supplied with currents that are sufficient to separate the upper cores 116 from the armatures 110 magnetically attached to the upper cores 116 due to the magnetic force produced by the upper magnets 116d, referred to as separating current. Therefore, strong magnetic forces are produced from the lower cores 118, so that the armatures 110 separate from the upper cores 116, and move toward the lower cores 118.

Figure 19D:
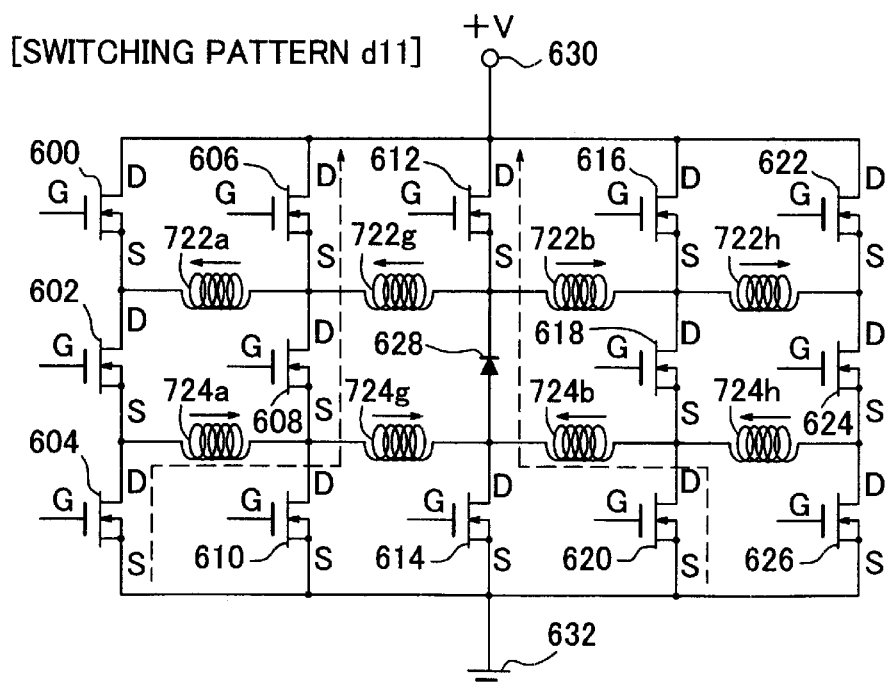

At the time point t21, the processor temporarily sets a switching pattern d11 indicated in FIG. 19D. In the switching pattern d11, the processor outputs the OFF signals to all the switching elements 600–626. Therefore, regenerative currents reversing from the low potential side terminal 632 and the high potential side terminal 630 occur as indicated by broken line arrows in FIG. 19D. The separating currents flowing through the lower coils 724a, and 724b rapidly decrease. Then, the processor immediately resumes a state where the switching pattern c11 and the switching pattern f11 are alternated. However, the proportion of the switching pattern c11 is reduced in comparison with the pattern alternating state during the time period t20–t21. In this manner, the quantity of current flowing through the lower coils 724a, and 724b is kept at a normal level of the drawing current.

At this moment, the armatures 110 are sufficiently apart from the upper cores 116. Therefore, the armatures 110 are not returned to the upper cores 116 by the magnetic forces from the upper magnets 116d while the currents flow through the lower coils 724a, and 724b that are set to the normal level of the drawing current. After that, due to the drawing currents and the forces from the upper springs 120, the armatures 110 rapidly move away from the upper cores 116, and approach the lower cores 118, and finally contact the lower cores 118 by overcoming the forces from the lower springs 106.

At a time point t22 after the armatures 110 come into contact with the lower cores 118, the processor temporarily sets the switching pattern d11 indicated in FIG. 19D. Therefore, regenerative currents occur, so that the currents flowing through the lower coils 724a, and 724b rapidly decrease. Then, the processor immediately resumes a state where the switching pattern c11 and the switching pattern f11 are alternated. In this case, however, the proportion of the switching pattern c11 is reduced, in comparison with the pattern alternating state during the time period t21–t22. In this manner, the quantity of current flowing through the lower coils 724a, and 724b is reduced to a holding current. The contact between the armatures 110 and the lower cores 118 is maintained. Thus, the input ports of the first cylinder are set fully open.

Subsequently, at a time point t23 near or at a timing at which the intake stroke of the first cylinder comes to an end, the switching pattern is changed to the switching pattern d11. Therefore, regenerative currents occur, so that the currents flowing through the lower coils 724a, 724b rapidly discontinue.

After the armatures 110 lose the attraction force to the lower cores 118 as described above, the armatures 110 start to move toward the upper cores 116, or toward the completely closed state, due to the forces from the lower springs 106. Therefore, the valve bodies 100 approach the valve seats 126, and the amount of valve lift starts to decrease.

Subsequently at a time point t24, the processor changes the switching pattern to a switching pattern a11 indicated in FIG. 19A, in order to draw the armatures 110 into contact with the upper cores 116. As a result, the drawing currents flow through the upper coils 722a, and 722b. After that, a drawing current is maintained by alternating the switching pattern a11 and a switching pattern e11 indicated in FIG. 19E, until the armatures 110 contact the upper cores 116.

In the switching pattern a11, the processor outputs the ON signals to the switching elements 602, 604, 606, 612, 618, and 620, and outputs. the OFF signals to the other switching elements. As a result, currents flow from the high potential side terminal 630 to the low potential side terminal 632 as indicated by broken line allows in FIG. 19A. The currents flow through the upper coils 722a, and 722b of in the intake valves of the first cylinder in the forward direction.

In the switching pattern e11, the processor outputs the ON signals to the switching elements 606, and 612, and outputs the OFF signals to the other switching elements. Therefore, a current circulation path is formed through which current flows in a sequence of the upper coil 722a and the switching. elements 600 and 606. A current circulation path is formed through which current flows in a sequence of the upper coil 722b and the switching elements 616 and 612. Immediately after the switching pattern a11 is changed to the switching pattern e11, flywheel currents flow through these circulation paths as indicated by broken line arrows in FIG. 19E. Therefore, by adjusting the proportion between the switching pattern a11 and the switching pattern e11, the quantity of current flowing through the upper coils 722a, and 722b in the forward direction can be adjusted.

At a time point t25 after the armatures 110 come into contact with the upper cores 116, the switching pattern is changed to a switching pattern b11 indicated in FIG. 19B. In the switching pattern b11, the CPU outputs the OFF signals to all the switching elements 600–626. Therefore, regenerative currents occur as indicated by broken line arrows in FIG. 19B, so that the drawing currents flowing through the upper coils 722a, and 722b rapidly discontinue.

Even after the drawing currents discontinue, the contact between the armatures 110 and the upper cores 116 is maintained by the magnetic attraction force from the upper magnets 116d. In this manner, the intake ports of the first cylinder are set to the completely closed state.

Figure 20A:
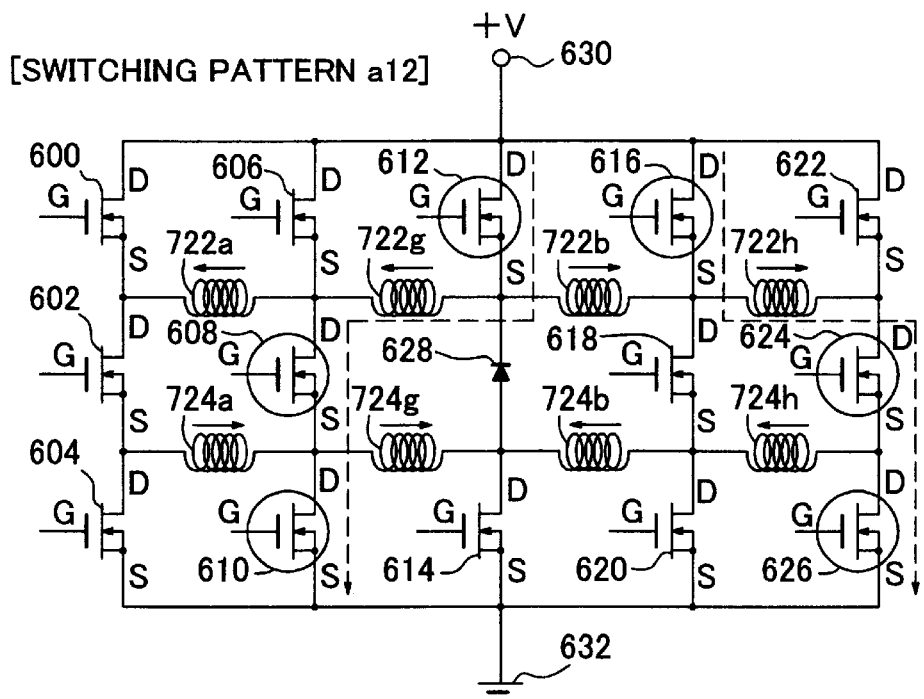
FIGS. 20A–20F are circuit diagrams for illustrating the control of current according to the embodiment of FIG. 17.
Figure 20B:
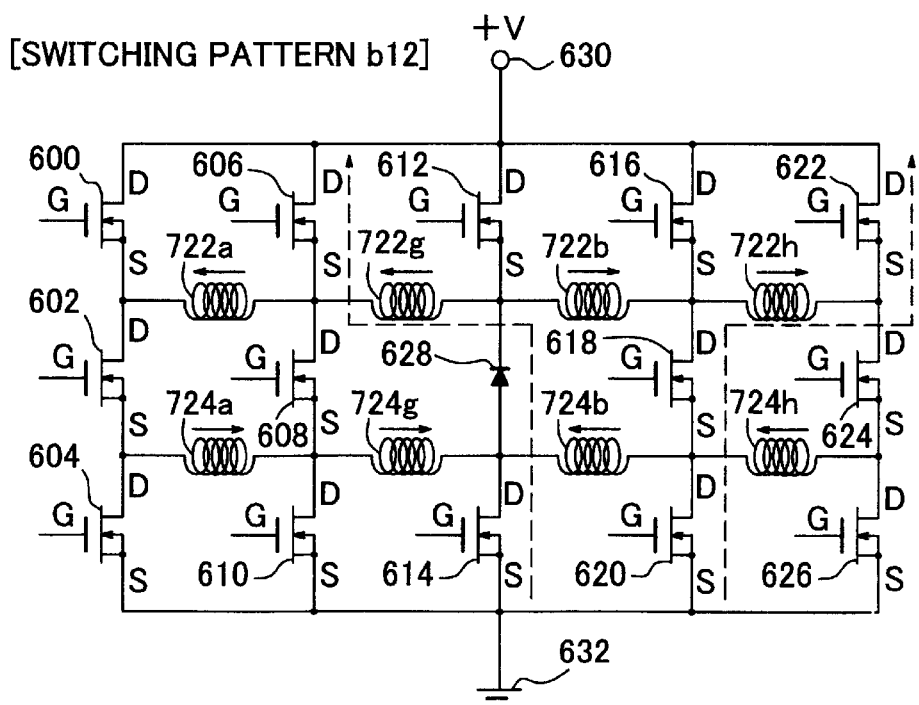
Figure 20C:
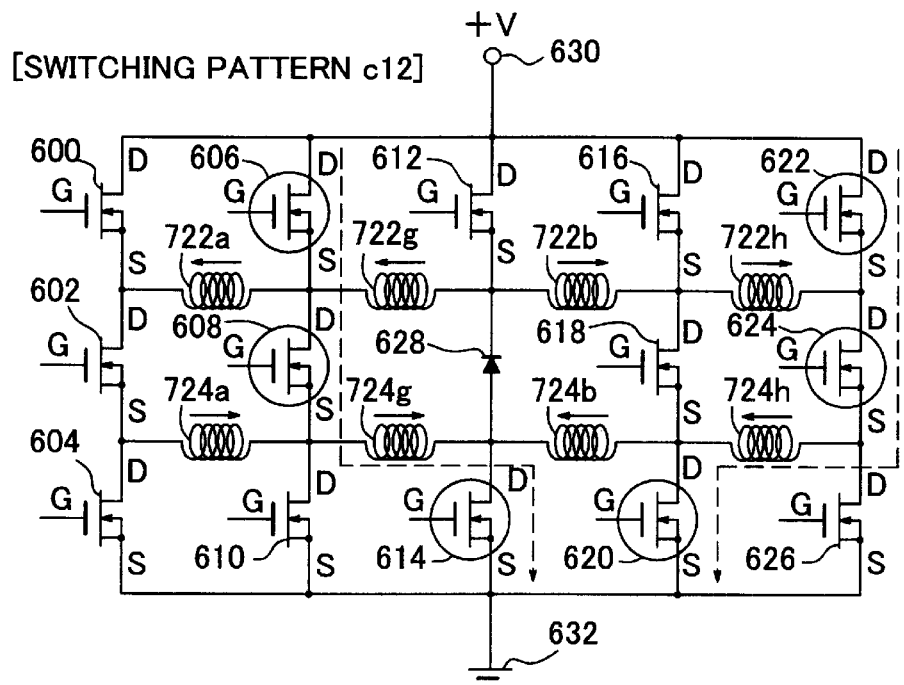

After the state where the OFF signals are outputted to all the switching elements 600–626, a timing comes at which the intake stroke of the fourth cylinder occurs and does not overlap the intake stroke of the first cylinder. In this instance, starting at a time point t26, the processor outputs the ON signals to the switching elements 606, 608, 614, 620, 622, and 624, and outputs the OFF signals to the other switching elements to establish a switching pattern c12 indicated in FIG. 20C. Therefore, currents flow from the high potential side terminal 630 to the low potential side terminal 632 as indicated by broken line arrows in FIG. 20C. Currents flow through the lower coils 724a, and 724b of the intake valves of the fourth cylinder in the forward direction. Then, the switching pattern c12 and a switching pattern f12 indicated in FIG. 20F are alternated until a time point t27.

In the switching pattern f12, the processor outputs the ON signals to the switching elements 614, and 620, and outputs the OFF signals to the other switching elements. Therefore, a current circulation path is formed through which current flows in a sequence of the lower coil 724g and the switching elements 614 and 610. A current circulation path is formed through which current flows in a sequence of the lower coil 724h and the switching elements 620 and 626. Immediately after the switching pattern c12 is changed to the switching pattern f12, flywheel currents flow through these circulation paths as indicated by broken line arrows in FIG. 20F. Therefore, by adjusting the proportion of the switching pattern c12 to a sufficient value, it is possible to achieve an adjustment for current flow through the lower coils 724g, and 724h in the forward direction.

In this manner, the lower coils 724g, and 724h are supplied with the separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Figure 20D:
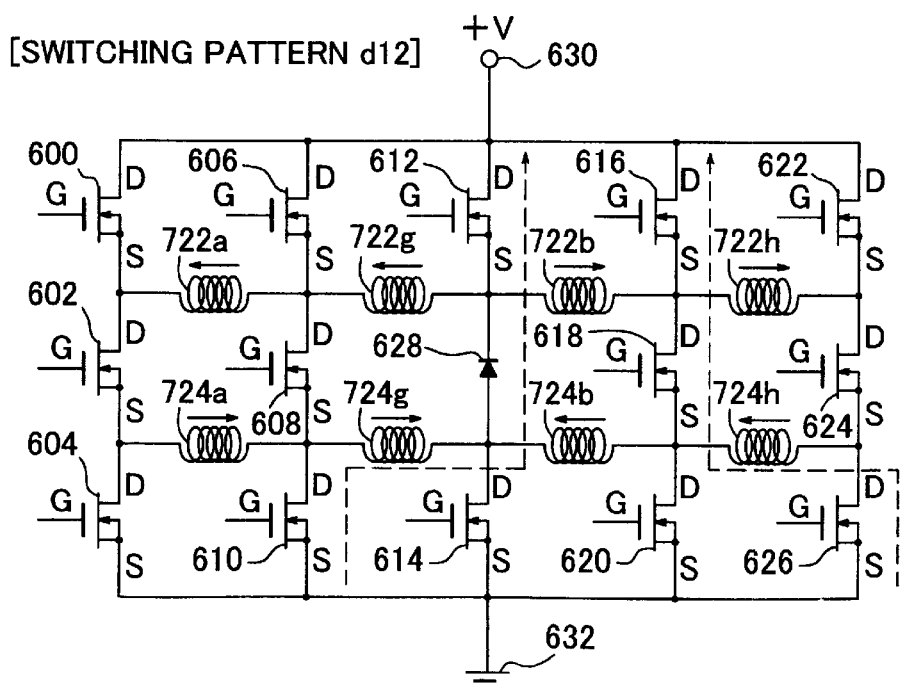

At the time point t27, the processor temporarily sets a switching pattern d12 indicated in FIG. 20D. In the switching pattern d12, the processor outputs the OFF signals to all the switching elements 600–626. Therefore, regenerative currents occur as indicated by broken line arrows in FIG. 20D. The separating currents through the lower coils 724g, 724*h* rapidly decrease. Then, the processor immediately resumes a state where the switching pattern c12 and the switching pattern f12 are alternated. In this case, however, the proportion of the switching pattern c12 is reduced, in comparison with the pattern alternating state during the time period t26–t27. In this manner, the quantity of current flowing through the lower coils 724*g*, 724*h* is kept at a normal level of the drawing current.

At this moment, the armatures 110 are sufficiently apart from the upper cores 116. Therefore, the armatures 110 are not returned to the upper cores 116 by the magnetic forces from the upper magnets 116*d* while the currents through the lower coils 724*g*, and 724*h* are set to the normal level of the drawing current. After that, due to the drawing currents and the forces from the upper springs 120, the armatures 110 rapidly move away from. the upper cores 116, approach the lower cores 118, and contact the lower cores 118, by overcoming the forces from the lower springs 106.

At a time point t28 after the armatures 110 come into contact with the lower cores 118, the processor temporarily sets the switching pattern d12. Therefore, regenerative currents occur. The drawing currents through the lower coils 724*g*, and 724*h* rapidly decrease. Then, the processor immediately resumes a state where the switching pattern c12 and the switching pattern f12 are alternated. In this case, however, the proportion of the switching pattern c12 is reduced in comparison with the pattern alternating state during the time period t27–t28. In this manner, the quantity of current flowing through the lower coils 724*g*, and 724*h* is reduced to the holding current. The contact between the armatures 110 and the lower cores 118 is maintained. Thus, the input ports of the fourth cylinder are set to the fully open state.

Subsequently, at a time point t29 near or at a timing at which the intake stroke of the fourth cylinder comes to an end, the switching pattern is changed to the switching pattern d12 indicated in FIG. 20D. Therefore, regenerative currents occur, so that the holding currents flowing through the lower coils 724*g*, and 724*h* rapidly discontinue.

After the armatures 110 lose the attraction force to the lower cores 118 as described above, the armatures 110 start to move toward the upper cores 116, or toward the completely closed state, due to the forces from the lower springs 106. Therefore, the valve bodies 100 approach the valve seats 126, the amount of valve lift starts to decrease.

Subsequently at a time point t30, the processor changes the switching pattern to a switching pattern a12 indicated in FIG. 20A, in order to draw the armatures 110 into contact with the upper cores 116. As a result, the drawing currents flow through the upper coils 722*g*, and 722*h*. After that, a drawing current is maintained by alternating the switching pattern a12 and a switching pattern e12 indicated in FIG. 20E, until the armatures 110 contact the upper cores 116.

In the switching pattern a12, the processor outputs the ON signals only to the switching elements 608, 610, 612, 616, 624, and 626, and outputs the OFF signals to the other switching elements. As a result, currents flow from the high potential side terminal 630 to the low potential side terminal 632 as indicated by broken line allows in FIG. 20A. Currents flow through the upper coils 722*g*, 722*h* of the intake valves of the fourth cylinder in the forward direction.

In the switching pattern e12, the processor outputs the ON signals to the switching elements 612, and 616, and outputs the OFF signals to the other switching elements. Therefore, a current circulation path is formed through which current flows in a sequence of the upper coil 722*g* and the switching elements 606 and 612. A current circulation path is formed through which current flows in a sequence of the upper coil 722*h* and the switching elements 622 and 616. Immediately after the switching pattern a12 is changed to the switching pattern e12, flywheel currents flow through these circulation paths as indicated by broken line arrows in FIG. 20E. Therefore, by adjusting the proportion between the switching pattern a12 and the switching pattern e12, the quantity of current flowing through the upper coils 722*g*, and 722*h* in the forward direction can be adjusted.

At a time point t31 after the armatures 110 come into contact with the upper cores 116, the switching pattern is changed to a switching pattern b12 indicated in FIG. 20B. In the switching pattern b12, the processor outputs the OFF signals to all the switching elements 600–626. Therefore, regenerative currents occur as indicated by broken line arrows in FIG. 20B. The drawing currents flowing through the upper coils 722*g*, and 722*h* rapidly discontinue.

Even after the drawing currents discontinue, the contact between the armatures 110 and the upper cores 116 is maintained by the magnetic attraction force from the upper magnets 116*d*. In this manner, the intake ports of the fourth cylinder are set to the completely closed state.

Thus, the four intake valves of first cylinder and the fourth cylinder are driven in the opening and closing directions by the drive circuit 692*a*, which includes the 14 switching elements 600–626 and the diode 628.

Figure 19E:
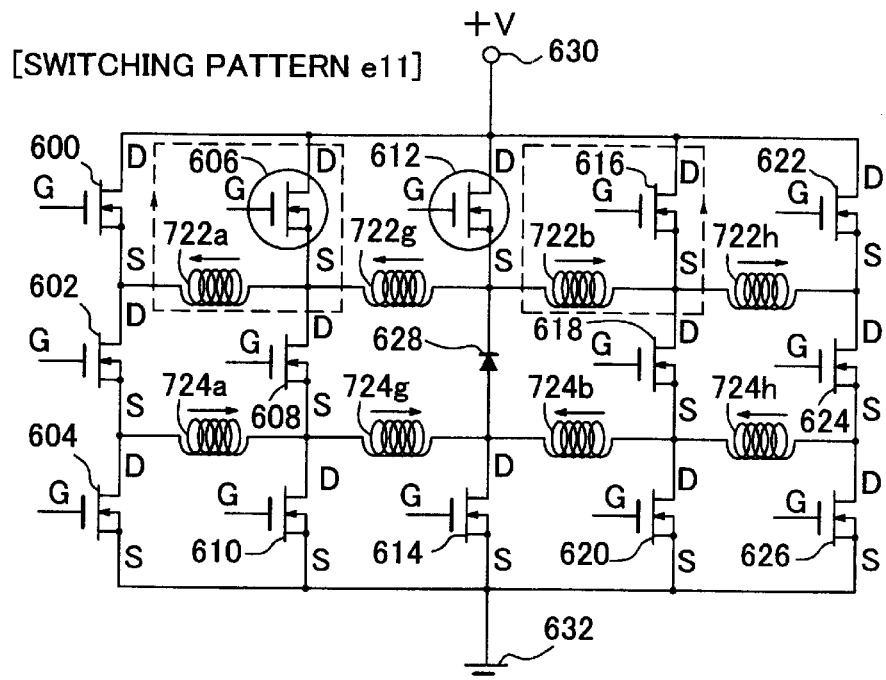
Figure 19F:
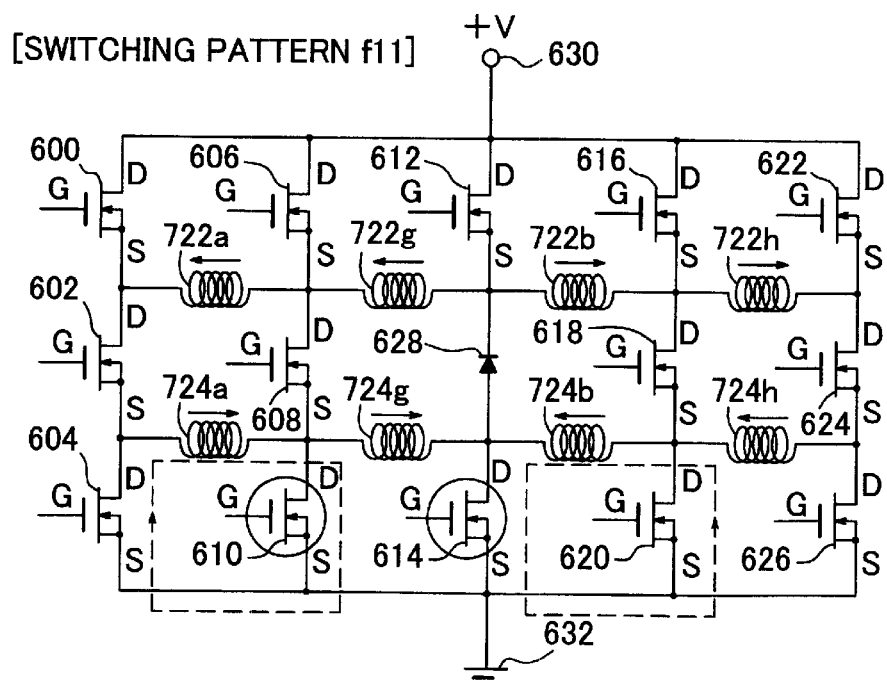

From the foregoing description, it should be understood that the switching elements 600–620. and the diode 628 used to conduct current to drive the upper coils 722*a*, 722*b* as indicated in FIGS. 19A, 19B and 19E are the same as the switching elements 600–620 and the diode 628 used to conduct current to drive the lower coils 724*a*, and 724*b* as indicated in FIGS. 19C, 19D and 19F. Thus, these elements are shared by the upper coils 722*a*, and 722*b* and the lower coils 724*a*, and 724*b*.

Figure 20E:
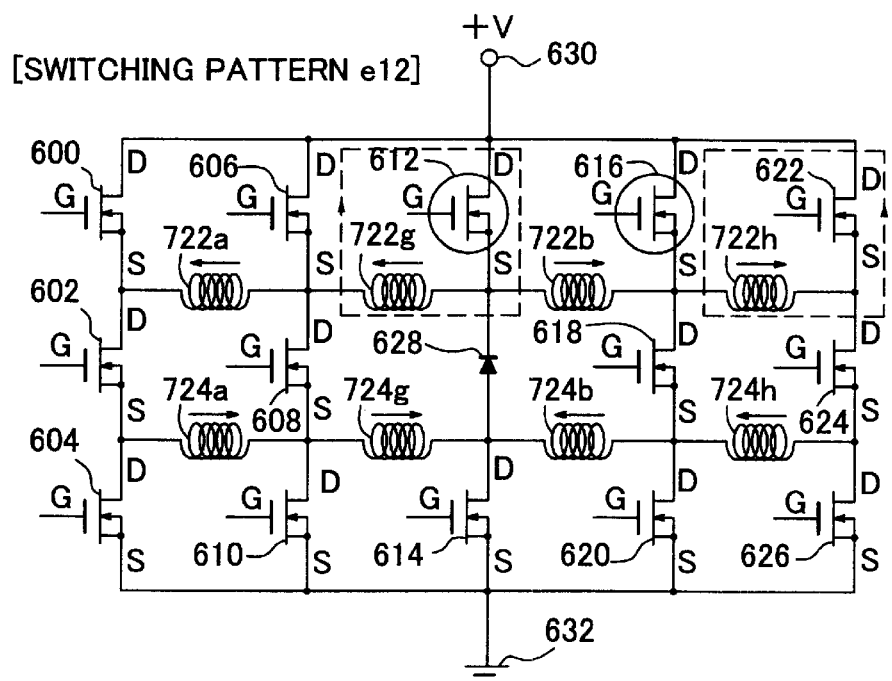
Figure 20F:
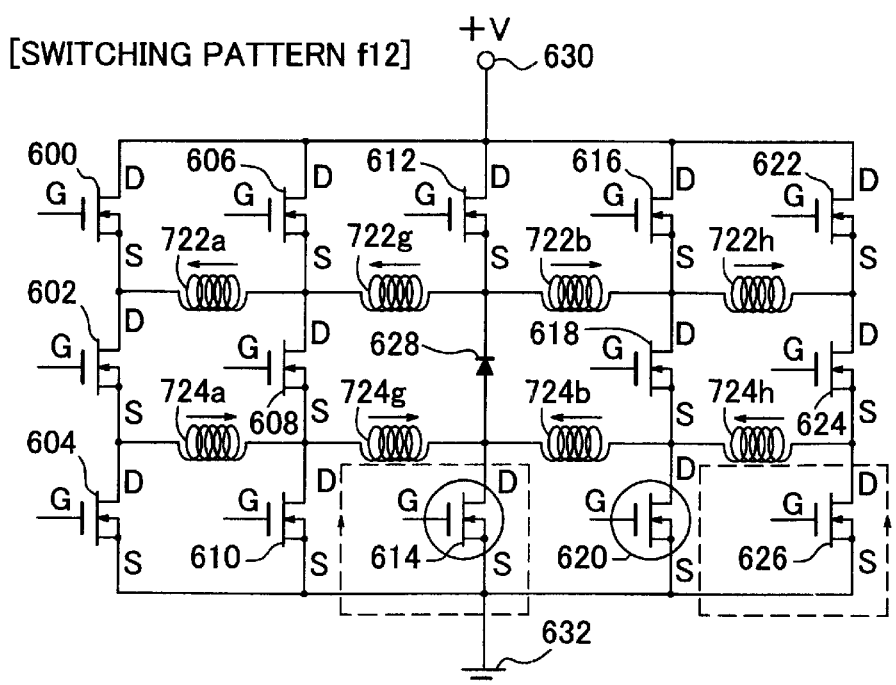

Furthermore, it should be understood that the switching elements 606–626 and the diode 628 used to conduct current to drive the upper coils 722*g*, and 722*h* as indicated in FIGS. 20A, 20B and 20E are the same as the switching elements 606–626 and the diode 628 caused to conduct current to drive the lower coils 724*g*, and 724*h* as indicated in FIGS. 20C, 20D and 20F. These elements are shared by the upper coils 722*g*, and 722*h* and the lower coils 724*g*, and 724*h*.

Still further, through comparison between the switching elements 600–620 and the diode 628 used to conduct current to drive the upper coils 722*a*, and 722*b* and the lower coils 724*a*, and 724*b* of the two intake valves of the first cylinder as indicated in FIGS. 19A to 19F and the switching elements 606–626 and the diode 628 used to conduct current to drive the upper coils 722*g*, and 722*h* and the lower coils 724*g*, and 724*h* of the two intake valves of the fourth cylinder as indicated in FIGS. 20A to 20F. It should be understood that the switching elements 606–620 and the diode 628 are shared.

A configuration substantially similar to the drive circuit 692*a* is adopted to form a drive circuit 692*b* for driving a total of 4 exhaust valves of the first cylinder and the fourth cylinder, a drive circuit 692*c* for driving a total of 4 intake valves of the second cylinder and the third cylinder, and a drive circuit 692*d* for driving a total of 4 exhaust valves of the second cylinder and the third cylinder. In these three drive circuits 692*b*, 692*c*, and 692*d*, the switching elements and the diode are shared as described above in conjunction with the drive circuit 692*a*. Control is performed in substantially the same pattern as indicated in FIG. 18 to open and close the intake and exhaust valves.

Therefore, the drive circuit portion, equipped with the four drive circuits 692a–692d, is able to drive a total of 16 valves of the four cylinders, similar to FIG. 16.

By employing the fourteen switching elements 600–626 and the diode 628, embodiments of the present invention are able to drive the intake and exhaust valves. Thus, the present embodiments reduce the number of switching elements by one the previously described embodiments, and allow the use of a less expensive diode 628.

Therefore, the present embodiment reduces the number of switching elements employed, and allows further reductions in size and cost of the drive circuit portion for the intake and exhaust valves formed as electromagnetic valves.

The number of electrically conductive wires is reduced, so that the thickness of a wire harness disposed in a vehicle can be reduced. This contributes to size and weight reductions of the vehicle.

Figure 21:
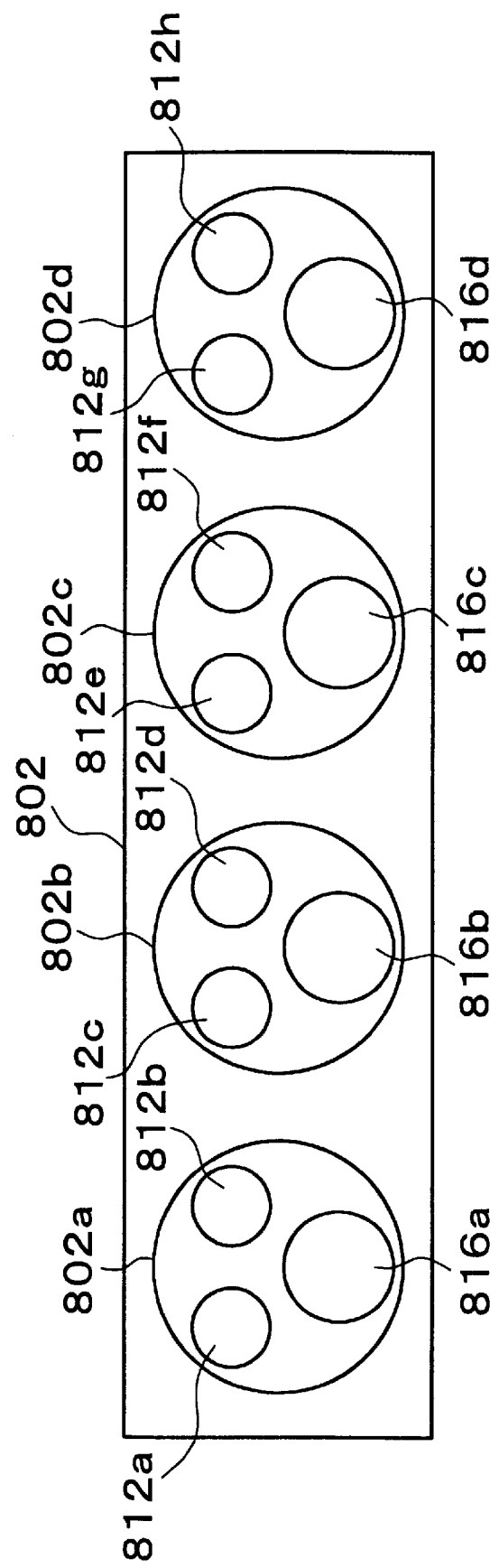
FIG. 21 is a diagram illustrating a valve arrangement according to another embodiment of the present invention.

The embodiments of the present invention of FIG. 21 differs from previously described embodiments in that an engine 802 is a four-cylinder three-valve engine in which the four cylinders 802a, 802b, 802c, and 802d each have two intake valves 812a, 812b, 812c, 812d, 812e, 812f, 812g, and 812h, and one exhaust valve 816a, 816b, 816c, 816d.

Figure 22:
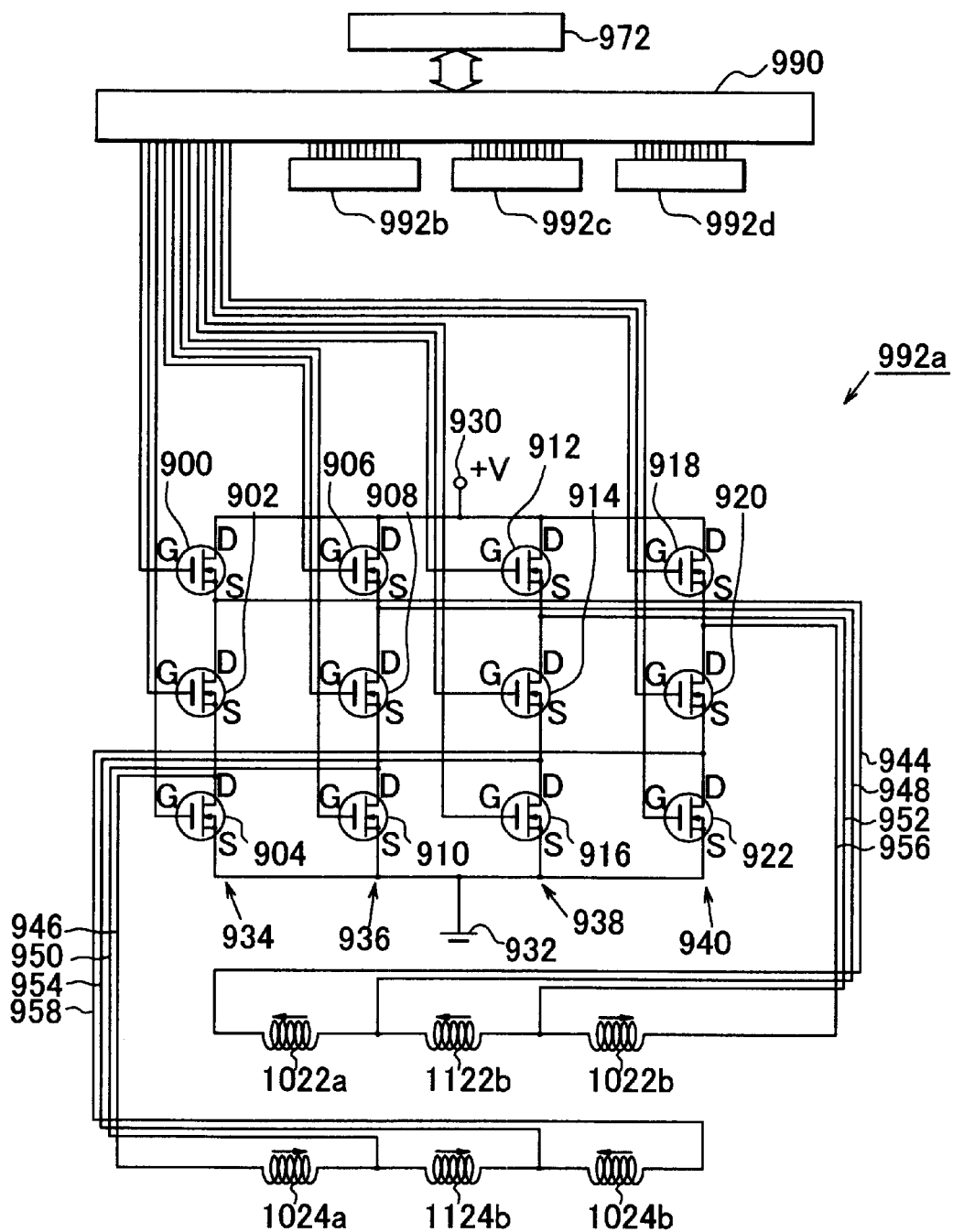
FIG. 22 is a diagram illustrating a construction of a drive circuit according to the embodiment of FIG. 21.

Furthermore, corresponding to the different number of valves. The configuration of drive circuits 992a, 992b, 992c, 992d are driven and controlled by a processor via an output port 972 and a buffer circuit 990 as indicated in FIG. 22, and the combinations of object valves to be driven, as described below. The drive circuits 992a, 992b, 992c, and 992d are three-switching element in-series type drive circuits.

The drive circuits 992b, 992c, and 992d have the same configuration as the drive circuit 992a. Therefore, the drive circuit 992a will be described as a representative of the other drive circuits. Other configurations are substantially similar as those described previously unless otherwise noted.

The drive circuit 992a is formed by twelve switching elements 900, 902, 904, 906, 908, 910, 912, 914, 916, 918, 920, and 922. The switching elements 900–922 form four series circuits 934, 936, 938, and 940. Each switch element includes three of the switching elements connected in series. The series circuits 934–940 are connected in parallel between a high potential side terminal 930 and a low potential side terminal 932.

In the series circuit 934 formed by three switching elements 900, 902, and 904, a series connecting portion between the switching elements 900, and 902 is connected with an end of an electrically conductive wire 944. Similarly, a series connecting portion between the switching elements 902, and 904 is connected with an end of an electrically conductive wire 946. In the series circuit 936 formed by three switching elements 906, 908, and 910, a series connecting portion between the switching elements 906, and 908 is connected with an end of an electrically conductive wire 948. A series connecting portion between the switching elements 908, and 910 is connected with an end of an electrically conductive wire 950. In the series circuit 938 formed by three switching elements 912, 914, and 916, a series connecting portion between the switching elements 912, and 914 is connected with an end of an electrically conductive wire 952. A series connecting portion between the switching elements 914, and 916 is connected with an end of an electrically conductive wire 954. In the series circuit 940 formed by three switching elements 918, 920, and 922, a series connecting portion between the switching elements 918, and 920 is connected with an end of an electrically conductive wire 956, and a series connecting portion between the switching elements 920, 922 is connected with an end of an electrically conductive wire 958.

Of these wires, the conductive wire 944 is connected to an end of an upper coil 1022a incorporated in the first intake valve 812a of the first cylinder 802a. The conductive wire 948 is connected to the other end of the upper coil 1022a and to an end of an upper coil 1122b incorporated in the exhaust valve 816b of the second cylinder 802b. The conductive wire 952 is connected to the other end of the upper coil 1122b and to an end of an upper coil 1022b incorporated in the second intake valve 812b of the first cylinder 802a. The conductive wire 956 is connected to the other end of the upper coil 1022b.

The conductive wire 946 is connected to an end of a lower coil 1024a incorporated in the first intake valve 812a of the first cylinder 802a. The conductive wire 950 is connected to the other end of the lower coil 1024a and to an end of a lower coil 1124b incorporated in the exhaust valve 816b of the second cylinder 802b. The conductive wire 954 is connected to the other end of the lower coil 1124b and to an end of a lower coil 1024b incorporated in the second intake valve 812b of the first cylinder 802a. The conductive wire 958 is connected to the other end of the lower coil 1024b.

Thus, the connections between the series circuit 934 and the series circuit 936 and the connections between the series circuit 938 and the series circuit 940 are accomplished by the electromagnetic coils 1022a, 1022b, 1024a, and 1024b, provided in the two intake valves 812a, and 812b, which perform identical operations on the first cylinder 802a. Furthermore, the connections between the series circuit 936 and the series circuit 938 are accomplished only by the electromagnetic coils 1122b, and 1124b provided in the exhaust valve 816b of the second cylinder 802b. Thus, in the drive circuit 992a, the inter-series circuit connections are accomplished by the electromagnetic coils 1022a, 1022b, 1024a, and 1024b of the two intake valves 812a, and 812b of the first cylinder 802a. The inter-series circuit connections accomplished only by the electromagnetic coils 1122b, and 1124b of the exhaust valve 816b of the second cylinder 802b and are alternately arranged with the former inter-series circuit connections. In this manner, the drive circuit 992a is provided collectively for the group of valves consisting of the three valves 812a, 812b, and 816b.

Gate terminals G of the switching elements 900–922 input ON and OFF signals via a buffer circuit 990 provided in the drive circuit. A processor controls the output signals to the gate terminals G of the switching elements 900–922 via the output port 972 and the buffer circuit 990. Therefore, the state of activation of the electromagnetic coils 1022a, 1122b, 1022b, 1024a, 1124b, and 1024b is controlled so that a control of opening and closing the two intake valves 812a, and 812b of the first cylinder 802a and the exhaust valve 816b of the second cylinder 802b is performed.

As indicated in the valve timing chart of FIG. 6, the open valve period of the intake valves 812a, and 812b of the first cylinder 802a and the open valve period of the exhaust valve 816b of the second cylinder 802b do not overlap. Thus, the drive circuit 992a illustrated in FIG. 30 is provided collectively for the intake valves 812a, 812b of the first cylinder 802a and the exhaust valve 816b of the second cylinder 802b, whose open valve periods do not overlap.

The opening and closing operations of the intake valves 812a, and 812b of the first cylinder 802a and the exhaust valve 816b of the second cylinder 802b caused by supply of control currents from the ECU is described below. A timing chart depicted in FIG. 23 indicates the operations of the intake and exhaust valves 812a, 812b, and 816b.

FIGS. 24A to 24F and FIGS. 25A to 25F are circuit diagrams indicating states of control performed on the drive circuit 992a shown in FIG. 22 to realize the operations indicated in FIG. 23. In FIGS. 24A to 24F and 25A to 25F, the conductive wires 944–958 are omitted. Furthermore, in FIGS. 24A to 24F and 25A to 25F, broken line arrows and circles "□" the same state as described above in conjunction with previous embodiments.

Before a time point t40 indicated in FIG. 23, the armatures 110 are brought into contact with the upper cores 116 as depicted in FIG. 10 by temporary excitation of the upper coils 1022a, 1022b, and 1122b. This contact state is maintained by magnetic attraction force of the upper magnets 116d. Therefore, the valve bodies 100 are in contact with the valve seats 126. The intake valves 812a, and 812b of the first cylinder 802a and the exhaust valve 816b of the second cylinder 802b are in a completely closed state. The OFF signals are outputted to all the twelve switching elements 900–922.

Figure 24A:
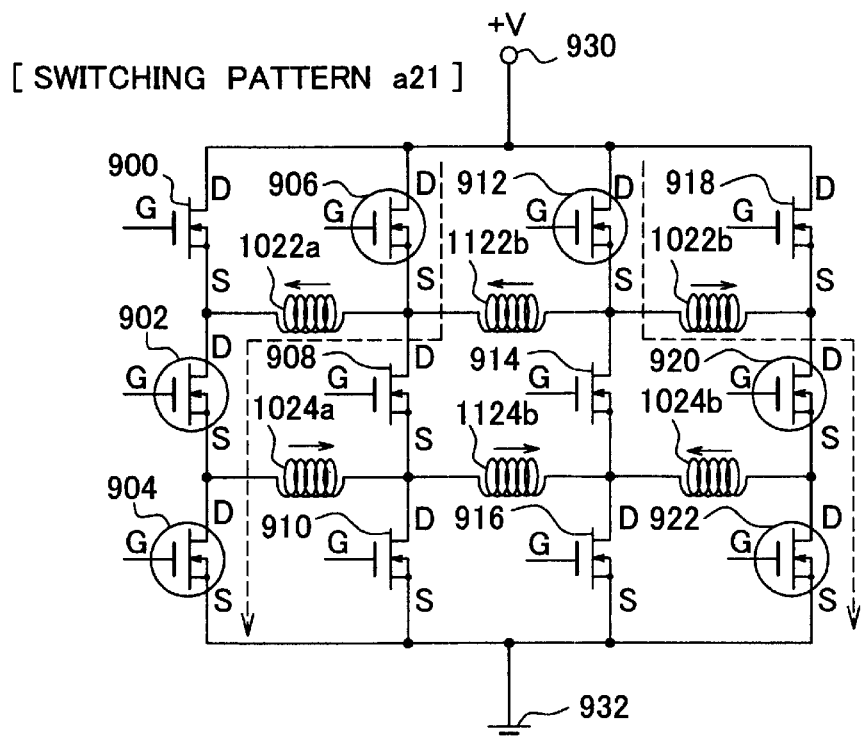
FIGS. 24A–24F are circuit diagrams for illustrating the control of current according to the embodiment of FIG. 21.
Figure 24B:
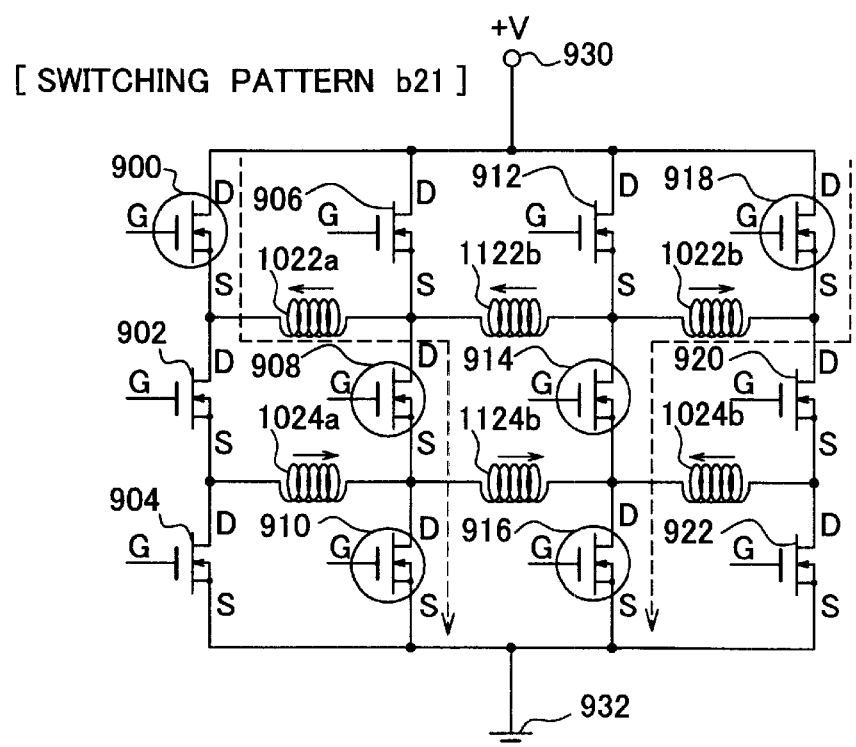

At the time of the intake stroke of the first cylinder 802a, the processor first selects a switching pattern b21 indicated in FIG. 24B during a time period t40–t41. In the switching pattern b21, the processor outputs the ON signals to the switching elements 900, 908, 910, 914, 916, and 918, and outputs the OFF signals to the other switching elements. As a result, currents flow from the high potential side terminal 930 to the low potential side terminal 932 as indicated by broken line arrows in FIG. 24B. Releasing currents for canceling out the magnetic fluxes from the upper magnets 116d flow through the upper coils 1022a, and 1022b.

Therefore, the magnetic attraction force on the armatures 110 created by the upper cores 116 discontinues. As a result, the armatures 110 start to move toward the lower cores 118, or toward a fully open state, due to the forces from the upper springs 120. Hence, the valve bodies 100 start to move apart from the valve seats 126, and the amount of valve lift starts to increase.

After that, at the time point t41, the processor outputs the ON signals to the switching elements 902, 904, 906, 912, 920, and 922, and outputs the OFF signals to the other switching elements to establish a switching pattern a21 indicated in FIG. 24A. Therefore, regenerative currents flow in a direction opposite to the direction indicated by broken line arrows in FIG. 24A. The releasing currents flowing through the upper coils 1022, and 1022b in a reverse direction rapidly discontinue. Then, the processor immediately outputs the OFF signals to all the switching elements 900–922 to maintain a state where no current flows through the upper coils 1022a, and 1022b.

At the time point t41 when the releasing currents through the upper coils 1022a, and 1022b discontinue, the armatures 110 are sufficiently apart from the upper cores 116. The armatures 110 are not returned to the upper cores 116 by the magnetic forces from the upper magnets 116d. After that, the armatures 110 are moved apart from the upper cores 116 toward the lower cores 118 by the forces from the upper springs 120.

Figure 24C:
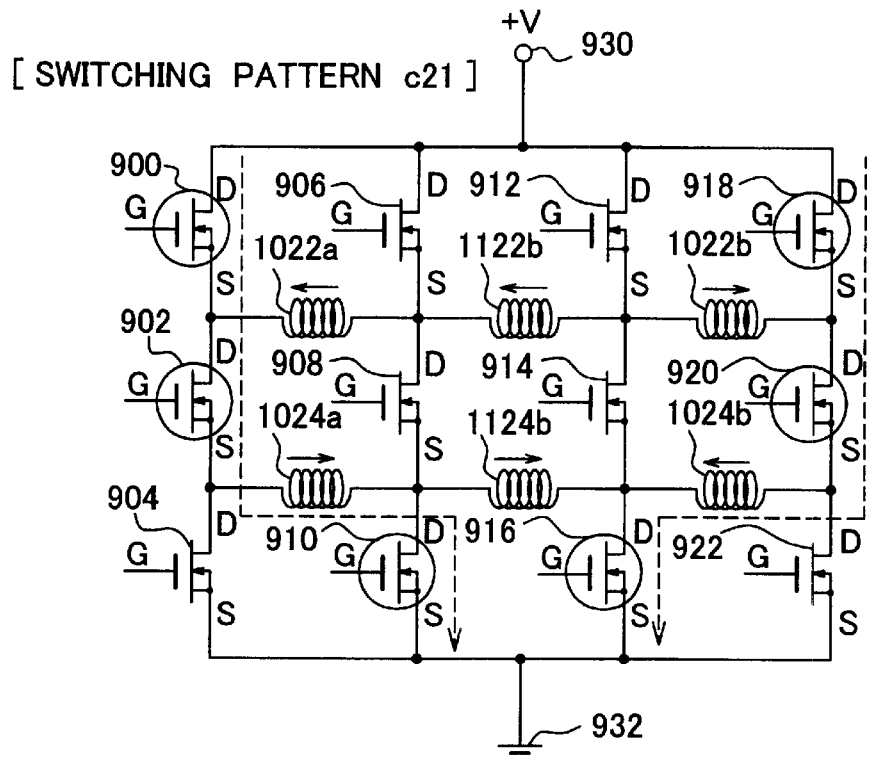

Subsequently at a time point t42, the processor changes the switching pattern to a switching pattern c21 indicated in FIG. 24C. In the switching pattern c21, the processor outputs the ON signals to the switching elements 900, 902, 910, 916, 918, and 920, and outputs the OFF signals to the other switching elements. Therefore, currents flow from the high potential side terminal 930 to the low potential side terminal 932 as indicated by broken line arrows in FIG. 24C. Forward-direction currents flow through the lower coils 1024a, and 1024b of the intake valves 812a, and 812b of the first cylinder 802a. Then, until a time point t43, the switching pattern c21 and a switching pattern f21 indicated in FIG. 24F are alternated to maintain the drawing currents for magnetically drawing the, armatures 110 to the lower cores 118. Therefore, when approaching the lower cores 118, the armatures 110 come into contact with the lower cores 118 by overcoming the forces from the lower springs 106.

In the switching pattern f21, the processor outputs the ON signals to the switching elements 910, and 916, and outputs the OFF signals to the other switching elements. Therefore, a current circulation path is formed through which current flows in a sequence of the lower coil 1024a and the switching elements 910 and 904. A current circulation path is formed through which current flows in a sequence of the lower coil 1024b and the switching elements 916 and 922. Immediately after the switching pattern c21 is changed to the switching pattern f21, flywheel currents flow through these circulation paths as indicated by broken line arrows in FIG. 24F. Therefore, by adjusting the proportion between the switching pattern c21 and the switching pattern f21, the quantity of current flowing through the lower coils 1024a, and 1024b in the forward direction can be adjusted.

Figure 24D:
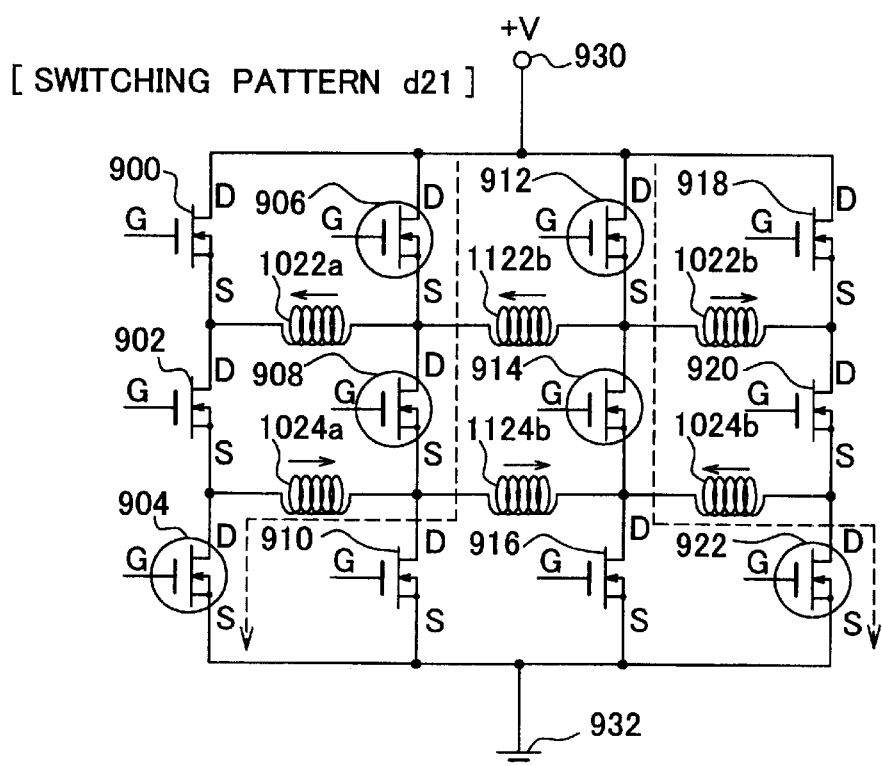

At the time point t43 after the armatures 110 come into contact with the lower cores 118, the switching pattern is temporarily changed to a switching pattern d21 indicated in FIG. 24D. In the switching pattern d21, the processor outputs the ON signals to the switching elements 904, 906, 908, 912, 914, and 922, and outputs the OFF signals to the other switching elements. Therefore, regenerative currents occur, so that the drawing currents flowing through the lower coils 1024a, and 1024b in the forward direction rapidly decrease. Immediately after, the state of alternating the switching pattern c21 and the switching pattern f21 is resumed. In this case, however, the proportion of the switching pattern c21 is reduced in comparison with the pattern alternating state during the time period t42–t43. In this manner, the quantity of current flowing through the lower coils 1024a, and 1024b in the forward direction is kept at a holding current.

While the armatures 110 are held in contact with the lower cores 118 by the magnetic force created by continuously supplying the holding currents through the lower coils 1024a, and 1024b, the valve bodies 100 are farthest from the valve seats 126 as indicated in FIG. 11. Thus, the intake ports of the first cylinder 802a remain in the fully open state.

Subsequently, at a time point t44 near or at a timing at which the intake stroke of the first cylinder 802a comes to an end, the switching pattern is changed to the switching pattern d21 indicated in FIG. 24D. Therefore, regenerative currents flow, so that the holding currents flowing through the lower coils 1024a, and 1024b rapidly discontinue. The releasing currents flow in the reverse direction. Subsequently at a time. point t45, the switching pattern is temporarily changed to the switching pattern c21. Therefore, regenerative currents flow in the direction opposite to the direction indicated by the broken line arrows in FIG. 24C, so that the releasing currents rapidly discontinue. Then, the processor immediately outputs the OFF signals to all the switching elements 900–922 to maintain the current discontinued state of the lower coils 1024a, and 1024b.

After the armatures 110 lose the attraction force to the lower cores 118, the armatures 110 start to move toward the upper cores 116, or toward the completely closed state, due to the forces from the lower springs 106. Therefore, the valve bodies 100 approach the valve seats 126 the amount of valve lift starts to decrease.

Subsequently at a time point t46, the processor changes the switching pattern to the switching pattern a21 indicated in FIG. 24A to draw the armatures 110 into contact with the upper cores 116. As a result, the drawing currents flow through the upper coils 1022a, and 1022b. After that, a drawing current is maintained by alternating the switching pattern a21 and a switching pattern e21 indicated in FIG. 24E, until the armatures 110 contact the upper cores 116.

In the switching pattern e21, the processor outputs the ON signals to the switching elements 906, and 912, and outputs the OFF signals to the other switching elements. Therefore, a current circulation path is formed through which current flows in a sequence of the upper coil 1022a and the switching elements 900 and 906. A current circulation path is formed through which current flows in a sequence of the upper coil 1022b and the switching elements 918 and 912. Immediately after the switching pattern a21 is changed to the switching pattern e21, flywheel currents flow through these circulation paths as indicated by broken line arrows in FIG. 24E. Therefore, by adjusting the proportion between the switching pattern a21 and the switching pattern e21, the quantity of current flowing through the upper coils 1022a, and 1022b in the forward direction can be adjusted.

At a time point t47 after the armatures 110 come into contact with the upper cores 116, the switching pattern is temporarily changed to the switching pattern b21. Therefore, regenerative currents occur, so that the drawing currents flowing through the upper coils 1022a, and 1022b rapidly discontinue. Then, the processor immediately outputs the OFF signals to all the switching elements 900–922 to maintain such a state that no current flows through the upper coils 1022a, and 1022b.

Even after the drawing currents discontinue, the contact between the armatures 110 and the upper cores 116 is maintained by the magnetic attraction force from the upper magnets 116d. Thus, the valve bodies 100 are held in contact with the valve seats 126, and, therefore, the intake ports of the first cylinder 802a are kept in the completely closed state.

After the state where the OFF signals are outputted to all the switching elements 900–922, a timing point comes at which the exhaust stroke of the second cylinder 802b occurs. The exhaust stroke does not overlap the intake stroke of the first cylinder 802a. In this case, starting at a time point t48, the processor outputs the ON signals to the switching elements 906, 914, and 916, and outputs the OFF signals to the other switching elements to establish a switching pattern b22 indicated in FIG. 25B. Therefore, a current flows from the high potential side terminal 930 to the low potential side terminal 932 as indicated by a broken line arrow in FIG. 25B. A releasing current for canceling out the magnetic fluxes from the upper magnet 116d is supplied to the upper coil 1122b of the exhaust valve 816b of the second cylinder 802b.

Therefore, the magnetic attraction force on the armature 110 created by the upper core 116 disappears. As a result, the armature 110 starts to move toward the lower core 118, or toward the fully open state, due to the force from the upper spring 120. Hence, the valve body 100 starts to move apart from the valve seat 126, and the amount of valve lift starts to increase.

Figure 25A:
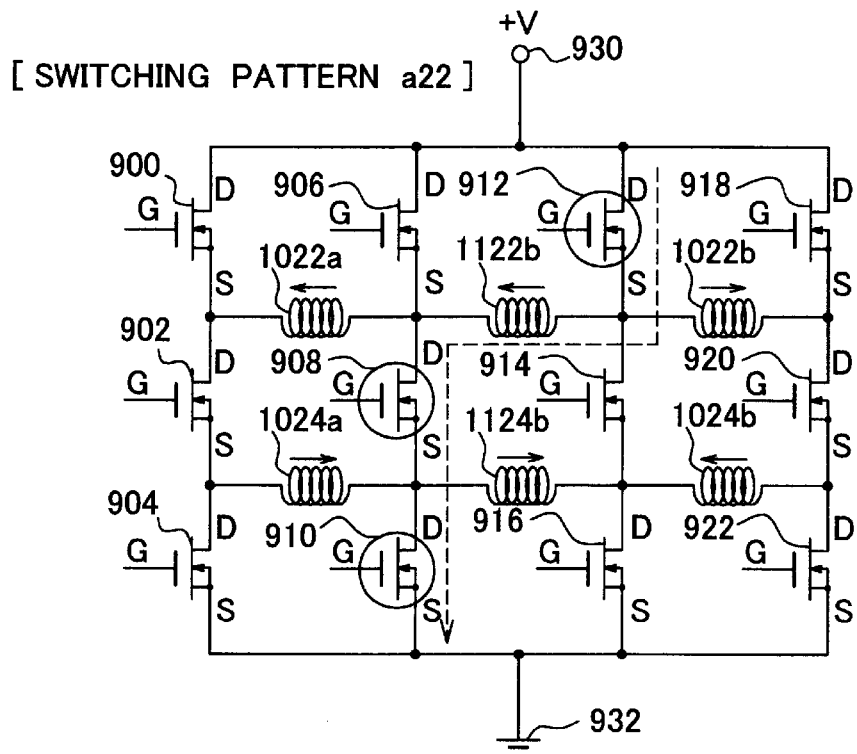
FIGS. 25A–25F are circuit diagrams for illustrating the control of current according to the embodiment of FIG. 21.

After that, at a time point t49, the processor outputs the ON signals to the switching elements 908, 910, and 912, and outputs the OFF signals to the other switching elements to establish a switching pattern a22 indicated in FIG. 25A. Therefore, a regenerative current flows, so that the releasing current flowing through the upper coil 1122b rapidly discontinues. Then, the processor immediately outputs the OFF signals to all the switching elements 900–922 to maintain a state where no current flows through the upper coil 1122b.

At the time point t49 when the releasing current through the upper coil 1122b discontinues, the armature 110 is sufficiently apart from the upper core 116, so that the armature 110 is not returned to the upper core 116 by the magnetic force from the upper magnet 116d. Afterwards, the armature 110 is moved apart from the upper core 116 toward the lower core 118 by the force from the upper spring 120.

Figure 25B:
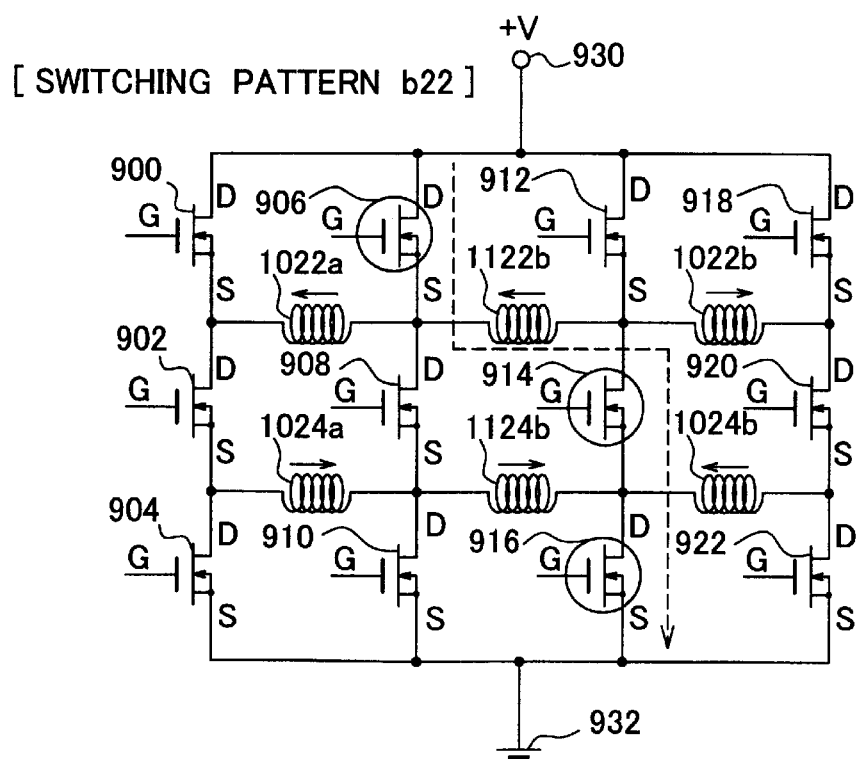
Figure 25C:
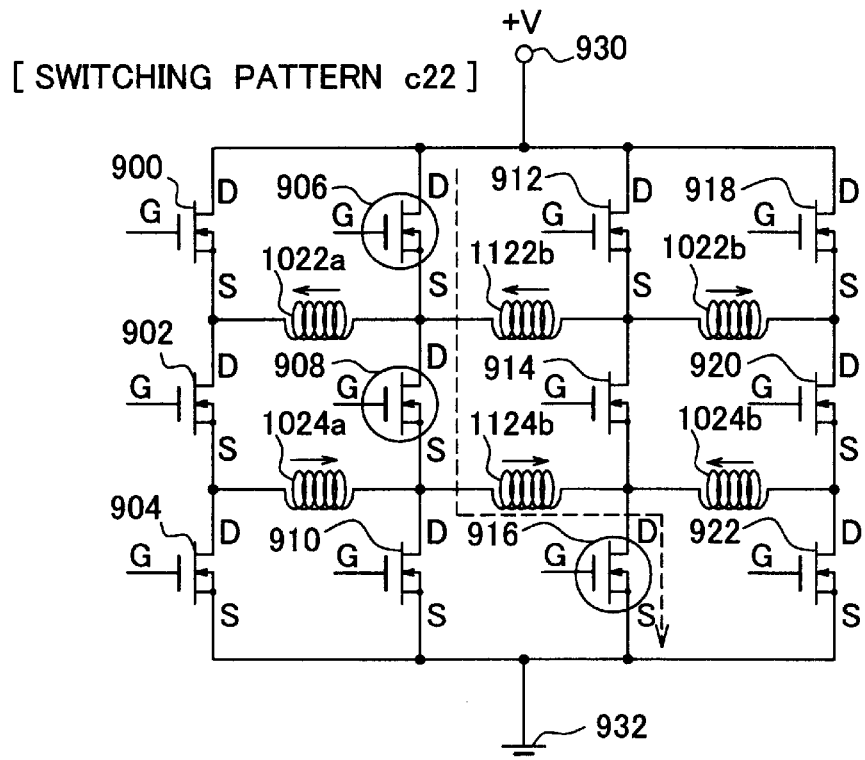

Subsequently at a time point t50, the processor outputs the ON signals to the switching elements 906, 908, and 916, and outputs the OFF signals to the other switching elements to establish a switching pattern c22 indicated in FIG. 25C. Therefore, a current flows from the high potential side terminal 930 to the low potential side terminal 932 as indicated by a broken line arrow in FIG. 25C. A current flows through the lower coil 1124b of the exhaust valve 816b of the second cylinder 802b in the forward direction. Then, until a time point t51, the switching pattern c22 and a switching pattern f22 indicated in FIG. 25F are alternated to maintain the drawing current for magnetically attracting the armature 110 to the lower core 118. Therefore, when approaching the lower core 118 by the armature 110 comes into contact with the lower core 118, overcoming the force from the lower spring 106.

In the switching pattern f22, the processor outputs the ON signal to the switching element 916, and outputs the OFF signals to the other switching elements. Therefore, a current circulation path through which current flows in a sequence of the lower coil 1124b and the switching elements 916 and 910 is formed. Immediately after the switching pattern c22 is changed to the switching pattern f22, a flywheel current flows through the circulation path as indicated by a broken line arrow in FIG. 25F. Therefore, by adjusting the proportion between the switching pattern c22 and the switching pattern f22, the quantity of current flowing through the lower coil 1124b in the forward direction can be adjusted.

Figure 25D:
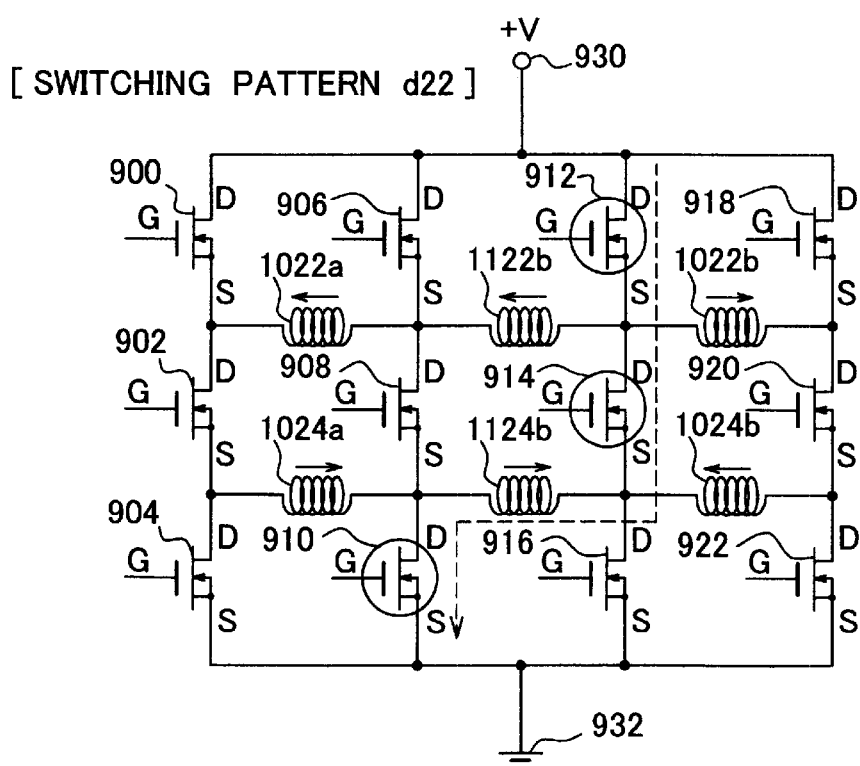

At the time point t51 after the armature 110 comes into contact with the lower core 118, the switching pattern is temporarily changed to a switching pattern d22 indicated in FIG. 25D. In the switching pattern d22, the processor outputs the ON signals to the switching elements 910, 912, and 914, and outputs the OFF signals to the other switching elements. Therefore, a regenerative current occurs, so that the drawing current rapidly decreases. Immediately after, the state of alternating the switching pattern c22 and the switching pattern f22 is resumed. In this case, however, the proportion of the switching pattern c22 is reduced, in comparison with the pattern alternating state during the time period t50–t51. In this manner, the quantity of current flowing through the lower coil 1124b in the forward direction is maintained at the level of the holding current, so as to maintain the contact between the armature 110 and the lower core 118.

While the armature 110 and the lower core 118 are held in contact by continuously supplying the holding current through the lower coil 1124b, the valve body 100 is held farthest from the valve seat 126 as depicted in FIG. 11. Therefore, the exhaust port of the second cylinder 802b remains in the fully open state.

Subsequently, at a time point t52 near or at a timing point at which the exhaust stroke of the second cylinder 802b comes to an end, the switching pattern is changed to the switching pattern d22 indicated in FIG. 25D. Therefore, a regenerative current flows, so that the holding current through the lower coil 1124*b* rapidly discontinues. The releasing current flows in the reverse direction. Subsequently at a time point t53, the switching pattern is temporarily changed to the switching pattern c22. Therefore, a regenerative current occurs, so that the releasing current through the lower coil 1124*b* rapidly discontinues. Then, the processor immediately outputs the OFF signals to all the switching elements 900–922 to maintain the current discontinued state of the lower coil 1124*b*.

After the armature 110 loses the attraction force toward the lower core 118 as described above, the armature 110 starts to move toward the upper core 116, or toward the completely closed state, due to the force from the lower spring 106. Therefore, the valve body 100 approaches the valve seat 126 by reducing the amount of valve lift.

Subsequently at a time point t54, the processor changes the switching pattern to the switching pattern a22 indicated in FIG. 25A, in order to draw the armature 110 into contact with the upper core 116. As a result, the drawing current flows through the upper coil 1122*b*. Afterwards, a drawing current is maintained by alternating the switching pattern a22 and a switching pattern e22 indicated in FIG. 25E, until the armature 110 contacts the upper core 116.

In the switching pattern e22, the processor outputs the ON signal to the switching element 912, and outputs the OFF signals to the other switching elements. Therefore, a current circulation path is formed through which current flows in a sequence of the upper coil 1122*b* and the switching elements 906 and 912. Immediately after the switching pattern a22 is changed to the switching pattern e22, a flywheel current flows through the circulation path as indicated by a broken line arrow in FIG. 25E. Therefore, by adjusting the proportion between the switching pattern a22 and the switching pattern e22, the quantity of current flowing through the upper coil 1122*b* in the forward direction can be adjusted.

At a time point t55 after the armature 110 comes into contact with the upper core 116, the switching pattern is temporarily changed to the switching pattern b22. Therefore, a regenerative current occurs, so that the drawing current through the upper coil 1122*b* rapidly discontinues. Then, the processor immediately outputs the OFF signals to all the switching elements 900–922 to maintain the current discontinued state of the upper coil 1122*b*.

Even after the drawing current discontinues, the contact between the armature 110 and the upper core 116 is maintained by the magnetic attraction force from the upper magnet 116*d*. Thus, the valve body 100 is held in contact with the valve seat 126, and, therefore, the exhaust valve 816*b* of the second cylinder 802*b* remains in the completely closed state.

By repeating the above-described processes, the two intake valves 812*a*, and 812*b* of the first cylinder 802*a* and the exhaust valve 816*b* of the second cylinder 802*b* are opened and closed.

Figure 24E:
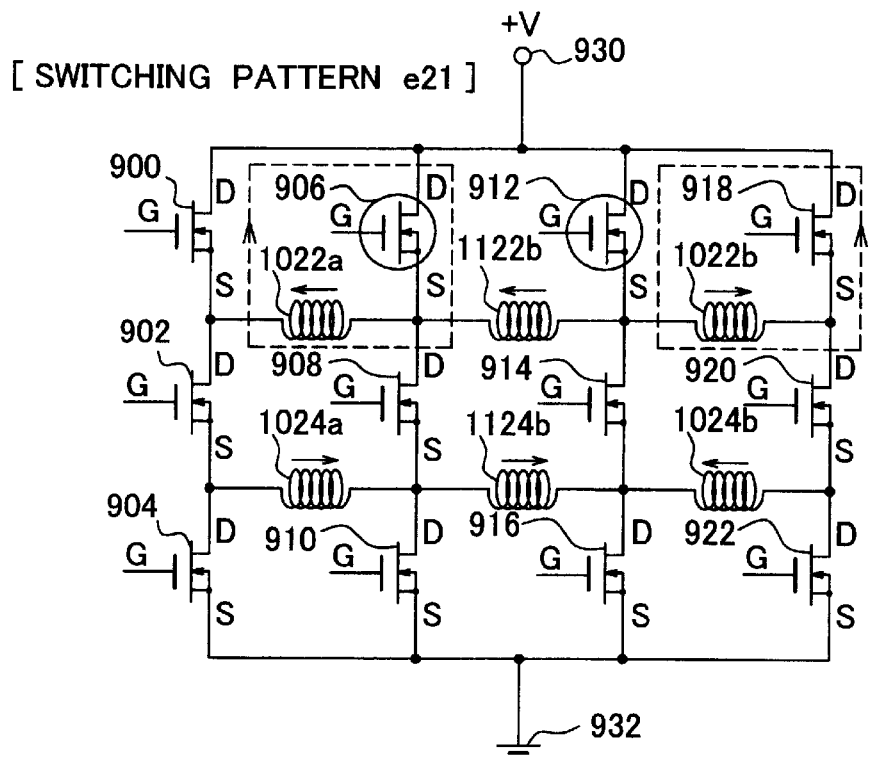
Figure 24F:
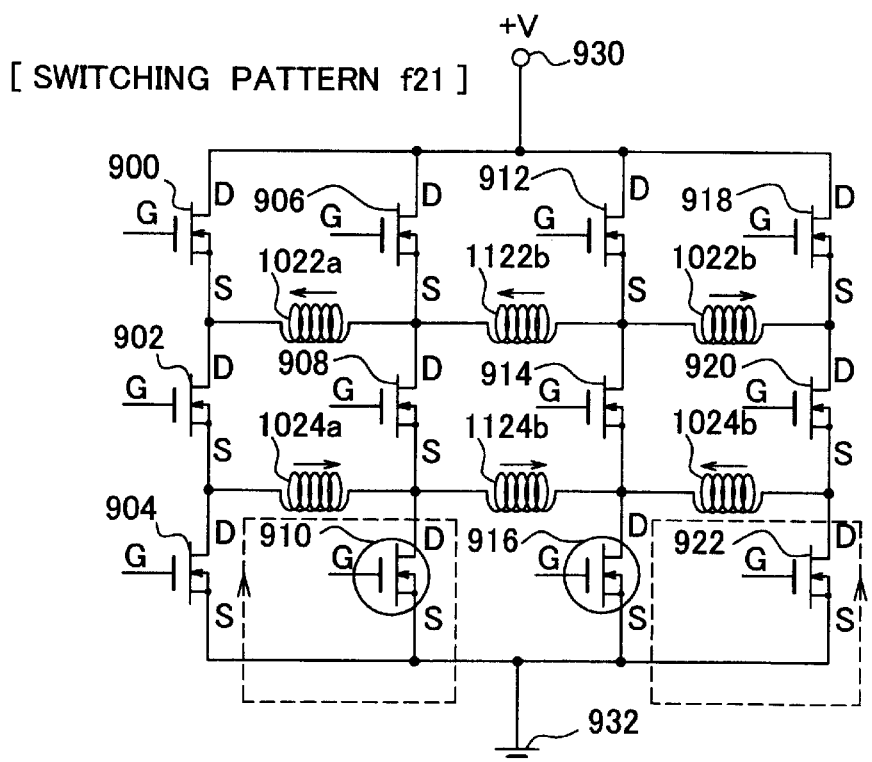

From the foregoing description, it should be understood that the switching elements 900–922 used to conduct current to drive the upper coils 1022*a*, and 1022*b* as indicated in FIGS. 24A, 24B and 24E are the same as the switching elements 900–922 used to conduct current to drive the lower coils 1024*a*, and 1024*b* as indicated in FIGS. 24C, 24D and 24F. These switching elements are shared by the upper coils 1022*a*, and 1022*b* and the lower coils 1024*a*, and 1024*b*.

Figure 25E:
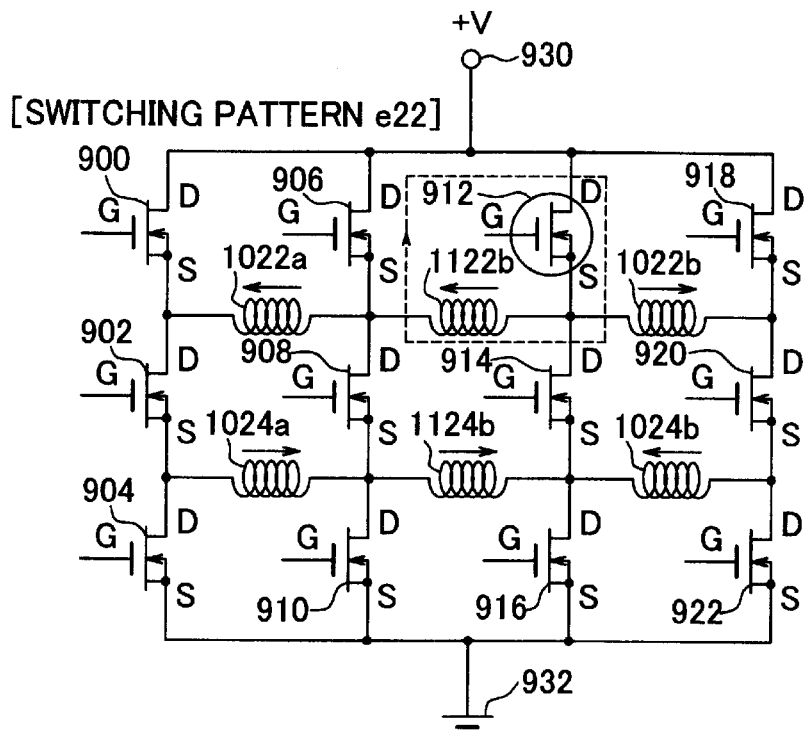
Figure 25F:
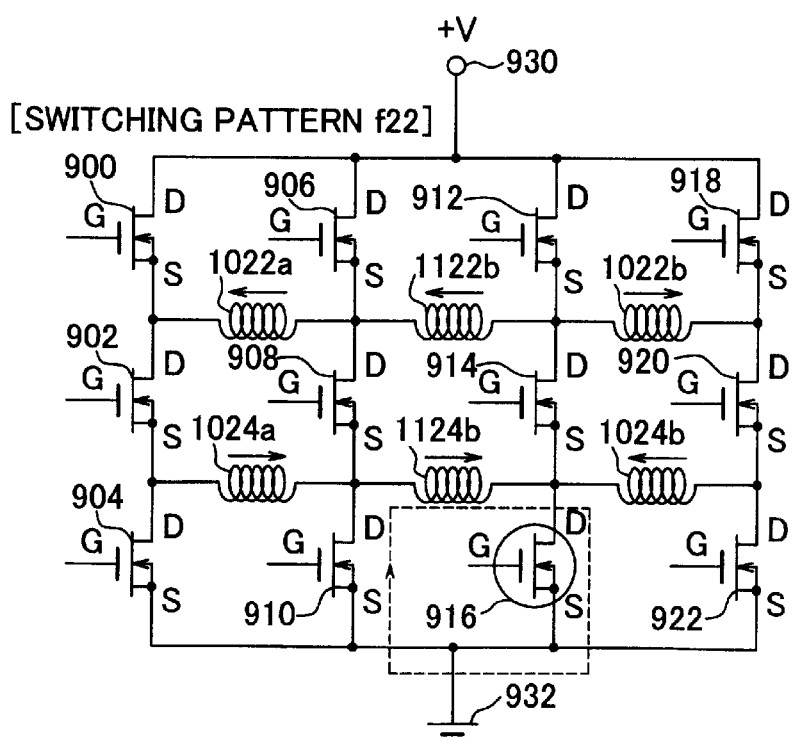

Furthermore, it should be understood that the switching elements 906–916 used to conduct current to drive the upper coil 1122*b* of the exhaust valve 816*b* as indicated in FIGS. 25A, 25B and 25E are the same as the switching elements 906–916 used to conduct current to drive the lower coil 1124*b* of the exhaust valve 816*b* as indicated in FIGS. 25C, 25D and 25F. These switching elements are shared by the upper coil 1122*b* and the lower coil 1124*b*.

Still further, through comparison between the switching elements 900–922 used to conduct current to drive the upper coils 1022*a*, and 1022*b* and the lower coils 1024*a*, and 1024*b* of the two intake valves 812*a*, 812*b* of the first cylinder 802*a* as indicated in FIGS. 24A to 24F, and the switching elements 900–922 used to conduct current to drive the upper coil 1122*b* and the lower coil 1124*b* of the exhaust valve 816*b* of the second cylinder 802*b* as indicated in FIGS. 25A to 25F, it should be understood that the switching elements 906–916 are shared.

The other drive circuits 992*b*, 992*c*, and 992*d* drive combinations of valves as shown in FIG. 26. For example, the drive circuit 992*b* drives a combination of the two intake valves 812*c*, and 812*d* of the second cylinder 802*b* and the exhaust valve 816*d* of the fourth cylinder 802*d*. The relationships between the valves 812*c*, 812*d*, and 816*d* and the electromagnetic coils are substantially similar as those in the drive circuit 992*a*.

The intake stroke of the second cylinder 802*b* and the exhaust stroke of the fourth cylinder 802*d* do not overlap. Therefore, the twelve switching elements in the drive circuit 992*b* are controlled by the processor in patterns that are substantially similar as the switching patterns a21–f22 indicated in FIGS. 24A to 24F and 25A to 25F. Therefore, the two intake valves 812*c*, and 812*d* of the second cylinder 802*b* and the exhaust valve 816*d* of the fourth cylinder 802*d* can be opened and closed in a manner substantially similar as that indicated in the timing chart of FIG. 23. Therefore, the sharing of switching elements is achieved as in the case of the drive circuit 992*a*.

The drive circuit 992*c* drives a combination of the two intake valves 812*e*, and 812*f* of the third cylinder 802*c* and the exhaust valve 816*a* of the first cylinder 802*a*. The relationships between the valves 812*e*, 812*f*, and 816*a* and the electromagnetic coils are substantially the same as those in the drive circuit 992*a*.

The intake stroke of the third cylinder 802*c* and the exhaust stroke of the first cylinder 802*a* do not overlap. Therefore, the twelve switching elements in the drive circuit 992*c* are controlled by the processor in patterns that are substantially similar as the switching patterns a21–f22 indicated in FIGS. 24A to 24F and 25A to 25F. Therefore, the two intake valves 812*e*, and 812*f* of the third cylinder 802*c* and the exhaust valve 816*a* of the first cylinder 802*a* can be opened and closed in a manner substantially similar as indicated in the timing chart of FIG. 23. Therefore, the sharing of switching elements is achieved as in the case of the drive circuit 992*a*.

The drive circuit 992*d* drives a combination of the two intake valves 812*g*, and 812*h* of the fourth cylinder 802*d* and the exhaust valve 816*c* of the third cylinder 802*c*. The relationships between the valves 812*g*, 812*h*, and 816*c* and the electromagnetic coils are substantially the same as those in the drive circuit 992*a*.

The intake stroke of the fourth cylinder 802*d* and the exhaust stroke of the third cylinder 802*c* do not overlap. Therefore, the twelve switching elements in the drive circuit 992*d* are controlled by the processor in patterns that are substantially similar as the switching patterns a21–f22 indicated in FIGS. 24A to 24F and 25A to 25F. Therefore, the two intake valves 812*g*, and 812*h* of the fourth cylinder 802*d* and the exhaust valve 816c of the third cylinder 802c can be opened and closed in a manner substantially similar as indicated in the timing chart of FIG. 23. Therefore, the sharing of switching elements is achieved as in the case of the drive circuit 992a.

Therefore, the drive circuit portion, equipped with the four drive circuits 992a–992d, is able to drive a total of twelve valves of the four cylinders 802a–802d, or the eight intake valves 812a–812h and the four exhaust valves 816a 816d, in the combinations depicted in FIG. 26. Each of the drive circuits 992a–992d is able to drive two intake valves and one exhaust valve by using the twelve switching elements 900–922. Thus, 48 switching elements are used to drive the twelve valves of the four cylinders 802a–802d, 4 elements/1 valve. In contrast, the above-described conventional three-switching element in-series type construction needs 72 switching elements for 16 valves, 4.5 elements/1 valve.

Therefore, embodiments of the present invention are able to reduce the number of switching elements, and allow size and cost reductions of the drive circuit portion for the intake and exhaust valves formed as electromagnetic valves.

The terminal portions of the electromagnetic coils 1022a–1124b are connected to the series connecting portions between the switching elements of the series circuits 934–940, each series circuit formed by connecting three switching elements in series. Therefore, in the switching control on the switching elements 900–922, a mode of supplying reverse currents through the electromagnetic coils 1022a–1124b can be realized as indicated in FIGS. 24B, 24D, 25B and 25D.

Each drive circuit 992a–992d employs the eight electrically conductive wires 944–958 for the six electromagnetic coils, or 1.3 wires/1 electromagnetic coil, thus reducing the number of wires needed. In the above-described conventional three-switching element in-series type construction, 48 conductive wires are needed for 32 electromagnetic coils, or 1.5 wires/1 electromagnetic coil. Thus, embodiments of the presend invention allows a reduction in the thickness of a wire harness disposed in a vehicle, thus contributing to size and weight reductions of the vehicle.

Figure 27:
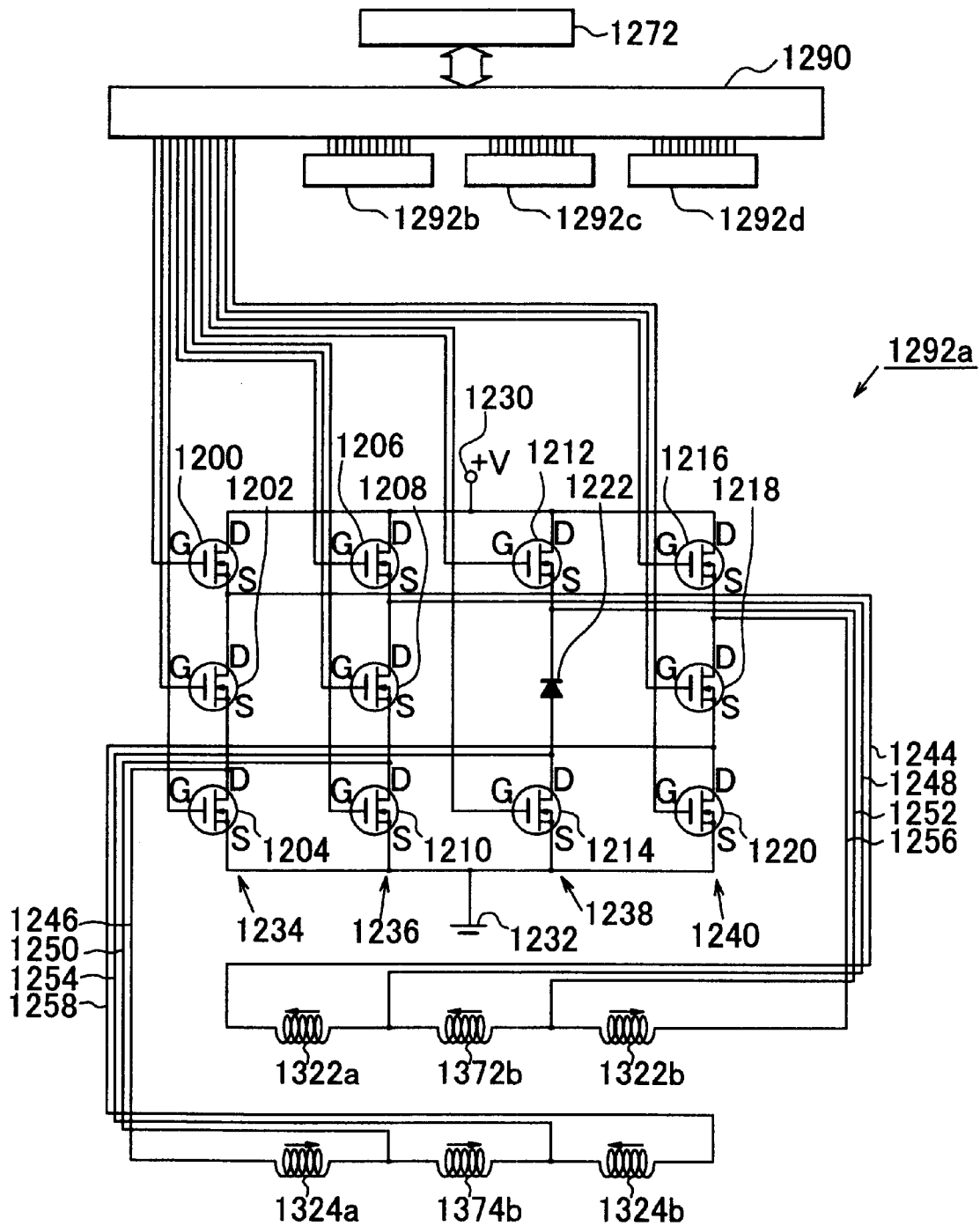
FIG. 27 is a diagram illustrating a construction of a drive circuit according to another embodiment of the present invention.

Embodiments of the present invention use a drive circuit 1292a as depicted in FIG. 27 in place of the drive circuit 992a. The drive circuit 1292a is a three-switching element in-series type drive circuit. Other drive circuits 1292b, 1292c, and 1292d are basically the same as the drive circuit 1292a. Therefore, the drive circuit 1292a will be described below as a representative. Other configurations of the embodiments described below are substantially similar as those of the embodiments described above, unless otherwise noted.

The drive circuit 1292a is formed by eleven switching elements 1200, 1202, 1204, 1206, 1208, 1210, 1212, 1214, 1216, 1218, and 1220, and one diode 1222. The switching elements 1200–1220 and the diode 1222 form four series circuits 1234, 1236, 1238, and 1240. Each series circuits may include three of the elements including the diode 1222 connected in series. The series circuits 1234–1240 are connected in parallel between a high potential side terminal 1230 and a low potential side terminal 1232.

Of the four series circuits 1234–1240, the series circuit 1238 in FIG. 27 is formed by connecting in series the switching element 1212, the diode 1222, and the switching element 1214 in that order. The diode 1222 is disposed in such a direction as to allow current to flow from the low potential side terminal 1232 to the high potential side terminal 1230. The other three series circuits 1234, 1236, 1240 are each formed by connecting three of the switching elements 1200–1210 and 1216–1220 in series.

Thus, the drive circuit 1292a in this embodiment differs from the drive circuit 992a in previous embodiments in that the second series circuit 1238 in FIG. 25 has in its middle position the diode 1222 instead of a switching element. Other configurations of the drive circuit 1292a are substantially similar as those of the drive circuit 992a. An upper coil 1322a of a first intake valve and an upper coil 1322b of a second intake valve of a first cylinder, an upper coil 1372b of an exhaust valve of a second cylinder, a lower coil 1324a of the first intake valve and a lower coil 1324b of the second intake valve of the first cylinder, and a lower coil 1374b of the exhaust valve of the second cylinder are connected to positions comparable to those in previous embodiments, via eight electrically conductive wires 1244, 1246, 1248, 1250, 1252, 1254, 1256, and 1258.

The eleven switching elements 1200–1220 are substantially similar as the switching elements in previous embodiments in that ON signals and OFF signals from a processor are inputted to the gate terminals G via an output port 1272 and a buffer circuit 1290.

The opening and closing operations of the two intake valves of the first cylinder and the exhaust valve of the second cylinder performed when control currents are supplied from the ECU is described below. A timing chart shown in FIG. 28 indicates the operations of the two intake valves of the first cylinder and the exhaust valve of the second cylinder.

Figure 28:
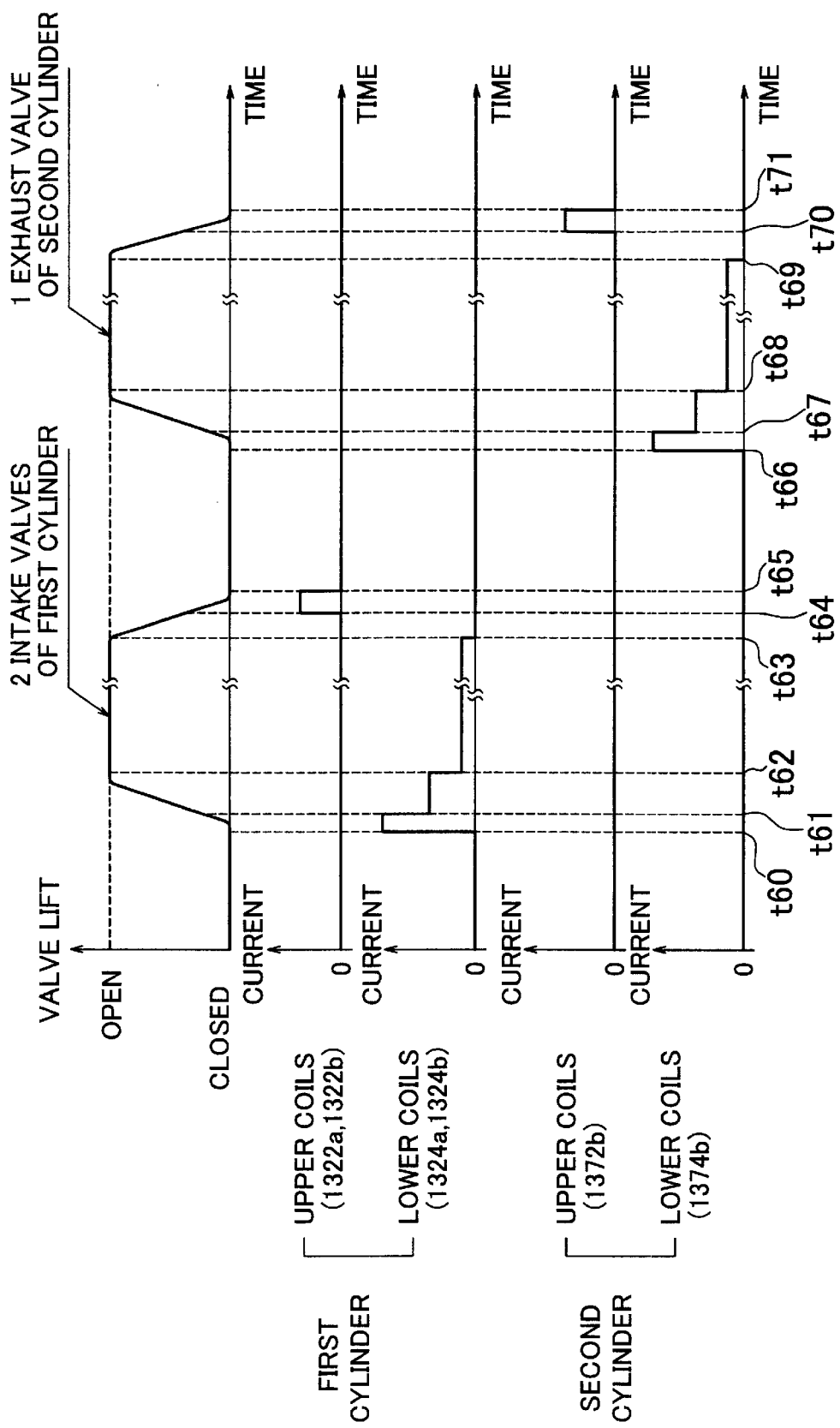
FIG. 28 is a timing chart indicating the operations of intake/exhaust valves and the current control according to the embodiment of FIG. 27.

FIGS. 29A to 29F and FIGS. 30A to 30F are circuit diagrams indicating states of control performed on the drive circuit 1292a depicted in FIG. 27 so as to realize the operations indicated in FIG. 28. In FIGS. 29A to 29F and 30A to 30F, the conductive wires 1244–1258 are omitted. Furthermore, in FIGS. 29A to 29F and 30A to 30F, broken line arrows and circles "□" have the same states as described above in conjunction with previous embodiments.

Before a time point t60 indicated in FIG. 28, the armatures 110 are brought into contact with the upper cores 116 as depicted in FIG. 10 by temporary excitation of the upper coils 1322a, 1322b, and 1372b. This contact state is maintained by the magnetic attraction force of the upper magnets 116d. Therefore, the valve bodies 100 are in contact with the valve seats 126. The two intake valves of the first cylinder and the exhaust valve of the second cylinder are in a completely closed state. The OFF signals are outputted to all the eleven switching elements 1200–1220.

Figure 29A:
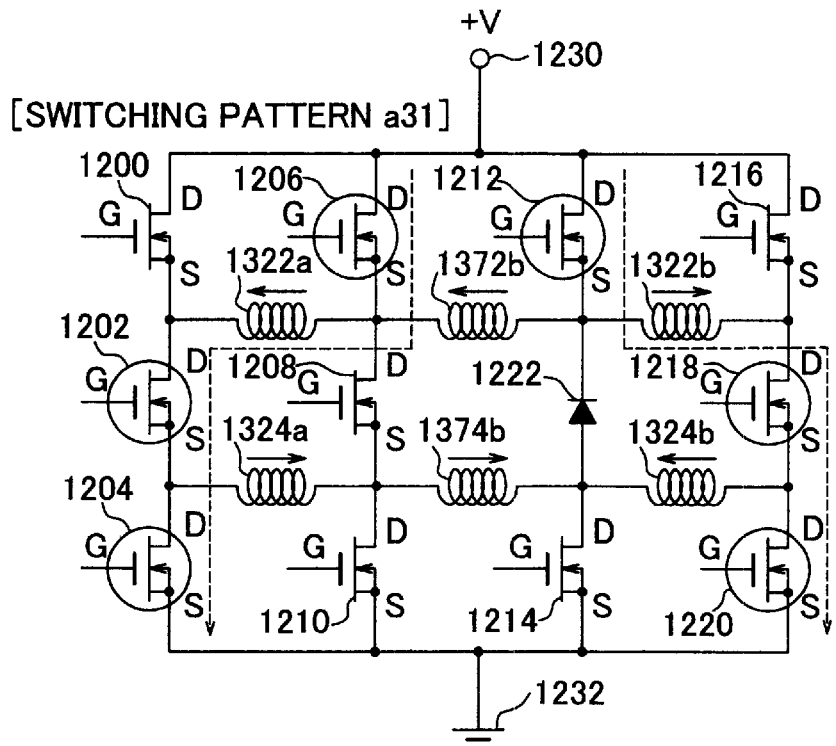
FIGS. 29A–29F are circuit diagrams for illustrating the control of current according to the embodiment of FIG. 27.
Figure 29B:
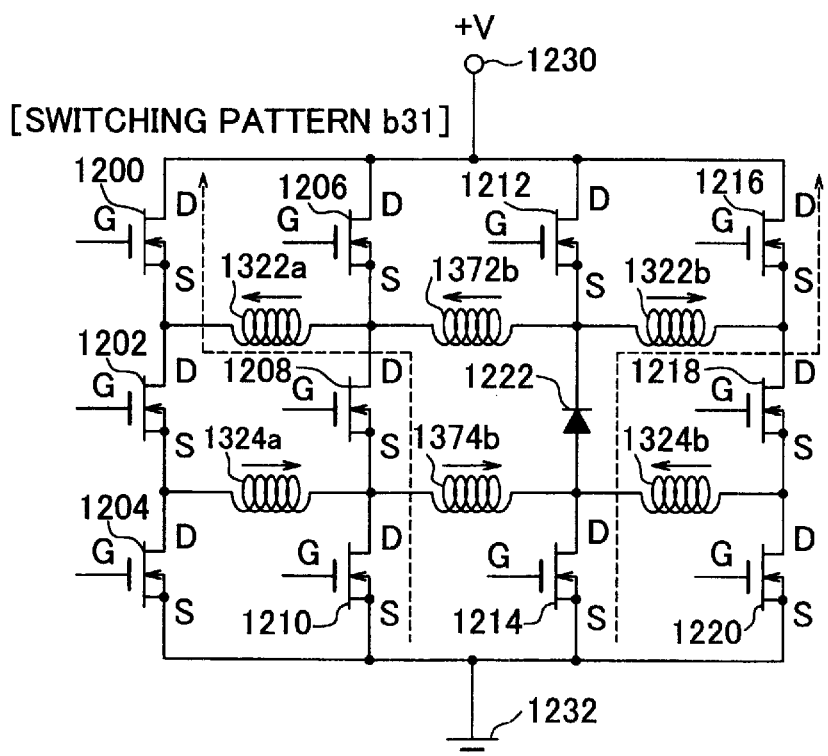
Figure 29C:
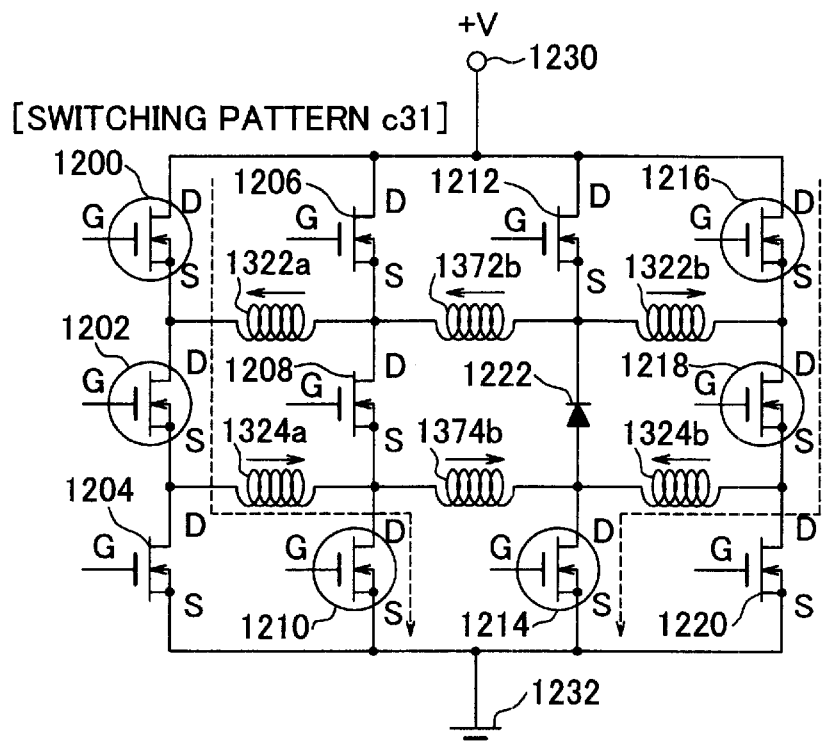

At the time of the intake stroke of the first cylinder, the processor outputs the ON signals to the switching elements 1200, 1202, 1210, 1214, 1216, and 1218 and outputs the OFF signals to the other switching elements at the time point t60 to establish a switching pattern c31 indicated in FIG. 29C. As a result, currents flow from the high potential side terminal 1230 to the low potential side terminal 1232 as indicated by broken line arrows in FIG. 29C, so that currents flow through the lower coils 1324a, and 1324b of. the intake valves of the first cylinder in a forward direction. Then, the switching pattern c31 and a switching pattern f31 indicated in FIG. 29F are alternated until a time point t61.

In the switching pattern f31, the processor outputs the ON signals to the switching elements 1210, and 1214, and outputs the OFF signals to the other switching elements. Therefore, a current circulation path is formed through which current flows in a sequence of the lower coil 1324a and the switching elements 1210 and 1204. A current circulation path is formed through which current flows in a sequence of the lower coil 1324b and the switching elements 1214 and 1220. Immediately after the switching pattern c31 is changed to the switching pattern f31, flywheel currents flow through the circulation paths as indicated by broken line arrows in FIG. 29F. Therefore, by adjusting the proportion of the switching pattern c31 to a sufficiently great value, it is possible to achieve such an adjustment that great currents flow through the lower coils 1324a, and 1324b in the forward direction.

In this manner, the lower coils 1324a, and 1324b are supplied with separating currents for separating the upper cores 116 from the armatures 110 magnetically attached to the upper cores 116 due to the magnetic force produced by the upper magnets 116d. Therefore, strong magnetic forces are produced from the lower cores 118, so that the armatures 110 separate from the upper cores 116, and move toward the lower cores 118.

Figure 29D:
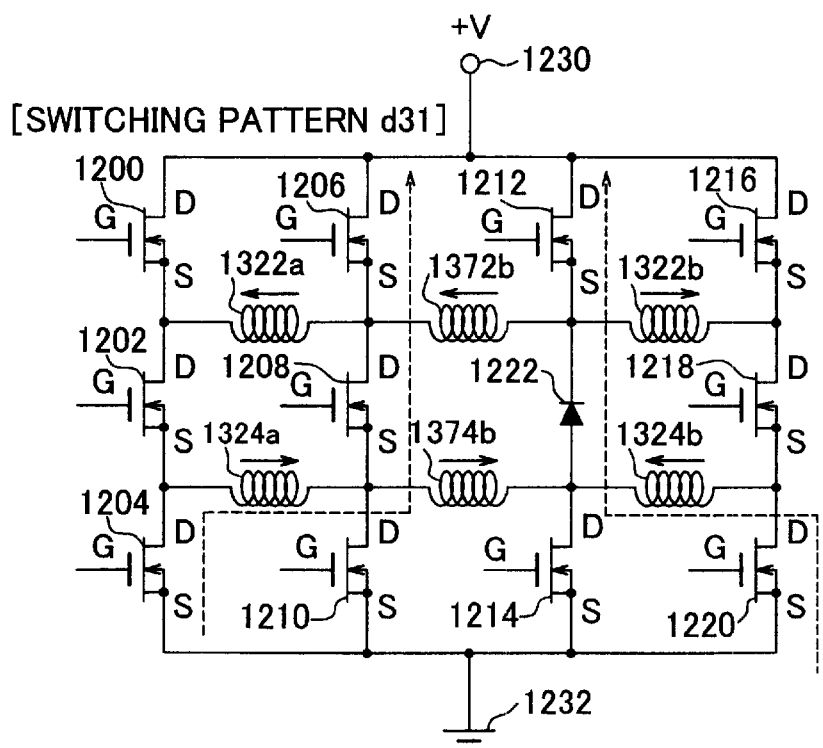

At the time point t61, the processor temporarily sets a switching pattern d31 indicated in FIG. 29D. In the switching pattern d31, the processor outputs the OFF signals to all the switching elements 1200–1220. Therefore, regenerative currents occur as indicated by broken line arrows in FIG. 29D, so that the separating currents flowing through the lower coils 1324a, and 1324b rapidly decrease. Then, the processor immediately sets a state where the switching pattern c31 and the switching pattern f31 are alternated. However, the proportion of the switching pattern c31 is reduced, in comparison with the pattern alternating state during the time period t60–t61. In this manner, the quantity of current flowing through the lower coils 1324a, and 1324b is kept at a normal level of the drawing current. At this moment, the armatures 110 are sufficiently apart from the upper cores 116. Therefore, although the currents through the lower coils 1324a, and 1324b are set to the normal level of the drawing current, the armatures 110 are not returned to the upper cores 116 by the magnetic forces from the upper magnets 116d. After that, due to the drawing currents and the forces from the upper springs 120, the armatures 110 rapidly move away from the upper cores 116, and approach the lower cores 118, and finally contact the lower cores 118 by overcoming the forces from the lower springs 106.

At a time point t62 after the armatures 110 come into contact with the lower cores 118, the processor temporarily sets the switching pattern d31 indicated in FIG. 29D. Therefore, regenerative currents occur as indicated by the broken line arrows in FIG. 29D, so that the drawing currents flowing through the lower coils 1324a, and 1324b rapidly decrease. Then, the processor immediately sets a state where the switching pattern c31 and the switching pattern f31 are alternated. In this case, however, the proportion of the switching pattern c31 is reduced, in comparison with the pattern alternating state during the time period t61–t62. In this manner, the quantity of current flowing through the lower coils 1324a, and 1324b is reduced to the level of the holding current. The contact between the armatures 110 and the lower cores 118 is maintained. Thus, the input ports of the first cylinder are set fully open.

Subsequently, at a time point t63 near or at a timing at which the intake stroke of the first cylinder comes to an end, the switching pattern is changed to the switching pattern d31 shown in FIG. 29D. Therefore, regenerative currents occur, so that the currents flowing through the lower coils 1324a, and 1324b rapidly discontinue.

After the armatures 110 lose the attraction force toward the lower cores 118 as described above, the armatures 110 start to move toward the upper cores 116, or toward the completely closed state, due to the forces from the lower springs 106. Therefore, the valve bodies 100 approach the valve seats 126 as the amount of valve lift starts to decrease.

Subsequently at a time point t64, the processor changes the switching pattern to a switching pattern a31 indicated in FIG. 29A, in order to draw the armatures 110 into contact with the upper cores 116. As a result, the drawing currents flow through the upper coils 1322a, and 1322b. Afterwards, a drawing current is maintained by alternating the switching pattern a31 and a switching pattern e31 indicated in FIG. 29E, until the armatures 110 contact the upper cores 116.

In the switching pattern a31, the processor outputs the ON signals to the switching elements 1202, 1204, and 1206, 1212, 1218, 1220, and outputs the OFF signals to the other switching elements. As a result, currents flow from the high potential side terminal 1230 to the low potential side terminal 1232 as indicated by broken line allows in FIG. 29A, so that currents flow through the upper coils 1322a, and 1322b of the intake valves of the first cylinder in the forward direction.

In the switching pattern e31, the processor outputs the ON signals to the switching elements 1206, and 1212, and outputs the OFF signals to the other switching elements. Therefore, a current circulation path is formed through which current flows in a sequence of the upper coil 1322a and the switching elements 1200 and 1206. A current circulation path is formed through which current flows in a sequence of the upper coil 1322b and the switching elements 1216 and 1212. Immediately after the switching pattern a31 is changed to the switching pattern e31, flywheel currents flow through the circulation paths as indicated by broken line arrows in FIG. 29E. Therefore, by adjusting the proportion between the switching pattern a31 and the switching pattern e31, the quantity of current flowing through the upper coils 1322a, and 1322b in the forward direction can be adjusted.

At a time point t65 after the armatures 110 come into contact with the upper cores 116, the switching pattern is changed to a switching pattern b31 indicated in FIG. 29B. In the switching pattern b31, the processor outputs the OFF signals to all the switching elements 1200–1220. Therefore, regenerative currents occur as indicated by broken line arrows in FIG. 29B, so that the drawing currents flowing through the upper coils 1322a, and 1322b rapidly discontinue.

Even after the drawing currents discontinue, the contact between the armatures 110 and the upper cores 116 is maintained by the magnetic attraction force from the upper magnets 116d. In this manner, the intake ports of the first cylinder are set to the completely closed state.

Figure 30A:
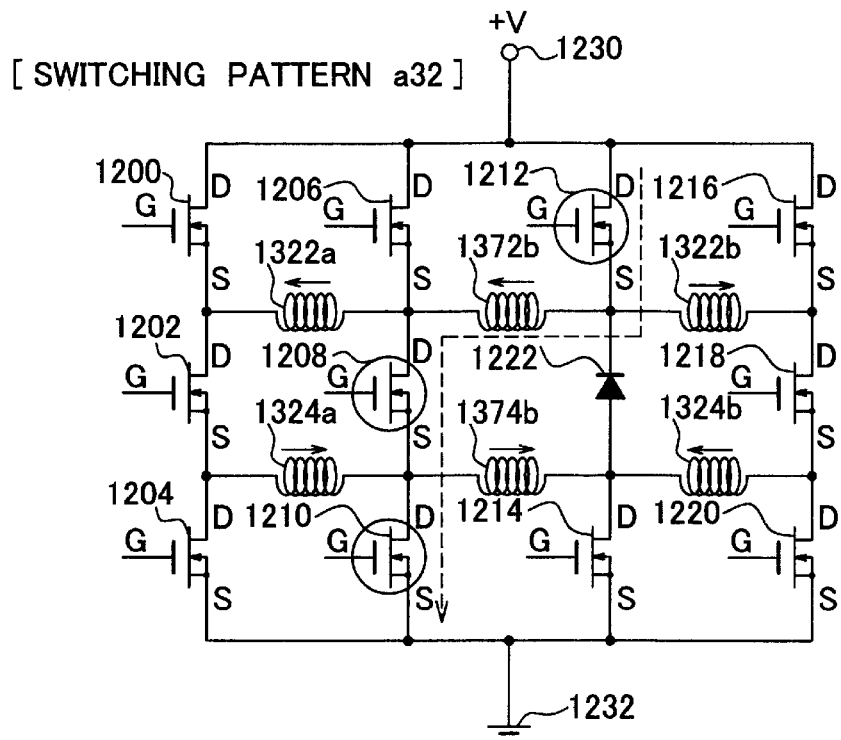
FIGS. 30A–30F are circuit diagrams for illustrating the control of current according to the embodiment of FIG. 27.
Figure 30B:
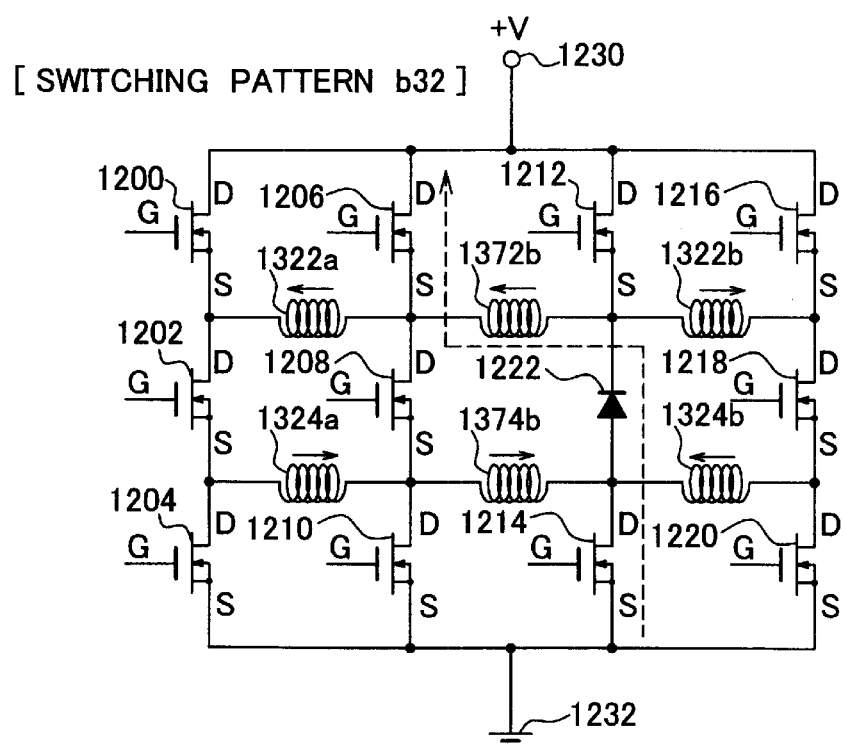
Figure 30C:
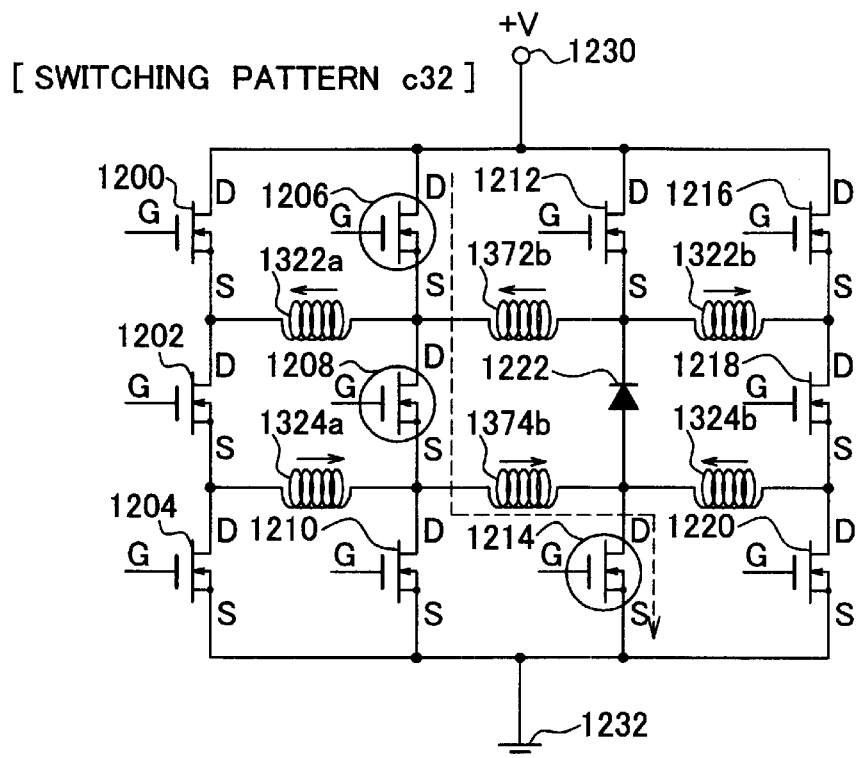

After the state where the OFF signals are outputted to all the switching elements 1200–1220, a timing points occurs at which the exhaust stroke of the second cylinder does not overlap the intake stroke of the first cylinder. In this case, starting at a time point t66, the processor outputs the ON signals to the switching elements 1206, 1208, and 1214, and outputs the OFF signals to the other switching elements to establish a switching pattern c32 indicated in FIG. 30C. Therefore, a current flows from the high potential side terminal 1230 to the low potential side terminal 1232 as indicated by a broken line arrow in FIG. 30C, so that a current flows through the lower coil 1374b of the exhaust valve of the second cylinder in the forward direction. Then, the switching pattern c32 and a switching pattern f32 indicated in FIG. 30F are alternated until a time point t67.

In the switching pattern f32, the processor outputs the ON signals to the switching element 1214, and outputs the OFF signals to the other switching elements. Therefore, a current circulation path through which current flows in a sequence of the lower coil 1374b and the switching elements 1214 and 1210 is formed. Immediately after the switching pattern c32 is changed to the switching pattern f32, a flywheel current flows through the circulation path as indicated by a broken line arrow in FIG. 30F. Therefore, by adjusting the proportion of the switching pattern c32 to a sufficiently great value, it is possible to achieve such an adjustment that a great current flows through the lower coil 1374b in the forward direction.

In this manner, the lower coil 1374b is supplied with the separating current for separating the upper core 116 from the armature 110 magnetically attached to the upper core 116 due to the magnetic force produced by the upper magnet 116d. Therefore, a strong magnetic force is produced from the lower core 118, so that the armature 110 moves apart from the upper core 116 toward the lower core 118.

Figure 30D:
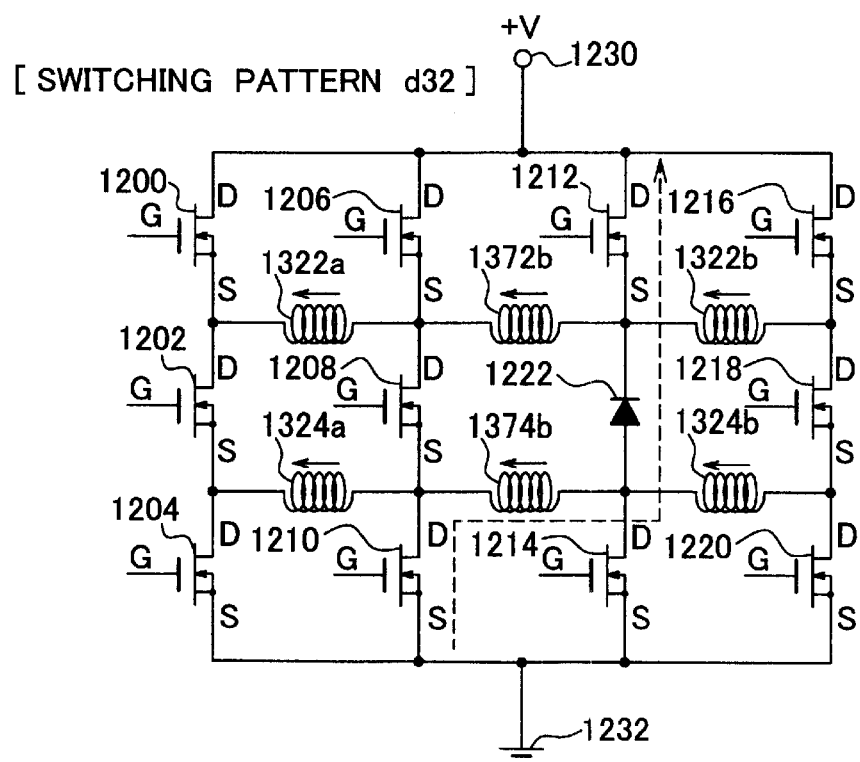

At the time point t67, the processor temporarily sets a switching pattern d32 indicated in FIG. 30D. In the switching pattern d32, the processor outputs the OFF signals to all the switching elements 1200–1220. Therefore, a regenerative current occurs as indicated by a broken line arrow in FIG. 30D, so that the separating current through the lower coil 1374b rapidly decreases. Then, the processor immediately resumes a state where the switching pattern c32 and the switching pattern f32 are alternated. In this case, however, the proportion of the switching pattern c32 is reduced, in comparison with the pattern alternating state during the time period t66–t67. In this manner, the quantity of current flowing through the lower coil 1374b is kept at a normal level of the drawing current.

At this moment, the armature 110 is sufficiently apart from the upper core 116. Therefore, although the current through the lower coil 1374b is set to the normal level of the drawing current, the armature 110 is not returned to the upper core 116 by the magnetic force from the upper magnet 116d. Afterwards, due to the drawing current and the force from the upper spring 120, the armature 110 rapidly moves away from the upper core 116, and approaches the lower core 118, and armature 110 finally contacts the lower core 118 by overcoming the force from the lower spring 106.

At a time point t68 after the armature 110 comes into contact with the lower core 118, the processor temporarily changes the switching pattern to the switching pattern d32 shown in FIG. 30D. Therefore, a regenerative current occurs, so that the drawing current through the lower coil 1374b rapidly decreases. Then, the processor immediately resumes a state where the switching pattern c32 and the switching pattern f32 are alternated. In this case, however, the proportion of the switching pattern c32 is reduced, in comparison with the pattern alternating state during the time period t67–t68. In this manner, the quantity of current supplied through the lower coil 1374b is reduced to the level of the holding current, whereby the contact between the armature 110 and the lower core 118 is maintained. Thus, the exhaust port of the second cylinder is set to the fully open state.

Subsequently, at a time point t69 near or at a timing at which the exhaust stroke of the second cylinder comes to an end, the switching pattern is changed to the switching pattern d32 indicated in FIG. 30D. Therefore, a regenerative current occurs, so that the holding current flowing through the lower coil 1374b rapidly discontinues.

After the armature 110 loses the attraction force to the lower core 118 as described above, the armature 110 starts to move toward the upper core 116, or toward the completely closed state, due to the force from the lower spring 106. Therefore, the valve body 100 approaches the valve seat 126, as the amount of valve lift starts to decrease.

Subsequently at a time point t70, the processor changes the switching pattern to a switching pattern a32 indicated in FIG. 30A, in order to draw the armature 110 into contact with the upper core 116. As a result, the drawing current flows through the upper coil 1372b. Afterwards, a drawing current is maintained by alternating the switching pattern a32 and a switching pattern e32 indicated in FIG. 30E, until the armature 110 contacts the upper core 116.

In the switching pattern a32, the processor outputs the ON signals to the switching elements 1208, 1210, and 1212, and outputs the OFF signals to the other switching elements. As a result, a current flows from the high potential side terminal 1230 to the low potential side terminal 1232 as indicated by a broken line allow in FIG. 30A, so that a current flows through the upper coil 1372b of the exhaust valve of the second cylinder in the forward direction.

In the switching pattern e32, the processor outputs the ON signals to the switching elements 1212, and outputs the OFF signals to the other switching elements. Therefore, a current circulation path is formed through which current flows in a sequence of the upper coil 1372b and the switching elements 1206 and 1212. Immediately after the switching pattern a32 is changed to the switching pattern e32, a flywheel current flows through the circulation path as indicated by a broken line arrow in FIG. 30E. Therefore, by adjusting the proportion between the switching pattern a32 and the switching pattern e32, the quantity of current flowing through the upper coil 1372b in the forward direction can be adjusted.

At a time point t71 after the armature 110 comes into contact with the upper core 116, the switching pattern is changed to a switching pattern b32 indicated in FIG. 30B. In the switching pattern b32, the processor outputs the OFF signals to all the switching elements 1200–1220. Therefore, a regenerative current occurs as indicated by a broken line arrow in FIG. 30B, so that the drawing current flowing through the upper coil 1372b rapidly discontinues.

Even after the drawing current discontinues, the contact between the armature 110 and the upper core 116 is maintained by the magnetic attraction force from the upper magnet 116d. In this manner, the exhaust port of the second cylinder is set to the completely closed state.

Thus, the two intake valves of first cylinder and the exhaust valve of the second cylinder are driven in the opening and closing directions by the drive circuit 1292a, which includes the eleven switching elements 1200–1220 and the diode 1222.

Figure 29E:
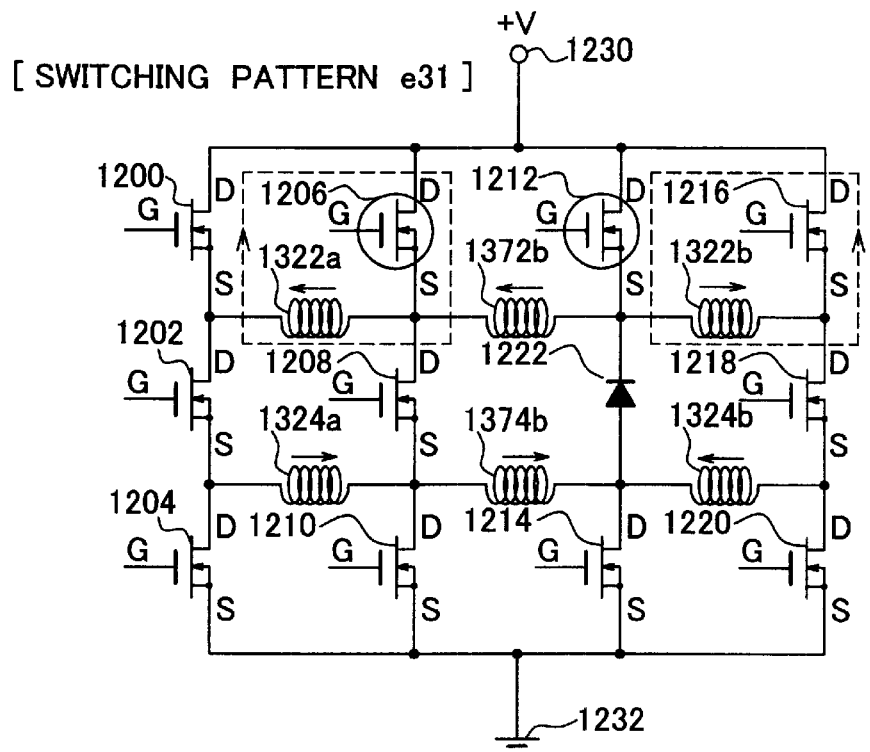
Figure 29F:
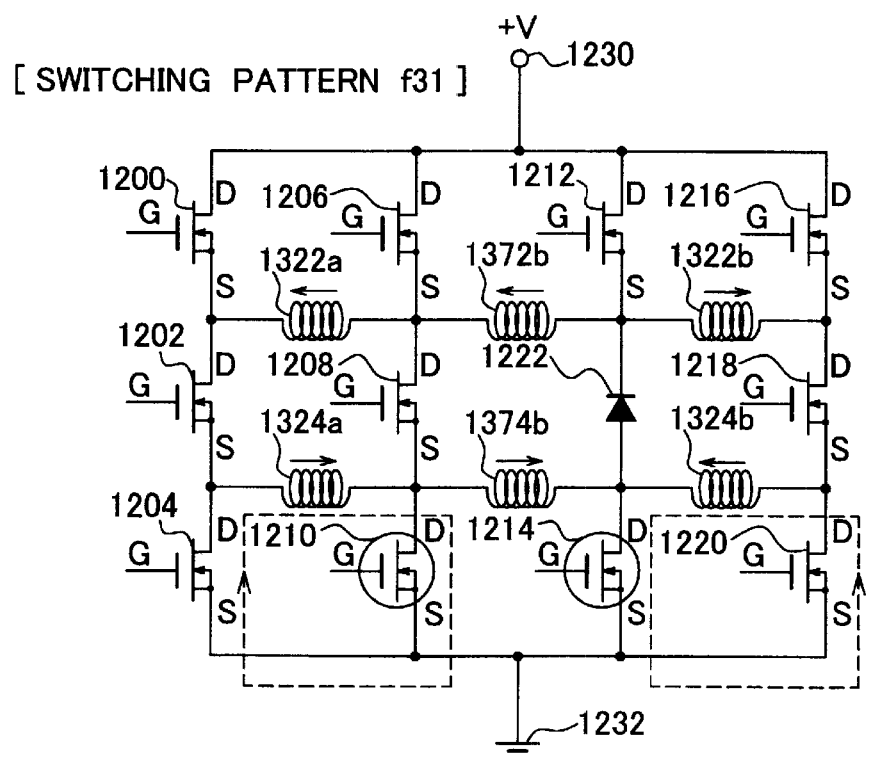

From the foregoing description, it should be understood that the switching elements 1200–1220 and the diode 1222 used to conduct current to drive the upper coils 1322a, and 1322b as indicated in FIGS. 29A, 29B and 29E are the same as the switching elements 1200–1220 and the diode 1222 used to conduct current to drive the lower coils 1324a, 1324b as indicated in FIGS. 29C, 29D and 29F. These elements are shared by the upper coils 1322a, and 1322b and the lower coils 1324a, 1324b.

Figure 30E:
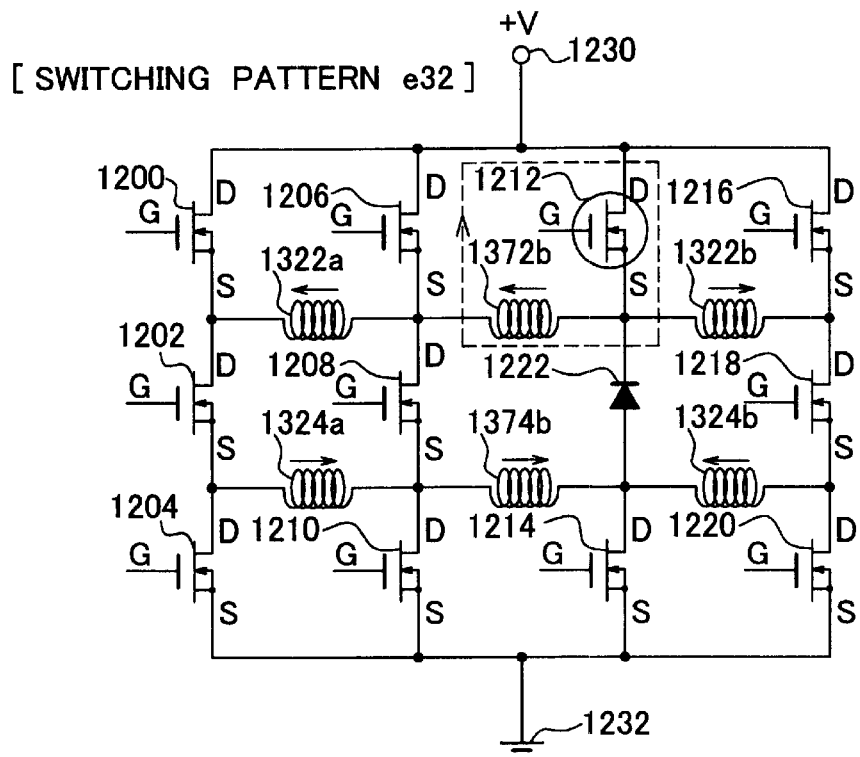
Figure 30F:
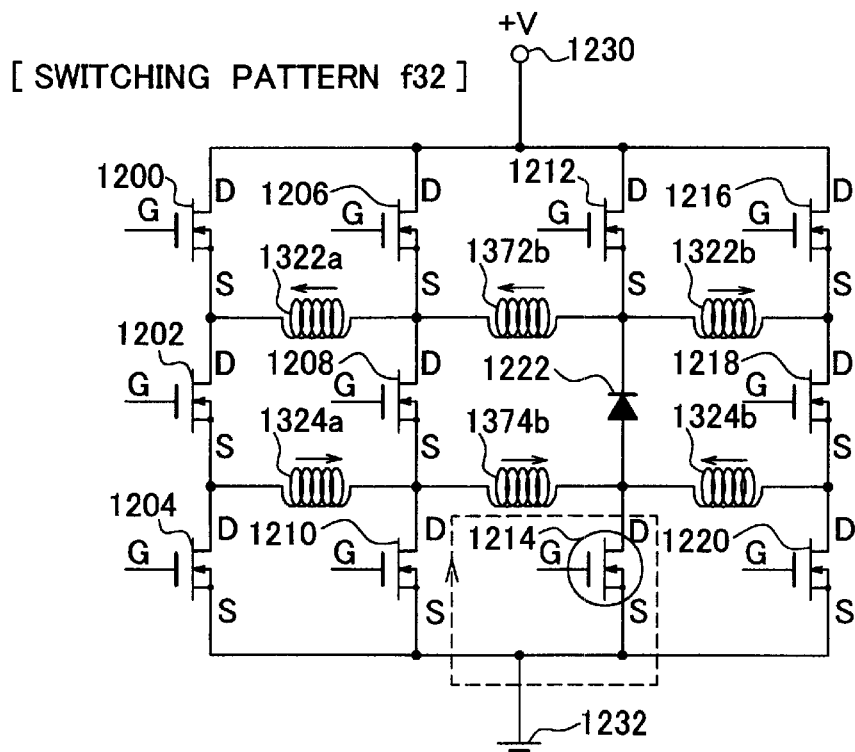

Furthermore, it should be understood that the switching elements 1206–1214 and the diode 1222 caused to conduct current to drive the upper coil 1372b as indicated in FIGS. 30A, 30B and 30E are the same as the switching elements 1206–1214 and the diode 1222 used to conduct current to drive the lower coil 1374*b* as indicated in FIGS. 30C, 30D and 30F. These elements are shared by the upper coil 1372*b* and the lower coil 1374*b*.

Still further, through comparison between the switching elements 1200–1220 and the diode 1222 used to conduct current to drive the upper coils 1322*a*, and 1322*b* and the lower coils 1324*a*, and 1324*b* of the two intake valves of the first cylinder as indicated in FIGS. 29A to 29F and the switching elements 1206–1214 and the diode 1222 used to conduct current to drive the upper coil 1372*b* and the lower coil 1374*b* of the exhaust valve of the second cylinder as indicated in FIGS. 30A to 30F, it should be understood that the switching elements 1206–1214 and the diode 1222 are shared.

A configuration substantially similar as that of the drive circuit 1292*a* is adopted to form the drive circuit 1292*b* for driving the two intake valves of the second cylinder and the exhaust valve of the fourth cylinder, the drive circuit 1292*c* for driving the two intake valves of the third cylinder and the exhaust valve of the first cylinder, and the drive circuit 1292*d* for driving the two intake valves of the fourth cylinder and the exhaust valve of the third cylinder. In these three drive circuits 1292*b*, 1292*c*, and 1292*d*, the switching elements and the diode are shared as described above in conjunction with the drive circuit 1292*a*, and control is performed in substantially the same pattern as indicated in FIG. 28 to open and close the intake and exhaust valves.

Therefore, the drive circuit portion, equipped with the four drive circuits 1292*a*–1292*d*, is able to drive a total of twelve valves of the four cylinders. Thus, the eight intake valves and the four exhaust valves, in combinations substantially similar as those in embodiments depicted in FIG. 26.

Embodiment 4, employing the eleven switching elements 1200–1220 and the diode 1222, are able to drive the intake and exhaust valves constructed in the same manner as those in embodiments described above. Thus, embodiments of the present invention reduces the number of switching elements by one from the number described in previous embodiments, and allows the use of a less expensive diode 1222.

Therefore, embodiments of the present invention reduce the number of switching elements employed, and allows further reductions in size and cost of the drive circuit portion for the intake and exhaust valves formed as electromagnetic valves.

The number of electrically conductive wires is reduced, so that the thickness of a wire harness disposed in a vehicle can be reduced, thus contributing to size and weight reductions.

Figure 31:
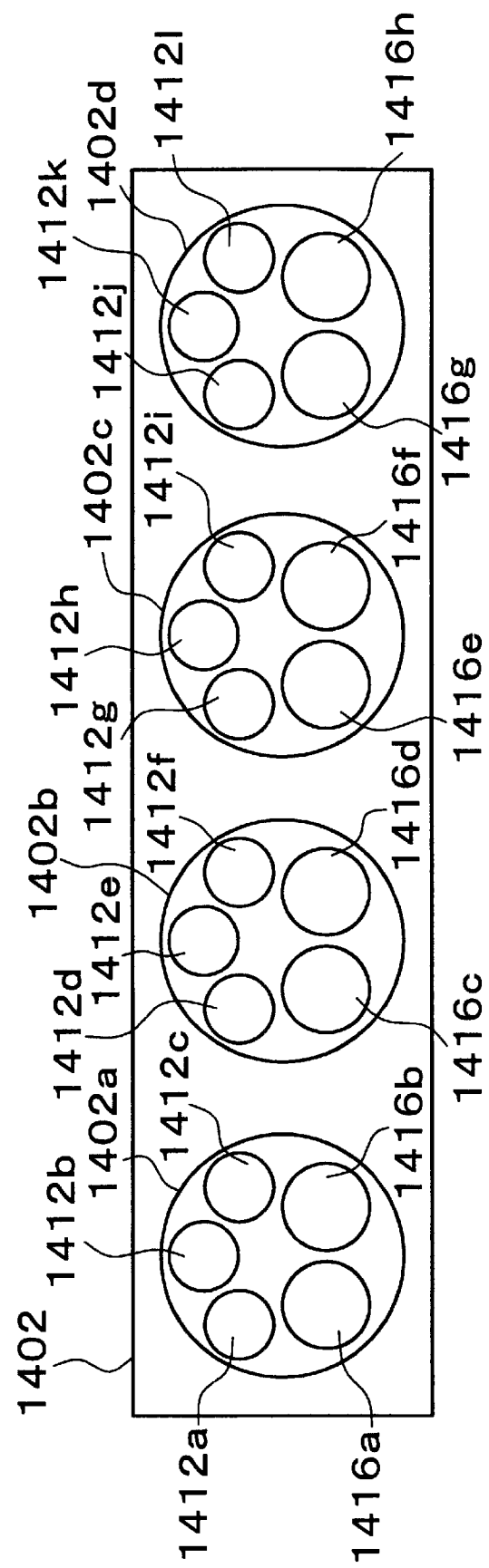
FIG. 31 is a diagram illustrating a valve arrangement according to another embodiment of the present invention.

As shown in a schematic diagram of FIG. 31, this embodiment of present invention differ from previous embodiments in that an engine 1402 is a four-cylinder five-valve engine in which the cylinders 1402*a*, 1402*b*, 1402*c*, and 1402*d* each have three intake valves 1412*a*, 1412*b*, 1412*c*, 1412*d*, 1412*e*, 1412*f*, 1412*g*, 1412*h*, 1412*i*, 1412*j*, 1412*k*, and 1412*l*, and two exhaust valves 1416*a*, 1416*b*, 1416*c*, 1416*d*, 1416*e*, 1416*f*, 1416*g*, and 1416*h*.

Figure 32:
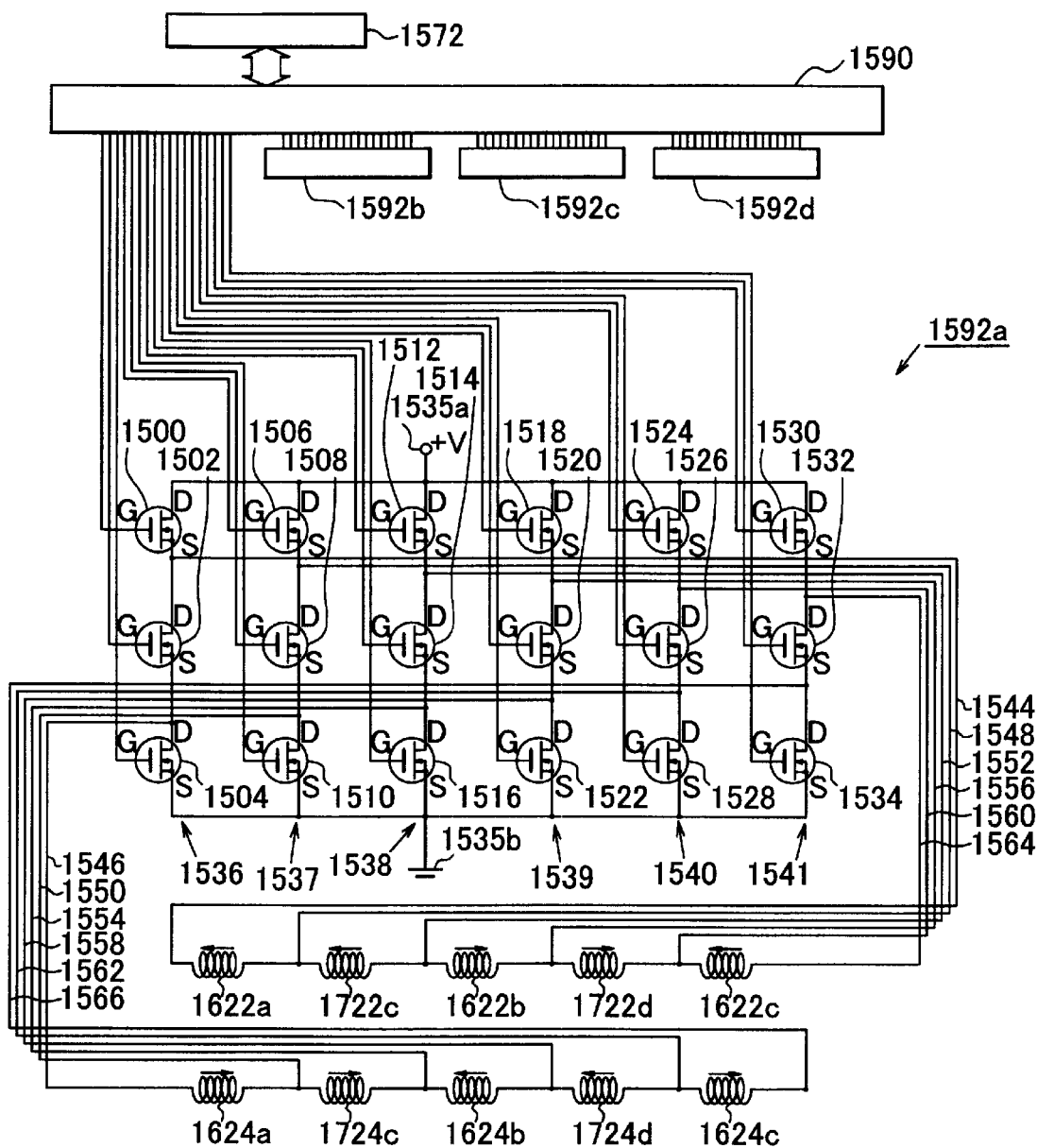
FIG. 32 is a diagram illustrating a construction of a drive circuit according to the embodiment of FIG.31.

Furthermore, corresponding to the different number of valves, this embodiment differs from previous embodiments in the construction of drive circuits 1592*a*, 1592*b*, 1592*c*, and 1592*d* that are driven and controlled by a processor via an output port 1572 and a buffer circuit 1590 as indicated in FIG. 32, and the combinations of object valves to be driven, as described below. The drive circuits 1592*a*, 1592*b*, 1592*c*, and 1592*d* are three-switching element in-series type drive circuits.

The drive circuits 1592*b*, 1592*c*, and 1592*d* have the same configuration as the drive circuit 1592*a*. Therefore, the drive circuit 1592*a* will be described as representative of other drive circuits. Other configurations of the embodiments of the present invention are substantially similar as those of previous embodiments, unless otherwise noted.

The drive circuit 1592*a* is formed by eighteen switching elements 1500, 1502, 1504, 1506, 1508, 1510, 1512, 1514, 1516, 1518, 1520, 1522, 1524, 1526, 1528, 1530, 1532, and 1534. The switching elements 1500–1534 form six series circuits 1536, 1537, 1538, 1539, 1540, and 1541 each of which includes three of the switching elements connected in series. The series circuits 1536–1541 are connected in parallel between a high potential side terminal 1535*a* and a low potential side terminal 1535*b*.

In the series circuit 1536 formed by three switching elements 1500, 1502, and 1504, a series connecting portion between the switching elements 1500, and 1502 is connected with an end of an electrically conductive wire 1544. Similarly, a series connecting portion between the switching elements 1502, and 1504 is connected with an end of an electrically conductive wire 1546. In the series circuit 1537 formed by three switching elements 1506, and 1508, 1510, a series connecting portion between the switching elements 1506, 1508 is connected with an end of an electrically conductive wire 1548. A series connecting portion between the switching elements 1508, and 1510 is connected with an end of an electrically conductive wire 1550. In the series circuit 1538 formed by three switching elements 1512, 1514, and 1516, a series connecting portion between the switching elements 1512, and 1514 is connected with an end of an electrically conductive wire 1552, and a series connecting portion between the switching elements 1514, and 1516 is connected with an end of an electrically conductive wire 1554. In the series circuit 1539 formed by three switching elements 1518, 1520, and 1522, a series connecting portion between the switching elements 1518, and 1520 is connected with an end of an electrically conductive wire 1556. A series connecting portion between the switching elements 1520, and 1522 is connected with an end of an electrically conductive wire 1558. In the series circuit 1540 formed by three switching elements 1524, 1526, and 1528, a series connecting portion between the switching elements 1524, and 1526 is connected with an end of an electrically conductive wire 1560. A series connecting portion between the switching elements 1526, and 1528 is connected with an end of an electrically conductive wire 1562. In the series circuit 1541 formed by three switching elements 1530, 1532, and 1534, a series connecting portion between the switching elements 1530, and 1532 is connected with an end of an electrically conductive wire 1564. A series connecting portion between the switching elements 1532, and 1534 is connected with an end of an electrically conductive wire 1566.

Of these wires, the conductive wire 1544 is connected to an end of an upper coil 1622*a* incorporated in the first intake valve 1412*a* of the cylinder 1402*a*. The conductive wire 1548 is connected to the other end of the upper coil 1622*a* and to an end of an upper coil 1722*c* incorporated in the first exhaust valve 1416*c* of the cylinder 1402*b*. The conductive wire 1552 is connected to the other end of the upper coil 1722*c* and to an end of an upper coil 1622*b* incorporated in the second intake valve 1412*b* of the cylinder 1402*a*. The conductive wire 1556 is connected to the other end of the upper coil 1622*b* and to an end of an upper coil 1722*d* incorporated in the second exhaust valve 1416*d* of the cylinder 1402*b*. The conductive wire 1560 is connected to the other end of the upper coil 1722*d* and to an end of an upper coil 1622*c* incorporated in the third intake valve 1412*c* of the cylinder 1402*a*. The conductive wire 1564 is connected to the other end of the upper coil 1622*c*.

The conductive wire 1546 is connected to an end of a lower coil 1624*a* incorporated in the first intake valve 1412*a* of the cylinder 1402*a*. The conductive wire 1550 is connected to the other end of the lower coil 1624*a* and to an end of a lower coil 1724*c* incorporated in the first exhaust valve 1416*c* of the cylinder 1402*b*. The conductive wire 1554 is connected to the other end of the lower coil 1724*c* and to an end of a lower coil 1624*b* incorporated in the second intake valve 1412*b* of the cylinder 1402*a*. The conductive wire 1558 is connected to the other end of the lower coil 1624*b* and to an end of a lower coil 1724*d* incorporated in the second exhaust valve 1416*d* of the cylinder 1402*b*. The conductive wire 1562 is connected to the other end of the lower coil 1724*d* and to an end of a lower coil 1624*c* incorporated in the third intake valve 1412*c* of the cylinder 1402*a*. The conductive wire 1566 is connected to the other end of the lower coil 1624*c*.

Thus, the connections between the series circuit 1536 and the series circuit 1537 and the connections between the series circuit 1538 and the series circuit 1539 are accomplished by the electromagnetic coils 1622*a*, 1622*b*, 1622*c*, 1624*a*, 1624*b*, and 1624*c* provided in the three intake valves 1412*a*, 1412*b*, and 1412*c*, which perform identical operations on the cylinder 1402*a*. Furthermore, the connections between the series circuit 1537 and the series circuit 1538 and the connections between the series circuit 1539 and the series circuit 1540 are accomplished by the electromagnetic coils 1722*c*, 1722*d*, 1724*c*, and 1724*d* provided in the two exhaust valves 1416*c*, and 1416*d*, which perform identical operations on the cylinder 1402*b*. Thus, in the drive circuit 1592*a*, the inter-series circuit connections accomplished by the electromagnetic coils 1622*a*, 1622*b*, 1622*c*, 1624*a*, 1624*b*, and 1624*c* of the three intake valves 1412*a*, 1412*b*, and 1412*c* of the cylinder 1402*a*, and the inter-series circuit connections accomplished by the electromagnetic coils 1722*c*, and 1722*d*, 1724*c*, and 1724*d* of the two exhaust valves 1416*c*, and 1426*d* of the cylinder 1402*b* are alternately arranged. In this manner, the drive circuit 1592*a* is provided collectively for the group of valves consisting of the five valves 1412*a*, 1412*b*, 1412*c*, 1416*c*, and 1416*d*.

The processor controls output signals to the gate terminals G of the switching elements 1500–1534 via the output port 1572 and the buffer circuit 1590. Therefore, the state of activation of the electromagnetic coils 1622*a*, 1722*c*, 1622*b*, 1722*d*, 1622*c*, 1624*a*, 1724*c*, 1624*b*, 1724*d*, and 1624*c* is controlled so that a control of opening and closing the three intake valves 1412*a*–1412*c* of the cylinder 1402*a* and the two exhaust valves 1416*c*, and 1416*d* of the cylinder 1402*b* is performed.

As indicated in the valve timing chart of FIG. 6, the open valve period of the three intake valves 1412*a*–1412*c* of the cylinder 1402*a* and the open valve period of the two exhaust valves 1416*c*, and 1416*d* of the cylinder 1402*b* do not overlap. Thus, the drive circuit 1592*a* illustrated in FIG. 32 is provided collectively for the three intake valves 1412*a*–1412*c* of the cylinder 1402*a* and the two exhaust valves 1416*c*, and 1416*d* of the cylinder 1402*b*, whose open valve periods do not overlap.

The opening and closing operations of the three intake valves 1412–1412*c* of the cylinder 1402*a* and the two exhaust valves 1416*c*, and 1416*d* of the cylinder 1402*b* caused by supply of control currents from the ECU will be described below. A timing chart depicted in FIG. 33 indicates the operations of the five valves 1412*a*–1412*c*, 1416*c*, and 1416*d*.

Figure 33:
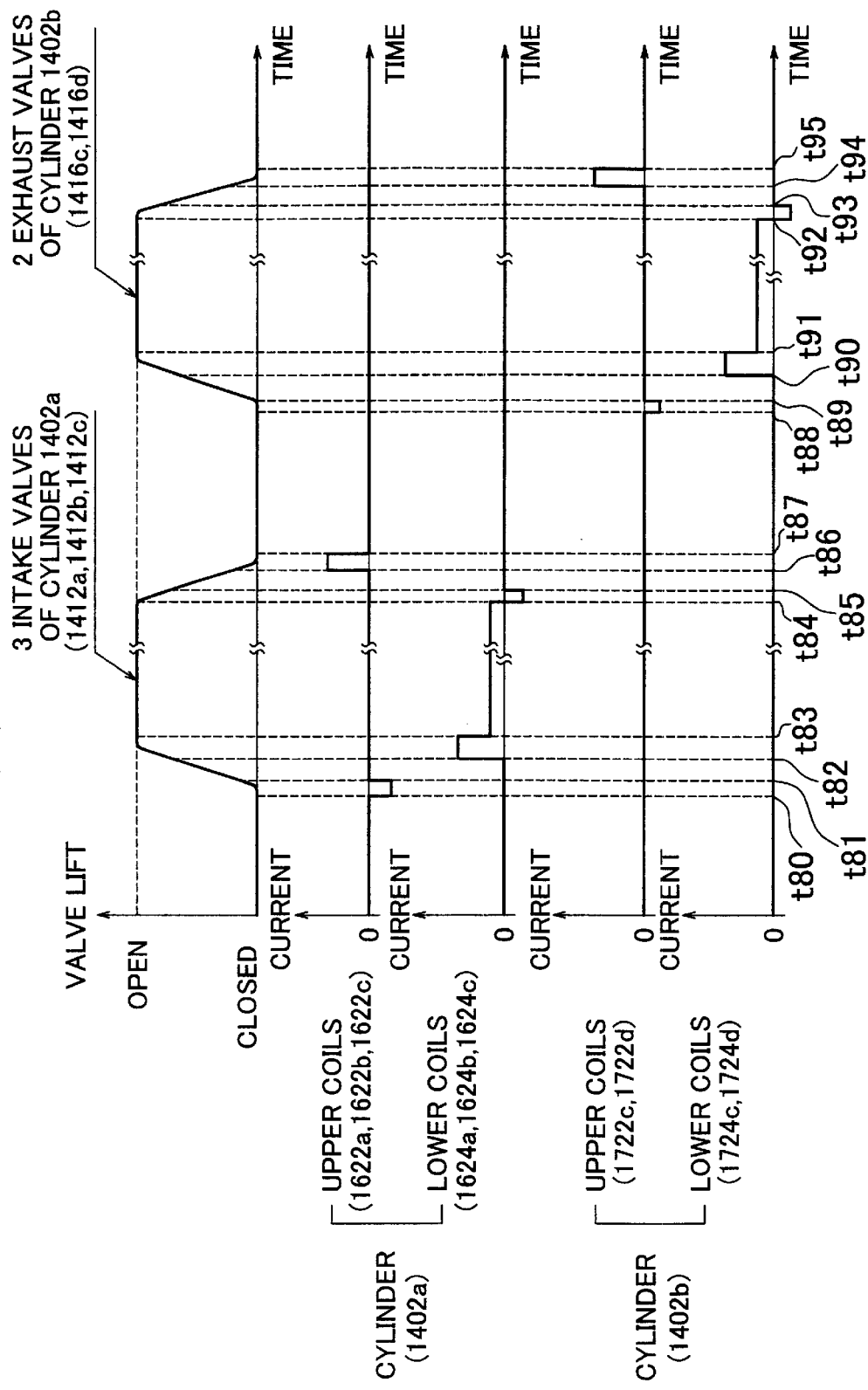
FIG. 33 is a timing chart indicating the operations of intake/exhaust valves and the current control according to the embodiment of FIG. 31.

FIGS. 34A to 34F and FIGS. 35A to 35F are circuit diagrams indicating states of control performed on the drive circuit 1592*a* depicted in FIG. 32 to realize the operations indicated in FIG. 33. In FIGS. 34A to 34F and 35A to 35F, the conductive wires 1544–1566 are omitted. Furthermore, in FIGS. 34A to 34F and 35A to 35F, broken line arrows and circles "□" have the same states as described above in conjunction with previously described embodiments of the present invention.

Before a time point t80 indicated in FIG. 33, the armatures 110 are brought into contact with the upper cores 116 as depicted in FIG. 10 by temporary excitation of the upper coils 1622*a*, 1722*d*, 1622*b*, 1722*d*, and 1622*c*, and that this contact state is maintained by the magnetic attraction force of the upper magnets 116*d*. Therefore, the valve bodies 100 are in contact with the valve seats 126 because the three intake valves 1412*a*–1412*c* of the cylinder 1402*a* and the two exhaust valves 1416*c*, 1416*d* of the cylinder 1402*b* are in a completely closed state. The OFF signals are outputted to all the eighteen switching elements 1500–1534.

Figure 34A:
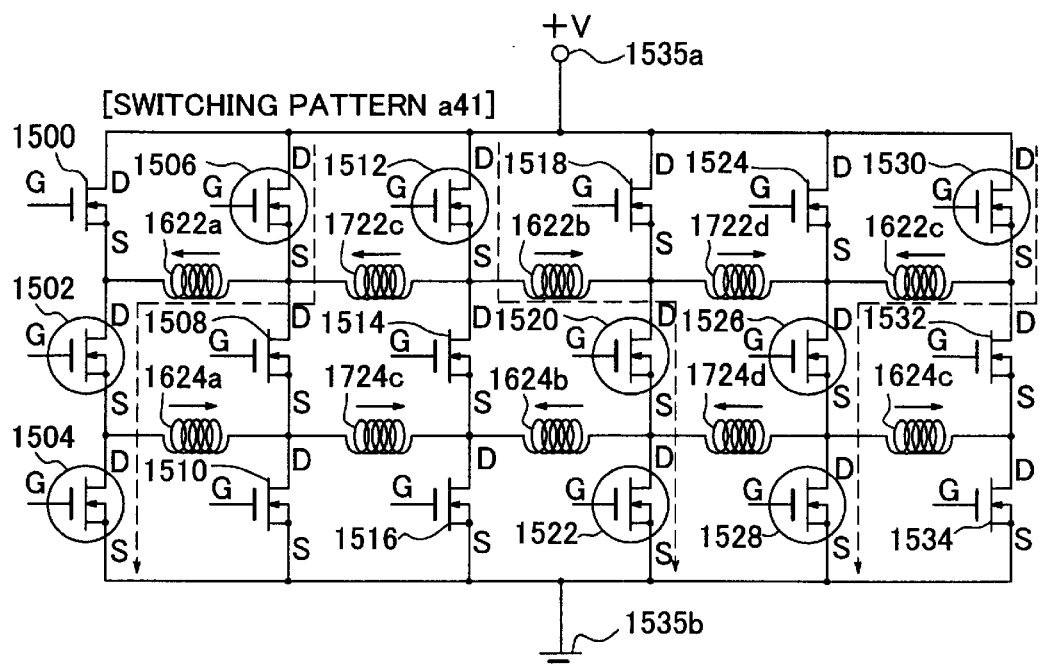
FIGS. 34A to 34F are circuit diagrams for illustrating the control of current according to the embodiment of FIG. 31.
Figure 34B:
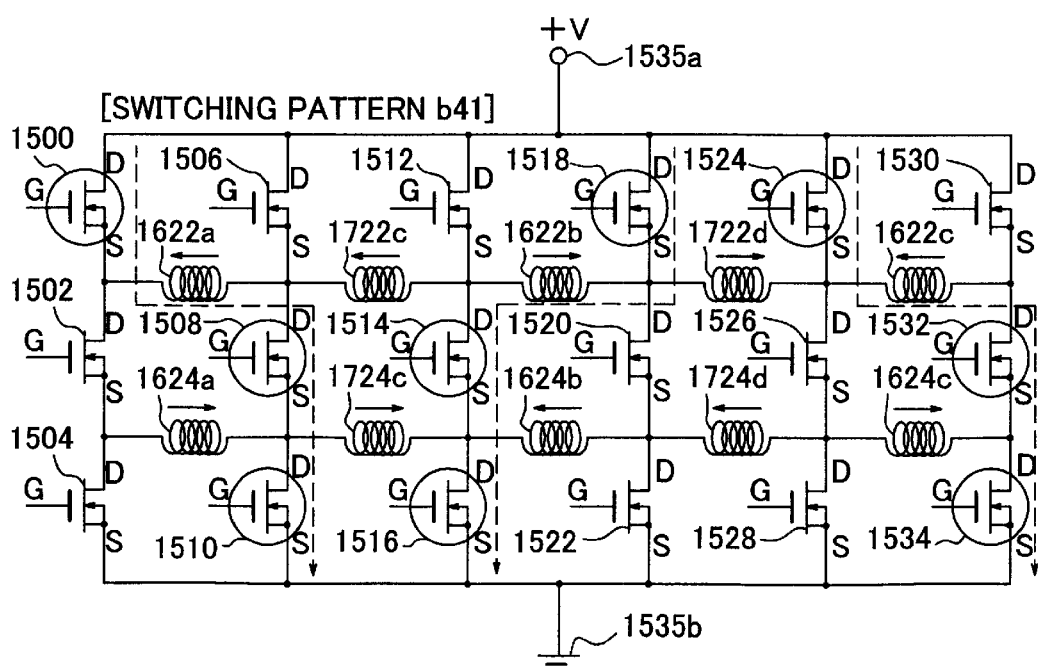

At the time of the intake stroke of the cylinder 1402*a*, the processor outputs the ON signals to the switching elements 1500, 1508, 1510, 1514, 1516, 1518, 1524, 1532, and 1534 and outputs the OFF signals to the other switching elements during a time period of t80–t81, so as to establish a switching pattern b41 indicated in FIG. 34B. As a result, currents flow from the high potential side terminal 1535*a* to the low potential side terminal 1535*b* as indicated by broken line arrows in FIG. 34B, so that releasing currents flow through the upper coils 1622*a*–1622*c* in a reverse direction so as to cancel out the magnetic fluxes from the upper magnets 116*d*.

Therefore, the magnetic attraction force on the armatures 110 created by the upper cores 116 discontinues. As a result, the armatures 110 start to move toward the lower cores 118, or toward a fully open state, due to the force from the upper springs 120. Hence, the valve bodies 100 start to move apart from the valve seats 126, and the amount of valve lift starts to increase.

After that, at the time point t81, the processor outputs the ON signals to the switching elements 1502, 1504, 1506, 1512, 1520, 1522, 1526, 1528, and 1530, and outputs the OFF signals to the other switching elements, so as to establish a switching pattern a41 indicated in FIG. 34A. Therefore, regenerative currents flow in a direction opposite to the direction indicated by broken line arrows in FIG. 34A, so that the releasing currents through the upper coils 1622*a*–1622*c* rapidly discontinue. Then, the processor immediately outputs the OFF signals to all the switching elements 1500–1534 to maintain the current discontinued state of the upper coils 1622*a*–1622*c*.

At the time point t81 when the releasing currents through the upper coils 1622*a*–1622*c* discontinue, the armatures 110 are sufficiently apart from the upper cores 116. The armatures 110 are not returned to the upper cores 116 by the magnetic forces from the upper magnets 116*d*. Afterwards, the armatures 110 are moved apart from the upper cores 116 toward the lower cores 118 by the forces from the upper springs 120.

Figure 34C:
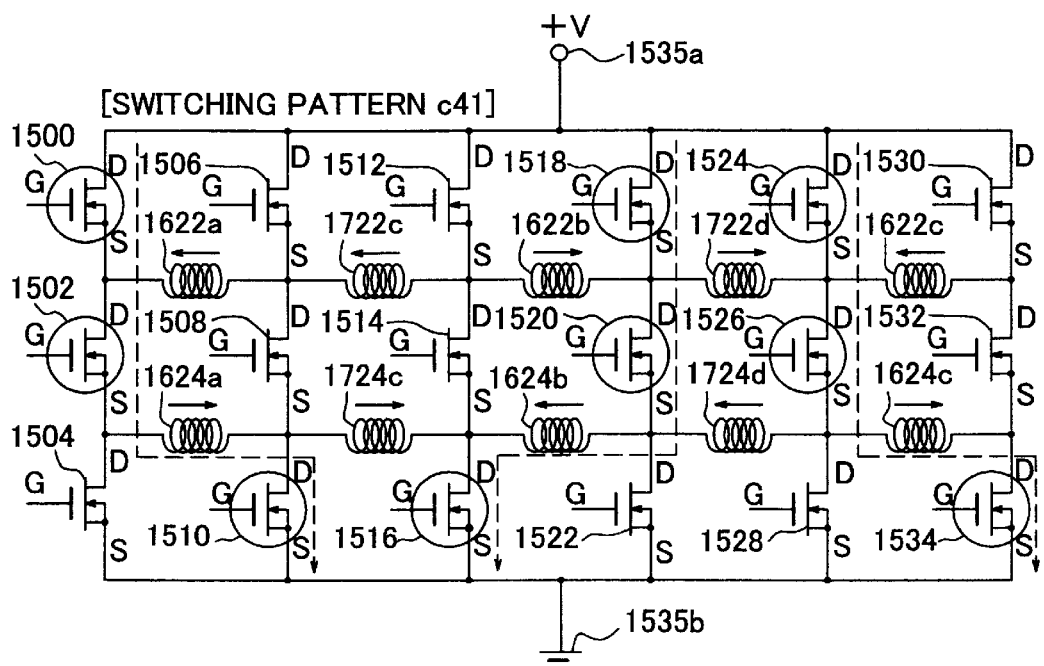

Subsequently at a time point t82, the processor outputs the ON signals to the switching elements 1500, 1502, 1510, 1516, 1518, 1520, 1524, 1526, and 1534, and outputs the OFF signals to the other switching elements so as to set a switching pattern c41 indicated in FIG. 34C. Therefore, currents flow from the high potential side terminal 1535*a* to the low potential side terminal 1535*b* as indicated by broken line arrows in FIG. 34C. Currents flow through the lower coils 1624a–1624c of the three intake valves 1412a–1412c of the cylinder 1402a in the forward direction. Then, until a time point t83, the switching pattern c41 and a switching pattern f41 indicated in FIG. 34F are alternated to maintain the drawing currents for magnetically drawing the armatures 110 to the lower cores 118. Therefore, when approaching the lower cores 118, the armatures 110 come into contact with the lower cores 118 by overcoming the forces from the lower springs 106.

In the switching pattern f41, the processor outputs the ON signals to the switching elements 1510, 1516, and 1534, and outputs the OFF signals to the other switching elements. Therefore, a current circulation path is formed through which current flows in a sequence of the lower coil 1624a and the switching elements 1510 and 1504. A current circulation path is formed through which current flows in a sequence of the lower coil 1624b and the switching elements 1516 and 1522. A current circulation path is formed through which current flows in a sequence of the lower coil 1624c and the switching elements 1534 and 1528. Immediately after the switching pattern c41 is changed to the switching pattern f41, flywheel currents flow through these circulation paths as indicated by broken line arrows in FIG. 34F. Therefore, by adjusting the proportion between the switching pattern c41 and the switching pattern f41, the quantity of current flowing through the lower coils 1624a–1624c in the forward direction can be adjusted.

Figure 34D:
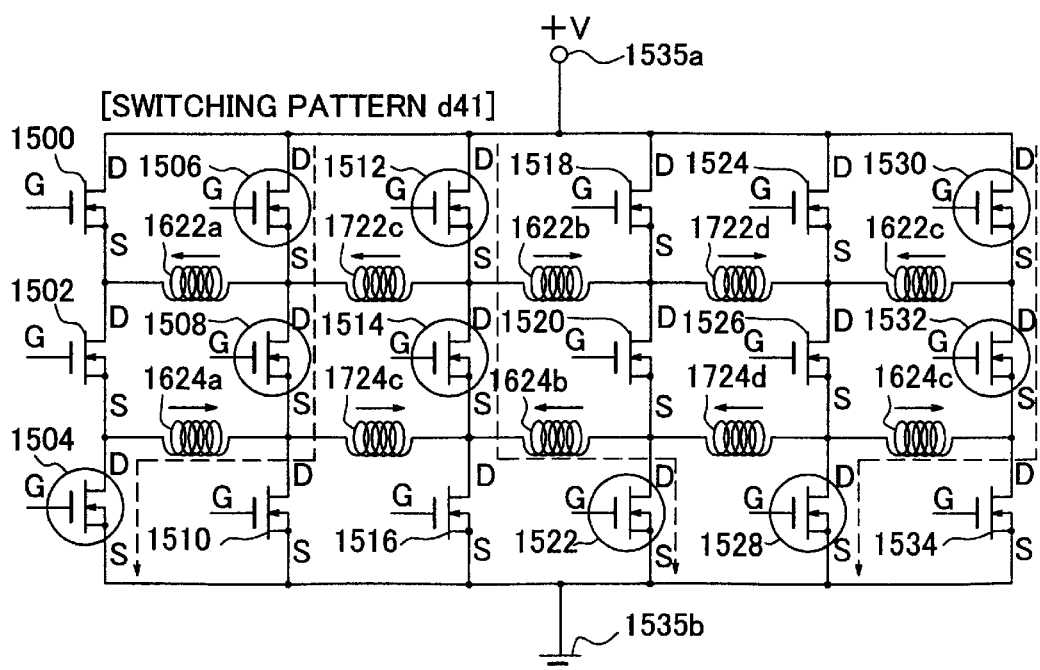

At the time point t83 after the armatures 110 come into contact with the lower cores 118, the switching pattern is temporarily changed to a switching pattern d41 indicated in FIG. 34D. In the switching pattern d41, the processor outputs the ON signals to the switching elements 1504, 1506, 1508, 1512, 1514, 1522, 1528, 1530, and 1532, and outputs the OFF signals to the other switching elements. Therefore, regenerative currents occur in the direction opposite to the direction indicated by broken line arrows in FIG. 34D, so that the drawing currents through the lower coils 1624a–1624c rapidly decrease. Immediately after, the state of alternating the switching pattern c41 and the switching pattern f41 is resumed. In this case, however, the proportion of the switching pattern c41 is reduced, in comparison with the pattern alternating state during the time period t82–t83. In this manner, the quantity of current flowing through the lower coils 1624a–1624c is kept at the level of the holding current so as to maintain the contact between the armatures 110 and the lower cores 118. While the armatures 110 are held in contact with the lower cores 118 by the magnetic force created by continuously supplying the holding currents through the lower coils 1624a–1624c, the valve bodies 100 are farthest apart from the valve seats 126 as indicated in FIG. 11, the intake ports of the cylinder 1402a remain in the fully open state.

Subsequently, at a time point t84 near or at a timing at which the intake stroke of the cylinder 1402a comes to an end, the switching pattern is changed to the switching pattern d41 indicated in FIG. 34D. Therefore, regenerative currents occur in the direction opposite to the direction indicated by the broken line arrows in FIG. 34D, so that the holding currents through the lower coils 1624a–1624c of the three intake valves 1412a–1412c of the cylinder 1402a rapidly discontinue. Then, the releasing currents flow through the lower coils 1624a–1624c in the reverse direction. Subsequently at a time point t85, the switching pattern is temporarily changed to the switching pattern c41 indicated in FIG. 34C. Therefore, regenerative currents flow in the direction opposite to the direction indicated by the broken line arrows in FIG. 34C, so that the releasing currents through the lower coils 1624a–1624c rapidly discontinue. Then, the processor immediately outputs the OFF signals to all the switching elements 1500–1534 to maintain the current discontinued state of the lower coils 1624a–1624c.

After the armatures 110 thus lose the attraction force to the lower cores 118, the armatures 110 start to move toward the upper cores 116, or toward the completely closed state, due to the forces from the lower springs 106. Therefore, the valve bodies 100 approach the valve seats 126, as the amount of valve lift starts to decrease.

Subsequently at a time point t86, the CPU changes the switching pattern to the switching pattern a41 indicated in FIG. 34A, in order to draw the armatures 110 into contact with the upper cores 116. As a result, the drawing currents flow through the upper coils 1622a–1622c. Afterwards, a drawing current is maintained by alternating the switching pattern a41 and a switching pattern e41 indicated in FIG. 34E, until the armatures 110 contact the upper cores 116.

In the switching pattern e41, the processor outputs the ON signals to the switching elements 1506, 1512, and 1530, and outputs the OFF signals to the other switching elements. Therefore, a current circulation path is formed through which current flows in a sequence of the upper coil 1622a and the switching elements 1500 and 1506. A current circulation path is formed through which current flows in a sequence of the upper coil 1622b and the switching elements 1518 and 1512. A current circulation path is formed through which current flows in a sequence of the upper coil 1622c and the switching elements 1524 and 1530. Immediately after the switching pattern a41 is changed to the switching pattern e41, flywheel currents flow through these circulation paths as indicated by broken line arrows in FIG. 34E. Therefore, by adjusting the proportion between the switching pattern a41 and the switching pattern e41, the quantity of current flowing through the upper coils 1622a–1622c in the forward direction can be adjusted.

At a time point t87 after the armatures 110 come into contact with the upper cores 116, the switching pattern is temporarily changed to the switching pattern b41 indicated in FIG. 34B. Therefore, regenerative currents flow in the direction opposite to the direction indicated by the broken line arrows in FIG. 34B and the drawing currents through the upper coils 1622a–1622c rapidly discontinue. Then, the processor immediately outputs the OFF signals to all the switching elements 1500–1534 so as to maintain the current discontinued state of the upper coils 1622a–1622c.

Even after the drawing currents discontinue, the contact between the armatures 110 and the upper cores 116 is maintained by the magnetic attraction force from the upper magnets 116d. Thus, the valve bodies 100 are held in contact with the valve seats 126. Therefore, the intake ports of the cylinder 1402a are kept in the completely closed state.

After the state where the OFF signals are outputted to all the switching elements 1500–1534, a timing point occurs at which the exhaust stroke of the cylinder 1402b does not overlap the intake stroke of the cylinder 1402a. In this case, starting at a time point t88, the processor outputs the ON signals to the switching elements 1506, 1514, 1516, 1520, 1522, and 1524, and outputs the OFF signals to the other switching elements, to establish a switching pattern b42 indicated in FIG. 35B. Therefore, currents flow from the high potential side terminal 1535a to the low potential side terminal 1535b as indicated by broken line arrows in FIG. 35B, so that releasing currents flow through the upper coils 1722c, and 1722d of the exhaust valves 1416c, and 1416d of the cylinder 1402b to cancel out the magnetic fluxes from the upper magnets 116d.

Therefore, the magnetic attraction force on the armatures 110 created by the upper cores 116 disappears. As a result, the armatures 110 start to move toward the lower cores 118, or toward the fully open state, due to the force from the upper springs 120. Hence, the valve bodies 100 start to move apart from the valve seats 126, and the amount of valve lift starts to increase.

Figure 35A:
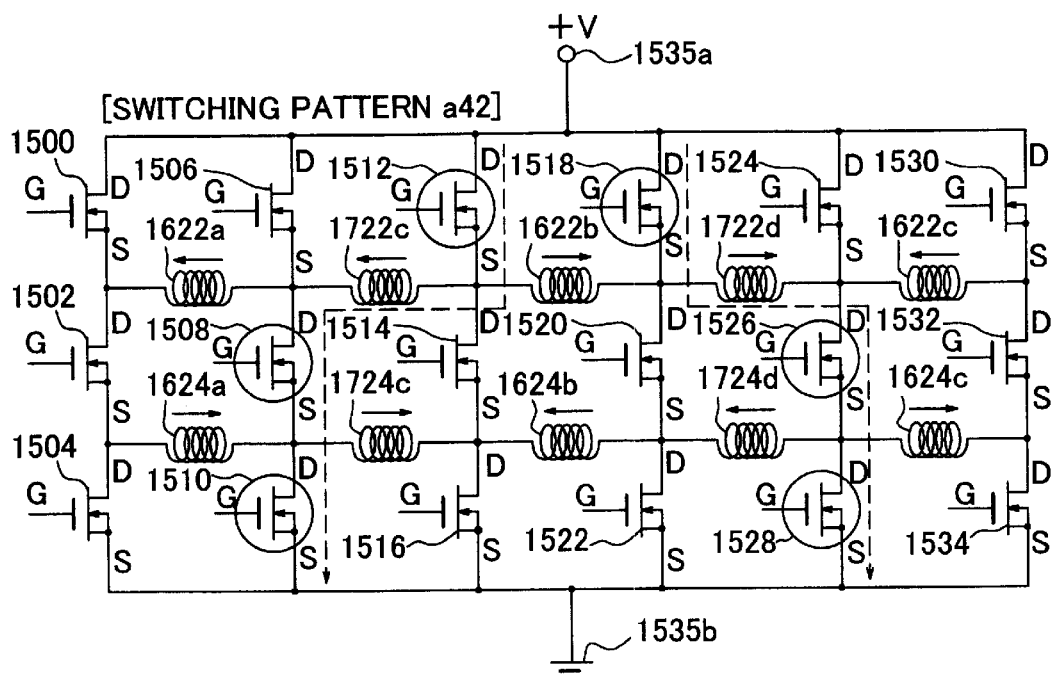
FIGS. 35A to 35F are circuit diagrams for illustrating the control of current according to the embodiment of FIG. 31.

Afterwards, at a time point t89, the processor outputs the ON signals to the switching elements 1508, 1510, 1512, 1518, 1526, and 1528, and outputs the OFF signals to the other switching elements to establish a switching pattern a42 indicated in FIG. 35A. Therefore, regenerative currents flow in the direction opposite to the direction indicated by broken line arrows in FIG. 35A, so that the releasing currents through the upper coils 1722c, 1722d rapidly discontinue. Then, the processor immediately outputs the OFF signals to all the switching elements 1500–1534 to maintain the current discontinued state of the upper coils 1722c, and 1722d.

At the time point t89 when the releasing currents through the upper coils 1722c, and 1722d discontinue, the armatures 110 are sufficiently apart from the upper cores 116, so that the armatures 110 are not returned to the upper cores 116 by the magnetic forces from the upper magnets 116d. Afterwards, the armatures 110 are moved apart from the upper cores 116 toward the lower cores 118 by the force from the upper springs 120.

Figure 35B:
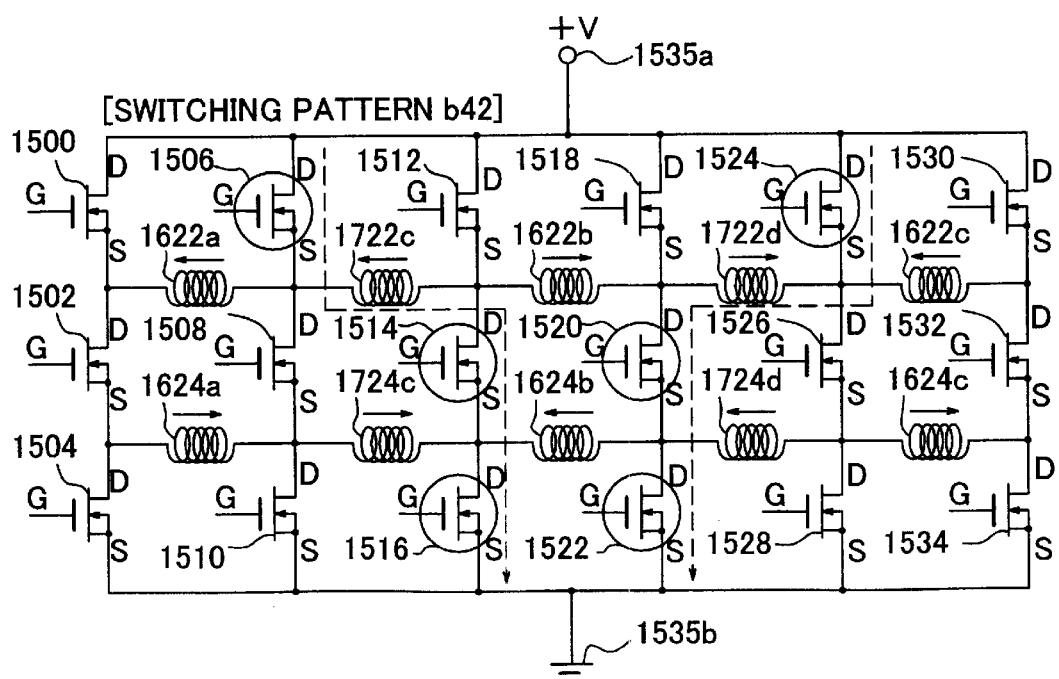
Figure 35C:
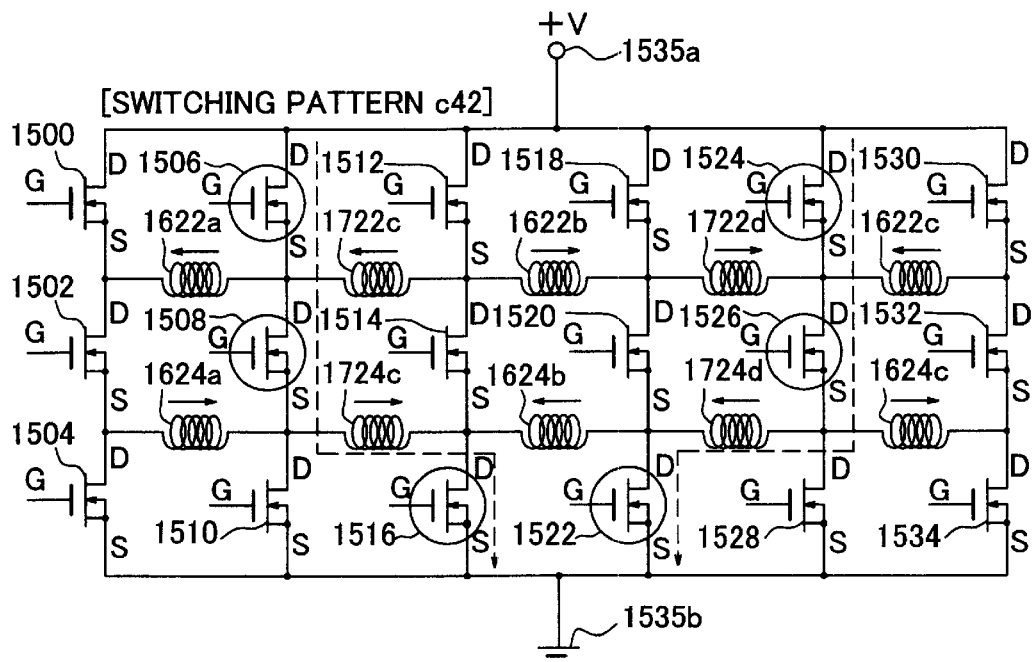

Subsequently at a time point t90, the processor outputs the ON signals to the switching elements 1506, 1508, 1516, 1522, 1524, and 1526, and outputs the OFF signals to the other switching elements to establish a switching pattern c42 indicated in FIG. 35C. Therefore, currents flow from the high potential side terminal 1535a to the low potential side terminal 1535b as indicated by broken line arrows in FIG. 35C, so that currents flow through the lower coils 1724c, and 1724d of the two exhaust valves 1416c, and 1416d of the cylinder 1402b in the forward direction. Then, until a time point t91, the switching pattern c42 and a switching pattern f42 indicated in FIG. 35F are alternated to maintain the drawing currents for magnetically drawing the armatures 110 into contact with the lower cores 118. Therefore, when approaching the lower cores 118, the armatures 110 come into contact with the lower cores 118, overcoming the force from the lower springs 106.

In the switching pattern f42, the processor outputs the ON signal to the switching elements 1516, and 1522, and outputs the OFF signals to the other switching elements. Therefore, a current circulation path is formed through which current flows in a sequence of the lower coil 1724c and the switching elements 1516 and 1510. A current circulation path is formed through which current flows in a sequence of the lower coil 1724d and the switching elements 1522 and 1528. Immediately after the switching pattern c42 is changed to the switching pattern f42, flywheel currents flow through the circulation paths as indicated by broken line arrows in FIG. 35F. Therefore, by adjusting the proportion between the switching pattern c42 and the switching pattern f42, the quantity of current flowing through the lower coils 1724c, and 1724d in the forward direction can be adjusted.

Figure 35D:
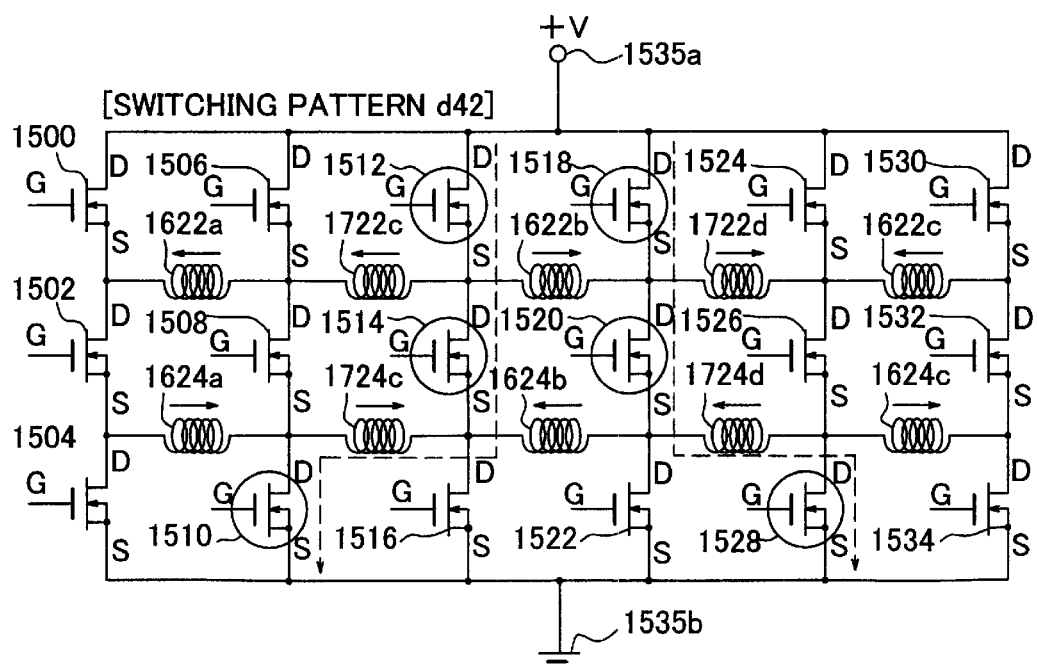

At the time point t91 after the armatures 110 come into contact with the lower cores 118, the switching pattern is temporarily changed to a switching pattern d42 indicated in FIG. 35D. In the switching pattern d42, the processor outputs the ON signals to the switching elements 1510, 1512, 1514, 1518, 1520, and 1528, and outputs the OFF signals to the other switching elements. Therefore, regenerative currents occur in the direction opposite to the direction indicated by broken line arrows in FIG. 35D, so that the drawing currents through the lower coils 1724c, 1724d rapidly decrease. Immediately after that, the state of alternating the switching pattern c42 and the switching pattern f42 is resumed. In this case, however, the proportion of the switching pattern c42 is reduced in comparison with the pattern alternating state during the time period t90–t91. In this manner, the quantity of current flowing through the lower coils 1724c, and 1724d in the forward direction is maintained at the level of the holding current to maintain the contact between the armatures 110 and the lower cores 118.

While the armatures 110 and the lower cores 118 are held in contact by continuously supplying the holding currents through the lower coils 1724c, and 1724d, the valve bodies 100 are held farthest from the valve seats 126 as depicted in FIG. 11, and therefore the exhaust ports of the cylinder 1402b remain in the fully open state.

Subsequently, at a time point t92 near or at a timing at which the exhaust stroke of the cylinder 1402b comes to an end, the switching pattern is changed to the switching pattern d42 indicated in FIG. 35D. Therefore, regenerative currents flow in the direction opposite to the direction indicated by the broken line arrows in FIG. 35D, so that the holding currents through the lower coils 1724c, and 1724d rapidly discontinue, and the releasing currents flow as indicated by the broken line arrows.

Subsequently at a time point t93, the switching pattern is temporarily changed to the switching pattern c42 indicated in FIG. 35C. Therefore, regenerative currents flow in the direction opposite to the direction indicated by the broken line arrows in FIG. 35C, so that the releasing currents through the lower coils 1724c, and 1724d rapidly discontinue. Then, the processor immediately outputs the OFF signals to all the switching elements 1500–1534 to maintain the current discontinued state of the lower coils 1724c, and 1724d.

After the armatures 110 lose the attraction force toward the lower cores 118 as described above, the armatures 110 start to move toward the upper cores 116, or toward the completely closed state, due to the force from the lower springs 106. Therefore, the valve bodies 100 approach the valve seats 126 by reducing the amount of valve lift.

Subsequently at a time point t94, the processor changes the switching pattern to the switching pattern a42 indicated in FIG. 35A, in order to draw the armatures 110 into contact with the upper cores 116. As a result, the drawing currents flow through the upper coils 1722c, and 1722d. Afterwards, a drawing current is maintained by alternating the switching pattern a42 and a switching pattern e42 indicated in FIG. 35E, until the armatures 110 contact the upper cores 116.

In the switching pattern e42, the processor outputs the ON signal to the switching elements 1512, and 1518, and outputs the OFF signals to the other switching elements. Therefore, a current circulation path is formed through which current flows in a sequence of the upper coil 1722c and the switching elements 1506 and 1512. A current circulation path is formed through which current flows in a sequence of the upper coil 1722d and the switching elements 1524 and 1518. Immediately after the switching pattern a42 is changed to the switching pattern e42, flywheel currents flow through the circulation paths as indicated by broken line arrows in FIG. 35E. Therefore, by adjusting the proportion between the switching pattern a42 and the switching pattern e42, the quantity of current flowing through the upper coils 1722c, and 1722d in the forward direction can be adjusted.

At a time point t95 after the armatures 110 come into contact with the upper cores 116, the switching pattern is temporarily changed to the switching pattern b42 indicated in FIG. 35B. Therefore, regenerative currents flow in the direction opposite to the direction indicated by the broken line arrows in FIG. 35B, so that the drawing currents through the upper coils 1722c, and 1722d rapidly discontinue. Then, the processor immediately outputs the OFF signals to all the switching elements 1500–1534 to maintain the current discontinued state of the upper coils 1722c, and 1722d.

Even after the drawing currents discontinue, the contact between the armatures 110 and the upper cores 116 is maintained by the magnetic attraction force from the upper magnets 116d. Thus, the valve bodies 100 are held in contact with the valve seats 126, and, therefore, the two exhaust valves 1416c, and 1416d of the cylinder 1402b remain in the closed state.

By repeating the above-described processes, the three intake valves 1412a–1412c of the cylinder 1402a and the two exhaust valves 1416c, 1416d of the cylinder 1402b are opened and closed.

Figure 34E:
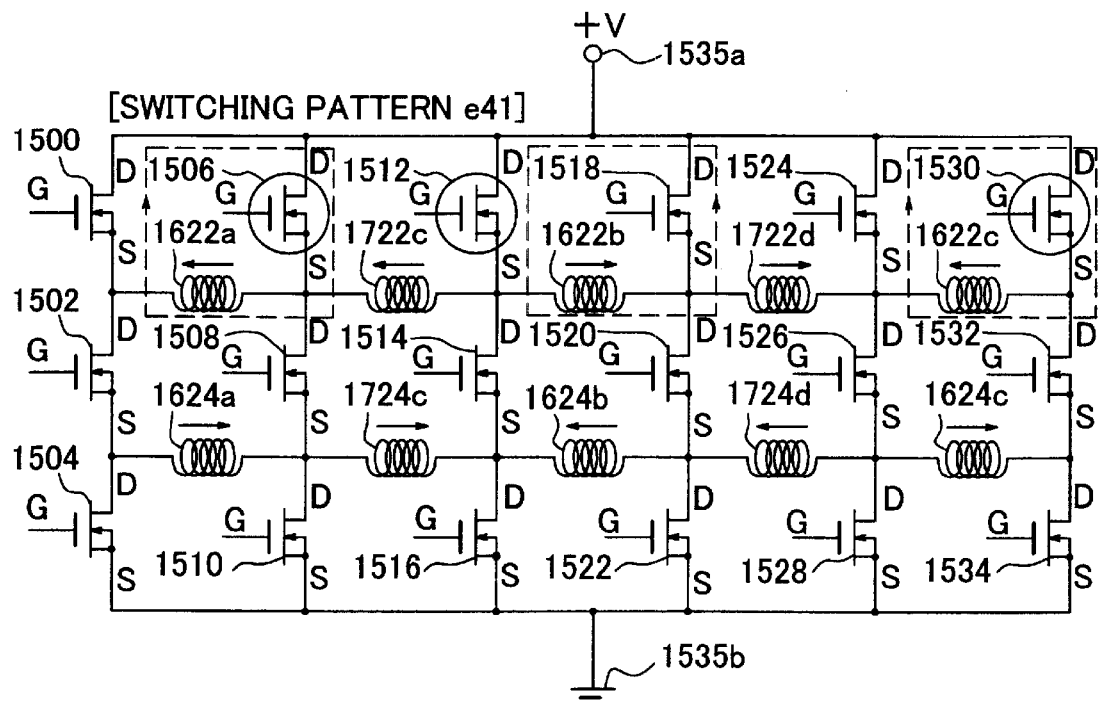
Figure 34F:
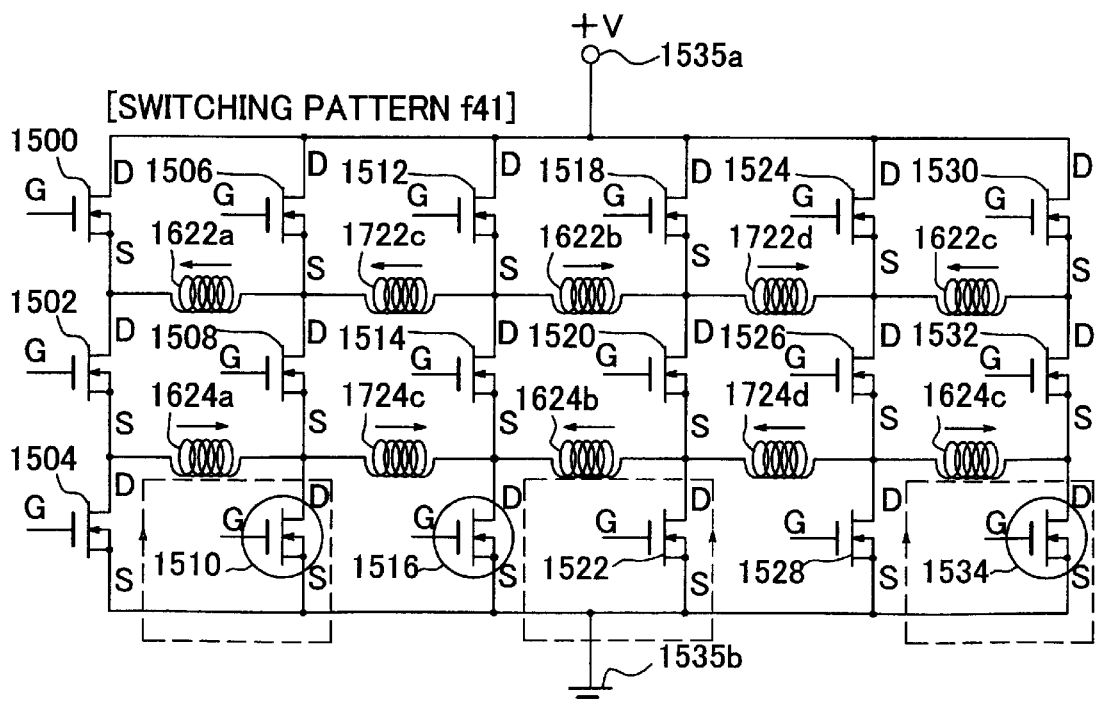

From the foregoing description, it should be understood that the switching elements 1500–1534 used to conduct current to drive the upper coils 1622a–1622c of the three intake valves 1412a–1412c as indicated in FIGS. 34A, 34B and 34E are the same as the switching elements 1500–1534 used to conduct current to drive the lower coils 1624a–1624c of the same intake valves 1412a–1412c as indicated in FIGS. 34C, 34D and 34F. Thus these switching elements are shared by the upper coils 1622a–1622c and the lower coils 1624a–1624c.

Figure 35E:
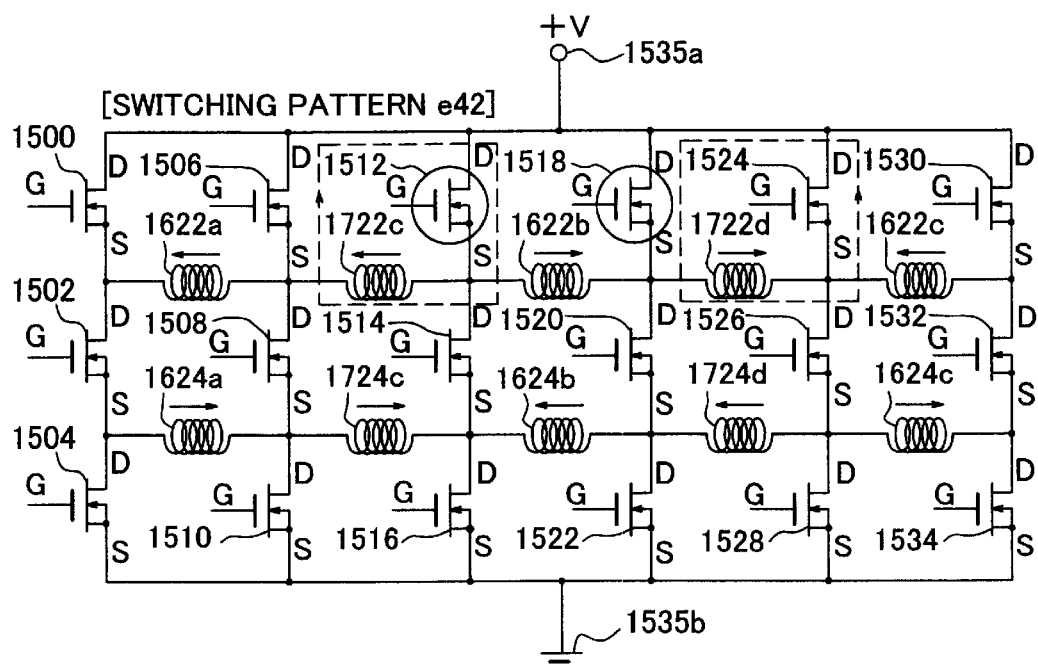
Figure 35F:
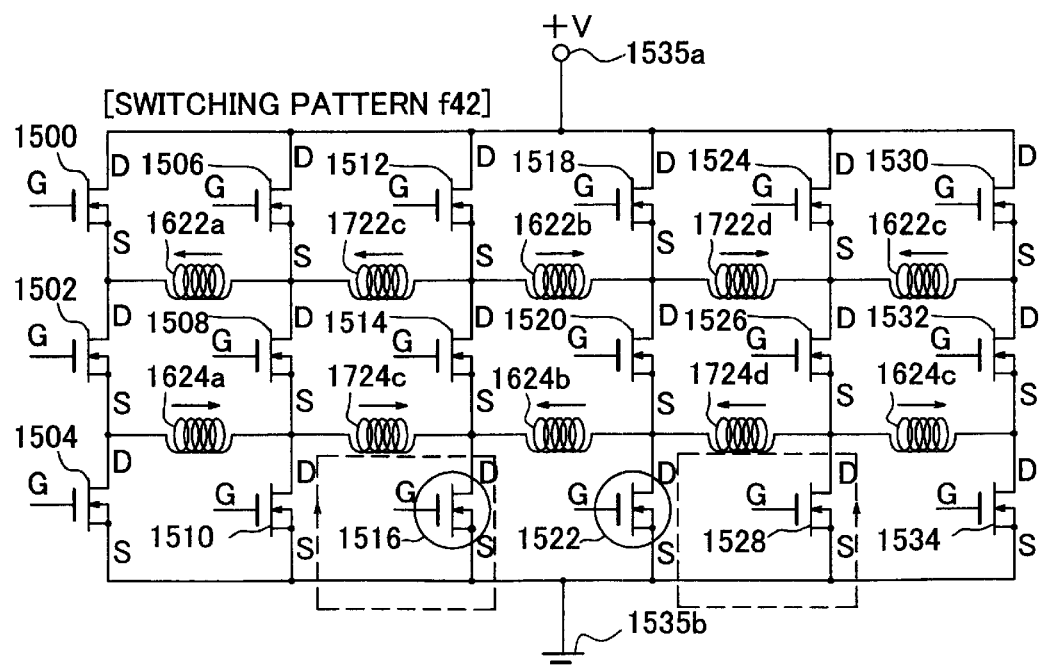

Furthermore, it should be understood that the switching elements 1506–1528 used to conduct current to drive the upper coils 1722c, and 1722d of the two exhaust valves 1416c, and 1416d as indicated in FIGS. 35A, 35B and 35E are the same as the switching elements 1506–1528 used to conduct current to drive the lower coils 1724c, and 1724d of the same exhaust valves 1416c, and 1416d as indicated in FIGS. 35C, 35D and 35F. Thus, these switching elements are shared by the upper coils 1722c, and 1722d and the lower coils 1724c, and 1724d.

Still further, through comparison between the switching elements 1500–1534 used to conduct current to drive the upper coils 1622a–1622c and the lower coils 1624a–1624c of the three intake valves 1412a–1412c of the cylinder 1402a as indicated in FIGS. 34A to 34F and the switching elements 1500–1528 used to conduct current to drive the upper coils 1722c, and 1722d and the lower coils 1724c, and 1724d of the two exhaust valves 1416c, and 1416d of the cylinder 1402b as indicated in FIGS. 35A to 35F, it should be understood that the switching elements 1506–1528 are shared.

The other drive circuits 1592b, 1592c, and 1592d drive combinations of valves as shown in FIG. 36. For example, the drive circuit 1592b drives a combination of the three intake valves 1412d, 1412e, and 1412f of the cylinder 1402b and the two exhaust valves 1416g, and 1416h of the cylinder 1402d. The relationships between the valves 1412d, 1412e, 1412f, 1416g, and 1416h and electromagnetic coils are substantially similar as those in the drive circuit 1592a.

The intake stroke of the cylinder 1402b and the exhaust stroke of the cylinder 1402d do not overlap. Therefore, the eighteen switching elements in the drive circuit 1592b are controlled by the processor in patterns that are substantially similar as the switching patterns a41–f42 indicated in FIGS. 34A to 34F and 35A to 35F. Therefore, the three intake valves 1412d–1412f of the cylinder 1402b and the two exhaust valves 1416g, and 1416h of the cylinder 1402d can be opened and closed in a manner substantially similar as that indicated in the timing chart of FIG. 33. Therefore, the sharing of switching elements is achieved as in the case of the drive circuit 1592a.

The drive circuit 1592c drives a combination of the three intake valves 1412g, 1412h, and 1412i of the cylinder 1402c and the two exhaust valves 1416a, and 1416b of the cylinder 1402a. The relationships between the valves 1412g, 1412h, 1412i, 1416a, and 1416b and electromagnetic coils are substantially similar as those in the drive circuit 1592a.

The intake stroke of the cylinder 1402c and the exhaust stroke of the cylinder 1402a do not overlap. Therefore, the eighteen switching elements in the drive circuit 1592c are controlled by the processor in patterns that are substantially similar as the switching patterns a41–f42 indicated in FIGS. 34A to 34F and 35A to 35F.

Therefore, the three intake valves 1412g, 1412h, and 1412i of the cylinder 1402c and the two exhaust valves 1416a, and 1416b of the cylinder 1402a can be opened and closed in a manner substantially similar as that indicated in the timing chart of FIG. 33. Therefore, the sharing of switching elements is achieved as in the case of the drive circuit 1592a.

The drive circuit 1592d drives a combination of the three intake valves 1412j, 1412k, and 1412l of the cylinder 1402d and the two exhaust valves 1416e, and 1416f of the cylinder 1402c. The relationships between the valves 1412j, 1412k, 1412l, 1416e, and 1416f and electromagnetic coils are substantially similar as those in the drive circuit 1592a.

The intake stroke of the cylinder 1402d and the exhaust stroke of the cylinder 1402c do not overlap. Therefore, the eighteen switching elements in the drive circuit 1592d are controlled by the processor in patterns that are substantially similar as the switching patterns a41–f42 indicated in FIGS. 34A to 34F and 35A to 35F.

Therefore, the three intake valves 1412j–1412l of the cylinder 1402d and the two exhaust valves 1416e, and 1416f of the cylinder 1402c can be opened and closed in a manner substantially similar as that indicated in the timing chart of FIG. 33. Therefore, the sharing of switching elements is achieved as in the case of the drive circuit 1592a.

Therefore, the drive circuit portion, equipped with the four drive circuits 1592a–1592d, is able to drive a total of twenty valves of the four cylinders 1402a–1402d, or the twelve intake valves 1412a–1412l and the eight exhaust valves 1416a–1416h, in the combinations depicted in FIG. 36.

Each of the drive circuits 1592a–1592d is able to drive three intake valves and two exhaust valves by using the eighteen switching elements 1500–1534. Thus 72 switching elements are used to drive the twenty valves of the four cylinders 1402a–1402d, or 3.6 elements/1 valve. In contrast, the above-described conventional three-switching element in series type construction needs 72 switching elements for 16 valves, or 4.5 elements/1 valve.

Therefore, the present embodiments of the present invention is able to reduce the number of switching elements, and allow size and cost reductions of the drive circuit portion for the intake and exhaust valves formed as electromagnetic valves.

The terminal portions of the electromagnetic coils 1622a–1724d are connected to the series connecting portions between the switching elements of the series circuits 1534–1541. Each series circuit is formed by connecting three switching elements in series. Therefore, in the switching control on the switching elements 1500–1534, a mode of supplying reverse currents through the electromagnetic coils 1622a–1724d can be realized as indicated in FIGS. 34B, 34D, 35B and 35D.

Each drive circuit 1592a–1592d employs the 12 electrically conductive wires for the 10 electromagnetic coils, or 1.2 wires/1 electromagnetic coil, thus reducing the number of wires needed. In the above-described conventional three-switching element in-series type construction, 48 conductive wires are needed for 32 electromagnetic coils, or 1.5 wires/1 electromagnetic coil. Thus, embodiments of the present invention allow a reduction in the thickness of a wire harness disposed in a vehicle, thus contributing to size and weight reductions of the vehicle.

Figure 37:
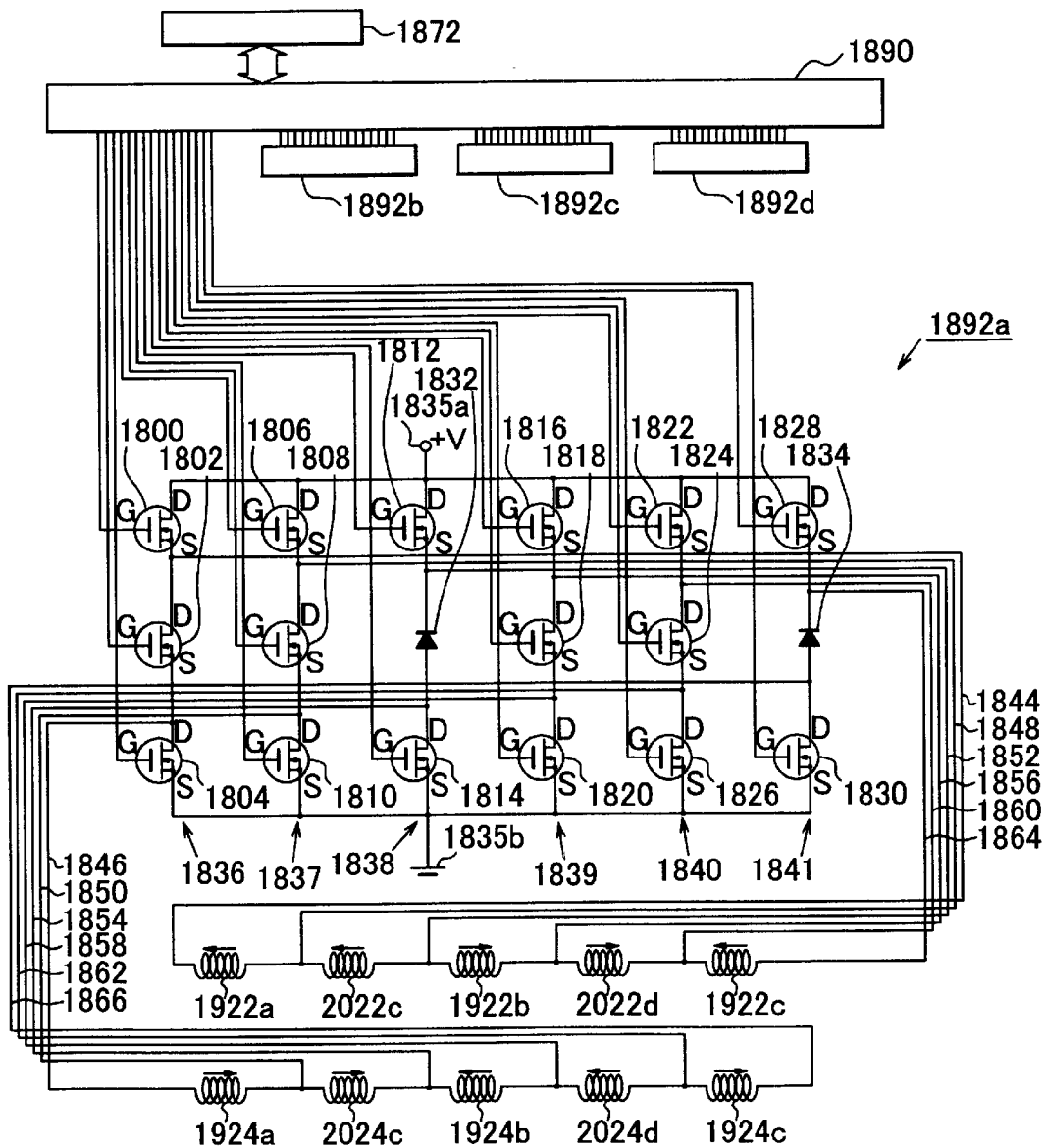
FIG. 37 is a diagram illustrating a construction of a drive circuit according to another embodiment of the present invention.

A drive circuit 1892a as depicted in FIG. 37 differs from the drive circuit 1592a. The drive circuit 1892a is a three-switching element in-series type drive circuit. Other drive circuits 1892b, 1892c, and 1892d are the same as the drive circuit 1892a. Therefore, the drive circuit 1892a will be described below as a representative of the other drive circuits. Other configurations of the present embodiment are substantially similar as those of previous embodiments, unless otherwise noted.

The drive circuit 1892a is formed by sixteen switching elements 1800, 1802, 1804, 1806, 1808, 1810, 1812, 1814, 1816, 1818, 1820, 1822, 1824, 1826, 1828, and 1830 and two diodes 1832, and 1834. The switching elements 1800–1830 and the diodes 1832, and 1834 form six series circuits 1836, 1837, 1838, 1839, 1840, and 1841. Each of the series circuits have three of the elements including the diodes 1832, and 1834 connected in series. The series circuits 1836–1841 are connected in parallel between a high potential side terminal 1835a and a low potential side terminal 1835b, thus forming the drive circuit 1892a.

Of the six series circuits 1836–1841, the fourth and first series circuits 1838, and 1841 right in FIG. 37 are formed by connecting the switching element 1812, the diode 1832 and the switching element 1814 in series in that order, and the switching element 1828, the diode 1834 and the switching element 1830 in series in that order, respectively. The diodes 1832, and 1834 are disposed in such a direction as to allow current to flow from the low potential side terminal 1835b to the high potential side terminal 1835a. The other four series circuits 1836, 1837, 1839, and 1840 are each formed by connecting three of the switching. elements 1800–1810 and 1816–1826 in series.

Thus, the drive circuit 1892a in this embodiment differs from the drive circuit 1592a in previous embodiments in that each of the two series circuit 1838, 1842 has in its middle position the diode 1832, and 1834 instead of a switching element. Other configurations of the drive circuit 1892a are substantially similar as those of the drive circuit 1592a. An upper coil 1922a of a first intake valve, an upper coil 1922b of a second intake valve and an upper coil 1922c of a third intake valve of a cylinder, an upper coil 2022c of a first exhaust valve and an upper coil 2022d of a second exhaust valve of a second cylinder, a lower coil 1924a of the first intake valve, a lower coil 1924b of the second intake valve and a lower coil 1924c of the third intake valve of the first cylinder, and a lower coil 2024c of the first exhaust valve and a lower coil 2024d of the second exhaust valve of the second cylinder are connected to positions comparable to those in previous embodiments, via twelve electrically conductive wires 1844, 1846, 1848, 1850, 1852, 1854, 1856, 1858, 1860, 1862, 1864, and 1866.

The sixteen switching elements 1800–1830 are substantially similar as the switching elements in previous embodiments in that ON signals and OFF signals from a processor are inputted to the gate terminals G via an output port 1872 and a buffer circuit 1890.

The opening and closing operations of the three intake valves of the first cylinder and the two exhaust valves of the second cylinder are performed when control currents are supplied from the ECU. A timing chart depicted in FIG. 38 indicates the operations of these five valves.

FIGS. 39A to 39F and FIGS. 40A to 40F are circuit diagrams indicating states of control performed on the drive circuit 1892a shown in FIG. 37 so as to realize the operations indicated in FIG. 38. In FIGS. 39A to 39F and 40A to 40F, the conductive wires 1844–1866 are omitted. Furthermore, in FIGS. 39A to 39F and 40A to 40F, broken line arrows and circles "□" have the same states as described above in conjunction with previous embodiments.

Before a time point t100 indicated in FIG. 38, the armatures 110 are brought into contact with the upper cores 116 as depicted in FIG. 10 by temporary excitation of the upper coils 1922a–1922c, 2022c, 2022d, and that this contact state is maintained by the magnetic attraction force of the upper magnets 116d. Therefore, the valve bodies 100 are in contact with the valve seats 126. Thus, the three intake valves of the first cylinder and the two exhaust valves of the second cylinder are in a completely closed state. The OFF signals are outputted to all the sixteen switching elements 1800–1830.

Figure 39A:
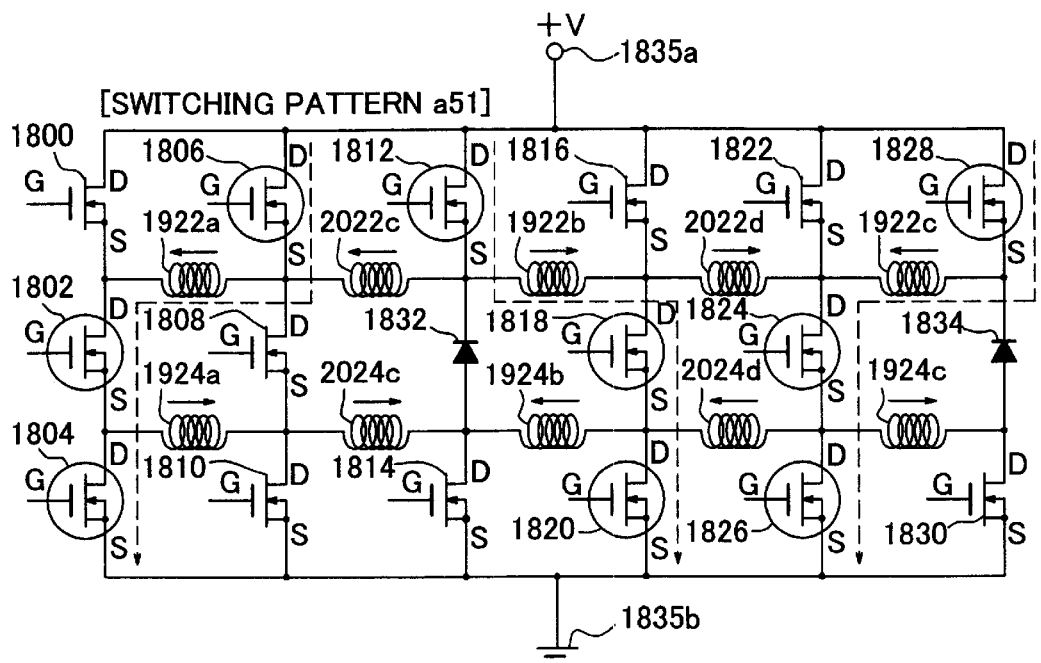
FIGS. 39A–39F are circuit diagrams for illustrating the control of current according to the embodiment of FIG. 37.
Figure 39B:
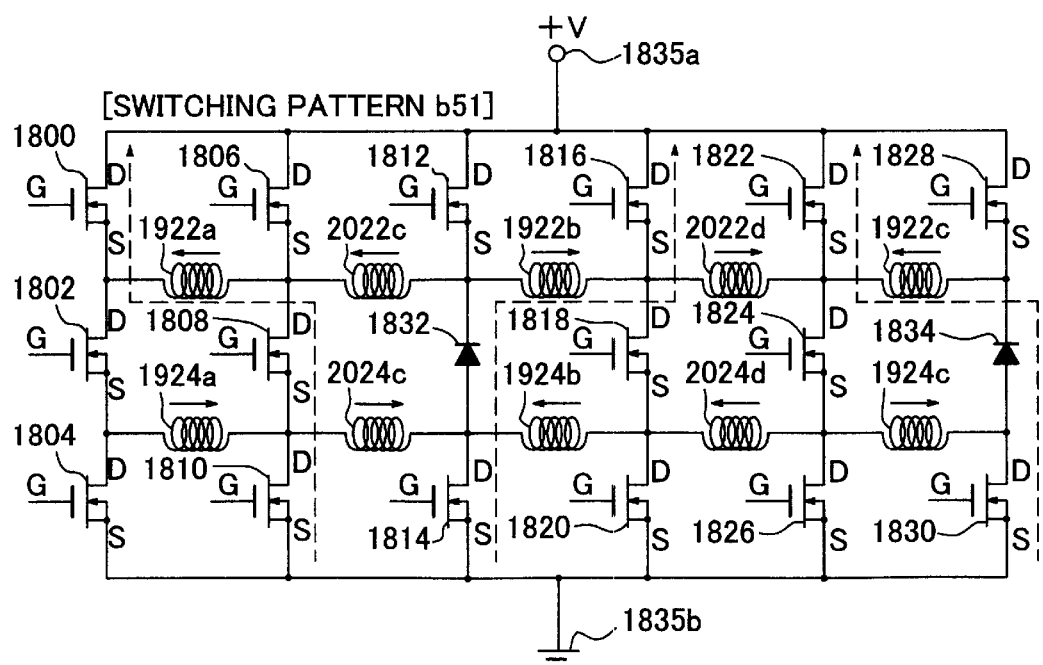
Figure 39C:
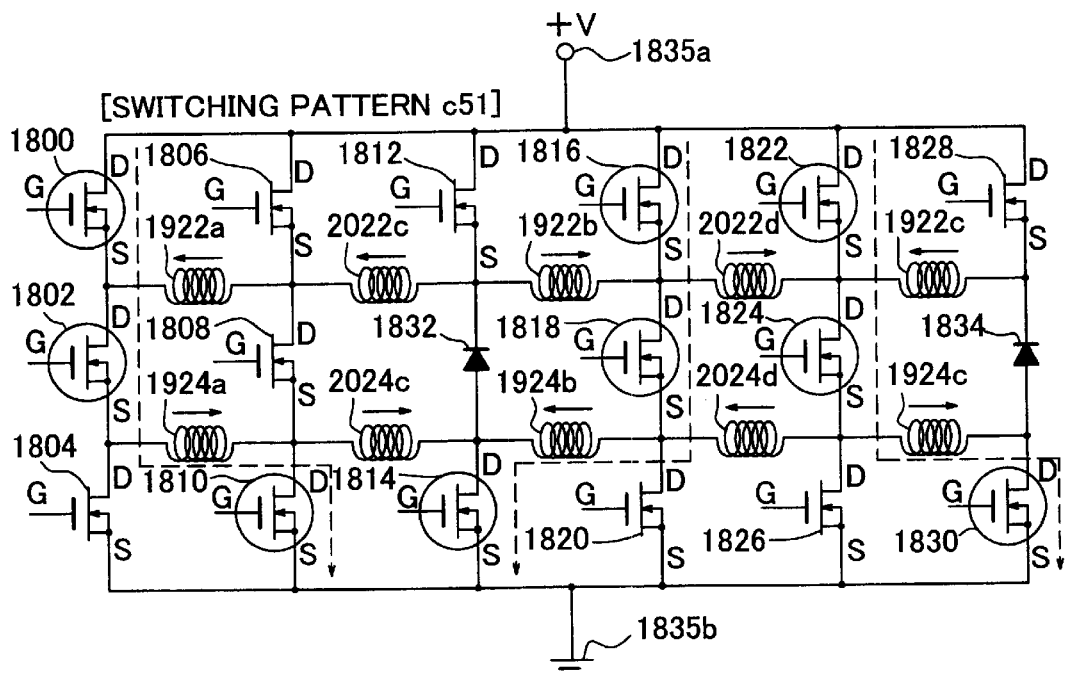

At the time of the intake stroke of the first cylinder, the processor outputs the ON signals to the switching elements 1800, 1802, 1810, 1814, 1816, and 1818, 1822, 1824, 1830 and outputs the OFF signals to the other switching elements at the time point t100 to establish a switching pattern c51 indicated in FIG. 39C. As a result, currents flow from the high potential side terminal 1835a to the low potential side terminal 1835b as indicated by broken line arrows in FIG. 39C, so that currents flow through the lower coils 1924a, 1924b, and 1924c of the three intake valves of the first cylinder in a forward direction. Then, the switching pattern c51 and a switching pattern f51 indicated in FIG. 39F are alternated until a time point t101.

In the switching pattern f51, the processor outputs the ON signals to the switching elements 1810, 1814, and 1830, and outputs the OFF signals to the other switching elements. Therefore, a current circulation path is formed through which current flows in a sequence of the lower coil 1924a and the switching elements 1810 and 1804. A current circulation path is formed through which current flows in a sequence of the lower coil 1924b and the switching elements 1814 and 1820. A current circulation path through which current flows in a sequence of the lower coil 1924c and the switching elements 1830 and 1826 is formed. Immediately after the switching pattern c51 is changed to the switching pattern f51, flywheel currents flow through the circulation paths as indicated by broken line arrows in FIG. 39F. Therefore, by adjusting the proportion of the switching pattern c51 to a sufficiently great value, it is possible to achieve such an adjustment that great currents flow through the lower coils 1924a–1924c in the forward direction.

In this manner, the lower coils 1924a–1924c are supplied with separating currents for separating the upper cores 116 from the armatures 110 magnetically attached to the upper cores 116 due to the magnetic force produced by the upper magnets 116d. Therefore, strong magnetic forces are produced from the lower cores 118, so that the armatures 110 separate from the upper cores 116, and move toward the lower cores 118.

Figure 39D:
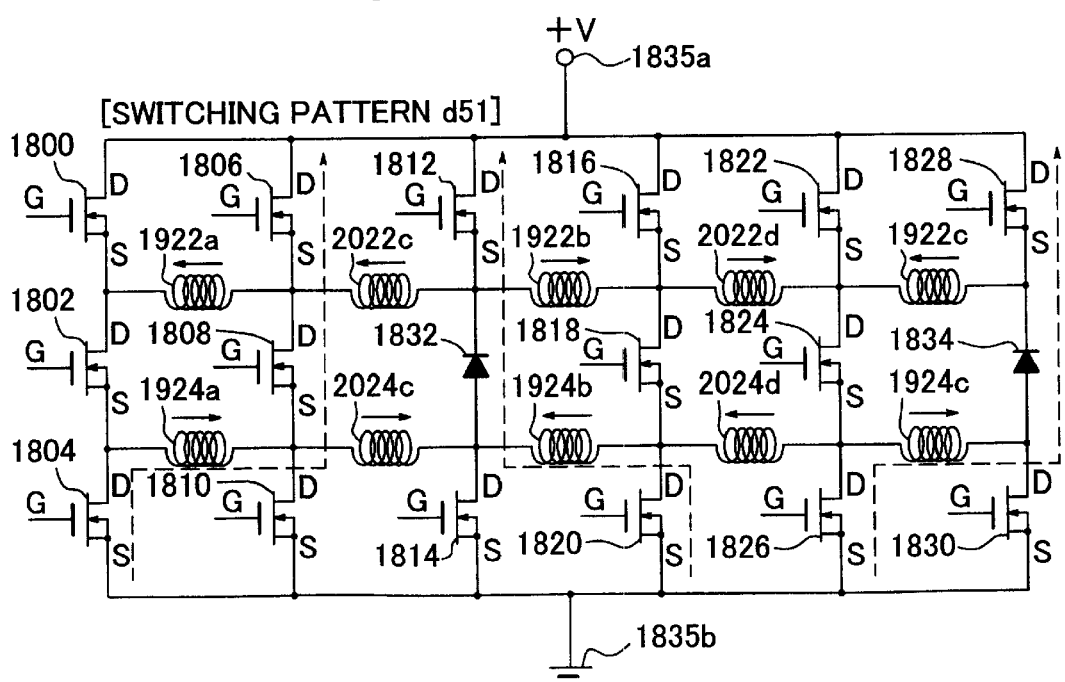

At the time point t101, the processor temporarily sets a switching pattern d51 indicated in FIG. 39D. In the switching pattern d51, the processor outputs the OFF signals to all the switching elements 1800–1830. Therefore, regenerative currents occur as indicated by broken line arrows in FIG. 39D, so that the separating currents flowing through the lower coils 1924a–1924c rapidly decrease. Then, the processor immediately sets a state where the switching pattern c51 and the switching pattern f51 are alternated. However, the proportion of the switching pattern c51 is reduced, in comparison with the pattern alternating state during the time period t100–t101. In this manner, the quantity of current flowing through the lower coils 1924a–1924c is kept at a normal level of the drawing current.

At this moment, the armatures 110 are sufficiently apart from the upper cores 116. Therefore, although the currents through the lower coils 1924a–1924c are set to the normal level of the drawing current, the armatures 110 are not returned to the upper cores 116 by the magnetic forces from the upper magnets 116d. After that, due to the drawing currents and the forces from the upper springs 120, the armatures 110 rapidly move away from the upper cores 116, and approach the lower cores 118, and finally contact the lower cores 118 by overcoming the forces from the lower springs 106.

At a time point t102 after the armatures 110 come into contact with the lower cores 118, the processor temporarily sets the switching pattern d51 indicated in FIG. 39D. Therefore, regenerative currents occur as indicated by the broken line arrows in FIG. 39D, so that the drawing currents flowing through the lower coils 1924a–1924c rapidly decrease. Then, the processor immediately sets a state where the switching pattern c51 and the switching pattern f51 are alternated. In this case, however, the proportion of the switching pattern c51 is reduced, in comparison with the pattern alternating state during the time period t101–t102. In this manner, the quantity of current flowing through the lower coils 1924a–1924c is reduced to the level of the holding current, whereby the contact between the armatures 110 and the lower cores 118 is maintained. Thus, the input ports of the first cylinder are set fully open.

Subsequently, at a time point t103 near or at a timing point at which the intake stroke of the first cylinder comes to an end, the switching pattern is changed to the switching pattern d51 depicted in FIG. 39D. Therefore, regenerative currents occur as indicated by the broken line arrows in FIG. 39D, so that the holding currents through the lower coils 1924a–1924c rapidly discontinue.

After the armatures 110 lose the attraction force toward the lower cores 118 as described above, the armatures 110 start to move toward the-upper cores 116, or, toward the completely closed state, due to the forces from the lower springs 106. Therefore, the valve bodies 100 approach the valve seats 126, and, the amount of valve lift starts to decrease.

Subsequently at a time point t104, the processor changes the switching pattern to a switching pattern a51 indicated in FIG. 39A, in order to draw the armatures 110 into contact with the upper cores 116. As a result, the drawing currents flow through the upper coils 1922a, and 1922b, 1922c. Afterwards, a drawing current is maintained by alternating the switching pattern a51 and a switching pattern e51 indicated in FIG. 39E, until the armatures 110 contact the upper cores 116.

In the switching pattern a51, the processor outputs the ON signals to the switching elements 1802, 1804, 1806, 1812, 1818, 1820, 1824, 1826, and 1828, and outputs the OFF signals to the other switching elements. As a result, currents flow from the high potential side terminal 1835a to the low potential side terminal 1835b as indicated by broken line allows in FIG. 39A, so that currents flow through the upper coils 1922a–1922c of the three intake valves of the first cylinder in the forward direction.

In the switching pattern e51, the processor outputs the ON signals to only the switching elements 1806, and 1812, 1828, and outputs the OFF signals to the other switching elements. Therefore, a current circulation path is formed through which current flows in a sequence of the upper coil 1922a and the switching elements 1800 and 1806. A current circulation path is formed through which current flows in a sequence of the upper coil 1922b and the switching elements 1816 and 1812. A current circulation path is formed through which current flows in a sequence of the upper coil 1922c and the switching elements 1822 and 1828. Immediately after the switching pattern a51 is changed to the switching pattern e51, flywheel currents flow through the circulation paths as indicated by broken line arrows in FIG. 39E. Therefore, by adjusting the proportion between the switching pattern a51 and the switching pattern e51, the quantity of current flowing through the upper coils 1922a–1922c in the forward direction can be adjusted.

At a time point t105 after the armatures 110 come into contact with the upper cores 116, the switching pattern is changed to a switching pattern b51 indicated in FIG. 39B. In the switching pattern b51, the processor outputs the OFF signals to all the switching elements 1800–1830. Therefore, regenerative currents occur as indicated by broken line arrows in FIG. 39B, so that the drawing currents through the upper coils 1922a–1922c rapidly discontinue.

Even after the drawing currents discontinue, the contact between the armatures 110 and the upper cores 116 is maintained by the magnetic attraction force from the upper magnets 116d. In this manner, the intake ports of the first cylinder are set to the completely closed state.

Figure 40A:
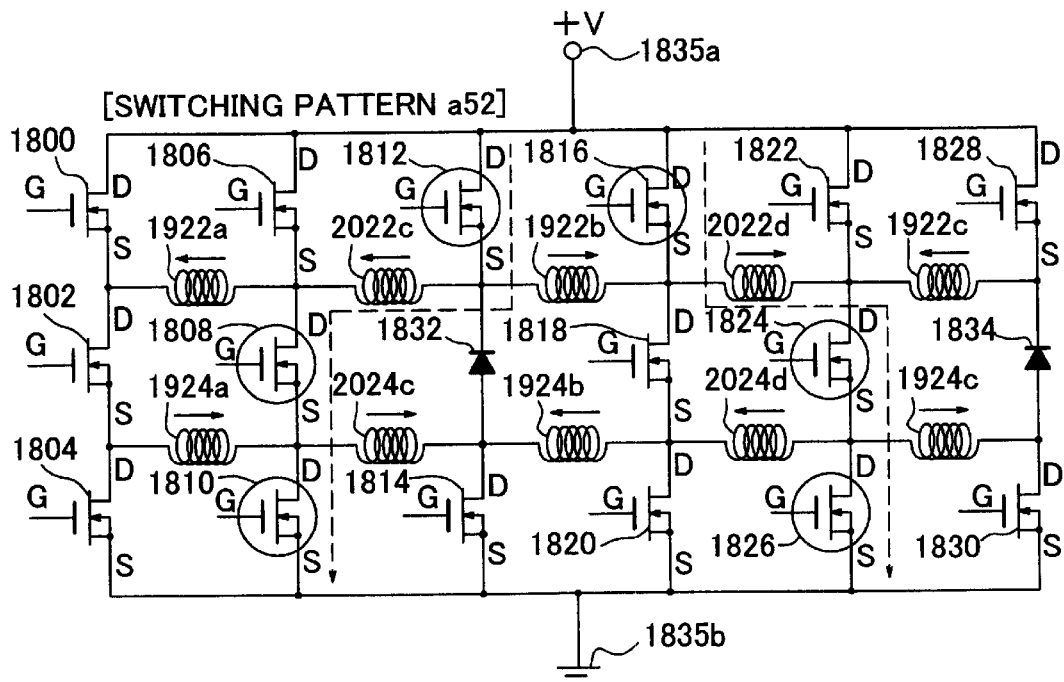
FIGS. 40A–40F are circuit diagrams for illustrating the control of current according to the embodiment of FIG. 37.
Figure 40B:
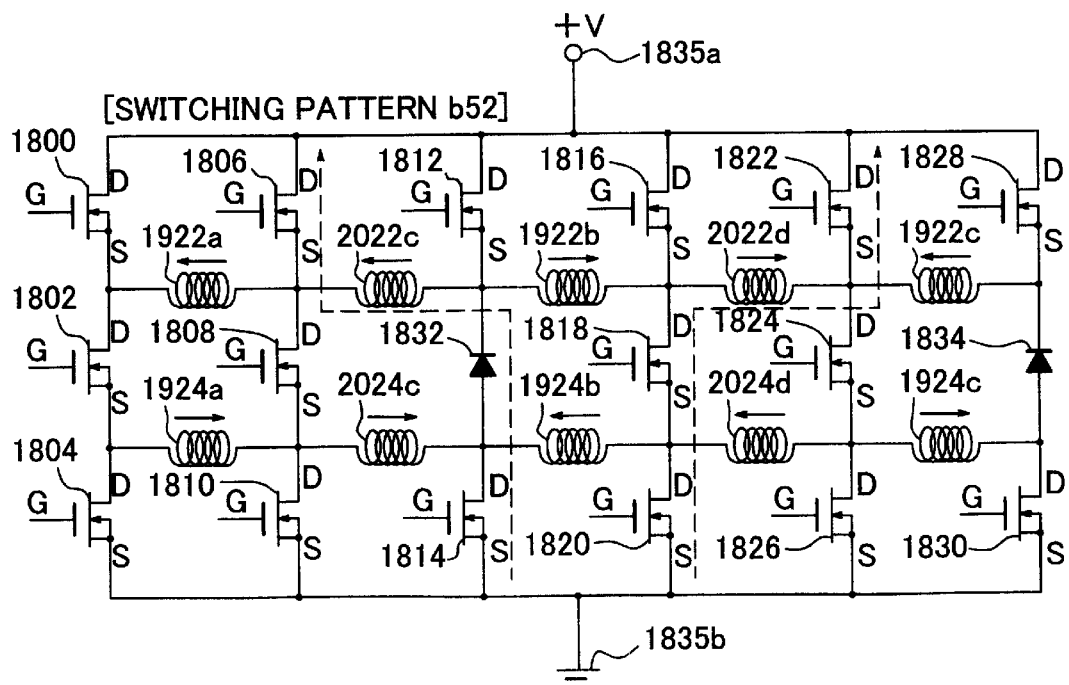
Figure 40C:
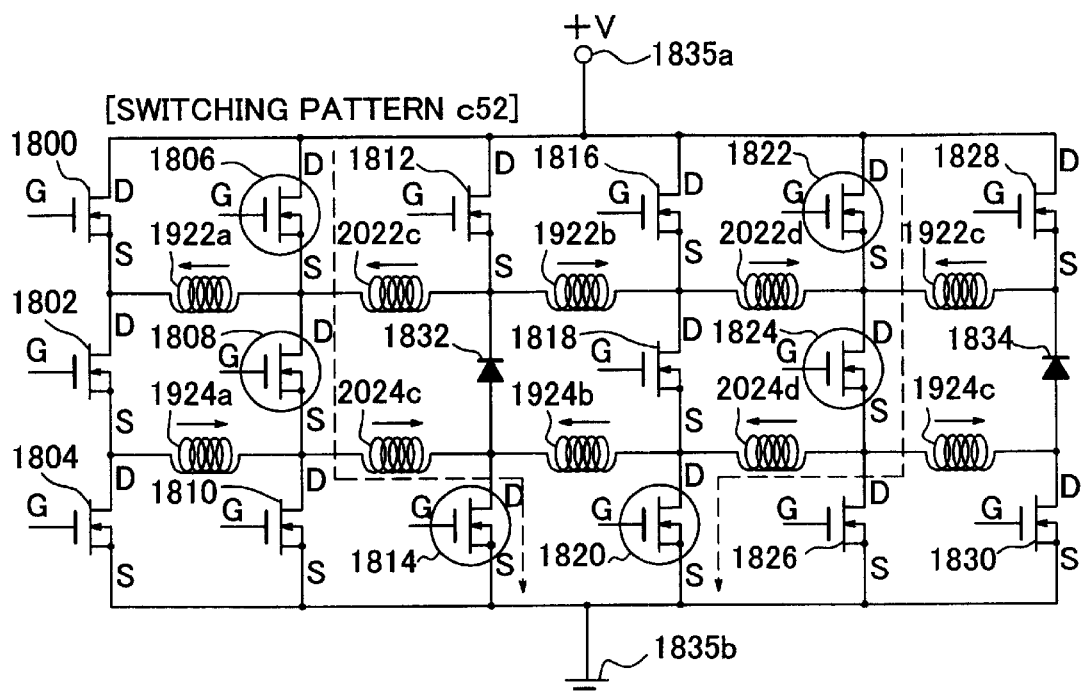

After the state where the OFF signals are outputted to all the switching elements 1800–1830, a timing points occurs at which the exhaust stroke of the second cylinder doe not overlap the intake stroke of the first cylinder, occurs. In this case, starting at a time point t106, the processor outputs the ON signals to the switching elements 1806, 1808, 1814, 1820, 1822, and 1824, and outputs the OFF signals to the other switching elements to establish a switching pattern c52 indicated in FIG. 40C. Therefore, currents flow from the high potential side terminal 1835a to the low potential side terminal 1835b as indicated by broken line arrows in FIG. 40C. Currents flow through the lower coils 2024c, and 2024d of the two exhaust valves of the second cylinder in the forward direction. Then, the switching pattern c52 and a switching pattern f52 indicated in FIG. 40F are alternated until a time point t107.

In the switching pattern f52, the processor outputs the ON signals to the switching elements 1814, and 1820, and outputs the OFF signals to the other switching elements. Therefore, a current circulation path is formed through which current flows in a sequence of the lower coil 2024c and the switching elements 1814 and 1810. A current circulation path is formed through which current flows in a sequence of the lower coil 2024d and the switching elements 1820 and 1826. Immediately after the switching pattern c52 is changed to the switching pattern f52, flywheel currents flow through the circulation paths as indicated by broken line arrows in FIG. 40F. Therefore, by adjusting the proportion of the switching pattern c52 to a sufficiently great value, it is possible to achieve such an adjustment that great currents flow through the lower coils 2024c, and 2024d in the forward direction.

In this manner, the lower coils 2024c, and 2024d are supplied with the separating currents for separating from the upper cores 116 the armatures 110 magnetically attached to the upper cores 116 due to the magnetic force produced by the upper magnets 116d. Therefore, strong magnetic forces are produced from the lower cores 118, so that the armatures 110 separate from the upper cores 116, and move toward the lower cores 118.

Figure 40D:
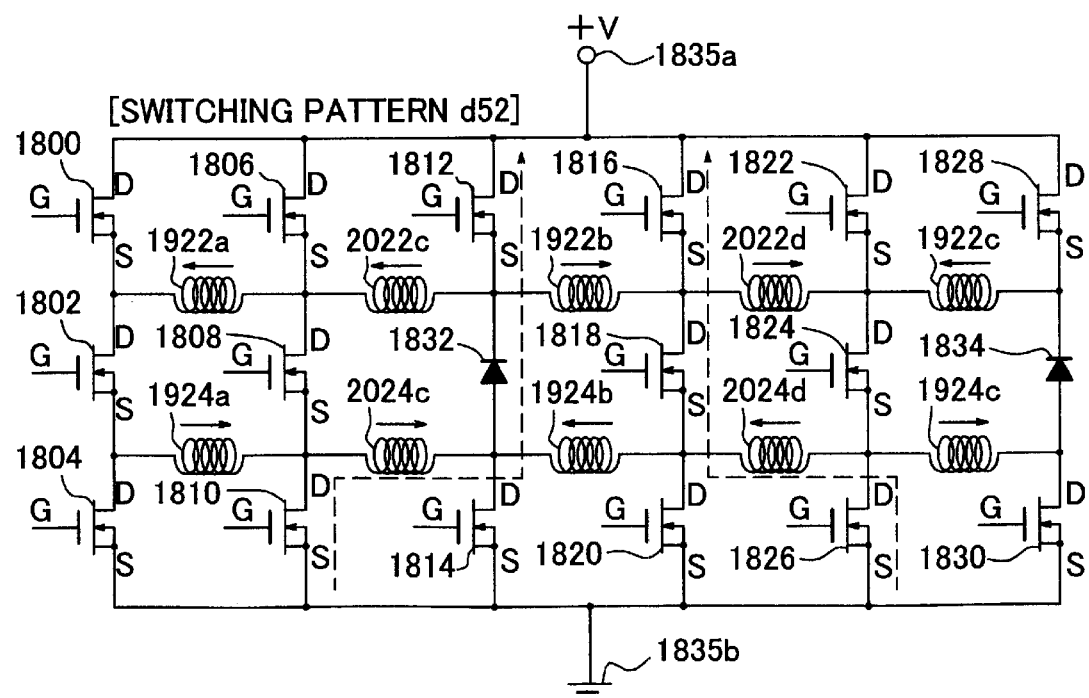

At the time point t107, the processor temporarily sets a switching pattern d52 indicated in FIG. 40D. In the switching pattern d52, the processor outputs the OFF signals to all the switching elements 1800–1830. Therefore, regenerative currents occur as indicated by broken line arrows in FIG. 40D, so that the separating currents through the lower coils 2024c, and 2024d rapidly decrease. Then, the processor immediately resumes a state where the switching pattern c52 and the switching pattern f52 are alternated. In this case, however, the proportion of the switching pattern c52 is reduced in comparison with the pattern alternating state during the time period t106–t107. In this manner, the quantity of current flowing through the lower coils 2024c, 2024d is kept at a normal level of the drawing current.

At this moment, the armatures 110 are sufficiently apart from the upper cores 116. Therefore, although the currents through the lower coils 2024c, 2024d are set to the normal level of the drawing current, the armatures 110 are not returned to the upper cores 116 by the magnetic forces from the upper magnets 116d. After that, due to the drawing currents and the forces from the upper springs 120, the armatures 110 rapidly move away from the upper cores 116, and approach the lower cores 118, and contact the lower cores 118 by overcoming the forces from the lower springs 106.

At a time point t108 after the armatures 110 come into contact with the lower cores 118, the CPU temporarily changes the switching pattern to the switching pattern d52 shown in FIG. 40D. Therefore, regenerative currents occur as indicated by the broken line arrows in FIG. 40D, so that the drawing currents through the lower coils 2024c, and 2024d rapidly decrease. Then, the processor immediately resumes a state where the switching pattern c52 and the switching pattern f52 are alternated. In this case, however, the proportion of the switching pattern c52 is reduced, in comparison with the pattern alternating state during the time period t107–t108. In this manner, the quantity of current flowing through the lower coils 2024c, 2024d in the forward direction is kept at the level of the holding current, whereby the contact between the armatures 110 and the lower cores 118 is maintained. Thus, the exhaust ports of the second cylinder are set to the fully open state.

Subsequently, at a time point t109 near or at a timing point at which the exhaust stroke of the second cylinder comes to an end, the switching pattern is changed to the switching pattern d52 indicated in FIG. 40D. Therefore, regenerative currents flow as indicated by the broken line arrows in FIG. 40D, so that the holding currents flowing through the lower coils 2024c, and 2024d rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t110, the processor changes the switching pattern to a switching pattern a52 indicated in FIG. 40A, in order to draw the armatures 110 into contact with the upper cores 116. As a result, the drawing currents flow through the upper coils 2022c, and 2022d. Afterwards, a drawing current is maintained by alternating the switching pattern a52 and a switching pattern e52 indicated in FIG. 40E, until the armatures 110 contact the upper cores 116.

In the switching pattern a52, the processor outputs the ON signals to the switching elements 1808, 1810, 1812, 1816, 1824, and 1826, and outputs the OFF signals to the other switching elements. As a result, currents flow from the high potential side terminal 1835a to the low potential side terminal 1835b as indicated by broken line allows in FIG. 40A, so that currents flow through the upper coils 2022c, and 2022d of the two exhaust valves of the second cylinder in the forward direction.

In the switching pattern e52, the processor outputs the ON signals to only the switching elements 1812, and 1816, and outputs the OFF signals to the other switching elements. Therefore, a current circulation path is formed through which current flows in a sequence of the upper coil 2022c and the switching elements 1806 and 1812. A current circulation path is formed through which current flows in a sequence of the upper coil 2022d and the switching elements 1822 and 1816. Immediately after the switching pattern a52 is changed to the switching pattern e52, flywheel currents flow through the circulation paths as indicated by broken line arrows in FIG. 40E. Therefore, by adjusting the proportion between the switching pattern a52 and the switching pattern e52, the quantity of current flowing through the upper coils 2022c, and 2022d in the forward direction can be adjusted.

At a time point till after the armatures 110 come into contact with the upper cores 116, the switching pattern is changed to a switching pattern b52 indicated in FIG. 40B. In the switching pattern b52, the processor outputs the OFF signals to all the switching elements 1800–1830. Therefore, regenerative currents occur as indicated by broken line arrows in FIG. 40B, so that the drawing currents flowing through the upper coils 2022c, and 2022d rapidly discontinue.

Even after the drawing currents discontinue, the contact between the armatures 110 and the upper cores 116 is maintained by the magnetic attraction forces from the upper magnets 116d. In this manner, the exhaust ports of the second cylinder are set to the completely closed state.

Thus, the three intake valves of first cylinder and the two exhaust valves of the second cylinder are driven in the opening and closing directions by the drive circuit 1892a, which includes the sixteen switching elements 1800–1830 and the diodes 1832, and 1834.

Figure 39E:
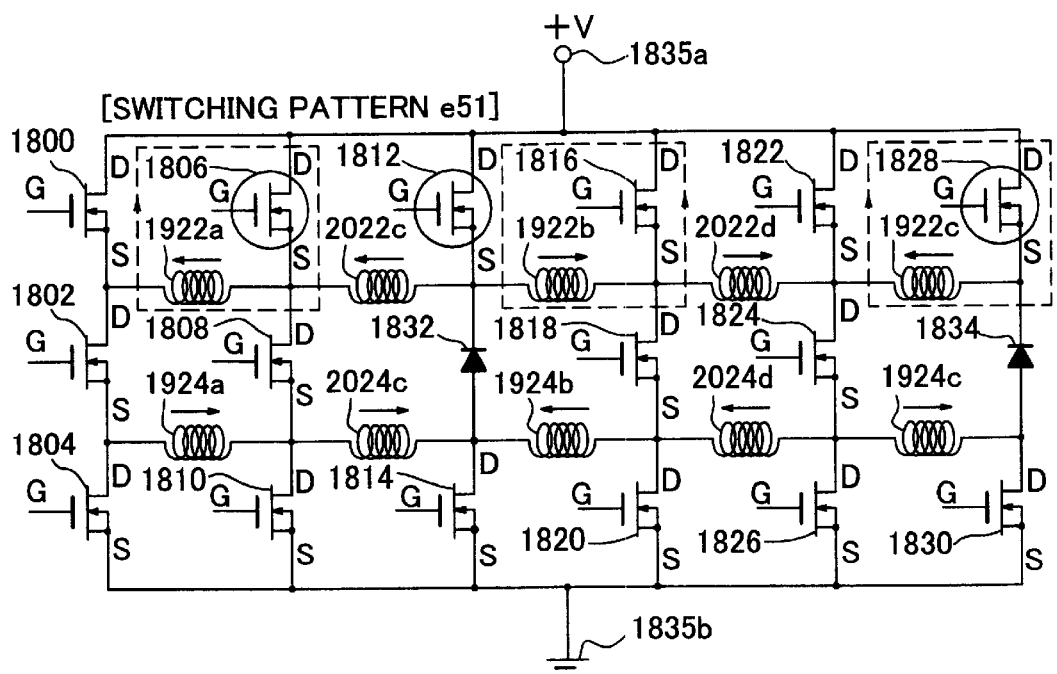
Figure 39F:
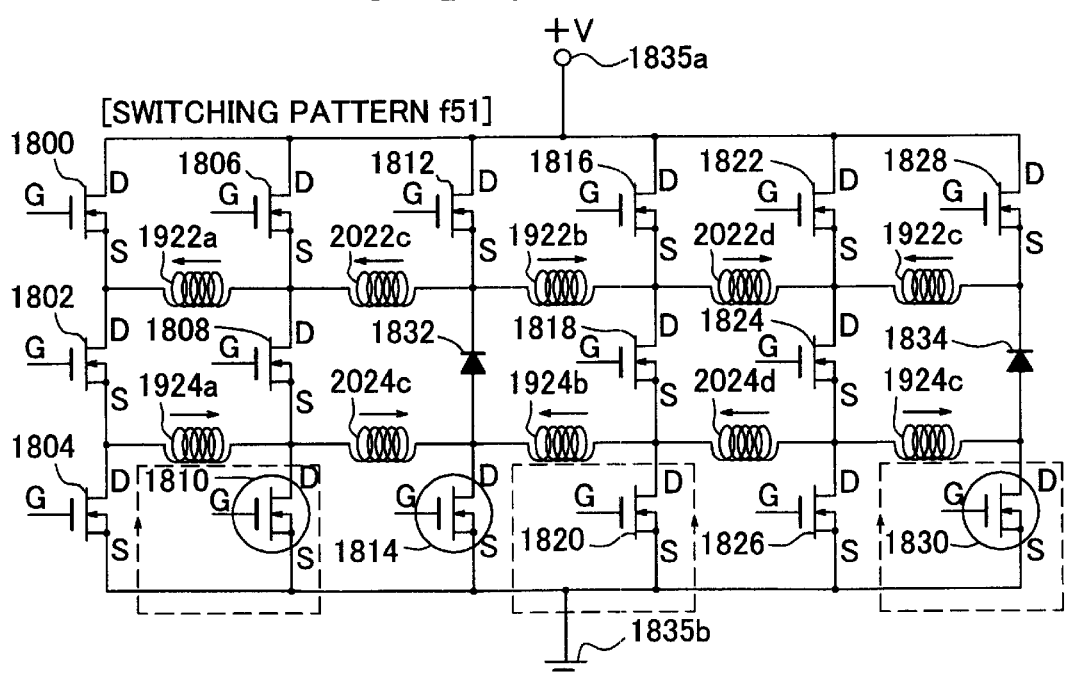

From the foregoing description, it should be understood that the switching elements 1800–1830 and the diodes 1832, and 1834 used to conduct current to drive the upper coils 1922a–1922c as indicated in FIGS. 39A, 39B and 39E are the same as the switching elements 1800–1830 and the diodes 1832, and 1834 used to conduct current to drive the lower coils 1924a–1924c as indicated in FIGS. 39C, 39D and 39F. These elements are shared by the upper coils 1922a–1922c and the lower coils 1924a–1924c.

Figure 40E:
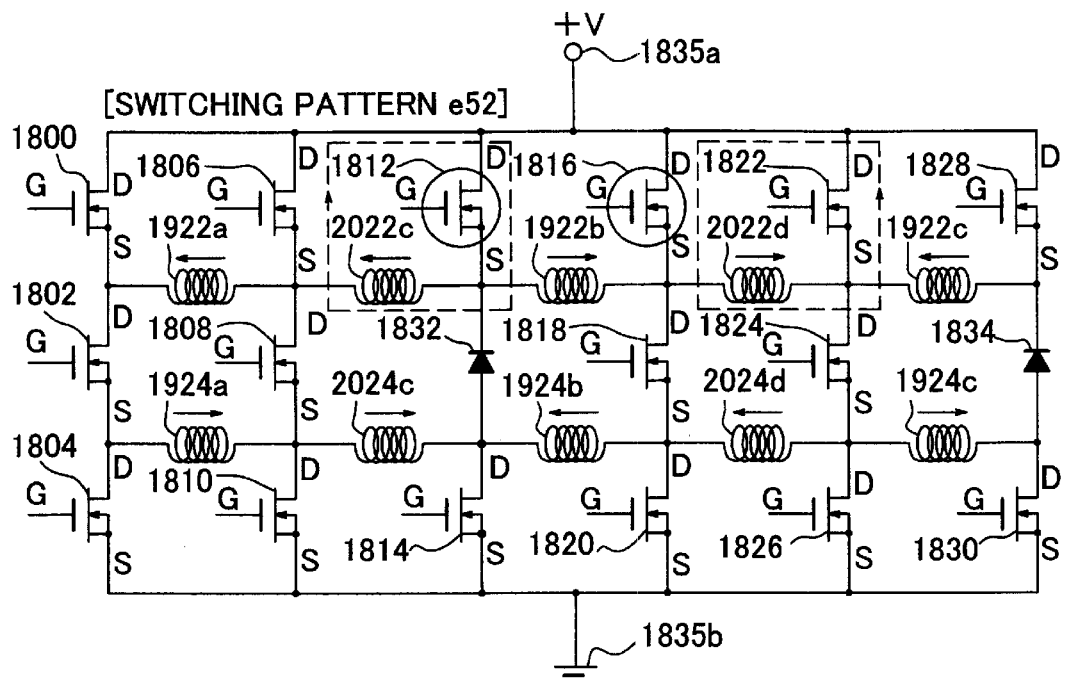
Figure 40F:
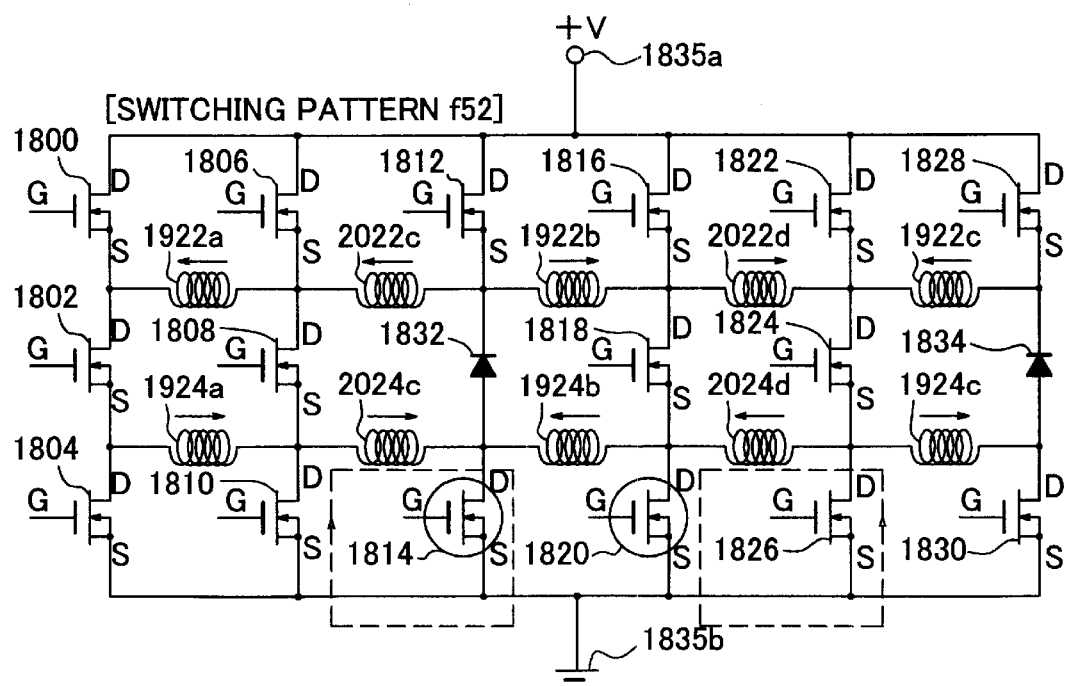

Furthermore, it should be understood that the switching elements 1806–1826 and the diode 1832 used to conduct current to drive the upper coils 2022c, and 2022d as indicated in FIGS. 40A, 40B and 40E are the same as the switching elements 1806–1826 and the diode 1832 used to conduct current to drive the lower coils 2024c, and 2024d as indicated in FIGS. 40C, 40D and 40F, that is, these elements are shared by the upper coils 2022c, and 2022d and the lower coils 2024c, and 2024d.

Still further, through comparison between the switching elements 1800–1830 and the diodes 1832, and 1834 used to conduct current to drive the upper coils 1922a–1922c and the lower coils 1924a–1924c of the three intake valves of the first cylinder as indicated in FIGS. 39A to 39F and the switching elements 1806–1826 and the diode 1832 used to conduct current to drive the upper coils 2022c, and 2022d and the lower coils 2024c, and 2024d of the two exhaust valves of the second cylinder as indicated in FIGS. 40A to 40F, it should be understood that the switching elements 1806–1832 and the diode 1832 are shared.

A configuration substantially similar as that of the drive circuit 1892a is adopted to form the drive circuit 1892b for driving the three intake valves of the second cylinder and the two exhaust valves of the fourth cylinder, the drive circuit 1892c for driving the three intake valves of the third cylinder and the two exhaust valves of the first cylinder, and the drive circuit 1892d for driving the three intake valves of the fourth cylinder and the two exhaust valves of the third cylinder. In these three drive circuits 1892b, 1892c, and 1892d, the switching elements and the diodes are shared as described above in conjunction with the drive circuit 1892a, and control is performed in substantially the same pattern as indicated in FIG. 38 to open and close the intake and exhaust valves.

Therefore, the drive circuit portion, equipped with the four drive circuits 1892a–1892d, is able to drive a total of 20 valves of the 4 cylinders, or, the 12 intake valves and the 8 exhaust valves, in combinations substantially similar as those depicted in FIG. 35.

Present embodiments employing the sixteen switching elements 1800–1830 and the two diodes 1832, and 1834, are able to drive the intake and exhaust valves constructed in the same manner as those in previous embodiments. Thus, present embodiments reduce the number of switching elements by two from the number in previous embodiments, and allows the use of less expensive diodes 1832, and 1834.

Therefore, embodiments of the present invention reduce the number of switching elements employed, and allows further reductions in size and cost of the drive circuit portion for the intake and exhaust valves formed as electromagnetic valves.

The number of electrically conductive wires is reduced, so that the thickness of a wire harness disposed in a vehicle can be reduced, thus contributing to size and weight reductions of the vehicle, previous embodiments.

Figure 41:
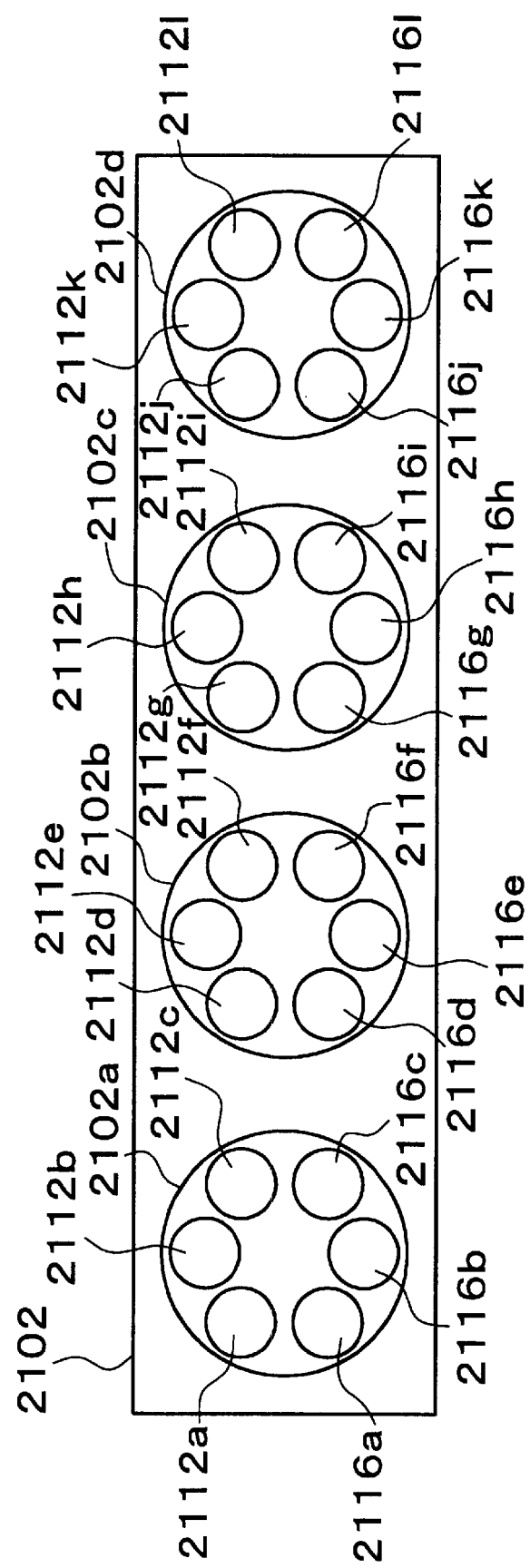
FIG. 41 is a diagram illustrating a valve arrangement according to another embodiment of the present invention.

The embodiments of the present invention depicted in FIG. 41, differs from previous embodiments in that an engine 2102 is a four-cylinder six-valve engine in which the cylinders 2102a, 2102b, 2102c, and 2102d each have three intake valves 2112a, 2112b, 2112c, 2112d, 2112e, 2112f, 2112g, 2112h, 2112i, 2112j, 2112k, and 2112l, and three exhaust valves 2116a, 2116b, 2116c, 2116d, 2116e, 2116f, 2116g, 2116h, 2116i, 2116k, 2116k, and 2116l.

Figure 42:
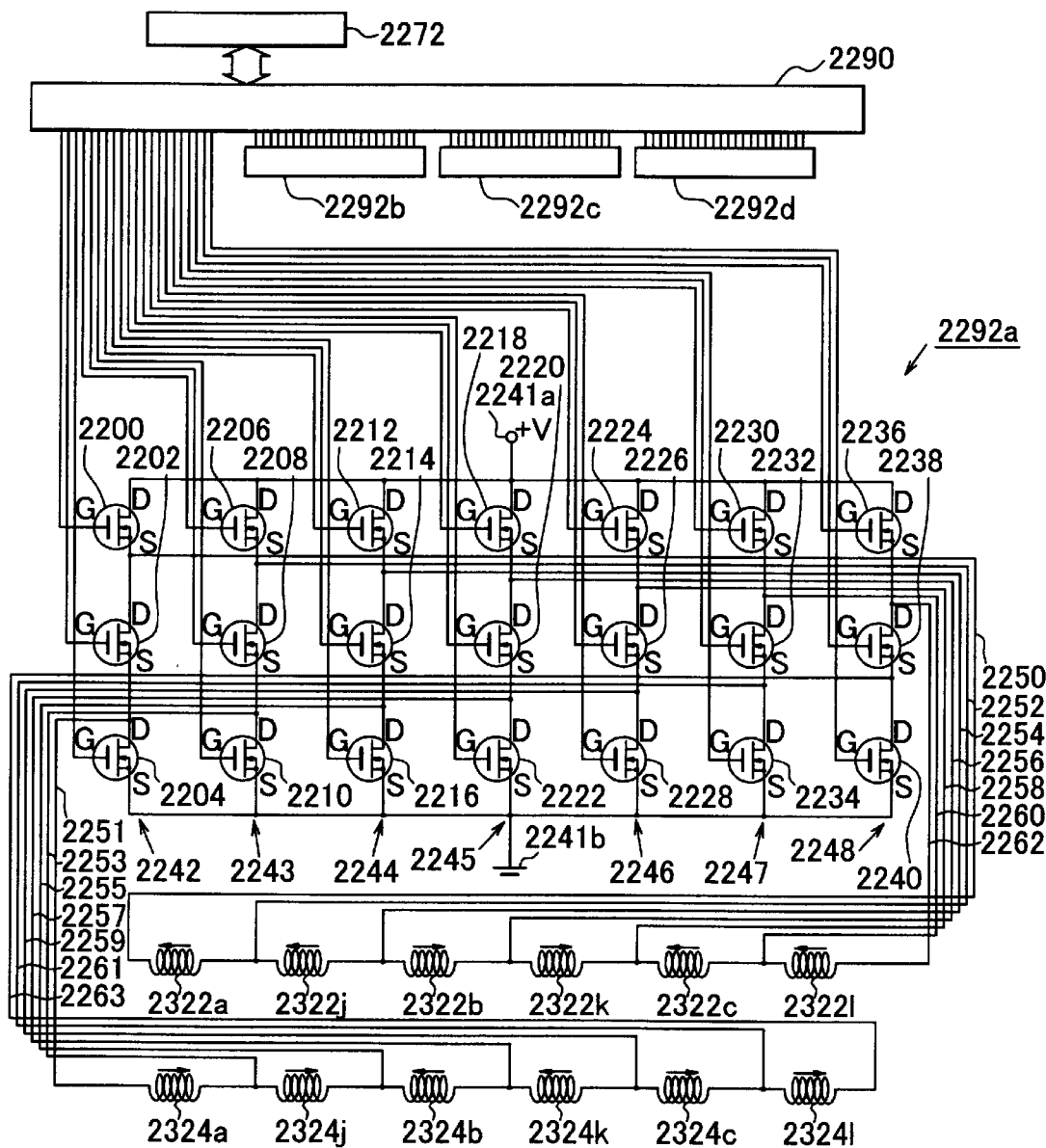
FIG. 42 is a diagram illustrating a construction of a drive circuit according to the embodiment of FIG. 41.

Furthermore, corresponding to the different number of valves, the present embodiments differ from previous embodiments in the configuration of drive circuits 2292a, 2292b, 2292c, and 2292d that are driven and controlled by a processor via an output port 2272 and a buffer circuit 2290 as indicated in FIG. 42, and the combinations of object valves to be driven, as described below. The drive circuits 2292a, 2292b, 2292c, and 2292d are three-switching element in-series type drive circuits.

The drive circuits 2292b, 2292c, and 2292d have the same configuration as the drive circuit 2292a. Therefore, the drive circuit 2292a will be described as a representative of the other drive circuits. Other configurations of the present embodiments are substantially similar as those of previous embodiments, unless otherwise noted.

The drive circuit 2292a is formed by 21 switching elements 2200, 2202, 2204, 2206, 2208, 2210, 2212, 2214, 2216, 2218, 2220, 2222, 2224, 2226, 2228, 2230, 2232, 2234, 2236, 2238, and 2240. The switching elements 2200–2240 form seven series circuits 2242, 2243, 2244, 2245, 2246, 2247, and 2248, each of which includes three of the switching elements connected in series. The series circuits 2242–2248 are connected in parallel between a high potential side terminal 2241a and a low potential side terminal 2241b.

In the series circuit 2242 formed by three switching elements 2200, 2202, and 2204, a series connecting portion between the switching elements 2200, and 2202 is connected with an end of an electrically conductive wire 2250. Similarly, a series connecting portion between the switching elements 2202, and 2204 is connected with an end of an electrically conductive wire 2251. In the series circuit 2243 formed by three switching elements 2206, 2208, 2210, a series connecting portion between the switching elements 2206, 2208 is connected with an end of an electrically conductive wire 2252. A series connecting portion between the switching elements 2208, and 2210 is connected with an end of an electrically conductive wire 2253. In the series circuit 2244 formed by three switching elements 2212, 2214, and 2216, a series connecting portion between the switching elements 2212, and 2214 is connected with an end of an electrically conductive wire 2254, and a series connecting portion between the switching elements 2214, and 2216 is connected with an end of an electrically conductive wire 2255. In the series circuit 2245 formed by three switching elements 2218, 2220, and 2222, a series connecting portion between the switching elements 2218, and 2220 is connected with an end of an electrically conductive wire 2256. A series connecting portion between the switching elements 2220, and 2222 is connected with an end of an electrically conductive wire 2257. In the series circuit 2246 formed by three switching elements 2224, 2226, and 2228, a series connecting portion between the switching elements 2224, and 2226 is connected with an end of an electrically conductive wire 2258, and a series connecting portion between the switching elements 2226, and 2228 is connected with an end of an electrically conductive wire 2259. In the series circuit 2247 formed by three switching elements 2230, 2232, and 2234, a series connecting portion between the switching elements 2230, and 2232 is connected with an end of an electrically conductive wire 2260. A series connecting portion between the switching elements 2232, and 2234 is connected with an end of an electrically conductive wire 2261. In the series circuit 2248 formed by three switching elements 2236, 2238, and 2240, a series connecting portion between the switching elements 2236, 2238 is connected with an end of an electrically conductive wire 2262, and a series connecting portion between the switching elements 2238, and 2240 is connected with an end of an electrically conductive wire 2263.

Of these wires, the conductive wire 2250 is connected to an end of an upper coil 2322a incorporated in the first intake valve 2112a of the first cylinder 2102a. The conductive wire 2252 is connected to the other end of the upper coil 2322a and to an end of an upper coil 2322j incorporated in the first intake valve 2112j of the fourth cylinder 2102d. The conductive wire 2254 is connected to the other end of the upper coil 2322*j* and to an end of an upper coil 2322*b* incorporated in the second intake valve 2112*b* of the first cylinder 2102*a*. The conductive wire 2256 is connected to the other end of the upper coil 2322*b* and to an end of an upper coil 2322*k* incorporated in the second intake valve 2112*k* of the fourth cylinder 2102*d*. The conductive wire 2258 is connected to the other end of the upper coil 2322*k* and to an end of an upper coil 2322*c* incorporated in the third intake valve 2112*c* of the first cylinder 2102*a*. The conductive wire 2260 is connected to the other end of the upper coil 2322*c* and to an end of an upper coil 2322*l* incorporated in the third intake valve 2112*l* of the fourth cylinder 2102*d*. The conductive wire 2262 is connected to the other end of the upper coil 2322*l*.

The conductive wire 2251 is connected to an end of a lower coil 2324*a* incorporated in the first intake valve 2112*a* of the first cylinder 2102*a*. The conductive wire 2253 is connected to the other end of the lower coil 2324*a* and to an end of a lower coil 2324*j* incorporated in the first intake valve 2112*j* of the cylinder 2102*d*. The conductive wire 2255 is connected to the other end of the lower coil 2324*j* and to an end of a lower coil 2324*b* incorporated in the second intake valve 2112*b* of the first cylinder 2102*a*. The conductive wire 2257 is connected to the other end of the lower coil 2324*b* and to an end of a lower coil 2324*k* incorporated in the second intake valve 2112*k* of the fourth cylinder 2102*d*. The conductive wire 2259 is connected to the other end of the lower coil 2324*k* and to an end of a lower coil 2324*c* incorporated in the third intake valve 2112*c* of the first cylinder 2102*a*. The conductive wire 2261 is connected to the other end of the lower coil 2324*c* and to an end of a lower coil 2324*l* incorporated in the third intake valve 2112*l* of the fourth cylinder 2102*d*. The conductive wire 2263 is connected to the other end of the lower coil 2324*l*.

Thus, the connections between the series circuit 2242 and the series circuit 2243, the connections between the series circuit 2244 and the series circuit 2245, and the connections between the series circuit 2246 and the series circuit 2247 are accomplished only by the electromagnetic coils 2322*a*–2322*c*, and 2324*a*–2324*c* provided in the three intake valves 2112*a*–2112*c*, which perform identical operations on the first cylinder 2102*a*. Furthermore, the connections between the series circuit 2243 and the series circuit 2244, the connections between the series circuit 2245 and the series circuit 2246, and the connections between the series circuit 2247 and the series circuit 2248 are accomplished only by the electromagnetic coils 2322*j*–2322*l*, and 2324*j*–2324*l* provided in the three intake valves 2112*j*–2112*l*, which perform identical operations on the fourth cylinder 2102*d*. Thus, in the drive circuit 2292*a*, the inter-series circuit connections accomplished by the electromagnetic coils 2322*a*–2322*c*, and 2324*a*–2324*c* of the three intake valves 2112*a*–2112*c* of the first cylinder 2102*a*, and the inter-series circuit connections accomplished by the electromagnetic coils 2322*j*–2322*l*, and 2324*j*–2324*l* of the three intake valves 2112*j*–2112*l* of the fourth cylinder 2102*d* are alternately arranged. In this manner, the drive circuit 2292*a* is provided collectively for the group of valves consisting of the six valves 2112*a*–2112*c*, 2112*j*–2112*l*.

The processor controls output signals to the gate terminals G of the switching elements 2200–2240 via the output port 2272 and the buffer circuit 2290. Therefore, the state of activation of the electromagnetic coils 2322*a*, 2322*j*, 2322*b*, 2322*k*, 2322*c*, 2322*l*, 2324*a*, 2324*j*, 2324*b*, 2324*k*, 2324*c*, and 2324*l* is controlled so that a control of opening and closing the three intake valves 2112*a*, 2112*b*, and 2112*c* of the first cylinder 2102*a* and the three intake valves 2112*j*, 2112*k*, and 2112*l* of the fourth cylinder 2102*d* is performed.

As indicated in the valve timing chart of FIG. 6, the open valve period of the three intake valves 2112*a*–2112*c* of the first cylinder 2102*a* and the open valve period of the three intake valves 2112*j*–2112*l* of the fourth cylinder 2102*d* do not overlap. Thus, the drive circuit 2292*a* illustrated in FIG. 42 is provided collectively for the three intake valves 2112*a*–2112*c* of the first cylinder 2102*a* and the three intake valves 2112*j*–2112*l* of the fourth cylinder 2102*d*, whose open valve periods do not overlap.

The opening and closing operations of the three intake valves 2112*a*–2112*c* of the first cylinder 2102*a* and the three intake valves 2112*j*–2112*l* of the fourth cylinder 2102*d* are caused by supply of control currents from the ECU. A timing chart shown in FIG. 43 indicates the operations of the six valves 2112*a*–2112*c*, and 2112*j*–2112*l*.

Figure 43:
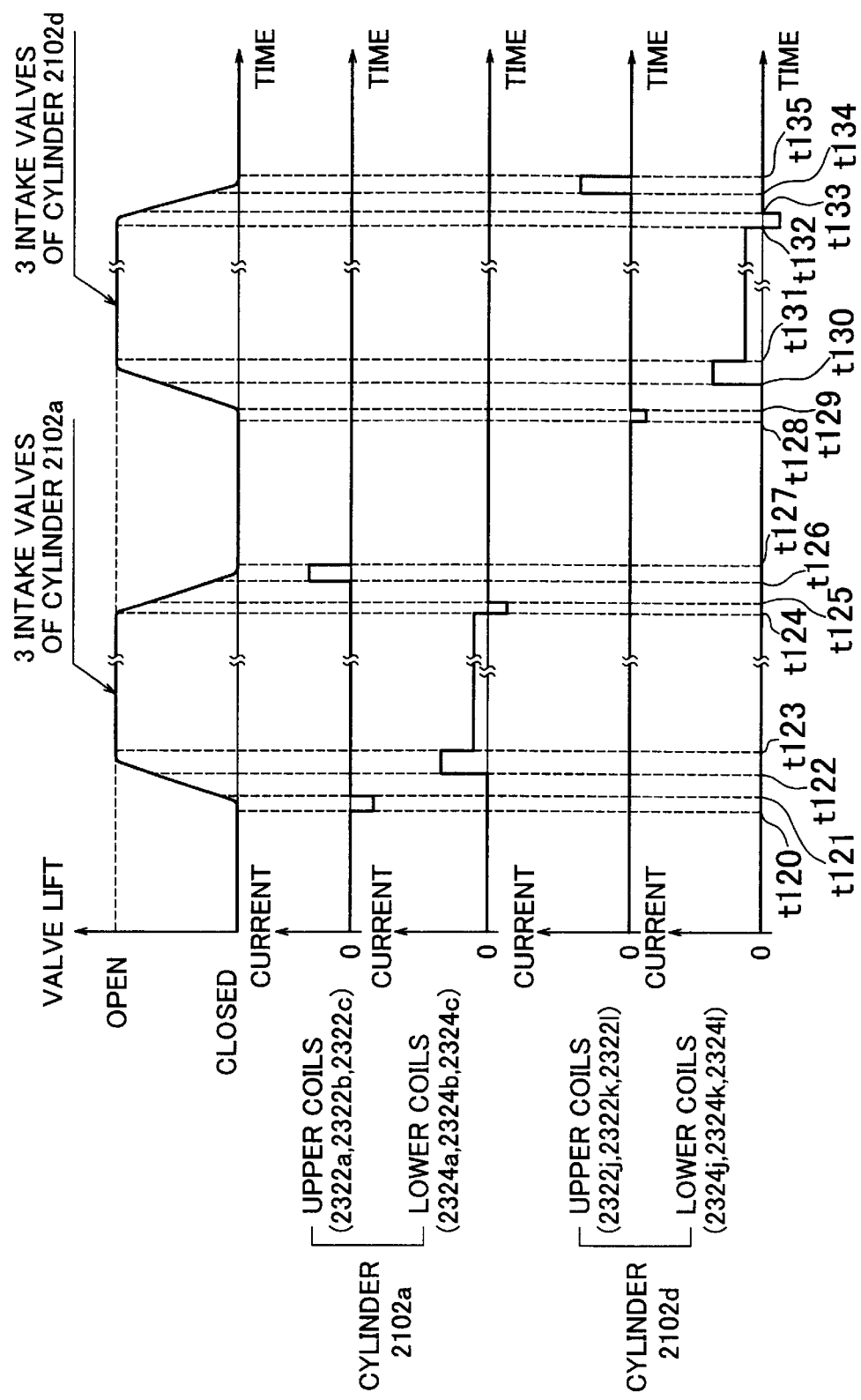
FIG. 43 is a timing chart indicating the operations of intake valves and the current control according to the embodiment of FIG. 41.

FIGS. 44A to 44F and FIGS. 45A to 45F are circuit diagrams indicating states of control performed on the drive circuit 2292*a* shown in FIG. 42 to realize the operations indicated in FIG. 43. In FIGS. 44A to 44F and 45A to 45F, the conductive wires 2250–2263 are omitted. Furthermore, in FIGS. 44A to 44F and 45A to 45F, broken line arrows and circles "□" have the same states as described above in conjunction with previous embodiments.

Before a time point t120 indicated in FIG. 43, the armatures 110 are brought into contact with the upper cores 116 as shown in FIG. 10 by temporary excitation of the upper coils 2322*a*–2322*c*, and 2322*j*–2322*l*, and that this contact state is maintained by the magnetic attraction forces of the upper magnets 116*d*. Therefore, the valve bodies 100 are in contact with the valve seats 126, and, the three intake valves 2112*a*–2112*c* of the first cylinder 2102*a* and the three intake valves 2112*j*–2112*l* of the fourth cylinder 2102*d* are in a completely closed state. The OFF signals are outputted to all the 21 switching elements 2200–2240.

Figure 44A:
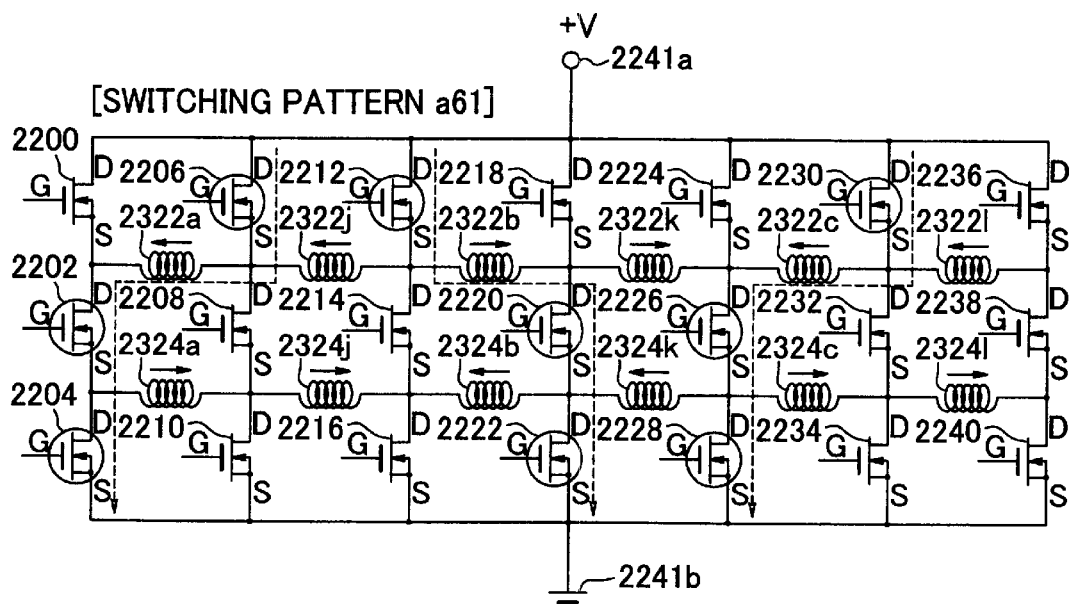
FIGS. 44A–44F are circuit diagrams for illustrating the control of current according to the embodiment of FIG. 41.
Figure 44B:
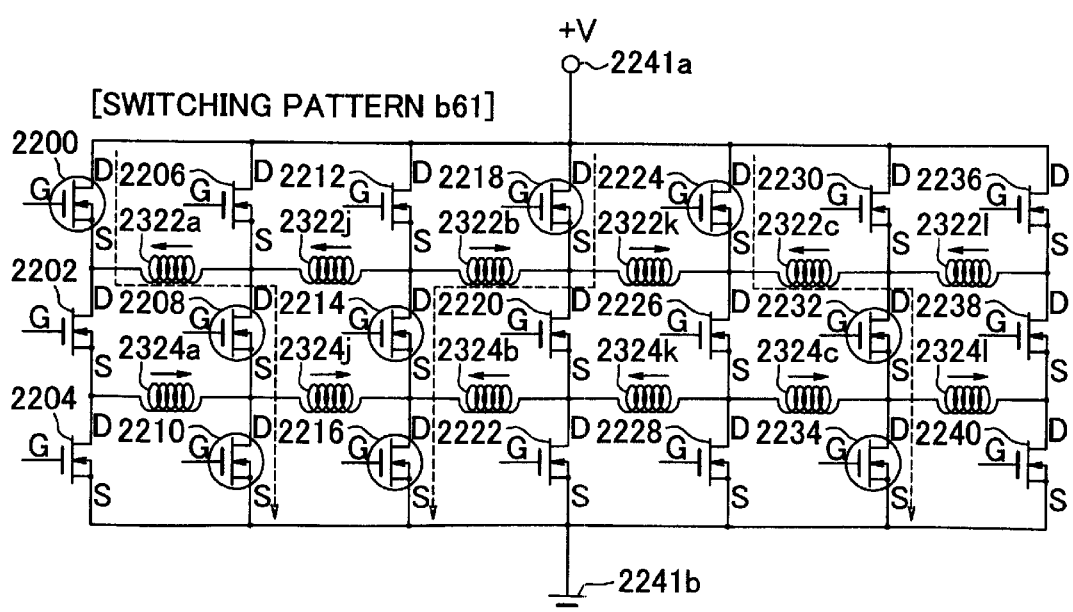

At the time of the intake stroke of the first cylinder 2102*a*, the processor outputs the ON signals to the switching elements 2200, 2208, 2210, 2214, 2216, 2218, 2224, 2232, and 2234 and outputs the OFF signals to the other switching elements during a time period of t120–t121, to establish a switching pattern b61 indicated in FIG. 44B. As a result, currents flow from the high potential side terminal 2241*a* to the low potential side terminal 2241*b* as indicated by broken line arrows in FIG. 44B, so that releasing currents flow through the upper coils 2322*a*–2322*c* in a reverse direction so as to cancel out the magnetic fluxes from the upper magnets 116*d*.

Therefore, the magnetic attraction forces on the armatures 110 created by the upper cores 116 discontinue. As a result, the armatures 110 start to move toward the lower cores 118, or, toward a fully open state, due to the forces from the upper springs 120. Hence, the valve bodies 100 start to move apart from the valve seats 126, and the amount of valve lift starts to increase.

Afterwards, at the time point t121, the processor temporarily sets a switching pattern a61 indicated in FIG. 44A. In the switching pattern a61, the processor outputs the ON signals to the switching elements 2202, 2204, 2206, 2212, 2220, 2222, 2226, 2228, and 2230, and outputs the OFF signals to the other switching elements. Therefore, regenerative currents flow in a direction opposite to the direction indicated by broken line arrows in FIG. 44A, so that the releasing currents through the upper coils 2322*a*–2322*c* rapidly discontinue. Then, the processor immediately outputs the OFF signals to all the switching elements 2200–2240 to maintain the current discontinued state of the upper coils 2322a–2322c.

At the time point t121 when the releasing currents through the upper coils 2322a–2322c discontinue, the armatures 110 are sufficiently apart from the upper cores 116, so that the armatures 110 are not returned to the upper cores 116 by the magnetic forces from the upper magnets 116d. After that, the armatures 110 are moved apart from the upper cores 116 toward the lower cores 118 by the forces from the upper springs 120.

Figure 44C:
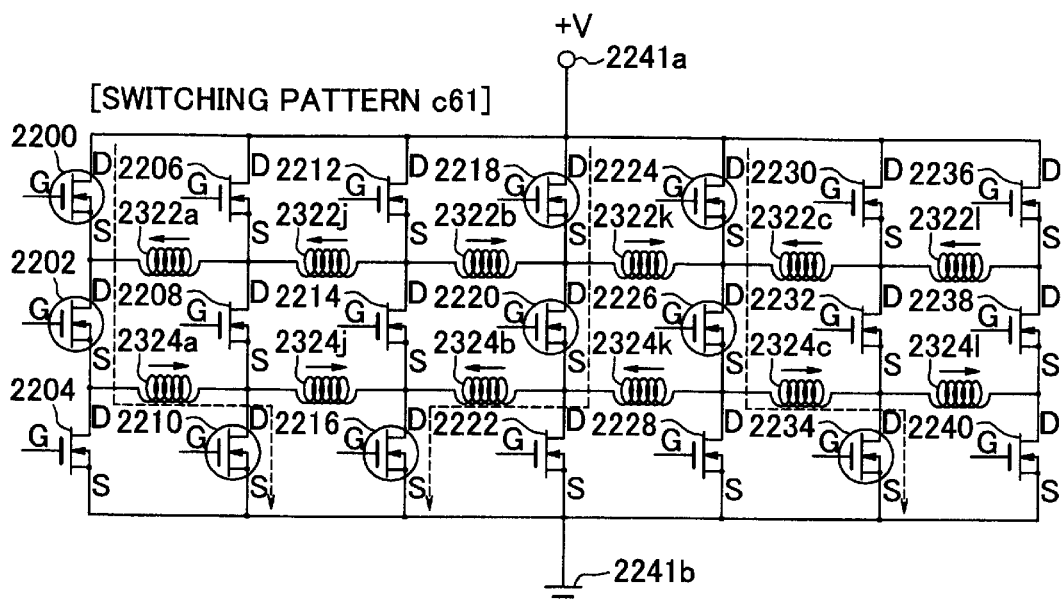

Subsequently at a time point t122, the processor outputs the ON signals to the switching elements 2200, 2202, 2210, 2216, 2218, 2220, 2224, 2226, and 2234, and outputs the OFF signals to the other switching elements so as to set a switching pattern c61 indicated in FIG. 44C. Therefore, currents flow from the high potential side terminal 2241a to the low potential side terminal 2241b as indicated by broken line arrows in FIG. 44C, so that currents flow through the lower coils 2324a–2324c of the three intake valves 2112a–2112c of the first cylinder 2102a in the forward direction. Then, until a time point t123, the switching pattern c61 and a switching pattern f61 indicated in FIG. 44F are alternated to maintain the drawing currents for magnetically drawing the armatures 110 to the lower cores 118. Therefore, when approaching the lower cores 118, the armatures 110 come into contact with the lower cores 118, overcoming the forces from the lower springs 106.

In the switching pattern f61, the processor outputs the ON signals to the switching elements 2210, 2216, and 2234, and outputs the OFF signals to the other switching elements. Therefore, a current circulation path is formed through which current flows in a sequence of the lower coil 2324a and the switching elements 2210 and 2204. A current circulation path is formed through which current flows in a sequence of the lower coil 2324b and the switching elements 2216 and 2222. A current circulation path is formed through which current flows in a sequence of the lower coil 2324c and the switching elements 2234 and 2228. Immediately after the switching pattern c61 is changed to the switching pattern f61, flywheel currents flow through these circulation paths as indicated by broken line arrows in FIG. 44F. Therefore, by adjusting the proportion between the switching pattern c61 and the switching pattern f61, the quantity of current flowing through the lower coils 2324a–2324c in the forward direction can be adjusted.

Figure 44D:
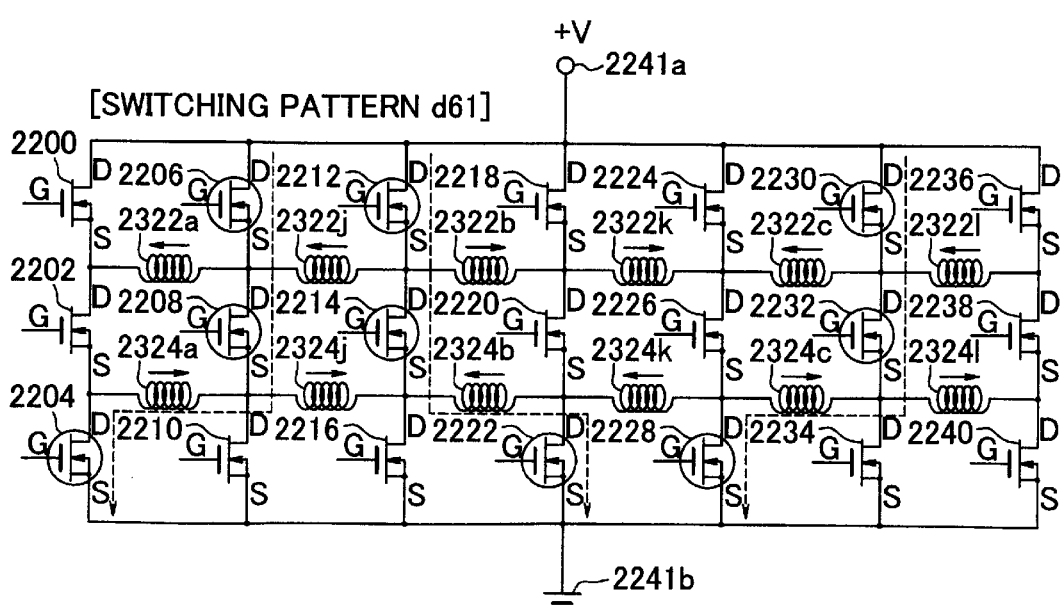

At the time point t123 after the armatures 110 come into contact with the lower cores 118, the switching pattern is temporarily changed to a switching pattern d61 indicated in FIG. 44D. In the switching pattern d61, the processor outputs the ON signals to the switching elements 2204, 2206, 2208, 2212, 2214, 2222, 2228, 2230, and 2232, and outputs the OFF signals to the other switching elements. Therefore, regenerative currents occur in the direction opposite to the direction indicated by broken line arrows in FIG. 44D, so that the drawing currents through the lower coils 2324a–2324c rapidly decrease. Immediately after that, the state of alternating the switching pattern c61 and the switching pattern f61 is resumed. In this case, however, the proportion of the switching pattern c61 is reduced, in comparison with the pattern alternating state during the time period t122–t123. In this manner, the level of the holding current is maintained so as to maintain the contact between the armatures 110 and the lower cores 118.

While the armatures 110 are held in contact with the lower cores 118 by the magnetic forces created by continuously supplying the holding currents through the lower coils 2324a–2324c, the valve bodies 100 are farthest apart from the valve seats 126 as indicated in FIG. 11. Thus, the intake ports of the first cylinder 2102a remain in the fully open state.

Subsequently, at a time point t124 near or at a timing at which the intake stroke of the first cylinder 2102a comes to an end, the switching pattern is changed to the switching pattern d61 indicated in FIG. 44D. Therefore, regenerative currents occur in the direction opposite to the direction indicated by the broken line arrows in FIG. 44D, so that the holding currents through the lower coils 2324a–2324c rapidly discontinue. Then, the releasing currents flow through the lower coils 2324a–2324c in the reverse direction.

Subsequently at a time point t125, the switching pattern is temporarily changed to the switching pattern c61. Therefore, regenerative currents flow in the direction opposite to the direction indicated by the broken line arrows in FIG. 44C, so that the releasing currents through the lower coils 2324a–2324c rapidly discontinue. Then, the processor immediately outputs the OFF signals to all the switching elements 2200–2240 to maintain the current discontinued state of the lower coils 2324a–2324c.

After the armatures 110 lose the attraction forces toward the lower cores 118, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t126, the processor changes the switching pattern to the switching pattern a61 indicated in FIG. 44A, in order to draw the armatures 110 into contact with the upper cores 116. As a result, the drawing currents flow through the upper coils 2322a–2322c. Afterwards, a drawing current is maintained by alternating the switching pattern a61 and a switching pattern e61 indicated in FIG. 44E, until the armatures 110 contact the upper cores 116.

In the switching pattern e61, the processor outputs the ON signals to the switching elements 2206, 2212, and 2230, and outputs the OFF signals to the other switching elements. Therefore, a current circulation path is formed through which current flows in a sequence of the upper coil 2322a and the switching elements 2200 and 2206. A current circulation path is formed through which current flows in a sequence of the upper coil 2322b and the switching elements 2218 and 2212. A current circulation path is formed through which current flows in a sequence of the upper coil 2322c and the switching elements 2224 and 2230. Immediately after the switching pattern a61 is changed to the switching pattern e61, flywheel currents flow through these circulation paths as indicated by broken line arrows in FIG. 44E. Therefore, by adjusting the proportion between the switching pattern a61 and the switching pattern e61, the quantity of current flowing through the upper coils 2322a–2322c in the forward direction can be adjusted.

At a time point t127 after the armatures 110 come into contact with the upper cores 116, the switching pattern is temporarily changed to the switching pattern b61 indicated in FIG. 44B. Therefore, regenerative currents flow in the direction opposite to the direction indicated by the broken line arrows in FIG. 44B, so that the drawing currents through the upper coils 2322a–2322c rapidly discontinue. Then, the processor immediately outputs the OFF signals to all the switching elements 2200–2240 so as to maintain the current discontinued state of the upper coils 2322a–2322c.

Even after the drawing currents discontinue, the contact between the armatures 110 and the upper cores 116 is maintained by the magnetic attraction forces from the upper magnets 116d. Thus, the valve bodies 100 are held in contact with the valve seats 126, and therefore the intake ports of the first cylinder 2102a are kept in the closed state.

After the state where the OFF signals are outputted to all the switching elements 2200–2240, a timing point occurs at the intake stroke of the fourth cylinder 2102d occurs. The intake stroke of the fourth cylinder 2102d does not overlap the intake stroke of the first cylinder 2102a. In this case, starting at a time point t128, the processor sets a switching pattern b62 indicated in FIG. 45B. In the switching pattern b62, the processor outputs the ON signals to the switching elements 2206, 2214, 2216, 2220, 2222, 2224, 2230, 2238, and 2240, and outputs the OFF signals to the other switching elements. Therefore, currents flow from the high potential side terminal 2241a to the low potential side terminal 2241b as indicated by broken line arrows in FIG. 45B, so that releasing currents flow through the upper coils 2322j, 2322k, and 2322l of the intake valves 2112j–2112l of the fourth cylinder 2102d so as to cancel out the magnetic fluxes from the upper magnets 116d.

Therefore, the magnetic attraction forces on the armatures 110 created by the upper cores 116 disappear. Hence, the armatures 110 start to move toward the lower cores 118, or, toward the fully open state, due to the forces from the upper springs 120. As a result, the valve bodies 100 start to move apart from the valve seats 126, and the amount of valve lift starts to increase.

Figure 45A:
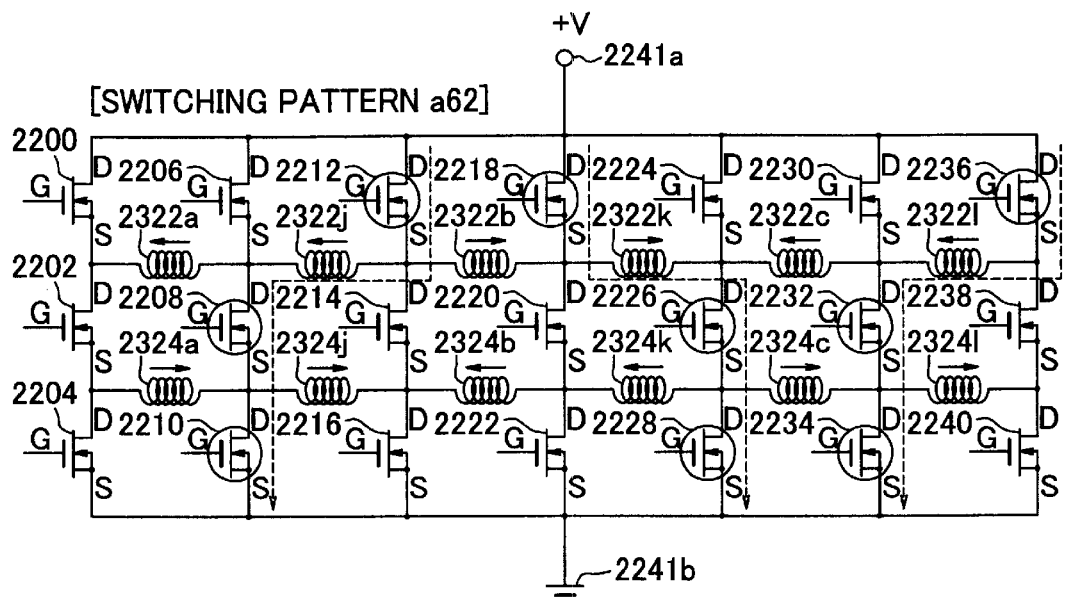
FIGS. 45A–45F are circuit diagrams for illustrating the control of current according to the embodiment of FIG. 41.

After that, at a time point t129, the processor sets a switching pattern a62 indicated in FIG. 45A. In the switching pattern a62, the processor outputs the ON signals to the switching elements 2208, 2210, 2212, 2218, 2226, 2228, 2232, 2234, and 2236, and outputs the OFF signals to the other switching elements. Therefore, regenerative currents flow in the direction opposite to the direction indicated by broken line arrows in FIG. 45A, so that the releasing currents flowing through the upper coils 2322j–2322l rapidly discontinue. Then, the processor immediately outputs the OFF signals to all the switching elements 2200–2240 to maintain the current discontinued state of the upper coils 2322j–2322l.

At the time point t129 when the releasing currents through the upper coils 2322j–2322l discontinue, the armatures 110 are sufficiently apart from the upper cores 116, so that the armatures 110 are not returned to the upper cores 116 by the magnetic forces from the upper magnets 116d. Afterwards, the armatures 110 are moved apart from the upper cores 116 toward the lower cores 118 by the forces from the upper springs 120.

Figure 45B:
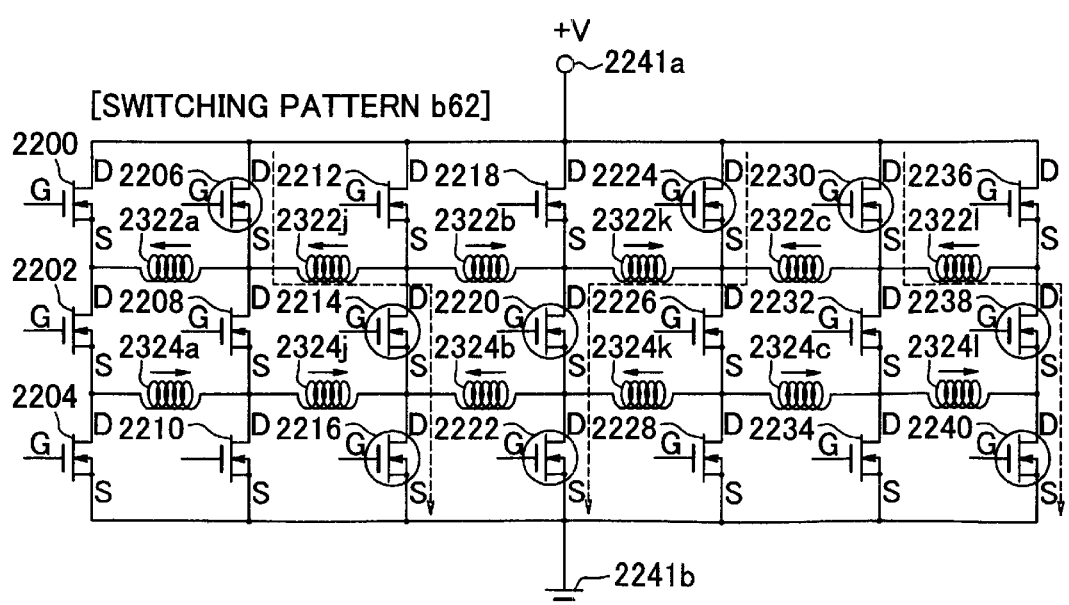
Figure 45C:
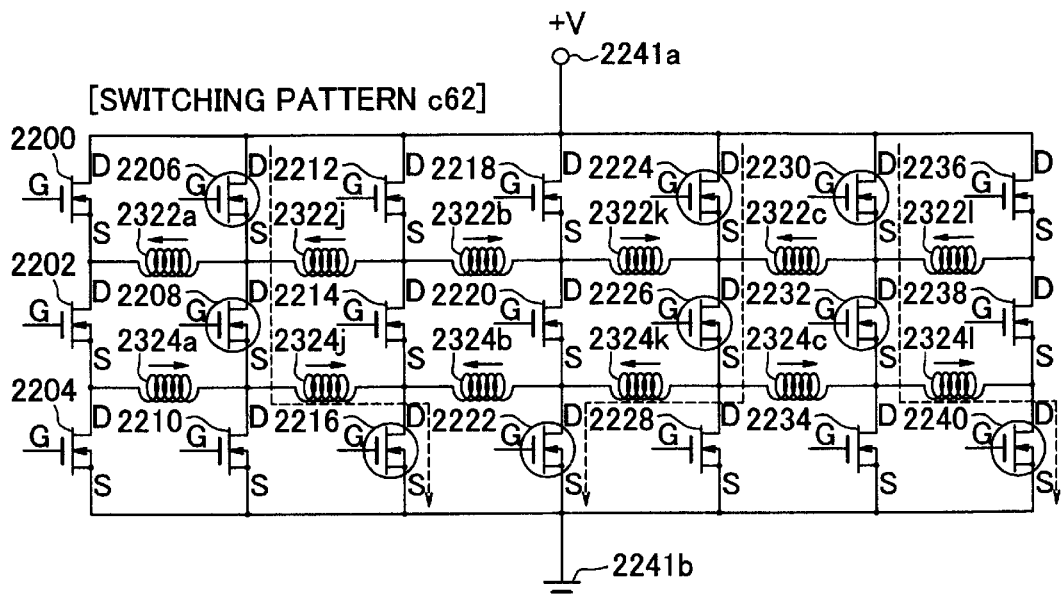

Subsequently at a time point t130, the processor sets a switching pattern c62 indicated in FIG. 45C. In the switching pattern c62, the processor outputs the ON signals to the switching elements 2206, 2208, 2216, 2222, 2224, 2226, 2230, 2232, and 2240, and outputs the OFF signals to the other switching elements. Therefore, currents flow from the high potential side terminal 2241a to the low potential side terminal 2241b as indicated by broken line arrows in FIG. 45C, so that currents flow through the lower coils 2324j–2324l of the three intake valves 2112j–2112l of the fourth cylinder 2102d in the forward direction. Then, until a time point t131, the switching pattern c62 and a switching pattern f62 indicated in FIG. 45F are alternated to maintain the drawing currents for magnetically drawing the armatures 110 into contact with the lower cores 118. Therefore, when approaching the lower cores 118, the armatures 110 come into contact with the lower cores 118, overcoming the forces from the lower springs 106.

In the switching pattern f62, the processor outputs the ON signal to the switching elements 2216, 2222, and 2240, and outputs the OFF signals to the other switching elements. Therefore, a current circulation path is formed through which current flows in a sequence of the lower coil 2324j and the switching elements 2216 and 2210. A current circulation path is formed through which current flows in a sequence of the lower coil 2324k and the switching elements 2222 and 2228. A current circulation path is formed through which current flows in a sequence of the lower coil 2324l and the switching elements 2240 and 2234. Immediately after the switching pattern c62 is changed to the switching pattern f62, flywheel currents flow through the circulation paths as indicated by broken line arrows in FIG. 45F. Therefore, by adjusting the proportion between the switching pattern c62 and the switching pattern f62, the quantity of current flowing through the lower coils 2324j–2324l in the forward direction can be adjusted.

Figure 45D:
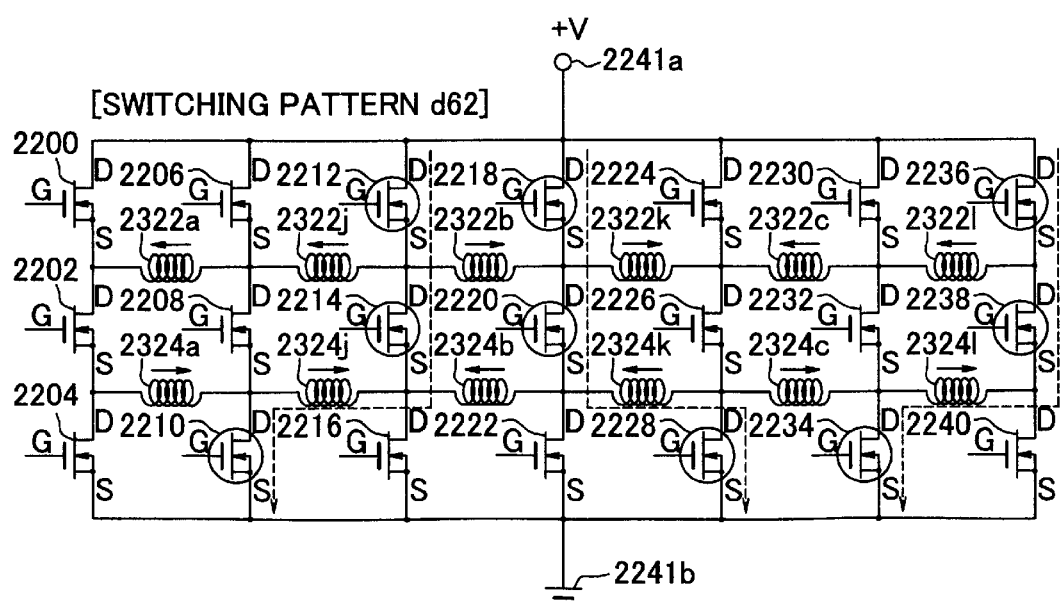

At the time point t131 after the armatures 110 come into contact with the lower cores 118, the switching pattern is temporarily changed to a switching pattern d62 indicated in FIG. 45D. In the switching pattern d62, the processor outputs the ON signals to the switching elements 2210, 2212, 2214, 2218, 2220, 2228, 2234, 2236, and 2238, and outputs the OFF signals to the other switching elements. Therefore, regenerative currents occur in the direction opposite to the direction indicated by broken line arrows in FIG. 45D, so that the drawing currents through the lower coils 2324j–2324l rapidly decrease. Immediately afterwards, the state of alternating the switching pattern c62 and the switching pattern f62 is resumed. In this case, however, the proportion of the switching pattern c62 is reduced, in comparison with the pattern alternating state during the time period t130–t131. In this manner, the quantity of current flowing through the lower coils 2324j–2324l in the forward direction is maintained at the level of the holding current, so as to maintain the contact between the armatures 110 and the lower cores 118.

While the armatures 110 and the lower cores 118 are held in contact by continuously supplying the holding currents through the lower coils 2324j–2324l, the valve bodies 100 are held farthest from the valve seats 126 as depicted in FIG. 11. Therefore, the intake ports of the fourth cylinder 2102d remain in the fully open state.

Subsequently, at a time point t132 near or at a timing at which the intake stroke of the fourth cylinder 2102d comes to an end, the switching pattern is changed to the switching pattern d62 indicated in FIG. 45D. Therefore, regenerative currents flow in the direction opposite to the direction indicated by the broken line arrows in FIG. 45D, so that the holding currents through the lower coils 2324j–2324l rapidly discontinue. Then, the releasing currents flow through the lower coils 2324j–2324l in the reverse direction.

Subsequently at a time point t133, the switching pattern is temporarily changed to the switching pattern c62 indicated in FIG. 45C. Therefore, regenerative currents flow in the direction opposite to the direction indicated by the broken line arrows in FIG. 45C, so that the releasing currents through the lower coils 2324j–2324l rapidly discontinue. Then, the processor immediately outputs the OFF signals to all the switching elements 2200–2240 to maintain the current discontinued state of the lower coils 2324j–2324l.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and the amount of valve lift starts to decrease.

Subsequently at a time point t134, the processor changes the switching pattern to the switching pattern a62 indicated in FIG. 45A, in order to draw the armatures 110 into contact with the upper cores 116. As a result, the drawing currents flow through the upper coils 2322j–2322l. Afterwards, a drawing current is maintained by alternating the switching pattern a62 and a switching pattern e62 indicated in FIG. 45E, until the armatures 110 contact the upper cores 116.

In the switching pattern e62, the processor outputs the ON signal to the switching elements 2212, 2218, and 2236, and outputs the OFF signals to the other switching elements. Therefore, a current circulation path is formed through which current flows in a sequence of the upper coil 2322j and the switching elements 2206 and 2212. A current circulation path is formed through which current flows in a sequence of the upper coil 2322k and the switching elements 2224 and 2218. A current circulation path is formed through which current flows in a sequence of the upper coil 2322l and the switching elements 2230 and 2236. Immediately after the switching pattern a62 is changed to the switching pattern e62, flywheel currents flow through the circulation paths as indicated by broken line arrows in FIG. 45E. Therefore, by adjusting the proportion between the switching pattern a62 and the switching pattern e62, the quantity of current flowing through the upper coils 2322j–2322l in the forward direction can be adjusted.

At a time point t135 after the armatures 110 come into contact with the upper cores 116, the switching pattern is temporarily changed to the switching pattern b62. Therefore, regenerative currents flow in the direction opposite to the direction indicated by the broken line arrows in FIG. 45B, so that the drawing currents through the upper coils 2322j–2322l rapidly discontinue. Then, the processor immediately outputs the OFF signals to all the switching elements 2200–2240 to maintain the current discontinued state of the upper coils 2322j–2322l.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the intake ports of the fourth cylinder 2102d remain in the completely closed state.

By repeating the above-described processes, the three intake valves 2112a–2112c of the first cylinder 2102a and the three intake valves 2112j–2112l of the fourth cylinder 2102d are opened and closed.

Figure 44E:
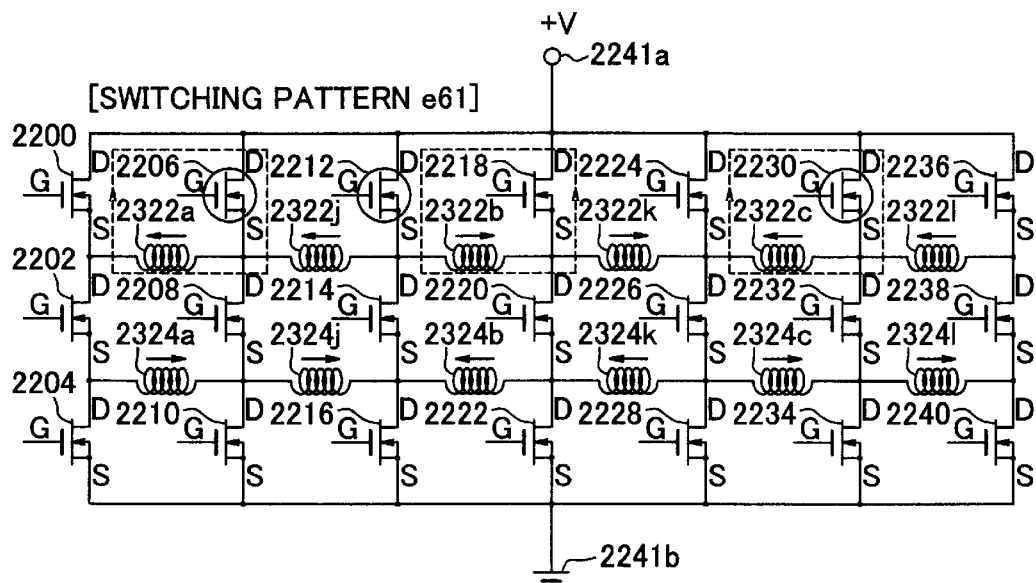
Figure 44F:
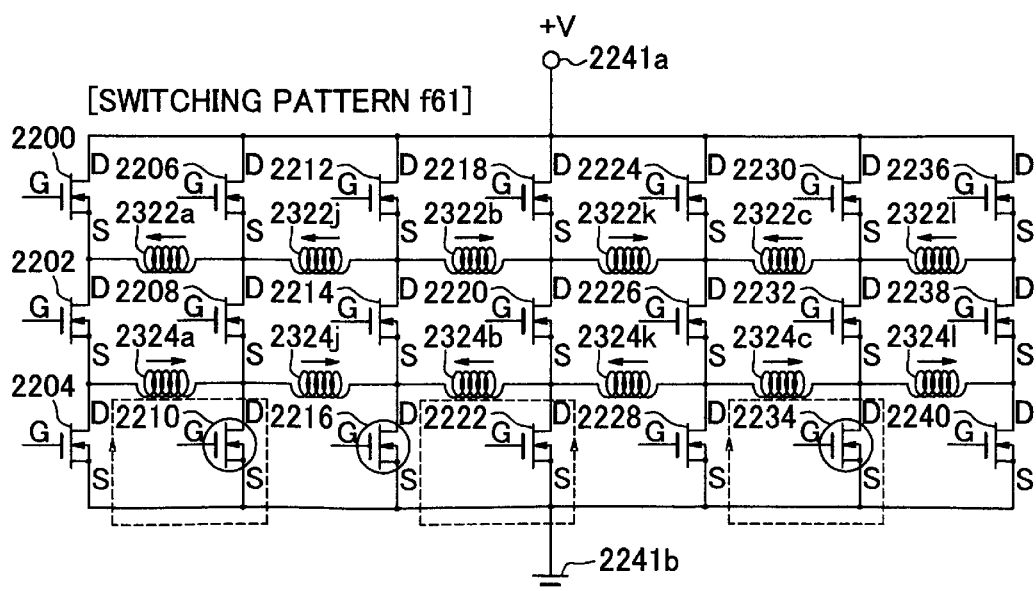

From the foregoing description, it should be understood that the switching elements 2200–2234 used to conduct current to drive the upper coils 2322a–2322c as indicated in FIGS. 44A, 44B and 44E are the same as the switching elements 2200–2234 used to conduct current to drive the lower coils 2324a–2324c as indicated in FIGS. 44C, 44D and 44F. Thus, these switching elements are shared by the upper coils 2322a–2322c and the lower coils 2324a–2324c.

Figure 45E:
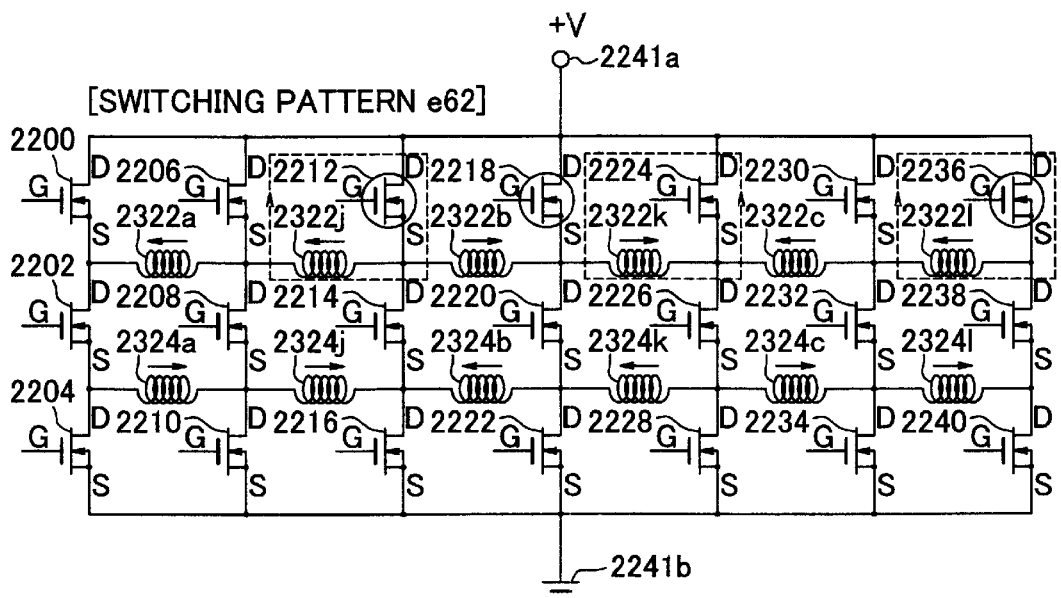
Figure 45F:
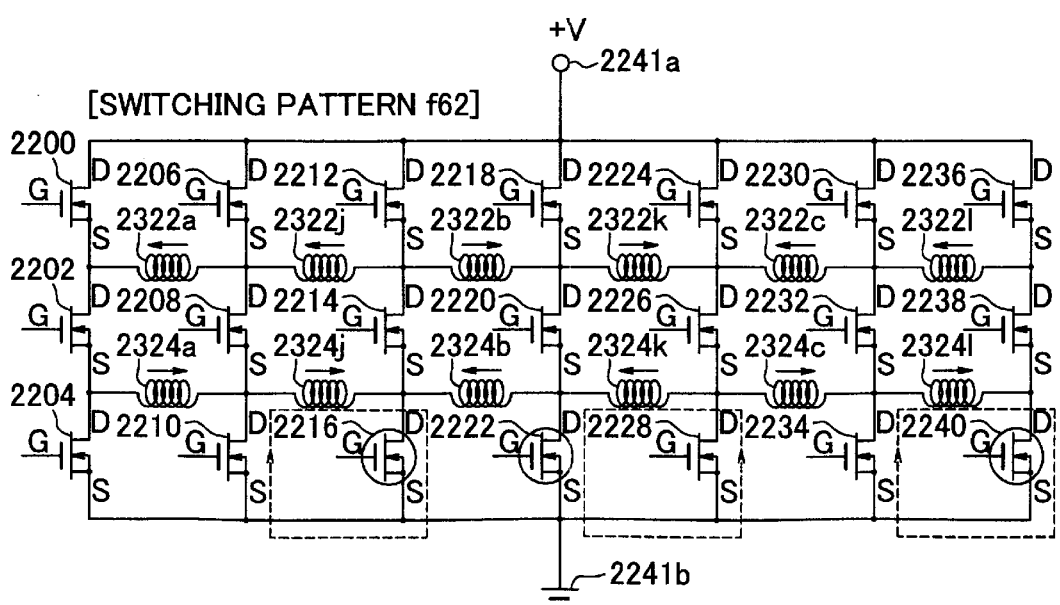

Furthermore, it should be understood that the switching elements 2206–2240 used to conduct current to drive the upper coils 2322j–2322l as indicated in FIGS. 45A, 45B and 45E are the same as the switching elements 2206–2240 used to conduct current to drive the lower coils 2324j–2324l as indicated in FIGS. 45C, 45D and 45F. Thus, these switching elements are shared by the upper coils 2322j–2322l and the lower coils 2324j–2324l.

Still further, through comparison between the switching elements 2200–2234 used to conduct current to drive the upper coils 2322a–2322c and the lower coils 2324a–2324c of the three intake valves 2112a–2112c of the first cylinder 2102a as indicated in FIGS. 44A to 44F and the switching elements 2206–2240 used to conduct current to drive the upper coils 2322j–2322l and the lower coils 2324j–2324l of the three intake valves 2112j–2112l of the fourth cylinder 2102d as indicated in FIGS. 45A to 45F, it should be understood that the switching elements 2206–2234 are shared.

The other drive circuits 2292b, 2292c, and 2292d drive combinations of valves as shown in FIG. 46. For example, the drive circuit 2292b drives a combination of the three exhaust valves 2116a, 2116b, and 2116c of the first cylinder 2102a and the three exhaust valves 2116j, 2116k, and 2116l of the fourth cylinder 2102d. The relationships between the valves 2116a–2116c, and 2116j–2116l and electromagnetic coils are substantially the same as those in the drive circuit 2292a.

The exhaust stroke of the first cylinder 2102a and the exhaust stroke of the fourth cylinder 2102d do not overlap. Therefore, the 21 switching elements in the drive circuit 2292b are controlled by the processor in patterns that are substantially similar as the switching patterns a61–f62 indicated in FIGS. 44A to 44F and 45A to 45F. Therefore, the three exhaust valves 2116a–2116c of the first cylinder 2102a and the three exhaust valves 2116j–2116l of the fourth cylinder 2102d can be opened and closed in a manner substantially similar as that indicated in the timing chart of FIG. 43. Therefore, the sharing of switching elements is achieved as in the case of the drive circuit 2292a.

The drive circuit 2292c drives a combination of the three intake valves 2112d, 2112e, and 2112f of the second cylinder 2102b and the three intake valves 2112g, 2112h, 2112i of the three cylinder 2102c. The relationships between the valves 2112d–2112i and the electromagnetic coils are substantially the same as those in the drive circuit 2292a.

The intake stroke of the second cylinder 2102b and the intake stroke of the third cylinder 2102c do not overlap. Therefore, the 21 switching elements in the drive circuit 2292c are controlled by the processor in patterns that are substantially similar as the switching patterns a61–f62 indicated in FIGS. 44A to 44F and 45A to 45F. Hence, the three intake valves 2112d–2112f of the second cylinder 2102b and the three intake valves 2112g–2112i of the third cylinder 2102c can be opened and closed in a manner substantially similar as that indicated in the timing chart of FIG. 43. Therefore, the sharing of switching elements is achieved as in the. case of the drive circuit 2292a.

The drive circuit 2292d drives a combination of the three exhaust valves 2116d, 2116e, and 2116f of the second cylinder 2102b and the three exhaust valves 2416g, 2116h, and 2116i of the third cylinder 2102c. The relationships between the valves 2116d–2116i and electromagnetic coils are substantially the same as those in the drive circuit 2292a.

The exhaust stroke of the second cylinder 2102b and the exhaust stroke of the third cylinder 2102c do not overlap. Therefore, the 21 switching elements in the drive circuit 2292d are controlled by the processor in patterns that are substantially similar as the switching patterns a61–f62 indicated in FIGS. 44A to 44F and 45A to 45F. Therefore, the three exhaust valves 2116d–2116f of the second cylinder 2102b and the three exhaust valves 2416g–2116i of the third cylinder 2102c can be opened and closed in a manner substantially similar as that indicated in the timing chart of FIG. 43. Therefore, the sharing of switching elements is achieved as in the case of the drive circuit 2292a.

Therefore, the drive circuit portion, equipped with the four drive circuits 2292a–2292d, is able to drive a total of 24 valves of the four cylinders 2102a–2102d, or, the 12 intake valves 2112a–2112l and the 12 exhaust valves 2116a–2116l, in the combinations depicted in FIG. 46.

Each of the drive circuits 2292a–2292d is able to drive 6 intake valves or 6 exhaust valves by using the 21 switching elements 2200–2240. Thus, 84 switching elements are used to drive the 24 valves of the four cylinders 2102a–2102d, or 3.5 elements/1 valve. In contrast, the above-described conventional three-switching element in-series type construction needs 72 switching elements for 16 valves, or 4.5 elements/1 valve.

Therefore, embodiments of the present invention are able to reduce the number of switching elements, and allow size and cost reductions of the drive circuit portion for the intake and exhaust valves formed as electromagnetic valves.

The terminal portions of the electromagnetic coils 2322a–2324l are connected to the series connecting portions between the switching elements of the series circuits 2242–2248 each formed by connecting three switching elements in series. Therefore, in the switching control on the switching elements 2200–2240, a mode of supplying reverse currents through the electromagnetic coils 2322a–2324l can be realized as indicated in FIGS. 44B, 44D, 45B and 45D.

Each drive circuit 2292a–2292d employs the 14 electrically conductive wires for the 12 electromagnetic coils, or 1.17 wires/1 electromagnetic coil, thus reducing the number of wires needed. In the above-described conventional three-switching element in-series type construction, 48 conductive wires are needed for 32 electromagnetic coils, or 1.5 wires/1 electromagnetic coil. Thus, embodiments of the present invention allow a reduction in the thickness of a wire harness disposed in a vehicle, thus contributing to size and weight reductions.

Figure 47:
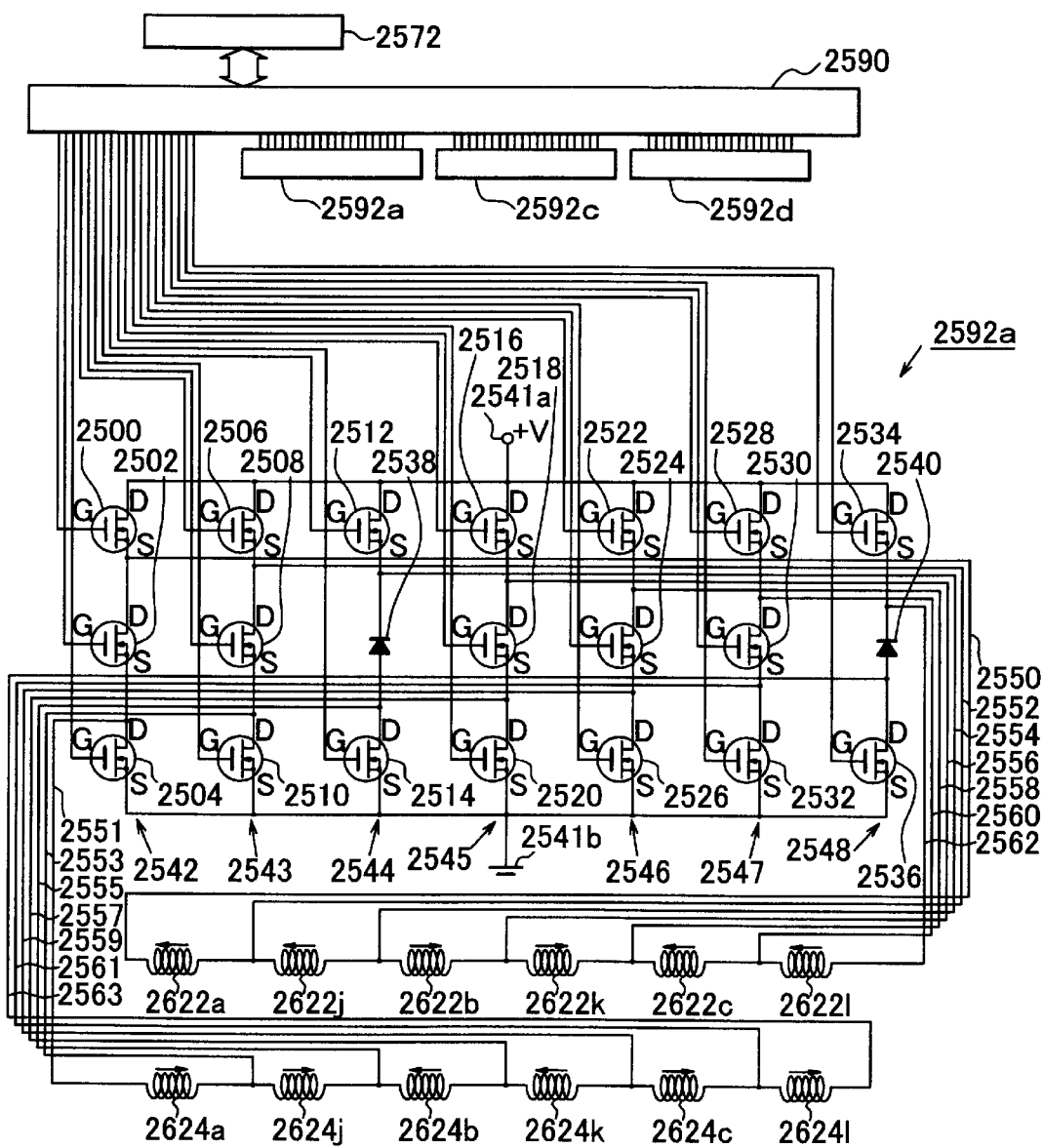
FIG. 47 is a diagram illustrating a construction of a drive circuit according to another embodiment of the present invention.

Embodiments depicted in FIG. 47 differ from previous embodiments by Embodiment 8 uses a drive circuit 2592a as shown in FIG. 47 in place of the drive circuit 2292a. The drive circuit 2592a is a three-switching element in-series type drive circuit. Other drive circuits 2592b, 2592c, and 2592d are the same as the drive circuit 2592a. Therefore, the drive circuit 2592a will be described below as a representative of the other drive circuits. Other configurations of the present embodiment are substantially similar as those of previous embodiments, unless otherwise noted.

The drive circuit 2592a is formed by 19 switching elements 2500, 2502, 2504, 2506, 2508, 2510, 2512, 2514, 2516, 2518, 2520, 2522, 2524, 2526, 2528, 2530, 2532, 2534, and 2536 and two diodes 2538, and 2540. Seven series circuits 2542, 2543, 2544, 2545, 2546, 2547, and 2548 are formed by connecting three of the switching elements 2500–2536 and the diodes 2538, and 2540 in series. The series circuits 2542–2548 are connected in parallel between a high potential side terminal 2541a and a low potential side terminal 2541b. Of the seven series circuits 2542–2548, the series circuit 2544 and the series circuit 2548 in FIG. 47 are formed by connecting the switching element 2512, the diode 2538 and the switching element 2514 in series in that order, and the switching element 2534, the diode 2540 and the switching element 2536 in series in that order, respectively. The diodes 2538, and 2540 are disposed in such a direction as to allow current to flow from the low potential side terminal 2541b to the high potential side terminal 2541a. The other five series circuits 2542, 2543, 2545, 2546, and 2547 are each formed by connecting three of the switching elements 2500–2510 and 2516–2532 in series.

Thus, the drive circuit 2592a in this embodiment differs from the drive circuit 2292a in previous embodiments in that each of the two series circuit 2544, and 2548 has in its middle position the diode 2538 or 2540 instead of a switching element. Other configurations of the drive circuit 2592a are substantially the same as those of the drive circuit 2292a. An upper coil 2622a of a first intake valve, an upper coil 2622b of a second intake valve and an upper coil 2622c of a third intake valve of a first cylinder, an upper coil 2622j of a first intake valve, an upper coil 2622k of a second intake valve and an upper coil 2622l of a third intake valve of a fourth cylinder, a lower coil 2624a of the first intake valve, a lower coil 2624b of the second intake valve and a lower coil 2624c of the third intake valve of the first cylinder, and a lower coil 2624j of the first intake valve, a lower coil 2624k of the second intake valve, and a lower coil 2624l of the third intake valve of the fourth cylinder are connected to positions comparable to those in previous embodiments, via 14 electrically conductive wires 2550, 2551, 2552, 2553, 2554, 2555, 2556, 2557, 2558, 2559, 2560, 2561, 2562, and 2563.

The 19 switching elements 2500–2536 are substantially similar to the switching elements in previous embodiments in that ON signals and OFF signals from a processor are inputted to the gate terminals G via an output port 2572 and a buffer circuit 2590.

The opening and closing operations of the three intake valves of the first cylinder and the three intake valves of the fourth cylinder are performed when control currents are supplied from the ECU. A timing chart shown in FIG. 48 indicates the operations of these valves.

Figure 48:
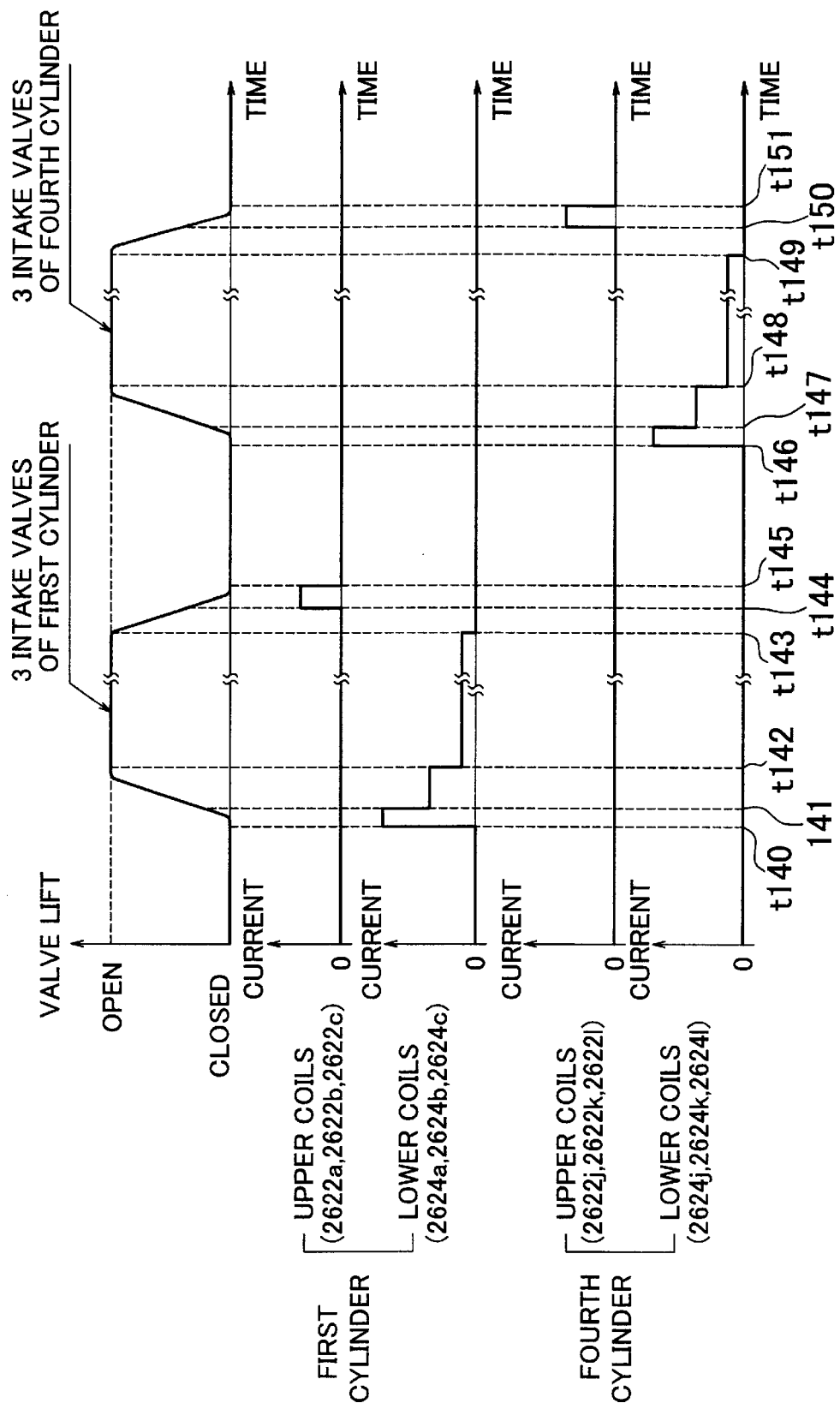
FIG. 48 is a timing chart indicating the operations of intake valves and the current control according to the embodiment of FIG. 47.

FIGS. 49A to 49F and FIGS. 50A to 50F are circuit diagrams indicating states of control performed on the drive circuit 2592a depicted in FIG. 47 to realize the operations indicated in FIG. 48. In FIGS. 49A to 49F and 50A to 50F, the conductive wires 2550–2563 are omitted. Furthermore, in FIGS. 49A to 49F and 50A to 50F, broken line arrows and circles "□" indicate the same states as described above in conjunction with previous embodiments.

Before a time point t140 indicated in FIG. 48, the armatures 110 are brought into contact with the upper cores 116 as shown in FIG. 10 by temporary excitation of the upper coils 2622a, 2622b, 2622c, 2622j, 2622k, and 2622l, and that this contact state is maintained by magnetic attraction forces of the upper magnets 116d. Therefore, the valve bodies 100 are in contact with the valve seats 126, and, the three intake valves of the first cylinder and the three intake valves of the fourth cylinder are in a closed state. The OFF signals are outputted to all the 19 switching elements 2500–2536.

Figure 49A:
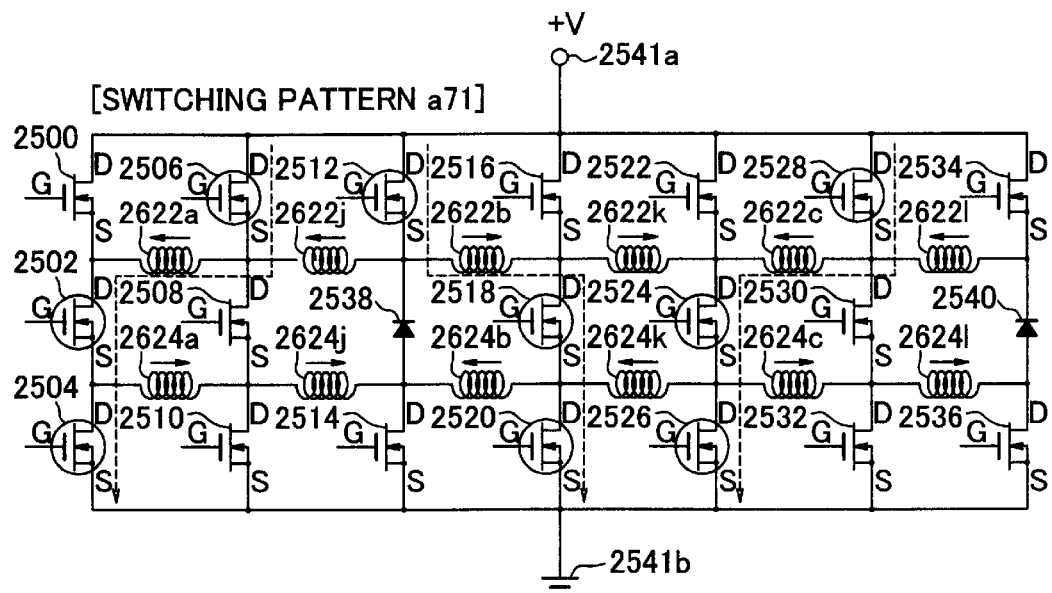
FIGS. 49A–49F are circuit diagrams for illustrating the control of current according to the embodiment of FIG. 47.
Figure 49B:
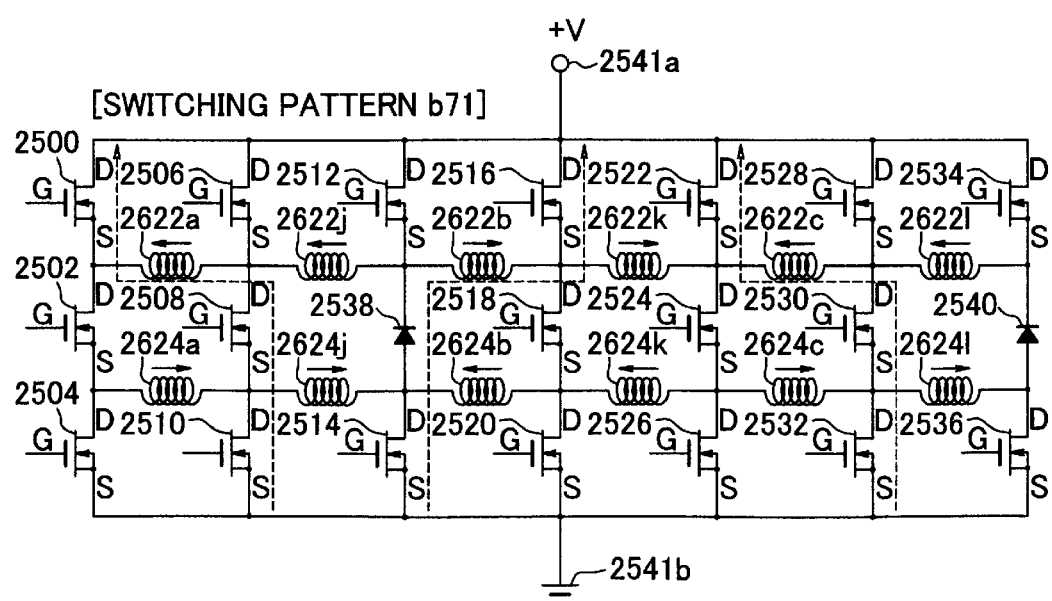
Figure 49C:
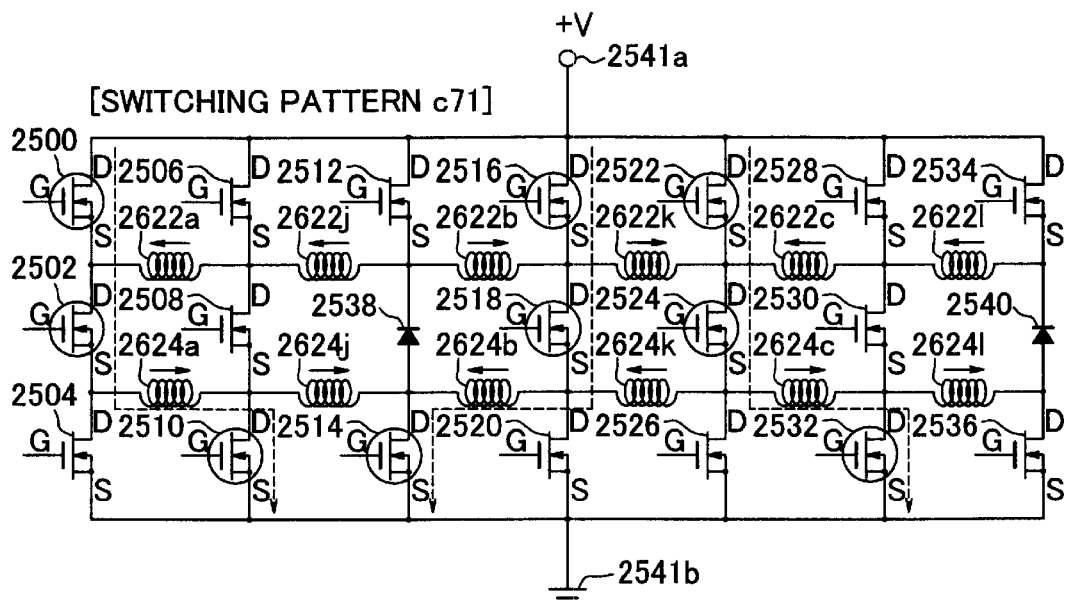

At the time of the intake stroke of the first cylinder, the processor outputs the ON signals to the switching elements 2500, 2502, 2510, 2514, 2516, 2518, 2522, 2524, and 2532 and outputs the OFF signals to the other switching elements at the time point t140, to establish a switching pattern c71 indicated in FIG. 49C. As a result, currents flow from the high potential side terminal 2541a to the low potential side terminal 2541b as indicated by broken line arrows in FIG. 49C, so that currents flow through the lower coils 2624a, 2624b, and 2624c of the three intake valves of the first cylinder in a forward direction. Then, the switching pattern c71 and a switching pattern f71 indicated in FIG. 49F are alternated until a time point t141.

In the switching pattern f71, the processor outputs the ON signals to the switching elements 2510, 2514, and 2532, and outputs the OFF signals to the other switching elements.

Therefore, a current circulation path is formed through which current flows in a sequence of the lower coil 2624a and the switching elements 2510 and 2504. A current circulation path is formed through which current flows in a sequence of the lower coil 2624b and the switching elements 2514 and 2520. A current circulation path is formed through which current flows in a sequence of the lower coil 2624c and the switching elements 2532 and 2526. Immediately after the switching pattern c71 is changed to the switching pattern f71, flywheel currents flow through the circulation paths as indicated by broken line arrows in FIG. 49F. Therefore, by adjusting the proportion of the switching pattern c71 to a sufficiently great value, it is possible to achieve such an adjustment that great currents flow through the lower coils 2624a–2624c in the forward direction.

In this manner, the lower coils 2624a–2624c are supplied with separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Figure 49D:
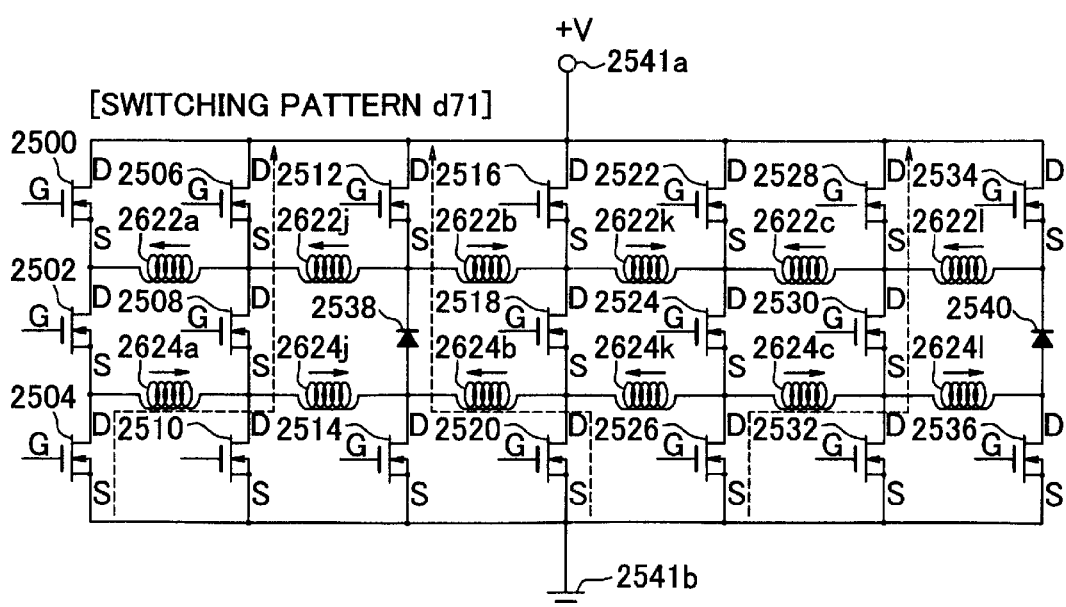

At the time point t141, the processor temporarily sets a switching pattern d71 indicated in FIG. 49D. In the switching pattern d71, the CPU outputs the OFF signals to all the switching elements 2500–2536. Therefore, regenerative currents reversing from the low potential side terminal 2541b to the high potential side terminal 2541a occur as indicated by broken line arrows in FIG. 49D, so that the separating currents flowing through the lower coils 2624a–2624c rapidly decrease. Then, the processor immediately sets a state where the switching pattern c51 and the switching pattern f51 are alternated. However, the proportion of the switching pattern c71 is reduced, in comparison with the pattern alternating state during the time period t140–t141.

In this manner, the quantity of current flowing through the lower coils 2624a–2624c is kept at a normal level of the drawing current, or lower than the separating current. At this moment, the armatures 110 are sufficiently apart from the upper cores 116. Therefore, although the currents through the lower coils 2624a–2624c are set to the normal level of the drawing current, the armatures 110 are not returned to the upper cores 116 by the magnetic forces from the upper magnets 116d. Afterwards, due to the drawing currents and forces from the upper springs 120, the armatures 110 rapidly move away from the upper cores 116, and approach the lower cores 118, and finally contact the lower cores 118, overcoming the forces from the lower springs 106.

At a time point t142 after the armatures 110 come into contact with the lower cores 118, the processor temporarily changes the switching pattern to the switching pattern d71 indicated in FIG. 49D. Therefore, regenerative currents occur as indicated by the broken line arrows in FIG. 49D, so that the drawing currents flowing through the lower coils 2624a–2624c rapidly decrease. Then, the processor immediately sets a state where the switching pattern c51 and the switching pattern f51 are alternated, with the proportion of the switching pattern c51 being reduced in comparison with the pattern alternating state during the time period t141–t142.

In this manner, the quantity of current flowing through the lower coils 2624a–2624c is reduced to the level of the holding current, whereby the contact between the armatures 110 and the lower cores 118 is maintained. Thus, the input ports of the first cylinder are kept fully open.

Subsequently, at a time point t143 near or at a timing at which the intake stroke of the first cylinder comes to an end, the switching pattern is changed to the switching pattern d71 shown in FIG. 49D. Therefore, regenerative currents occur as indicated by the broken line arrows in FIG. 49D, so that the holding currents through the lower coils 2624a–2624c rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t144, the processor changes the switching pattern to a switching pattern a71 indicated in FIG. 49A to draw the armatures 110 into contact with the upper cores 116. As a result, the drawing currents flow through the upper coils 2622a, 2622b, and 2622c. Afterwards, a drawing current is maintained by alternating the switching pattern a71 and a switching pattern e71 indicated in FIG. 49E, until the armatures 110 contact the upper cores 116.

In the switching pattern a71, the processor outputs the ON signals only to the switching elements 2502, 2504, 2506, 2512, 2518, 2520, 2524, 2526, and 2528, and outputs the OFF signals to the other switching elements. As a result, currents flow from the high potential side terminal 2541a to the low potential side terminal 2541b as indicated by broken line allows in FIG. 49A, so that currents flow through the upper coils 2622a–2622c in the forward direction.

In the switching pattern e71, the processor outputs the ON signals to the switching elements 2506, 2512, and 2528, and outputs the OFF signals to the other switching elements. Therefore, a current circulation path is formed through which current flows in a sequence of the upper coil 2622a and the switching elements 2500 and 2506. A current circulation path is formed through which current flows in a sequence of the upper coil 2622b and the switching elements 2516 and 2512. A current circulation path is formed through which current flows in a sequence of the upper coil 2622c and the switching elements 2522 and 2528. Immediately after the switching pattern a71 is changed to the switching pattern e71, flywheel currents flow through the circulation paths as indicated by broken line arrows in FIG. 49E. Therefore, by adjusting the proportion between the switching pattern a71 and the switching pattern e71, the quantity of current flowing through the upper coils 2622a–2622c in the forward direction can be adjusted.

At a time point t145 after the armatures 110 come into contact with the upper cores 116, the switching pattern is changed to a switching pattern b71 indicated in FIG. 49B. In the switching pattern b71, the processor outputs the OFF signals to all the switching elements 2500–2536. Therefore, regenerative currents occur as indicated by broken line arrows in FIG. 49B, so that the drawing currents through the upper coils 2622a–2622c rapidly discontinue.

Even after the drawing currents discontinue, the contact between the armatures 110 and the upper cores 116 is maintained by the magnetic attraction forces from the upper magnets 116d. In this manner, the intake ports of the first cylinder are set completely closed.

Figure 50A:
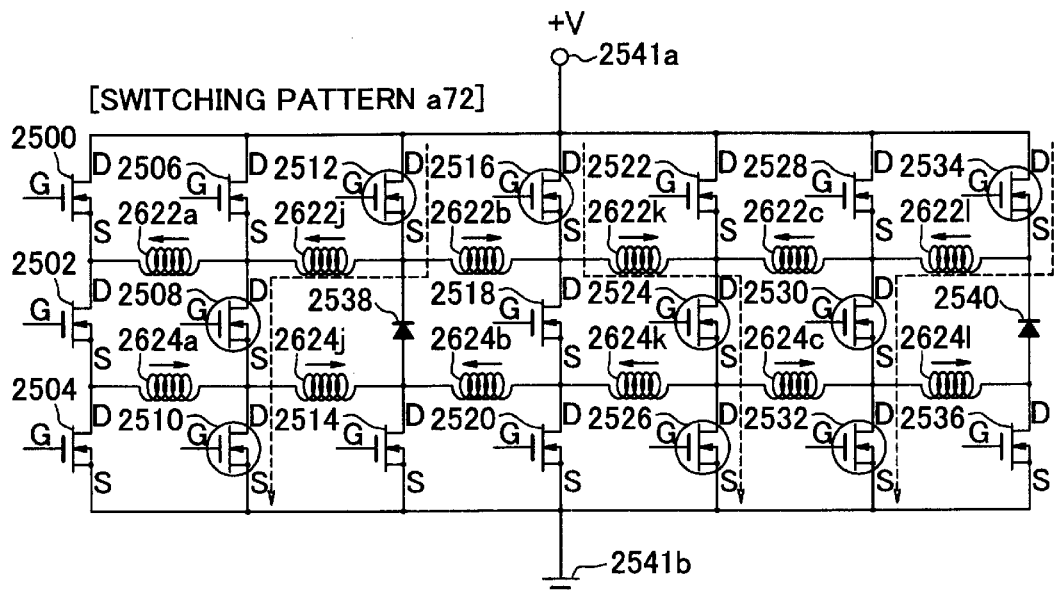
FIGS. 50A–50F are circuit diagrams for illustrating the control of current according to the embodiment of FIG. 47.
Figure 50B:
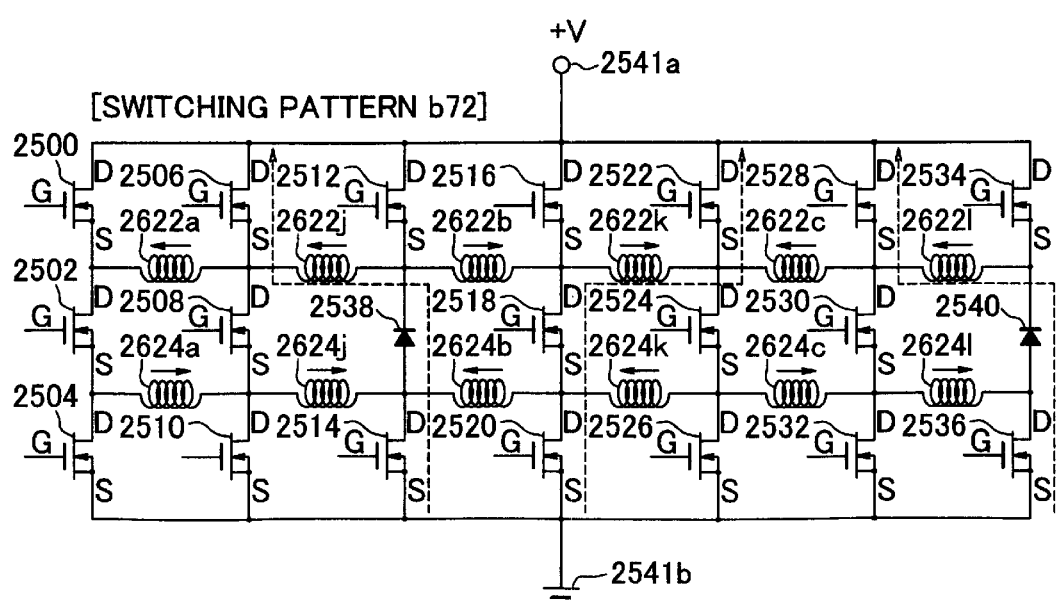
Figure 50C:
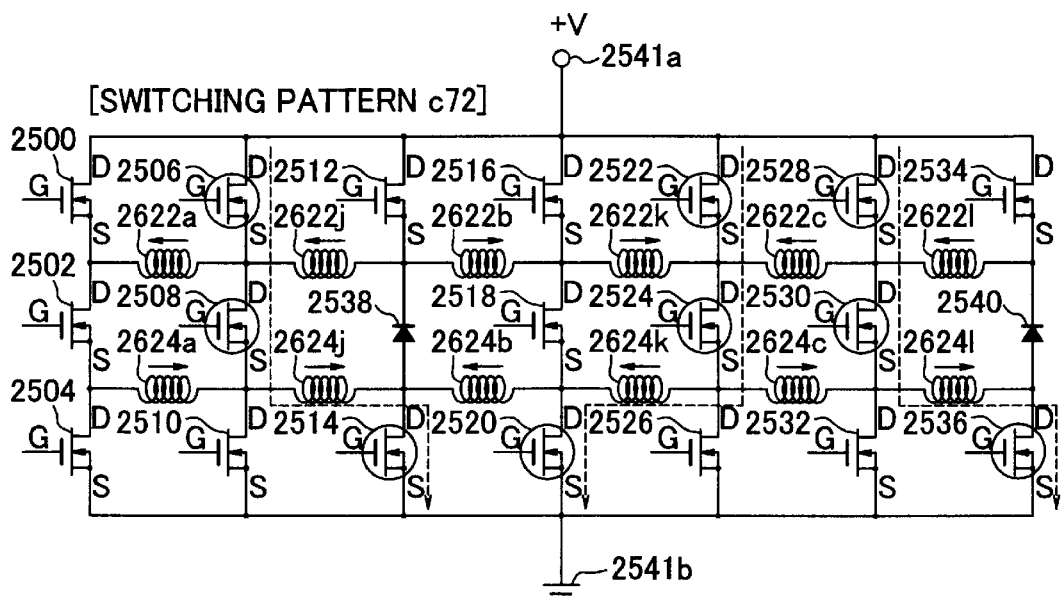

After the state where the OFF signals are outputted to all the switching elements 2500–2536, a timing point occurs at which the intake stroke of the fourth cylinder occurs. The intake stroke of the fourth cylinder does not overlap the intake stroke of the first cylinder. Starting at a time point t146, the processor sets a switching pattern c72 indicated in FIG. 50C. In the switching pattern c72, the processor outputs the ON signals to only the switching elements 2506, 2508, 2514, 2520, and 2522, and 2524, 2528, 2530, and 2536, and outputs the OFF signals to the other switching elements. Therefore, currents flow from the high potential side terminal 2541a to the low potential side terminal 2541b as indicated by broken line arrows in FIG. 50C, so that currents flow through the lower coils 2624j, 2624k, and 2624l of the three intake valves of the fourth cylinder in the forward direction. Then, the switching pattern c72 and a switching pattern f72 indicated in FIG. 50F are alternated until a time point t147.

In the switching pattern f72, the processor outputs the ON signals to only the switching elements 2514, 2520, and 2536, and outputs the OFF signals to the other switching elements. Therefore, a current circulation path is formed through which current flows in a sequence of the lower coil 2624j and the switching elements 2514 and 2510. A current circulation path is formed through which current flows in a sequence of the lower coil 2624k and the switching elements 2520 and 2526. A current circulation path is formed through which current flows in a sequence of the lower coil 2624l and the switching elements 2536 and 2532. Immediately after the switching pattern c72 is changed to the switching pattern f72, flywheel currents flow through the circulation paths as indicated by broken line arrows in FIG. 50F. Therefore, by adjusting the proportion of the switching pattern c72 to a sufficient value, it is possible to achieve such an adjustment that increases currents flow through the lower coils 2624j–2624l in the forward direction.

In this manner, the lower coils 2624j–2624l are supplied with the separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Figure 50D:
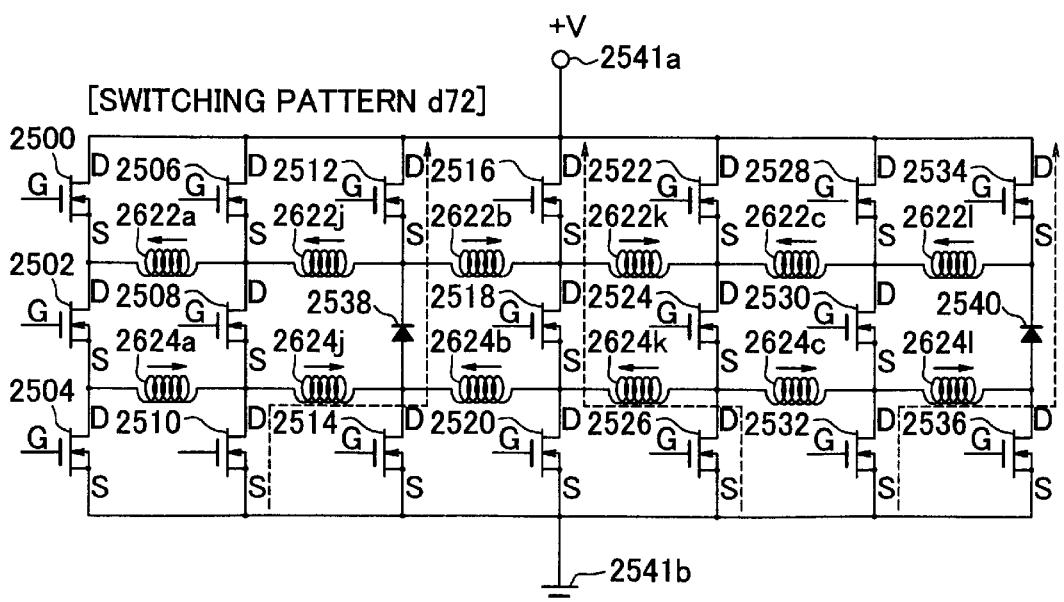

At the time point t147, the processor temporarily changes the switching pattern to a switching pattern d72 indicated in FIG. 50D. In the switching pattern d72, the processor outputs the OFF signals to all the switching elements 2500–2536. Therefore, regenerative currents occur as indicated by broken line arrows in FIG. 50D, so that the separating currents flowing through the lower coils 2624j–2624l rapidly decrease.

Then, the processor immediately resumes a state where the switching pattern c72 and the switching pattern f72 are alternated. In this case, however, the proportion of the switching pattern c72 is reduced, in comparison with the pattern alternating state during the time period t146–t147. In this manner, the quantity of current flowing through the lower coils 2624j–2624l is kept at a normal drawing current.

At this moment, the armatures 110 are sufficiently apart from the upper cores 116. Therefore, although the currents through the lower coils 2624j–2624l are set to the normal drawing current, the armatures 110 are not returned to the upper cores 116 by the magnetic forces from the upper magnets 116d. Afterwards, due to the drawing currents and the forces from the upper springs 120, the armatures 110 rapidly move away from the upper cores 116, and approach the lower cores 118, and finally contact the lower cores 118 by overcoming the forces from the lower springs 106.

At a time point t148 after the armatures 110 come into contact with the lower cores 118, the processor temporarily changes the switching pattern to the switching pattern d72. Therefore, regenerative currents occur as indicated by the broken line arrows in FIG. 50D, so that the drawing currents flowing through the lower coils 2624j–2624l rapidly decrease. Then, the processor immediately resumes a state where the switching pattern c72 and the switching pattern f72 are alternated. In this case, however, the proportion of the switching pattern c72 is reduced, in comparison with the pattern alternating state during the time period t147–t148. In this manner, the quantity of current flowing through the lower coils 2624j–2624l is kept at the holding current, whereby the contact between the armatures 110 and the lower cores 118 is maintained. Thus, the intake ports of the fourth cylinder are set to the fully open state.

Subsequently, at a time point t149 near or at a timing at which the intake stroke of the fourth cylinder comes to an end, the switching pattern is changed to the switching pattern d72. Therefore, regenerative currents flow as indicated by the broken line arrows in FIG. 50D, so that the holding currents through the lower coils 2624j–2624l rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t150, the processor changes the switching pattern to a switching pattern a72 indicated in FIG. 50A, in order to draw the armatures 110 into contact with the upper cores 116. As a result, the drawing currents flow through the upper coils 2622j, 2622k, and 2622l. Afterwards, a drawing current is maintained by alternating the switching pattern a72 and a switching pattern e72 indicated in FIG. 50E, until the armatures 110 contact the upper cores 116.

In the switching pattern a72, the processor outputs the ON signals to the switching elements 2508, 2510, 2512, 2516, 2524, 2526, 2530, 2532, and 2534, and outputs the OFF signals to the other switching elements. As a result, currents flow from the high potential side terminal 2541a to the low potential side terminal 2541b as indicated by broken line allows in FIG. 50A, so that currents flow through the upper coils 2622j–2622l in the forward direction.

In the switching pattern e72, the processor outputs the ON signals to the switching elements 2512, 2516, and 2534, and outputs the OFF signals to the other switching elements. Therefore, a current circulation path is formed through which current flows in a sequence of the upper coil 2622j and the switching elements 2506 and 2512. A current circulation path is formed through which current flows in a sequence of the upper coil 2622k and the switching elements 2522 and 2516. A current circulation path is formed through which current flows in a sequence of the upper coil 2622l and the switching elements 2528 and 2534. Immediately after the switching pattern a72 is changed to the switching pattern e72, flywheel currents flow through the circulation paths as indicated by broken line arrows in FIG. 50E. Therefore, by adjusting the proportion between the switching pattern a72 and the switching pattern e72, the quantity of current flowing through the upper coils 2622j–2622l in the forward direction can be adjusted.

At a time point t151 after the armatures 110 come into contact with the upper cores 116, the switching pattern is changed to a switching pattern b72 indicated in FIG. 50B. In the switching pattern b72, the processor outputs the OFF signals to all the switching elements 2500–2536. Therefore, regenerative currents occur as indicated by broken line arrows in FIG. 50B, so that the drawing currents flowing through the upper coils 2622j–2622l rapidly discontinue.

After the drawing currents. discontinue, the contact between the armatures 110 and the upper cores 116 is maintained by the magnetic attraction forces from the upper magnets 116d. In this manner, the intake ports of the fourth cylinder are set to the completely closed state.

Thus, the six intake valves of first cylinder and the fourth cylinder are driven in the opening and closing directions by the drive circuit 2592a, which includes the nineteen switching elements 2500–2536 and the two diodes 2538, and 2540.

Figure 49E:
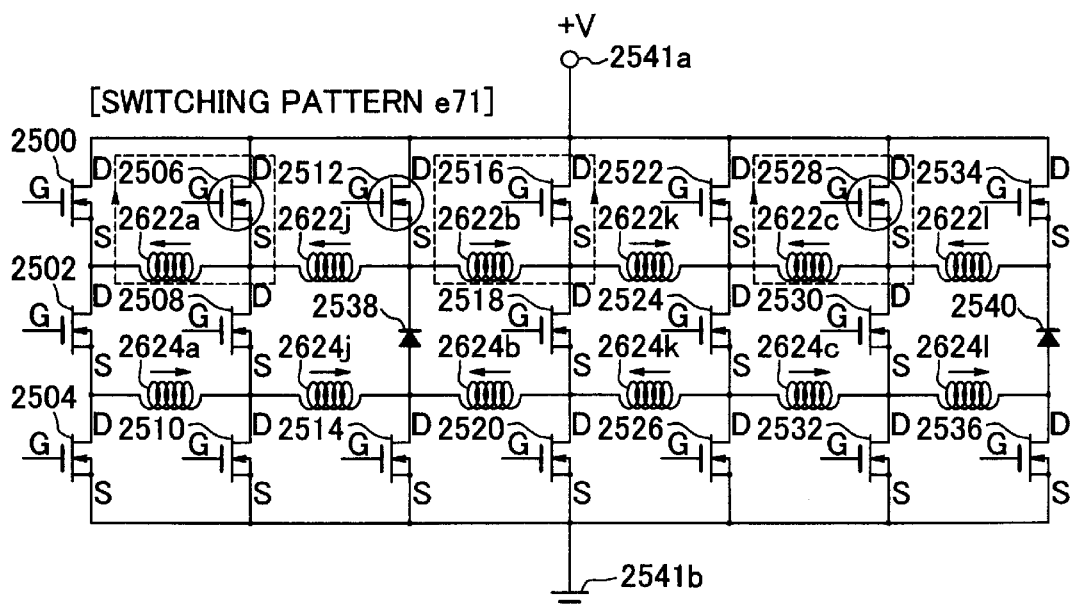
Figure 49F:
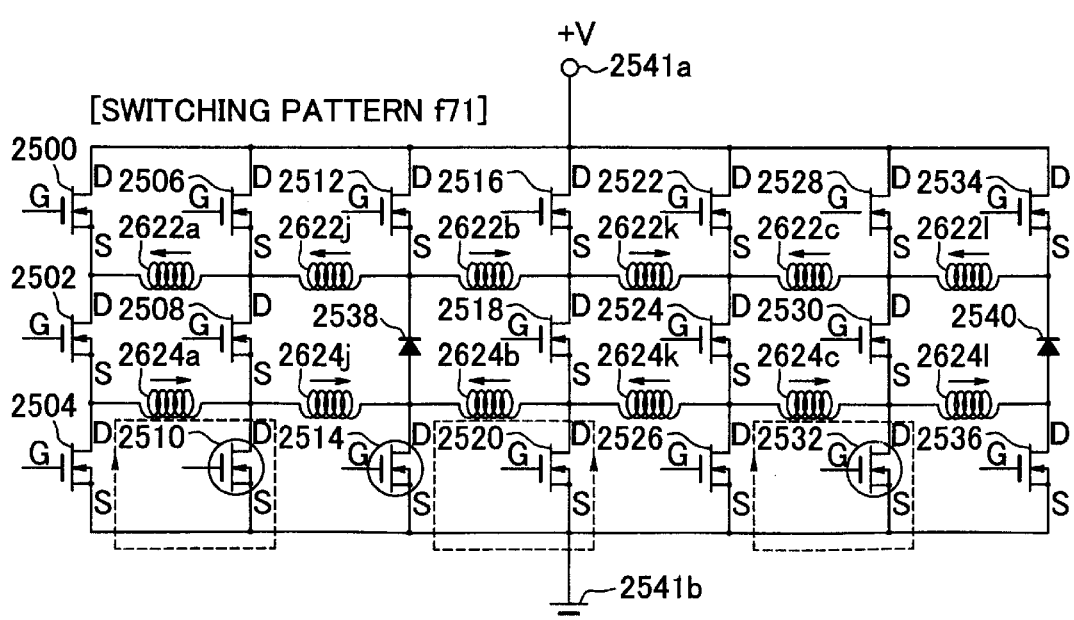

From the foregoing description, it should be understood that the switching elements 2500–2532 and the diode 2538 caused to conduct current to drive the upper coils 2622a–2622c as indicated in FIGS. 49A, 49B and 49E are the same as the switching elements 2500–2532 and the diode 2538 caused to conduct current to drive the lower coils 2624a–2624c as indicated in FIGS. 49C, 49D and 49F. Thus, these elements are shared by the upper coils 2622a–42622c and the lower coils 2624a–2624c.

Figure 50E:
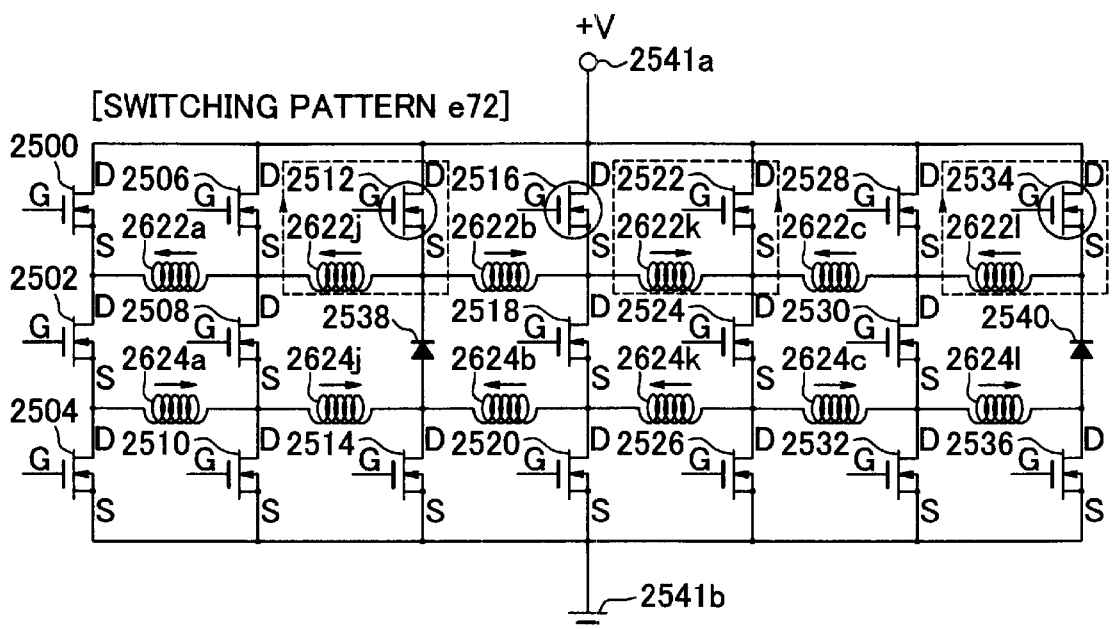
Figure 50F:
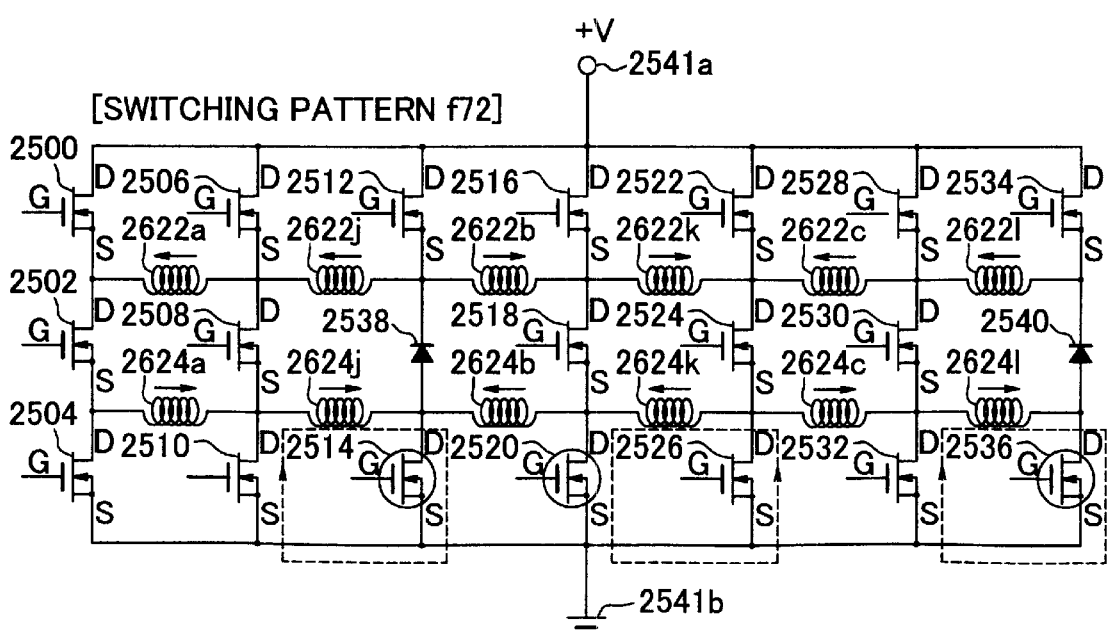

Furthermore, it should be understood that the switching elements 2506–2536 and the diodes 2538, and 2540 used to conduct current to drive the upper coils 2622j–2622l as indicated in FIGS. 50A, 50B and 50E are the same as the switching elements 2506–2536 and the diodes 2538, 2540 used to conduct current to drive the lower coils 2624j–2624l as indicated in FIGS. 50C, 50D and 50F. Thus, these elements are shared by the upper coils 2622j–2622l and the lower coils 2624j–2624l.

Still further, through comparison between the switching elements 2500–2532 and the diode 2538 used to conduct current to drive the upper coils 2622a–2622c and the lower coils 2624a–2624c of the three intake valves of the first cylinder as indicated in FIGS. 49A to 49F and the switching elements 2506–2536 and the diodes 2538, 2540 used to conduct current to drive the upper coils 2622j–2622l and the lower coils 2624j–2624l of the three intake valves of the fourth cylinder as indicated in FIGS. 50A to 50F, it should be understood that the switching elements 2506–2532 and the diode 2538 are shared.

A configuration substantially the same as that of the drive circuit 2592a is adopted to form the drive circuit 2592b for driving a total of six exhaust valves of the first cylinder and the fourth cylinder, the drive circuit 2592c for driving a total of six intake valves of the second cylinder and the third cylinder, and the drive circuit 2592d for driving a total of six exhaust valves of the third cylinder and the third cylinder. In the three drive circuits 2592b, 2592c, and 2592d, the switching elements and the diodes are shared as described above in conjunction with the drive circuit 2592a, and control is performed in substantially the same pattern as indicated in FIG. 48 to open and close the intake and exhaust valves.

Therefore, the drive circuit portion, equipped with the four drive circuits 2592a–2592d, is able to drive a total of 24 valves of the 4 cylinders, or, the 12 intake valves and the 12 exhaust valves, in combinations substantially similar as those depicted in FIG. 45.

Embodiments of the present invention, employ the 19 switching elements 2500–2536 and the two diodes 2538, and 2540, are able to drive the intake and exhaust valves configured in the same manner as those in previous embodiments. Thus, the present embodiment reduces the number of switching elements by two from the number in previous embodiment, and allows the use of less expensive diodes 2538, and 2540.

Therefore, embodiments of the present invention reduce the number of switching elements employed, and allow further reductions in size and cost of the drive circuit portion for the intake and exhaust valves formed as electromagnetic valves.

The number of electrically conductive wires is reduced, so that the thickness of a wire harness disposed in a vehicle can be reduced, thus contributing to size and weight reductions of the vehicle.

Figure 51:
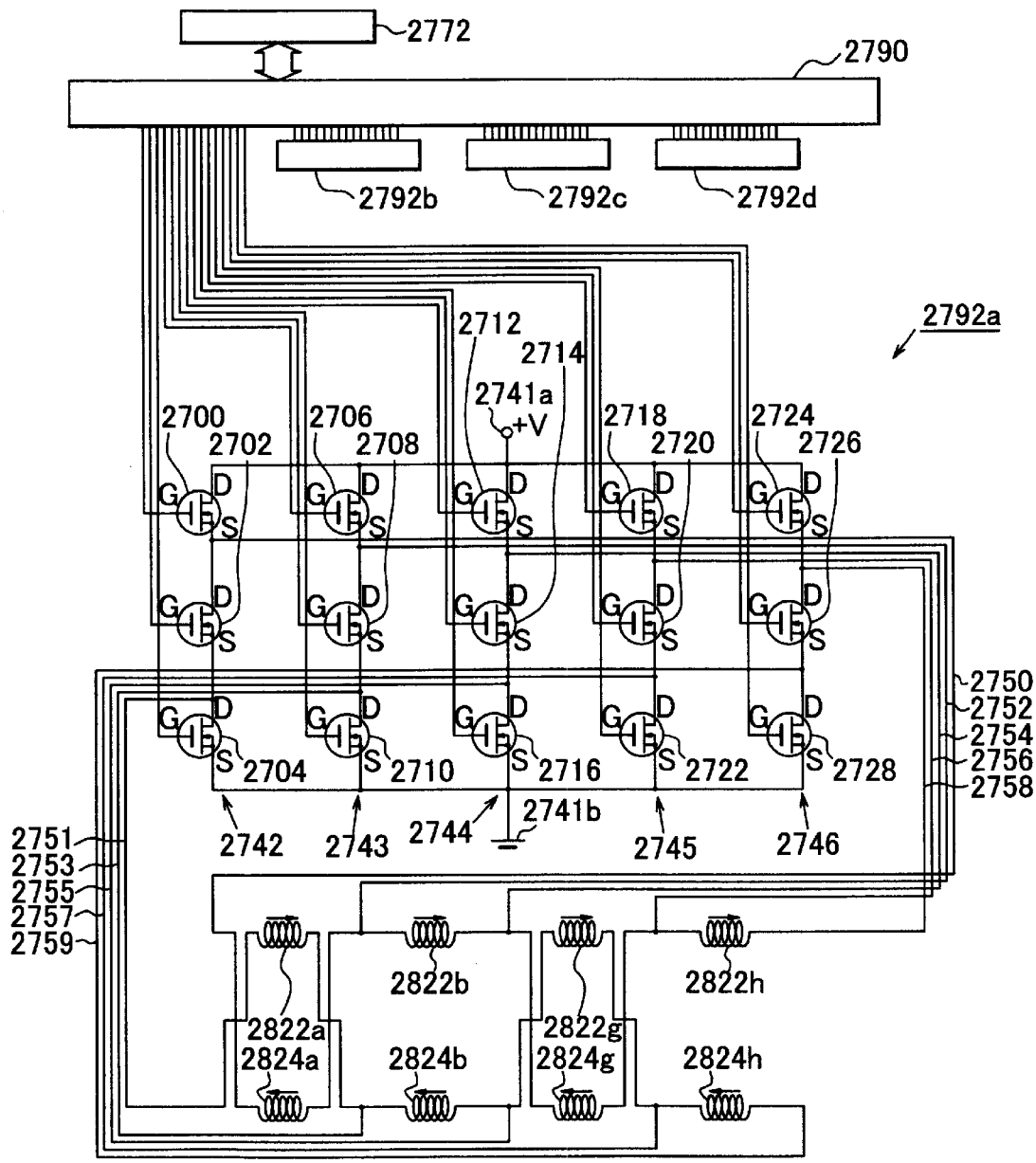
FIG. 51 is a diagram illustrating a construction of a drive circuit according to another embodiment of the present invention.

The embodiment depicted in FIG. 51 differs from previous embodiments in drive circuits 2792a, 2792b, 2792c, 2792d illustrated in FIG. 51. The drive circuits 2792a, 2792b, 2792c, and 2792d are three-switching element in-series type drive circuits.

Corresponding to the different drive circuits 2792a–2792d, the present embodiment adopts different switching patterns as described below. The drive circuits 2792b, 2792c, and 2792d have the same configuration as the drive circuit 2792a. Therefore, the drive circuit 2792a will be described as representative of the other drive circuits. Other configurations of the present embodiments are substantially similar as those of the previous embodiments.

The drive circuit 2792a is formed by 15 switching elements 2700, 2702, 2704, 2706, 2708, 2710, 2712, 2714, 2716, 2718, 2720, 2722, 2724, 2726, and 2728. The switching elements 2700–2728 form five series circuits 2742, 2743, 2744, 2745, and 2746, each of which includes three of the switching elements connected in series. The series circuits 2742–2746 are connected in parallel between a high potential side terminal 2741a and a low potential side terminal 2741b.

In the series circuit 2742 formed by three switching elements 2700, 2702, and 2704, a series connecting portion between the switching elements 2700, and 2702 is connected with an end of an electrically conductive wire 2750. Similarly, a series connecting portion between the switching elements 2702, and 2704 is connected with an end of an electrically conductive wire 2751. In the series circuit 2743 formed by three switching elements 2706, 2708, and 2710, a series connecting portion between the switching elements 2706, and 2708 is connected with an end of an electrically conductive wire 2752. A series connecting portion between the switching elements 2708, and 2710 is connected with an end of an electrically conductive wire 2753. In the series circuit 2744 formed by three switching elements 2712, 2714,and 2716, a series connecting portion between the switching elements 2712, and 2714 is connected with an end of an electrically conductive wire 2754, and a series connecting portion between the switching elements 2714, and 2716 is connected with an end of an electrically conductive wire 2755. In the series circuit 2745 formed by three switching elements 2718, 2720, and 2722, a series connecting portion between the switching elements 2718, 2720 is connected with an end of an electrically conductive wire 2756, and a series connecting portion between the switching elements 2720, and 2722 is connected with an end of an electrically conductive wire 2757. In the series circuit 2746 formed by three switching elements 2724, 2726, and 2728, a series connecting portion between the switching elements 2724, and 2726 is connected with an end of an electrically conductive wire 2758, and a series connecting portion between the switching elements 2726, and 2728 is connected with an end of an electrically conductive wire 2759.

Of these wires, the conductive wire 2750 is connected to an end of a lower coil 2824a incorporated in a first intake valve of a first cylinder. The conductive wire 2752 is connected to the other end of the lower coil 2824*a* and to an end of an upper coil 2822*b* incorporated in a second intake valve of the first cylinder. The conductive wire 2754 is connected to the other end of the upper coil 2822*b* and to an end of a lower coil 2824*g* incorporated in a first intake valve of a fourth cylinder. The conductive wire 2756 is connected to the other end of the lower coil 2824*g* and to an end of an upper coil 2822*h* incorporated in a second intake valve of the fourth cylinder. The conductive wire 2758 is connected to the other end of the upper coil 2822*h*.

The conductive wire 2751 is connected to an end of an upper coil 2822*a* incorporated in the first intake valve of the first cylinder. The conductive wire 2753 is connected to the other end of the upper coil 2822*a* and to an end of a lower coil 2824*b* incorporated in the second intake valve of the first cylinder. The conductive wire 2755 is connected to the other end of the lower coil 2824*b* and to an end of an upper coil 2822*g* incorporated in the first intake valve of the fourth cylinder. The conductive wire 2757 is connected to the other end of the upper coil 2822*g* and to an end of a lower coil 2824*h* incorporated in the second intake valve of the fourth cylinder. The conductive wire 2759 is connected to the other end of the lower coil 2824*h*.

Thus, the connections between the series circuit 2742 and the series circuit 2743, and the connections between the series circuit 2743 and the series circuit 2744 are accomplished only by the electromagnetic coils 2822*a*, 2822*b*, 2824*a*, and 2824*b* provided in the two intake valves that perform identical operations on the first cylinder. Furthermore, the connections between the series circuit 2744 and the series circuit 2745, and the connections between the series circuit 2745 and the series circuit 2746 are accomplished only by the electromagnetic coils 2822*g*, 2822*h*, 2824*g*, and 2824*h* provided in the two intake valves that perform identical operations on the fourth cylinder. Thus, in the drive circuit 2792*a*, the inter-series circuit connections accomplished only by the electromagnetic coils 2822*a*, 2822*b*, 2824*a*, and 2824*b* of the two intake valves of the first cylinder, and the inter-series circuit connections accomplished only by the electromagnetic coils 2822*g*, 2822*h*, 2824*g*, and 2824*h* of the two intake valves of the fourth cylinder are separately disposed, with the series circuit 2744 defining a boundary therebetween. In this manner, the drive circuit 2792*a* is provided collectively for the two intake valves of the first cylinder and the two intake valves of the fourth cylinder, whose open valve periods do not overlap each other.

The opening/closing operations of the two intake valves of the first cylinder and the two intake valves of the fourth cylinder caused by supply of control currents from the ECU will be described. A timing chart shown in FIG. 52 indicates the operations of the intake valves.

Figure 52:
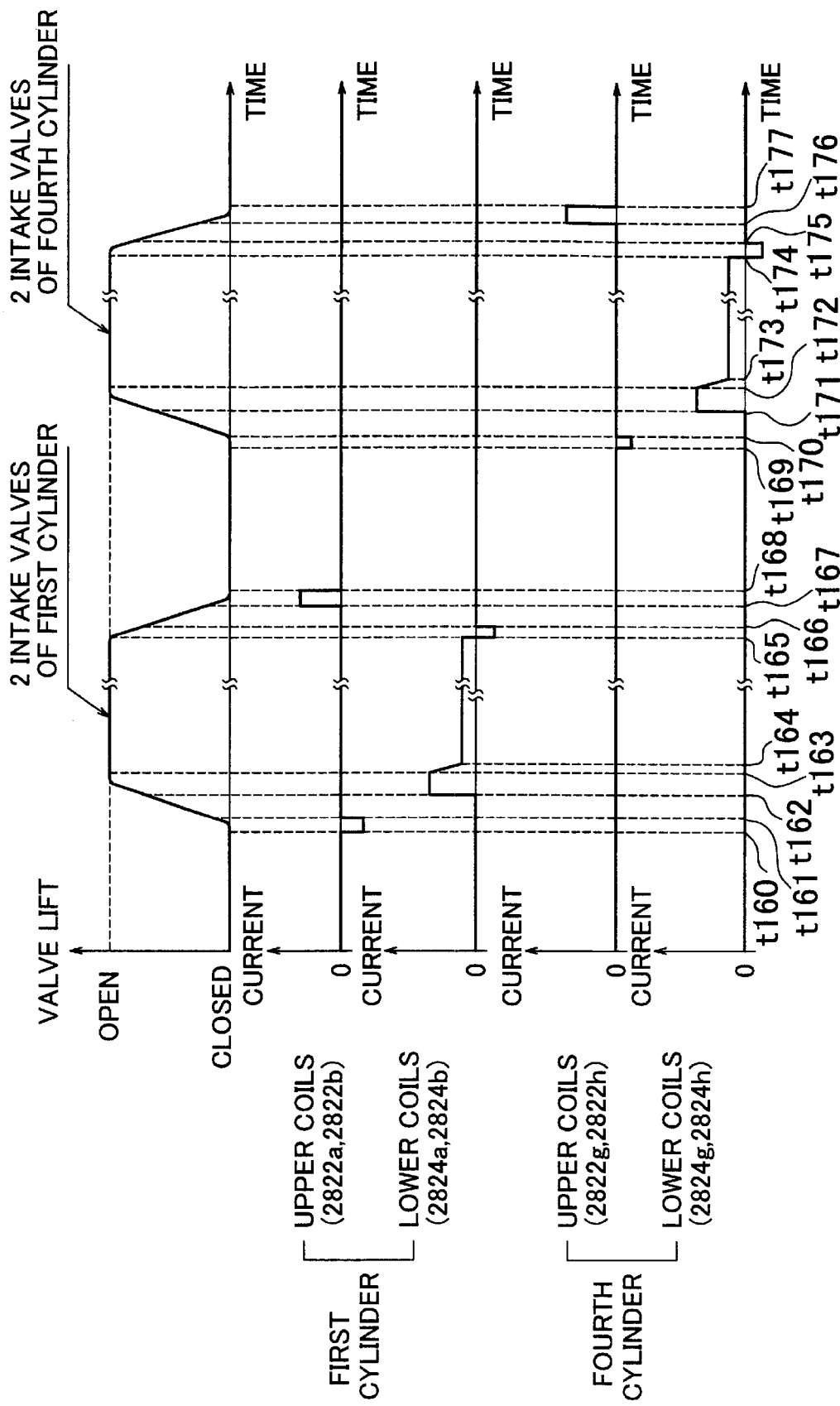
FIG. 52 is a timing chart indicating the operations of intake valves and the current control according to the embodiment of FIG. 51.

FIGS. 53A to 53K and FIGS. 54A to 54K are circuit diagrams indicating states of control performed on the drive circuit 2792*a* depicted in FIG. 51 to realize the operations indicated in FIG. 52. In FIGS. 53A to 53K and 54A to 54K, the conductive wires 2750–2759 are omitted. Furthermore, in FIGS. 53A to 53K and 54A to 54K, broken line arrows and circles "□" have the same states as described above in conjunction with previous embodiments.

Before a time point t160 indicated in FIG. 52, the armatures 110 are brought into contact with the upper cores 116 as shown in FIG. 10 by temporary excitation of the upper coils 2822*a*, 2822*b*, 2822*g*, and 2822*h*. This contact state is maintained by the magnetic attraction forces of the upper magnets 116*d*. Therefore, the valve bodies 100 are in contact with the valve seats 126, and, the two intake valves of the first cylinder and the two intake valves of the fourth cylinder are in a closed state. The OFF signals are outputted to all the 15 switching elements 2700–2728.

Figure 53A:
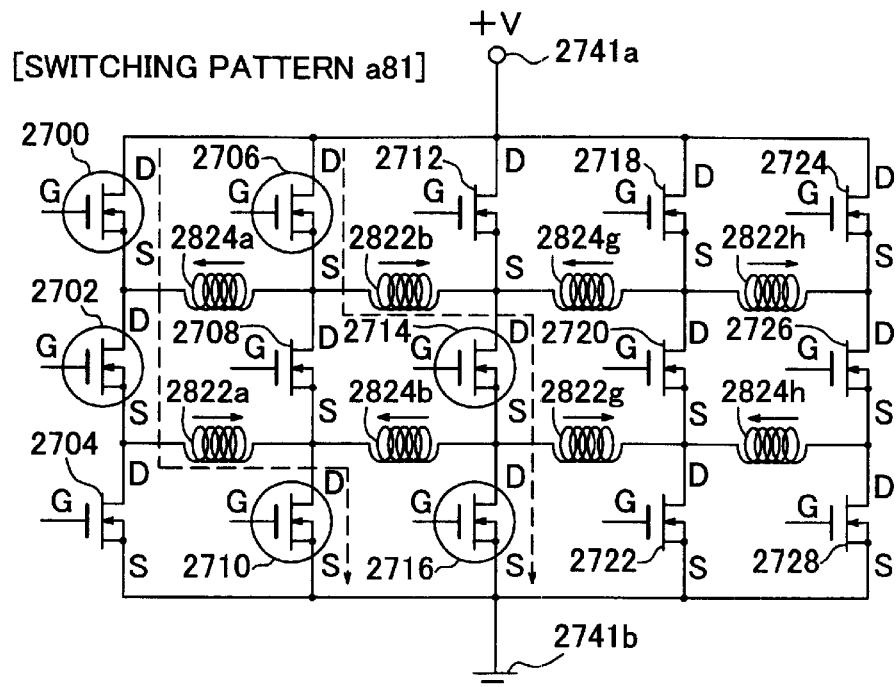
FIGS. 53A–53K are circuit diagrams for illustrating the control of current according to the embodiment of FIG. 51.
Figure 53B:
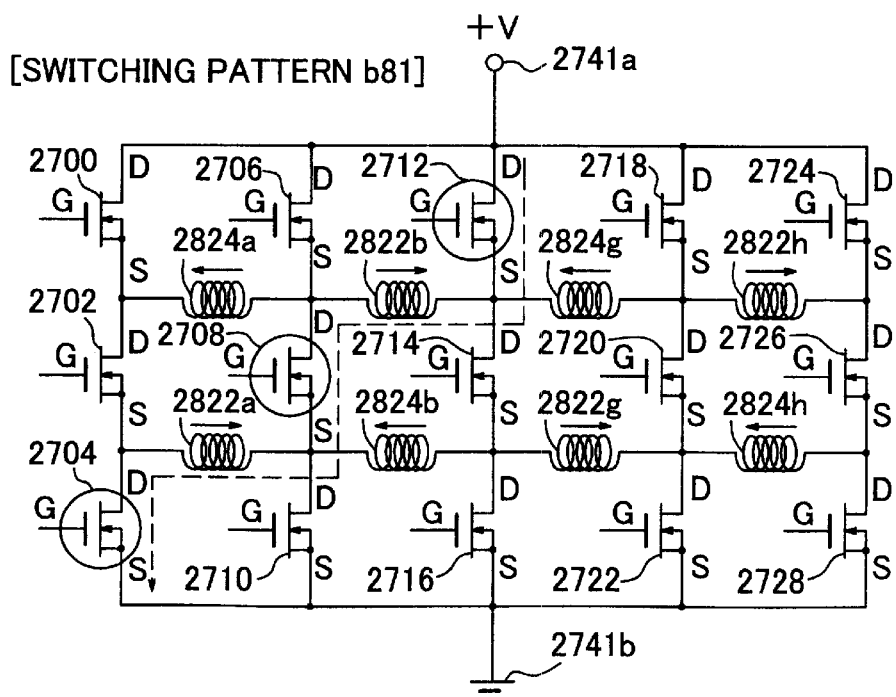

At the time of the intake stroke of the first cylinder, the processor outputs the ON signals to only the switching elements 2704, 2708, and 2712 and outputs the OFF signals to the other switching elements during a time period of t160–t161 to establish a switching pattern b81 indicated in FIG. 53B. As a result, a current flows from the high potential side terminal 2741*a* to the low potential side terminal 2741*b* as indicated by a broken line arrow in FIG. 53B, so that releasing currents flow through the upper coils 2822*a*, and 2822*b* in a reverse direction so as to cancel out the magnetic fluxes from the upper magnets 116*d*.

Therefore, the magnetic attraction forces on the armatures 110 created by the upper cores 116 discontinue. As a result, the armatures 110 start to move toward the lower cores 118, or, toward a fully open state, due to the forces from the upper springs 120. Hence, the valve bodies 100 start to move apart from the valve seats 126, and the amount of valve lift starts to increase.

Figure 53C:
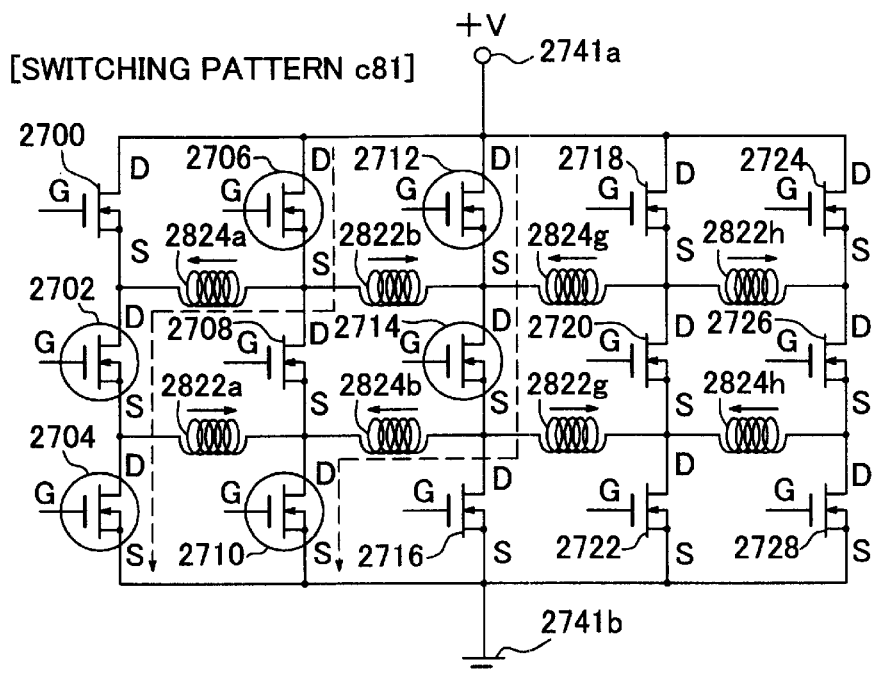
Figure 53D:
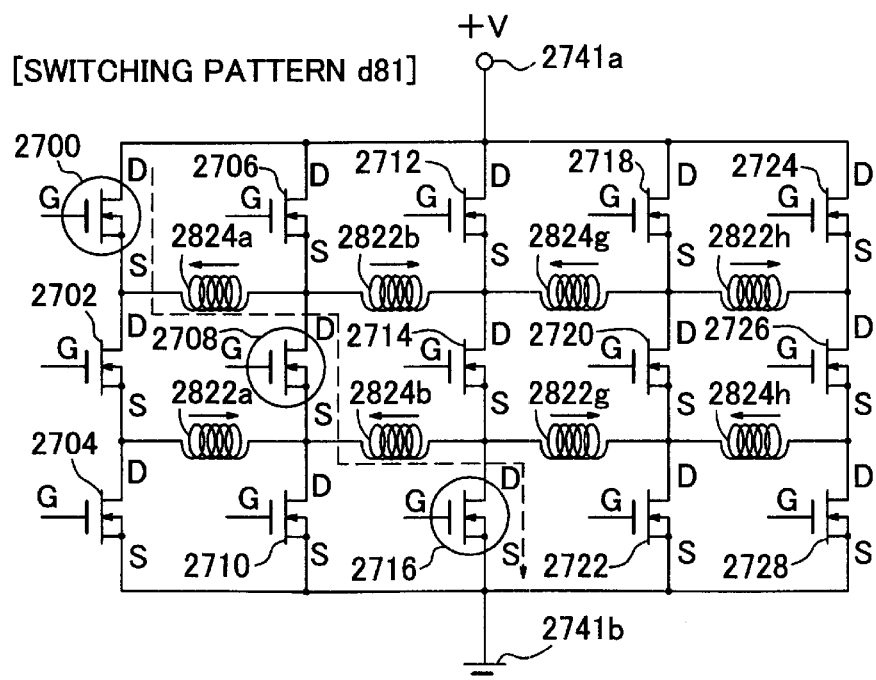
Figure 53E:
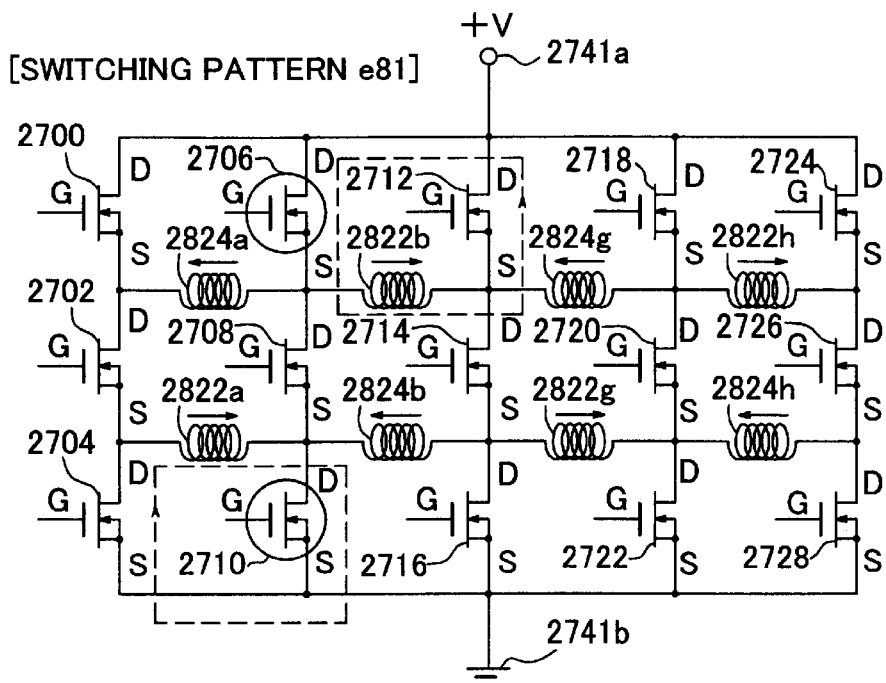
Figure 53F:
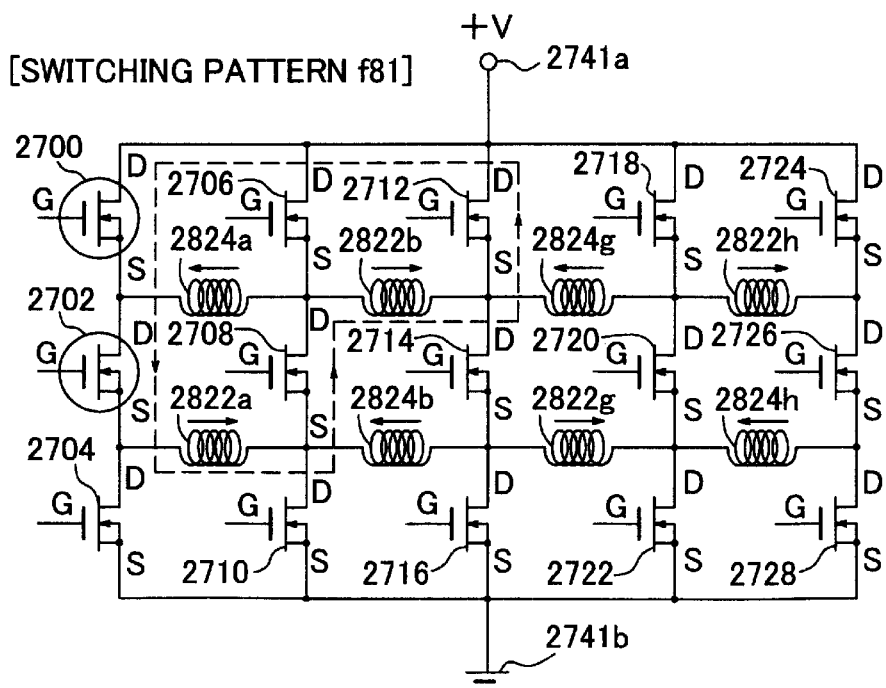
Figure 53G:
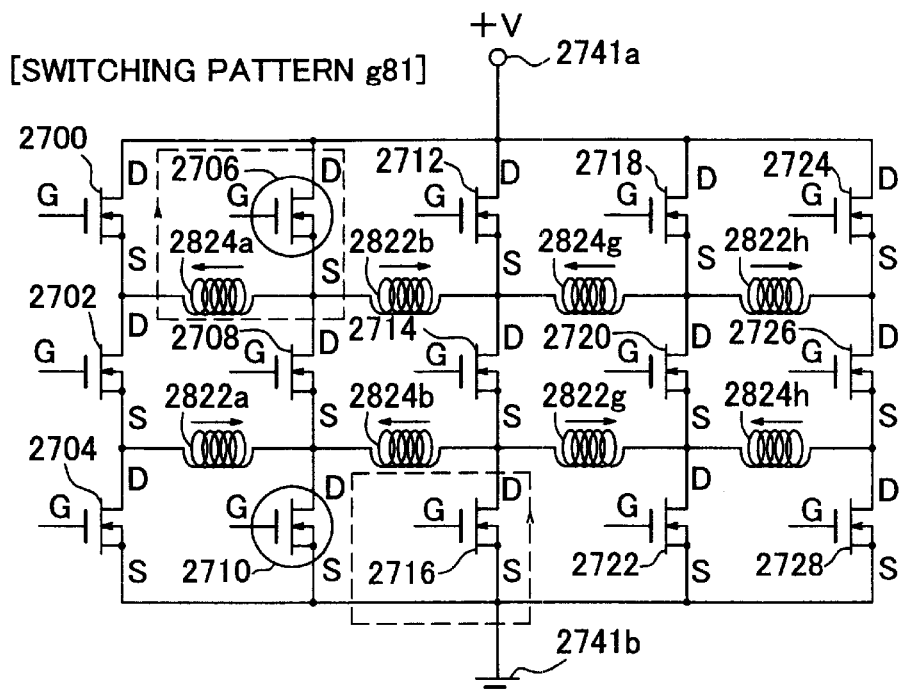
Figure 53H:
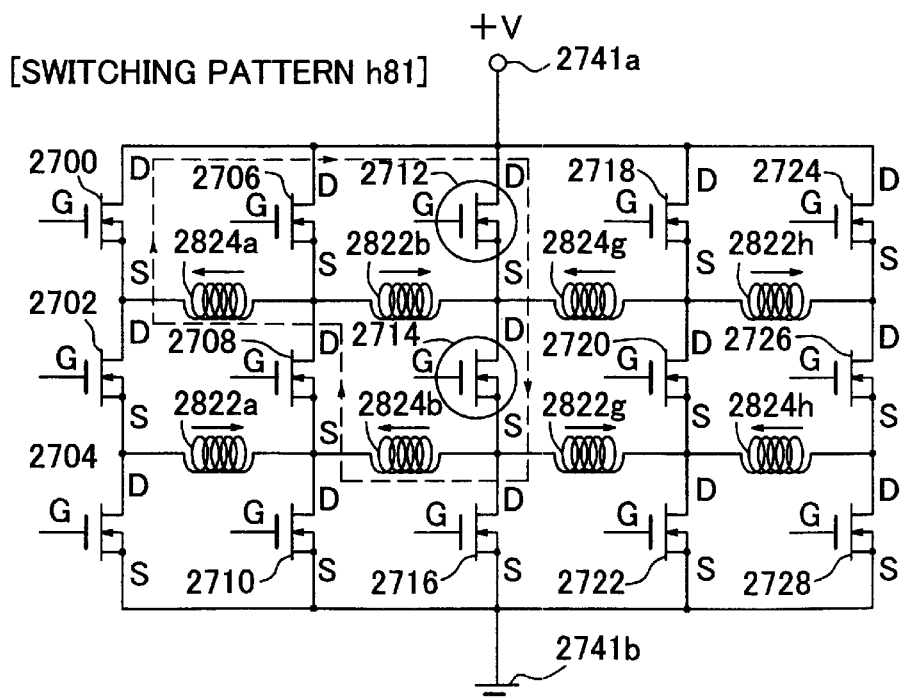
Figure 53I:
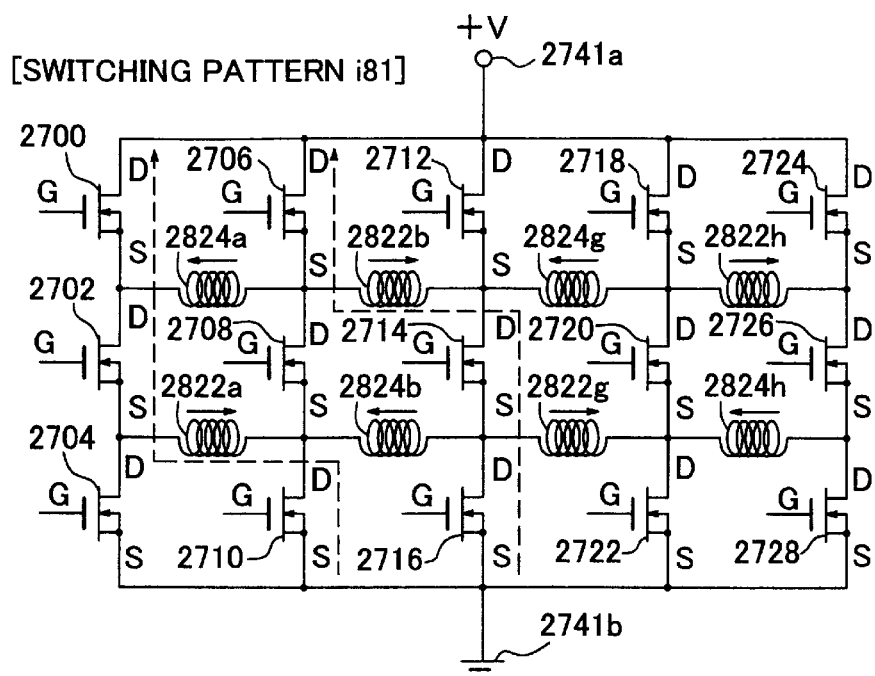

Afterwards, at the time point t161, the processor outputs the OFF signals to all the switching elements 2700–2728 to set a switching pattern i81 indicated in FIG. 53I. Therefore, regenerative currents flow as indicated by broken line arrows in FIG. 53I, so that the releasing currents through the upper coils 2822*a*, and 2822*b* rapidly discontinue.

At the time point t161 when the releasing currents through the upper coils 2822*a*, and 2822*b* discontinue, the armatures 110 are sufficiently apart from the upper cores 116, so that the armatures 110 are not returned to the upper cores 116 by the magnetic forces from the upper magnets 116*d*. Afterwards, the armatures 110 are moved apart from the upper cores 116 toward the lower cores 118 by forces from the upper springs 120.

Subsequently at a time point t162, the processor outputs the ON signals to the switching elements 2702, 2704, 2706, 2710, 2712, and 2714, and outputs the OFF signals to the other switching elements so as to set a switching pattern c81 indicated in FIG. 53C. Therefore, currents flow from the high potential side terminal 2741*a* to the low potential side terminal 2741*b* as indicated by broken line arrows in FIG. 53C, so that currents flow through the lower coils 2824*a*, and 2824*b* of the intake valves of the first cylinder in the forward direction. Then, until a time point t163, the switching pattern c81 and a switching pattern g81 indicated in FIG. 53G or a switching pattern h81 indicated in FIG. 53H are alternated, so as to maintain the drawing currents for magnetically drawing the armatures 110 to the lower cores 118. Therefore, when approaching the lower cores 118, the armatures 110 come into contact with the lower cores 118 by overcoming the forces from the lower springs 106.

In the switching pattern g81, the processor outputs the ON signals to the switching elements 2706, and 2710, and outputs the OFF signals to the other switching elements. Therefore, a current circulation path is formed through which current flows in a sequence of the lower coil 2824*a* and the switching elements 2700 and 2706. A current circulation path is formed through which current flows in a sequence of the lower coil 2824*b* and the switching elements 2710 and 2716. Immediately after the switching pattern c81 is changed to the switching pattern g81, flywheel currents flow through the circulation paths as indicated by broken line arrows in FIG. 53G.

In the switching pattern h81, the processor outputs the ON signals to the switching elements 2712, and 2714, and outputs the OFF signals to the other switching elements. Therefore, a current circulation path is formed through which current flows in a sequence of the lower coil 2824a, the switching elements 2700, 2712, and 2714, the lower coil 2824b, and the switching element 2708. Immediately after the switching pattern c81 is changed to the switching pattern h81, a flywheel current flows through the circulation path as indicated by a broken line arrow in FIG. 53H.

Therefore, by adjusting the proportion between the switching pattern c81 and the switching pattern g81 or the switching pattern h81, the quantity of current flowing through the lower coils 2824a, 2824b in the forward direction can be adjusted.

During a time period of t163–t164 after the armatures 110 come into contact with the lower cores 118, the proportion of the switching pattern c81 in the alternation between the switching pattern c81 and the switching pattern g81 or the switching pattern h81 is reduced. In this manner, the quantity of current flowing through the lower coils 2824a, and 2824b in the forward direction is reduced to the level of the holding current to maintain the contact between the armatures 110 and the lower cores 118. While the armatures 110 are held in contact with the lower cores 118 by the magnetic forces created by continuously supplying the holding currents through the lower coils 2824a, and 2824b, the valve bodies 100 are farthest apart from the valve seats 126 as indicated in FIG. 11, and, the intake ports of the first cylinder remain in the fully open state.

Subsequently, at a time point t165 near or at a timing at which the intake stroke of the first cylinder comes to an end, the switching pattern is changed to a switching pattern d81 indicated in FIG. 53D. In the switching pattern d81, the processor outputs the ON signals to only the switching elements 2700, 2708, and 2716, and outputs the OFF signals to the other switching elements. Therefore, a regenerative current occurs in the direction opposite to the direction indicated by a broken line arrow in FIG. 53D, so that the holding currents through the lower coils 2824a, and 2824b rapidly discontinue. Then, the releasing currents flow through the lower coils 2824a, and 2824b in the reverse direction as indicated by the broken line arrow.

Figure 53J:
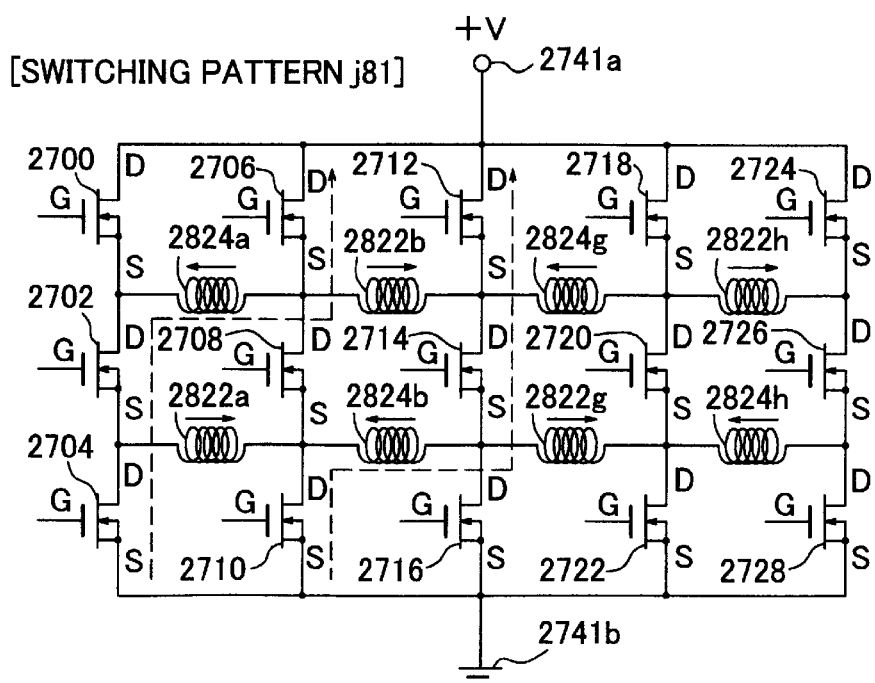

Subsequently, at a time point t166, the processor outputs the OFF signals to all the switching elements 2700–2728 so as to set a switching pattern j81 indicated in FIG. 53j. Therefore, regenerative currents flow as indicated by broken line arrows in FIG. 53j, so that the releasing currents flowing through the lower coils 2824a, and 2824b rapidly discontinue.

After the armatures 110 thus lose the attraction forces toward the lower cores 118, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t167, the processor changes the switching pattern to a switching pattern a81 indicated in FIG. 53A, in order to draw the armatures 110 into contact with the upper cores 116. In the switching pattern a81, the processor outputs the ON signals to the switching elements 2700, 2702, 2706, 2710, 2714, and 2716, and outputs the OFF signals to the other switching elements. As a result, currents flow from the high potential side terminal 2741a to the low potential side terminal 2741b as indicated by broken line arrows in FIG. 53A, so that the drawing currents flow through the upper coils 2822a, and 2822b of the intake valves of the first cylinder in the forward direction.

Afterwards, a drawing current is maintained by alternating the switching pattern a81 and a switching pattern e81 indicated in FIG. 53E or a switching pattern f81 indicated in FIG. 53F, until the armatures 110 contact the upper cores 116.

In the switching pattern e81, the processor outputs the ON signals to the switching elements 2706, and 2710, and outputs the OFF signals to the other switching elements. Therefore, a current circulation path is formed through which current flows in a sequence of the upper coil 2822a and the switching elements 2710 and 2714. A current circulation path is formed through which current flows in a sequence of the upper coil 2822b and the switching elements 2712 and 2706. Immediately after the switching pattern a81 is changed to the switching pattern e81, flywheel currents flow through these circulation paths as indicated by broken line arrows in FIG. 53E.

In the switching pattern f81, the processor outputs the ON signals to only the switching elements 2700, and 2702, and outputs the OFF signals to the other switching elements. Therefore, a current circulation path is formed through which current flows in a sequence of the.upper coil 2822a, the switching element 2708, the upper coil 2822b, and the switching elements 2712, 2700 and 2702. Immediately after the switching pattern a81 is changed to the switching pattern f81, a flywheel current flows through the circulation path as indicated by a broken line arrow in FIG. 53F.

Therefore, by adjusting the proportion between the switching pattern a81 and the switching pattern e81 or the switching pattern f81, the quantity of current flowing through the upper coils 2822a, and 2822b in the forward direction can be adjusted.

Figure 53K:
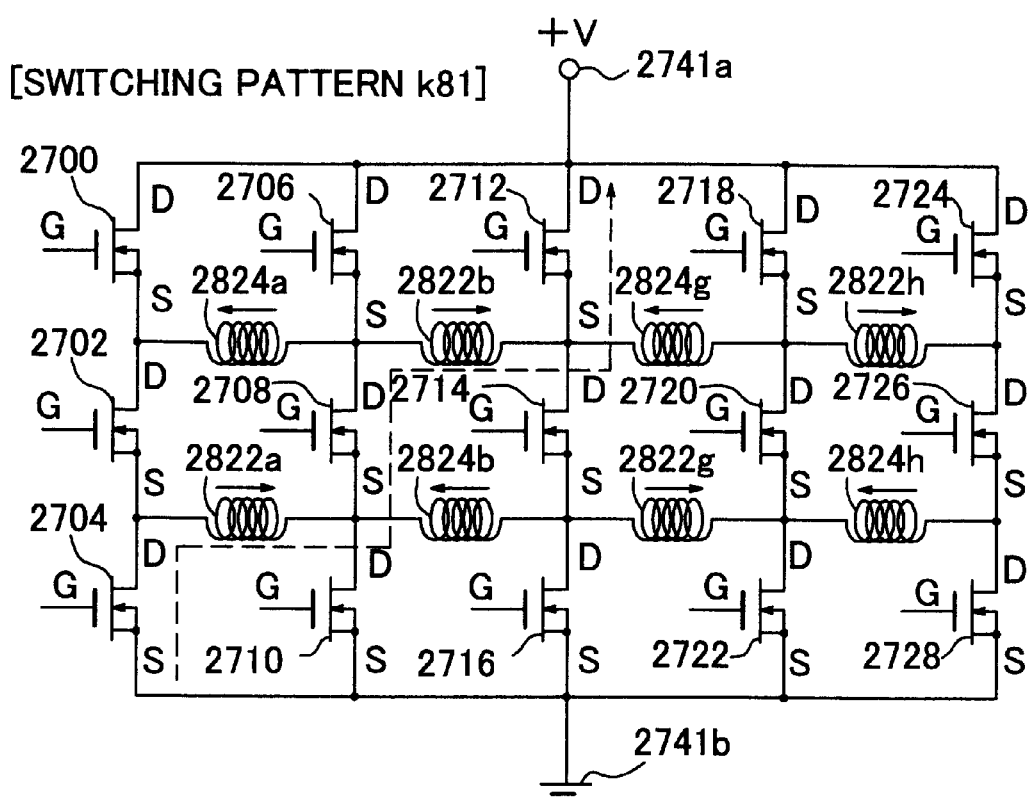

At a time point t168 after the armatures 110 come into contact with the upper cores 116, the processor outputs the OFF signals to all the switching elements 2700–2728 to set a switching pattern k81 indicated in FIG. 53K. Therefore, a regenerative current flows as indicated by a broken line arrow in FIG. 53K, so that the drawing currents flowing through the upper coils 2822a, and 2822b in the forward direction rapidly discontinue.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the intake ports of the first cylinder are kept in the closed state.

After the state where the OFF signals are outputted to all the switching elements 2700–2728, a timing comes at which the intake stroke of the fourth cylinder occurs. The intake stroke of the fourth cylinder does not overlap the intake stroke of the first cylinder.

Figure 54A:
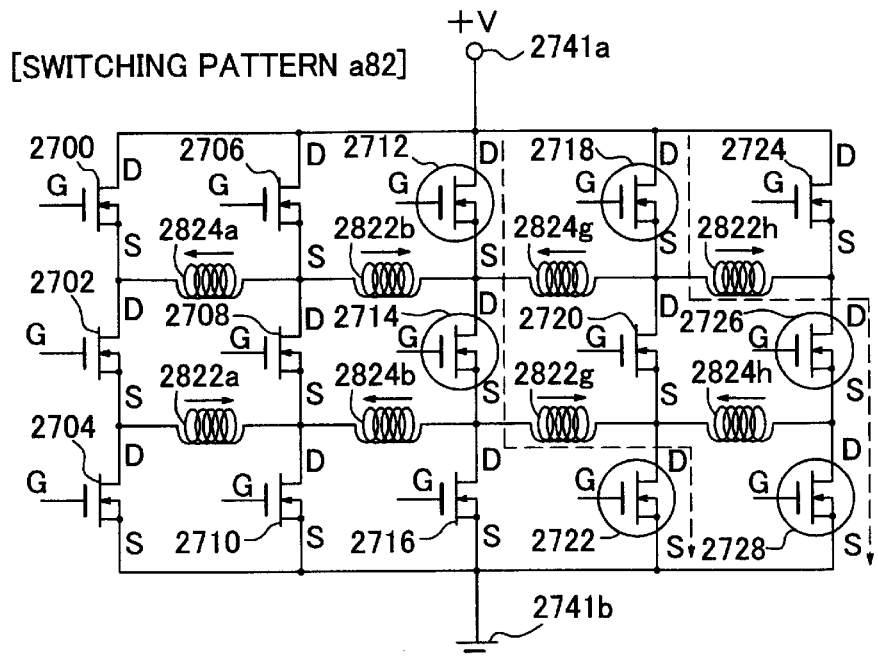
FIGS. 54A–54K are circuit diagrams for illustrating the control of current according to the embodiment of FIG. 51.
Figure 54B:
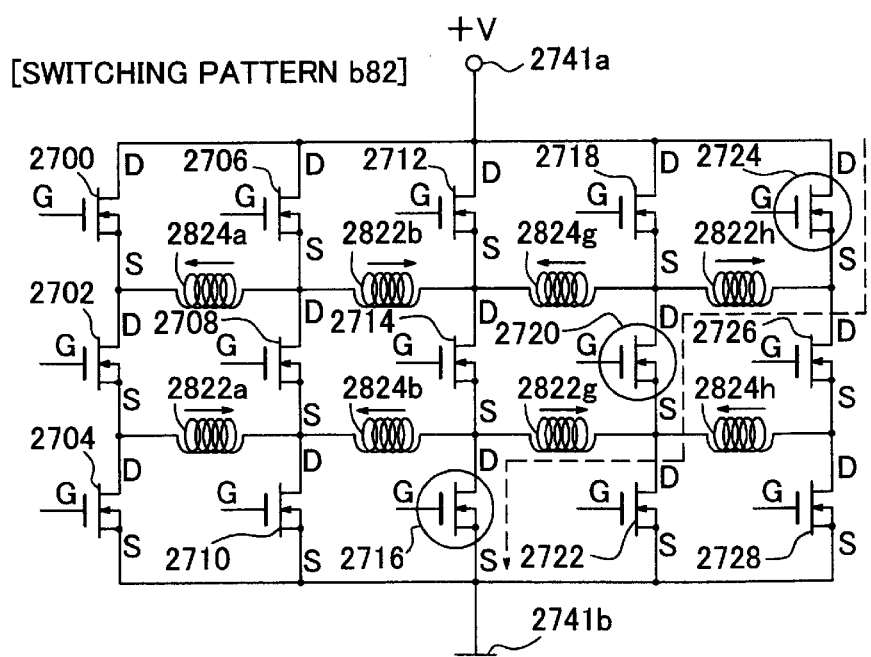

First, during a time period of t169–t170, the processor outputs the ON signals to the switching elements 2716, 2720, and 2724, and outputs the OFF signals to the other switching elements so as to set a switching pattern b82 indicated in FIG. 54B. Therefore, a current flows from the high potential side terminal 2741a to the low potential side terminal 2741b as indicated by a broken line arrow in FIG. 54B, so that reverse-direction releasing currents flow through the upper coils 2822g, and 2822h to cancel out the magnetic fluxes from the upper magnets 116d.

Therefore, the magnetic attraction forces on the armatures 110 created by the upper cores 116 disappear. Hence, the armatures 110 start to move toward the lower cores 118, or, toward the fully open state, due to the forces from the upper springs 120. As a result, the valve bodies 100 start to move apart from the valve seats 126, and the amount of valve lift starts to increase.

Figure 54C:
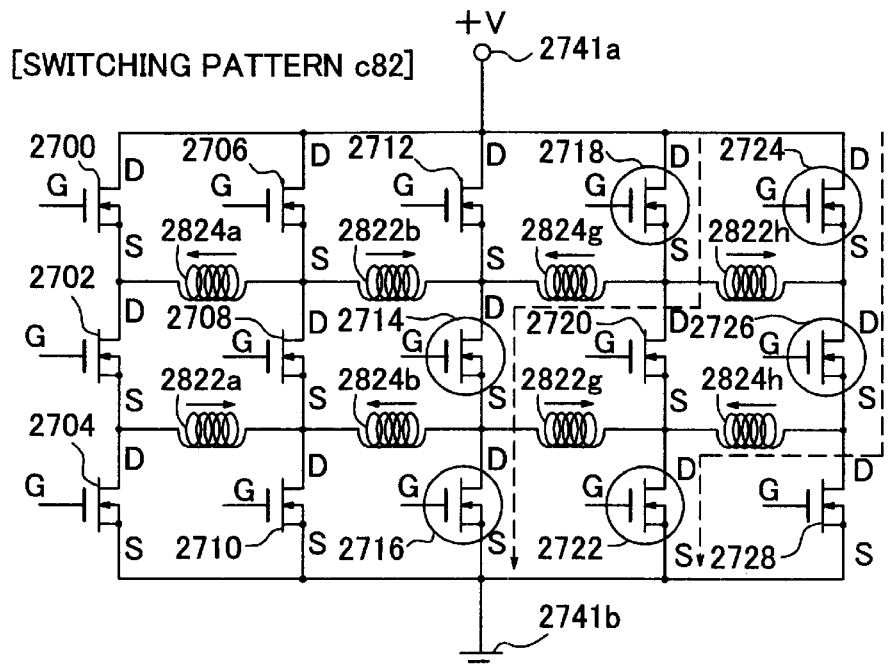
Figure 54D:
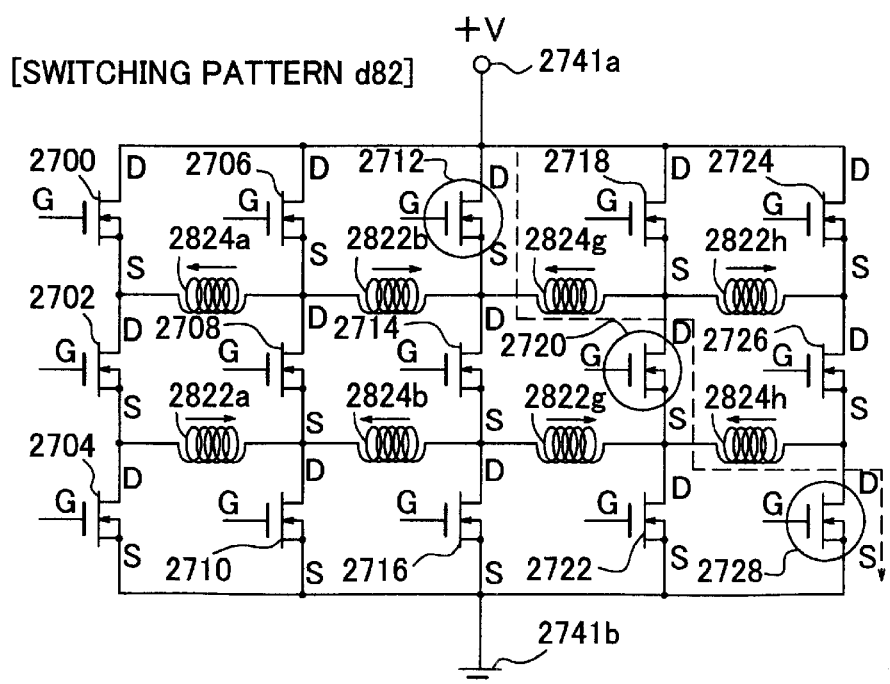
Figure 54E:
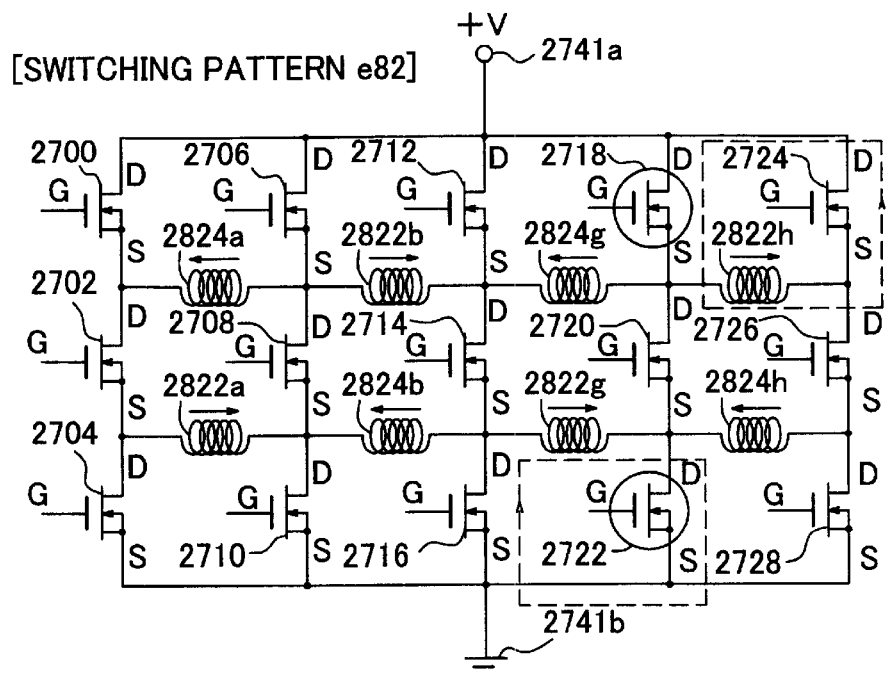
Figure 54F:
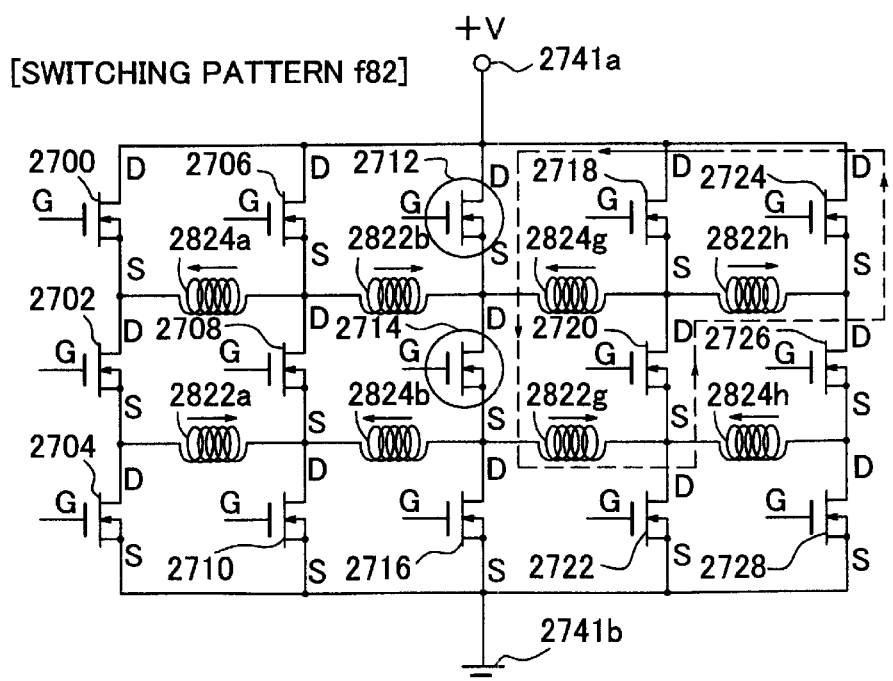
Figure 54G:
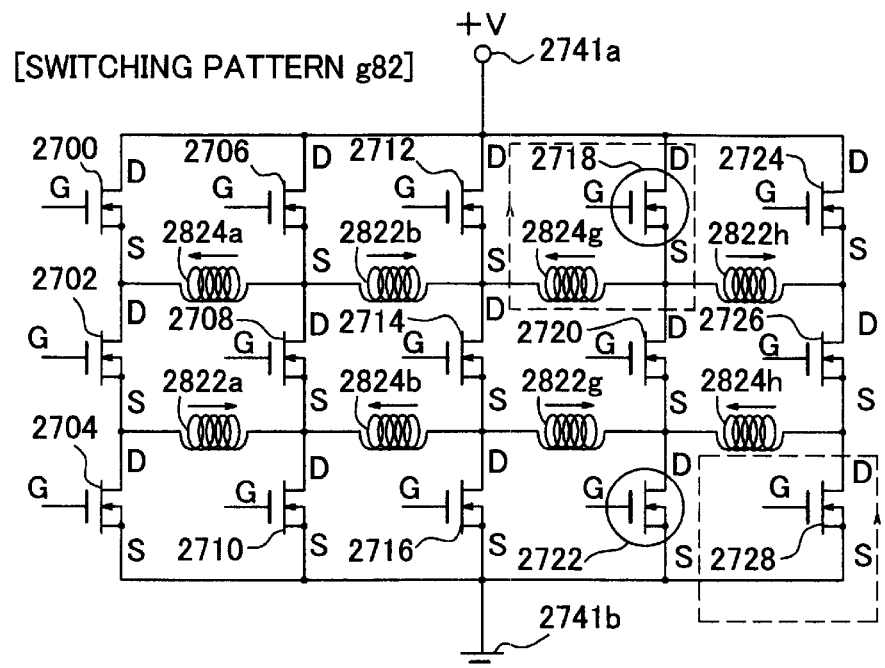
Figure 54H:
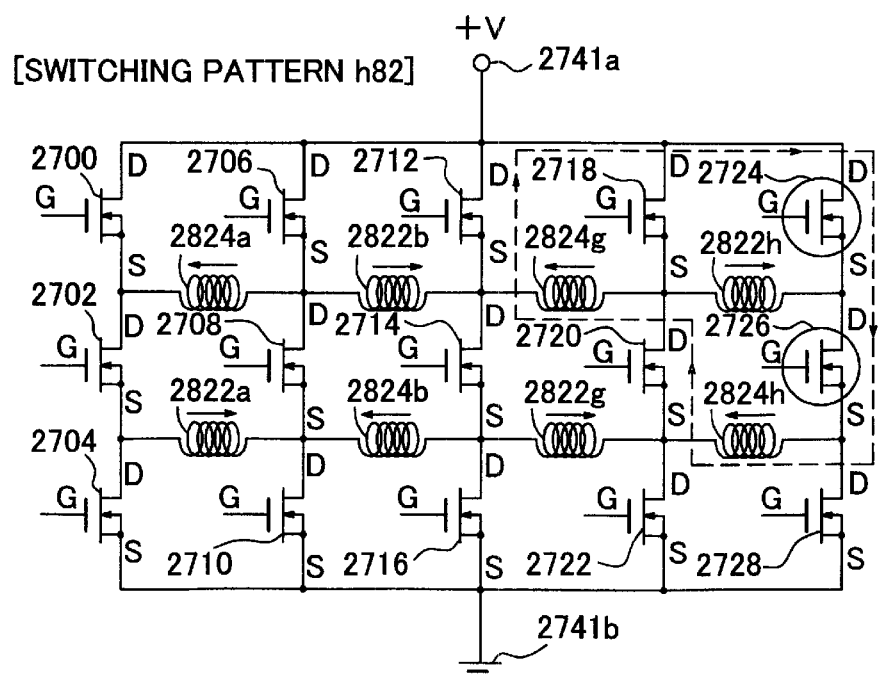
Figure 54I:
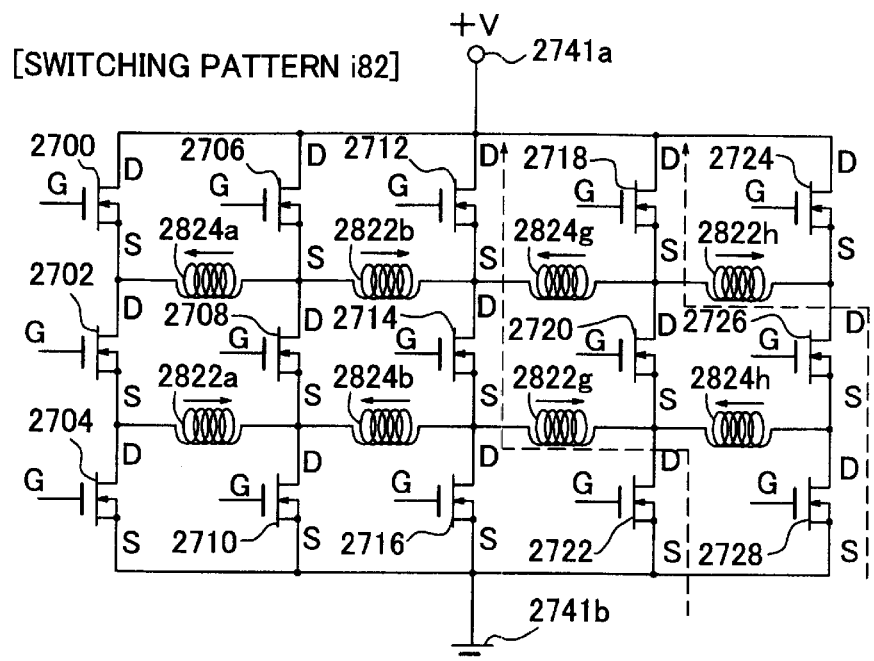

Afterwards, at a time point t170, the processor outputs the OFF signals to all the switching elements 2700–2728 to set a switching pattern i82 indicated in FIG. 54I. Therefore, regenerative currents flow as indicated by broken line arrows in FIG. 54I, so that the releasing currents through the upper coils 2822g, and 2822h rapidly discontinue.

At the time point t170 when the releasing currents through the upper coils 2822g, and 2822h discontinue, the armatures 110 are sufficiently apart from the upper cores 116, so that the armatures 110 are not returned to the upper cores 116 by the magnetic forces from the upper magnets 116d. Afterwards, the armatures 110 are moved away from the upper cores 116 toward the lower cores 118 by the force from the upper springs 120.

Subsequently at a time point t171, the processor outputs the ON signals to the switching elements 2714, 2716, 2722, 2724, and 2726, and outputs the OFF signals to the other switching elements so as to set a switching pattern c82 indicated in FIG. 54C. Therefore, currents flow from the high potential side terminal 2741a to the low potential side terminal 2741b as indicated by broken line arrows in FIG. 54C, so that currents flow through the lower coils 2824g, and 2824h of the intake valves of the fourth cylinder in the forward direction. Then, until a time point t172, the switching pattern c82 and a switching pattern g82 indicated in FIG. 54G or a switching pattern h82 indicated in FIG. 54H are alternated so as to maintain the drawing currents for magnetically drawing the armatures 110 into contact with the lower cores 118. Therefore, when approaching the lower cores 118 by the armatures 110 come into contact with the lower cores 118, overcoming the force from the lower springs 106.

In the switching pattern g82, the processor outputs the ON signals to the switching elements 2718, and 2722, and outputs the OFF signals to the other switching elements. Therefore, a current circulation path is formed through which current flows in a sequence of the lower coil 2824g and the switching elements 2712 and 2718. A current circulation path is formed through which current flows in a sequence of the lower coil 2824h and the switching elements 2722 and 2728. Immediately after the switching pattern c82 is changed to the switching pattern g82, flywheel currents flow through the circulation paths as indicated by broken line arrows in FIG. 54G.

In the switching pattern h82, the CPU outputs the ON signals to only the switching elements 2724, 2726, and outputs the OFF signals to the other switching elements. Therefore, a current circulation path through which current flows in a sequence of the lower coil 2824g, the switching elements 2712, 2724 and 2726, the lower coil 2824h, and the switching element 2720 is formed. Immediately after the switching pattern c82 is changed to the switching pattern h82, a flywheel current flows through the circulation path as indicated by a broken line arrow in FIG. 54H.

Therefore, by adjusting the proportion between the switching pattern c82 and the switching pattern g82 or the switching pattern h82, the quantity of current flowing through the lower coils 2824g, and 2824h in the forward direction can be adjusted.

During a time period of t172–t173 after the armatures 110 come into contact with the lower cores 118, the proportion of the switching pattern c82 in the alternation between the switching pattern c82 and the switching pattern g82 or the switching pattern h82 is reduced. Therefore, the quantity of current flowing through the lower coils 2824g, and 2824h in the forward direction is reduced to the holding current so as to maintain the contact between the armatures 110 and the lower cores 118. While the armatures 110 are held in contact with the lower cores 118 by continuously supplying the holding current through the lower coils 2824g, and 2824h, the valve bodies 100 are farthest apart from the valve seats 126 as indicated in FIG. 11, and, the intake ports of the fourth cylinder remain in the open state.

Subsequently, at a time point t174 near or at a timing at which the intake stroke of the fourth cylinder comes to an end, the switching pattern is changed to a switching pattern d82 indicated in FIG. 54D. In the switching pattern d82, the processor outputs the ON signals to the switching elements 2712, 2720, and 2728, and outputs the OFF signals to the other switching elements. Therefore, a regenerative current flows in the direction opposite to the direction indicated by a broken line arrow in FIG. 54D, so that the holding currents through the lower coils 2824g, and 2824h rapidly discontinue. Then, the releasing current flows through the lower coils 2824g, and 2824h in the reverse direction as indicated by the broken line in FIG. 54D.

Figure 54J:
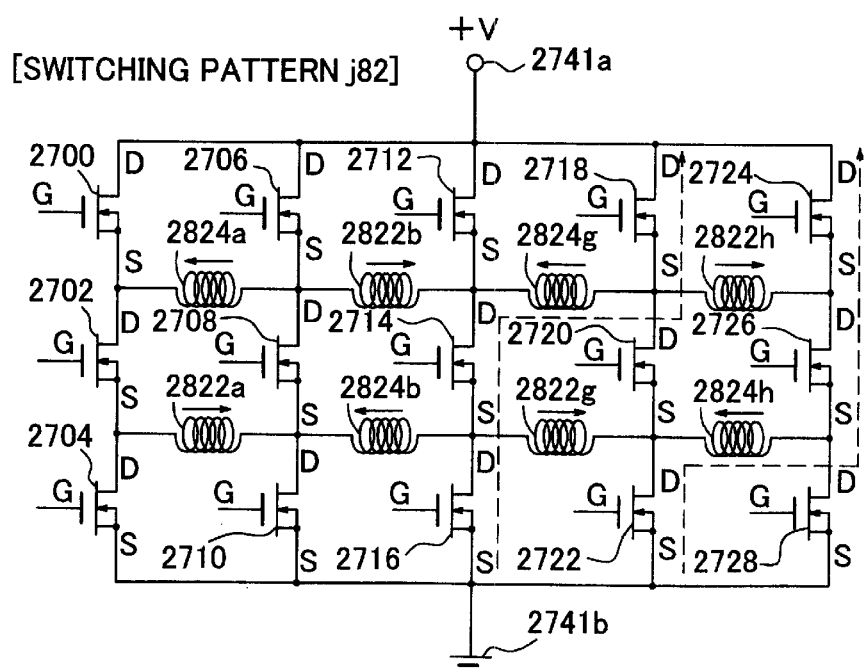

Subsequently at a time point t175, the processor outputs the OFF signals to all the switching elements 2700–2728 so as to set a switching pattern j82 indicated in FIG. 54J. Therefore, regenerative currents occur as indicated by broken line arrows in FIG. 54J, so that the releasing currents flowing through the lower coils 2824g, and 2824h in the reverse direction rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and the amount of valve lift starts to decrease.

Subsequently at a time point t176, the processor changes the switching pattern to a switching pattern a82 indicated in FIG. 54A, in order to draw the armatures 110 into contact with the upper cores 116. In the switching pattern a82, the processor outputs the ON signals to only the switching elements 2712, 2714, 2718, 2722, 2726, and 2728, and outputs the OFF signals to the other switching elements. As a result, currents flow from the high potential side terminal 2741a to the low potential side terminal 2741b as indicated by broken line arrows in FIG. 54A, so that the drawing currents flow through the upper coils 2822g, and 2822h of the intake valves of the fourth cylinder in the forward direction.

Afterwards, a drawing current is maintained by alternating the switching pattern a82 and a switching pattern e82 indicated in FIG. 54E or a switching pattern f82 indicated in FIG. 54F, until the armatures 110 contact the upper cores 116.

In the switching pattern e82, the processor outputs the ON signal to the switching elements 2718, and 2722, and outputs the OFF signals to the other switching elements. Therefore, a current circulation path is formed through which current flows in a sequence of the upper coil 2822g and the switching elements 2722 and 2716. A current circulation path is formed through which current flows in a sequence of the upper coil 2822h and the switching elements 2724 and 2718. Immediately after the switching pattern a82 is changed to the switching pattern e82, flywheel currents flow through the circulation paths as indicated by broken line arrows in FIG. 54E.

In the switching pattern f82, the processor outputs the ON signal to the switching elements 2712, and 2714, and outputs the OFF signals to the other switching elements. Therefore, a current circulation path is formed through which current flows in a sequence of the upper coil 2822g, the switching element 2720, the upper coil 2822h, and the switching elements 2724, 2712 and 2714. Immediately after the switching pattern a82 is changed to the switching pattern f82, a flywheel current flows through the circulation path as indicated by a broken line arrow in FIG. 54F.

Therefore, by adjusting the proportion between the switching pattern a82 and the switching pattern e82 or the switching pattern f82, the quantity of current flowing through the upper coils 2822g, 2822h in the forward direction can be adjusted.

Figure 54K:
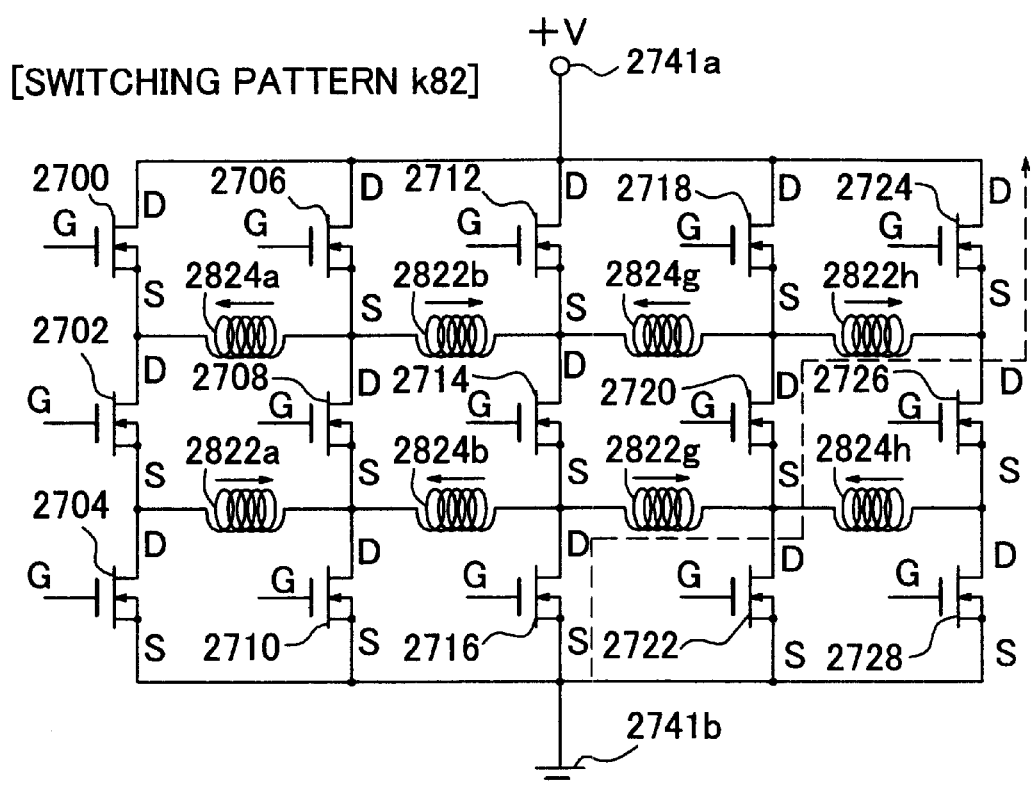

At a time point t177 after the armatures 110 come into contact with the upper cores 116, the processor outputs the OFF signals to all the switching elements 2700–2728 so as to set a switching pattern k82 indicated in FIG. 54K. Therefore, a regenerative current flows as indicated by a broken line arrow in FIG. 54K, so that the drawing currents flowing through the upper coils 2822g, and 2822h in the forward direction rapidly discontinue.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the intake ports of the fourth cylinder remain in the closed state.

In the above-described fashion, the four intake valves of the first cylinder and the fourth cylinder are opened and closed by the drive circuit 2792a.

From the foregoing description, it should be understood that the switching elements 2700–2716 used to conduct current to drive the upper coils 2822a, and 2822b as indicated in FIGS. 53A, 53B, 53E, 53F, 53I and 53K are the same as the switching elements 2700–2716 used to conduct current to drive the lower coils 2824a, and 2824b as indicated in FIGS. 53C, 53D, 53G, 53H and 52J Thus, these switching elements are shared by the upper coils 2822a, and 2822b and the lower coils 2824a, and 2824b.

Furthermore, it should be understood that the switching elements 2712–2728 used to conduct current to drive the upper coils 2822g, and 2822h as indicated in FIGS. 54A, 54B, 54E, 54F, 54I and 54K are the same as the switching elements 2712–2728 used to conduct current to drive the lower coils 2824g, and 2824h as indicated in FIGS. 54C, 54D, 54G, 54H and 54J. Thus, these switching elements are shared by the upper coils 2822g, and 2822h and the lower coils 2824g, and 2824h.

Still further, through comparison between the switching elements 2700–2716 used to conduct current to drive the upper coils 2822a, and 2822b and the lower coils 2824a, and 2824b of the two intake valves of the first cylinder as indicated in FIGS. 53A to 53K and the switching elements 2712–2728 caused to conduct current to drive the upper coils 2822g, and 2822h and the lower coils 2824g, and 2824h of the two intake valves of the fourth cylinder as indicated in FIGS. 54A to 54K, it should be understood that the switching elements 2712–2716 are shared.

The other drive circuits 2792b, 2792c, and 2792d drive combinations of valves as shown in FIG. 16. Therefore, all the valves can be opened and closed. In the drive circuits 2792b, 2792c, and 2792d, the sharing of switching elements is achieved as in the case of the drive circuit 2792a.

Therefore, the drive circuit portion, equipped with the four drive circuits 2792a–2792d, is able to drive a total of 16 valves of the four cylinders, or, the 8 intake valves and the 8 exhaust valves, in the combinations as depicted in FIG. 16.

Each of the drive circuits 2792a–2792d is able to drive four valves by using the 15 switching elements 2700–2728. Thus, 60 switching elements are used to drive the 16 valves of the four cylinders, or 3.75 elements/1 valve. In contrast, the above-described conventional three-switching element in-series type construction needs 72 switching elements for 16 valves, or 4.5 elements/1 valve.

Therefore, embodiments of the present invention are is able to reduce the number of switching elements, and allow size and cost reductions of the drive circuit portion for the intake and exhaust valves formed as electromagnetic valves.

The terminal portions of the electromagnetic coils 2822a–2824h are connected to the series connecting portions between the switching elements of the series circuits 2742–2746, each formed by connecting three switching elements in series. Therefore, in the switching control on the switching elements 2700–2728, a mode of supplying reverse currents through the electromagnetic coils 2822a–2824h can be realized as indicated in FIGS. 53B, 53D, 54B and 54D.

Each drive circuit 2792a–2792d employs the 10 electrically conductive wires for the 8 electromagnetic coils, or 1.25 wires/1 electromagnetic coil, thus reducing the number of wires needed. In the above-described conventional three-switching element in-series type construction, 48 conductive wires are needed for 32 electromagnetic coils, or 1.5 wires/1 electromagnetic coil. Thus, Embodiment 9 allows a reduction in the thickness of a wire harness disposed in a vehicle, thus contributing to size and weight reductions of the vehicle.

Figure 55:
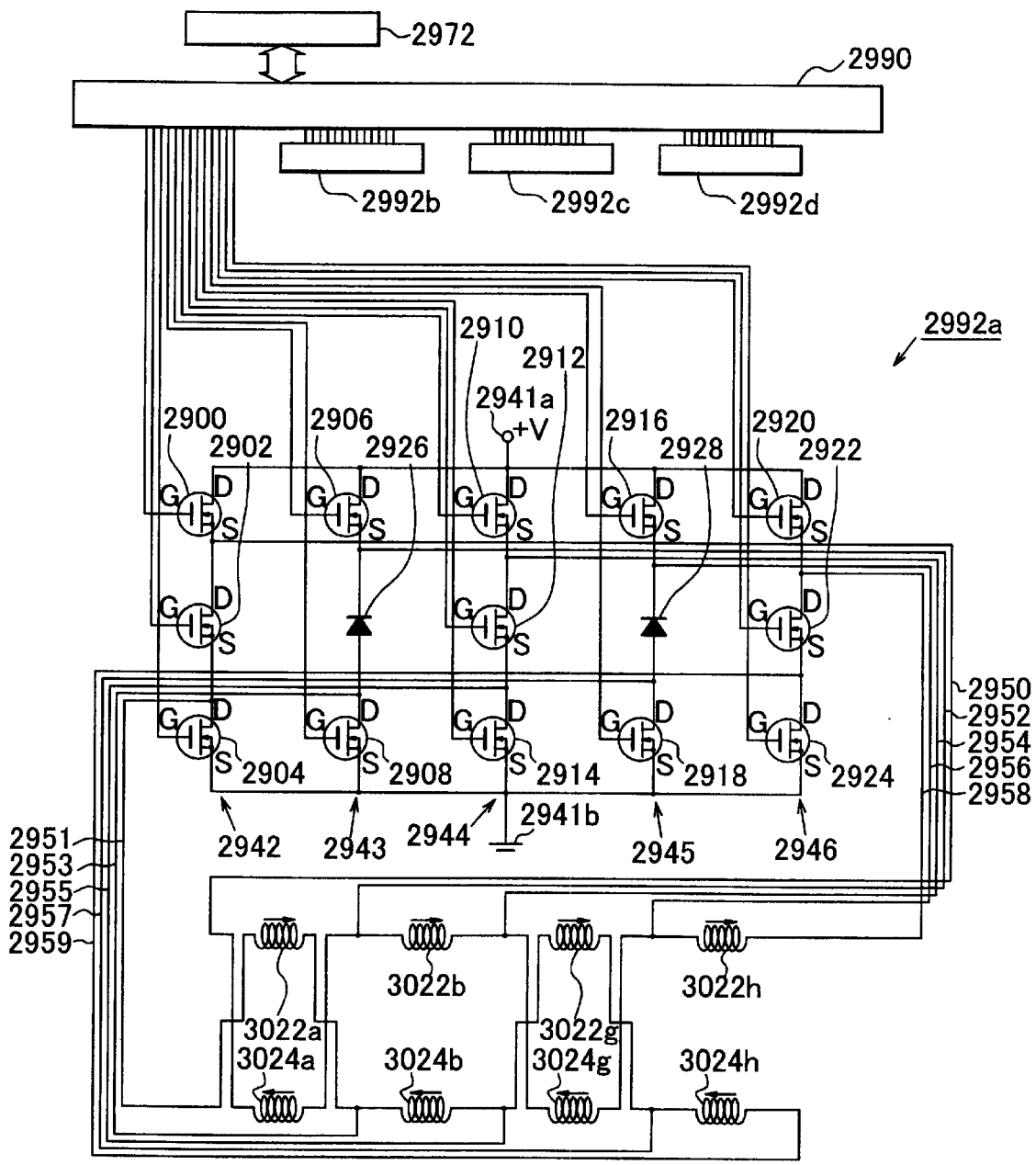
FIG. 55 is a diagram illustrating a construction of a drive circuit according to another embodiment of the present invention.

The embodiment depicted FIG. 55 differs from Embodiment 9 in that previous embodiments using a drive circuit 2992a in place of the drive circuit 2792a. The drive circuit 2992a is a three-switching element in-series type drive circuit. Other drive circuits 2992b, 2992c, and 2992d are the same as the drive circuit 2992a. Therefore, the drive circuit 2992a will be described below as representative of the other drive circuits. Other configurations of the present embodiment are substantially similar as those of previous embodiments.

The drive circuit 2992a is formed by 13 switching elements 2900, 2902, 2904, 2906, 2908, 2910, 2912, 2914, 2916, 2918, 2920, 2922, and 2924 and two diodes 2926, and 2928. Five series circuits 2942, 2943, 2944, 2945, and 2946 are formed by connecting three of the switching elements 2900–2924 and the diodes 2926, and 2928 in series. The series circuits 2942–2946 are connected in parallel between a high potential side terminal 2941a and a low potential side terminal 2941b.

Of the series circuits 2942–2946, the second and fourth series circuit 2943, and 2945 from the left side in FIG. 55 are formed by connecting the switching element 2906, the diode 2926 and the switching element 2908 in series in that order, and the switching element 2916, the diode 2928 and the switching element 2918 in series in that order, respectively. The diodes 2926, 2928 are disposed in such a direction as to allow current to flow from the low potential side terminal 2941b to the high potential side terminal 2941a. The other three series circuits 2942, 2945, and 2946 are each formed by connecting three of the switching elements 2900–2904, 2910–2914, and 2920–2924 in series.

Thus, the drive circuit 2992a in this embodiment differs from the drive circuit 2792a in previous embodiments in that the drive circuit 2992a employs the two diodes 2926, and 2928 in place of two switching elements. Other configurations of the drive circuit 2992a are substantially similar as those of the drive circuit 2792a. Thus, an upper coil 3022a of a first intake valve and an upper coil 3022b of a second intake valve of a first cylinder, an upper coil 3022g of a first intake valve and an upper coil 3022h of a second intake valve of a fourth cylinder, a lower coil 3024a of the first intake valve and a lower coil 3024b of the second intake valve of the first cylinder, and a lower coil 3024g of the first intake valve and a lower coil 3024h of the second intake valve of the fourth cylinder are connected to positions comparable to those in previous embodiments, via 10 electrically conductive wires 2950, 2951, 2952, 2953, 2954, 2955, 2956, 2957, 2958, and 2959.

The 13 switching elements 2900–2924 are substantially similar as the switching elements in previous embodiments in that ON signals and OFF signals from a processor are inputted to the gate terminals G via an output port 2972 and a buffer circuit 2990.

The opening and closing operations of the two intake valves of the first cylinder and the two intake valves of the fourth cylinder are performed when control currents are supplied from the ECU. A timing chart depicted in FIG. 56 indicates the operations of the four valves.

FIGS. 57A to 57L and FIGS. 58A to 58L are circuit diagrams indicating states of control performed on the drive circuit 2992a depicted in FIG. 55 so as to realize the operations indicated in FIG. 56. In FIGS. 57A to 57L and 58A to 58L, the conductive wires 2950–2959 are omitted. Furthermore, in FIGS. 57A to 57L and 58A to 58L, broken line arrows and circles "□" indicates the same states as described above in conjunction with previous embodiments.

Before a time point t180 indicated in FIG. 56, the armatures 110 are brought into contact with the upper cores 116 as depicted in FIG. 10 by temporary excitation of the upper coils 3022a, 3022b, 3022g, and 3022h, and that this contact state is maintained by the magnetic attraction forces of the upper magnets 116d. Therefore, the valve bodies 100 are in contact with the valve seats 126, that is, the two intake valves of the first cylinder and the two intake valves of the fourth cylinder are in a closed state. The OFF signals are outputted to all the 13 switching elements 2900–2924.

Figure 57A:
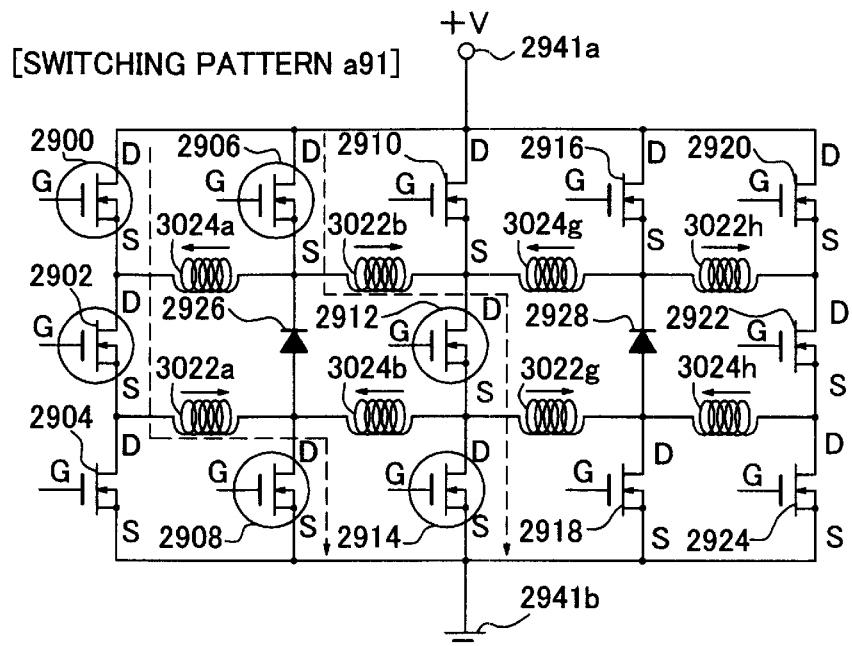
FIGS. 57A, 57C, 57E to 57H and 57K to 57L are circuit diagrams for illustrating the control of current according to the embodiment of FIG. 55.
Figure 57C:
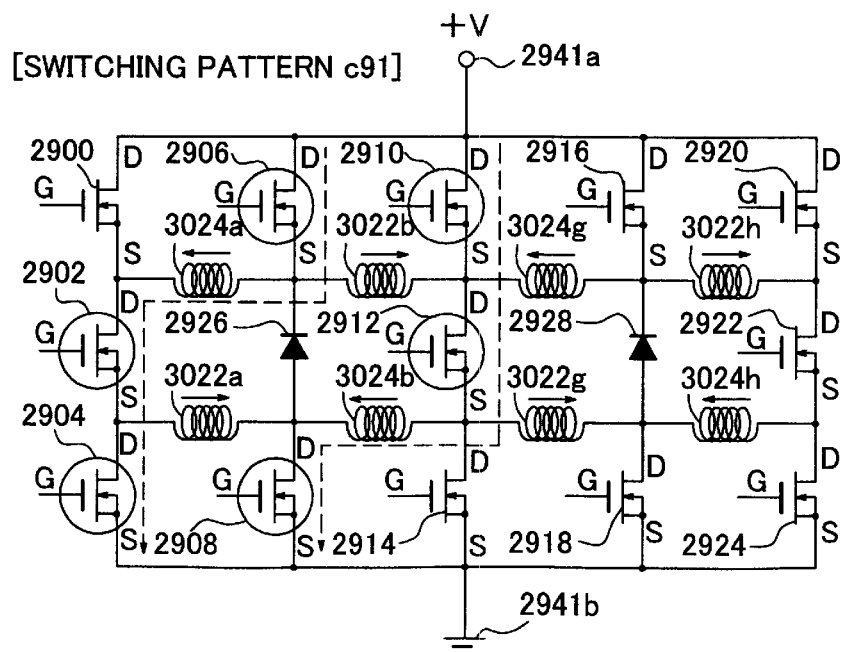
Figure 57E:
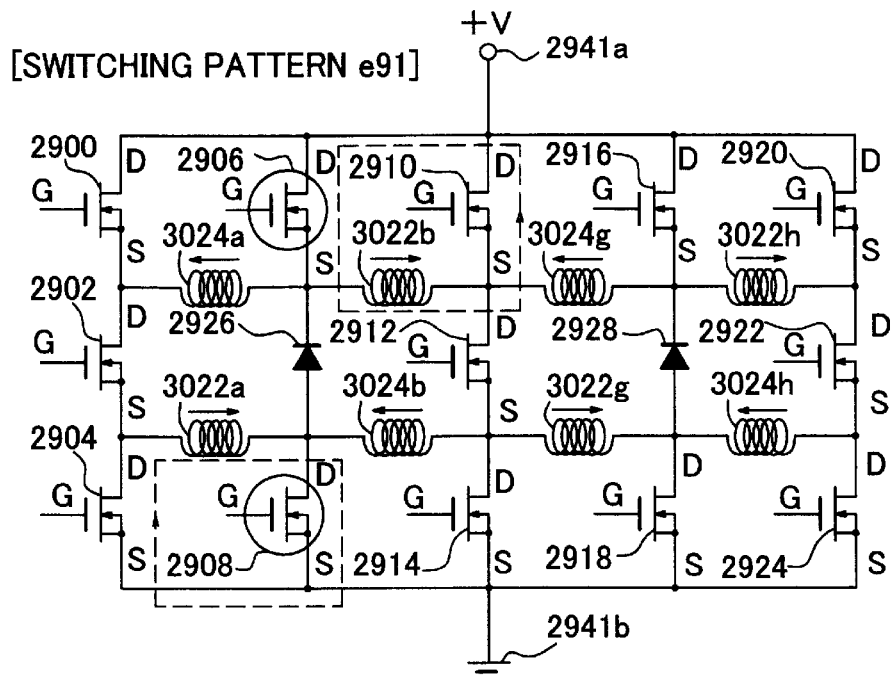
Figure 57F:
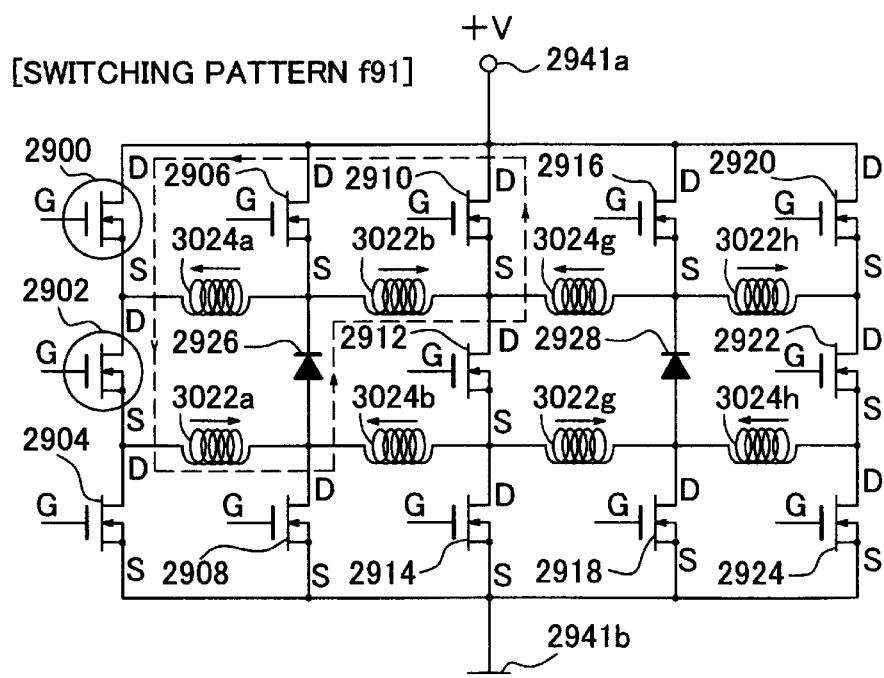
Figure 57G:
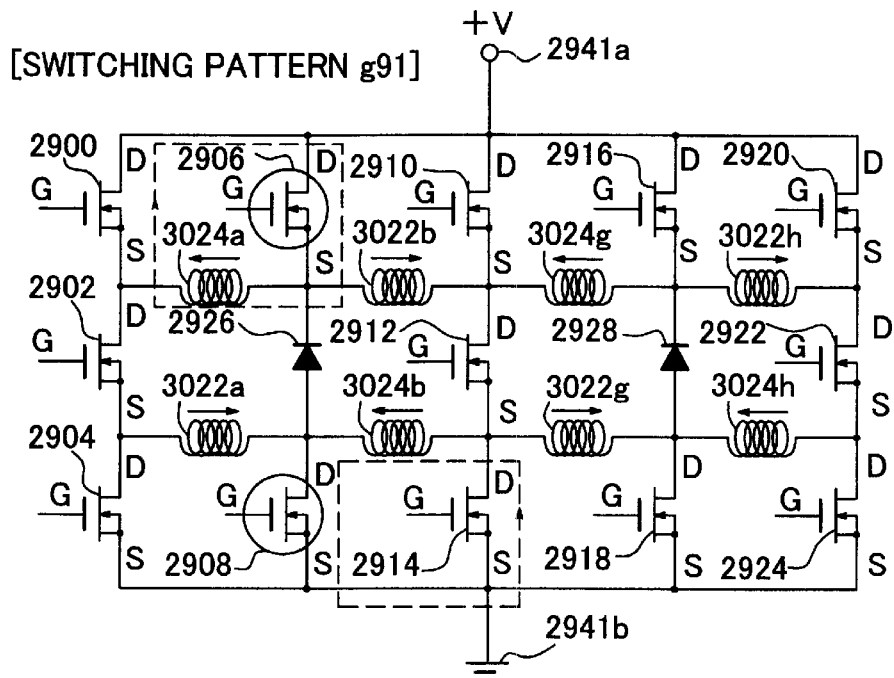
Figure 57H:
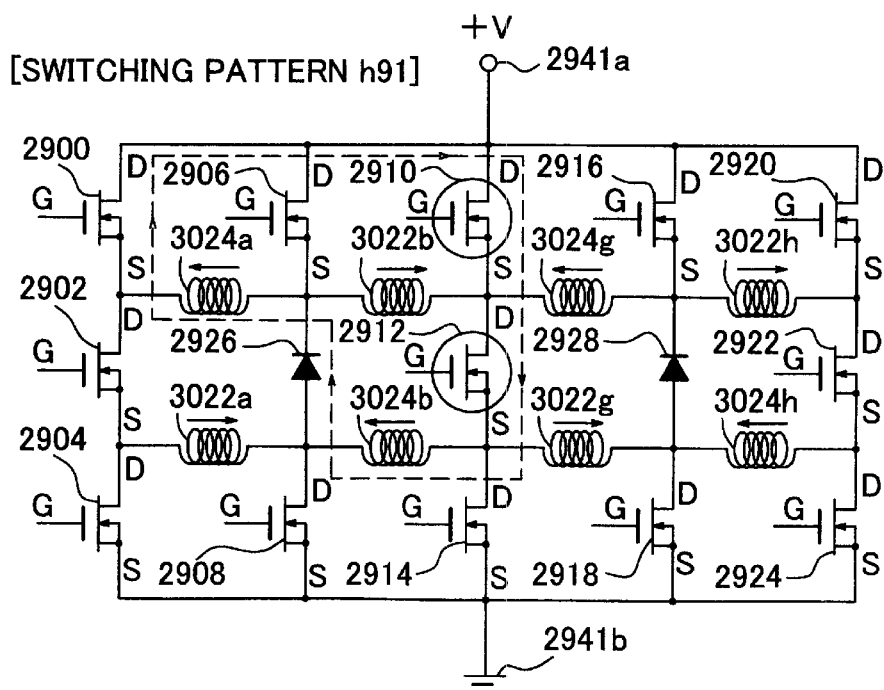

At the time of the intake stroke of the first cylinder, the processor outputs the ON signals to the switching elements 2902, 2906, 2908, 2910, and 2912 and outputs the OFF signals to the other switching elements at the time point t180 to establish a switching pattern c91 indicated in FIG. 57C. As a result, currents flow from the high potential side terminal 2941a to the low potential side terminal 2941b as indicated by broken line arrows in FIG. 57C, so that currents flow through the lower coils 3024a, 3024b of the two intake valves of the first cylinder in a forward direction. Then, the switching pattern c91 and a switching pattern g91 indicated in FIG. 57G or a switching pattern h91 indicated in FIG. 57H are alternated until a time point t181.

In the switching pattern g91, the processor outputs the ON signals to the switching elements 2906, and 2908, and outputs the OFF signals to the other switching elements. Therefore, a current circulation path is formed through which current flows in a sequence of the lower coil 3024a and the switching elements 2900 and 2906. A current circulation path is formed through which current flows in a sequence of the lower coil 3024b and the switching elements 2908 and 2914. Immediately after the switching pattern c91 is changed to the switching pattern g91, flywheel currents flow through the circulation paths as indicated by broken line arrows in FIG. 57G.

In the switching pattern h91, the processor outputs the ON signals to the switching elements 2910, and 2912, and outputs the OFF signals to the other switching elements. Therefore, a current circulation path is formed through which current flows in a sequence of the lower coil 3024b, the diode 2926, the lower coil 3024a, and the switching elements 2900, 2910 and 2912. Immediately after the switching pattern c91 is changed to the switching pattern h91, a flywheel current flows through the circulation path as indicated by a broken line arrow in FIG. 57H.

Therefore, by adjusting the proportion of the switching pattern c91 to a sufficiently great value, it is possible to achieve such an adjustment that great currents flow through the lower coils 3024a, and 3024b in the forward direction.

In this manner, the lower coils 3024a, and 3024b are supplied with separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Subsequently, starting at a time point t181, the processor reduces the proportion of the switching pattern c91 so as to reduce the quantity of current supplied through the lower coils 3024a, and 3024b, so that the quantity of current is set to a normal drawing current at a time point t182. At this moment, the armatures 110 are sufficiently apart from the upper cores 116. Therefore, although the currents through the lower coils 3024a, and 3024b are set to the normal drawing current, the armatures 110 are not returned to the upper cores 116 by the magnetic forces from the upper magnets 116d. Afterwards, due to the drawing currents and the forces from the upper springs 120, the armatures 110 rapidly move away from the upper cores 116, and contact the lower cores 118 by overcoming the forces from the lower springs 106.

Starting at a time point t183 after the armatures 110 come into contact with the lower cores 118, the processor further reduces the proportion of the switching pattern c91 so as to reduce the quantity of current flowing through the lower coils 3024a, and 3024b in the forward direction. Then, at a time point t184, the quantity of current is set to the level of the holding current, so that the contact between the armatures 110 and the lower cores 118 is maintained. Thus, the input ports of the first cylinder are set open.

Subsequently, at a time point t185 near or at a timing at which the intake stroke of the first cylinder comes to an end, the switching pattern is changed to a switching pattern 191 indicated in FIG. 57L. In the switching pattern 191, the processor outputs the OFF signals to all the switching elements 2900–2924. Therefore, a regenerative current occurs as indicated by a broken line arrow in FIG. 57L, so that the holding currents flowing through the lower coils 3024a, and 3024b rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t186, the processor changes the switching pattern to a switching pattern a91 indicated in FIG. 57A, in order to draw the armatures 110 into contact with the upper cores 116. As a result, the drawing currents flow through the upper coils 3022a, and 3022b. Afterwards, a drawing current is maintained by alternating the switching pattern a91 and a switching pattern e91 indicated in FIG. 57E or a switching pattern f91 indicated in FIG. 57F, until the armatures 110 contact the upper cores 116.

In the switching pattern a91, the processor outputs the ON signals to the switching elements 2900, 2902, 2906, 2908, 2912, and 2914, and outputs the OFF signals to the other switching elements. As a result, currents flow from the high potential side terminal 2941a to the low potential side terminal 2941b as indicated by broken line allows in FIG. 57A, so that currents flow through the upper coils 3022a, and 3022b of the intake valves of the first cylinder in the forward direction.

In the switching pattern e91, the processor outputs the ON signals to the switching elements 2906, and 2908, and outputs the OFF signals to the other switching elements. Therefore, a current circulation path is formed through which current flows in a sequence of the upper coil 3022a and the switching elements 2908 and 2904. A current circulation path is formed through which current flows in a sequence of the upper coil 3022b and the switching elements 2910 and 2906. Immediately after the switching pattern a91 is changed to the switching pattern e91, flywheel currents flow through the circulation paths as indicated by broken line arrows in FIG. 57E.

In the switching pattern f91, the processor outputs the ON signals to only the switching elements 2900, and 2902, and outputs the OFF signals to the other switching elements. Therefore, a current circulation path is formed through which current flows in a sequence of the upper coil 3022a, the diode 2926, the upper coil 3022b, and the switching elements 2910, 2900 and 2902. Immediately after the switching pattern a91 is changed to the switching pattern f91, a flywheel current flows through the circulation path as indicated by a broken line arrow in FIG. 57F.

Therefore, by adjusting the proportion between the switching pattern a91 and the switching pattern e91 or the switching pattern f91, the quantity of current flowing through the upper coils 3022a, and 3022b in the forward direction can be adjusted.

Figure 57K:
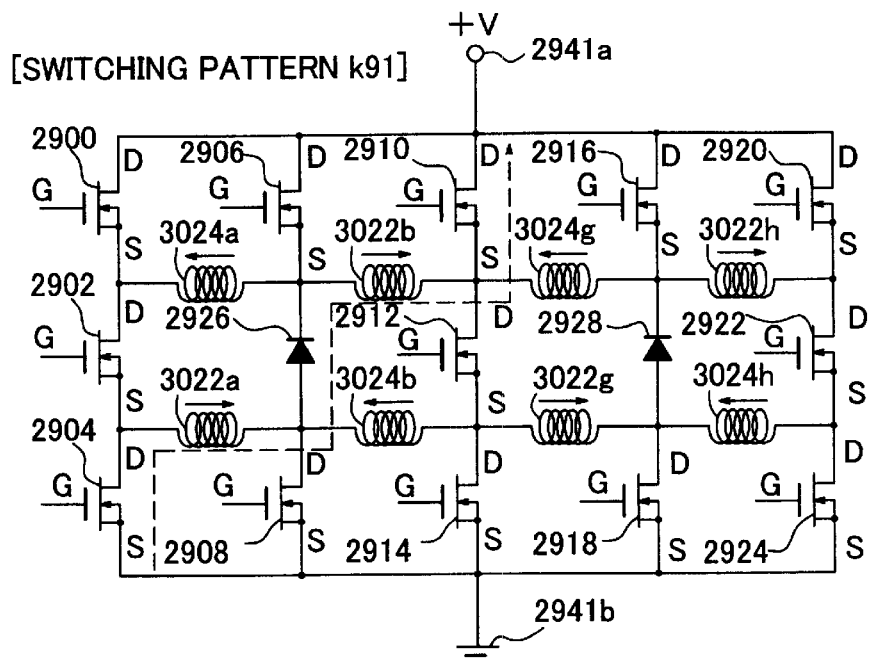
Figure 57L:
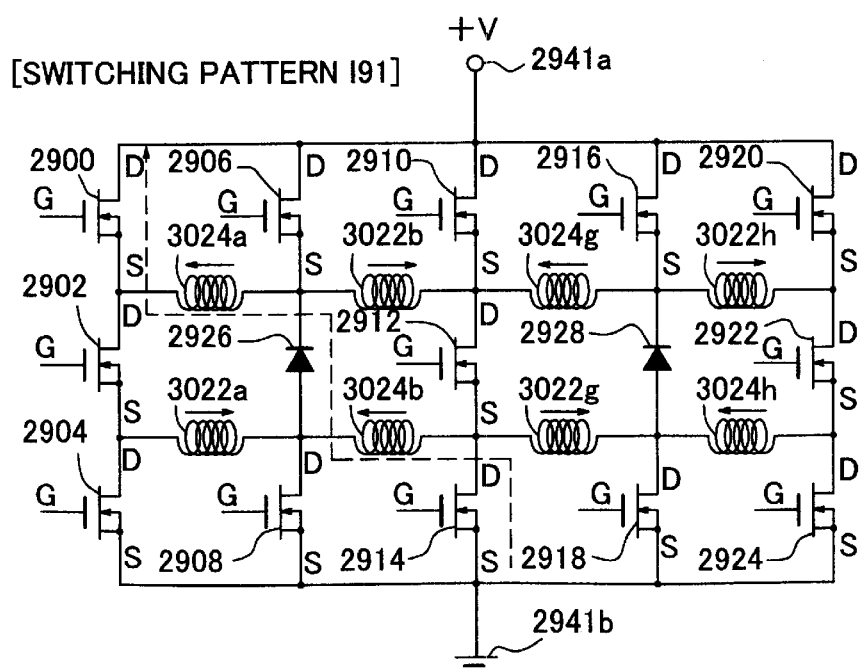

At a time point t187 after the armatures 110 come into contact with the upper cores 116, the switching pattern is changed to a switching pattern k91 indicated in FIG. 57K. In the switching pattern k91, the CPU outputs the OFF signals to all the switching elements 2900–2924. Therefore, a regenerative current occurs as indicated by a broken line arrow in FIG. 57K, so that the drawing currents flowing through the upper coils 3022a, and 3022b rapidly discontinue. Even after the drawing currents discontinue, the contact between the armatures 110 and the upper cores 116 is maintained by the magnetic attraction forces from the upper magnets 116d. In this manner, the intake ports of the first cylinder are set closed.

After the state where the OFF signals are outputted to all the switching elements 2900–2924, a timing point occurs at the intake stroke of the fourth cylinder. The intake stroke of the fourth cylinder does not overlap the intake stroke of the first cylinder.

Figure 58A:
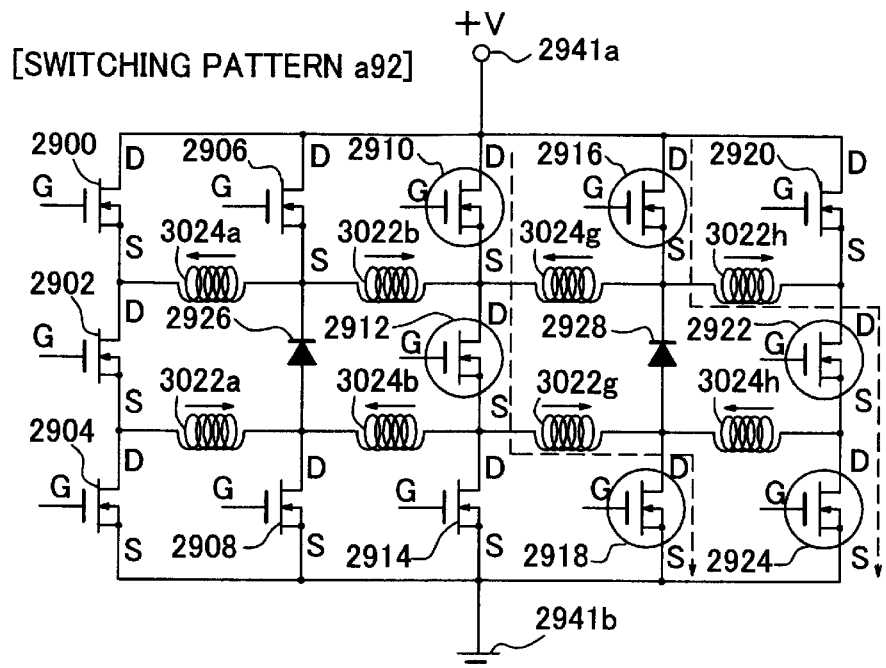
FIGS. 58A, 58C, 58E to 58H and 58K to 58L are circuit diagrams for illustrating the control of current according to the embodiment of FIG. 55.
Figure 58C:
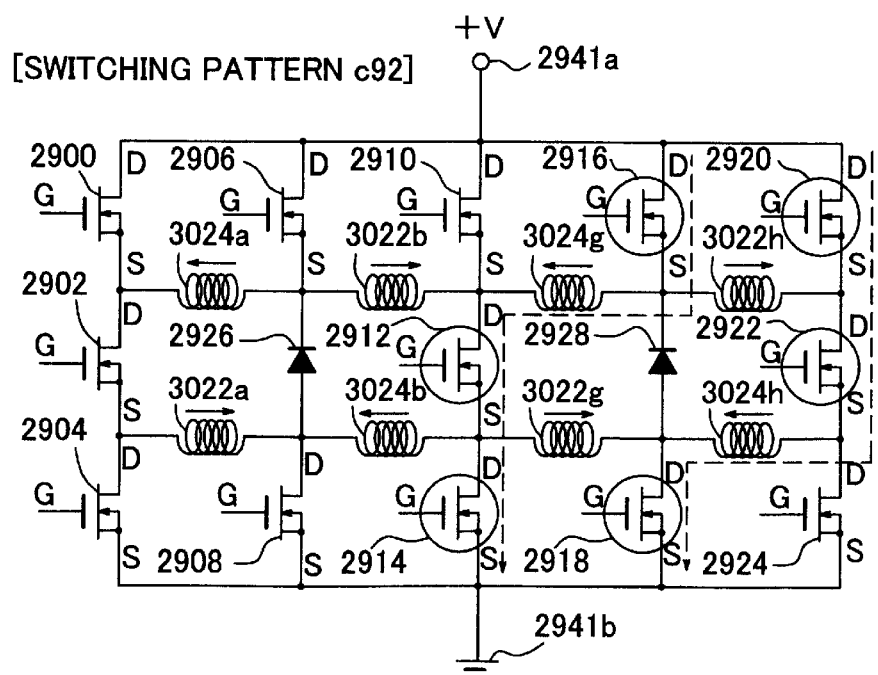
Figure 58E:
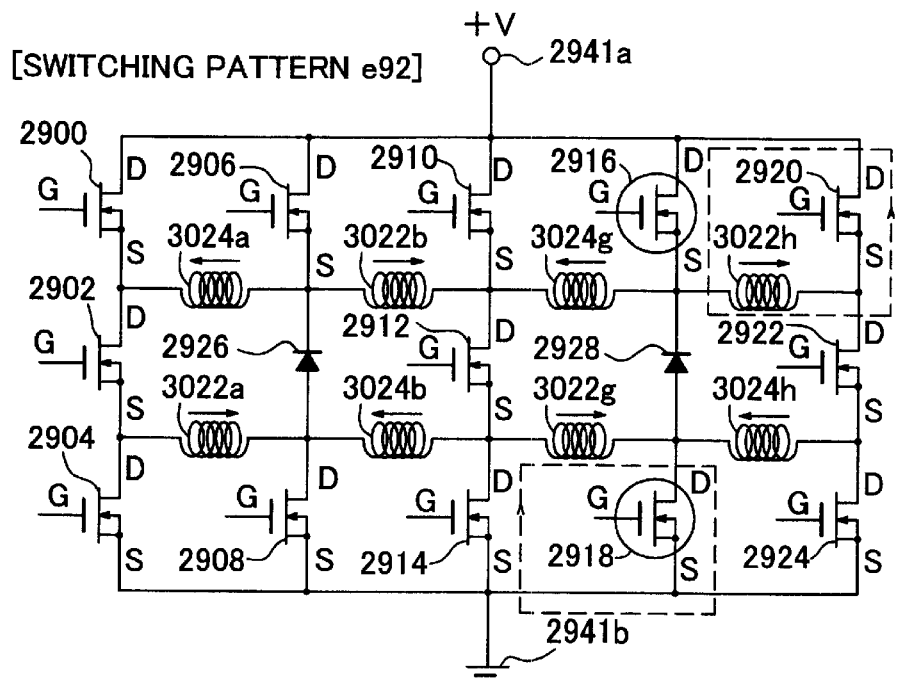
Figure 58F:
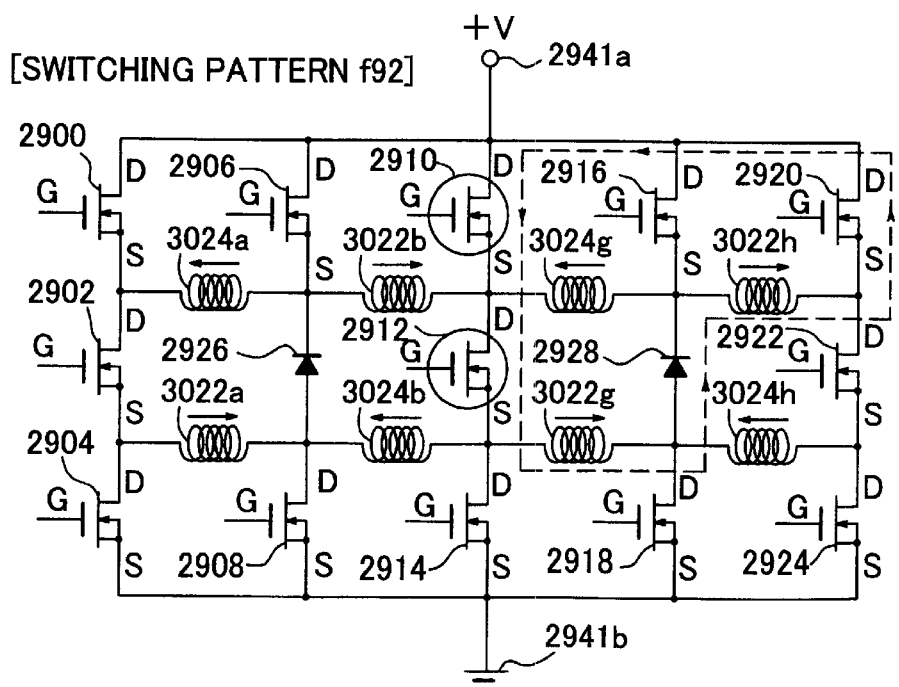
Figure 58G:
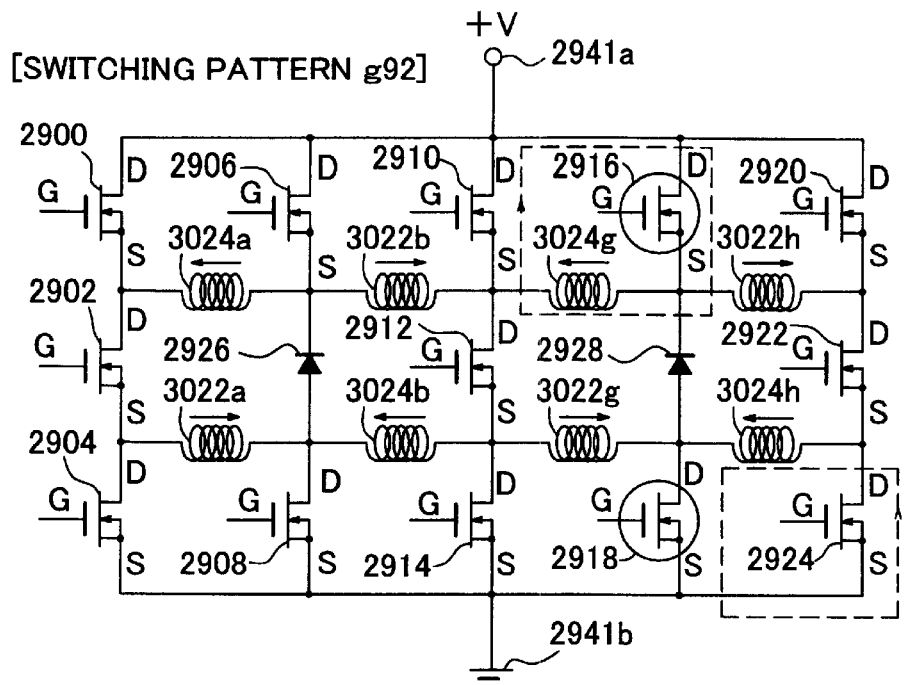
Figure 58H:
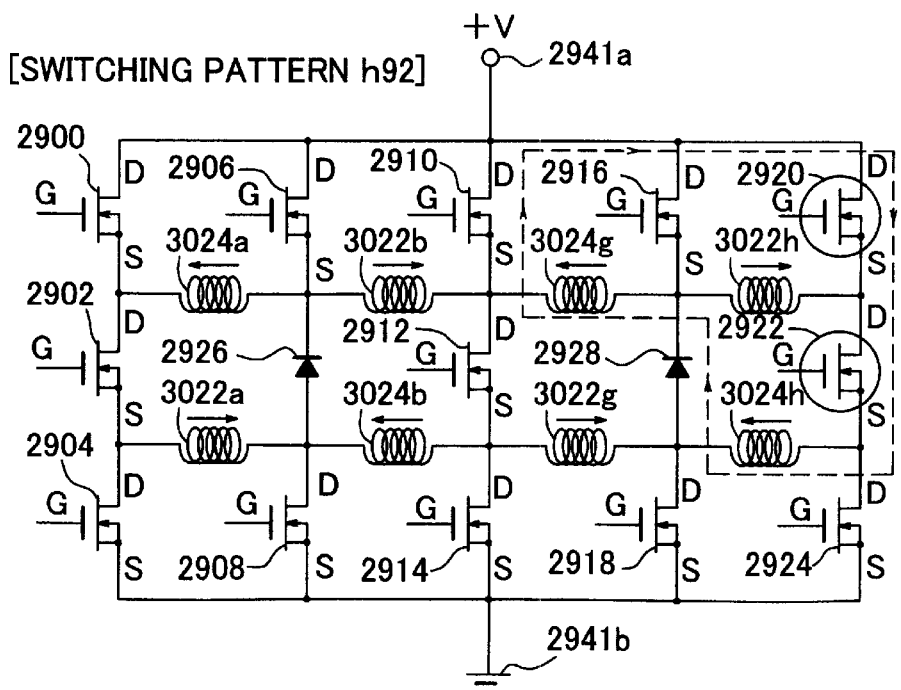

First, at a time point t188, the CPU outputs the ON signals to only the switching elements 2912, 2914, 2916, 2918, 2920, 2922, and outputs the OFF signals to the other switching elements so as to set a switching pattern c92 indicated in FIG. 58C. Therefore, currents flow from the high potential side terminal 2941a to the low potential side terminal 2941b as indicated by broken line arrows in FIG. 58C, so that currents flow through the lower coils 3024g, 3024h of the intake valves of the fourth cylinder in the forward direction. Then, the switching pattern c92 and a switching pattern g92 indicated in FIG. 58G or a switching pattern h92 indicated in FIG. 58H are alternated until a time point t189.

In the switching pattern g92, the processor outputs the ON signals to the switching elements 2916, and 2918, and outputs the OFF signals to the other switching elements. Therefore, a current circulation path is formed through which current flows in a sequence of the lower coil 3024g and the switching elements 2910 and 2916. A current circulation path is formed through which current flows in a sequence of the lower coil 3024h and the switching elements 2918 and 2924. Immediately after the switching pattern c92 is changed to the switching pattern g92, flywheel currents flow through the circulation paths as indicated by broken line arrows in FIG. 58G.

In the switching pattern h92, the processor outputs the ON signals to the switching elements 2920, and 2922, and outputs the OFF signals to the other switching elements. Therefore, a current circulation path is formed through which current flows in a sequence of the lower coil 3024h, the diode 2928, the lower coil 3024g, and the switching elements 2910, 2920 and 2922. Immediately after the switching pattern c92 is changed to the switching pattern h92, a flywheel current flows through the circulation path as indicated by a broken line arrow in FIG. 58H.

Therefore, by adjusting the proportion of the switching pattern c92 to a sufficiently great value, it is possible to achieve such an adjustment that great currents flow through the lower coils 3024g, and 3024h in the forward direction.

In this manner, the lower coils 3024g, and 3024h are supplied with the separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Subsequently, starting at a time point t189, the processor reduces the proportion of the switching pattern c92 so as to. reduce the quantity of current supplied through the lower coils 3024g, and 3024h, so that the quantity of current is set to a normal drawing current at a time point t190. At this moment, the armatures 110 are sufficiently apart from the upper cores 116. Therefore, although the currents through the lower coils 3024g, and 3024h are set to the normal drawing current, the armatures 110 are not returned to the upper cores 116 by the magnetic forces from the upper magnets 116d. Afterwards, due to the drawing currents and the forces from the upper springs 120, the armatures 110 rapidly move away from the upper cores 116, and contact the lower cores 118 by overcoming the forces from the lower springs 106.

Starting at a time point t191 after the armatures 110 come into contact with the lower cores 118, the processor further reduces the proportion of the switching pattern c92 to reduce the quantity of current flowing through the lower coils 3024g, and 3024h in the forward direction. Then, at a time point t192, the quantity of current is set to the level of the holding current, so that the contact between the armatures 110 and the lower cores 118 is maintained. Thus, the intake ports of the fourth cylinder are set to the open state.

Subsequently, at a time point t193 near or at a timing at which the intake stroke of the fourth cylinder comes to an end, the switching pattern is changed to a switching pattern 192 indicated in FIG. 58L. In the switching pattern 192, the processor outputs the OFF signals to all the switching elements 2900–2924. Therefore, a regenerative current flows as indicated by a broken line arrow in FIG. 58L, so that the holding currents flowing through the lower coils 3024g, and 3024h rapidly discontinue.

After the armatures 110 lose the attraction forces toward the lower cores 118 as described above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t194, the processor changes the switching pattern to a switching pattern a92 indicated in FIG. 58A, in order to draw the armatures 110 into contact with the upper cores 116. As a result, the drawing currents flow through the upper coils 3022g, and 3022h. Afterwards, a drawing current is maintained by alternating the switching pattern a92 and a switching pattern e72 indicated in FIG. 58E or a switching pattern f92 indicated in FIG. 58F, until the armatures 110 contact the upper cores 116.

In the switching pattern a92, the processor outputs the ON signals to the switching elements 2910, and 2912, 2916, 2918, 2922, and 2924, and outputs the OFF signals to the other switching elements. As a result, currents flow from the high potential side terminal 2941a to the low potential side terminal 2941b as indicated by broken line allows in FIG. 58A, so that currents flow through the upper coils 3022g, and 3022h of the intake valves of the fourth cylinder in the forward direction.

In the switching pattern e92, the processor outputs the ON signals to the switching elements 2916,and 2918, and outputs the OFF signals to the other switching elements. Therefore, a current circulation path is formed through which current flows in a sequence of the upper coil 3022g and the switching elements 2918 and 2914. A current circulation path is formed through which current flows in a sequence of the upper coil 3022h and the switching elements 2920 and 2916. Immediately after the switching pattern a92 is changed to the switching pattern e92, flywheel currents flow through the circulation paths as indicated by broken line arrows in FIG. 58E.

In the switching pattern f92, the processor outputs the ON signals to the switching elements 2910, and 2912, and outputs the OFF signals to the other switching elements. Therefore, a current circulation path is formed through which current flows in a sequence of the upper coil 3022g, the diode 2928, the upper coil 3022h, and the switching elements 2920, 2910 and 2912. Immediately after the switching pattern a92 is changed to the switching pattern f92, a flywheel current flows through the circulation path as indicated by a broken line arrow in FIG. 58F.

Therefore, by adjusting the proportion between the switching pattern a92 and the switching pattern e92 or the switching pattern f92, the quantity of current flowing through the upper coils 3022g, and 3022h in the forward direction can be adjusted.

Figure 58K:
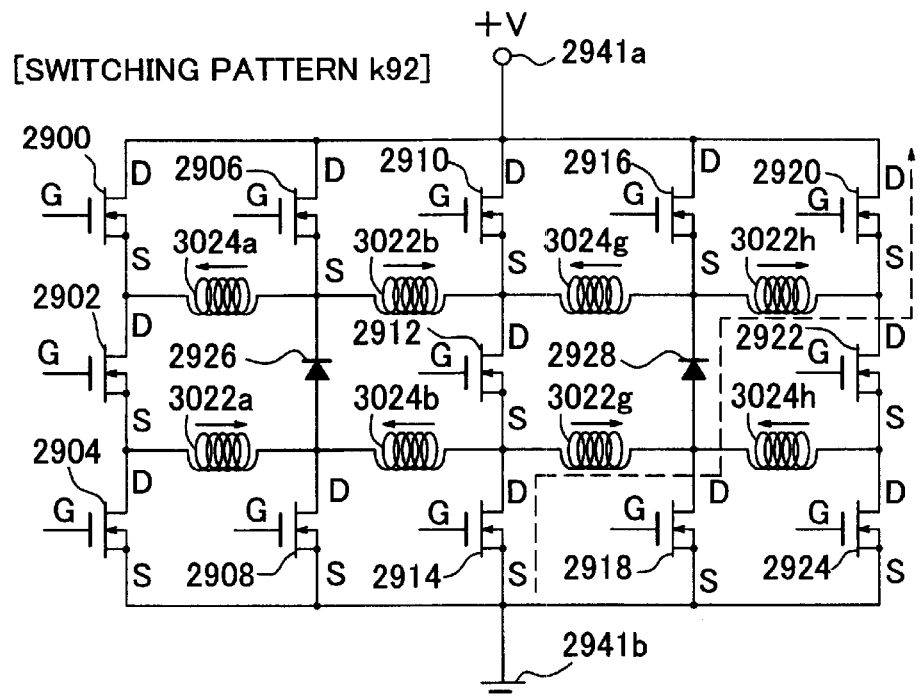
Figure 58L:
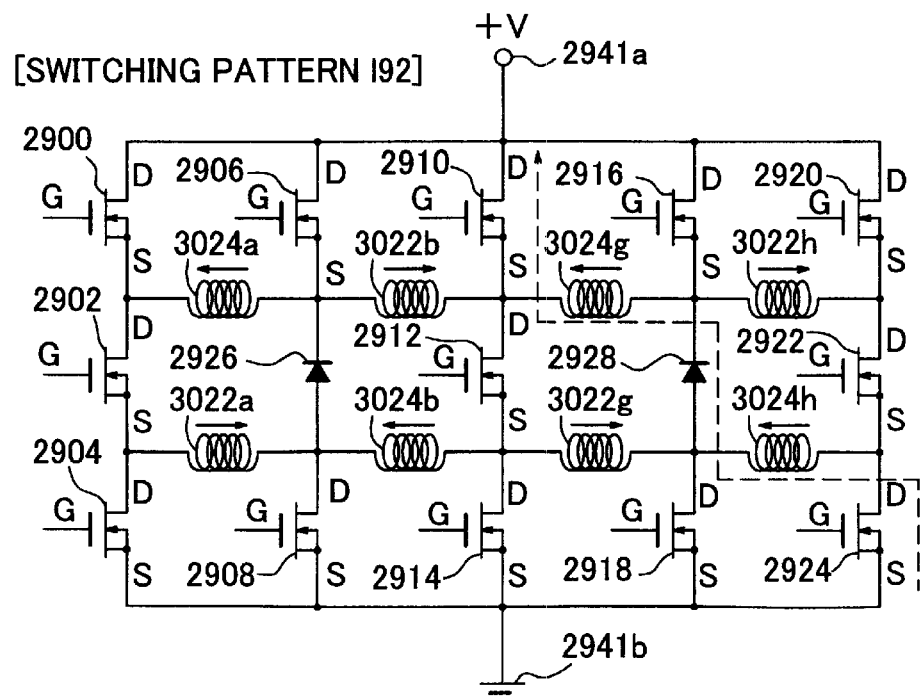

At a time point t195 after the armatures 110 come into contact with the upper cores 116, the switching pattern is changed to a switching pattern k92 indicated in FIG. 58K. In the switching pattern k92, the processor outputs the OFF signals to all the switching elements 2900–2924. Therefore, a regenerative current occurs as indicated by a broken line arrow in FIG. 58K, so that the drawing currents flowing through the upper coils 3022g, and 3022h rapidly discontinue. After the drawing currents discontinue, the contact between the armatures 110 and the upper cores 116 is maintained by the magnetic attraction forces from the upper magnets 116d. In this manner, the intake ports of the fourth cylinder are set to the completely closed state.

The four intake valves of the first cylinder and the fourth cylinder are opened and closed in the above-described fashion.

From the foregoing description, it should be understood that the switching elements 2900–2914 and the diode 2926 used to conduct current to drive the upper coils 3022a, and 3022b as indicated in FIGS. 57A, 57E, 57F and 57K are the same as the switching elements 2900–2914 and the diode 2926 used to conduct current to drive the lower coils 3024a, and 3024b as indicated in FIGS. 57C, 57G, 57H and 57L. These elements are shared by the upper coils 3022a, 3022b and the lower coils 3024a, and 3024b.

Furthermore, it should be understood that the switching elements 2910–2924 and the diode 2928 caused to conduct current to drive the upper coils 3022g, and 3022h as indicated in FIGS. 58A, 58E, 58F and 58K are the same as the switching elements 2910–2924 and the diodes 2928 used to conduct current to drive the lower coils 3024g, and 3024h as indicated in FIGS. 58C, 58G, 58H and 58L. These elements are shared by the upper coils 3022g, and 3022h and the lower coils 3024g, and 3024h.

Still further, through comparison between the switching elements 2900–2914 and the diode 2926 used to conduct current to drive the upper coils 3022a, and 3022b and the lower coils 3024a, and 3024b of the two intake valves of the first cylinder as indicated in FIGS. 57A to 57L and the switching elements 2910–2924 and the diode 2928 caused to conduct current to drive the upper coils 3022g, 3022h and the lower coils 3024g, and 3024h of the two intake valves of the fourth cylinder as indicated in FIGS. 58A to 58L, it should be understood that the switching elements 2910–2914 are shared.

The other drive circuits 2992b, 2992c, and 2992d drive combinations of valves as shown in FIG. 16. Therefore, all the valves can be opened and closed. In the drive circuits 2992b, 2992c, and 2992d, the sharing of switching elements is achieved as in the case of the drive circuit 2992a.

Therefore, the drive circuit portion, equipped with the four drive circuits 2992a–2992d, is able to drive a total of 16 valves of the 4 cylinders, or, the 8 intake valves and the 8 exhaust valves, in combinations as shown in FIG. 16.

Embodiments of the present invention, employ the 13 switching elements 2900–2924 and the two diodes 2926, and 2928, to drive the intake and exhaust valves configured in the same manner as those in previous embodiments. Thus, the present embodiment reduces the number of switching elements by two from the number in previous embodiment, and allows the use of less expensive diodes 2926, and 2928.

Therefore, embodiment of the present invention reduce the number of switching elements employed, and allow further reductions in size and cost of the drive circuit portion for the intake and exhaust valves formed as electromagnetic valves.

The number of electrically conductive wires is reduced, so that the thickness of a wire harness disposed in a vehicle can be reduced, thus contributing to size and weight reductions of the vehicle.

Figure 59:
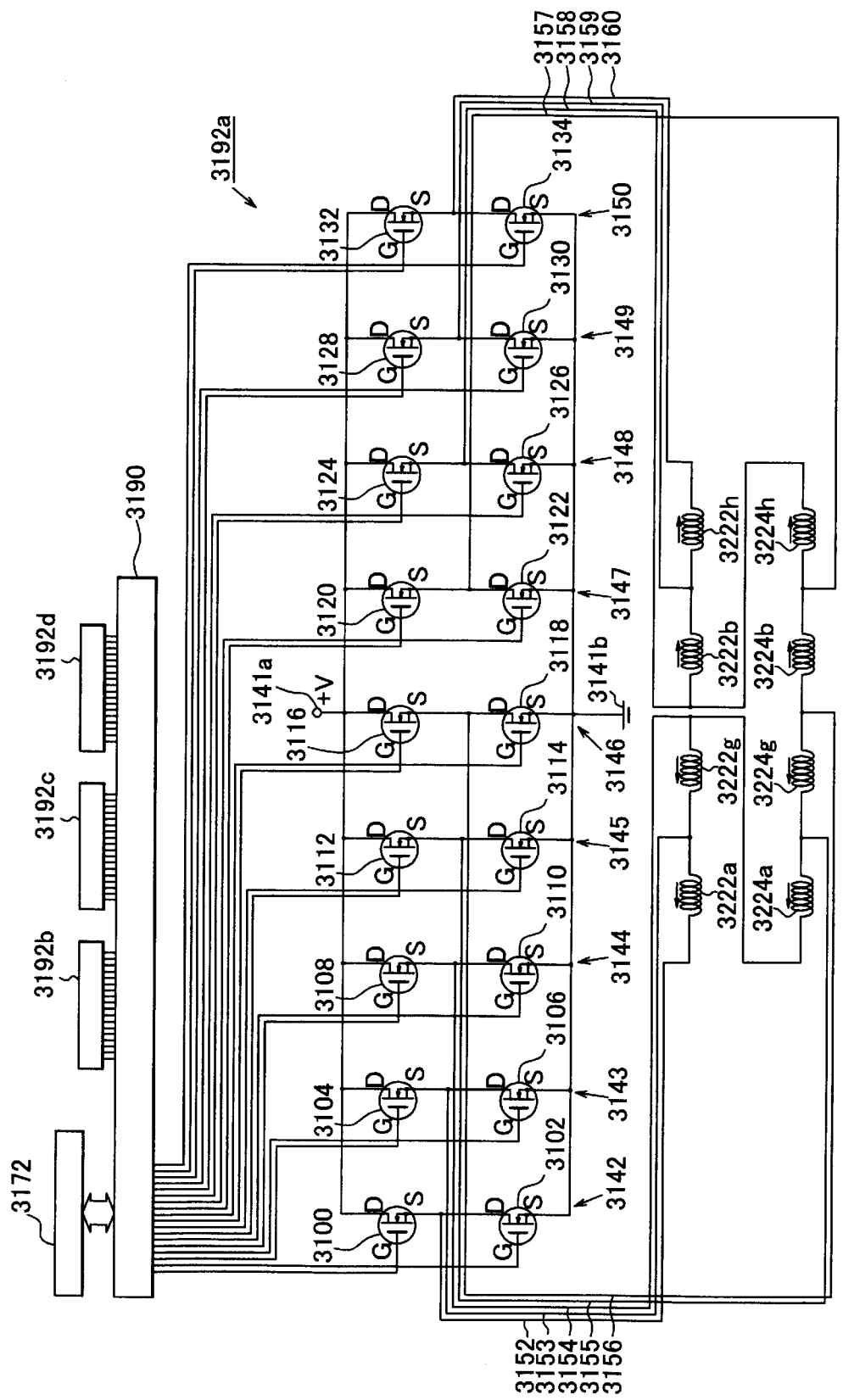
FIG. 59 is a diagram illustrating a construction of a drive circuit according to another embodiment of the present invention.

The embodiment depicted in FIG. 59 differs from previous embodiments in employ in, drive circuits 3192a, 3192b, and 3192*c*, instead of the drive circuits 92*a*–92*d*. The drive circuits 3192*a*, 3192*b*, 3192*c*, and 3192*d* are two-switching element in-series type drive circuits. Other configuration of the present embodiment is substantially similar as those of previous embodiments, unless otherwise noted.

The drive circuit 3192*a* is provided with 18 FETs as switching elements 3100, 3102, 3104, 3106, 3108, 3110, 3112, 3114, 3116, 3118, 3120, 3122, 3124, 3126, 3128, 3130, 3132, and 3134. Of the switching elements, two switching elements 3100, and 3102 are connected in series, and are disposed between a high potential side terminal 3141*a* and a low potential side terminal 3141*b*. Similarly, every two of the switching elements 3104–3134 are connected in series so as to form series circuits 3143, 3144, 3145, 3146, 3147, 3148, 3149, and 3150 disposed between the high potential side terminal 3141*a* and the low potential side terminal 3141*b*. Thus, the nine series circuits 3142–3150 are connected in parallel between the high potential side terminal 3141*a* and the low potential side terminal 3141*b*.

In the series circuit 3142, a series connecting portion between the switching element 3100 and the switching element 3102 is connected with an end of an electrically conductive wire 3152. Similarly, in each of the series circuits 3143–3150, a series connecting portion between the two switching elements 3104–3134 is connected with an end of an electrically conductive wire 3153, 3154, 3155, 3156, 3157, 3158, 3159, and 3160.

Of these wires, the conductive wire 3152 is connected to an end of an upper coil 3222*a* incorporated in a first intake valve of a first cylinder. The conductive wire 3153 is connected to the other end of the upper coil 3222*a* and to an end of an upper coil 3222*g* incorporated in a first intake valve of a fourth cylinder. The conductive wire 3154 is connected to the other end of the upper coil 3222*g* and to an end of a lower coil 3224*a* incorporated in the first intake valve of the first cylinder. The conductive wire 3155 is connected to the other end of the lower coil 3224*a* and to an end of a lower coil 3224*g* incorporated in the first intake valve of the fourth cylinder. The conductive wire 3156 is connected to the other end of the lower coil 3224*g* and to an end of a lower coil 3224*b* incorporated in a second intake valve of the first cylinder. The conductive wire 3157 is connected to the other end of the lower coil 3224*b* and to an end of a lower coil 3224*h* incorporated in a second intake valve of the fourth cylinder. The conductive wire 3158 is connected to the other end of the lower coil 3224*h* and to an end of an upper coil 3222*b* incorporated in the second intake valve of the first cylinder. The conductive wire 3159 is connected to the other end of the upper coil 3222*b* and to an end of an upper coil 3222*h* incorporated in the second intake valve of the fourth cylinder. The conductive wire 3160 is connected to the other end of the upper coil 3222*h*.

Thus, among the electromagnetic coils 3222*a*, 3224*b*, 3222*b*, and 3224*b* provided in the two intake valves that perform identical operations on the first cylinder, only the upper coil 3222*a* is used to form an inter-series circuit connection between the series circuit 3142 and the series circuit 3143. Similarly, only the lower coil 3224*a* is used to form an inter-series circuit connection between the series circuit 3144 and the series circuit 3145. Similarly, only the lower coil 3224*b* is used to form an inter-series circuit connection between the series circuit 3146 and the series circuit 3147. Similarly, only the upper coil 3222*b* is used to form an inter-series circuit connection between the series circuit 3148 and the series circuit 3149.

Furthermore, among the electromagnetic coils 3222*g*, 3224*g*, 3222*h*, and 3224*h* provided in the two intake valves that perform identical operations on the fourth cylinder, whose open valve period does not overlap the open valve period of the first cylinder, only the upper coil 3222*g* is used to form an inter-series circuit connection between the series circuit 3143 and the series circuit 3144. Similarly, only the lower coil 3224*g* is used to form an inter-series circuit connection between the series circuit 3145 and the series circuit 3146. Similarly, only the lower coil 3224*h* is used to form an inter-series circuit connection between the series circuit 3147 and the series circuit 3148. Similarly, only the upper coil 3222*h* is used to form an inter-series circuit connection between the series circuit 3149 and the series circuit 3150.

Thus, in the drive circuit 3192*a*, the inter-series circuit connections accomplished only by the electromagnetic coils 3222*a*, 3224*a*, 3222*b*, and 3224*b* of the two intake valves of the first cylinder, and the inter-series circuit connections accomplished only by the electromagnetic coils 3222*g*, 3224*g*, 3222*h*, and 3224*h* of the two intake valves of the fourth cylinder are alternately disposed. In this manner, the drive circuit 3192*a* is provided collectively for a group of valves consisting of the those four valves.

In FIG. 59, solid line arrows shown together with the electromagnetic coils 3222*a*, 3224*a*, 3222*g*, 3224*g*, 3222*b*, 3224*b*, 3222*h*, and 3224*h* indicate "forward direction" as described above in conjunction with previous embodiments.

The opening and closing operations of the two intake valves of the first cylinder and the two intake valves of the fourth cylinder is caused by supply of control currents from the ECU. A timing chart depicted in FIG. 60 indicates the operations of the four intake-valves.

FIGS. 61A to 61H and FIGS. 62A to 62H are circuit diagrams indicating states of control performed on the drive circuit 3192*a* shown in FIG. 59 so as to realize the operations indicated in FIG. 60. In FIGS. 61A to 61H and 62A to 62H, the conductive wires 3152–3160 are omitted. Furthermore, in FIGS. 61A to 61H and 62A to 62H, broken line arrows and circles "□" indicate the same states as described above in conjunction with previous embodiments.

Before a time point t200 indicated in FIG. 60, the armatures 110 are brought into contact with the upper cores 116 as depicted in FIG. 10 by temporary excitation of the upper coils 3222*a*, 3222*b*, 3222*g*, and 3222*h*, and this contact state is maintained by the magnetic attraction forces of the upper magnets 116*d*. Therefore, the valve bodies 100 are in contact with the valve seats 126, or, the two intake valves of the first cylinder and the two intake valves of the fourth cylinder are in a completely closed state. The OFF signals are outputted to all the 18 switching elements 3100–3134.

Figure 61A:
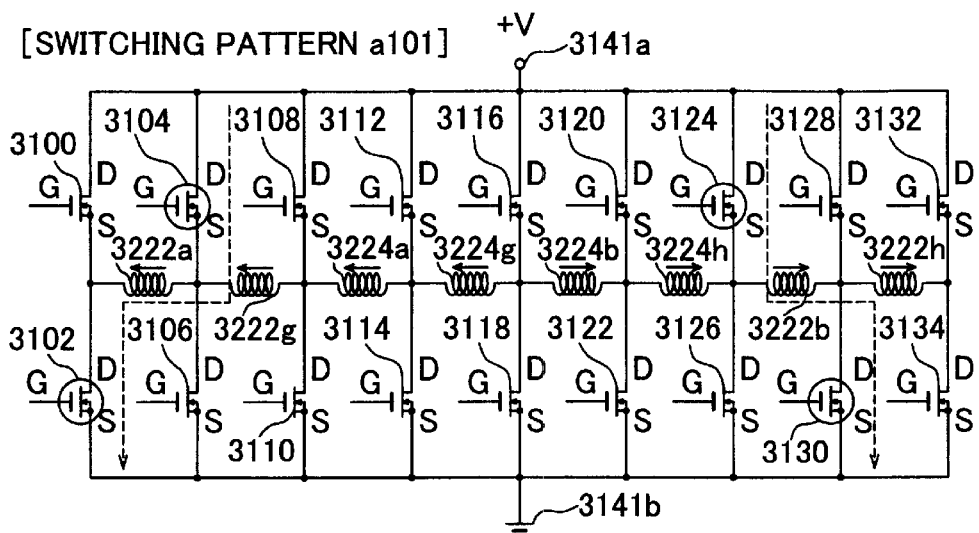
Figure 61B:
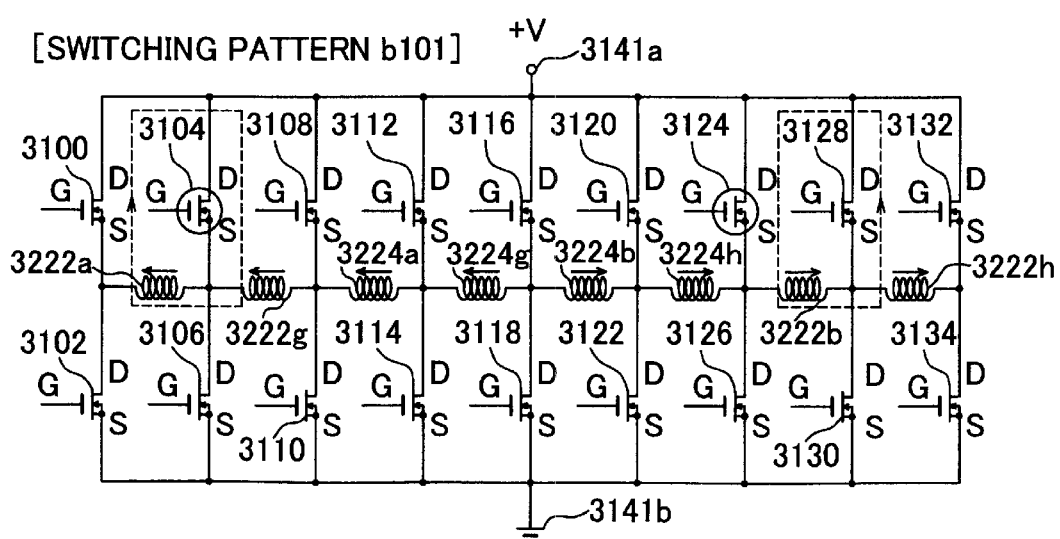
Figure 61C:
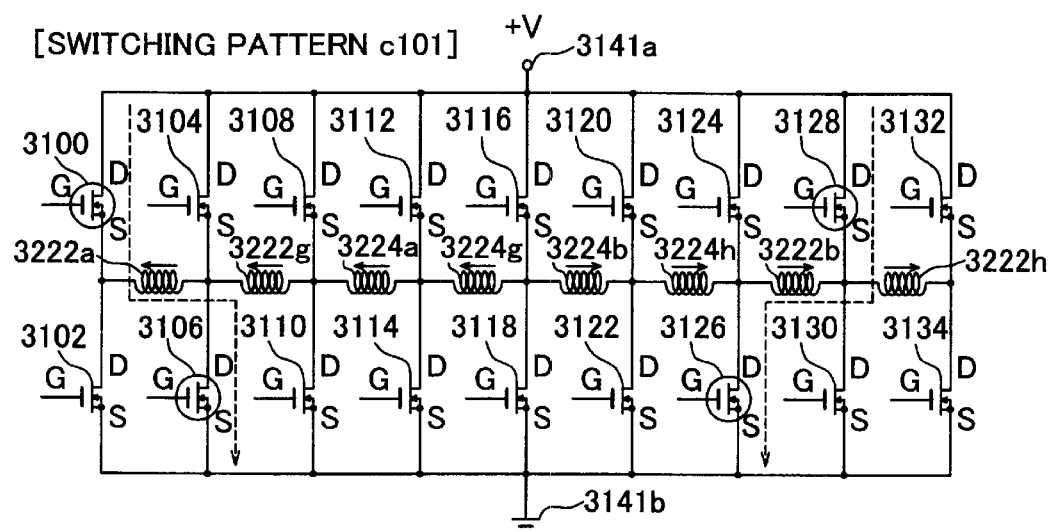

At the time of the intake stroke of the first cylinder, the processor outputs the ON signals to the switching elements 3100, 3106, 3126, and 3128 and outputs the OFF signals to the other switching elements during a time period of t200–t201 to establish a switching pattern c101 indicated in FIG. 61C. As a result, currents flow from the high potential side terminal 3141*a* to the low potential side terminal 3141*b* as indicated by broken line arrows in FIG. 61C, so that releasing currents flow through the upper coils 3222*a*, and 3222*b* in a reverse direction so as to cancel out the magnetic fluxes from the upper magnets 116*d*.

Figure 61D:
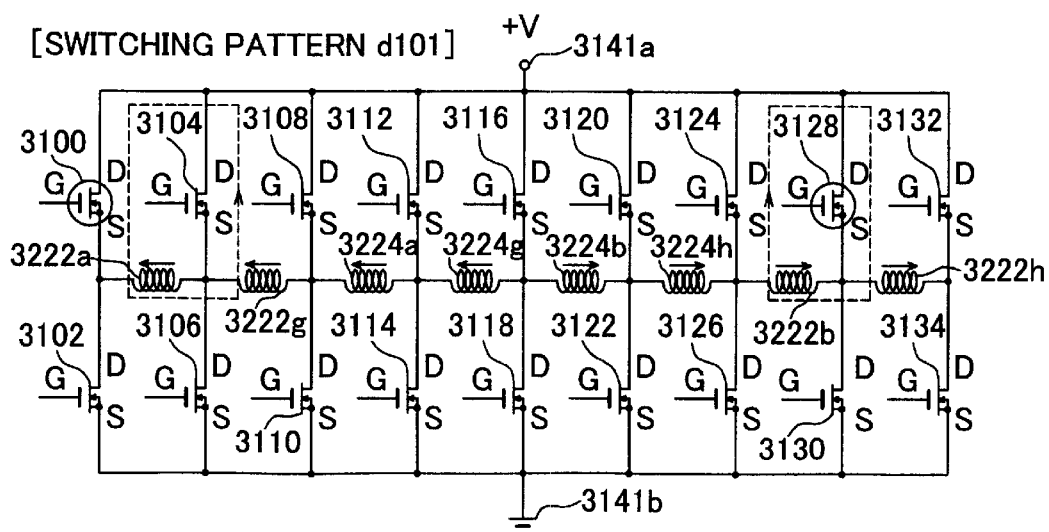

In order to adjust the quantity of current through the upper coils 3222*a*, and 3222*b* during the time period t200–t201, it is possible to execute a process of alternating the switching pattern c101 and a switching pattern d101 indicated in FIG. 61D at an appropriate proportion. In the switching pattern d101, the processor outputs the ON signals to the switching elements 3110, and 3128, and outputs the OFF signals to the other switching elements. Therefore, a current circulation path is formed through which current flows in a sequence of the upper coil 3222a and the switching elements 3104 and 3100. A current circulation path is formed through which current flows in a sequence of the upper coil 3222b and the switching elements 3124 and 3128. Immediately after the switching pattern c101 is changed to the switching pattern d101, flywheel currents flow through the circulation paths as indicated by broken line arrows in FIG. 61D. Therefore, by adjusting the proportion between the switching pattern c101 and the switching pattern d101, the quantity of current flowing through the upper coils 3222a, and 3222b in the reverse direction can be adjusted.

Due to the releasing currents flowing through the upper coils 3222a, and 3222b, the magnetic attraction forces produced on the armatures 110 by the upper cores 116 are cancelled out. As a result, the armatures 110 start to move toward the lower cores 118, or, toward a fully open state, due to the forces from the upper springs 120. Hence, the valve bodies 100 start to move apart from the valve seats 126, and the amount of valve lift starts to increase.

Afterwards, at the time point t201, the processor temporarily outputs the ON signals to the switching elements 3102, 3104, 3124, and 3130, and outputs the OFF signals to the other switching elements to set a switching pattern a101 indicated in FIG. 61A. Therefore, the releasing currents through the upper coils 3222a, and 3222b become regenerative currents flowing through the upper coils 3222a, and 3222b in the direction opposite to the direction indicated by broken line arrows in FIG. 61A, and therefore rapidly discontinue. After that, the processor immediately outputs the OFF signals to all the switching elements 3100–3134 to maintain the current discontinued state.

At the time point t201 when the releasing currents through the upper coils 3222a, and 3222b discontinue, the armatures 110 are sufficiently apart from the upper cores 116, so that the armatures 110 are not returned to the upper cores 116 by the magnetic forces from the upper magnets 116d. After that, the armatures 110 are gradually moved away from the upper cores 116 toward the lower cores 118 by the forces from the upper springs 120.

Subsequently at a time point t202, the processor outputs the ON signals to the switching elements 3110, 3112, 3116, and 3122, and outputs the OFF signals to the other switching elements so as to set a switching pattern e101 indicated in FIG. 61E. Therefore, currents flow from the high potential side terminal 3141a to the low potential side terminal 3141b as indicated by broken line arrows in FIG. 61E, so that currents flow through the lower coils 3224a, and 3224b of the two intake valves of the first cylinder in the forward direction. Then, until a time point t203, the switching pattern e101 and a switching pattern f101 indicated in FIG. 61F are alternated, so as to maintain the drawing currents for magnetically drawing the armatures 110 to the lower cores 118. Therefore, when approaching the lower cores 118, the armatures 110 come into contact with the lower cores 118 by overcoming the forces from the lower springs 106.

In the switching pattern f101, the processor outputs the ON signals to the switching elements 3112, and 3116, and outputs the OFF signals to the other switching elements. Therefore, a current circulation path is formed through which current flows in a sequence of the lower coil 3224a and the switching elements 3108 and 3112. A current circulation path is formed through which current flows in a sequence of the lower coil 3224b and the switching elements 3120 and 3116. Immediately after the switching pattern e101 is changed to the switching pattern f101, flywheel currents flow through the circulation paths as indicated by broken line arrows in FIG. 61F. Therefore, by adjusting the proportion between the switching pattern e101 and the switching pattern f101, the quantity of current flowing through the lower coils 3224a, and 3224b in the forward direction can be adjusted.

Figure 61G:
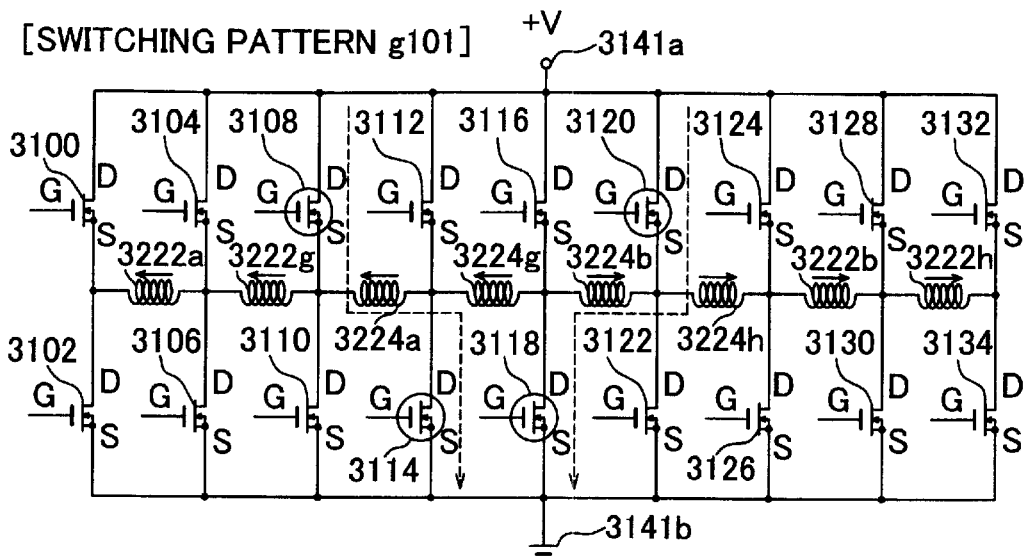

At a time point t203 after the armatures 110 come into contact with the lower cores 118, the processor temporarily sets a switching pattern g101 indicated in FIG. 61G. In the switching pattern g101, the processor outputs the ON signals to the switching elements 3108, 3114, 3118, and 3120, and outputs the OFF signals to the other switching elements. Therefore, regenerative currents flow in the direction opposite to the direction indicated by broke line arrows in FIG. 61G, so that the drawing currents through the lower coils 3224a, and 3224b rapidly decrease. Afterwards, the processor immediately resumes a state of alternation between the switching pattern e101 and the switching pattern f101. In this case, however, the proportion of the switching pattern e101 is reduced, in comparison with the pattern alternating state during the time period t202–t203. In this manner, the quantity of current flowing through the lower coils 3224a, and 3224b in the forward direction is kept at the holding current for maintaining the contact between the armatures 110 and the lower cores 118.

While the armatures 110 are held in contact with the lower cores 118 by the magnetic forces created by continuously supplying the holding currents through the lower coils 3224a, and 3224b, the valve bodies 100 are farthest from the valve seats 126 as indicated in FIG. 11. Thus, the intake ports of the first cylinder remain in the open state.

Subsequently, at a time point t204 near or at a timing at which the intake stroke of the first cylinder comes to an end, the switching pattern is changed to the switching pattern g101 indicated in FIG. 61G. Therefore, regenerative currents flow in the direction opposite to the direction indicated by the broken line arrows in FIG. 61G, so that the holding currents through the lower coils 3224a, and 3224b rapidly discontinue, and then the releasing currents flow in the direction indicated by the broken line arrows.

Figure 61H:
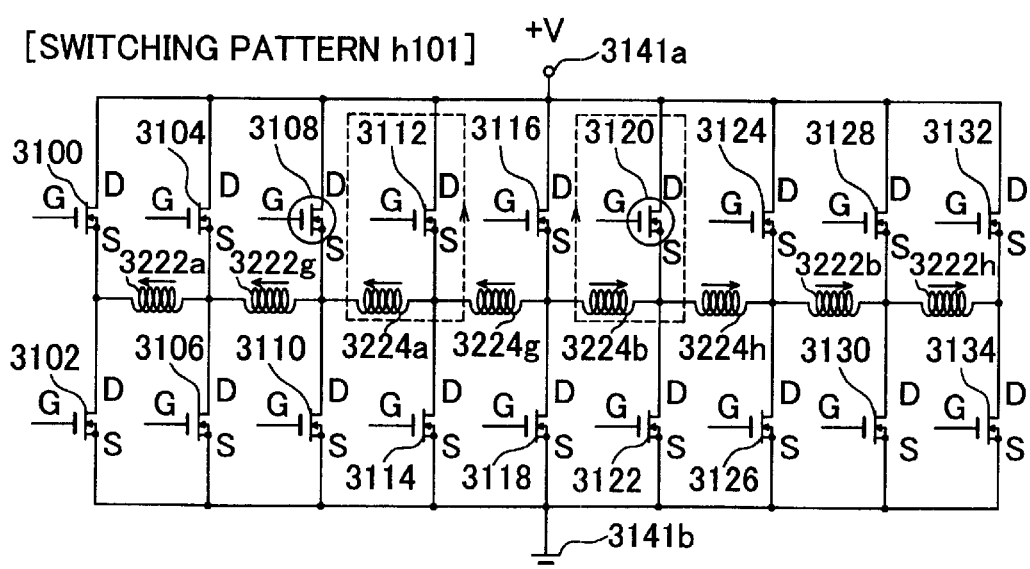

In order to adjust the quantity of releasing current through the lower coils 3224a, and 3224b, it is possible to execute a process of alternating the switching pattern g101 and a switching pattern h101 indicated in FIG. 61H at an appropriate proportion. In the switching pattern h101, the processor outputs the ON signals to only the switching elements 3108, and 3120, and outputs the OFF signals to the other switching elements. Therefore, a current circulation path is formed through which current flows in a sequence of the lower coil 3224a and the switching elements 3112 and 3108. A current circulation path is formed through which current flows in a sequence of the lower coil 3224b and the switching elements 3116 and 3120. Immediately after the switching pattern g101 is changed to the switching pattern h101, flywheel currents flow through the circulation paths as indicated by broken line arrows in FIG. 61H. Therefore, by adjusting the proportion between the switching pattern g101 and the switching pattern h101, the quantity of current flowing through the lower coils 3224a, and 3224b in the reverse direction can be adjusted.

Subsequently, at a time point t205, the switching pattern is changed to the switching pattern e101. Therefore, regenerative currents flow in the direction opposite to the direction indicated by broken line arrows in FIG. 61E, so that the releasing currents through the lower coils 3224a, and 3224b rapidly discontinue. Afterwards, the processor immediately outputs the OFF signals to all the switching elements 3100–3134 to maintain the current discontinued state.

Due to the releasing currents through the lower coils 3224a, and 3224b and the subsequent discontinuation of current, the armatures 110 lose the attraction forces toward the lower cores 118. The armatures 110 then start to move toward the upper cores 116, or, toward the completely closed state, due to the forces from the lower springs 106. Thus, the valve bodies 100 approach the valve seats 126, and the amount of valve lift starts to decrease.

Subsequently at a time point t206, the processor changes the switching pattern to the switching pattern a101 indicated in FIG. 61A, in order to draw the armatures 110 into contact with the upper cores 116. As a result, the drawing currents flow through the upper coils 3222a, and 3222b as indicated by the broken line arrows. Afterwards, a drawing current is maintained by alternating the switching pattern a101 and a switching pattern b101 indicated in FIG. 61B, until the armatures 110 contact the upper cores 116.

In the switching pattern b101, the processor outputs the ON signals to the switching elements 3104, and 3124, and outputs the OFF signals to the other switching elements. Therefore, a current circulation path is formed through which current flows in a sequence of the upper coil 3222a and the switching elements 3100 and 3104. A current circulation path is formed through which current flows in a sequence of the upper coil 3222b and the switching elements 3128 and 3124 is formed. Immediately after the switching pattern a101 is changed to the switching pattern b101, flywheel currents flow through these circulation paths as indicated by broken line arrows in FIG. 61B. Therefore, by adjusting the proportion between the switching pattern a101 and the switching pattern b101, the quantity of current flowing through the upper coils 3222a, and 3222b in the forward direction can be adjusted.

At a time point t207 after the armatures 110 come into contact with the upper cores 116 and therefore the two intake valves of the first cylinder become closed as depicted in FIG. 10, the processor temporarily changes the switching pattern to the switching pattern c101 indicated in FIG. 61C. Therefore, regenerative currents flow in the direction opposite to the direction indicated by the broken line arrows in FIG. 61C, so that the drawing currents through the upper coils 3222a, and 3222b rapidly discontinue. After that, the processor immediately outputs the OFF signals to all the switching elements 3100–3134 to maintain the current discontinued state.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore the two intake valves of the first cylinder are kept in the completely closed state.

After the state where the OFF signals are outputted to all the switching elements 3100–3134, a timing point comes point occurs at the intake stroke of the fourth cylinder occurs. The intake stroke of the fourth cylinder does not overlap the intake stroke of the first cylinder. In this case, during a time period of t208–t209, the processor outputs the ON signals to the switching elements 3104, 3110, 3130, and 3132 and outputs the OFF signals to the other switching elements so set a switching pattern c102 indicated in FIG. 62C. Therefore, currents flow from the high potential side terminal 3141a to the low potential side terminal 3141b as indicated by broken line arrows in FIG. 62C, so that reverse-direction releasing currents flow through the upper coils 3222g, and 3222h of the two intake valves of the fourth cylinder so as to cancel out the magnetic fluxes from the upper magnets 116d.

Figure 62A:
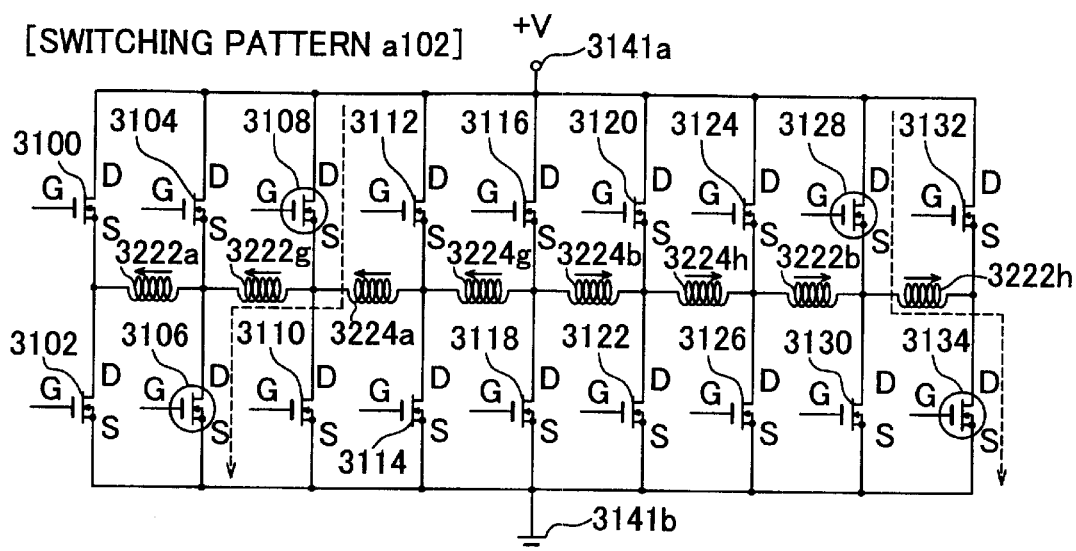
FIGS. 62A to 62H are circuit diagrams for illustrating the control of current according to the embodiment of FIG. 59.
Figure 62B:
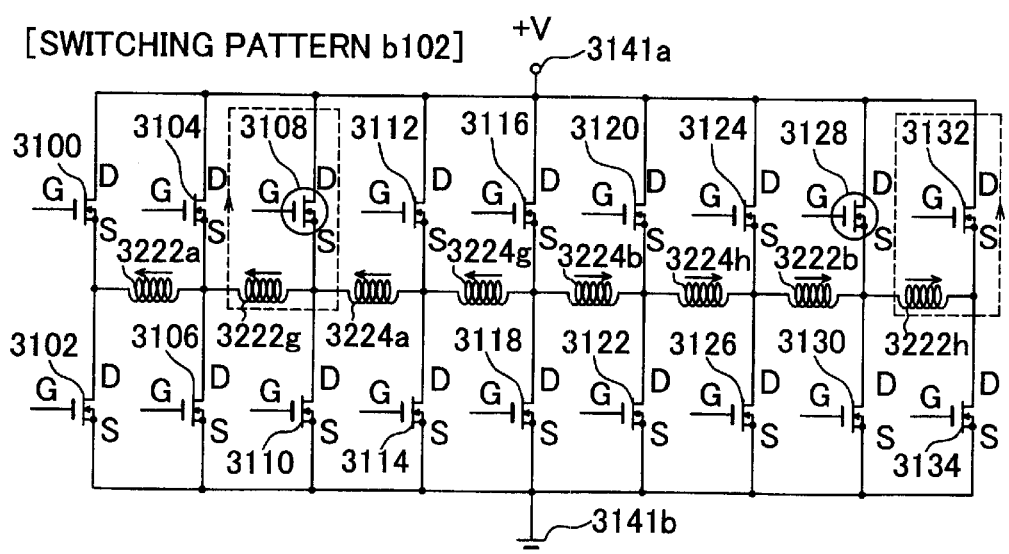
Figure 62C:
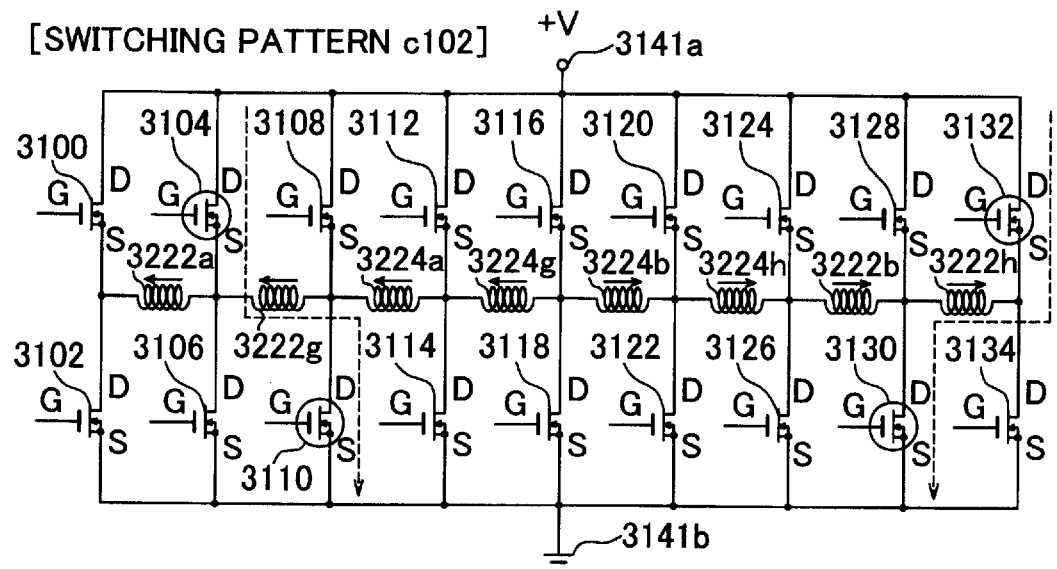
Figure 62D:
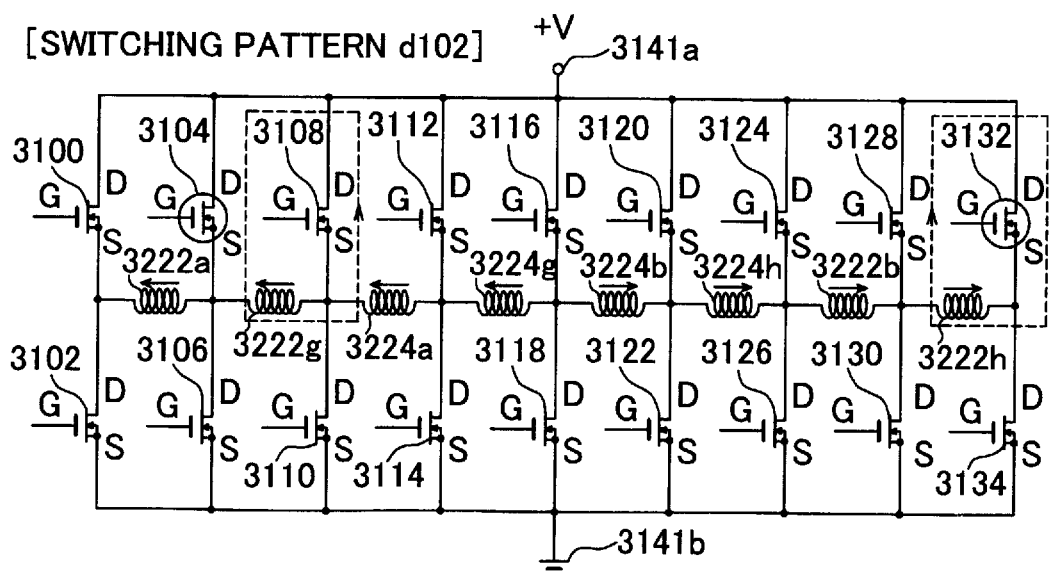

In order to adjust the quantity of current through the upper coils 3222g, and 3222h during the time period t208–t209, it is possible to execute a process of alternating the switching pattern c102 and a switching pattern d102 indicated in FIG. 62D at an appropriate proportion. In the switching pattern d102, the processor outputs the ON signals to the switching elements 3104, and 3132, and outputs the OFF signals to the other switching elements. Therefore, a current circulation path is formed through which current flows in a sequence of the upper coil 3222g and the switching elements 3108 and 3104. A current circulation path is formed through which current flows in a sequence of the upper coil 3222h and the switching elements 3128 and 3132. Immediately after the switching pattern c102 is changed to the switching pattern d102, flywheel currents flow through the circulation paths as indicated by broken line arrows in FIG. 62D. Therefore, by adjusting the proportion between the switching pattern c102 and the switching pattern d102, the quantity of current flowing through the upper coils 3222g, and 3222h in the reverse direction can be adjusted.

Due to the releasing currents supplied through the upper coils 3222g, and 3222h in the above-described manner, the magnetic attraction forces produced on the armatures 110 by the upper cores 116 are cancelled out. As a result, the armatures 110 start to move toward the lower cores 118, or, toward the fully open state, due to the forces from the upper springs 120. Thus, the valve bodies 100 start to move apart from the valve seat 126, and the amount of valve lift starts to increase.

After that, at the time point t209, the processor outputs the ON signals to the switching elements 3106, 3108, 3128, and 3134 and outputs the OFF signals to the other switching elements so as to set a switching pattern a102 indicated in FIG. 62A. Therefore, the releasing currents through the upper coils 3222g, and 322h become regenerative currents flowing in the direction opposite to the direction indicated by broken line arrows in FIG. 62A, and therefore rapidly discontinue. After that, the processor immediately outputs the OFF signals to all the switching elements 3100–3134 to maintain the current discontinued state.

At the time point t209 when the releasing currents through the upper coils 3222g, and 3222h discontinue, the armatures 110 are sufficiently apart from the upper cores 116, so that the armatures 110 are not returned to the upper cores 116 by the magnetic forces from the upper magnets 116d. Afterwards, the armatures 110 are gradually moved away from the upper cores 116 toward the lower cores 118 by the forces from the upper springs 120.

Figure 62E:
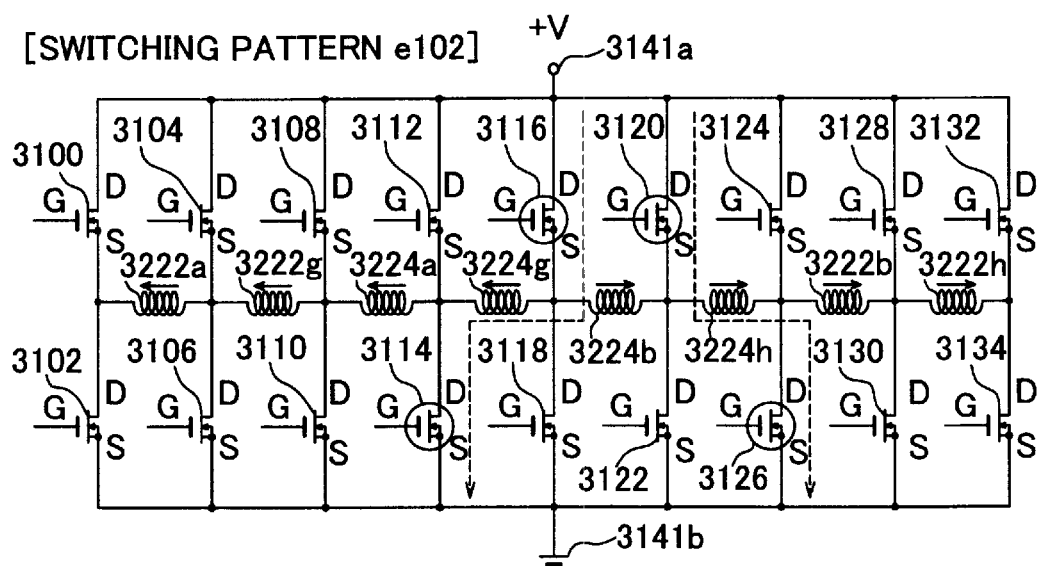
Figure 62F:
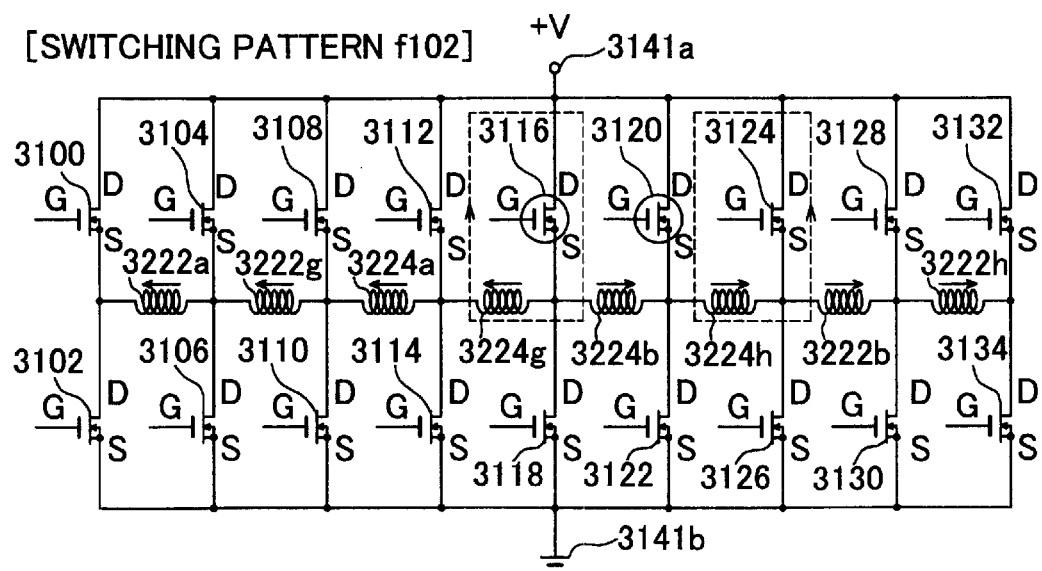

Subsequently at a time point t210, the processor outputs the ON signals to the switching elements 3114, 3116, 3120, and 3126, and outputs the OFF signals to the other switching elements to set a switching pattern e102 indicated in FIG. 62E. Therefore, currents flow from the high potential side terminal 3141a to the low potential side terminal 3141b as indicated by broken line arrows in FIG. 62E, so that currents flow through the lower coils 3224g, and 3224h of the two intake valves of the fourth cylinder in the forward direction. Then, until a time point t211, the switching pattern e102 and a switching pattern f102 indicated in FIG. 62F are alternated so as to maintain the drawing currents for magnetically drawing the armatures 110 into contact with the lower cores 118. Therefore, when approaching the lower cores 118, the armatures 110 come into contact with the lower cores 118 by overcoming the forces from the lower springs 106.

In the switching pattern f102, the processor outputs the ON signals to only the switching elements 3116, and 3120, and outputs the OFF signals to the other switching elements. Therefore, a current circulation path is formed through which current flows in a sequence of the lower coil 3224g and the switching elements 3112 and 3116. A current circulation path is formed through which current flows in a sequence of the lower coil 3224h and the switching elements 3124 and 3120. Immediately after the switching pattern e102 is changed to the switching pattern f102, flywheel currents flow through the circulation paths as indicated by broken line arrows in FIG. 62F. Therefore, by adjusting the proportion between the switching pattern e102 and the switching pattern f102, the quantity of current flowing through the lower coils 3224g, and 3224h in the forward direction can be adjusted.

Figure 62G:
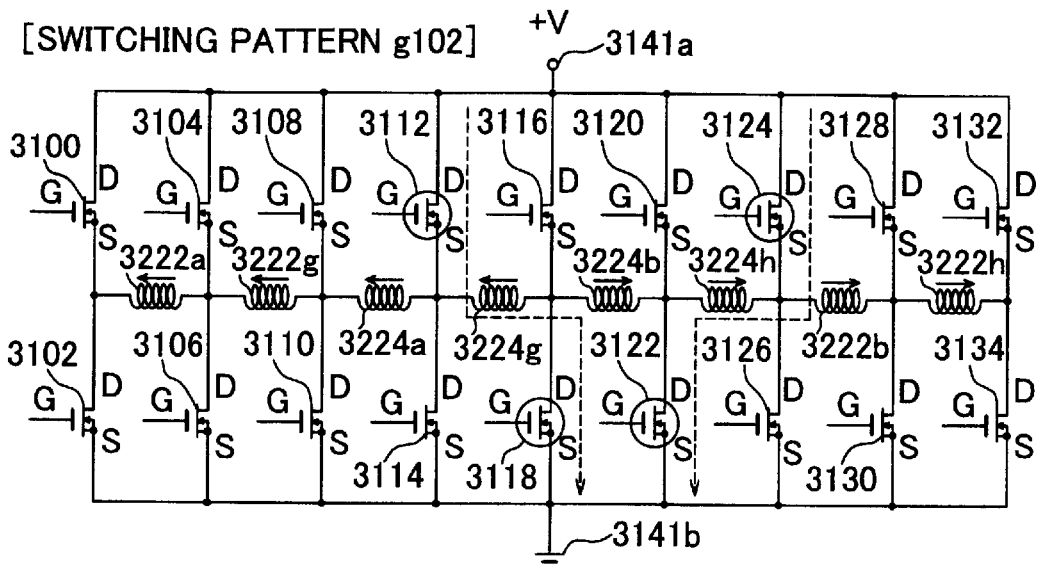

At a time point t211 after the armatures 110 come into contact with the lower cores 118, the processor temporarily sets a switching pattern g102 indicated in FIG. 62G. In the switching pattern g102, the processor outputs the ON signals to the switching elements 3112, 3118, and 3122, 3124, and outputs the OFF signals to the other switching elements. Therefore, regenerative currents flow in the direction opposite to the direction indicated by broken line arrows in FIG. 62G, so that the drawing currents through the lower coils 3224g, and 3224h rapidly decrease. After that, the processor immediately resumes a state of alternation between the switching pattern e102 and the switching pattern f102. In this case, however, the proportion of the switching pattern e102 is reduced, in comparison with the pattern alternating state during the time period t210–t211. In this manner, the quantity of current flowing through the lower coils 3224g, and 3224h in the forward direction is kept at the level of the holding current for maintaining the contact between the armatures 110 and the lower cores 118.

While the armatures 110 are held in contact with the lower cores 118 by continuously supplying the holding current through the lower coils 3224g, and 3224h in the above-described manner, the valve bodies 100 are farthest from the valve seats 126 as indicated in FIG. 11. Thus, the intake ports of the fourth cylinder remain in the fully open state.

Subsequently, at a time point t212 near or at a timing at which the intake stroke of the fourth cylinder comes to an end, the switching pattern is changed to the switching pattern g102 indicated in FIG. 62G. Therefore, regenerative currents flow in the direction opposite to the direction indicated by the broken line arrows in FIG. 62G, so that the holding currents through the lower coils 3224g, and 3224h rapidly discontinue. Then, the releasing currents flow through the lower coils 3224g, and 3224h in the direction indicated by the broken line arrows in FIG. 62G.

Figure 62H:
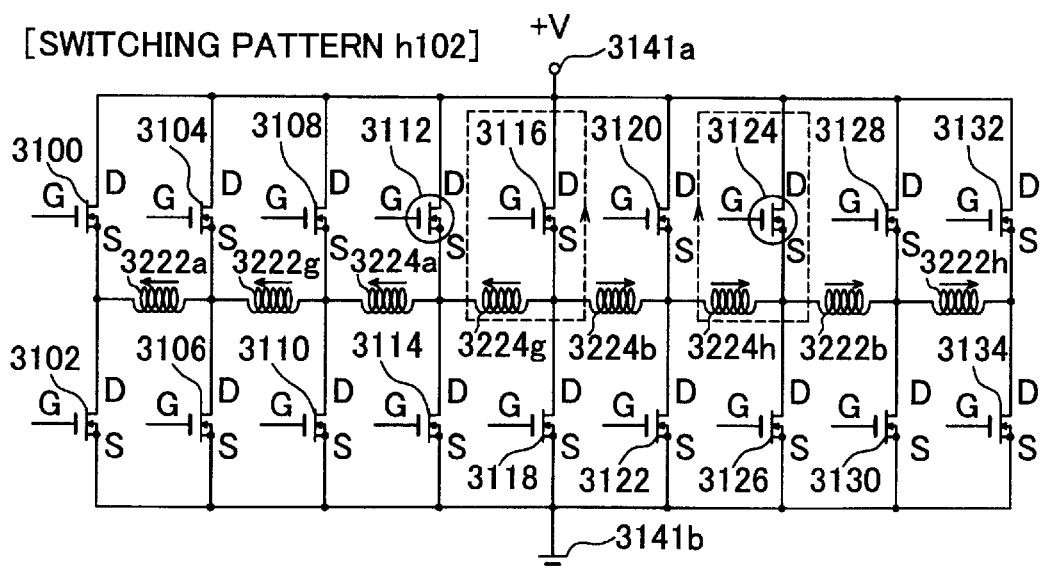

In order to adjust the quantity of releasing current through the lower coils 3224g, and 3224h, it is possible to execute a process of alternating the switching pattern g102 and a switching pattern h102 indicated in FIG. 62H at an appropriate proportion. In the switching pattern h102, the processor outputs the ON signals to only the switching elements 3112, and 3124, and outputs the OFF signals to the other switching elements. Therefore, a current circulation path is formed through which current flows in a sequence of the lower coil 3224g and the switching elements 3116 and 3112. A current circulation path is formed through which current flows in a sequence of the lower coil 3224h and the switching elements 3120 and 3124. Immediately after the switching pattern g102 is changed to the switching pattern h102, flywheel currents flow through the circulation paths as indicated by broken line arrows in FIG. 62G. Therefore, by adjusting the proportion between the switching pattern g102 and the switching pattern h102, the quantity of current flowing through the lower coils 3224g, and 3224h in the reverse direction can be adjusted.

Subsequently, at a time point t213, the processor temporarily sets the switching pattern e102. Therefore, regenerative currents flow in the direction opposite to the direction indicated by the broken line arrows in FIG. 62E, so that the releasing currents through the lower coils 3224g, and 3224h rapidly discontinue. Then, the processor immediately outputs the OFF signals to all the switching elements 3100–3134 to maintain the current discontinued state.

Due to the releasing currents through the lower coils 3224g, and 3224h and the subsequent discontinuation of current, the armatures 110 lose the attraction forces toward the lower cores 118, and start to move toward the upper cores 116, or, toward the completely closed state, due to the forces from the lower springs 106. Thus, the valve bodies 100 approach the valve seats 126, and the amount of valve lift starts to decrease.

Subsequently at a time point t214, the processor changes the switching pattern to the switching pattern a102 indicated in FIG. 62A in order to draw the armatures 110 into contact with the upper cores 116. As a result, the drawing currents flow through the upper coils 3222g, and 3222h as indicated by the broken line arrows in FIG. 62A. Afterwards, a drawing current is maintained by alternating the switching pattern a102 and a switching pattern b102 indicated in FIG. 62B, until the armatures 110 contact the upper cores 116.

In the switching pattern b102, the processor outputs the ON signal to the switching elements 3108, and 3128, and outputs the OFF signals to the other switching elements. Therefore, a current circulation path is formed through which current flows in a sequence of the upper coil 3222g and the switching elements 3104 and 3108. A current circulation path is formed through which current flows in a sequence of the upper coil 3222h and the switching elements 3132 and 3128. Immediately after the switching pattern a102 is changed to the switching pattern b102, flywheel currents flow through the circulation paths as indicated by broken line arrows in FIG. 62B. Therefore, by adjusting the proportion between the switching pattern a102 and the switching pattern b102, the quantity of current flowing through the upper coils 3222g, and 3222h in the forward direction can be adjusted.

At a time point t215 after the armatures 110 come into contact with the upper cores 116 and the two intake valves of the fourth cylinder become closed as shown in FIG. 10, the CPU temporarily changes the switching pattern to the switching pattern c102 indicated in FIG. 61C. Therefore, regenerative currents flow in the direction opposite to the direction indicated by the broken line arrows in FIG. 62C, so that the drawing currents through the upper coils 3222g, and 3222h rapidly discontinue. Then, the processor immediately outputs the OFF signals to all the switching elements 3100–3134 so as to maintain the current discontinued state.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the two intake valves of the fourth cylinder remain in the closed state.

By repeating the above-described operation, the four intake valves of the first cylinder and the fourth cylinder are opened and closed.

Through comparison between the switching elements 3100–3130 used to conduct current to drive the upper coils 3222a, and 3222b and the lower coils 3224a, and 3224b of the two intake valves of the first cylinder as indicated in FIGS. 61A to 61H and the switching elements 3104–3134 caused to conduct current to drive the upper coils 3222g, 3222h and the lower coils 3224g, and 3224h of the two intake valves of the fourth cylinder as indicated in FIGS. 62A to 62H, it should be understood that the switching elements 3104–3130 are shared.

The drive circuit 3192b in the drive circuit portion is provided collectively for a total of four exhaust valves of the first cylinder and the fourth cylinder. The drive circuit 3192b, having substantially the same circuit arrangement as that of the drive circuit 3192a, performs current-control of the upper and lower coils provided in the four exhaust valves, in a manner as described above. Thus, the drive circuit 3192b opens and closes the four exhaust valves of the first cylinder and the fourth cylinder at appropriate timing.

The drive circuit 3192c in the drive circuit portion is provided collectively for a total of four intake valves of the second cylinder and the third cylinder. The drive circuit 3192c, having substantially the same circuit arrangement as that of the drive circuit 3192a, performs current-control of the upper and lower coils provided in the four intake valves, in a manner as described above. Thus, the drive circuit 3192c opens and closes the four intake valves of the second cylinder and the third cylinder at appropriate timing.

The drive circuit 3192d in the drive circuit portion is provided collectively for a total of four exhaust valves of the second cylinder and the third cylinder. The drive circuit 3192d, having substantially the same circuit arrangement as that of the drive circuit 3192a, performs current-control of the upper and lower coils provided in the four exhaust valves, in a manner as described above. Thus, the drive circuit 3192d opens and closes the four exhaust valves of the second cylinder and the third cylinder at appropriate timing.

Therefore, the drive circuit portion, equipped with the four drive circuits 3192a–3192d, is able to drive a total of 16 valves of the four cylinders, or, the 8 intake valves and the 8 exhaust valves, in the combinations as depicted in FIG. 16 in conjunction with previous embodiments.

As described above, the drive circuit portion provided in the ECU includes the four drive circuits 3192a–3192d of two-switching element in-series type to perform current control on a total of 32 electromagnetic coils provided for the 16 intake and exhaust valves provided on the four-cylinder four-valve engine. Each of the drive circuits 3192a–3192d is provided collectively for a valve group consisting of four valves, or, the two valves that perform identical operations on a single cylinder and two more valves whose open period does not overlap the open period of the aforementioned two valves. More specifically, each drive circuit is provided collectively for a valve group consisting of four valves as depicted in FIG. 16.

The drive circuits 3192a–3192d each have a construction in which the nine series circuits 3142–3150 are connected in parallel between the high potential side terminal 3141a and the low potential side terminal 3141b. The inter-series circuit connections each established via the upper coils and the lower coils provided for the two valves that perform identical operations on the same cylinder and the inter-series circuit connections, each established via the upper coils and the lower coils provided for other two valves whose open period does not overlap the open period of the aforementioned two valves are alternately disposed.

Thus, the electromagnetic coils, upper coils and lower coils are driven by each drive circuit 3192a–3192d and include the electromagnetic coils used in the valves that perform identical operations and the electromagnetic coils of other valves whose open period does not overlap the open period of the aforementioned valves. Because the open periods of the valves driven by each drive circuit do not overlap, the switching 3104–3130 elements can be shared by the electromagnetic coils of each group of valves in the operation of opening the valves and maintaining the open state of the valves The closed periods of the valves of each group overlap each other. However, because the upper coils 116d are provided for maintaining the closed state of the valves without using electromagnetic force, there is no need to drive a switching element during the closed valve period. Therefore, the valve-closing electromagnetic coils need to be activated during the closing action of the valves. The closing action period of valves does not overlap the closing action period of other valves whose open period does not overlap the open period of the aforementioned valves. Therefore, the electromagnetic coils of each group of valves can share the switching elements 3104–3130 for closing the valves.

Therefore, the drive circuits 3192a–3192d are able to open and close the 16 valves through the use of a total of 72 switching elements. The aforementioned conventional three-switching pattern in-series type construction needs 72 switching elements.

For example, a two-switching element in-series circuit configuration different from the configuration of the embodiments of the present invention needs 80 switching elements as described below in Reference Example 1.

Thus, the drive circuits 3192a–3192d are able to supply current to and rapidly reduce or discontinue current through the electromagnetic coils that are currently needed among the upper coils and the lower coils of many valves, at appropriate timing, based on the switching actions of a small number of switching elements that are shared by the electromagnetic coils. In this manner, the drive circuits 3192a–3192d are able to control the quantities of current flowing Therefore, the two-switching element in-series type circuit configuration is able to further reduce the number of switching elements employed, and to reduce the size and cost of the drive circuit portion for the intake valves and the exhaust valves formed as electromagnetic valves.

The two electromagnetic coils of a single valve are connected separately between different pairs of series circuits. Thus, in comparison with previous embodiments, the present embodiment is able to reduce the number of switching elements provided in each current path for activating an electromagnetic coil. That is, the number of switching elements in each current path for activating an electromagnetic coil in previous embodiment is three, whereas the corresponding number of switching elements in present embodiment is two. Therefore, the present embodiment allows a reduction of the loss of supplied current.

The terminal portions of the electromagnetic coils 3222a–3224h are connected to the series connecting portions between the switching elements of the series circuits 3142–3150, each formed by connecting two switching elements in series. Therefore, in the switching control on the switching elements 3100–3134, a mode of supplying reverse currents through the electromagnetic coils 3222a–3224h can be realized as indicated in FIGS. 61C, 61G, 62C and 62G.

In the drive circuits 3192a–3192d, the upper coils and the lower coil of the 16 valves in total are connected via the 36 electrically conductive wires for the above-described control, as depicted in FIG. 58. In contrast, the two-switching pattern in-series type configuration described below in Reference Example 1 employs 40 electrically conductive wires. Therefore, embodiments of the present invention also allow a reduction in the thickness of a wire harness disposed in a vehicle, and, therefore, contribute to reductions of the vehicle in size and weight.

Figure 63:
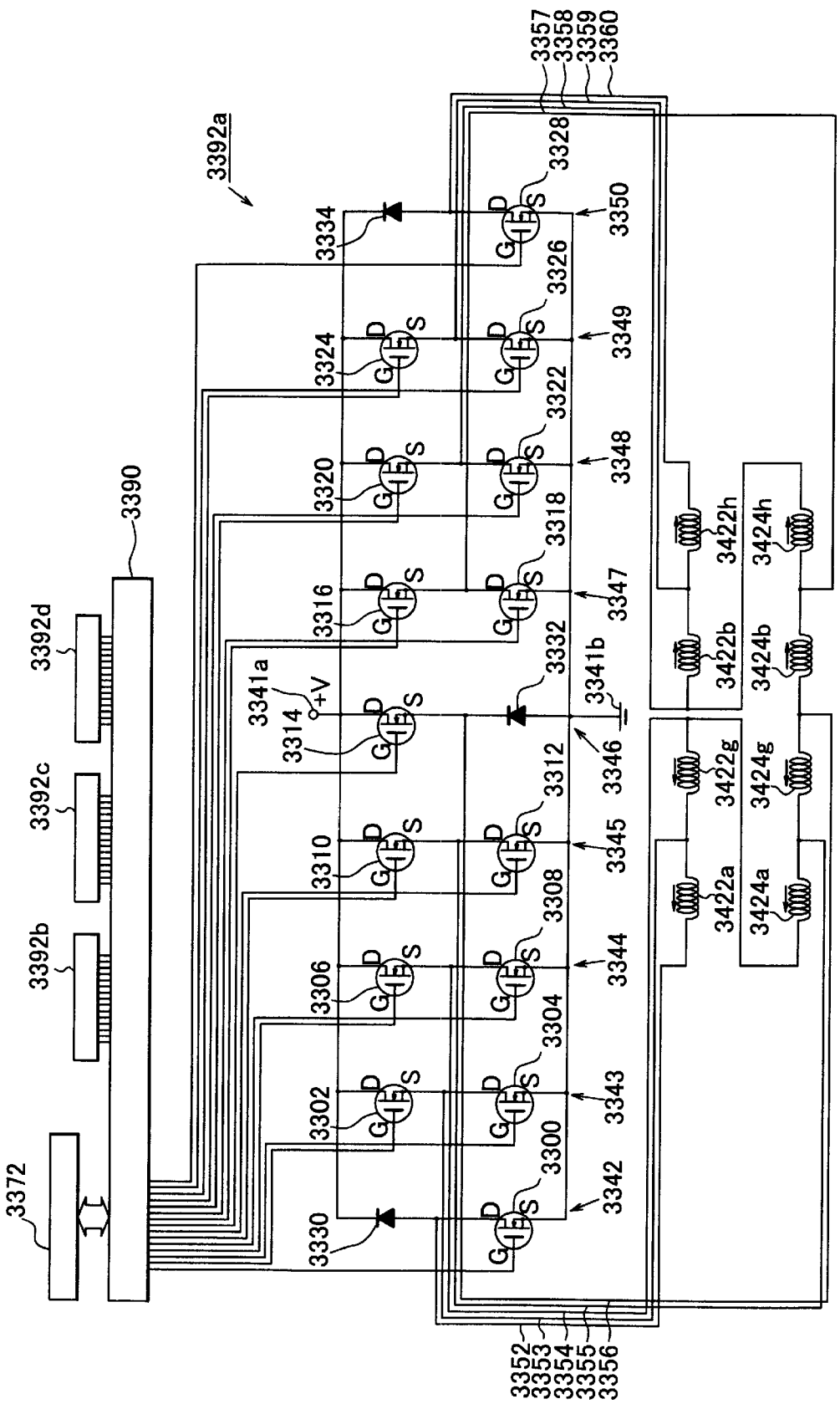
FIG. 63 is a diagram illustrating a construction of a drive circuit according to another embodiment of the present invention.

The embodiment depicted in FIG. 63 differs from previous embodiments in that using a drive circuit 3392a in place of the drive circuit 3192a. The drive circuit 3392a is a two-switching element in-series type drive circuit.

Other drive circuits 3392b, 3392c, and 3392d have relationships to the drive circuit 3392a corresponding to the relationships of the drive circuits 3192b, 3192c, and 3192d to the drive circuit 3192a. Therefore, the other drive circuits 3392b–3392d are the same as the drive circuit 3392a. Hence, the drive circuit 3392a will be described as a representative of the other drive circuits. Other configurations of the present embodiment are substantially similar as those of the present embodiments, unless otherwise noted.

The drive circuit 3392a is formed by 15 switching elements 3300, 3302, 3304, 3306, 3308, 3310, 3312, 3314, 3316, 3318, 3320, 3322, 3324, 3326, and 3328 and three diodes 3330, 3332, and 3334. Nine series circuits 3342, 3343, 3344, 3345, 3346, 3347, 3348, 3349, and 3350 are connected in parallel between a high potential side terminal 3341a and a low potential side terminal 3341b. Each series circuit is formed by connecting two elements selected from the group consisting of the switching elements 3300–3328 and the diodes 3330, 3332, and 3334 in series.

Of the nine series circuits 3342–3350, three series circuits 3342, 3346, and 3350 are located on opposite ends and in the middle in FIG. 63, with each formed by a series-connected combination of a switching element 3300, and 3314, 3328 and a diode 3330, 3332, and 3334. Of the three series circuits, the two series circuits 3342, and 3350 located on the opposite ends are formed by connecting the diode 3330, and 3334 and the switching element 3300, and 3328 in that order starting at the side of the high potential side terminal 3341a. The series circuit 3346 in FIG. 63 is formed by connecting the switching element 3314 and the diode 3332 in that order starting at the side of the high potential side terminal 3341a. The three diodes 3330, 3332, and 3334 are disposed in such a direction as to allow current to flow from the low potential side terminal 3341b to the high potential side terminal 3341a.

The other six series circuits 3343–3345 and 3347–3349 are formed by connecting two of the switching elements 3302–3312 and 3316–3326 in series as in previous embodiments.

Thus, the drive circuit 3392a in this embodiment differs from the drive circuit 3192a in previous embodiment in that the drive circuit 3392a employs the three diodes 3330, 3332, and 3334 in place of three switching elements located on the opposite ends and in the middle. Other configurations of the drive circuit 3392a are substantially similar as those of the drive circuit 3192a. Thus, an upper coil 3422a and a lower coil 3424a of a first intake valve of a first cylinder, an upper coil 3422b and a lower coil 3424b of a second intake valve of the first cylinder, an upper coil 3422g and a lower coil 3424g of a first intake valve of the fourth cylinder, and an upper coil 3422h and a lower coil 3424h of a second intake valve of the fourth cylinder are connected to positions comparable to those in previous embodiments, via 9 electrically conductive wires 3352, 3353, 3354, 3355, 3356, 3357, 3358, 3359, and 3330.

The 15 switching elements 3300–3328 are substantially the same as the switching elements in previous embodiments in that ON signals and OFF signals from a processor are inputted to the gate terminals G via an output port 3372 and a buffer circuit 3390.

The opening and closing operations of the two intake valves of the first cylinder and the two intake valves of the fourth cylinder performed when control currents are supplied from the ECU. A timing chart depicted in FIG. 64 indicates the operations of the two intake valves of the first cylinder and the two intake valves of the first cylinder.

Figure 64:
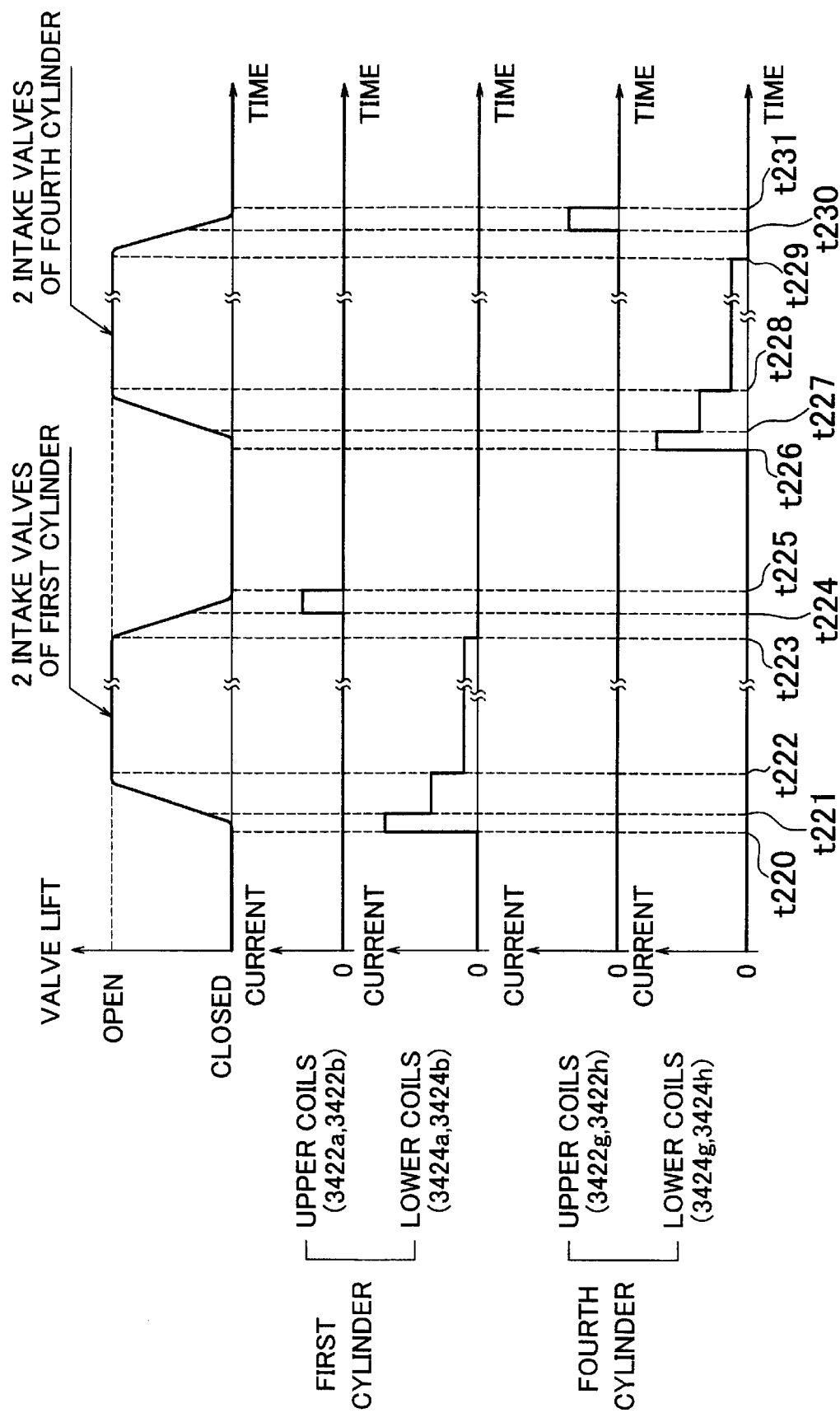
FIG. 64 is a timing chart indicating the operations of intake valves and the current control according to the embodiment of FIG. 63.

FIGS. 65A to 65G and FIGS. 66A to 66G are circuit diagrams indicating states of control performed on the drive circuit 3392a depicted in FIG. 63 so as to realize the operations indicated in FIG. 64. In FIGS. 65A to 65G and 66A to 66G, the conductive wires 3352–3360 are omitte. Furthermore, in FIGS. 65A to 65G and 66A to 66G, broken line arrows and circles "□" indicate the same states as described above in conjunction with the previous embodiments.

Before a time point t220 indicated in FIG. 64, the armatures 110 are brought into contact with the upper cores 116 as depicted in FIG. 10 by temporary excitation of the upper coils 3422a, 3422b, 3422g, and 3422h, and that. this contact state is maintained by the magnetic attraction forces of the upper magnets 116d. Therefore, the valve bodies 100 are in contact with the valve seats 126 Thus, the intake valves of the first cylinder and the intake valves of the fourth cylinder are in a closed state. The OFF signals are outputted to all the 15 switching elements 3300–3328.

Figure 65A:
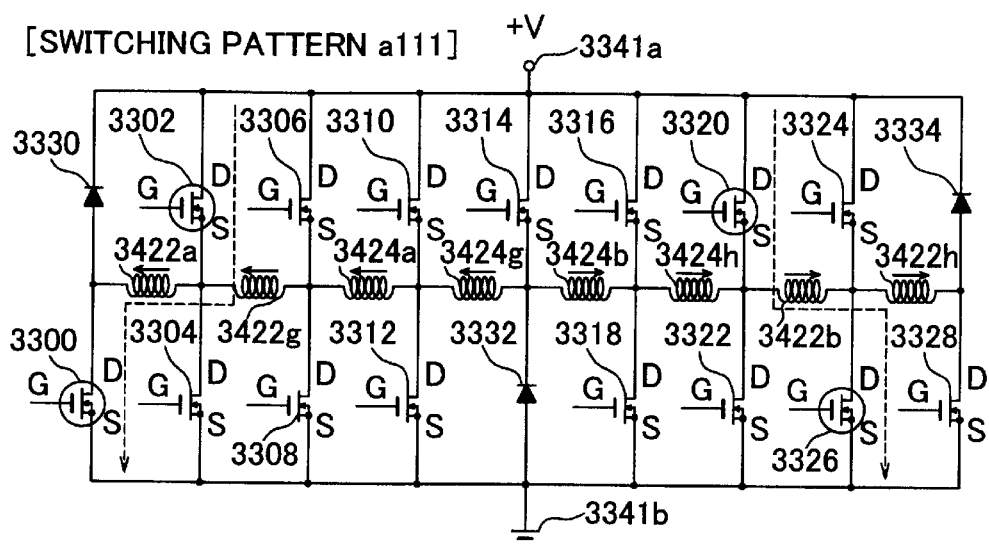
FIGS. 65A to 65C and 65E to 65G are circuit diagrams for illustrating the control of current according to the embodiment of FIG. 63.
Figure 65B:
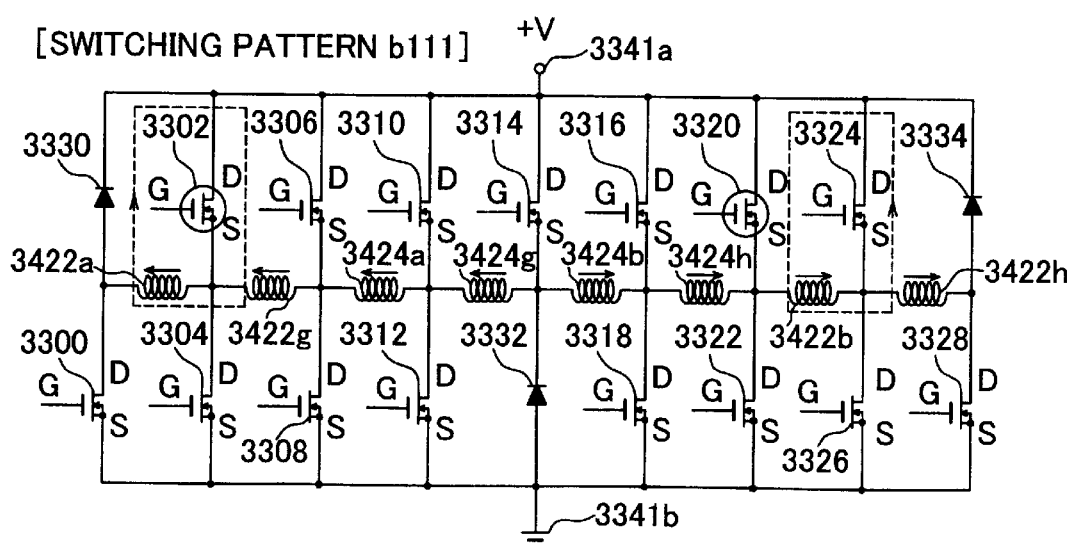
Figure 65C:
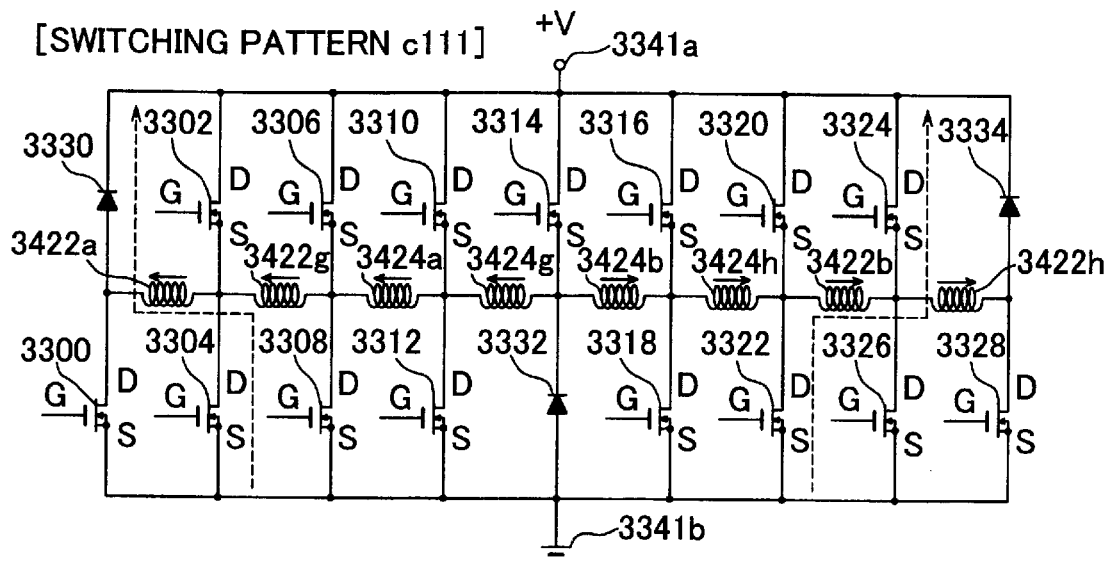
Figure 65E:
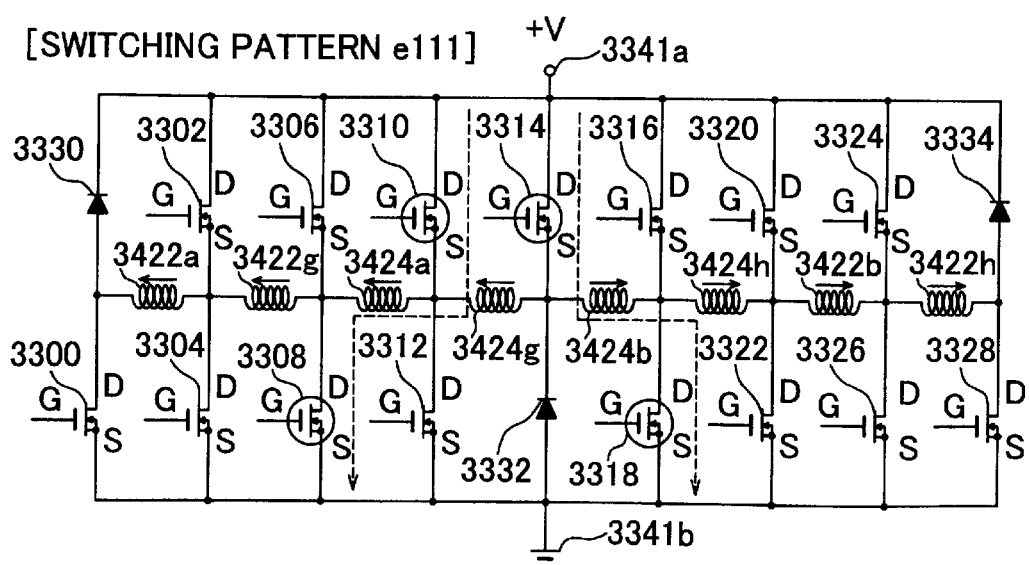
Figure 65F:
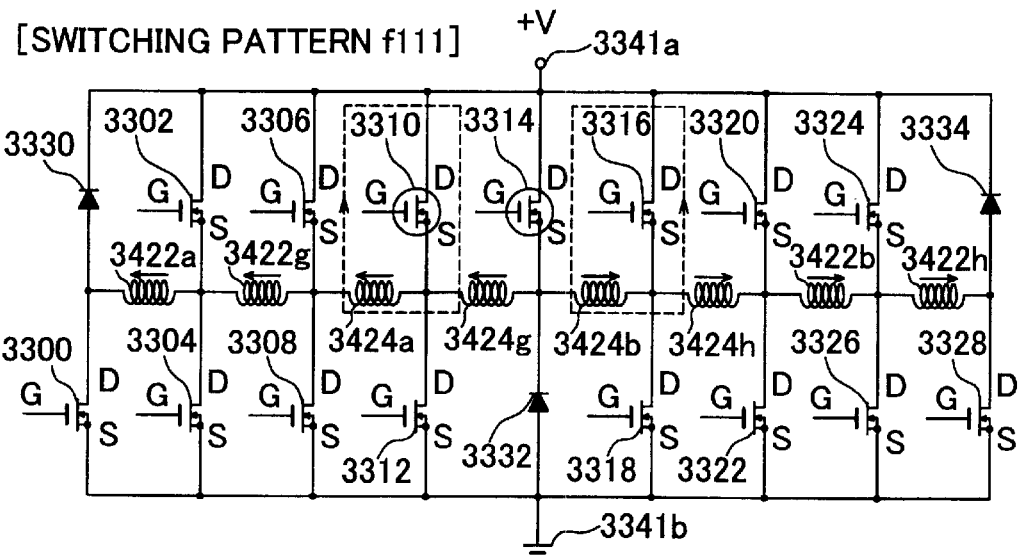

At the time of the intake stroke of the first cylinder, the processor outputs the ON signals to the switching elements 3308, 3310, 3314, and 3318 and outputs the OFF signals to the other switching elements at the time point t220 to establish a switching pattern e111 indicated in FIG. 65E. As a result, currents flow from the high potential side terminal 3341a to the low potential side terminal 3341b as indicated by broken line arrows in FIG. 65E, so that currents flow through the lower coils 3424a, and 3424b of the intake valves of the first cylinder in a forward direction. Then, the switching pattern e111 and a switching pattern f111 indicated in FIG. 65F are alternated until a time point t221.

In the switching pattern f111, the processor outputs the ON signals to the switching elements 3310, and 3314, and outputs the OFF signals to the other switching elements. Therefore, a current circulation path is formed through which current flows in a sequence of the lower coil 3424a and the switching elements 3306 and 3310. A current circulation path is formed through which current flows in a sequence of the lower coil 3424b and the switching elements 3316 and 3314. Immediately after the switching pattern e111 is changed to the switching pattern f111, flywheel currents flow through the circulation paths as indicated by broken line arrows in FIG. 65F. Therefore, by adjusting the proportion of the switching pattern e111 to a sufficiently great value, it is possible to achieve such an adjustment that great currents flow through the lower coils 3424a, and 3424b in the forward direction.

In this manner, the lower coils 3424a, and 3424b are supplied with separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Subsequently, starting at a time point t221, the processor temporarily sets a switching pattern g111 indicated in FIG. 65G. In the switching pattern g111, the processor outputs the OFF signals to all the switching element 3300–3328. Therefore, regenerative currents reversing from the low potential side terminal 3341b to the high potential side terminal 3341a occur as indicated by broken line arrows in FIG. 65G, so that the separating currents flowing through the lower coils 3424a, and 3424b rapidly decrease. Then, the processor immediately resumes a state of alternation between the switching pattern e111 and the switching pattern f111. In this case, however, the proportion of the switching pattern e111 is reduced, in comparison with the pattern alternating state during the time period t220–t221. Thus, the quantity of current supplied through the lower coils 3424a, and 3424b is kept at a normal drawing current. p At this moment, the armatures 110 are sufficiently apart from the upper cores 116. Therefore, although the currents through the lower coils 3424a, and 3424b are set to the normal drawing current, the armatures 110 are not returned to the upper cores 116 by the magnetic forces from the upper magnets 116d. After that, due to the drawing currents and the forces from the upper springs 120, the armatures 110 rapidly move away from the upper cores 116 and approach the lower cores 118, and contact the lower cores 118 by overcoming the forces from the lower springs 106.

Figure 65G:
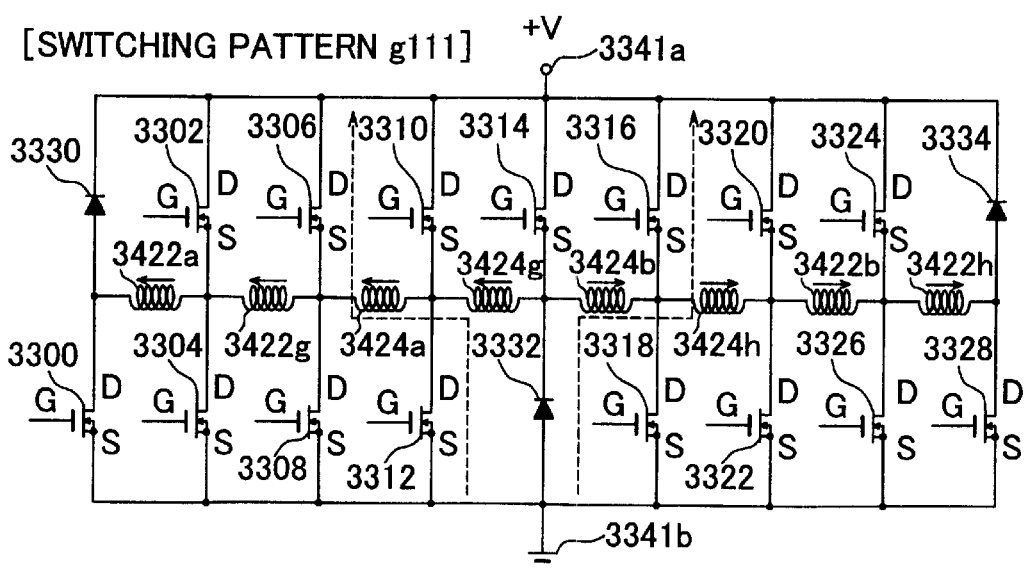

At a time point t222 after the armatures 110 come into contact with the lower cores 118, the processor temporarily sets the switching pattern g111 indicated in FIG. 65G. Therefore, regenerative currents occur as described above, so that the currents flowing through the lower coils 3242a, and 3424b rapidly decrease. Then, the processor immediately resumes a state of alternation between the switching pattern e111 and the switching pattern f111. In this case, however, the proportion of the switching pattern e111 is reduced, in comparison with the pattern alternating state during the time period t221–t222. Therefore, the quantity of current supplied through the lower coils 3424a, and 3424b is reduced to the holding current so as to maintain the contact between the armatures 110 and the lower cores 118. Thus, the intake ports of the first cylinder are set to the fully open state.

Subsequently, at a time point t223 near or at a timing at which the intake stroke of the first cylinder comes to an end, the switching pattern is changed to the switching pattern g111. Therefore, regenerative currents occur as described above, so that the currents flowing through the lower coils 3424a, and 3424b rapidly discontinue.

After the armatures 110 lose the attraction forces toward the lower cores 118 as described above, the armatures 110 start to move toward the upper cores 116, or, toward the completely closed state, due. to forces from the lower springs 106. Therefore, the valve bodies 100 approach the valve seats 126, and, the amount of valve lift starts to decrease.

Subsequently at a time point t224, the processor changes the switching pattern to a switching pattern a111 indicated in FIG. 65A, in order to draw the armatures 110 into contact with the upper cores 116. As a result, the drawing currents flow through the upper coils 3422a, and 3422b. Afterwards, a drawing current is maintained by alternating the switching pattern a111 and a switching pattern b111 indicated in FIG. 65B, until the armatures 110 contact the upper cores 116.

In the switching pattern a111, the processor outputs the ON signals to the switching elements 3300, 3302, 3320, and 3326, and outputs the OFF signals to the other switching elements. As a result, currents flow from the high potential side terminal 3341a to the low potential side terminal 3341b as indicated by broken line allows in FIG. 65A, so that currents flow through the upper coils 3422a, 3422b of the two intake valves of the first cylinder in the forward direction.

In the switching pattern b111, the processor outputs the ON signals to the switching elements 3302, and 3320, and outputs the OFF signals to the other switching elements. Therefore, a current circulation path is formed through which current flows in a sequence of the upper coil 3422a, the diode 3330 and the switching element 3302. A current circulation path is formed through which current flows in a sequence of the upper coil 3422b and the switching elements 3324 and 3320. Immediately after the switching pattern a111 is changed to the switching pattern b111, flywheel currents flow through the circulation paths as indicated by broken line arrows in FIG. 65B. Therefore, by adjusting the proportion between the switching pattern a111 and the switching pattern b111, the quantity of current flowing through the upper coils 3422a, and 3422b in the forward direction can be adjusted.

At a time point t225 after the armatures 110 come into contact with the upper cores 116,. the switching pattern is changed to a switching pattern c111 indicated in FIG. 65C. In the switching pattern c111, the processor outputs the OFF signals to all the switching elements 3300–3328. Therefore, regenerative currents occur as indicated by broken line arrows in FIG. 65C, so that the drawing currents flowing through the upper coils 3422a, and 3422b rapidly discontinue.

Even after the drawing currents discontinue, the contact between the armatures 110 and the upper cores 116 is maintained by the magnetic attraction forces from the upper magnets 116d. In this manner, the intake ports of the first cylinder are set completely closed.

Figure 66A:
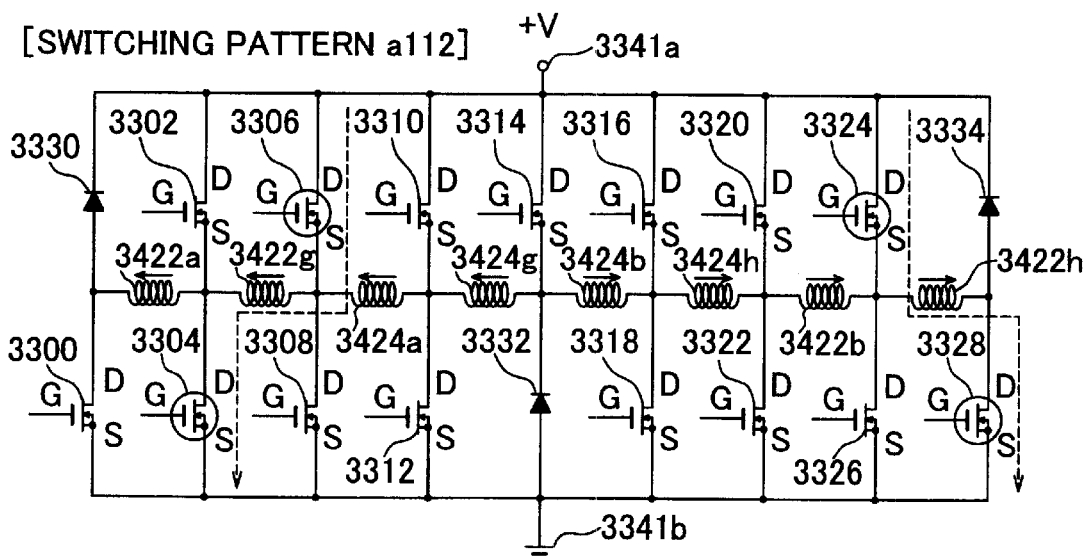
FIGS. 66A to 66C and 66E to 66G are circuit diagrams for illustrating the control of current according to the embodiment of FIG. 63.
Figure 66B:
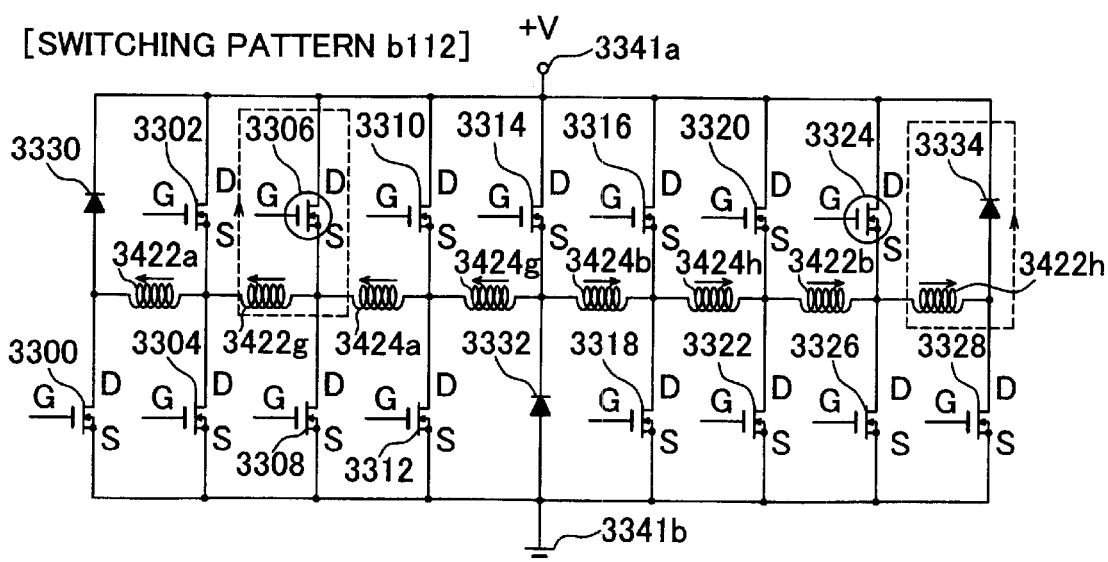

After the state where the OFF signals are outputted to all the switching elements 3300–3328, a timing comes at which the intake stroke of the fourth cylinder occurs. The intake stroke of the fourth cylinder does not overlap the intake stroke of the first cylinder. In this case, staring at a time point t226, the processor outputs the ON signals to the switching elements 3312, 3314, 3316, and 3322, and outputs the OFF signals to the other switching elements to set a switching pattern e112 indicated in FIG. 66E. Therefore, currents flow from the high potential side terminal 3341a to the low potential side terminal 3341b as indicated by broken line arrows in FIG. 66E, so that currents flow through the lower coils 3424g, and 3424h of the two intake valves of the fourth cylinder in the forward direction. Then, the switching pattern e112 and a switching pattern f112 indicated in FIG. 66F are alternated until a time point t227.

In the switching pattern f112, the processor outputs the ON signals to the switching elements 3314, and 3316, and outputs the OFF signals to the other switching elements. Therefore, a current circulation path is formed through which current flows in a sequence of the lower coil 3424g and the switching elements 3310 and 3314. A current circulation path is formed through which current flows in a sequence of the lower coil 3424h and the switching elements 3320 and 3316. Immediately after the switching pattern e112 is changed to the switching pattern f112, flywheel currents flow through the circulation paths as indicated by broken line arrows in FIG. 66F. Therefore, by adjusting the proportion of the switching pattern e112 to a sufficiently great value, it is possible to achieve such an adjustment that great currents flow through the lower coils 3424g, and 3424h in the forward direction.

In this manner, the lower coils 3424g, and 3424h are supplied with the separating currents for separating from the upper cores 116 the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Subsequently, starting at a time point t227, the processor temporarily sets a switching pattern g112 indicated in FIG. 66G. In the switching pattern g112, the processor outputs the OFF signals to all the switching elements 3300–3328. Therefore, regenerative currents occur as indicated by broken line arrows in FIG. 66G, so that the separating currents through the lower coils 3424g, and 3424h rapidly decrease. Then, the processor immediately resumes a state of alternating the switching pattern e112 and the switching pattern f112. In this case, however, the proportion of the switching pattern e112 is reduced, in comparison with the pattern alternating state during the time period t226–t227. Thus, the quantity of current supplied through the lower coils 3424g, and 3424h is kept at a normal drawing current.

At this moment, the armatures 110 are sufficiently apart from the upper cores 116. Therefore, although the currents through the lower coils 3424g, and 3424h are set to the normal drawing current, the armatures 110 are not returned to the upper cores 116 by the magnetic forces from the upper magnets 116d. Afterwards, due to the drawing currents and the forces from the upper springs 120, the armatures 110 rapidly move away from the upper cores 116 and approach the lower cores 118, and contact the lower cores 118 by overcoming the forces from the lower springs 106.

Starting at a time point t228 after the armatures 110 come into contact with the lower cores 118, the processor temporarily sets the switching pattern g112, thereby causing regenerative currents so as to rapidly reduce the drawing currents through the lower coils 3424g, and 3424h. Then, the processor immediately resumes a state of alternating the switching pattern e112 and the switching pattern f112. In this case, however, the proportion of the switching pattern e112 is reduced, in comparison with the pattern alternating state during the time period t227–t228. Thus, the quantity of current supplied through the lower coils 3424g, and 3424h is kept at the holding current, so as to maintain the contact between the armatures 110 and the lower cores 118. In this manner, the intake ports of the fourth cylinder are set to the fully open state.

Subsequently, at a time point t229 near or at a timing at which the intake stroke of the fourth cylinder comes to an end, the switching pattern is changed to the switching pattern g112 indicated in FIG. 66G. Therefore, regenerative currents flow as described above, so that the holding currents flowing through the lower coils 3424g, and 3424h rapidly discontinue.

After the armatures 110 lose the attraction forces toward the lower cores 118 as indicated above, the armatures 110 start to move toward the upper cores 116, or, toward the completely closed state, due to the forces from the lower springs 106. Therefore, the valve bodies 100 approach the valve seats 126, and, the amount of valve lift starts to decrease.

Subsequently at a time point t230, the processor changes the switching pattern to a switching pattern a112 indicated in FIG. 66A, in order to draw the armatures 110 into contact with the upper cores 116. As a result, the drawing currents flow through the upper coils 3422g, and 3422h. Afterwards, a drawing current is maintained by alternating the switching pattern a112 and a switching pattern b112 indicated in FIG. 66B, until the armatures 110 contact the upper cores 116.

In the switching pattern a112, the processor outputs the ON signals to the switching elements 3304, 3306, 3324, and 3328, and outputs the OFF signals to the other switching elements. As a result, currents flow from the high potential side terminal 3341a to the low potential side terminal 3341b as indicated by broken line allows in FIG. 66A, so that currents flow through the upper coils 3422g, and 3422h of the two intake valves of the fourth cylinder in the forward direction.

In the switching pattern b112, the processor outputs the ON signals to the switching elements 3306, and 3324, and outputs the OFF signals to the other switching elements. Therefore, a current circulation path is formed through which current flows in a sequence of the upper coil 3422g and the switching elements 3302 and 3306. A current circulation path is formed through which current flows in a sequence of the upper coil 3422h, the diode 3334 and the switching element 3324. Immediately after the switching pattern a112 is changed to the switching pattern b112, flywheel currents flow through the circulation paths as indicated by broken line arrows in FIG. 66B. Therefore, by adjusting the proportion between the switching pattern a112 and the switching pattern b112, the quantity of current flowing through the upper coils 3422g, and 3422h in the forward direction can be adjusted.

Figure 66C:
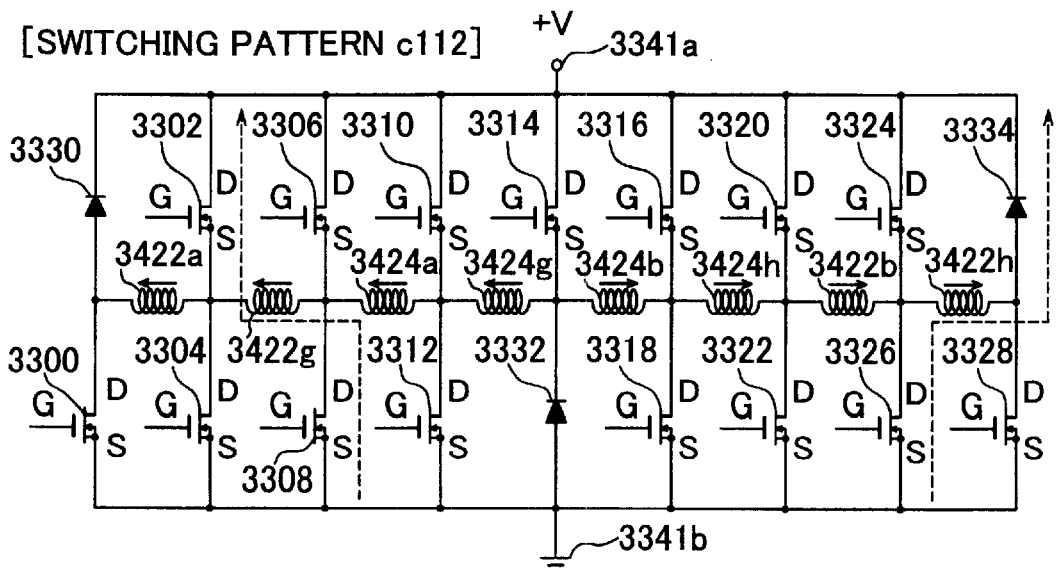
Figure 66E:
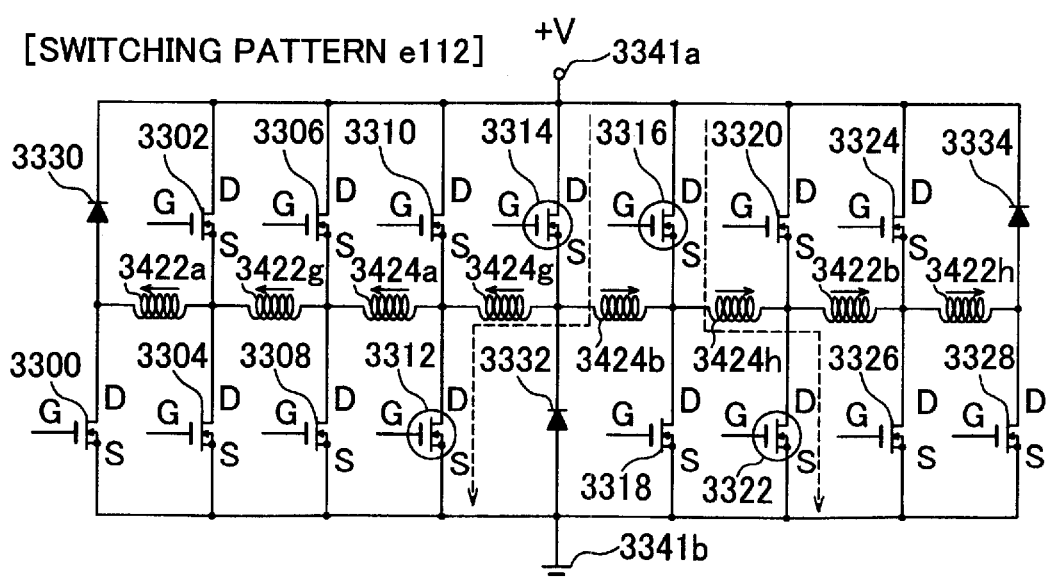
Figure 66F:
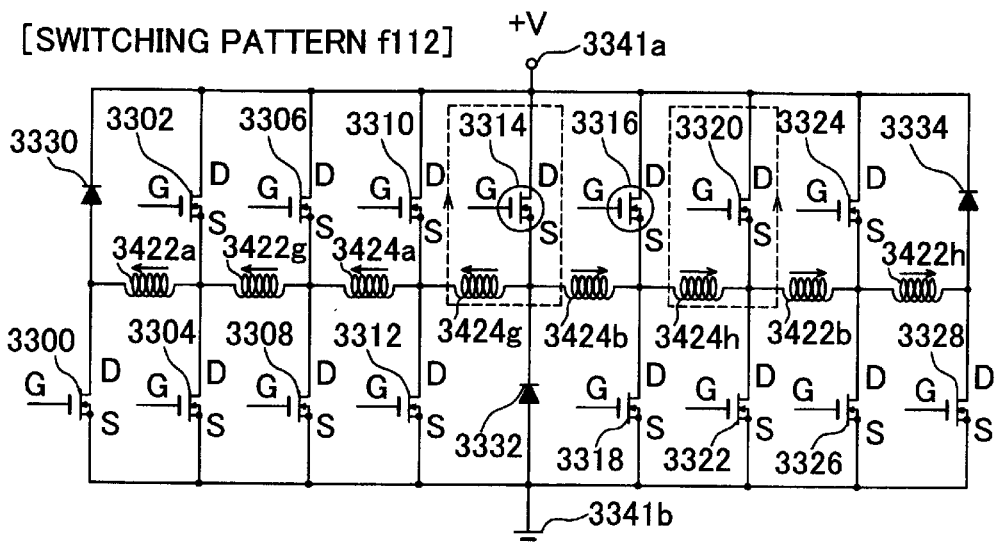
Figure 66G:
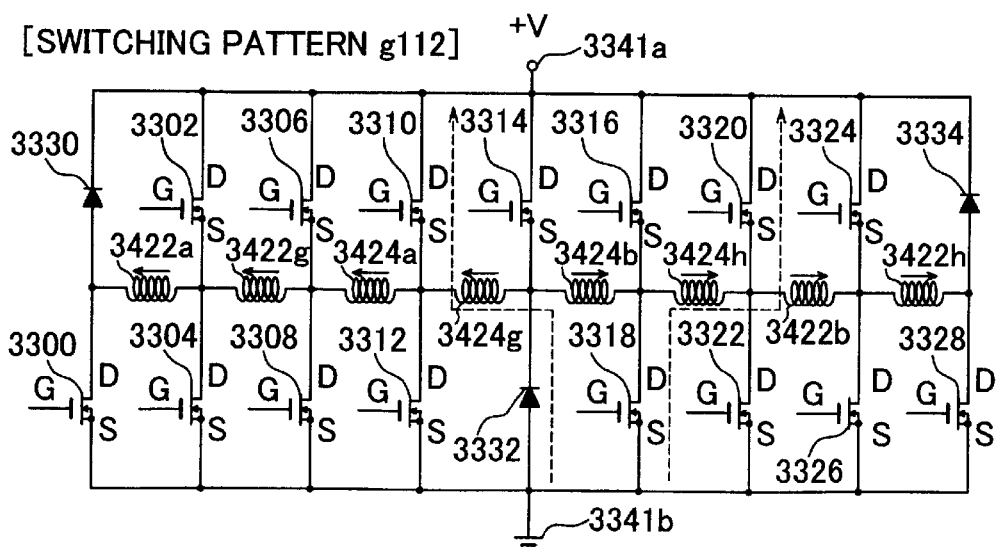

At a time point t231 after the armatures 110 come into contact with the upper cores 116, the switching pattern is changed to a switching pattern c112 indicated in FIG. 66C. In the switching pattern c112, the processor outputs the OFF signals to all the switching elements 3300–3328. Therefore, regenerative currents occur as indicated by broken line arrows in FIG. 66C, so that the drawing currents flowing through the upper coils 3422g, and 3422h rapidly discontinue.

After the drawing currents discontinue, the contact between the armatures 110 and the upper cores 116 is maintained by the magnetic attraction forces from the upper magnets 116d. In this manner, the intake ports of the fourth cylinder are set to the completely closed state.

The four intake valves of the first cylinder and the fourth cylinder are opened and closed in the above-described fashion by the drive circuit 3392a formed by the 15 switching elements 3300–3328 and the three diodes 3330–3334.

Through comparison between the 14 switching elements 3300–3326 and the two diodes 3330, and 3332 used to conduct current to drive the upper coils 3422a, and 3422b and the lower coils 3424a, and 3424b of the two intake valves of the first cylinder as indicated in FIGS. 65A to 65G and the 14 switching elements 3302–3328 and the two diodes 3332, and 3334 used to conduct current to drive the upper coils 3422g, 3422h and the lower coils 3424g, and 3424h of the two intake valves of the fourth cylinder as indicated in FIGS. 66A to 66G, it should be understood that the switching elements 3302–3326 and the diode 3332 are shared.

The drive circuit 3392b in the drive circuit portion is provided collectively for a total of four exhaust valves of the first cylinder and the fourth cylinder. The drive circuit 3392*b*, having a substantially similar circuit arrangement as that of the drive circuit 3392*a*, performs current-control of the upper and lower coils provided in the four exhaust valves. Thus, the drive circuit 3392*b* opens and closes the four exhaust valves of the first cylinder and the fourth cylinder at necessary timing.

The drive circuit 3392*c* in the drive circuit portion is provided collectively for a total of four intake valves of the second cylinder and the third cylinder. The drive circuit 3392*c*, having a substantially similar circuit arrangement as that of the drive circuit 3392*a*, performs current-control of the upper and lower coils provided in the four intake valves. Thus, the drive circuit 3392*c* opens and closes the four intake valves of the second cylinder and the third cylinder at appropriate timing.

The drive circuit 3392*d* in the drive circuit portion is provided collectively for a total of four exhaust valves of the second cylinder and the third cylinder. The drive circuit 3392*d*, having substantially the same circuit arrangement as that of the drive circuit 3392*a*, performs current-control of the upper and lower coils provided in the four exhaust valves. Thus, the drive circuit 3392*d* opens and closes the four exhaust valves of the second cylinder and the third cylinder at appropriate timing.

Therefore, the drive circuit portion, equipped with the four drive circuits 3392*a*–3392*d*, is able to drive a total of 16 valves of the four cylinders, or, the 8 intake valves and the 8 exhaust valves, in the combinations as depicted in FIG. 16 in conjunction with the previous embodiments.

The present embodiments, employs the 15 switching elements 3300–3328 and the three diodes 3330–3334, and is able to drive the intake and exhaust valves. Therefore, the present embodiments needs 60 switching elements and 12 diodes for the entire engine. Thus, the present embodiment reduces the total number of switching elements by 12 from the number in previous embodiments, and allows the use of less expensive diodes.

Therefore, the present embodiment further reduces the number of switching elements, and allows size and cost reductions of the drive circuit portion for the intake and exhaust valves formed as electromagnetic valves.

For example, a two-switching element in-series circuit configuration different from the configuration of the present embodiment needs 64 switching elements and 16 diodes as described below in Reference Example 2. Therefore, Embodiment 12 is advantageous over Reference Example 2.

The number of electrically conductive wires employed is reduced to 36, so that the thickness of a wire harness disposed in a vehicle can be reduced, thus contributing to size and weight reductions of the. In the two-switching element in-series type construction of Reference Example 2 described below, the number of electrically conductive wires employed is 40. Thus, in view of the wire harness, too, the present embodiments is advantageous over Reference Example 2.

Figure 67:
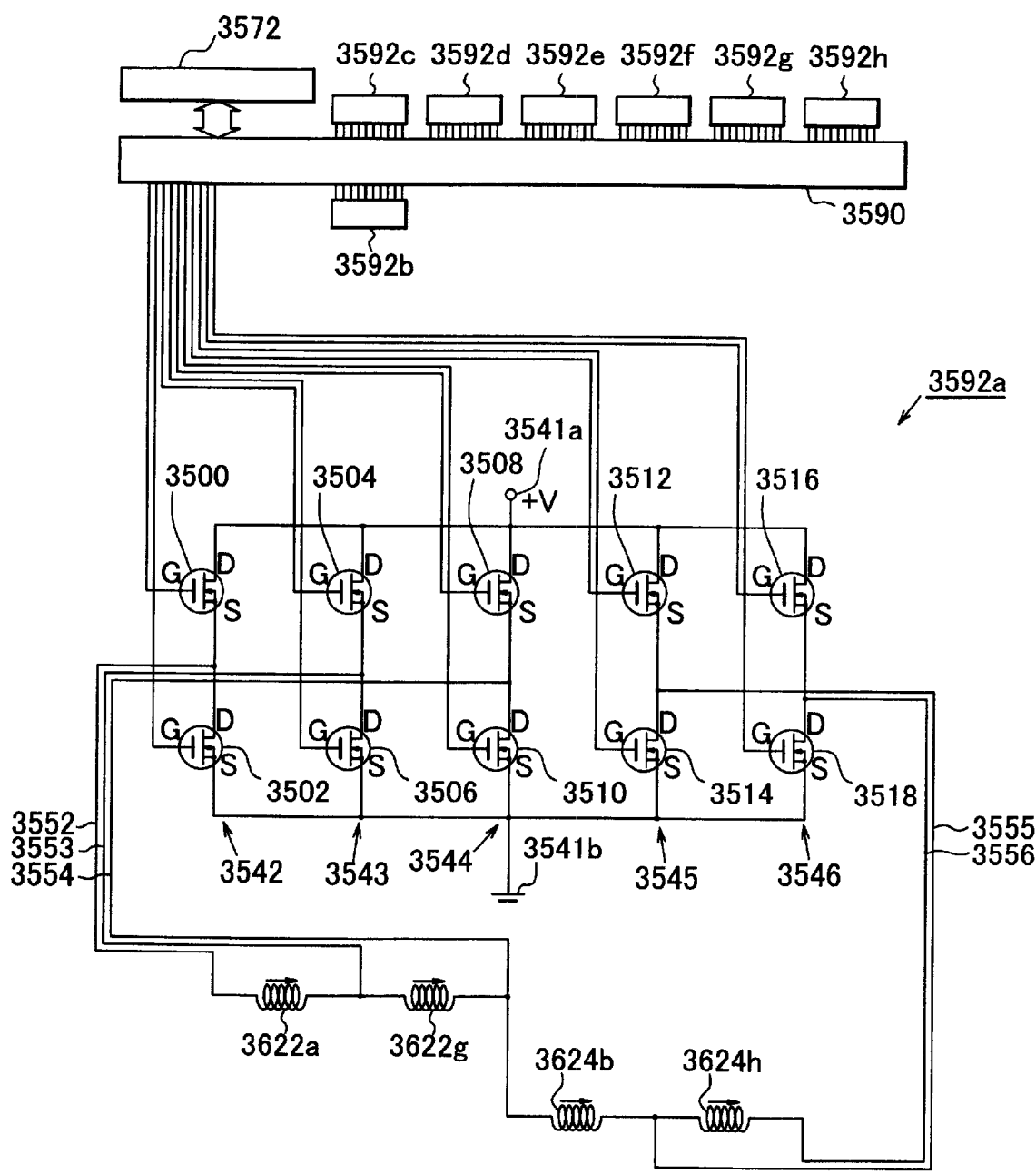
FIG. 67 is a diagram illustrating a construction of a drive circuit.
Figure 68:
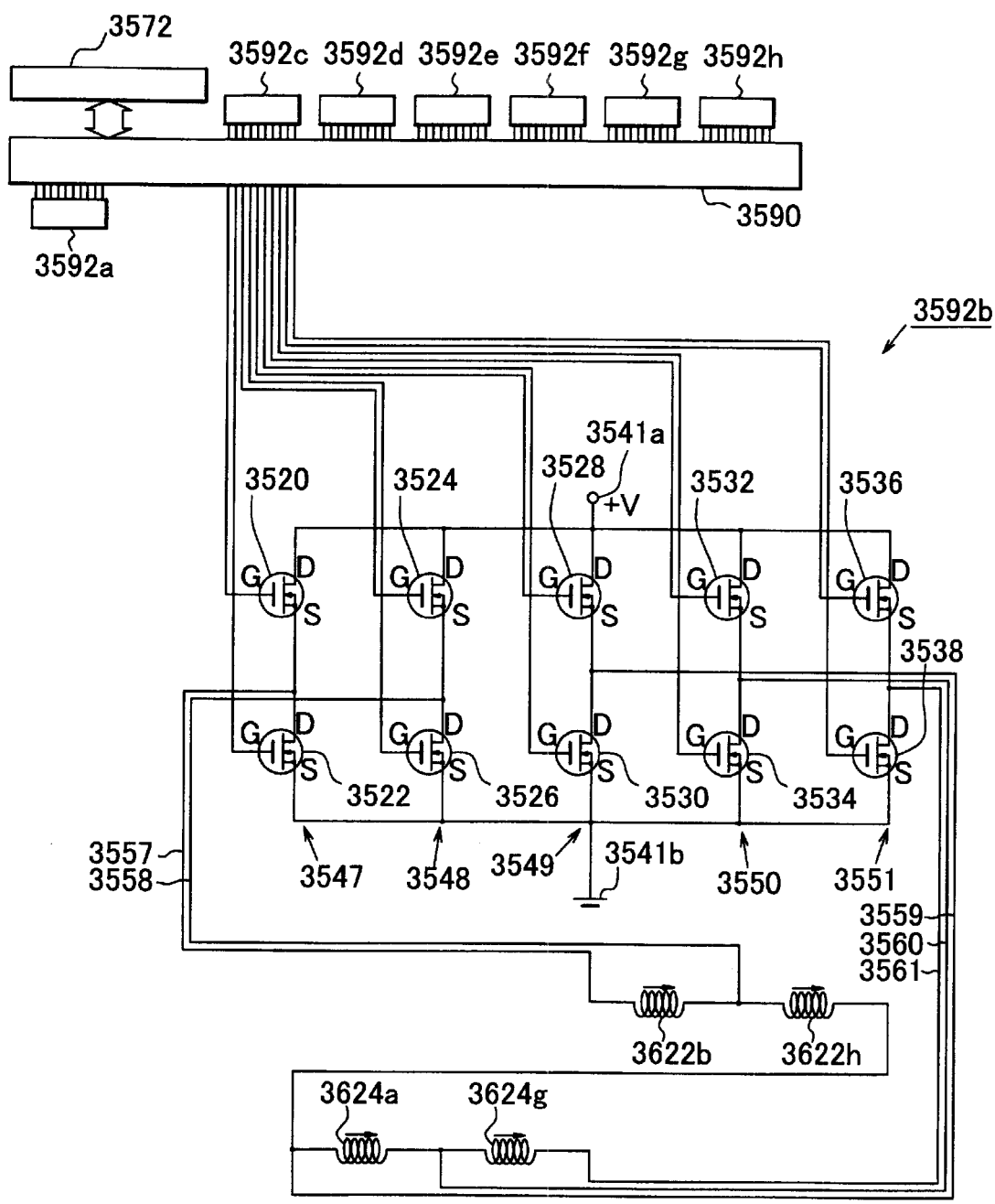
FIG. 68 is a diagram illustrating a construction of a drive circuit.

Reference Example 1 differs from embodiments of the present invention in that Reference Example 1 employs two drive circuits 3592*a*, and 3592*b* illustrated in FIGS. 67 and 68 in place of the drive circuit 3192*a*. Similarly, the other drive circuits 3192*b*–3192*d* in are replaced by combinations of two of drive circuits 3592*c*, 3592*d*, 3592*e*, 3592*f*, 3592*g*, and 3592*h* that have basically the same construction as the drive circuits 3592*a*, and 3592*b*. Therefore, the drive circuits 3592*a*, and 3592*b* will be described below as representatives of the other drive circuits. Other configurations of Reference Example 1 are substantially the same as those of the previous embodiments, unless otherwise noted.

The drive circuit 3592*a* depicted in FIG. 67 is provided with 10 FETs as switching elements 3500, 3502, 3504, 3506, 3508, 3510, 3512, 3514, 3516, and 3518. Of the switching elements, two switching elements 3500, and 3502 are connected in series, and are disposed between a high potential side terminal 3541*a* and a low potential side terminal 3541*b*. Similarly, every two of the switching elements 3504, 3506, 3508, 3510, 3512, 3514, 3516, and 3518 are connected in series so as to form series circuits 3543, 3544, 3545, and 3546 disposed between the high potential side terminal 3541*a* and the low potential side terminal 3541*b*. Thus, the five series circuits 3542–3546 are connected in parallel between the high potential side terminal 3541*a* and the low potential side terminal 3541*b*.

In the series circuit 3542, a series connecting portion between the switching element 3500 and the switching element 3502 is connected with an end of an electrically conductive wire 3552. Similarly, in each of the series circuits 3543–3546, a series connecting portion between the two switching elements 3504–3518 is connected with an end of an electrically conductive wire 3553, 3554, 3555, and 3556.

Of these wires, the conductive wire 3552 is connected to an end of an upper coil 3622*a* incorporated in a first intake valve of a first cylinder. The conductive wire 3553 is connected to the other end of the upper coil 3622*a* and to an end of an upper coil 3622*g* incorporated in a first intake valve of a fourth cylinder. The conductive wire 3554 is connected to the other end of the upper coil 3622*g* and to an end of a lower coil 3624*b* incorporated in a second intake valve of the first cylinder. The conductive wire 3555 is connected to the other end of the lower coil 3624*b* and to an end of a lower coil 3624*h* incorporated in a second intake valve of the fourth cylinder. The conductive wire 3556 is connected to the other end of the lower coil 3624*h*.

Thus, an inter-series circuit connection between the series circuit 3542 and the series circuit 3543 is formed by the upper coil 3622*a* incorporated in the first intake valve of the first cylinder. Similarly, an inter-series circuit connection between the series circuit 3543 and the series circuit 3544 is formed by the upper coil 3622*g* incorporated in the first intake valve of the fourth cylinder. Similarly, an inter-series circuit connection between the series circuit 3544 and the series circuit 3545 is formed by the lower coil 3624*b* incorporated in the second intake valve of the first cylinder. Similarly, an inter-series circuit connection between the series circuit 3545 and the series circuit 3546 is formed by the lower coil 3624*h* incorporated in the second intake valve of the fourth cylinder.

Thus, the drive circuit 3592*a* is provided collectively for the electromagnetic coils 3622*a*, 3622*g*, 3624*b*, and 3624*h*, or, one coil of each of the four valves. In FIG. 67, solid line arrows shown together with the electromagnetic coils 3622*a*, 3622*g*, 3624*b*, and 3624*h* indicated "forward direction".

The drive circuit 3592*b* depicted in FIG. 68 is provided with 10 FETs as switching elements 3520, 3522, 3524, 3526, 3528, 3530, 3532, 3534, 3536, and 3538. Of the switching elements, two switching elements 3520, and 3522 are connected in series, and are disposed between a high potential side terminal 3541*a* and a low potential side terminal 3541*b*. Similarly, every two of the switching elements 3524, 3526, 3528, 3530, 3532, 3534, 3536, and 3538 are connected in series so as to form series circuits 3548, 3549, 3550, and 3551 disposed between the high potential side terminal 3541*a* and the low potential side terminal 3541*b*. Thus, the five series circuits 3547–3551 are connected in parallel between the high potential side terminal 3541a and the low potential side terminal 3541b.

In the series circuit 3547, a series connecting portion between the switching element 3520 and the switching element 3522 is connected with an end of an electrically conductive wire 3557. Similarly, in each of the series circuits 3548–3551, a series connecting portion between the two switching elements 3524–3538 is connected with an end of an electrically conductive wire 3558, 3559, 3560, and 3561.

Of these wires, the conductive wire 3557 is connected to an end of an upper coil 3622b incorporated in the second intake valve of the first cylinder. The conductive wire 3558 is connected to the other end of the upper coil 3622b and to an end of an upper coil 3622h incorporated in the second intake valve of the fourth cylinder. The conductive wire 3559 is connected to the other end of the upper coil 3622h and to an end of a lower coil 3624a incorporated in the first intake valve of the first cylinder. The conductive wire 3560 is connected to the other end of the lower coil 3624a and to an end of a lower coil 3624g incorporated in the first intake valve of the fourthcylinder. The conductive wire 3561 is connected to the other end of the lower coil 3624g.

Thus, an inter-series circuit connection between the series circuit 3547 and the series circuit 3548 is formed by the upper coil 3622b incorporated in the second intake valve of the first cylinder. Similarly, an inter-series circuit connection between the series circuit 3548 and the series circuit 3549 is formed by the upper coil 3622h incorporated in the second intake valve of the fourth cylinder. Similarly, an inter-series circuit connection between the series circuit 3549 and the series circuit 3550 is formed only by the lower coil 3624a incorporated in the first intake valve of the first cylinder. Similarly, an interseries circuit connection between the series circuit 3550 and the series circuit 3551 is formed only by the lower coil 3624g incorporated in the first intake valve of the fourth cylinder.

Thus, the drive circuit 3592B is provided collectively for the electromagnetic coils 3622b, 3622h, 3624a, and 3624g, or, one coil of each of the four valves The opening and closing operations of the two intake valves of the first cylinder and the two intake valves of the fourth cylinder are caused by supply of control currents from the ECU. A timing chart depicted in FIG. 69 indicates the operations of the four intake valves.

Figure 69:
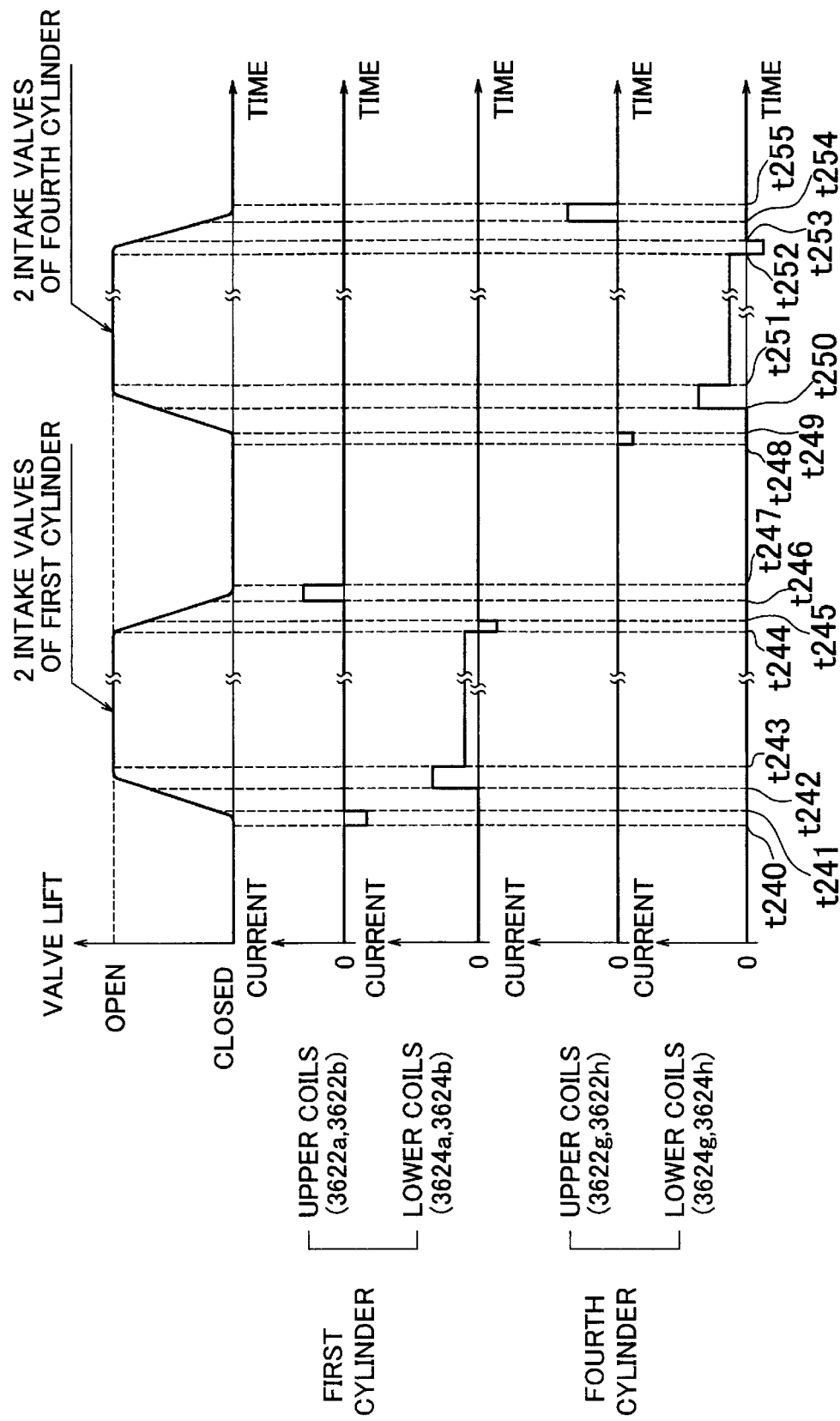
FIG. 69 is a timing chart indicating the operations of intake valves and the current control.

FIGS. 70A1 to 70P2 are circuit diagrams indicating states of control performed on the drive circuits 3592a, and 3592b depicted in FIGS. 67 and 68 to realize the operations indicated in FIG. 69. In FIGS. 70A1 to 70P2, the conductive wires 3552–3561 are omitted. Furthermore, in FIGS. 70A1 to 70P2, broken line arrows and circles "□" indicate the same states as described above in conjunction with Embodiment 1.

It is assumed that before a time point t240 indicated in FIG. 69, the armatures 110 are brought into contact with the upper cores 116 as depicted in FIG. 10 by temporary excitation of the upper coils 3622a, 3622b, 3622g, and 3622h, and that this contact state is maintained by the magnetic attraction forces of the upper magnets 116d. Therefore, the valve bodies 100 are in contact with the valve seats 126. Thus the two intake valves of the first cylinder and the two intake valves of the fourth cylinder are in a completely closed state. The OFF signals are outputted to all the 20 switching elements 3500–3538 of the drive circuits 3592a, and 3592b.

At the time of the intake stroke of the first cylinder, the processor operates during a time period of t240–t241 as follows. Thus, with respect to the drive circuit 3592a, the processor outputs the ON signals to the switching elements 3502, and 3504 and outputs the OFF signals to the other switching elements, to establish a switching pattern c121 indicated in FIG. 70C1. With respect to the drive circuit 3592b, the processor outputs the ON signals to the switching elements 3522, and 3524 and outputs the OFF signals to the other switching elements to establish a switching pattern c122 indicated in FIG. 70C2. As a result, currents flow from the high potential side terminal 3541a to the low potential side terminal 3541b as indicated by broken line arrows in FIGS. 70C1 and 70C2, so that releasing currents flow through the upper coils 3622a, 3622b of the two intake valves of the first cylinder in a reverse direction so as to cancel out the magnetic fluxes from the upper magnets 116d.

In order to adjust the quantity of current through the upper coils 3622a, and 3622b during the time period t240–t241, it is possible to execute a process of alternating the switching patterns c121, and c122 and switching patterns d121, and d122 indicated in FIGS. 70D1 and 70D2 at an appropriate proportion.

In the switching pattern d121 of the drive circuit 3592a, the processor outputs the ON signals to the switching element 3504, and outputs the OFF signals to the other switching elements. In the switching pattern d122 of the drive circuit 3592b, the CPU outputs the ON signals to only the switching element 3524, and outputs the OFF signals to the other switching elements. Therefore, a current circulation path is formed through which current flows in a sequence of the upper coil 3622a and the switching elements 3500 and 3504. A current circulation path is formed through which current flows in a sequence of the upper coil 3622b and the switching elements 3520 and 3524.

Immediately after the switching patterns c121, and c122 are changed to the switching patterns d121, and d122, flywheel currents flow through the circulation paths as indicated by broken line arrows in FIGS. 70D1 and 70D2. Therefore, by adjusting the proportion between the switching patterns c121, and c122 and the switching patterns d121, and d122, the quantity of current flowing through, the upper coils 3622a, and 3622b in the reverse direction can be adjusted.

Due to the releasing currents flowing through the upper coils 3622a, 3622b, the magnetic attraction forces produced on the armatures 110 by the upper cores 116 are cancelled out. As a result, the armatures 110 start to move toward the lower cores 118, or, toward a fully open state, due to the forces from the upper springs 120. Hence, the valve bodies 100 start to move apart from the valve seats 126, and the amount of valve lift starts to increase.

After that, at the time point t241, the processor temporarily outputs the ON signals to the switching elements 3500, 3506, 3520, and 3526, and outputs the OFF signals to the other switching elements to set switching patterns a121, a122 indicated in FIGS. 70A1 and 70A2. Therefore, the releasing currents flowing through the upper coils 3622a, and 3622b become regenerative currents flowing through the upper coils 3622a, and 3622b in the direction opposite to the direction indicated by broken line arrows in FIGS. 70A1 and 70A2, and therefore rapidly discontinue. After that, the processor immediately outputs the OFF signals to all the switching elements 3500–3538 to maintain the current discontinued state.

At the time point t241 when the releasing currents through the upper coils 3622a, and 3622b discontinue, the armatures 110 are sufficiently apart from the upper cores 116, so that the armatures 110 are not returned to the upper cores 116 by the magnetic forces from the upper magnets 116d. Afterwards, the armatures 110 are gradually moved away from the upper cores 116 toward the lower cores 118 by the forces from the upper springs 120.

Subsequently at a time point t242, the processor outputs the ON signals to the switching elements 3508, 3514, 3528, and 3534, and outputs the OFF signals to the other switching elements so as to set switching patterns i121, i122 indicated in FIGS. 70I1 and 70I2. Therefore, currents flow from the high potential side terminal 3541a to the low potential side terminal 3541b as indicated by broken line arrows in FIGS. 70I1 and 70I2, so that currents flow through the lower coils 3624a, and 3624b of the two intake valves of the first cylinder in the forward direction. Then, until a time point t243, the switching patterns i121, and i122 and switching patterns j121, and j122 indicated in FIGS. 70J1 and 70J2 are alternated, so as to maintain the drawing currents for magnetically drawing the armatures 110 to the lower cores 118. Therefore, when approaching the lower cores 118, the armatures 110 come into contact with the lower cores 118 by overcoming the forces from the lower springs 106.

In the switching patterns j121, and j122, the processor outputs the ON signals to the switching elements 3508, and 3528, and outputs the OFF signals to the other switching elements. Therefore, a current circulation path is formed through which current flows in a sequence of the lower coil 3624b and the switching elements 3512 and 3508. A current circulation path is formed through which current flows in a sequence of the lower coil 3624a and the switching elements 3532 and 3528. Immediately after the switching patterns i121, and i122 are changed to the switching patterns j121, and j122, flywheel currents flow through the circulation paths as indicated by broken line arrows in FIGS. 70J1 and 70J2.

Therefore, by adjusting the proportion between the switching patterns i121, and i122 and the switching patterns j121,and j122, the quantity of current flowing through the lower coils 3624a, and 3624b in the forward direction can be adjusted.

At a time point t243 after the armatures 110 come into contact with the lower cores 118, the processor temporarily sets switching patterns k121, and k122 indicated in FIGS. 70K1 and 70K2. In the switching patterns k121, and k122, the processor outputs the ON signals to only the switching elements 3510, 3512, 3530, and 3532, and outputs the OFF signals to the other switching elements. Therefore, regenerative currents flow in the direction opposite to the direction indicated by broke line arrows in FIGS. 70K1 and 70K2, so that the drawing currents through the lower coils 3624a, 3624b rapidly decrease. After that, the CPU immediately resumes a state of alternation between the switching patterns i121, and i122 and the switching patterns j121, and j122. In this case, however, the proportion of the switching patterns i121, and i122 is reduced, in comparison with the pattern alternating state during the time period t242–t243. In this manner, the quantity of current flowing through the lower coils 3624a, 3624b in the forward direction is kept at the holding current for maintaining the contact between the armatures 110 and the lower cores 118.

While the armatures 110 are held in contact with the lower cores 118 by the magnetic forces created by continuously supplying the holding currents through the lower coils 3624a, and 3624b, the valve bodies 100 are farthest from the valve seats 126 as indicated in FIG. 11. thus, the intake ports of the first cylinder remain in the open state.

Subsequently, at a time point t244 near or at a timing at which the intake stroke of the first cylinder comes to an end, the switching patterns are changed to the switching patterns k121, and k122 indicated in FIGS. 70K1 and 70K2. Therefore, regenerative currents flow in the direction opposite to the direction indicated by the broken line arrows in FIGS. 70K1 and 70K2, so that the holding currents through the lower coils 3624a, and 3624b rapidly discontinue, and the releasing currents flow in the direction indicated by the broken line arrows.

In order to adjust the quantity of releasing current through the lower coils 3624a, and 3624b, it is possible to execute a process of alternating the switching patterns k121, and k122 and switching patterns l121, and l122 indicated in FIGS. 70L1 and 70L2 at an appropriate proportion. In the switching patterns l121, and l122, the processor outputs the ON signals to the switching elements 3512, and 3532, and outputs the OFF signals to the other switching elements. Therefore, a current circulation path through which current flows in a sequence of the lower coil 3624b and the switching elements 3508 and 3512. A current circulation path is formed through which current flows in a sequence of the lower coil 3624a and the switching elements 3528 and 3532. Immediately after the switching patterns k121, and k122 are changed to the switching patterns l121, and l122, flywheel currents flow through the circulation paths as indicated by broken line arrows in FIGS. 70L1 and 70L2. Therefore, by adjusting the proportion between the switching patterns k121, and k122 and the switching patterns l121, and l122, the quantity of current flowing through the lower coils 3624a, and 3624b in the reverse direction can be adjusted.

Subsequently, at a time point t245, the processor temporarily sets the switching patterns l121, and l122. Therefore, regenerative currents flow in the direction opposite to the direction indicated by broken line arrows in FIGS. 70I1 and 70I2, so that the releasing currents through the lower coils 3624b, and 3624a rapidly discontinue. Afterwards, the processor immediately outputs the OFF signals to all the switching elements 3500–3538 to maintain the current discontinued state.

Due to the releasing currents through the lower coils 3624a, and 3624b and the subsequent discontinuation of current described above, the armatures 110 lose the attraction forces toward the lower cores 118. The armatures 110 then start to move toward the upper cores 116, or, toward the closed state, due to the forces from the lower springs 106. Thus, the valve bodies 100 approach the valve seats 126, and the amount of valve lift starts to decrease.

Subsequently at a time point t246, the processor changes the switching patterns to the switching patterns a121, and a122 indicated in FIGS. 70A1 and 70A2, in order to draw the armatures 110 into contact with the upper cores 116. As a result, the drawing currents flow through the upper coils 3622a, and 3622b as indicated by the broken line arrows in FIGS. 70A1 and 70A2. Afterwards, a drawing current is maintained by alternating the switching patterns a121, and a122 and switching patterns b121, and b122 indicated in FIGS. 70B1 and 70B2, until the armatures 110 contact the upper cores 116.

In the switching patterns b121, and b122, the processor outputs the ON signals to only the switching elements 3500, and 3520, and outputs the OFF signals to the other switching elements. Therefore, a current circulation path through which current flows in a sequence of the upper coil 3622a and the switching elements 3504 and 3500 is formed, and a current circulation path through which current flows in a sequence of the upper coil 3622b and the switching elements 3524 and 3520 is formed. Immediately after the switching patterns a121, and a122 are changed to the switching patterns b121, and b122, flywheel currents flow through these circulation paths as indicated by broken line arrows in FIGS. 70B1 and 70B2. Therefore, by adjusting the proportion between the switching patterns a121, a122 and the switching patterns b121, b122, the quantity of current flowing through the upper coils 3622a, 3622b in the forward direction can be adjusted.

At a time point t247 after the armatures 110 come into contact with the upper cores 116 and therefore the two intake valves of the first cylinder become closed as depicted in FIG. 10, the processor temporarily changes the switching patterns to the switching patterns c121, and c122 indicated in FIGS. 70C1 and 70C2. Therefore, regenerative currents flow in the direction opposite to the direction indicated by the broken line arrows in FIGS. 70C1 and 70C2, so that the drawing currents through the upper coils 3622a, and 3622b rapidly discontinue. After that, the processor immediately outputs the OFF signals to all the switching elements 3500–3538 to maintain the current discontinued state.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the two intake valves of the first cylinder are kept in the closed state.

After the state where the OFF signals are outputted to all the switching elements 3500–3538, a timing point occurs at the intake stroke of the fourth cylinder occurs. The intake stroke of the fourth cylinder does not overlap the intake stroke of the first cylinder. In this case, during a time period of t248–t249, the processor outputs the ON signals to only the switching elements 3506, and 3508, 3526, and 3528 and outputs the OFF signals to the other switching elements so as to set switching patterns g121, and g122 indicated in FIGS. 70G1 and 70G2. Therefore, currents flow from the high potential side terminal 3541a to the low potential side terminal 3541b as indicated by broken line arrows in FIGS. 70G1 and 70G2, so that reverse-direction releasing currents flow through the upper coils 3622g, 3622h of the two intake valves of the fourth cylinder so as to cancel out the magnetic fluxes from the upper magnets 116d.

In order to adjust the quantity of current through the upper coils 3622g, and 3622h during the time period t248–t249, it is possible to execute a process of alternating the switching patterns g121, and g122 and switching patterns h121, h122 indicated in FIGS. 70H1 and and 70H2 at an appropriate proportion.

In the switching patterns h121, and h122, the processor outputs the ON signals to the switching elements 3508, and 3528, and outputs the OFF signals to the other switching elements. Therefore, a current circulation path is formed through which current flows in a sequence of the upper coil 3622g and the switching elements 3504 and 3508. A current circulation path is formed through which current flows in a sequence of the upper coil 3622h and the switching elements 3524 and 3528. Immediately after the switching patterns g121, and g122 are changed to the switching patterns h121, and h122, flywheel currents flow through the circulation paths as indicated by broken line arrows in FIGS. 70H1 and 70H2. Therefore, by adjusting the proportion between the switching patterns g121, and g122 and the switching patterns. h121, and h122, the quantity of current flowing through the upper coils 3622g, and 3622h in the reverse direction can be adjusted.

Due to the releasing currents supplied through the upper coils 3622g, and 3622h in the above-described manner, the magnetic attraction forces produced on the armatures 110 by the upper cores 116 are cancelled out. As a result, the armatures 110 start to move toward the lower cores 118, or, toward the fully open state, due to the forces from the upper springs 120. Thus, the valve bodies 100 start to move apart from the valve seat 126, and the amount of valve lift starts to increase.

Afterwards, at the time point t249, the processor outputs the ON signals to the switching elements 3504, 3510, 3524, and 3530 and outputs the OFF signals to the other switching elements so as to set switching patterns e121, and e122 indicated in FIGS. 70E1 and 70E2. Therefore, the releasing currents flowing through the upper coils 3622g, and 3622h become regenerative currents flowing in the direction opposite to the direction indicated by broken line arrows in FIGS. 70E1 and 70E2, and, therefore, rapidly discontinue. Then, the processor immediately outputs the OFF signals to all the switching elements 3500–3538 to maintain the current discontinued state.

At the time point t249 when the releasing currents through the upper coils 3622g, and 3622h discontinue, the armatures 110 are sufficiently apart from the upper cores 116, so that the armatures 110 are not returned to the upper cores 116 by the magnetic forces from the upper magnets 116d. Afterwards, the armatures 110 are gradually moved away from the upper cores 116 toward the lower cores 118 by the forces from the upper springs 120.

Subsequently at a time point t250, the processor outputs the ON signals to the switching elements 3512, 3518, 3532, and 3538, and outputs the OFF signals to the other switching elements, so as to set switching patterns m121, and m122 indicated in FIGS. 70M1 and 70M2. Therefore, currents flow from the high potential side terminal 3541a to the low potential side terminal 3541b as indicated by broken line arrows in FIGS. 70M1 and 70M2, so that currents flow through the lower coils 3624g, and 3624h of the two intake valves of the fourth cylinder in the forward direction. Then, until a time point t251, the switching patterns m121, m122 and switching patterns n121, and n122 indicated in FIGS. 70N1 and 70N2 are alternated so as to maintain the drawing currents for magnetically drawing the armatures 110 into contact with the lower cores 118. Therefore, when approaching the lower cores 118, the armatures 110 come into contact with the lower cores 118 by overcoming the forces from the lower springs 106.

In the switching patterns n121, and n122, the processor outputs the ON signals to only the switching elements 3512, and 3532, and outputs the OFF signals to the other switching elements. Therefore, a current circulation path through which current flows in a sequence of the lower coil 3624h and the switching elements 3516 and 3512 is formed, and a current circulation path through which current flows in a sequence of the lower coil 3624g and the switching elements 3536 and 3532 is formed. Immediately after the switching patterns m121, and m122 are changed to the switching patterns n121, and n122, flywheel currents flow through the circulation paths as indicated by broken line arrows in FIGS. 70N1 and 70N2. Therefore, by adjusting the proportion between the switching patterns m121, m122 and the switching patterns n121, and n122, the quantity of current flowing through the lower coils 3624g, 3624h in the forward direction can be adjusted.

At a time point t251 after the armatures 110 come into contact with the lower cores 118, the processor temporarily sets switching patterns o121, and p122 indicated in FIGS. 70O1 and 70O2. In the switching patterns o121, p122, the processor outputs the ON signals to only the switching elements 3514, 3516, 3534, and 3536, and outputs the OFF signals to the other switching elements. Therefore, regenerative currents flow in the direction opposite to the direction indicated by broken line arrows in FIGS. 70O1 and 70O2, so that the drawing currents through the lower coils 3624g, and 3624h rapidly decrease. Afterwards, the processor immediately resumes a state of alternation between the switching patterns m121, and m122 and the switching patterns n121, n122. In this case, however, the proportion of the switching patterns m121, m122 is reduced, in comparison with the pattern alternating state during the time period t250–t251. In this manner, the quantity of current flowing through the lower coils 3624g, and 3624h in the forward direction is kept at the holding current for maintaining the contact between the armatures 110 and the lower cores 118.

While the armatures 110 are held in contact with the lower cores 118 by continuously supplying the holding current through the lower coils 3624g, and 3624h in the above-described manner, the valve bodies 100 are farthest apart from the valve seats 126 as indicated in FIG. 11. Thus, the intake ports of the fourth cylinder remain in the open state.

Subsequently, at a time point t252 near or at a timing at which the intake stroke of the fourth cylinder comes to an end, the switching patterns are changed to the switching patterns o121, and o122 indicated in FIGS. 70O1 and 70O2. Therefore, regenerative currents flow in the direction opposite to the direction indicated by the broken line arrows in FIGS. 70O1 and 70O2, so that the holding currents through the lower coils 3624g, and 3624h rapidly discontinue, and then the releasing currents flow through the lower coils 3624g, and 3624h in the direction indicated by the broken line arrows in FIGS. 70O1 and 70O2.

In order to adjust the quantity of releasing current through the lower coils 3624g, and 3624h, it is possible to execute a process of alternating the switching patterns o121, and o122 and switching patterns p121, and p122 indicated in FIGS. 70P1 and 70P2 at an appropriate proportion. In the switching patterns p121, and p122, the processor outputs the ON signals to only the switching elements 3516, and 3536, and outputs the OFF signals to the other switching elements. Therefore, a current circulation path is formed through which current flows in a sequence of the lower coil 3624h and the switching elements 3512 and 3516. A current circulation path is formed through which current flows in a sequence of the lower coil 3624g and the switching elements 3532 and 3536. Immediately after the switching patterns o121, and o122 are changed to the switching patterns p121, and p122, flywheel currents flow through the circulation paths as indicated by broken line arrows in FIGS. 70P1 and 70P2. Therefore, by adjusting the proportion between the switching patterns o121, and o122 and the switching patterns p121, and p122, the quantity of current flowing through the lower coils 3624g, and 3624h in the reverse direction can be adjusted.

Subsequently, at a time point t253, the processor temporarily sets the switching patterns m121, and m122. Therefore, regenerative currents flow in the direction opposite to the direction indicated by the broken line arrows in FIGS. 70M1 and 70M2, so that the releasing currents through the lower coils 3624g, and 3624h rapidly discontinue. Then, the processor immediately outputs the OFF signals to all the switching elements 3500–3538 to maintain the current discontinued state.

Due to the releasing currents through the lower coils 3624g, and 3624h and the subsequent discontinuation of current, the armatures 110 lose the attraction forces toward the lower cores 118, and start to move toward the upper cores 116, to, toward the closed state, due to the forces from the lower springs 106. Thus, the valve bodies 100 approach the valve seats 126, and the amount of valve lift starts to decrease.

Subsequently at a time point t254, the processor changes the switching patterns to the switching patterns e121, and e122 indicated in FIGS. 70E1 and 70E2 in order to draw the armatures 110 into contact with the upper cores 116. As a result, the drawing currents flow through the upper coils 3622g, and 3622h as indicated by the broken line arrows in FIGS. 70E1 and 70E2. Afterwards, a drawing current is maintained by alternating the switching patterns e121, and e122 and switching patterns f121, and f122 indicated in FIGS. 70F1 and 70F2, until the armatures 110 contact the upper cores 116.

In the switching patterns f121, and f122, the processor outputs the ON signal to the switching elements 3504, and 3524, and outputs the OFF signals to the other switching elements. Therefore, a current circulation path through which current flows in a sequence of the upper coil 3622g and the switching elements 3508 and 3504 is formed, and a current circulation path through which current flows in a sequence of the upper coil 3622h and the switching elements 3528 and 3524 is formed. Immediately after the switching patterns e121, and e122 are changed to the switching patterns f121, and f122, flywheel currents flow through the circulation paths as indicated by broken line arrows in FIGS. 70F1 and 70F2. Therefore, by adjusting the proportion between the switching patterns e121, and e122 and the switching patterns f121, and f122, the quantity of current flowing through the upper coils 3622g, 3622h in the forward direction can be adjusted.

At a time point t255 after the armatures 110 come into contact with the upper cores 116 and the two intake valves of the fourth cylinder become closed as shown in FIG. 10, the processor temporarily changes the switching patterns to the switching patterns g121 and g122 indicated in FIGS. 70G1 and 70G2. Therefore, regenerative currents flow in the direction opposite to the direction indicated by the broken line arrows in FIGS. 70G1 and 70G2, so that the drawing currents through the upper coils 3622g, and 3622h rapidly discontinue. Then, the processor immediately outputs the OFF signals to all the switching elements 3500–3538 so as to maintain the current discontinued state.

Even after the drawing currents discontinue, the contact between the armatures 110 and the upper cores 116 is maintained by the magnetic attraction forces from the upper magnets 116d. Thus, the valve bodies 100 are held in contact with the valve seats 126. Therefore, the two intake valves of the fourth cylinder remain in the completely closed state.

By repeating the above-described operation, the four intake valves of the first cylinder and the fourth cylinder are opened and closed.

Through comparison between the switching elements 3500–3514, and 3520–3534 used to conduct current to drive the upper coils 3622a, and 3622b and the lower coils 3624a, and 3624b of the two intake valves of the first cylinder as indicated in FIGS. 70A2 to 70D2 and FIGS. 70I1 to 70L2 and the switching elements 3504–3518, 3524–3538 used to conduct current to drive the upper coils 3622g, and 3622h and the lower coils 3624g, 3624h of the two intake valves of the fourth cylinder as indicated in FIGS. 70E1 to 70H1 and FIGS. 70M1 to 70P2, it should be understood that the switching elements 3504–3514 and 3524–3534 are shared.

The relationship of the drive circuits 3592c, and 3592d in the drive circuit portion to a total of four exhaust valves of the first cylinder and the fourth cylinder is substantially similar to the relationship of the drive circuits 3592a, and 3592b to the four intake valves. The drive circuits 3592c, and 3592d, having substantially similar configuration as the drive circuits 3592a, and 3592b, perform current-control of the upper and lower coils provided in the four exhaust valves, in a manner as described above. Thus, the drive circuits 3592c, and 3592d open and close the four exhaust valves of the first cylinder and the fourth cylinder at necessary timing.

The relationship of the drive circuits 3592e, and 3592f in the drive circuit portion to a total of four intake valves of the second cylinder and the third cylinder is substantially similar the relationship of the drive circuits 3592a, and 3592b to the corresponding four intake valves. The drive circuits 3592e, and 3592f, having substantially similar configuration as the drive circuits 3592a, and 3592b, perform current-control of the upper and lower coils provided in the four intake valves, in a manner as described above. Thus, the drive circuits 3592e, and 3592f open and close the four intake valves of the second cylinder and the third cylinder at appropriate timing.

The relationship of the drive circuits 3592g, 3592h in the drive circuit portion to the four exhaust valves of the second cylinder and the third cylinder is substantially similar as the relationship of the drive circuits 3592a, and 3592b to the four intake valves. The drive circuits 3592g, and 3592h, having substantially the same construction as the drive circuits 3592a, and 3592b, perform current-control of the upper and lower coils provided in the four exhaust valves, in a manner as described above. Thus, the drive circuits 3592e, and 3592f open and close the four exhaust valves of the second cylinder and the third cylinder at appropriate timing.

Therefore, the drive circuit portion, equipped with the eight drive circuits 3592a–3592h, is able to drive a total of 16 valves of the four cylinders, or, the 8 intake valves and the 8 exhaust valves, in the combinations as depicted in FIG. 16.

Thus, the drive circuits 3592a–3592h use a total of 80 switching elements to drive and open the 16 valves. The upper coils and the lower coils of the 16 valves are connected via the 40 electrically conductive wires, and are controlled as described above.

Figure 71:
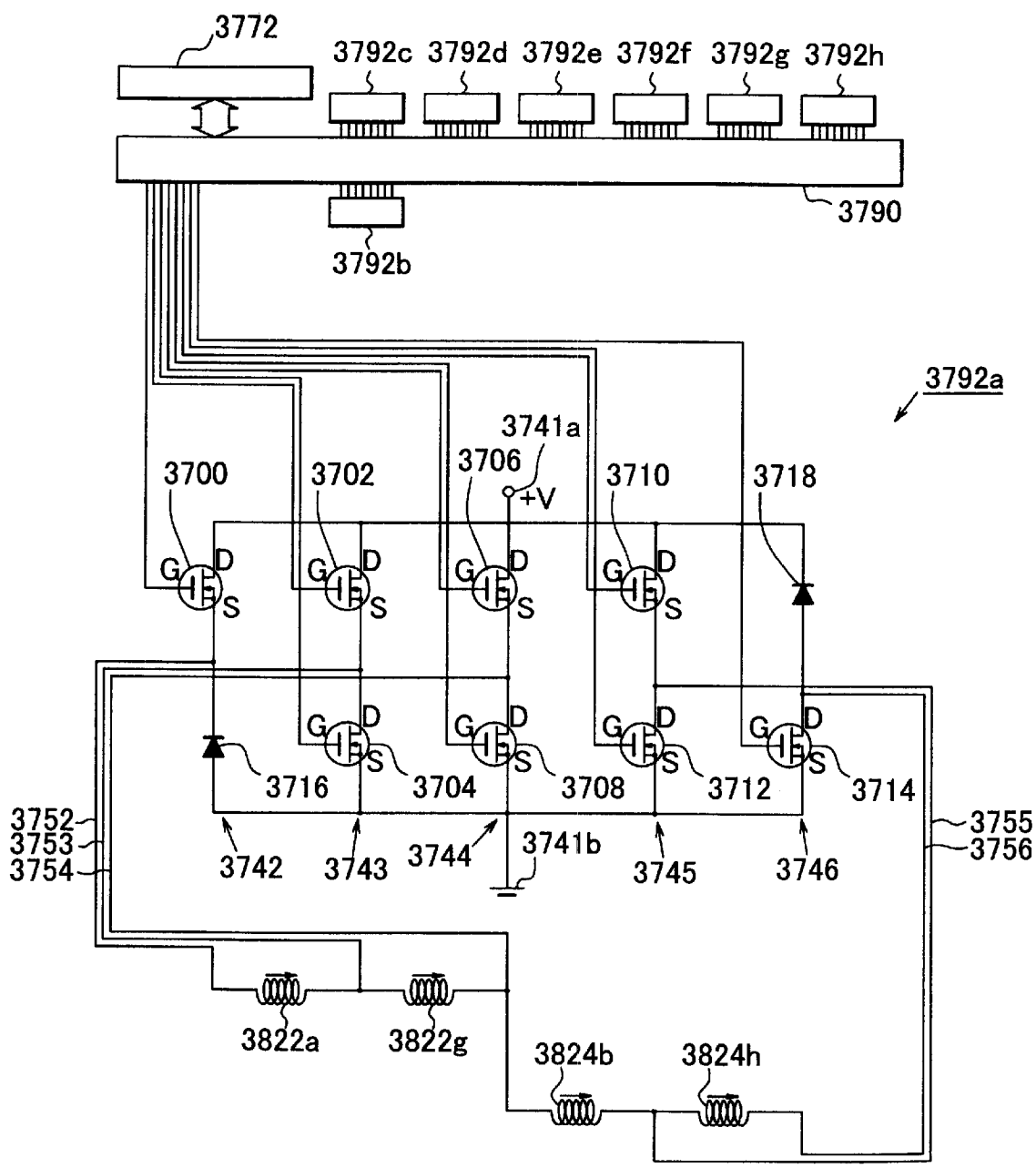
FIG. 71 is a diagram illustrating a construction of a drive circuit.
Figure 72:
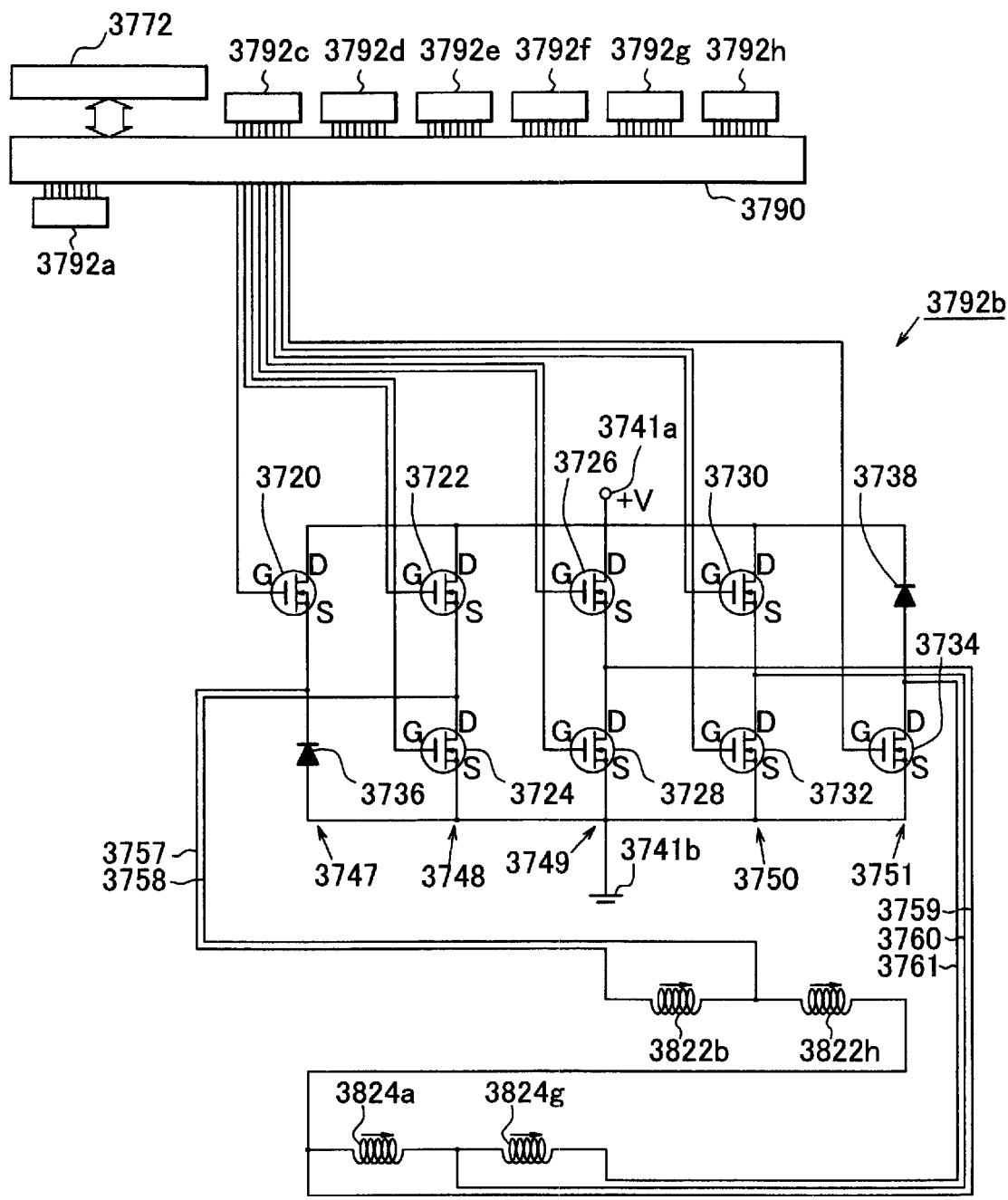
FIG. 72 is a diagram illustrating a construction of a drive circuit.

Reference Example 2 differs from Reference Example 1 in that Reference Example 2 uses a drive circuit 3792a as depicted in FIG. 71 in place of the drive circuit 3592a, and uses a drive circuit 3792b as depicted in FIG. 72 in place of the drive circuit 3592b.

Other drive circuits 3792c–3792h have relationships to the drive circuits 3792a, and 3792b corresponding to the relationships of the drive circuits 3592c–3592h to the drive circuits 3592a, and 3592b. Therefore, the other drive circuits 3792c–3792h are the same as the drive circuits 3792a, and 3792b. Hence, the drive circuits 3792a, and 3792b will be described as representatives of the other drive circuits. Other configurations of Reference Example 2 are substantially the similar to those of Reference Example 1, unless otherwise noted.

The drive circuit 3792a depicted in FIG. 71 is formed by 8 switching elements 3700, 3702, 3704, 3706, 3708, 3710, 3712, and 3714 and two diodes 3716, and 3718. Five series circuits 3342, 3743, 3744, 3745, and 3746 are connected in parallel between a high potential side terminal 3741a and a low potential side terminal 3741b. Each series circuit is formed by connecting two elements selected from the group consisting of the switching elements 3700–3714 and the diodes 3716, and 3718 in series.

Of the five series circuits 3742–3746, two series circuits 3742, and 3746 located on opposite ends in FIG. 71 are formed by connecting a switching element 3700, and 3714 and a diode 3716, and 3718, in series. The series circuit 3742 is formed by connecting the switching element 3700 and the diode 3716 in that order starting at the high potential side terminal 3741a. The series circuit 3746 is formed by connecting the diode 3718 and the switching element 3314 in that order starting at the side of the high potential side terminal 3741a. The two diodes 3716, and 3718 are disposed in such a direction as to allow current to flow from the low potential side terminal 3741b to the high potential side terminal 3741a. The other three series circuits 3743, 3744, and 3745 are formed by connecting two of the switching elements 3702–3712 in series as in Reference Example 1.

Thus, the drive circuit 3792a in this embodiment differs from the drive circuit 3592a in Reference Example 1 in that the drive circuit 3792a employs the two diodes 3716, and 3718, each provided in place of a switching element in each one of the two series circuits 3742, and 3746. Other configurations of the drive circuit 3792a are substantially the similar to those of the drive circuit 3592a. Thus, an upper coil 3822a of a first intake valve of a first cylinder, a lower coil 3824b of a second intake valve of the first cylinder, an upper coil 3822g of a first intake valve of a fourth cylinder, and a lower coil 3824h of a second intake valve of the fourth cylinder are connected to positions comparable to those in Reference Example 1, via five electrically conductive wires 3752, 3753, 3754, 3755, and 3756.

The drive circuit 3792b depicted in FIG. 72 is formed by 8 switching elements 3720, 3722, 3724, 3726, 3728, 3730, 3732, and 3734 and two diodes 3736, and 3738. Five series circuits 3747, 3748, 3749, 3750, and 3751 are connected in parallel between a high potential side terminal 3741a and a low potential side terminal 3741b. Each series circuit is formed by connecting two elements selected from the group consisting of the switching elements 3720–3734 and the diodes 3736, and 3738 in series.

Of the five series circuits 3747–3751, two series circuits 3747, and 3751 located on opposite ends in FIG. 72 are formed by connecting a switching element 3720, and 3734 and a diode 3736, and 3738, in series. The series circuit 3747 is formed by connecting the switching element 3720 and the diode 3736 in that order starting at the high potential side terminal 3741a. The series circuit 3751 is formed by connecting the diode 3738 and the switching element 3314 in that order starting at the high potential side terminal 3741a. The two diodes 3736, and 3738 are disposed in such a direction as to allow current to flow from the low potential side terminal 3741b to the high potential side terminal 3741a. The other three series circuits 3748, 3749, and 3750 are formed by connecting two of the switching elements 3722–3732 in series as in Reference Example 1.

Thus, the drive circuit 3792b in this embodiment differs from the drive circuit 3592b in Reference Example 1 in that the drive circuit 3792b employs the two diodes 3736, and 3738 each provided in place of a switching element in each one of the two series circuits 3747, and 3751 located on the opposite ends. Other configurations of the drive circuit 3792b are substantially similar to those of the drive circuit 3592b. Thus, an upper coil 3822b of the second intake valve of the first cylinder, a lower coil 3824a of the first intake valve of the first cylinder, an upper coil 3822*h* of the second intake valve of the fourth cylinder, and a lower coil 3824*g* of the first intake valve of the fourth cylinder are connected to positions comparable to those in Reference Example 1, via five electrically conductive wires 3757, 3758, 3759, 3760, and 3761.

The 16 switching elements 3700–3714 and 3720–3734 are substantially similar to the switching elements in Reference Example 1 in that ON signals and OFF signals from a processor are inputted to the gate terminals G via an output port 3772 and a buffer circuit 3790.

The opening and closing operations of the two intake valves of the first cylinder and the two intake valves of the fourth cylinder performed when control currents are supplied from the ECU. A timing chart depicted in FIG. 73 indicates the operations of the two intake valves of the first cylinder and the two intake valves of the first cylinder.

Figure 73:
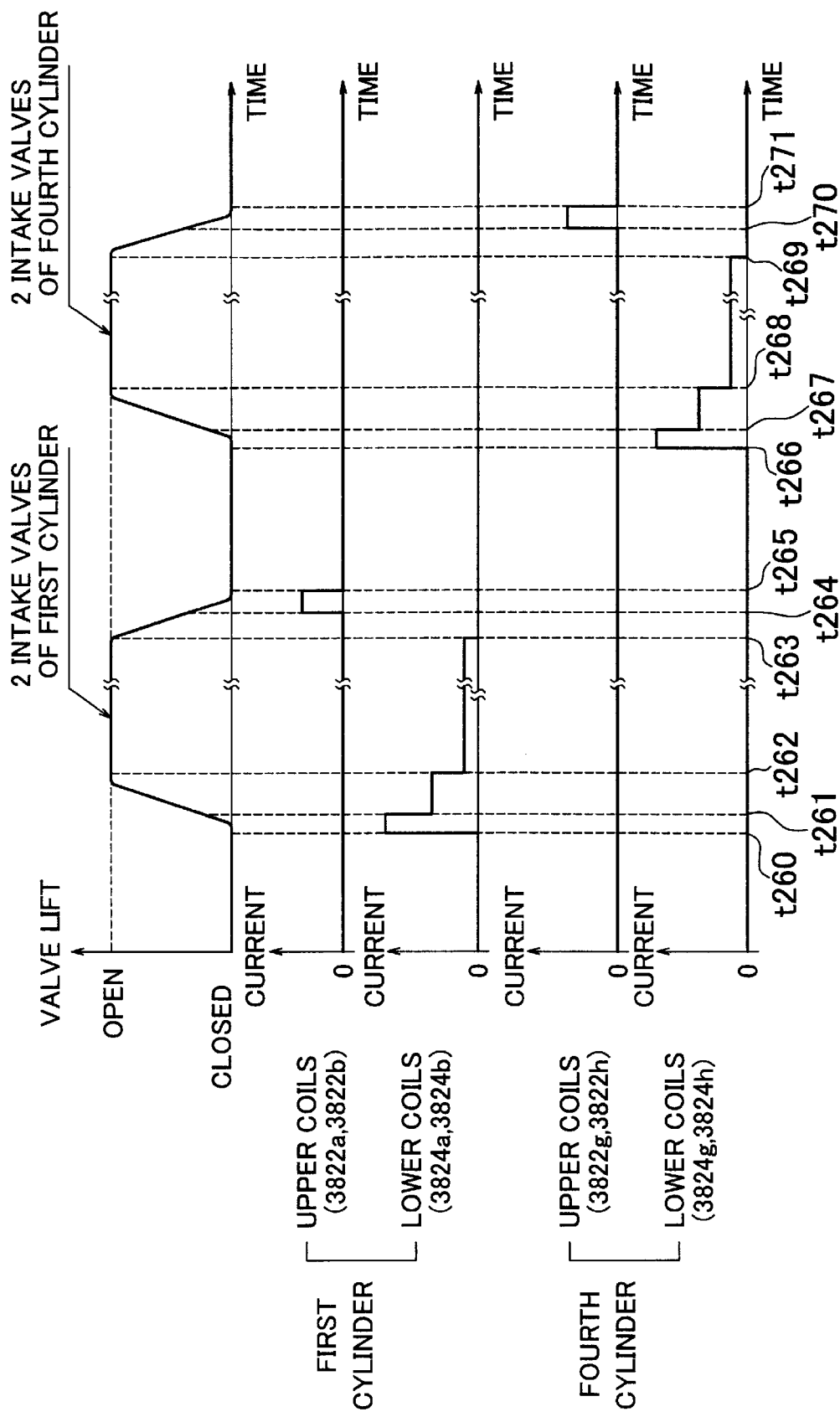
FIG. 73 is a timing chart indicating the operations of intake valves and the current control.

FIGS. 74A1 to 74O2 are circuit diagrams indicating states of control performed on the drive circuits 3792*a*, 3792*b* shown in FIGS. 71 and 72 to realize the operations indicated in FIG. 73. In FIGS. 74A1 to 74O2, the conductive wires 3752–3761 are omitted. Furthermore, in FIGS. 74A1 to 74O2, broken line arrows and circles "□" indicate the same states as described above in conjunction with the previous embodiments.

Before a time point t260 indicated in FIG. 73, the armatures 110 are brought into contact with the upper cores 116 as depicted in FIG. 10 by temporary excitation of the upper coils 3822*a*, 3822*b*, 3822*g*, and 3822*h*, and that this contact state is maintained by the magnetic attraction forces of the upper magnets 116*d*. Therefore, the valve bodies 100 are in contact with the valve seats 126, that is, the two intake valves of the first cylinder and the two intake valves of the fourth cylinder are in a completely closed state. The OFF signals are outputted to all the 16 switching elements 3700–3714, and 3720–3734*s*.

At the time of the intake stroke of the first cylinder, the processor outputs the ON signals to the switching elements 3306, 3712, 3726, and 3732 and outputs the OFF signals to the other switching elements at the time point t260 to establish switching patterns i131, i132 indicated in FIGS. 74I1 and 74I2. As a result, currents flow from the high potential side terminal 3741*a* to the low potential side terminal 3741*b* as indicated by broken line arrows in FIGS. 74I1 and 74I2, so that currents flow through the lower coils 3824*a*, 3824*b* of the two intake valves of the first cylinder in a forward direction. Then, the switching patterns i131, i132 and switching patterns j131, j132 indicated in FIGS. 74J1 and 74J2 are alternated until a time point t261.

In the switching patterns j131, and j132, the processor outputs the ON signals to the switching elements 3706, and 3726, and outputs the OFF signals to the other switching elements. Therefore, a current circulation path through which current flows in a sequence of the lower coil 3824*b* and the switching elements 3710 and 3706 is formed, and a current circulation path through which current flows in a sequence of the lower coil 3824*a* and the switching elements 3730 and 3726 is formed. Immediately after the switching patterns i131, and i132 are changed to the switching patterns j131, and j132, flywheel currents flow through the circulation paths as indicated by broken line arrows in FIGS. 74J1 and 74J2. Therefore, by adjusting the proportion of the switching patterns j131, and j132 to a sufficient value, it is possible to achieve such an adjustment that increase current flow through the lower coils 3824*a*, and 3824*b* in the forward direction.

In this manner, the lower coils 3824*a*, 3824*b* are supplied with separating currents for separating the upper cores 116 from the armatures 110 magnetically attached to the upper cores 116 due to the magnetic forces produced by the upper magnets 116*d*. Therefore, strong magnetic forces are produced from the lower cores 118, so that the armatures 110 separate from the upper cores 116, and move toward the lower cores 118.

Subsequently, at a time point t261, the processor temporarily sets switching patterns k131, and k132 indicated in FIGS. 74K1 and 74K2. In the switching patterns k131, and k132, the processor outputs the OFF signals to all the switching element 3700–3714, 3720–3734. Therefore, regenerative currents reversing from the low potential side terminal 3741*b* to the high potential side terminal 3741*a* occur as indicated by broken line arrows in FIGS. 74K1 and 74K2, so that the separating currents flowing through the lower coils 3824*a*, 3824*b* rapidly decrease. Then, the processor immediately resumes a state of alternation between the switching patterns i131, and i132 and the switching patterns j131, j132. In this case, however, the proportion of the switching patterns i131, i132 is reduced, in comparison with the pattern alternating state during the time period t260–t261. Thus, the quantity of current supplied through the lower coils 3824*a*, and 3824*b* is kept at a normal drawing current.

At this moment, the armatures 110 are sufficiently apart from the upper cores 116. Therefore, although the currents through the lower coils 3824*a*, and 3824*b* are set to the normal drawing current, the armatures 110 are not returned to the upper cores 116 by the magnetic forces from the upper magnets 116*d*. After that, due to the drawing currents and the forces from the upper springs 120, the armatures 110 rapidly move away from the upper cores 116 and approach the lower cores 118, and contact the lower cores 118 by overcoming the forces from the lower springs 106.

At a time point t262 after the armatures 110 come into contact with the lower cores 118, the processor temporarily sets the switching patterns k131, and k132 indicated in FIGS. 74K1 and 74K2. Therefore, regenerative currents occur, so that the currents flowing through the lower coils 3824*a*, and 3824*b* rapidly decrease. Then, the CPU immediately resumes a state of alternation between the switching patterns i131, and i132 and the switching patterns j131, and j132. In this case, however, the proportion of the switching patterns i131, i132 is reduced, in comparison with the pattern alternating state during the time period t261–t262. Therefore, the quantity of current supplied through the lower coils 3824*a*, and 3824*b* is reduced to the holding current so as to maintain the contact between the armatures 110 and the lower cores 118. Thus, the intake ports of the first cylinder are set to the fully open state.

Subsequently, at a time point t263 near or at a timing at which the intake stroke of the first cylinder comes to an end, the switching patterns are changed to the switching patterns k131, and k132. Therefore, regenerative currents occur as described above, so that the currents flowing through the lower coils 3824*a*, and 3824*b* rapidly discontinue.

After the armatures 110 lose the attraction forces toward the lower cores 118 as described above, the armatures 110 start to move toward the upper cores 116, or, toward the completely closed state, due to forces from the lower springs 106. Therefore, the valve bodies 100 approach the valve seats 126, or, the amount of valve lift starts to decrease.

Subsequently at a time point t264, the processor changes the switching patterns to switching patterns a131, a132 indicated in FIGS. 74A1 and 74A2, in order to draw the armatures 110 into contact with the upper cores 116. As a result, the drawing currents flow through the upper coils 3822a, 3822b. Afterwards, a drawing current is maintained by alternating the switching patterns a131, nd a132 and switching patterns b131, and b132 indicated. in FIGS. 74B1 and 74B2, until the armatures 110 contact the upper cores 116.

In the switching patterns a131, and a132, the processor outputs the ON signals to the switching elements 3700, 3704, 3720, and 3724, and outputs the OFF signals to the other switching elements. As a result, currents flow from the high potential side terminal 3741a to the low potential side terminal 3741b as indicated by broken line allows in FIGS. 74A1 and 74A2, so that currents flow through the upper coils 3822a, and 3822b of the two intake valves of the first cylinder in the forward direction.

In the switching patterns b131, and b132, the processor outputs the ON signals to only the switching elements 3700, and 3720, and outputs the OFF signals to the other switching elements. Therefore, a current circulation path through which current flows in a sequence of the upper coil 3822a and the switching elements 3702 and 3700 is formed, and a current circulation path through which current flows in a sequence of the upper coil 3822b and the switching elements 3722 and 3720 is formed. Immediately after the switching patterns a131, a132 are changed to the switching patterns b131, and b132, flywheel currents flow through the circulation paths as indicated by broken line arrows in FIGS. 74B1 and 74B2. Therefore, by adjusting the proportion between the switching patterns a131, a132 and the switching patterns b131, b132, the quantity of current flowing through the upper coils 3822a, 3822b in the forward direction can be adjusted.

At a time point t265 after the armatures 110 come into contact with the upper cores 116, the switching patterns are changed to switching patterns c131, and c132 indicated in FIGS. 74C1 and 74C2. In the switching patterns c131, and c132, the processor outputs the OFF signals to all the switching elements 3700–3714, and 3720–3734. Therefore, regenerative currents occur as indicated by broken line arrows in FIGS. 74C1 and 74C2, so that the drawing currents flowing through the upper coils 3822a, and 3822b rapidly discontinue.

Even after the drawing currents discontinue, the contact between the armatures 110 and the upper cores 116 is maintained by the magnetic attraction forces from the upper magnets 116d. In this manner, the intake ports of the first cylinder are closed.

After the state where the OFF signals are outputted to all the switching elements 3700–3714, and 3720–3734, a timing comes at which the intake stroke of the fourth cylinder occurs. The intake stroke of the fourth cylinder does not overlap the intake stroke of the first cylinder.

First, at a time point t266, the CPU outputs the ON signals to only the switching elements 3710, 3714, 3730, and 3734, and outputs the OFF signals to the other switching elements so as, to set switching patterns m131, m132 indicated in FIGS. 74M1 and 74M2. Therefore, currents flow from the high potential side terminal 3741a to the low potential side terminal 3741b as indicated by broken line arrows in FIGS. 74M1 and 74M2, so that currents flow through the lower coils 3824g, and 3824h of the two intake valves of the fourth cylinder in the forward direction. Then, the switching patterns m131, m132 and switching patterns n131, n132 indicated in FIGS. 74N1 and 74N2 are alternated until a time point t267.

In the switching patterns n131, n132, the processor outputs the ON signals to the switching elements 3710, and 3730, and outputs the OFF signals to the other switching elements. Therefore, a current circulation path through which current flows in a sequence of the lower coil 3824h, the diode 3718 and the switching element 3710 is formed, and a current circulation path through which current flows in a sequence of the lower coil 3824g, the diode 3738 and the switching element 3730 is formed. Immediately after the switching patterns m131, m132 are changed to the switching patterns n131, n132, flywheel currents flow through the circulation paths as indicated by broken line arrows in FIGS. 74N1 and 74N2. Therefore, by adjusting the proportion of the switching patterns m131, m132 to a sufficient great value, it is possible to achieve such an adjustment that increased currents flow through the lower coils 3824g, and 3824h in the forward direction.

In this manner, the lower coils 3824g, and 3824h are supplied with the separating currents for separating the upper cores 116 from the armatures 110 magnetically attached to the upper cores 116 due to the magnetic forces produced by the upper magnets 116d. Therefore, strong magnetic forces are produced from the lower cores 118, so that the armatures 110 separate from the upper cores 116, and move toward the lower cores 118.

Subsequently, at a time point t267, the processor temporarily sets switching patterns o131, and o132 indicated in FIGS. 74O1 and 74O2. In the switching patterns o131, and o132, the CPU outputs the OFF signals to all the switching elements 3700–3714, 3720–3734. Therefore, regenerative currents reversing from the low potential side terminal 3741b to the high potential side terminal 3741a occur as indicated by broken line arrows in FIGS. 74O1 and 74O2, so that the separating currents flowing through the lower coils 3824g, 3824h rapidly decrease. Then, the CPU immediately resumes a state of alternating the switching patterns m131, m132 and the switching patterns n131, and n132. In this case, however, the proportion of the switching patterns m131, and m132 is reduced, in comparison with the pattern alternating state during the time period t266–t267. Thus, the quantity of current supplied through the lower coils 3824g, and 3824h is kept at a normal drawing current.

At this moment, the armatures 110 are sufficiently apart from the upper cores 116. Therefore, although the currents through the lower coils 3824g, and 3824h are set to the normal drawing current, the armatures 110 are not returned to the upper cores 116 by the magnetic forces from the upper magnets 116d. Afterwards, due to the drawing currents and the forces from the upper springs 120, the armatures 110 rapidly move away from the upper cores 116 and approach the lower cores 118, and contact the lower cores 118 by overcoming the forces from the lower springs 106.

At a time point t268 after the armatures 110 come into contact with the lower cores 118, the processor temporarily sets the switching patterns o131, and o132 indicated in FIGS. 74O1 and 74O2. Therefore, regenerative currents occur so that the drawing currents through the lower coils 3824g, 3824h rapidly decrease. Then, the processor immediately resumes a state of alternating the switching patterns m131, and 132 and the switching patterns n131, and n132. In this case, however, the proportion of the switching patterns m131, and m132 is reduced, in comparison with the pattern alternating state during the time period t267–t268. Thus, the quantity of current supplied through the lower coils 3824g, and 3824h is kept at the holding current, so as to maintain the contact between the armatures 110 and the lower cores 118. In this manner, the intake ports of the fourth cylinder are set to the fully open state.

Subsequently, at a time point t269 near or at a timing at which the intake stroke of the fourth cylinder comes to an end, the switching patterns are changed to the switching patterns o131, and o132 indicated in FIGS. 74O1 and 74O2. Therefore, regenerative currents occur, so that the holding currents flowing through the lower coils 3824g, 3824h rapidly discontinue.

After the armatures 110 lose the attraction forces toward the lower cores 118 as indicated above, the armatures 110 start to move toward the upper cores 116, or, toward the completely closed state, due to the forces from the lower springs 106. Therefore, the valve bodies 100 approach the valve seats 126, and is, the amount of valve lift starts to decrease.

Subsequently at a time point t270, the processor changes the switching patterns to switching patterns e131, and e132 indicated in FIGS. 74E1 and 74E2, in order to draw the armatures 110 into contact with the upper cores 116. As a result, the drawing currents flow through the upper coils 3822g, and 3822h. Afterwards, a needed drawing current is maintained by alternating the switching patterns e131, e132 and switching patterns f131, and f132 indicated in FIGS. 74F1 and 74F2, until the armatures 110 contact the upper cores 116.

In the switching patterns e131, and e132, the processor outputs the ON signals to the switching elements 3702, 3708, 3722, and 3728, and outputs the OFF signals to the other switching elements. As a result, currents flow from the high potential side terminal 3741a to the low potential side terminal 3741b as indicated by broken line allows in FIGS. 74E1 and 74E2, so that currents flow through the upper coils 3822g, and 3822h of the two intake valves of the fourth cylinder in the forward direction.

In the switching patterns f131, and f132, the processor outputs the ON signals to only the switching elements 3702, and 3722, and outputs the OFF signals to the other switching elements. Therefore, a current circulation path through which current flows in a sequence of the upper coil 3822g and the switching elements 3706 and 3702 is formed, and a current circulation path through which current flows in a sequence of the upper coil 3822h and the switching elements 3726 and 3722 is formed. Immediately after the switching patterns e131, and e132 are changed to the switching patterns f131, f132, flywheel currents flow through the circulation paths as indicated by broken line arrows in FIGS. 74F1 and 74F2. Therefore, by adjusting the proportion between the switching patterns e131, e132 and the switching patterns f131, and f132, the quantity of current flowing through the upper coils 3822g, and 3822h in the forward direction can be adjusted.

At a time point t271 after the armatures 110 come into contact with the upper cores 116, the switching patterns are changed to switching patterns g131, g132 indicated in FIGS. 74G1 and 74G2. In the switching patterns g131, g132, the CPU outputs the OFF signals to all the switching elements 3700–3714, 3720–3734. Therefore, regenerative currents occur as indicated by broken line arrows in FIGS. 74G1 and 74G2, so that the drawing currents flowing through the upper coils 3822g, and 3822h rapidly discontinue.

After the drawing currents discontinue, the contact between the armatures 110 and the upper cores 116 is maintained by the magnetic attraction forces from the upper magnets 116d. In this manner, the intake ports of the fourth cylinder are set to the closed state.

The four intake valves of the first cylinder and the fourth cylinder are opened and closed in the above-described fashion by the drive circuits 3792a, and 3792b, which include, in total, the 16 switching elements 3700–3714, 3720–3734 and the four diodes 3716, 3718, 3736, and 3738.

Through comparison between the switching elements 3700–3712, and 3720–3732 and the diodes 3716, and 3736 used to conduct current to drive the upper coils 3822a, and 3822b and the lower coils 3824a, and 3824b of the two intake valves of the first cylinder as indicated in FIGS. 74A1, 74A2, 74B1, 74B2, 74C1, 74C2, 74I1, 74I2, 74J1, 74J2, 74K1 and 74K2 and the switching elements 3702–3714, and 3722–3734 and the diodes 3718, and 3738 used to conduct current to drive the upper coils 3822g, and 3822h and the lower coils 3824g, and 3824h of the two intake valves of the fourth cylinder as indicated in FIGS. 74E1, 74E2, 74F1, 74F2, 74G1, 74G2, 74M1, 74M2, 74N1, 74N2, 74O1 and 74O2, it should be understood that the switching elements 3702–3712, 3722–3732 are shared.

Configurations substantially similar to those of the drive circuits 3792a, and 3792b are adopted to form the drive circuits 3792c, and 3792d for driving a total of four exhaust valves of the first cylinder and the fourth cylinder, the drive circuits 3792e, and 3792f for driving a total of four intake valves of the second cylinder and the third cylinder, and the drive circuits 3792g, and 3792h for driving a total of four exhaust valves of the second cylinder and the third cylinder. In these six drive circuits, too, switching elements are shared as described above in conjunction with the drive circuits 3792a, and 3792b, and control is performed in a pattern substantially the same as that indicated in FIG. 73 so as to open and close the intake and exhaust valves.

Therefore, the drive circuit portion, equipped with the eight drive circuits 3792a–3792h, is able to drive a total of 16 valves of the four cylinders, or, the 8 intake valves and the 8 exhaust valves, in the combinations as depicted in FIG. 16.

Thus, the drive circuits 3792a–3792h use a total of 64 switching elements and a total of 16 diodes to drive and open the 16 valves. The upper coils and the lower coils of the 16 valves are connected via the 40 electrically conductive wires, and are controlled as described above.

Although in the foregoing embodiments and the foregoing reference examples, the upper magnets 116d formed by permanent magnets are provided only at the side of the upper cores 116, permanent magnets may also be provided at the side of the lower cores 118 as well as at the side of the upper cores 116. This configuration eliminates the need for the holding current during the valve open period.

The switching elements are not limited to FETs, but may also be other kinds of transistors, for example, IGBTs, or the like.

In the disclosed embodiments the quantity of current is sharply changed by causing regenerative currents at the time of the switching from the separating current to the drawing current or the switching from the drawing current to the holding current, however, it also is possible to smoothly change the quantity of current without causing regenerative current at the time of the above-described switching of current. Conversely, it is also possible to cause a regenerative current so as to sharply change the quantity of current.

Although the foregoing embodiments and the foregoing reference examples are provided for four-cylinder internal combustion engines, the internal combustion engine may have various numbers of cylinders, for example, six cylinders, eight cylinders, and the like. In this case, too, drive circuits are provided collectively for groups of valves each consisting of a plurality of valves that perform identical operations, and other valves whose open valve period does not overlap the open valve period of the aforementioned plurality of valves.

Besides the above-described embodiments of the invention, it should be noted that the invention includes an embodiment as follows:

An electromagnetic valve drive apparatus of an internal combustion engine for opening and closing intake valves and/or exhaust valves provided for a plurality cylinders, wherein the valves are provided with valve-opening electromagnetic coils, valve-closing electromagnetic coils, and a closed valve state holding mechanism that does not rely on electromagnetic force, and wherein drive circuits are provided for the electromagnetic coils, and the electromagnetic valve drive apparatus of an internal combustion engine being characterized in that the drive circuits are provided collectively for a group of N number of valves, that is, the group consisting of a plurality of valves that perform identical operations and valves whose open period does not overlap the open period of the plurality of valves, and that N+1 number of series circuits, each formed by connecting a plurality of switching elements, are connected in parallel between a high electric potential side and a low electric potential side, and electromagnetic coils provided for the N number of valves are connected between the N+1 number of series circuits, so that switching elements are shared in the group of valves.

While the invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. An electromagnetic valve drive apparatus of an internal combustion engine, comprising:

valve-opening first electromagnetic coils provided for a plurality of valves for a plurality of cylinders;

plurality of valve-closing second electromagnetic coils provided for the plurality of valves;

a mechanism that holds the plurality of valves in a closed state without using an electromagnetic force; and a drive circuit provided for the first and second electromagnetic coils, wherein the drive circuit is provided collectively for a valve group of the plurality of valves, the valve group including first valves having a first open period and perform identical operations and at least one second valve having a second open period does not overlap the first open period of the first of valves, and wherein the drive circuit includes a plurality of series circuits, each series circuit formed by connecting a plurality of switching elements in series, the plurality of series circuits are connected in parallel between a high electric potential side terminal and a low electric potential side terminal, and wherein the plurality of series circuits are connected by the first and second electromagnetic coils provided for the first valves and at least one second valve of the valve group.

2. An electromagnetic valve drive apparatus according to claim 1, wherein the drive circuit comprises:

a first series circuit connection that connects two series circuits among the plurality of series circuits via the first and second electromagnetic coils provided for the first valves; and a second series circuit connection that connects two series circuits among the plurality of series circuits via the first and second electromagnetic coils provided for the at least one second valve.

3. An electromagnetic valve drive apparatus according to claim 2, wherein the drive circuit is formed by alternately disposing the first series circuit connection and the second series circuit connection.

4. An electromagnetic valve drive apparatus according to claim 2, wherein the drive circuit is formed by disposing the first series circuit connection and the second series circuit connection separately, with a boundary series circuit defining a boundary between the first series circuit connection and the second series circuit connection.

5. An electromagnetic valve drive apparatus according to claim 1, wherein the plurality of series circuits are connected to each other via the first and second electromagnetic coils.

6. An electromagnetic valve drive apparatus according to claim 1, wherein the plurality of series circuit are formed by connecting three switching elements of the plurality of switching elements in series, and wherein the plurality of series circuits are connected by connecting end portions of the first and second electromagnetic coils to series connecting portions between the switching elements.

7. An electromagnetic valve drive apparatus according to claim 6, wherein the drive circuit is provided collectively for the valve group having four valves that includes two first valves for a first cylinder of the plurality of cylinders and two second valves for a second cylinder of the plurality of cylinders, and wherein the plurality of series circuits includes five series circuits, each series circuit is formed by connecting three switching elements of the plurality of switching elements in series, the five series circuits are connected in parallel between the high electric potential side terminal and the low electric potential side terminal, and the first and second electromagnetic coils provided for the valve group of the four valves are connected between the five series circuits.

8. An electromagnetic valve drive apparatus according to claim 6, wherein the drive circuit is provided collectively for the valve group having three valves that includes two first valves for a first cylinder of the plurality of cylinders and one second valve for a second cylinder of the plurality of cylinders, and wherein the plurality of series circuits includes four series circuits, each series circuit is formed by connecting three switching elements of the plurality of switching elements in series, the four series circuits are connected in parallel between the high electric potential side terminal and the low electric potential side terminal, and the first and second electromagnetic coils provided for the valve group of the three valves are connected between the four series circuits.

9. An electromagnetic valve drive apparatus according to claim 6, wherein the drive circuit is provided collectively for the valve group having five valves that includes three first valves for a first cylinder of the plurality of cylinders and two second valves for a second cylinder of the plurality of cylinders, and wherein the plurality of series circuits includes six series circuits, each series circuit formed by connecting three switching elements of the plurality of switching elements in series, the six series circuits are connected in parallel between the high electric potential side terminal and a low electric potential side terminal, and the first and second electromagnetic coils provided for the valve group of the five valves are connected between the six series circuits.

10. An electromagnetic valve drive apparatus according to claim 6, wherein the drive circuit is provided collectively for the valve group having six valves that includes three first valves for a first cylinder of the plurality of cylinders and three second valves for a second cylinder of the plurality of cylinders, and wherein the plurality of series circuits includes seven series circuits, each series circuit is formed by connecting three switching elements of the plurality of switching elements in series, the seven series circuits are connected in parallel between the high electric potential side terminal and the low electric potential side terminal, and the first and second electromagnetic coils provided for the valve group of the six valves are connected between the seven series circuits.

11. An electromagnetic valve drive apparatus according to claim 1, wherein a first at least one series circuit of the plurality of series circuit is formed by connecting three switching elements of the plurality of switching elements in series, and a second at least one series circuit of the plurality of series circuits is formed by connecting two switching elements of the plurality of switching elements and a diode in series, the diode being disposed between the two switching elements in such a direction as to allow a current to flow from the low electric potential side terminal to a high electric potential side terminal, and wherein the series circuits are connected by connecting end portions of the first and second electromagnetic coils to series connecting portions between the switching elements of the first at least one series circuit and to series connecting portions between the diode and the switching elements of the second at least one series circuit.

12. An electromagnetic valve drive apparatus according to claim 11, wherein the drive circuit is provided collectively for the valve group having four valves that includes two first valves for a first cylinder of the plurality of cylinders and two valves for a second cylinder of the plurality of cylinders, and wherein the plurality of series circuits includes five series circuits having four series circuits formed by connecting three switching elements of the plurality of switching elements in series, and one series circuit formed by connecting two switching elements of the plurality of switching elements and a diode, the five series circuits are connected in parallel between the high electric potential side terminal and the low electric potential side terminal, and the first and second electromagnetic coils provided for the valve group of the four valves are connected between the five series circuits.

13. An electromagnetic valve drive apparatus according to claim 11, wherein the drive circuit is provided collectively for the valve group having three valves that includes two first valves for a first cylinder of the plurality of cylinders and one second valve for a second cylinder of the plurality of cylinders, and wherein the plurality of series circuits includes four series circuits having three series circuits formed by connecting three switching elements of the plurality of switching elements in series and one series circuit formed by connecting two switching elements of the plurality of switching elements and a diode, the four series circuits are connected in parallel between the high electric potential side terminal and the low electric potential side terminal, and the first and second electromagnetic coils provided for the valve group of the three valves are connected between the four series circuits.

14. An electromagnetic valve drive apparatus according to claim 11, wherein the drive circuit is provided collectively for the valve group having five valves that includes three first valves for a first cylinder of the plurality of cylinders and two second valves for a second cylinder of the plurality of cylinders, and wherein the plurality of series circuits includes six series circuits having four series circuits formed by connecting three switching elements of the plurality of switching elements in series and two series circuits formed by connecting two switching elements of the plurality of switching elements and a diode, the six series circuits are connected in parallel between the high electric potential side terminal and the low electric potential side terminal, and the electromagnetic coils provided for the valve group of the five valves are connected between the six series circuits.

15. An electromagnetic valve drive apparatus according to claim 11, wherein the drive circuit is provided collectively for the valve group having six valves that includes three first valves for a first cylinder of the plurality of cylinders and three second valves for a second cylinder of the plurality of cylinders, and wherein the plurality of series circuits includes seven series circuits having five series circuits formed by connecting three switching elements of the plurality of switching elements in series and two series circuits formed by connecting two switching elements of the plurality of switching elements and a diode, the seven series circuits are connected in parallel between the high electric potential side terminal and the low electric potential side terminal, and the first and second electromagnetic coils provided for the valve group of the six valves are connected between the seven series circuits.

16. An electromagnetic valve drive apparatus according to claim 11, wherein the drive circuit is provided collectively for the valve group having four valves that includes two first valves for a first cylinder of the plurality of cylinders and two second valves of a second cylinder of the plurality of cylinders, and wherein the plurality of series circuits includes five series circuits having three series circuits formed by connecting three switching elements of the plurality of switching elements in series and two series circuits formed by connecting two switching elements of the plurality of switching elements and a diode, the five series circuits are connected in parallel between the high electric potential side terminal and the low electric potential side terminal, and the first and second electromagnetic coils provided for the valve group of the four valves are connected between the five series circuits.

17. An electromagnetic valve drive apparatus according to claim 1, wherein the first electromagnetic coil and the second electromagnetic coil of each valve are connected between different pairs of the plurality of series circuits.

18. An electromagnetic valve drive apparatus according to claim 17, wherein the series circuits of the plurality of series circuits are formed by connecting two switching elements of the plurality of switching elements in series, and the series circuits are connected by connecting end portions of the first and second electromagnetic coils to series connecting portions between the switching elements.

19. An electromagnetic valve drive apparatus according to claim 18,
wherein the drive circuit is provided collectively for the valve group having four valves that includes two first valves of the plurality of cylinders for a first cylinder and two second valves for a second cylinder, and
wherein the plurality of series circuits includes nine series circuits formed by connecting two switching elements of the plurality of switching elements in series, the nine series circuits are connected in parallel between the high electric potential side terminal and the low electric potential side terminal, and the nine series circuits are connected via the first and second electromagnetic coils provided for the four valves.

20. An electromagnetic valve drive apparatus according to claim 17,
wherein a first at least one series circuit of the plurality of series circuits is formed by connecting two switching elements of the plurality of switching elements, and a second at least one series circuit of the plurality of series circuits is formed by connecting one switching element of the plurality of switching elements and a diode in series, the diode being disposed in such a direction as to allow a current to flow from the low electric potential side terminal to the high electric potential side terminal,
and wherein the series circuits are connected by connecting end portions of the first and second electromagnetic coils to a series connecting portion between the switching elements of the first at least one series circuit and to a series connecting portion between the switching element and the diode of the second at least one series circuit.

21. An electromagnetic valve drive apparatus according to claim 20,
wherein the drive circuit is provided collectively for the valve group having four valves that includes two first valves for a first cylinder of the plurality of cylinders and two second valves for a second cylinder, and
wherein the plurality of series circuits includes nine series circuits consisting of six series circuits formed by connecting two switching elements of the plurality of switching elements in series and three series circuits formed by connecting one switching element of the plurality of switching elements and one diode, the nine series circuits are connected in parallel between the high electric potential side terminal and the low electric potential side terminal, and the nine series circuits are connected via the first and second electromagnetic coils provided for the valve group of the four valves.

22. An electromagnetic valve drive apparatus according to claim 1, wherein the switching elements have built-in diodes, and are disposed in such a direction that a current is allowed to flow from the low electric potential side terminal to the high electric potential side terminal by the diodes.

* * * * *